US008061132B2

(12) United States Patent
Fong et al.

(10) Patent No.: US 8,061,132 B2
(45) Date of Patent: Nov. 22, 2011

(54) COMPRESSED AIR ENERGY STORAGE SYSTEM UTILIZING TWO-PHASE FLOW TO FACILITATE HEAT EXCHANGE

(75) Inventors: Danielle A. Fong, Berkeley, CA (US); Stephen E. Crane, Santa Rosa, CA (US); Edwin P. Berlin, Jr., Oakland, CA (US); AmirHossein Pourmousa Abkenar, Irvine, CA (US); Kartikeya Mahalatkar, Oakland, CA (US); Yongxi Hou, Albany, CA (US); Todd Bowers, San Jose, CA (US); Karl E. Stahlkopf, Honolulu, HI (US)

(73) Assignee: Lightsail Energy, Inc., Oakland, CA (US)

( * ) Notice: Subject to any disclaimer, the term of this patent is extended or adjusted under 35 U.S.C. 154(b) by 0 days.

(21) Appl. No.: 12/868,701

(22) Filed: Aug. 25, 2010

(65) Prior Publication Data

US 2011/0030552 A1 Feb. 10, 2011

Related U.S. Application Data

(63) Continuation of application No. 12/823,944, filed on Jun. 25, 2010, which is a continuation-in-part of application No. 12/695,922, filed on Jan. 28, 2010, and a continuation-in-part of application No. 12/730,549, filed on Mar. 24, 2010.

(60) Provisional application No. 61/221,487, filed on Jun. 29, 2009, provisional application No. 61/294,396, filed on Jan. 12, 2010, provisional application No. 61/306,122, filed on Feb. 19, 2010, provisional application No. 61/320,150, filed on Apr. 1, 2010, provisional application No. 61/347,312, filed on May 21, 2010, provisional application No. 61/347,056, filed on May 21, 2010, provisional application No. 61/348,661, filed on May 26, 2010, provisional application No. 61/358,776, filed on Jun. 25, 2010.

(51) Int. Cl.
*F01B 21/02* (2006.01)
*F03C 1/00* (2006.01)

(52) U.S. Cl. ............................ 60/417; 60/407; 417/438

(58) Field of Classification Search .................... 60/370, 60/407, 415, 417; 417/438
See application file for complete search history.

(56) References Cited

U.S. PATENT DOCUMENTS 1,751,537 A 3/1930 Vianello
(Continued)

FOREIGN PATENT DOCUMENTS

DE 828844 1/1952
(Continued)

OTHER PUBLICATIONS

Website, "LightSail Designs—Technologies", Oct. 2008.
(Continued)

*Primary Examiner* — Thomas E Lazo

(57) ABSTRACT

A compressed-air energy storage system according to embodiments of the present invention comprises a reversible mechanism to compress and expand air, one or more compressed air storage tanks, a control system, one or more heat exchangers, and, in certain embodiments of the invention, a motor-generator. The reversible air compressor-expander uses mechanical power to compress air (when it is acting as a compressor) and converts the energy stored in compressed air to mechanical power (when it is acting as an expander). In certain embodiments, the compressor-expander comprises one or more stages, each stage consisting of pressure vessel (the "pressure cell") partially filled with water or other liquid. In some embodiments, the pressure vessel communicates with one or more cylinder devices to exchange air and liquid with the cylinder chamber(s) thereof. Suitable valving allows air to enter and leave the pressure cell and cylinder device, if present, under electronic control.

22 Claims, 207 Drawing Sheets

U.S. PATENT DOCUMENTS

| | | | |
|---|---|---|---|
| 1,929,350 A | 10/1933 | Christensen | |
| 2,025,142 A | 12/1935 | Zahm et al. | |
| 2,284,443 A | 5/1942 | Paradise | |
| 2,745,701 A | 5/1956 | Wahlin | |
| 3,192,705 A | 7/1965 | Miller | |
| 3,608,311 A | 9/1971 | Rosel, Jr. | |
| 3,659,787 A | 5/1972 | Ito | |
| 3,704,079 A | 11/1972 | Berlyn | |
| 3,858,812 A | 1/1975 | Williams et al. | |
| 3,862,590 A | 1/1975 | Mengeler | |
| 3,877,229 A | 4/1975 | Resler, Jr. | |
| 3,972,194 A | 8/1976 | Eskeli | |
| 4,016,724 A | 4/1977 | Karlsson | |
| 4,027,993 A | 6/1977 | Wolff | |
| 4,097,000 A | 6/1978 | Derr | |
| 4,170,878 A | 10/1979 | Jahnig | |
| 4,295,518 A | 10/1981 | Rannenberg | |
| 4,342,920 A | 8/1982 | Bucknam | |
| 4,393,653 A | 7/1983 | Fischer | |
| 4,426,847 A | 1/1984 | Fischer | |
| 4,432,203 A | 2/1984 | Fischer | |
| 4,484,082 A | 11/1984 | Bucknam | |
| 4,484,457 A | 11/1984 | Mugele | |
| 4,747,271 A | 5/1988 | Fischer | |
| 4,905,911 A | 3/1990 | Sakuma | |
| 5,027,602 A | 7/1991 | Glen et al. | |
| 5,076,067 A | 12/1991 | Prenger et al. | |
| 5,115,157 A | 5/1992 | Blumenau | |
| 5,121,607 A | 6/1992 | George, Jr. | |
| 5,169,295 A | 12/1992 | Stogner et al. | |
| 5,195,874 A | 3/1993 | Odagiri | |
| 5,214,921 A | 6/1993 | Cooley | |
| 5,404,937 A | 4/1995 | Assaf et al. | |
| 5,491,969 A | 2/1996 | Cohn et al. | |
| 5,537,822 A | 7/1996 | Shnaid et al. | |
| 5,537,974 A | 7/1996 | Palmer | |
| 5,616,007 A | 4/1997 | Cohen | |
| 5,634,340 A | 6/1997 | Grennan | |
| 5,638,684 A | 6/1997 | Siegel et al. | |
| 5,771,693 A | 6/1998 | Coney | |
| 5,899,067 A | 5/1999 | Hageman | |
| 5,934,076 A | 8/1999 | Coney | |
| 6,145,311 A | 11/2000 | Cyphelly | |
| 6,206,660 B1 | 3/2001 | Coney et al. | |
| 6,323,332 B1 | 11/2001 | Fukuda et al. | |
| RE37,603 E | 3/2002 | Coney | |
| 6,449,940 B2 | 9/2002 | Nagel | |
| 6,516,603 B1 | 2/2003 | Urbach | |
| 6,564,551 B1 | 5/2003 | Stock | |
| 6,607,361 B1 | 8/2003 | Kotter et al. | |
| 6,817,185 B2 | 11/2004 | Coney et al. | |
| 6,834,503 B2 | 12/2004 | Freymann | |
| 6,840,309 B2 | 1/2005 | Wilson et al. | |
| 6,858,953 B2 | 2/2005 | Stahlkopf | |
| 6,874,453 B2 | 4/2005 | Coney et al. | |
| 6,883,775 B2 | 4/2005 | Coney et al. | |
| 7,002,260 B2 | 2/2006 | Stahlkopf | |
| 7,073,335 B2 | 7/2006 | Gerdes et al. | |
| 7,086,231 B2 | 8/2006 | Pinkerton | |
| 7,140,182 B2 | 11/2006 | Warren | |
| 7,150,154 B2 | 12/2006 | Althaus et al. | |
| 7,398,841 B2 | 7/2008 | Kaufman | |
| 7,401,475 B2 | 7/2008 | Hugenroth et al. | |
| 7,432,611 B2 | 10/2008 | Stahlkopf | |
| 7,464,551 B2 | 12/2008 | Althaus et al. | |
| 7,469,527 B2 | 12/2008 | Negre et al. | |
| 7,566,992 B2 | 7/2009 | Althaus | |
| 7,612,466 B2 | 11/2009 | Skutt | |
| 7,614,237 B2 | 11/2009 | Nakhamkin | |
| 7,622,816 B2 | 11/2009 | Stahlkopf | |
| 7,640,643 B2 | 1/2010 | Nakhamkin | |
| 7,669,419 B2 | 3/2010 | Juby et al. | |
| 7,694,514 B2 | 4/2010 | Smith et al. | |
| 7,832,207 B2 * | 11/2010 | McBride et al. | 60/415 |
| 7,834,479 B2 | 11/2010 | Capp et al. | |
| 7,958,731 B2 | 6/2011 | McBride et al. | |
| 7,963,110 B2 | 6/2011 | Bollinger et al. | |
| 2001/0039795 A1 | 11/2001 | Nagel | |
| 2002/0128747 A1 | 9/2002 | Mima | |
| 2003/0180155 A1 * | 9/2003 | Coney et al. | 417/228 |
| 2004/0020528 A1 | 2/2004 | Patwardhan | |
| 2004/0244580 A1 | 12/2004 | Coney et al. | |
| 2005/0120715 A1 | 6/2005 | Labrador | |
| 2005/0126171 A1 | 6/2005 | Lasker | |
| 2005/0126176 A1 | 6/2005 | Fletcher et al. | |
| 2005/0178125 A1 | 8/2005 | Skinnes et al. | |
| 2005/0279296 A1 | 12/2005 | Coney et al. | |
| 2006/0248886 A1 | 11/2006 | Ma | |
| 2007/0006586 A1 | 1/2007 | Hoffman et al. | |
| 2007/0215723 A1 | 9/2007 | Moser et al. | |
| 2007/0295673 A1 | 12/2007 | Enis et al. | |
| 2008/0013253 A1 | 1/2008 | Thrap et al. | |
| 2008/0046387 A1 | 2/2008 | Gopal et al. | |
| 2008/0047271 A1 | 2/2008 | Ingersoll | |
| 2008/0155985 A1 | 7/2008 | Labrador | |
| 2008/0264062 A1 | 10/2008 | Prueitt | |
| 2009/0033102 A1 | 2/2009 | Enis et al. | |
| 2009/0038684 A1 | 2/2009 | Chatfield et al. | |
| 2009/0093916 A1 | 4/2009 | Parsonnet et al. | |
| 2009/0189456 A1 | 7/2009 | Skutt | |
| 2009/0205329 A1 | 8/2009 | Patwardhan | |
| 2009/0217666 A1 | 9/2009 | Farkaly | |
| 2009/0230696 A1 | 9/2009 | Enis et al. | |
| 2009/0281965 A9 | 11/2009 | Enis et al. | |
| 2009/0301089 A1 | 12/2009 | Bollinger | |
| 2009/0322084 A1 | 12/2009 | Hamilton | |
| 2010/0018196 A1 | 1/2010 | Li et al. | |
| 2010/0018247 A1 | 1/2010 | Enis et al. | |
| 2010/0037653 A1 | 2/2010 | Enis et al. | |
| 2010/0051003 A1 | 3/2010 | Negre et al. | |
| 2010/0089063 A1 | 4/2010 | McBride et al. | |
| 2010/0090532 A1 | 4/2010 | Shelton et al. | |
| 2010/0111713 A1 | 5/2010 | Chatfield et al. | |
| 2010/0127664 A1 | 5/2010 | Paice et al. | |
| 2010/0138058 A1 | 6/2010 | Kirchner et al. | |
| 2010/0205960 A1 | 8/2010 | McBride et al. | |
| 2010/0257862 A1 | 10/2010 | Howes et al. | |
| 2010/0275634 A1 | 11/2010 | Okamoto et al. | |
| 2010/0307156 A1 | 12/2010 | Bollinger et al. | |
| 2011/0056368 A1 | 3/2011 | McBride et al. | |
| 2011/0061741 A1 | 3/2011 | Ingersoll et al. | |
| 2011/0061836 A1 | 3/2011 | Ingersoll et al. | |
| 2011/0062166 A1 | 3/2011 | Ingersoll et al. | |
| 2011/0070031 A1 | 3/2011 | Frazier et al. | |
| 2011/0070032 A1 | 3/2011 | Frazier et al. | |
| 2011/0131966 A1 | 6/2011 | McBride et al. | |

FOREIGN PATENT DOCUMENTS

| | | |
|---|---|---|
| DE | 10151323 A1 | 1/2002 |
| EP | 0196690 B1 | 10/1989 |
| EP | 1783364 A2 | 5/2007 |
| ES | 2150833 A1 | 1/2000 |
| FR | 2 229 857 | 12/1974 |
| GB | 233078 | 5/1925 |
| GB | 1100983 | 1/1968 |
| GB | 1273537 | 5/1972 |
| GB | 2239489 A | 7/1991 |
| GB | 2376507 A | 12/2002 |
| JP | 52104644 A | 2/1977 |
| JP | 56-085527 | 7/1981 |
| JP | 58-155286 | 9/1983 |
| JP | 58155286 A | 9/1983 |
| JP | 63-115997 A | 5/1988 |
| JP | 4093559 A | 3/1992 |
| JP | 04-116348 A | 4/1992 |
| JP | 2000-314405 | 11/2000 |
| KR | 93-11547 | 6/1993 |
| KR | 1020080024497 A | 3/2008 |
| WO | WO 80/01301 | 6/1980 |
| WO | WO 87/03357 | 6/1987 |
| WO | WO 91/02885 | 3/1991 |
| WO | WO 93/06367 | 4/1993 |
| WO | WO 93/24754 | 12/1993 |
| WO | WO 94/12785 | 6/1994 |
| WO | WO 98/16741 | 4/1998 |
| WO | WO 99/47803 A1 | 9/1999 |
| WO | WO 01/75278 A1 | 10/2001 |

| | | | |
|---|---|---|---|
| WO | WO 01/75283 | A1 | 10/2001 |
| WO | WO 01/75290 | A1 | 10/2001 |
| WO | WO 01/75308 | A1 | 10/2001 |
| WO | WO 01/75383 | A1 | 10/2001 |
| WO | WO 03/021107 | A1 | 3/2003 |
| WO | WO 03/021702 | A1 | 3/2003 |
| WO | WO 2004/022960 | A1 | 3/2004 |
| WO | WO 2007/066117 | A1 | 6/2007 |
| WO | WO 2007/118282 | A1 | 10/2007 |
| WO | WO 2007/120525 | A2 | 10/2007 |
| WO | WO 2007/140583 | A1 | 12/2007 |
| WO | WO 2008/013870 | A2 | 1/2008 |
| WO | WO 2008/022406 | A1 | 2/2008 |
| WO | WO 2008/045468 | A1 | 4/2008 |
| WO | WO 2008/064197 | A2 | 5/2008 |
| WO | WO 2008/094058 | A2 | 8/2008 |
| WO | WO 2008/139267 | A1 | 11/2008 |
| WO | WO 2008/152432 | A2 | 12/2008 |
| WO | WO 2008/153716 | A2 | 12/2008 |
| WO | WO 2009/034421 | A1 | 3/2009 |
| WO | WO 2009/034548 | A2 | 3/2009 |
| WO | WO 2009/044139 | A2 | 4/2009 |
| WO | WO 2009/061866 | A2 | 5/2009 |
| WO | WO 2009/081171 | A2 | 7/2009 |
| WO | WO 2009/114205 | A2 | 9/2009 |
| WO | WO 2009/126784 | A2 | 10/2009 |
| WO | WO 2010/074589 | A2 | 7/2010 |
| WO | WO 2010/128224 | A1 | 11/2010 |
| WO | WO 2011/053402 | A1 | 5/2011 |
| WO | WO 2011/056296 | A2 | 5/2011 |
| WO | WO 2011/056303 | A2 | 5/2011 |
| WO | WO 2011/056855 | A1 | 5/2011 |

OTHER PUBLICATIONS

Website, "LightSail Designs—Frequenty Asked Questions", Oct. 2008.
Danielle Fong, "Tick Tock", Essays by Danielle Fong, Blog Entry, Nov. 2008.
Flyer, "World Standard Gas Compressors", Ariel Corporation, www.airlecorp.com, Aug. 18, 2010.
"PJ Smallest Physical Size", www.BETE.com, Aug. 18, 2010.
Linda Stuntz et al., "Bottling Electricity: Storage as a Strategic Tool for Managing Variability and Capacity Concerns in the Modern Grid: A Report by The Electricity Advisory Committee", EAC, Dec. 2008, Energetics Incorporated.
Linda Stuntz et al., "Smart Grid: Enabler of the New Energy Economy: A Report by The Electricity Advisory Committee", EAC, Dec. 2008, Energetics Incorporated.
Sylvain Lemofouet, "Energy Autonomy and Efficiency through Hydro-Pneumatic Storage", Enairys Power Tech, 2008.
Accelerated Examination Support Document for US 2010/0089063 A1 published on Apr. 15, 2010.
Akimichi Okimoto et al., "Grid Scale Applications of NAS Batteries around the World", 2010 ESA Annual Meeting, May 5, 2010, NGK Insulators, Ltd.
Mauro Pedretti, "Tensairity", European Congress on Computational Methods in Applied Sciences and Engineering (ECCOMAS) 2004, pp. 1-9, Airlight Ltd.
Franklin D. Jones, "Ingenious Mechanisms for Designers and Inventors vol. I", Copyright 1935, The Industrial Press, New York City.
Franklin D. Jones, "Ingenious Mechanisms for Designers and Inventors vol. II", Copyright 1936, The Industrial Press, New York City.
John L. Lumley, "Engines: An Introduction", Sibley School of Mechanical and Aerospace Engineering, Cornell University, Using Version 2 of the Stanford Engine Simulation Program of W.C. Reynolds, 1999, pp. 66-74, Cambridge University Press.
P K Nag, "Engineering Thermodynamics", Second Edition, 1981, pp. 497-530, Tata McGraw-Hill Publishing Company Limited, New Delhi.
Allan J. Organ, "The Regenerator and the Stirling Engine", 1997, pp. 43-45, Mechanical Engineering Publications Limited, London.
Michael W. Coney et al., "Development of a Reciprocating Compressor Using Water Injection to Achieve Quasi-Isothermal Compersion", Presented at the International Compressor Engineering Conference at Purdue, Jul. 16-19, 2002, pp. 1-8.
Maurice Stewart et al., "Gas-Liquid and Liquid-Liquid Separators", 2009, pp. 64-71, Elsevier, Gul Professional Publishing.
Charlels Fayette Taylor, "The Internal-Combustion Engine in Theory and Practice vol. 1: Thermodynamics, Fluid Flow, Performance", Second Edition, 1960, The M.I.T. Press.
Charles Fayette Taylor, "The Internal-Combustion Engine in Theory and Practice vol. II: Combustion, Fuels, Materials, Design", Revised Edition, 1968, The M.I.T. Press.
Jim Eyer et al., "Energy Storage for the Electricity Grid: Benefits and Market Potential Assessment Guide: A Study for the DOE Energy Storage Systems Program", Sandia Report, SAND2010-0815, Unlimited Release, Printed Feb. 2010, Sandia National Laboratories.
Sylvain Lemofouet—GATSI, "Investigation and Optimisation of Hybrid Electricity Storage Systems Based on Compressed Air and Supercapacitors", These N 3628 (2006), Ecole Polytechnique Federale De Lausanne.
Danielle Fong, "How Law Shapes the Business Landscape, and a Patent Puzzle", Essays by Danielle Fong, Blog Entry, Feb. 2010.
Written Opinion of the International Searching Authority for PCT/US2010/040240 filed on Jun. 28, 2010.
International Search Report for PCT/US2010/040240 filed on Jun. 28, 2010.
Notice of Allowance and List of References cited by the Examiner for U.S. Appl. No. 12/868,695 mailed Jun. 8, 2011 from the United States Patent and Trademark Office.
Preliminary Amendment for U.S. Appl. No. 12/938,853 filed Dec. 2, 2010 to the United States Patent and Trademark Office.
Preliminary Amendment for U.S. Appl. No. 13/026,677 filed Mar. 23, 2011 to the United States Patent and Trademark Office.
U.S. Appl. No. 12/701,023, Publication DateFeb. 5, 2010, Lightsail Energy Inc.
U.S. Appl. No. 12/701,039, Publication Date Feb. 5, 2010, Lightsail Energy Inc.
U.S. Appl. No. 12/701,080, Publication Date Feb. 5, 2010, Lightsail Energy Inc.
U.S. Appl. No. 12/107,146, Publication Date Feb. 5, 2010, Lightsail Energy Inc.
U.S. Appl. No. 12/701,032, Publication Date Feb. 5, 2010, Lightsail Energy Inc.
The International Search Report for PCT/US2010/031915 filed on Apr. 21, 2010.
Written Opinion of the International Searching Authority for PCT/US2010/031915 filed on Apr. 21, 2010.
The International Search Report for PCT/US2010/033795 filed on May 5, 2010.
Jason James Hugenroth, "Liquid Flooded Ericsson Cycle Cooler", Thesis Dissertation, Purdue University, May 2006, West Lafayette, Indiana.
Giuseppe Grazzini et al, "Energy Analysis of a Caes With Thermal Energy Storage", Università di Firenze, Italy, 2008.
Andrew Goodwin et al., "Improving PUE with the Use of Battery-Free UPS", Compressed Air, Rotary, Diesel, UPS—Introducing Air-DRUPS™, Jan. 7, 2011.
Johan Beukes et al., "Suitability of compressed air energy storage technology for electricity utility standby power applications", Jan. 3, 2010.
Tim Probert, "Pnu tricks: compressed air energy storage", Power Engineering International, Sep. 1, 2009. Website: http://www.powergenworldwide.com/index/display/articledisplay/369242/articles/power-en.

* cited by examiner

Figure 16A Compression step 1
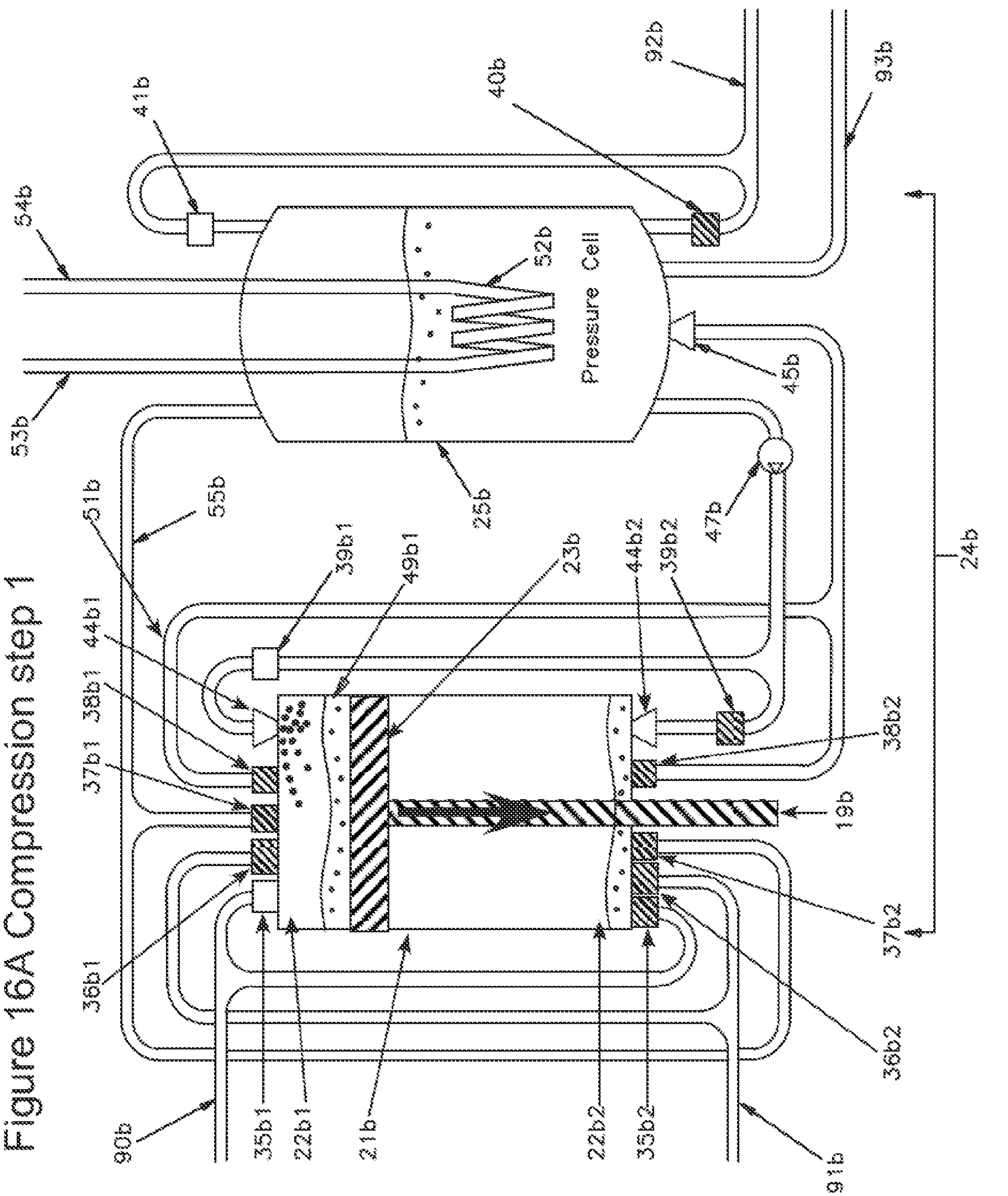

Figure 16B Compression step 2
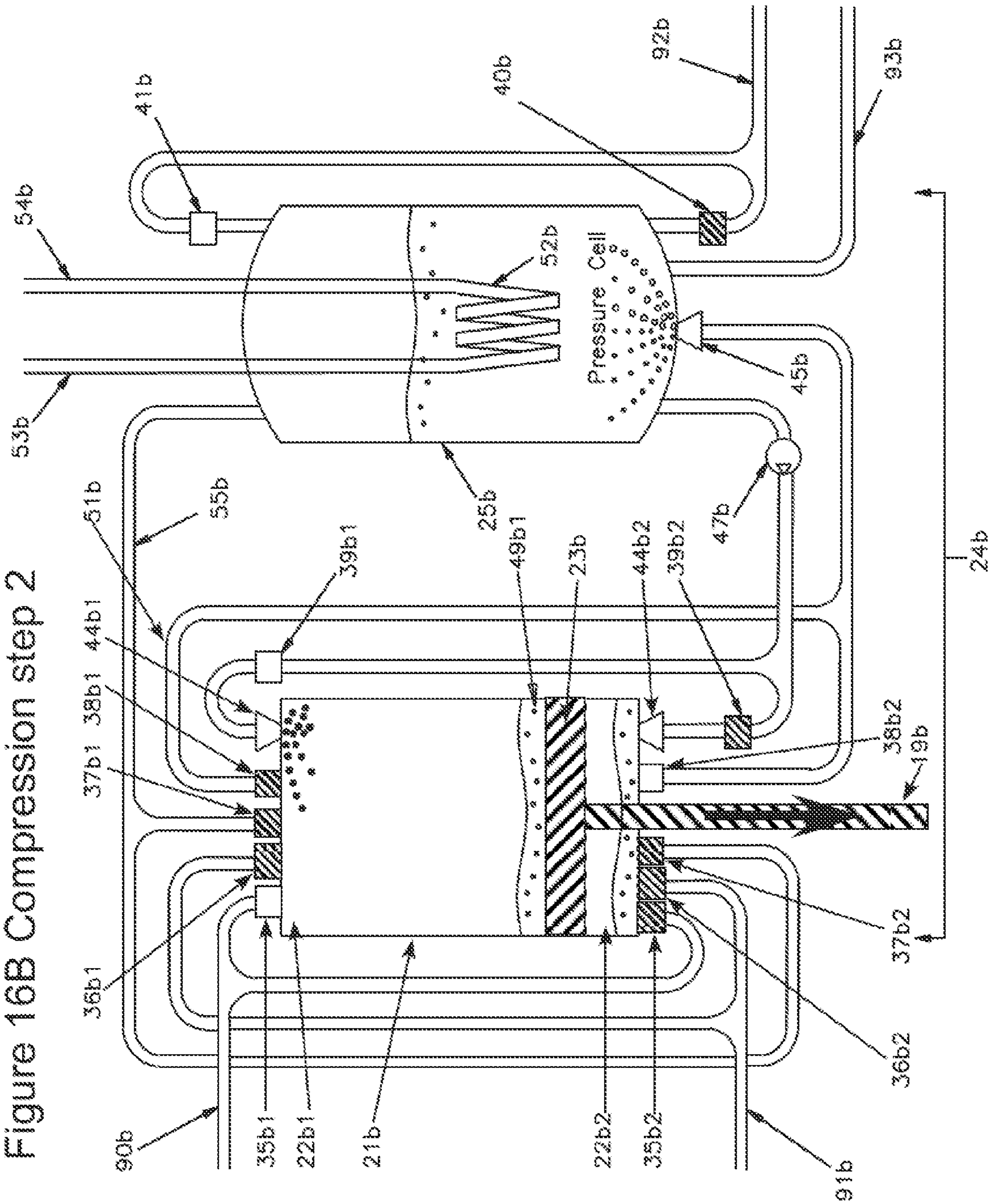

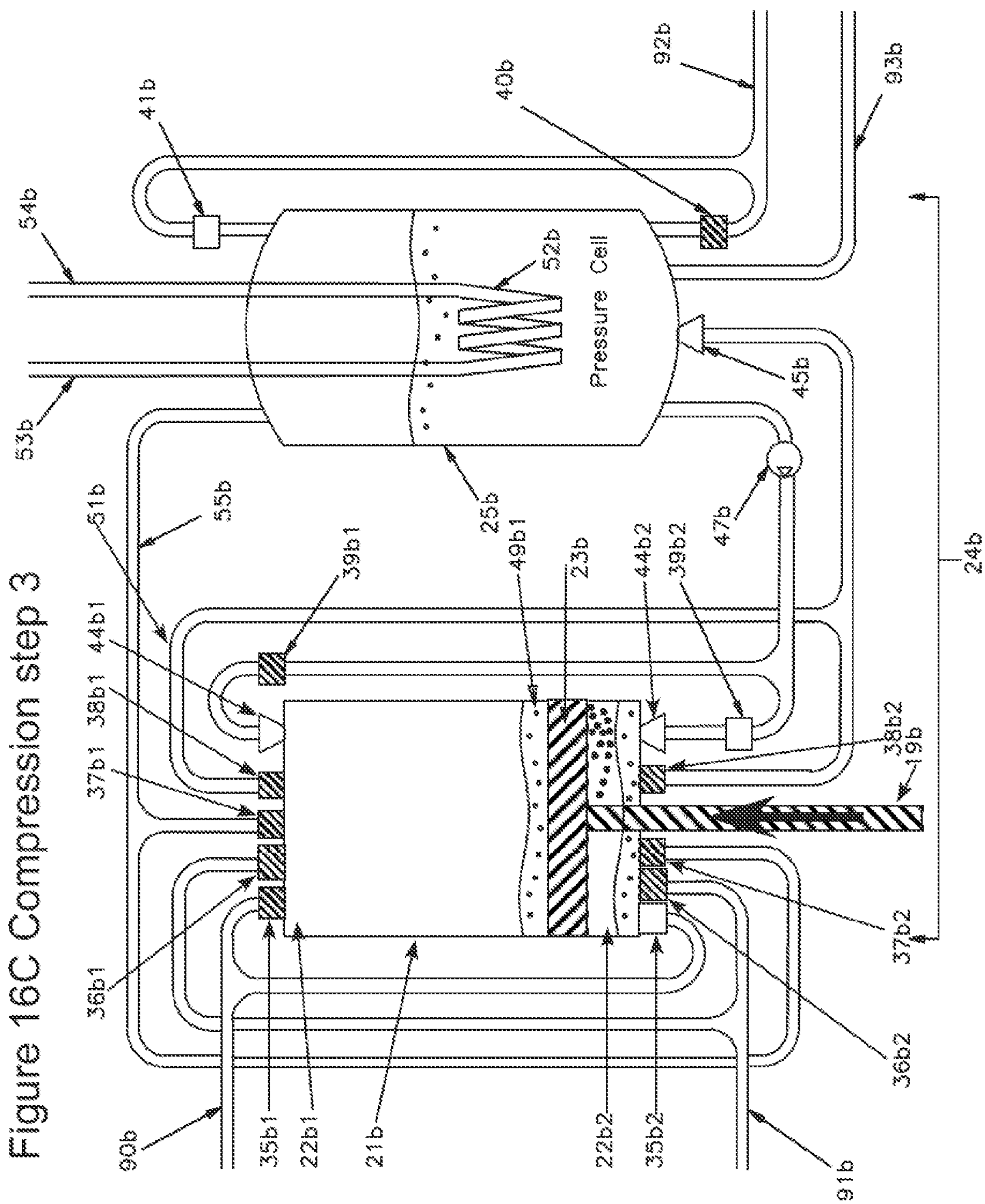
Figure 16C Compression step 3
54b
53b
41b
40b
92b
93b
52b
Pressure Cell
45b
25b
47b
55b
51b
39b1
44b1
38b1
37b1
36b1
35b1
22b1
21b
90b
49b1
23b
44b2
39b2
38b2
19b
37b2
36b2
35b2
22b2
91b
24b

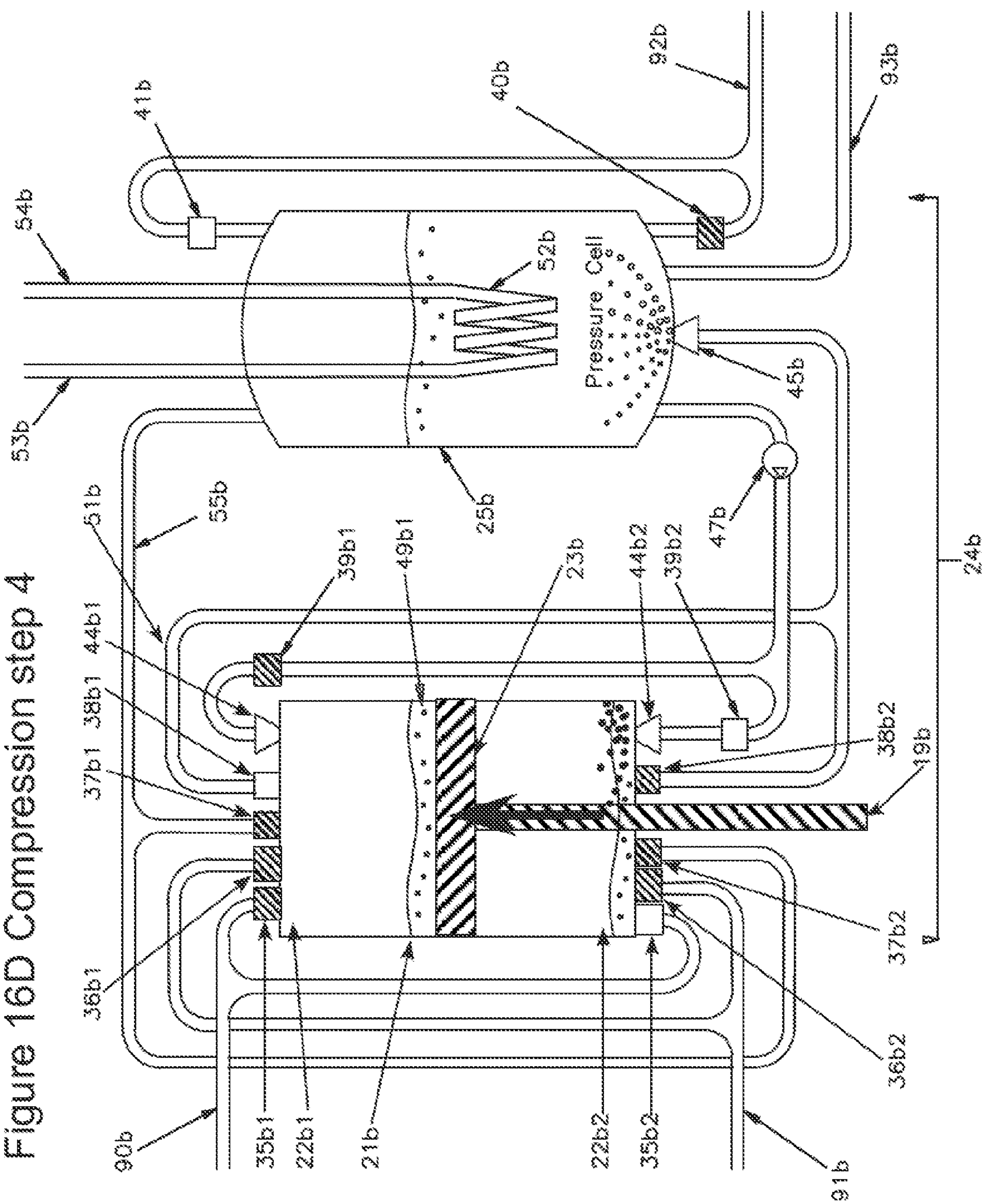
Figure 16D Compression step 4

Figure 17A Expansion step 1
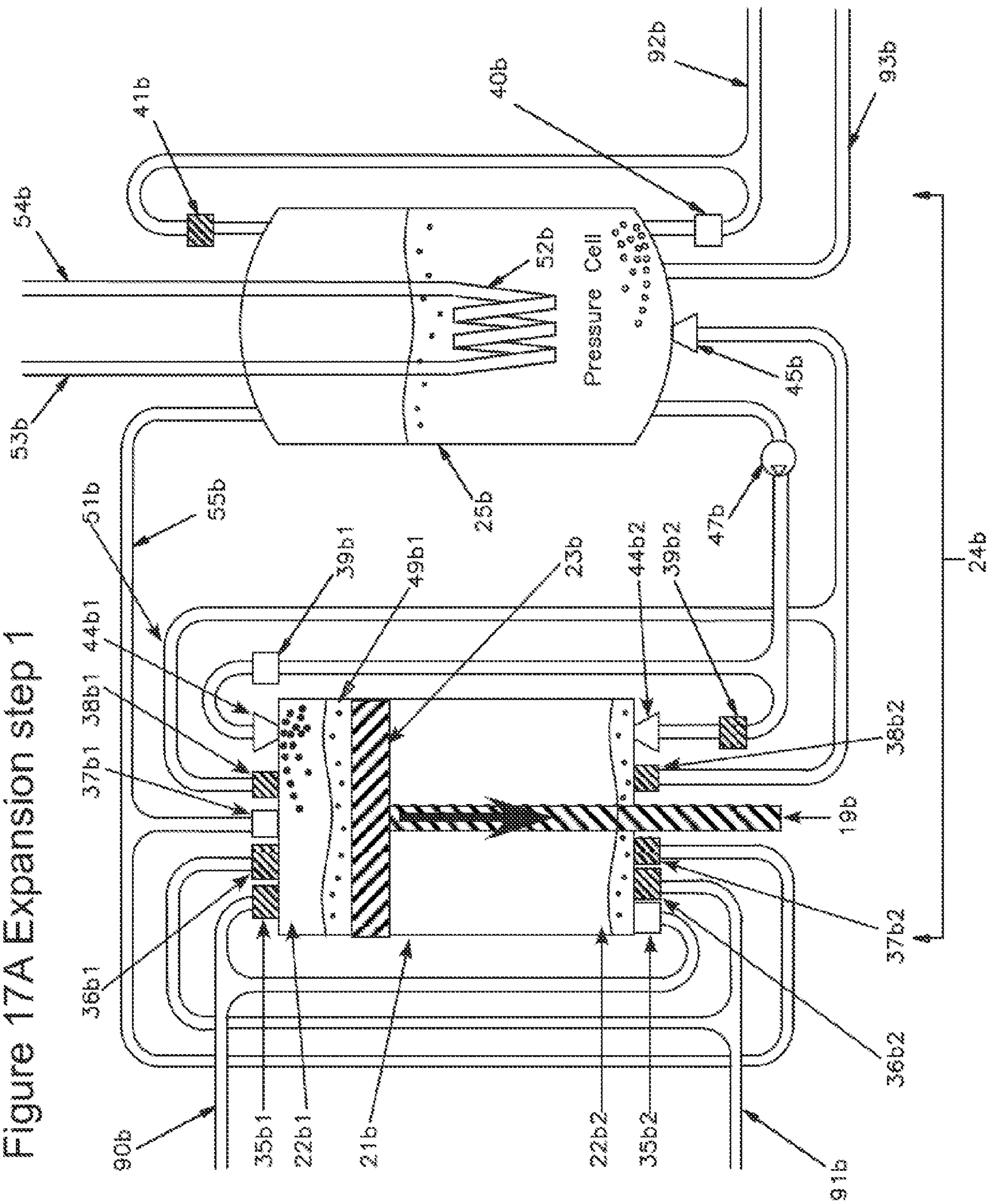

Figure 17B Expansion step 2
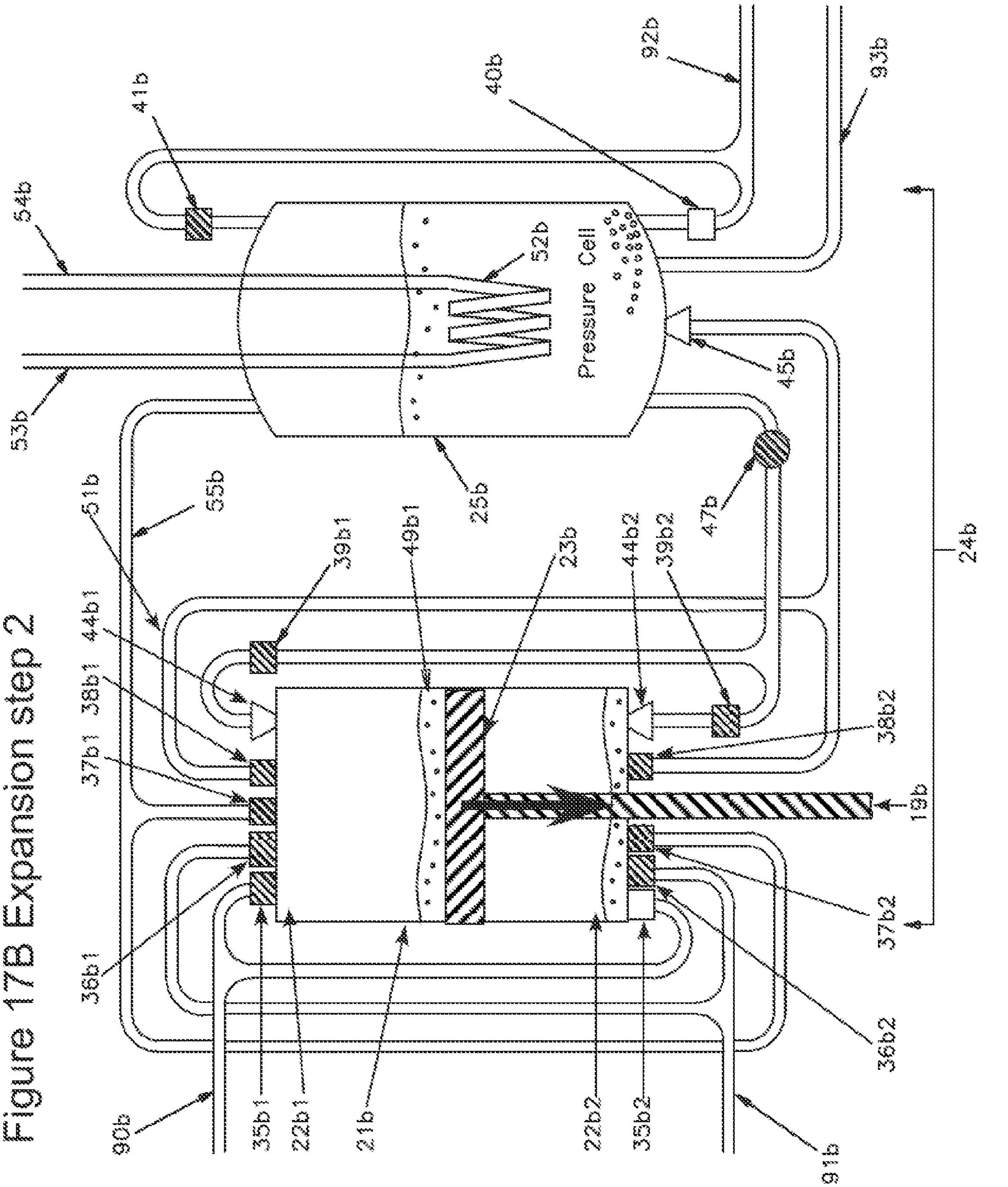

Figure 17C Expansion step 3
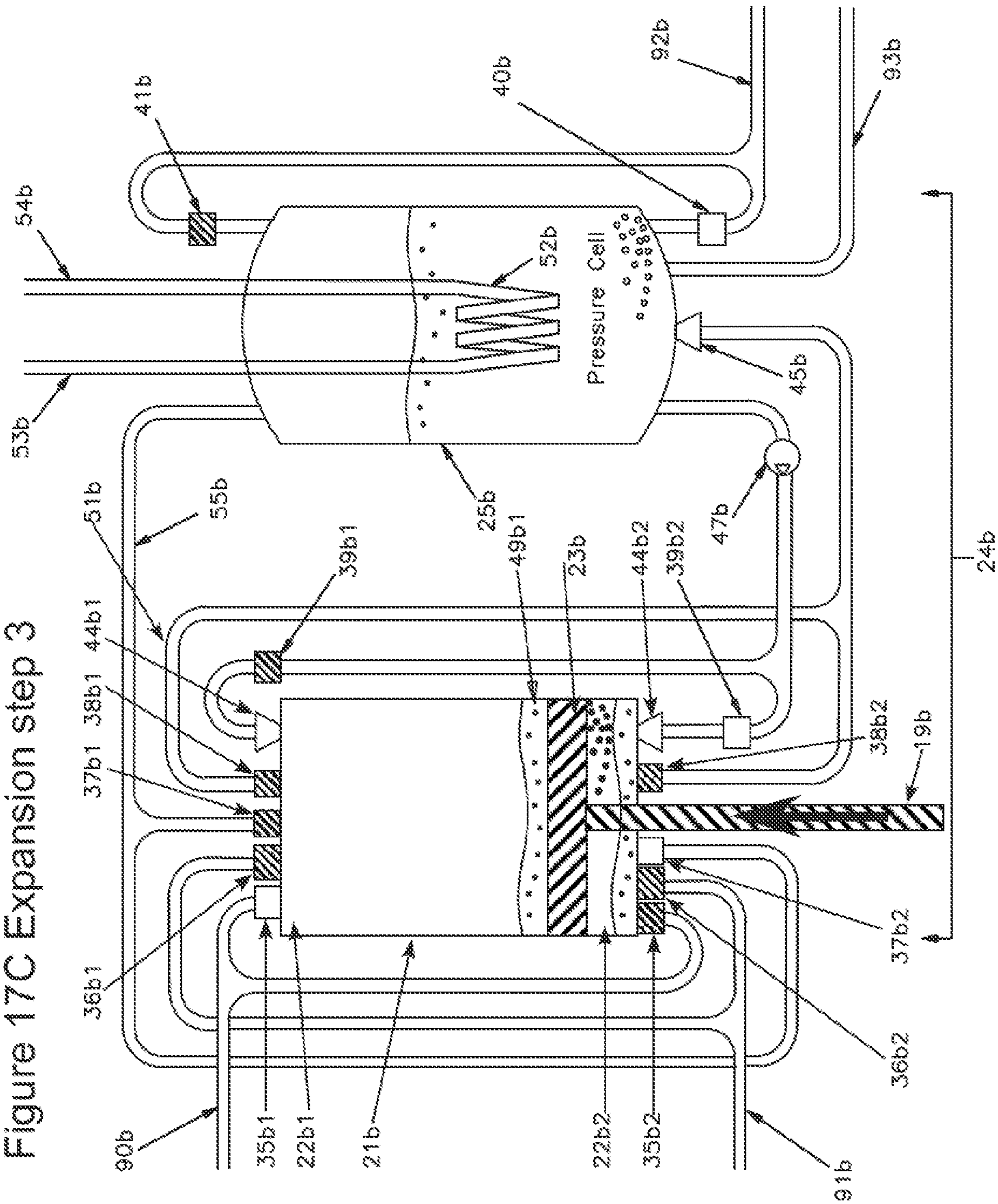

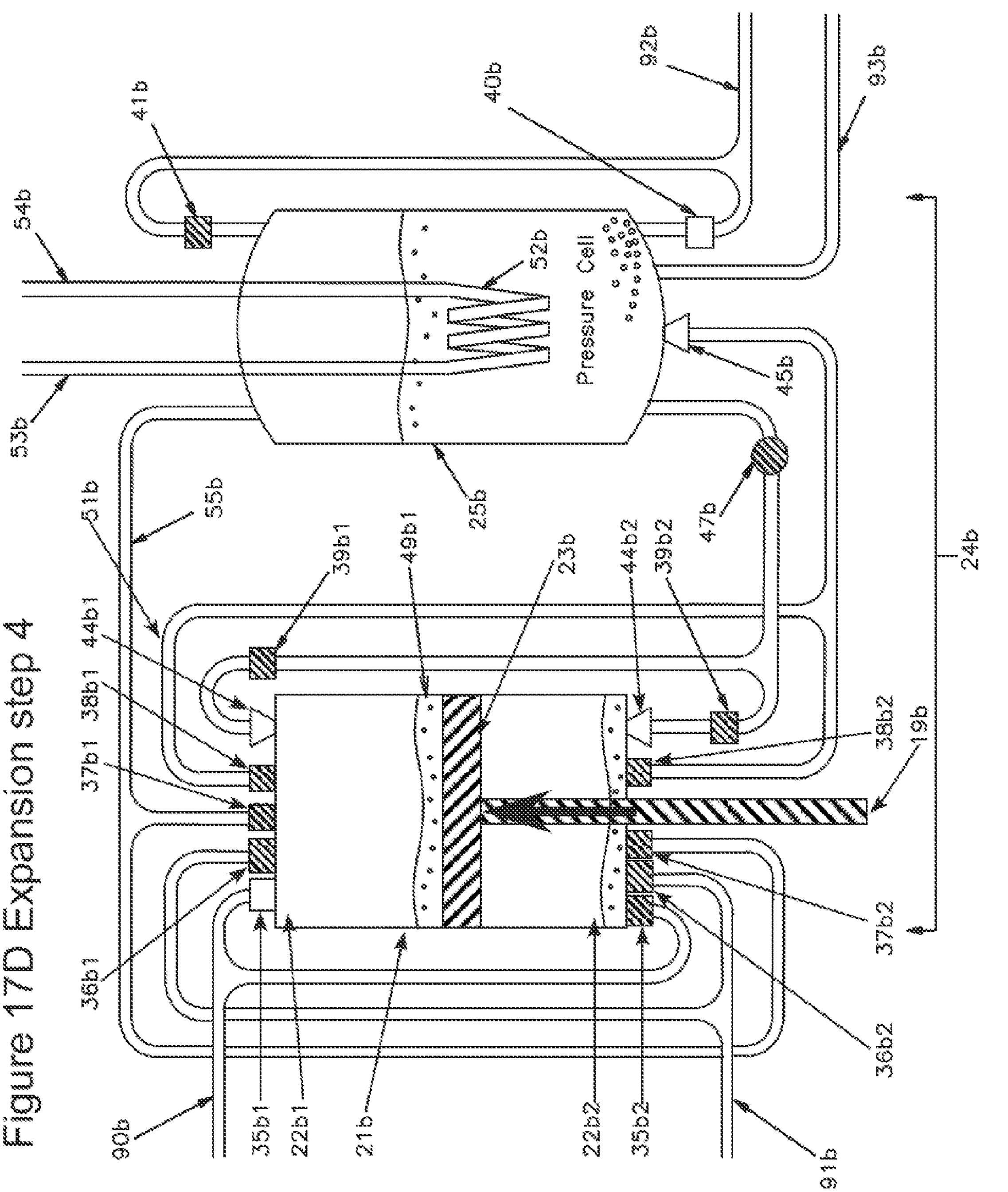
Figure 17D Expansion step 4

Air filter
Liquid Trap Reservoir
Heat Exchanger
Pressure Cell 1
Pressure Cell 2
Air Tank
Expansion Step 2
Hydraulic Motor (57)
10
12
13d
13e
20
24
25d
25e
26d
26e
32
46
49d
49e
52d
52e
53
54
11d
11e
130
131
132
133
134
135
136
137
138
139d
139e
140
141
142

| Temperature Control Role | End Use Examples | Air Conditioned Square Footage | Expected Duration (hrs) | Output (BTU/h) | System Capacity (Tons)[1] | Energy Use (kWh)[2] |
|---|---|---|---|---|---|---|
| Cooling | Small home | 200 - 4,000 | 4 - 8 | 6,000 - 60,000 | 1 - 5 | 1 - 40 |
| | Medium home, small office | 2,000 - 20,000 | 4 - 8 | 60,000 - 300,000 | 5 - 25 | 10 - 220 |
| | Large home, small warehouse | 8,000 - 48,000 | 4 - 8 | 240,000 - 720,000 | 20 - 60 | 60 - 520 |
| | Small office building | 16,000 - 50,000 | 4 - 8 | 720,000 - 1,500,000 | 60 - 125 | 170 - 1,090 |
| | Medium office building | 27,000 - 200,000 | 4 - 8 | 1,200,000 - 6,000,000 | 100 - 500 | 280 - 4,360 |
| | Large office building | 27,000 - 400,000 | 4 - 8 | 1,200,000 - 12,000,000 | 100 - 1,000 | 280 - 8,730 |
| | Medium warehouse | 40,000 - 400,000 | 8 - 12 | 1,200,000 - 6,000,000 | 100 - 500 | 560 - 6,550 |
| | Large warehouse | 100,000 - 800,000 | 8 - 12 | 3,000,000 - 12,000,000 | 250 - 1,000 | 1,410 - 13,090 |
| | Refrigerated Warehouse | 40,000 - 160,000 | 24 - 24 | 1,800,000 - 4,800,000 | 150 - 400 | 2,540 - 10,470 |
| | Supermarket, food service facility | 27,000 - 100,000 | 24 - 24 | 1,200,000 - 3,000,000 | 100 - 250 | 1,690 - 6,550 |
| Heating | Small home | 200 - 3,000 | 4 - 8 | 6,000 - 60,000 | 1 - 5 | 1 - 40 |
| | Medium home, small office | 2,000 - 15,000 | 4 - 8 | 60,000 - 300,000 | 5 - 25 | 10 - 220 |
| | Large home, small warehouse | 8,000 - 36,000 | 4 - 8 | 240,000 - 720,000 | 20 - 60 | 60 - 520 |
| | Small office building | 18,000 - 50,000 | 4 - 8 | 720,000 - 1,500,000 | 60 - 125 | 170 - 1,090 |
| | Medium office building | 30,000 - 200,000 | 4 - 8 | 1,200,000 - 6,000,000 | 100 - 500 | 280 - 4,360 |
| | Large office building | 30,000 - 400,000 | 4 - 8 | 1,200,000 - 12,000,000 | 100 - 1,000 | 280 - 8,730 |
| | Medium warehouse | 40,000 - 300,000 | 8 - 12 | 1,200,000 - 6,000,000 | 100 - 500 | 560 - 6,550 |
| | Large warehouse | 100,000 - 600,000 | 8 - 12 | 3,000,000 - 12,000,000 | 250 - 1,000 | 1,410 - 13,090 |
| | Automotive assembly plant, storage facility | 8,000 - 200,000 | 24 - 24 | 300,000 - 6,000,000 | 25 - 500 | 420 - 13,090 |

Notes:
1) 1 Ton = cooling power of one short ton (2000 pounds or 907 kilograms) of ice melting in a 24-hour period. Equals 12,000 BTU per hour, or 3517 watts.
2) Assume SEER (Seasonal Energy Efficiency Rating) range of 11 to 17.

FIG. 60

| | Discharge Duration* | | |
|---|---|---|---|
| **Power Supply Role** | **Low** | **High** | **Notes** |
| Electric Energy Time-shift | 2 | 8 | Depends on energy price differential, storage efficiency, and storage variable operating cost. |
| Electric Supply Capacity | 4 | 6 | Peak demand hours. |
| Load Following | 2 | 4 | Assume: 1 hour of discharge duration provides approximately 2 hours of load following. |
| Area Regulation | 15 min. | 30 min. | Based on demonstration of Beacon Flywheel. |
| Electric Supply Reserve Capacity | 1 | 2 | Allow time for generation-based reserves to come on-line. |
| Voltage Support | 15 min. | 1 | Time needed for a) system stabilization or b) orderly load shedding. |
| Transmission Support | 2 sec. | 5 sec. | Per EPRI-DOE Handbook of Energy Storage for Transmission and Distribution Applications. |
| Transmission Congestion Relief | 3 | 6 | Peak demand hours. Low value is for "peaky" loads, high value is for "flatter" load profiles. |
| T&D Upgrade Deferral - 50th Percentile | 3 | 6 | Same as above. |
| T&D Upgrade Deferral - 90th Percentile | 3 | 6 | Same as above. |
| Substation On-site Power | 8 | 16 | Per EPRI/DOE Substation Battery Survey. |
| Time-of-use Energy Cost Management | 4 | 6 | Peak demand hours. |
| Demand Change Management | 5 | 11 | Maximum daily demand charge hours, per utility tariff. |
| Electric Service Reliability | 5 min. | 1 | Time needed for a) shorter duration outages or b) orderly load shutdown. |
| Electric Service Power Quality | 10 sec. | 1 min. | Time needed for events ridethrough depends on the type of PQ challenges addressed. |
| Renewables Energy Timeshift | 3 | 5 | Depends on energy cost/price differential and storage efficiency and variable operating cost. |
| Renewables Capacity Firming | 2 | 4 | Low & high values for Renewable Gen./Peak Load correlation (>6 hours) of 85% & 50%. |
| Wind Generation Grid Integration, Short Duration | 10 sec. | 15 min. | For a) Power Quality (depends on type of challenge addressed) and b) Wind Intermittency. |
| Wind Generation Grid Integration, Long Duration | 1 | 6 | Backup, Time Shift, Congestion Relief. |

Notes:
**Hours unless indicated otherwise. min. = minutes. sec. = seconds.*
Source: United States. Dept. of Energy. Sandia National Laboratories. Energy Storage for the Electricity Grid: Benefits and Market Potential Assessment Guide. By Jim Eyer and Garth Corey. Springfield, VA: National Technical Information Service, 2010

FIG. 62

| | Capacity (Power: kW, | | |
|---|---|---|---|
| | Low | High | Notes |
| | 1MW | 500MW | Low per ISO transaction min. (Can aggregate smaller capacity). High = combined cycle gen. |
| | 1MW | 500MW | Same as above. |
| | 1MW | 500MW | Same as above. |
| | 1MW | 40MW | Low per ISO transaction min. Max is 50% of estimate CA technical potential of 80MW. |
| | 1MW | 500MW | Low per ISO transaction min. (Can aggregate smaller capacity). High = combined cycle gen. |
| | 1MW | 10MW | Assume distributed deployment, to serve Voltage support needs locally. |
| | 10MW | 100MW | Low value is for subtransmission. |
| | 1MW | 100MW | Low per ISO transaction min. (Can aggregate smaller capacity). High = 20% of high capacity |
| | 250kW | 5MW | Low = smallest likely; High = high end for distribution and subtransmission. |
| | 250kW | 2MW | Same as above. |
| | 1.5kW | 5kW | Per EPRI/DOE Substation Battery Survey. |
| | 1kW | 5MW | Residential to medium sized commercial/industrial users. |
| | 50kW | 10MW | Small commercial to large commercial/industrial users. |
| | 0.2kW | 10MW | Low = under desk UPS. High = facility wide for commercial industrial users. |
| | 0.2kW | 10MW | Same as above. |
| | 1kW | 500MW | Low = small residential PV. High = "bulk" renewable energy fueled generation. |
| | 1kW | 500MW | Same as above. |
| | 0.2kW | 500MW | Low = small residential turbine. High = large wind farm boundary. |
| | 0.2kW | 500MW | Same as above. |

FIG. 62 (Cont.)

DG = distributed generation; NM = net metering

| MODE | DESCRIPTION |
|---|---|
| Compression | • Electricity from meter powers motor to drive compressor to compress gas that is flowed to storage unit.<br>• Thermal energy from separated liquid is communicated from compressor to end user where heating is desired. Otherwise, thermal energy from the heated separated liquid is routed out of the system. |
| Expansion | • Expansion of compressed gas in expander cools liquid that is separated and flowed to end user where cooling is desired. If cooling is not desired, thermal energy from the cooled separated liquid is routed out of the system.<br>• Expansion of compressed gas in expander also drives the generator through the shaft to flow electricity to the end user, to the meter (DG/NM), or to both. |
| Compression and Expansion | • Electricity from meter powers motor to drive compressor to compress gas, and flow the compressed gas to storage unit. Thermal energy from separated liquid is communicated from compressor to end user where heating is desired. Otherwise, the heated separated liquid is routed out of the system.<br>• Compressed gas from the storage unit is expanded in expander, which cools liquid that is separated and flowed to end user where cooling is desired. If cooling is not desired, the cooled separated liquid is routed out of the system.<br>• Expansion of compressed gas in expander drives the generator through the shaft to flow electricity to the end user, to the meter (DG/NM), or to both. |

FIG. 71

PV = photovoltaic; TS = thermal solar; WT = wind turbine; MT = microturbine;
DG = distributed generation; NM = net metering

| MODE | DESCRIPTION |
|---|---|
| Compression | • Electricity from meter powers motor to drive compressor to compress gas that is flowed to the storage unit.<br>• Electricity from local source (PV) powers motor to drive compressor, alone or in conjunction with electricity from meter.<br>• Physical energy from local source (WT/MT) drives compressor through gearing.<br>• Gearing allows physical energy from local source (WT/MT) to be combined with physical energy from motor to drive compressor.<br>• Thermal energy from separated liquid is communicated from compressor to end user where heating is desired. Otherwise, thermal energy from the heated separated liquid is routed out of the system. |
| Expansion | • Expansion of compressed gas in expander cools liquid that is separated and flowed to end user where cooling is desired. If cooling is not desired, thermal energy from the cooled separated liquid is routed out of the system.<br>• Expansion of compressed gas in expander also drives the generator through the gearing to flow electricity to the end user, to the meter (DG/NM), or to both.<br>• Thermal energy from the local source (TS/MT/or facility) is communicated to enhance efficiency of, and/or augment the power output from, recovery of energy from expansion of compressed gas in the expander. |
| Compression and Expansion | • Electricity from meter powers motor to drive compressor to compress gas that is flowed to the storage unit.<br>• Electricity from local source (PV) may also power motor to drive compressor.<br>• Physical energy from local source (WT/MT) drives compressor through gearing.<br>• Gearing may allow physical energy from local source (WT/MT) to be combined with energy from motor to drive compressor.<br>• Thermal energy from separated liquid is communicated from compressor to end user where heating is desired. Otherwise, the heated separated liquid is routed out of the system.<br>• Compressed gas from the storage unit is expanded in expander, which cools liquid that is separated and flowed to end user where cooling is desired. If cooling is not desired, the cooled separated liquid is routed out of the system.<br>• Expansion of compressed gas in expander drives the generator through the gearing to flow electricity to the end user, to the meter (DG/NM), or to both.<br>• Thermal energy from the local source (TS/MT/or facility) is communicated to enhance efficiency of, and/or augment the power output from, recovery of energy from expansion of compressed gas in the expander. |

FIG. 72

COMPRESSED AIR ENERGY STORAGE SYSTEM UTILIZING TWO-PHASE FLOW TO FACILITATE HEAT EXCHANGE

CROSS-REFERENCE TO RELATED APPLICATIONS

The instant patent application is a continuation of U.S. nonprovisional patent application Ser. No. 12/823,944 filed Jun. 25, 2010, which is a continuation-in-part of U.S. nonprovisional patent application Ser. No. 12/695,922 filed Jan. 28, 2010, which claims priority to U.S. Provisional Patent Application No. 61/221,487, filed Jun. 29, 2009. The U.S. nonprovisional patent application Ser. No. 12/823,944 is also a continuation-in-part of U.S. nonprovisional patent application Ser. No. 12/730,549 filed Mar. 24, 2010. The U.S. nonprovisional patent application Ser. No. 12/823,944 also claims priority to the following provisional patent applications: U.S. provisional patent application No. 61/294,396 filed Jan. 12, 2010; U.S. provisional patent application No. 61/306,122 filed Feb. 19, 2010; U.S. provisional patent application No. 61/320,150 filed Apr. 1, 2010; U.S. provisional patent application No. 61/347,312 filed May 21, 2010; U.S. provisional patent application No. 61/347,056, filed May 21, 2010; U.S. provisional patent application No. 61/358,776 filed Jun. 25, 2010; and U.S. provisional patent application No. 61/348,661 filed May 26, 2010. Each of the above applications is incorporated by reference in its entirety herein for all purposes

BACKGROUND

Air compressed to 300 bar has energy density comparable to that of lead-acid batteries and other energy storage technologies. However, the process of compressing and decompressing the air typically is inefficient due to thermal and mechanical losses. Such inefficiency limits the economic viability of compressed air for energy storage applications, despite its obvious advantages.

It is well known that a compressor will be more efficient if the compression process occurs isothermally, which requires cooling of the air before or during compression. Patents for isothermal gas compressors have been issued on a regular basis since 1930 (e.g., U.S. Pat. No. 1,751,537 and No. 1,929,350). One approach to compressing air efficiently is to effect the compression in several stages, each stage comprising a reciprocating piston in a cylinder device with an intercooler between stages (e.g., U.S. Pat. No. 5,195,874). Cooling of the air can also be achieved by injecting a liquid, such as mineral oil, refrigerant, or water into the compression chamber or into the airstream between stages (e.g., U.S. Pat. No. 5,076,067).

Several patents exist for energy storage systems that mix compressed air with natural gas and feed the mixture to a combustion turbine, thereby increasing the power output of the turbine (e.g., U.S. Pat. No. 5,634,340). The air is compressed by an electrically-driven air compressor that operates at periods of low electricity demand. The compressed-air enhanced combustion turbine runs a generator at times of peak demand. Two such systems have been built, and others proposed, that use underground caverns to store the compressed air.

Patents have been issued for improved versions of this energy storage scheme that apply a saturator upstream of the combustion turbine to warm and humidify the incoming air, thereby improving the efficiency of the system (e.g., U.S. Pat. No. 5,491,969). Other patents have been issued that mention the possibility of using low-grade heat (such as waste heat from some other process) to warm the air prior to expansion, also improving efficiency (e.g., U.S. Pat. No. 5,537,822).

BRIEF SUMMARY OF THE INVENTION

Embodiments of the present invention relate generally to energy storage systems, and more particularly, relates to energy storage systems that utilize compressed air as the energy storage medium, comprising an air compression/expansion mechanism, a heat exchanger, and one or more air storage tanks.

According to embodiments of the present invention, a compressed-air energy storage system is provided comprising a reversible mechanism to compress and expand air, one or more compressed air storage tanks, a control system, one or more heat exchangers, and, in certain embodiments of the invention, a motor-generator, for example motor-generator 97 in FIG. 1.

The reversible air compressor-expander uses mechanical power to compress air (when it is acting as a compressor) and converts the energy stored in compressed air to mechanical power (when it is acting as an expander). The compressor-expander comprises one or more stages, each stage consisting of pressure vessel (the "pressure cell") partially filled with water or other liquid. In some embodiments, the pressure vessel communicates with one or more cylinder devices to exchange air and liquid with the cylinder chamber(s) thereof. Suitable valving allows air to enter and leave the pressure cell and cylinder device, if present, under electronic control.

The cylinder device referred to above may be constructed in one of several ways. In one specific embodiment, it can have a piston connected to a piston rod, so that mechanical power coming in or out of the cylinder device is transmitted by this piston rod. In another configuration, the cylinder device can contain hydraulic liquid, in which case the liquid is driven by the pressure of the expanding air, transmitting power out of the cylinder device in that way. In such a configuration, the hydraulic liquid can interact with the air directly, or a diaphragm across the diameter of the cylinder device can separate the air from the liquid.

In low-pressure stages, liquid is pumped through an atomizing nozzle into the pressure cell or, in certain embodiments, the cylinder device during the expansion or compression stroke to facilitate heat exchange. The amount of liquid entering the chamber is sufficient to absorb (during compression) or release (during expansion) all the heat associated with the compression or expansion process, allowing those processes to proceed near-isothermally. This liquid is then returned to the pressure cell during the non-power phase of the stroke, where it can exchange heat with the external environment via a conventional heat exchanger. This allows the compression or expansion to occur at high efficiency.

Operation of embodiments according the present invention may be characterized by a magnitude of temperature change of the gas being compressed or expanded. According to one embodiment, during a compression cycle the gas may experience an increase in temperate of 100 degrees Celsius or less, or a temperature increase of 60 degrees Celsius or less. In some embodiments, during an expansion cycle, the gas may experience a decrease in temperature of 100 degrees Celsius or less, 15 degrees Celsius or less, or 11 degrees Celsius or less—nearing the freezing point of water from an initial point of room temperature.

Instead of injecting liquid via a nozzle, as described above, air may be bubbled though a quantity of liquid in one or more of the cylinder devices in order to facilitate heat exchange. This approach is preferred at high pressures.

During expansion, the valve timing is controlled electronically so that only so much air as is required to expand by the desired expansion ratio is admitted to the cylinder device. This volume changes as the storage tank depletes, so that the valve timing must be adjusted dynamically.

The volume of the cylinder chambers (if present) and pressure cells increases from the high to low pressure stages. In other specific embodiments of the invention, rather than having cylinder chambers of different volumes, a plurality of cylinder devices is provided with chambers of the same volume are used, their total volume equating to the required larger volume.

During compression, a motor or other source of shaft torque drives the pistons or creates the hydraulic pressure via a pump which compresses the air in the cylinder device. During expansion, the reverse is true. Expanding air drives the piston or hydraulic liquid, sending mechanical power out of the system. This mechanical power can be converted to or from electrical power using a conventional motor-generator.

BRIEF DESCRIPTION OF THE DRAWINGS

FIGS. 16A-D show the configuration of an apparatus during steps of a compression cycle according to an embodiment of the present invention.

FIGS. 17A-D show the configuration of an apparatus during steps of an expansion cycle according to an embodiment of the present invention.

FIG. 33AA shows a simplified cross-sectional view of the planetary gear system of FIG. 33A taken along line 33A-33A'.

FIGS. 42BA-42BC show simplified views of embodiments of the various modular elements of the system of FIG. 42B.

FIGS. 53BA-53BC show simplified views of embodiments of the various modular elements of the system of FIG. 53B.

FIG. 60 is a table listing heating and cooling functions for an energy storage system according to an embodiment of the present invention.

FIG. 62 is a table listing possible functions for an energy storage system according to the present invention incorporated within a power supply network.

FIG. 71 is a table summarizing various operational modes of a compressed gas energy storage and recovery system that is co-situated behind a meter with an end user.

FIG. 72 is a table summarizing various operational modes of a compressed gas energy storage and recovery system that is co-situated behind a meter with an end user and with a local power source.

FIG. 84 shows a simplified cross-sectional view of an embodiment of an apparatus which utilizes a piston as a gas flow valve.

FIG. 85 shows an embodiment of an apparatus utilizing the flow of liquid into a chamber.

Figure 86:
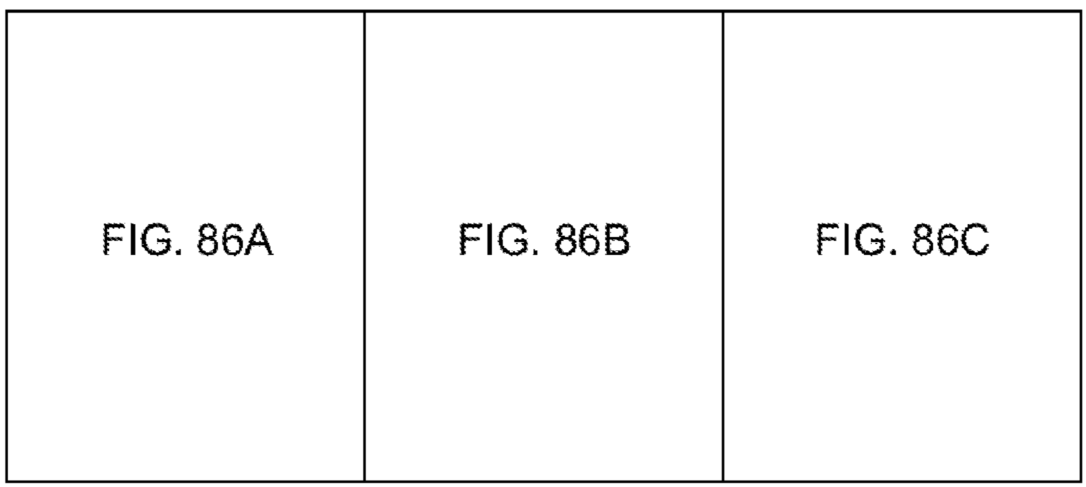
Figure 86A:
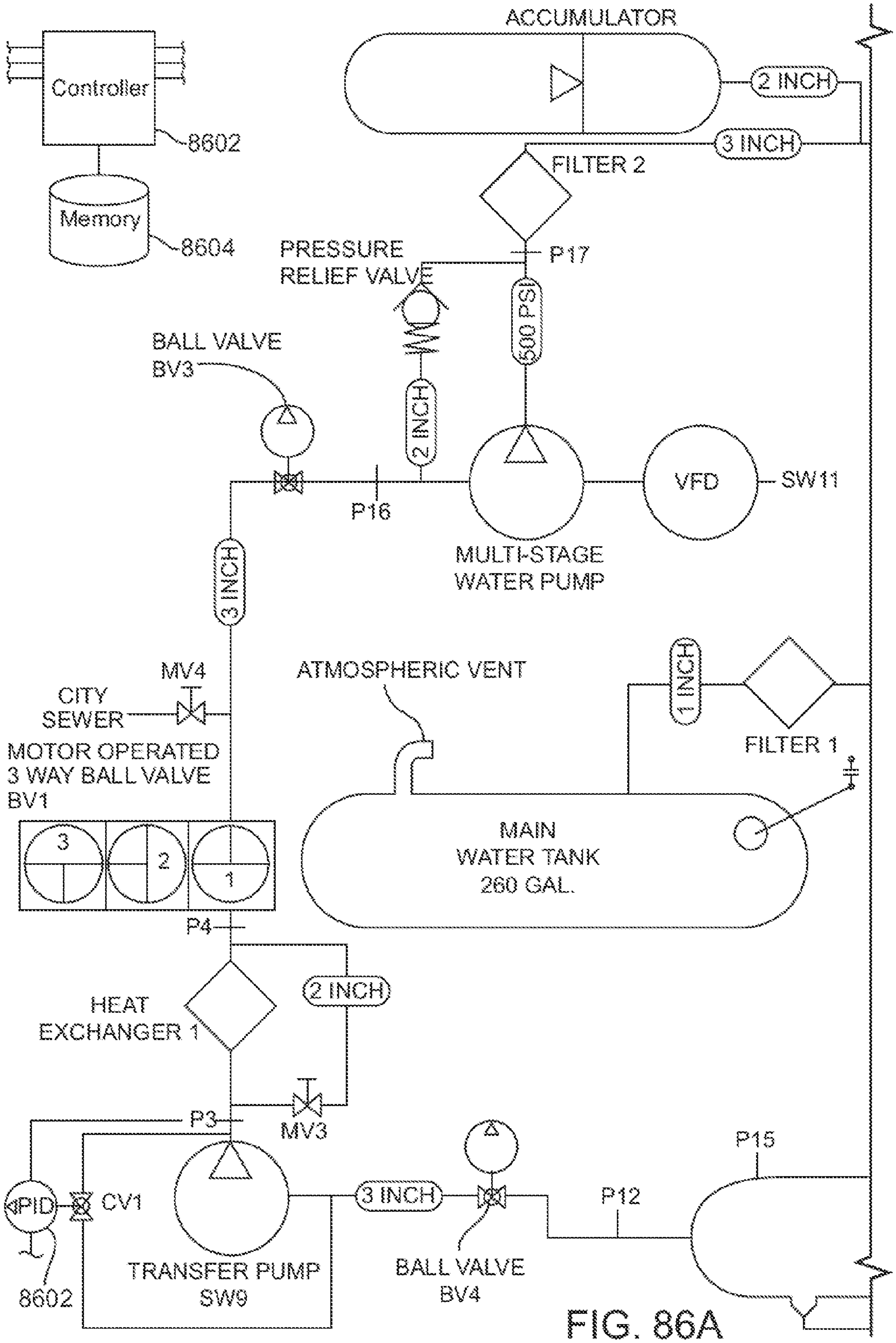
Figure 86B:
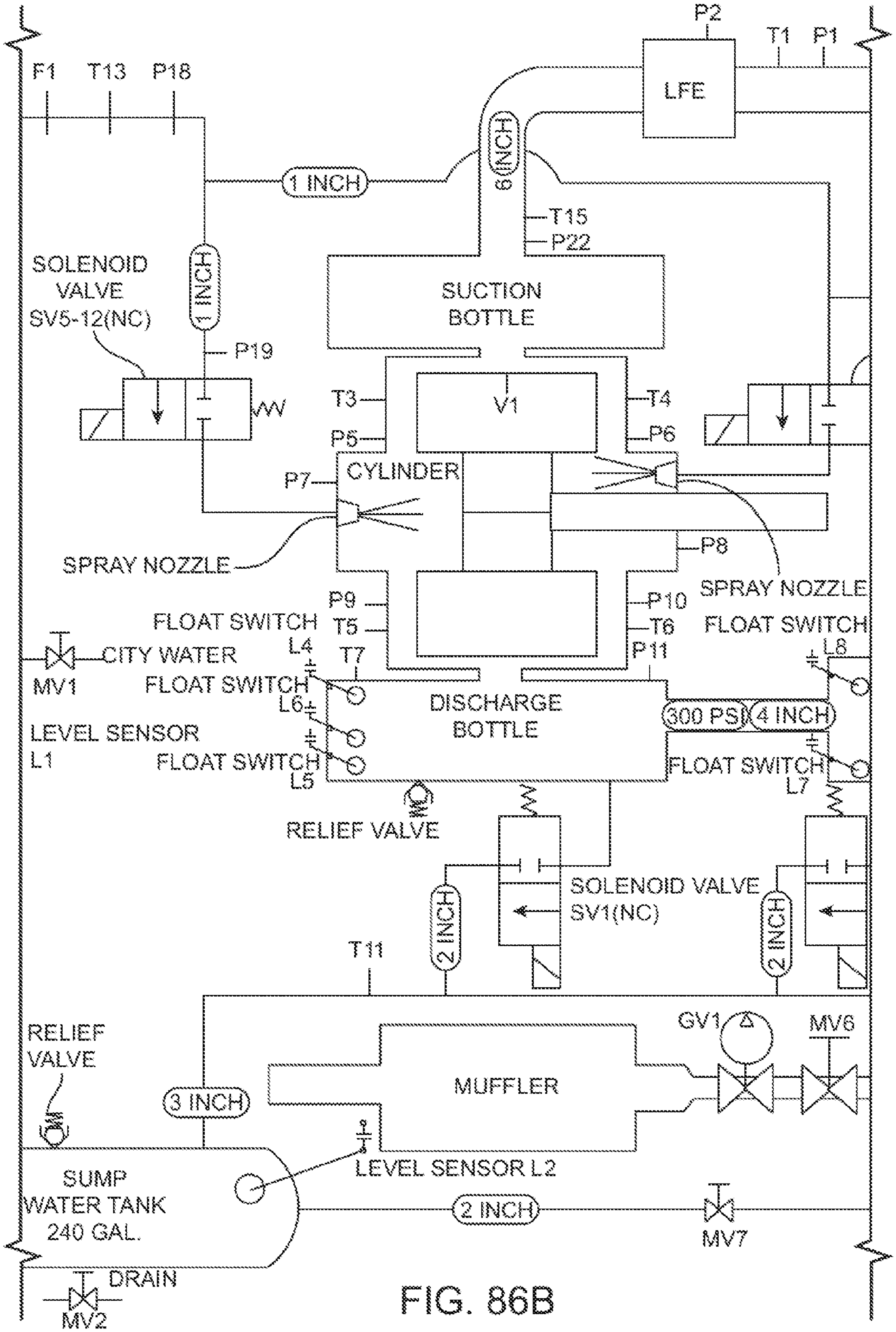
Figure 86C:
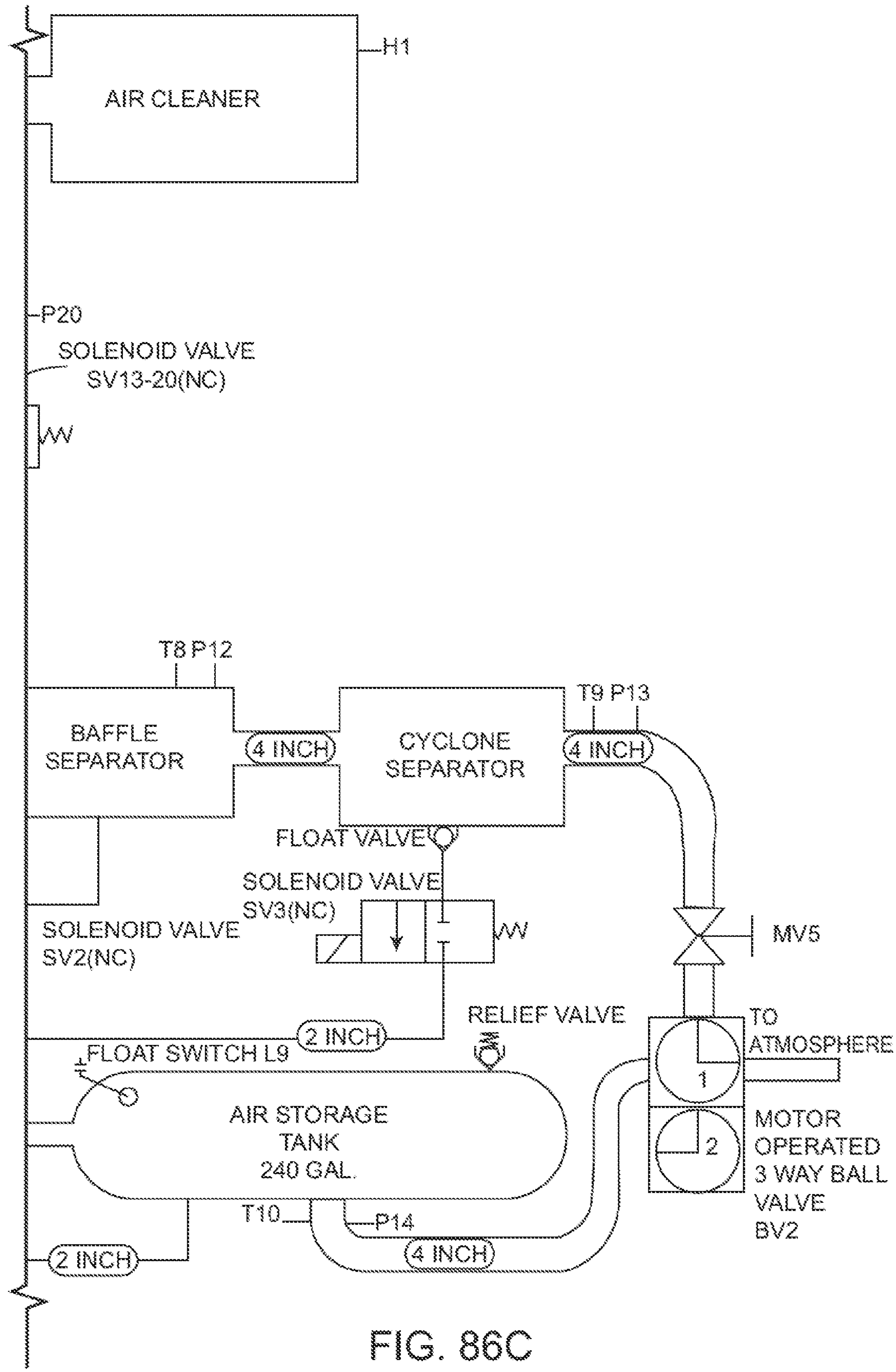

FIGS. 86A-C show views of a compression apparatus in accordance with an embodiment of the present invention.

Figure 87:
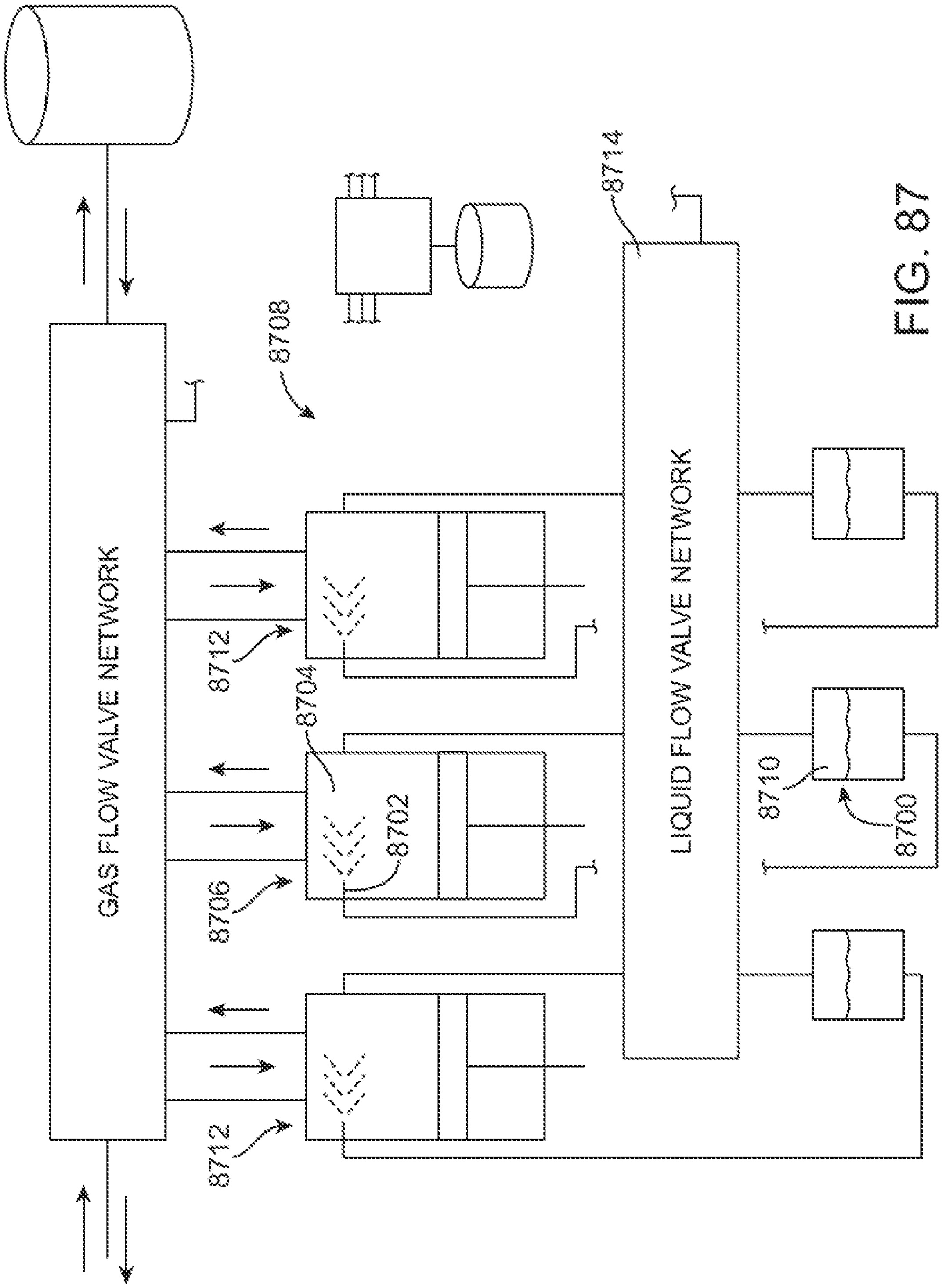

FIG. 87 show a simplified view of an embodiment of an apparatus in accordance with the present invention including a liquid flow valve network.

Figure 88:
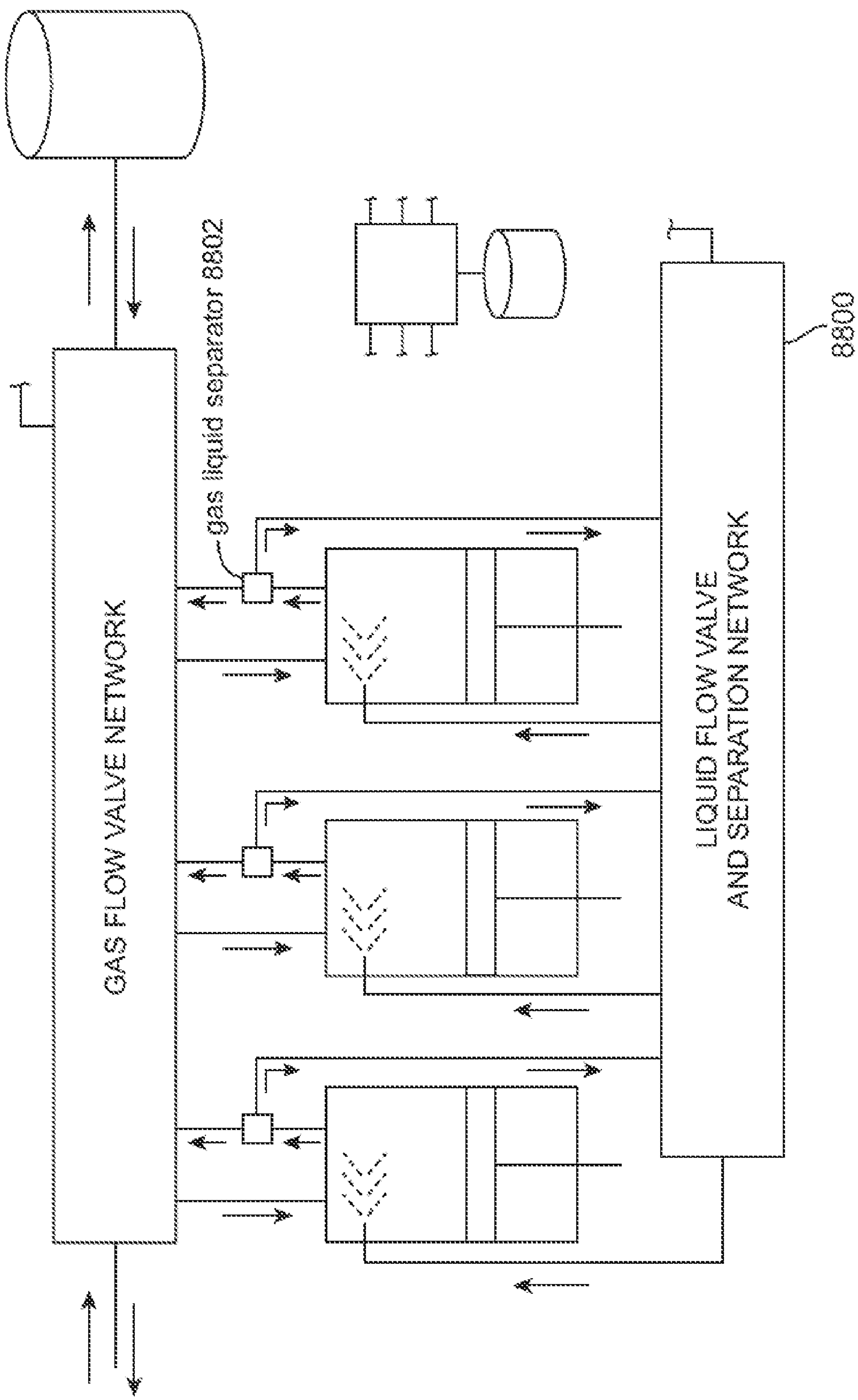

FIG. 88 show a simplified view of an embodiment of an apparatus in accordance with the present invention.

Figure 89:
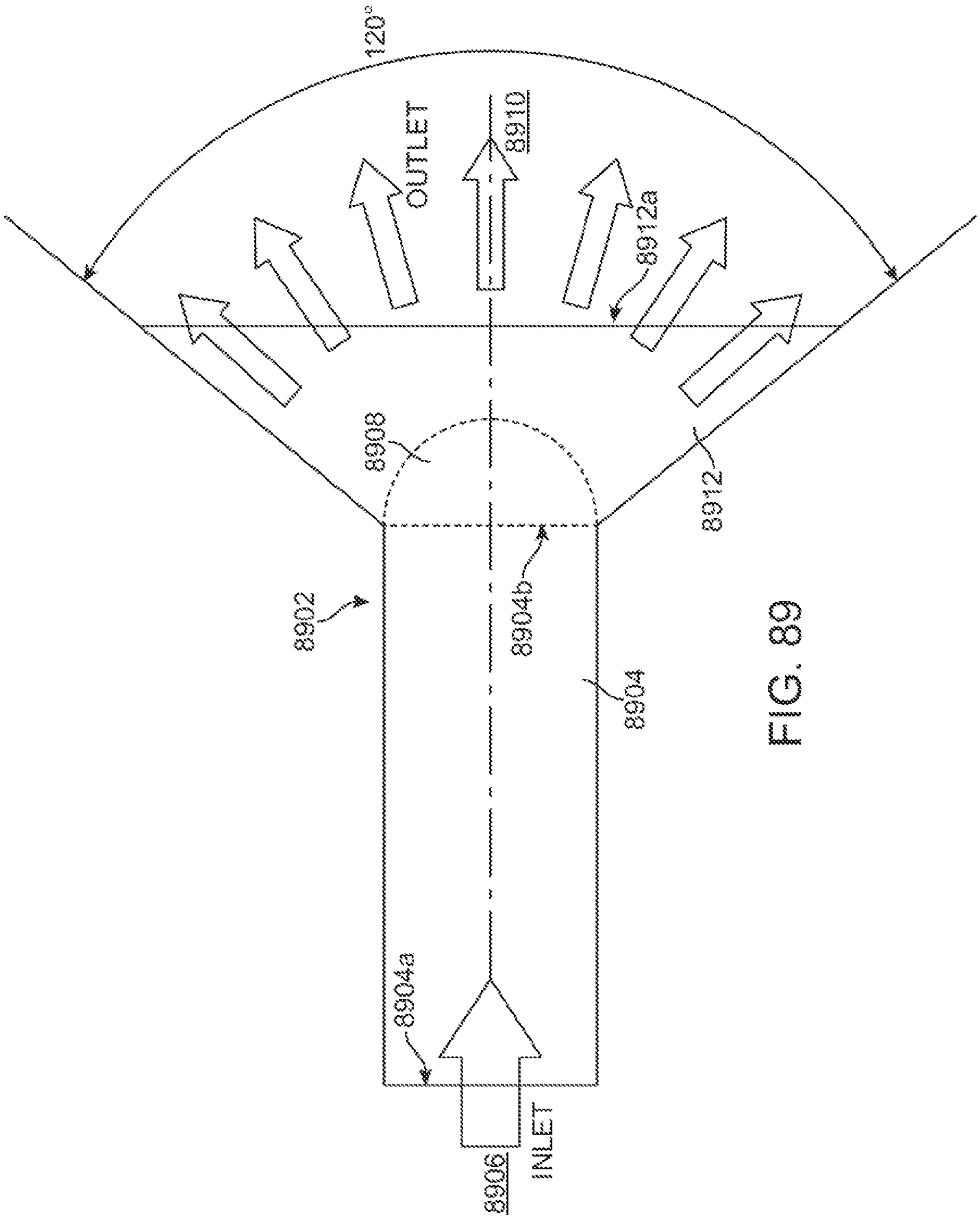

FIG. 89 shows a simplified cross-sectional view of the space defining a liquid injection sprayer according to an embodiment of the present invention.

Figure 90C:
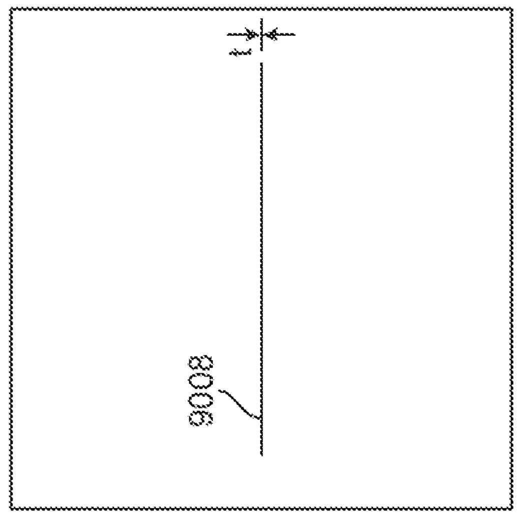
Figure 90B:
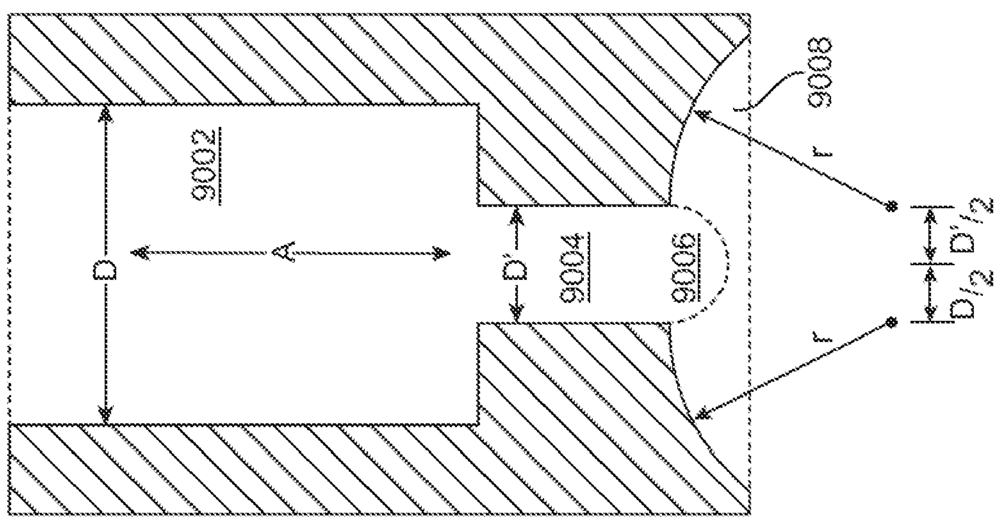
Figure 90A:
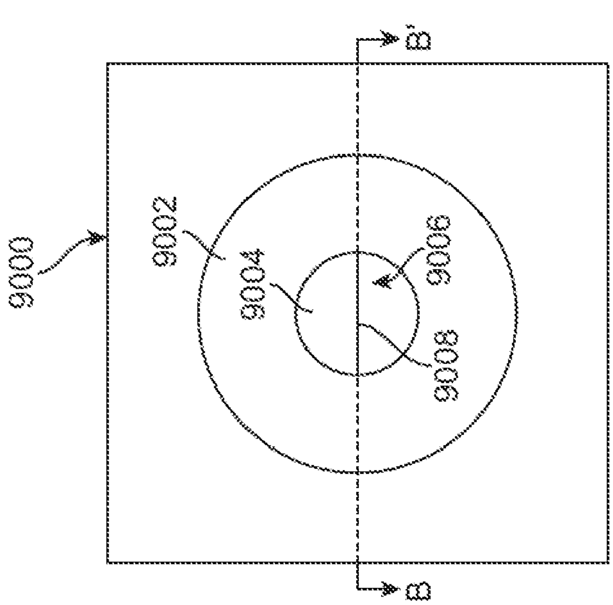

FIGS. 90A-90C show simplified views of an embodiment of a spray nozzle fabricated from a single piece.

FIGS. 91A-91E show simplified views of another embodiment of a spray nozzle fabricated from a single piece.

FIGS. 92A-92E show simplified views of another embodiment of a spray nozzle fabricated from a single piece.

Figure 93:
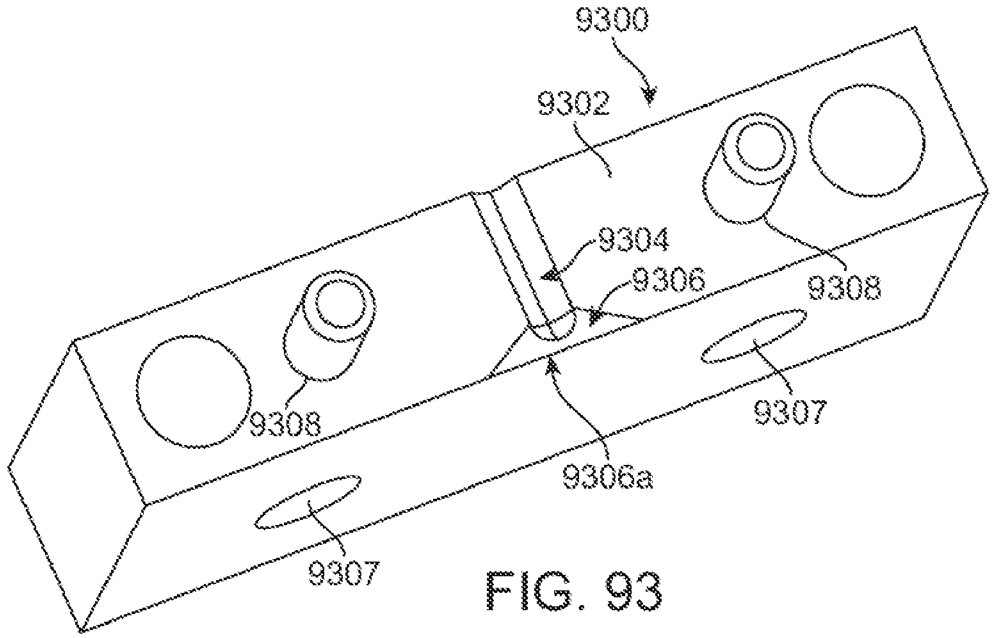

FIG. 93 is a perspective view of one plate of a multi-piece nozzle design, showing one of the opposing surfaces defining one-half of the sprayer structure.

Figure 93A:
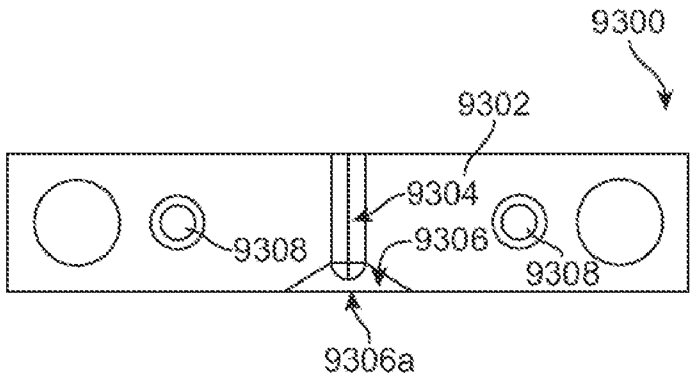

FIG. 93A shows a top view of the plate of FIG. 93.

Figure 93B:
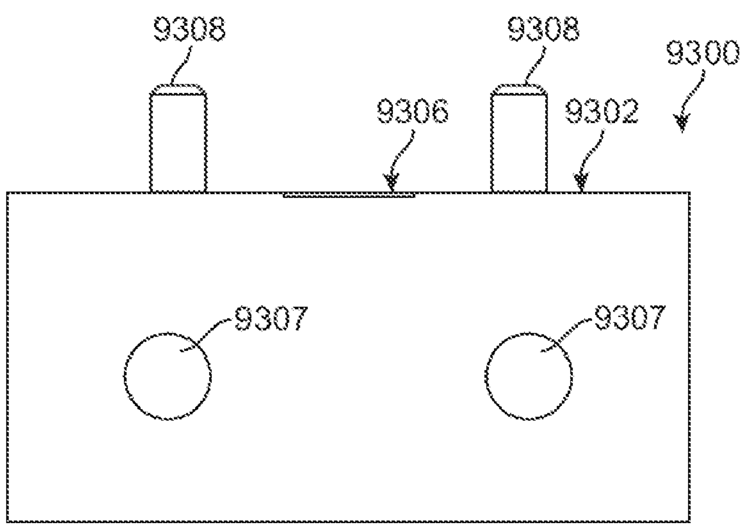

FIG. 93B shows a side view of the plate of FIG. 93.

Figure 94:
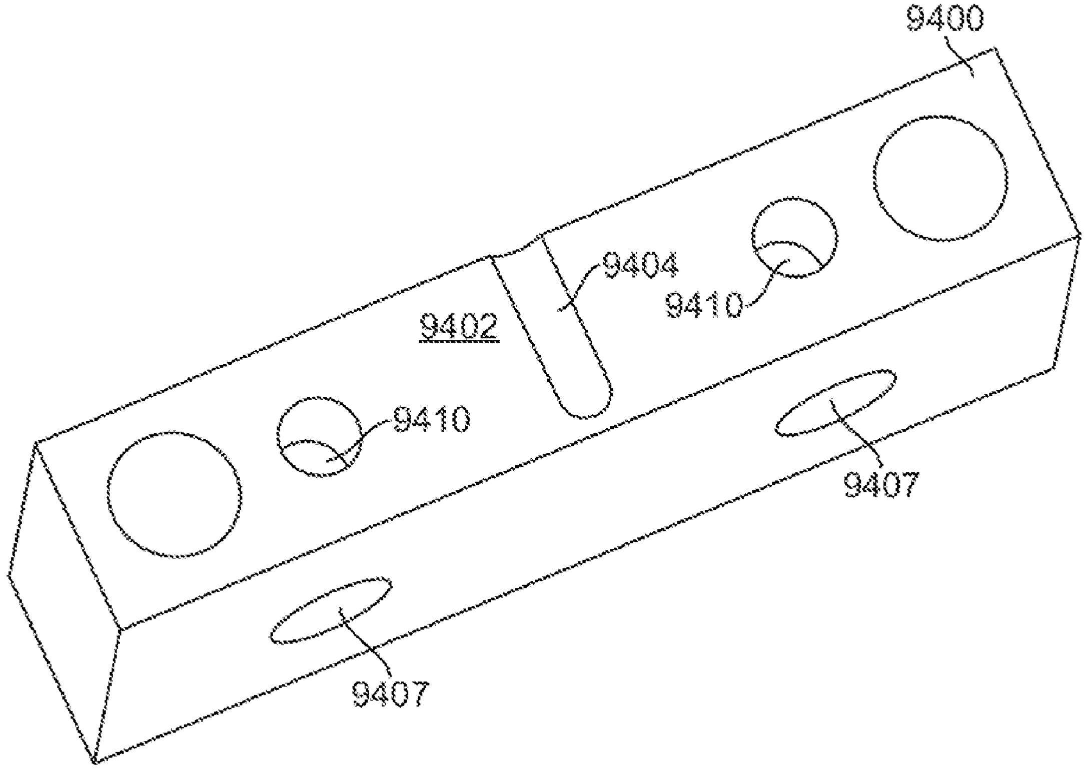

FIG. 94 is a perspective view of the second plate showing the surface defining the recess forming the other half of the sprayer structure.

Figure 95:
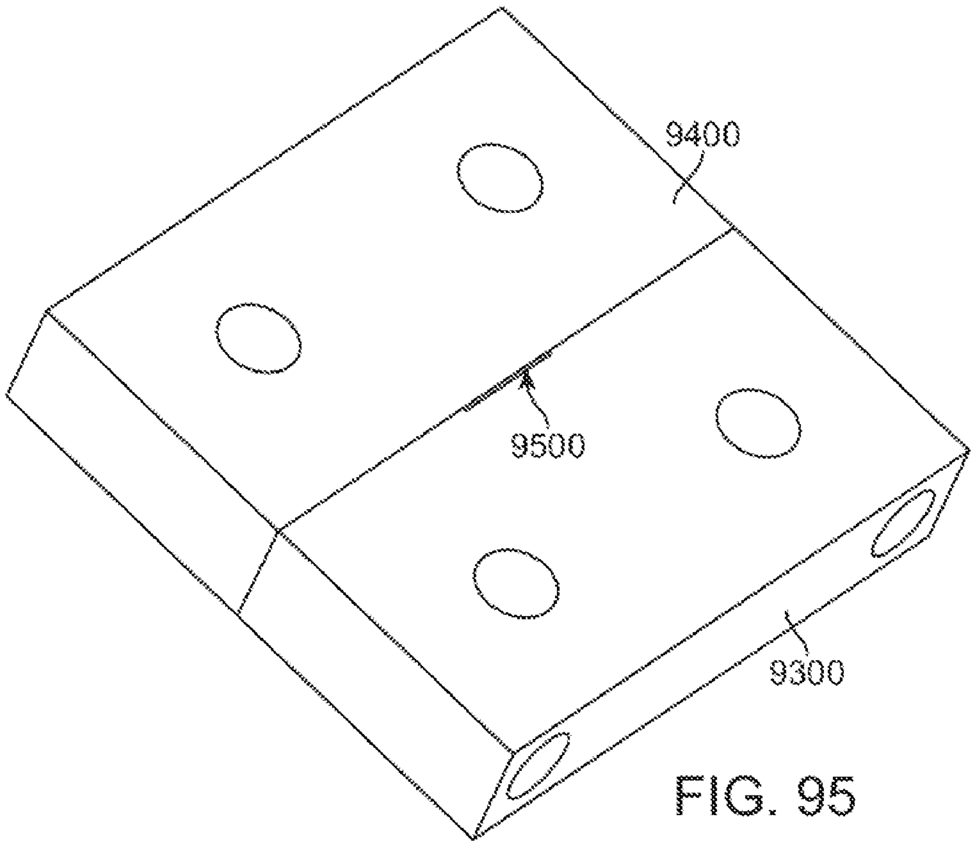

FIG. 95 shows a view of an embodiment of an assembled sprayer structure taken from the perspective of a chamber that is configured to receive liquid from the sprayer.

Figure 96:
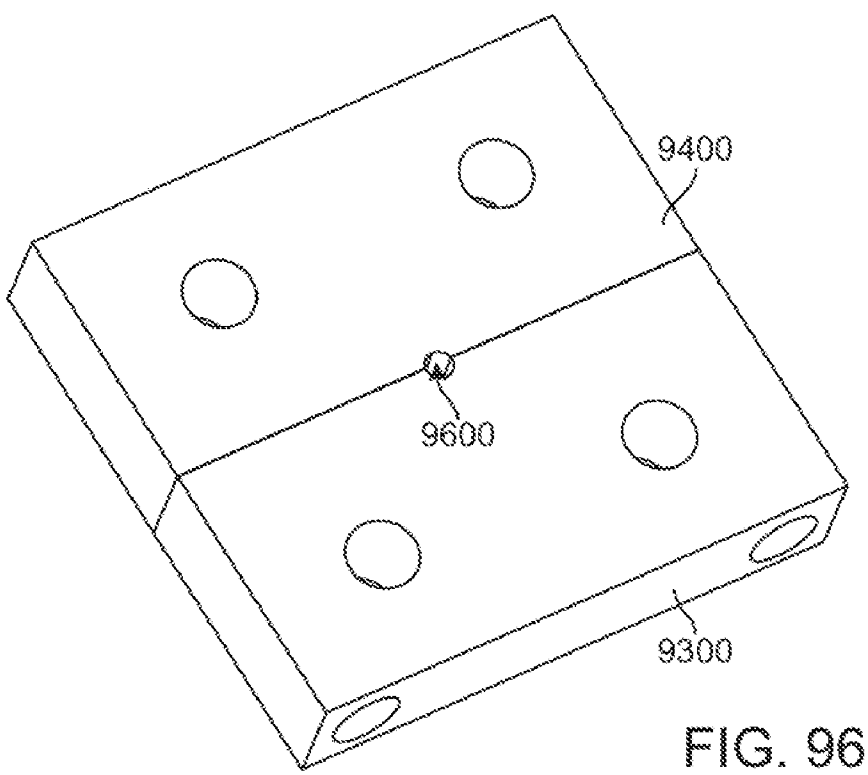

FIG. 96 shows a view of the embodiment of the assembled sprayer structure of FIG. 95, taken from the perspective of a source of liquid to the sprayer.

Figure 97:
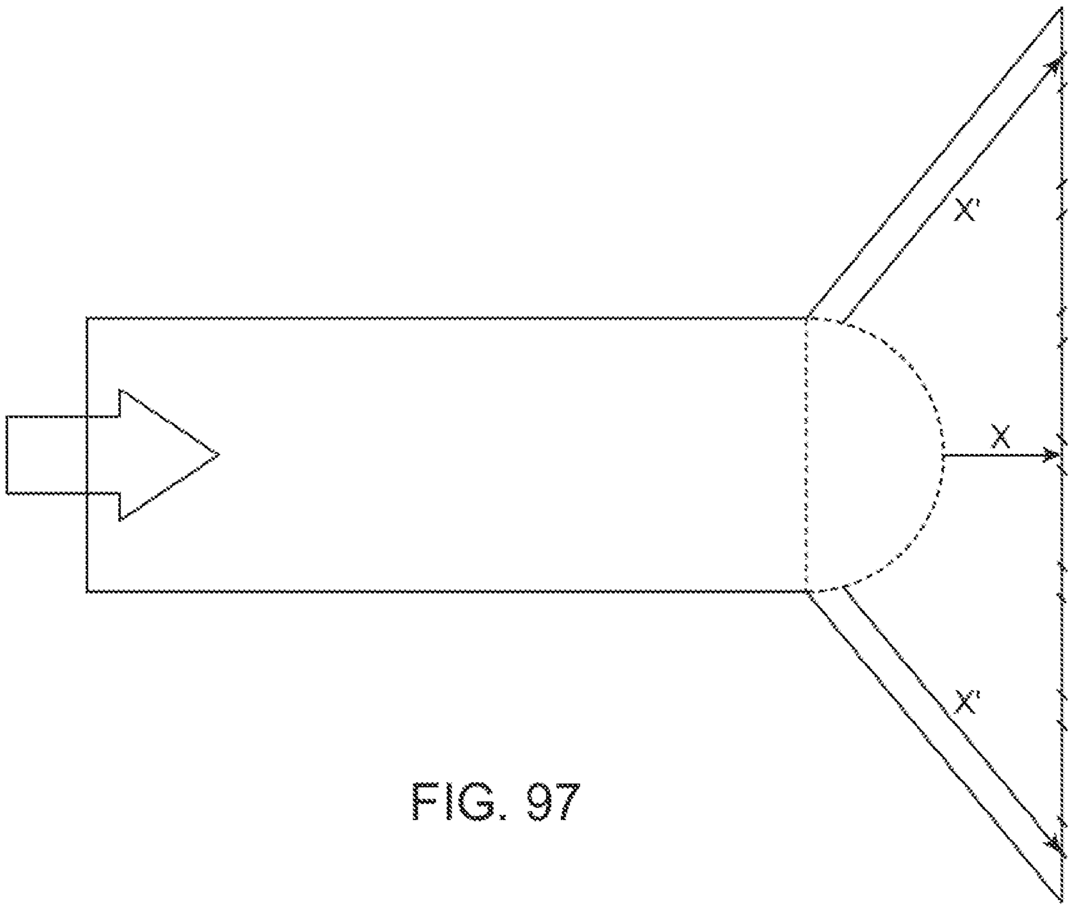

FIG. 97 shows relative distances of different portions of the nozzle design of FIG. 89.

Figure 98:
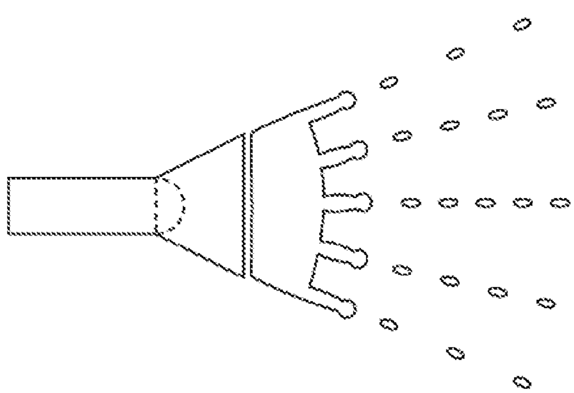
Figure 99A:
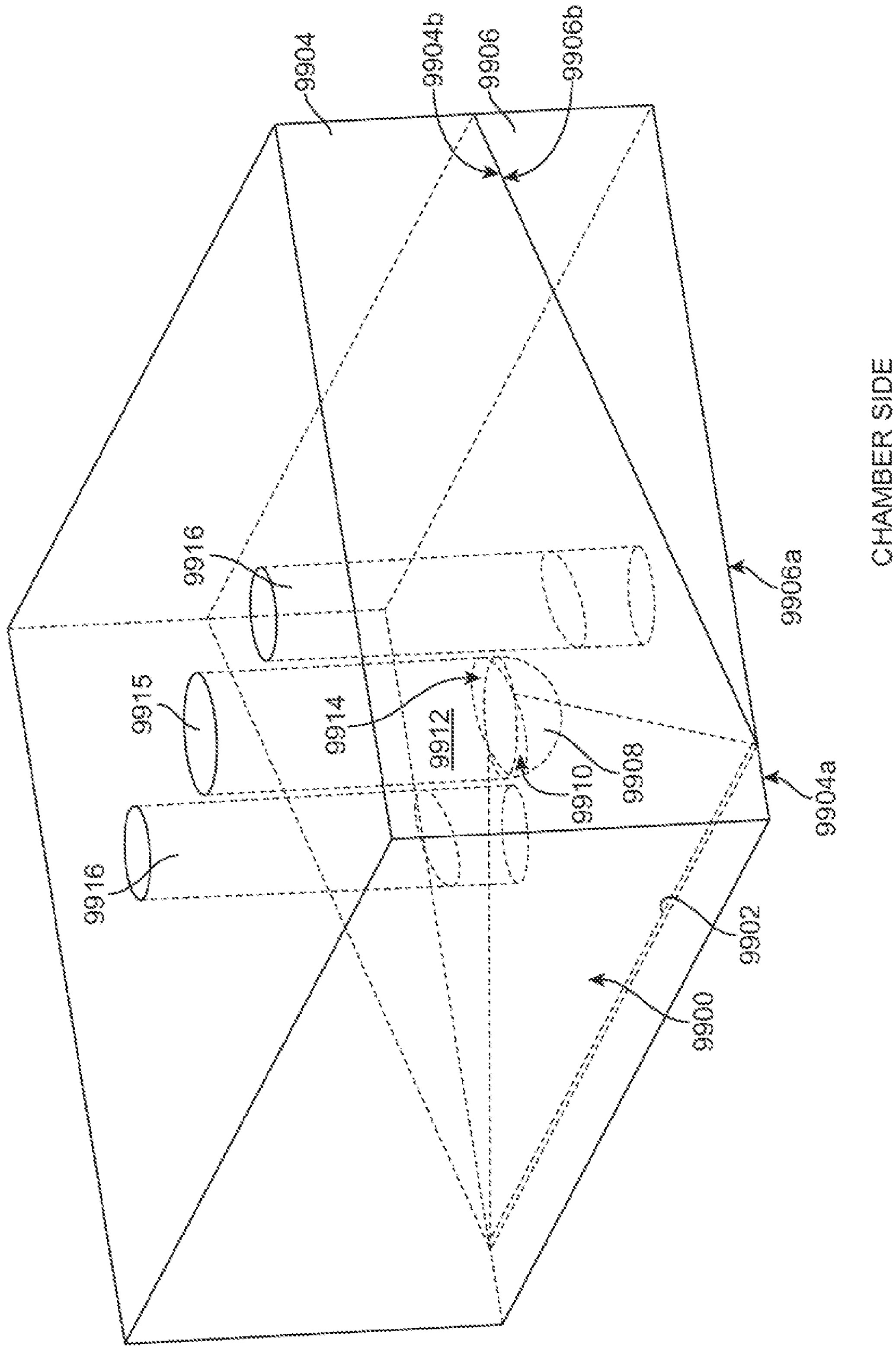
Figure 99B:
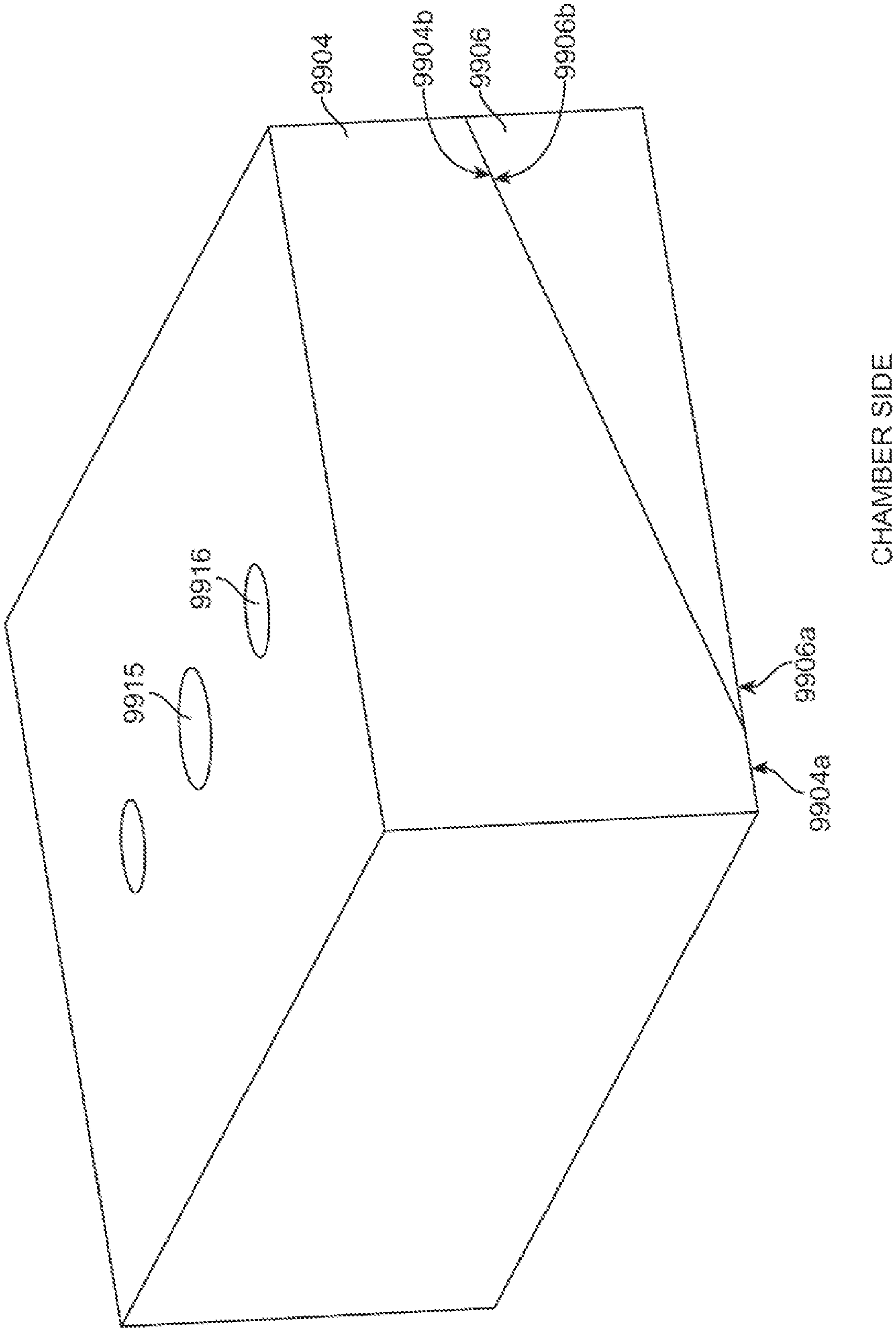
Figure 99C:
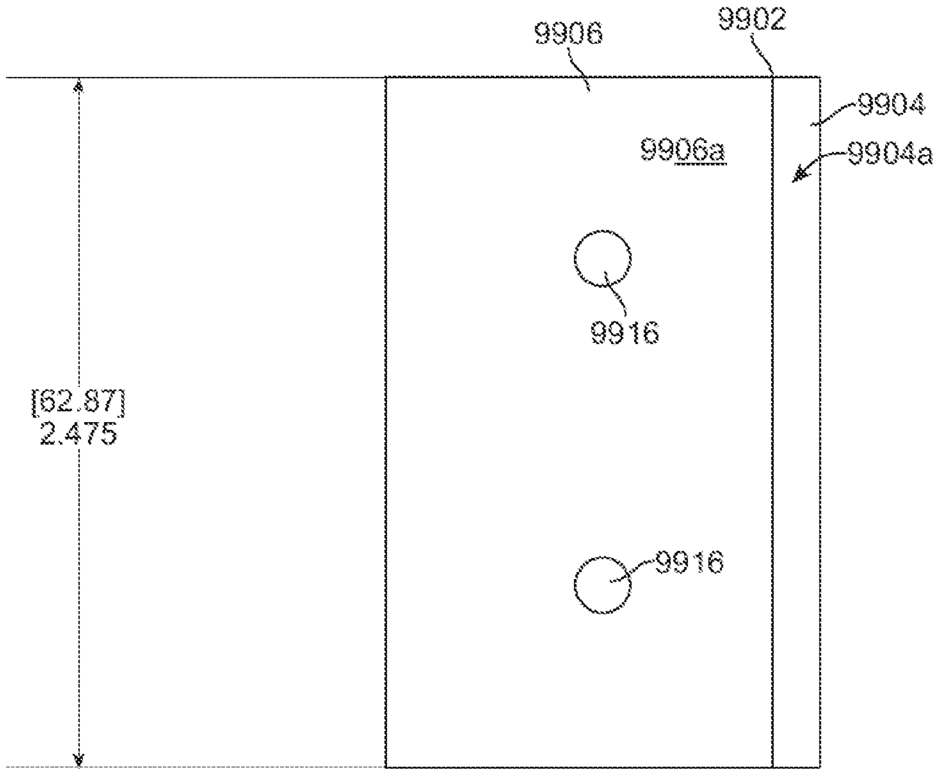
Figure 99D:
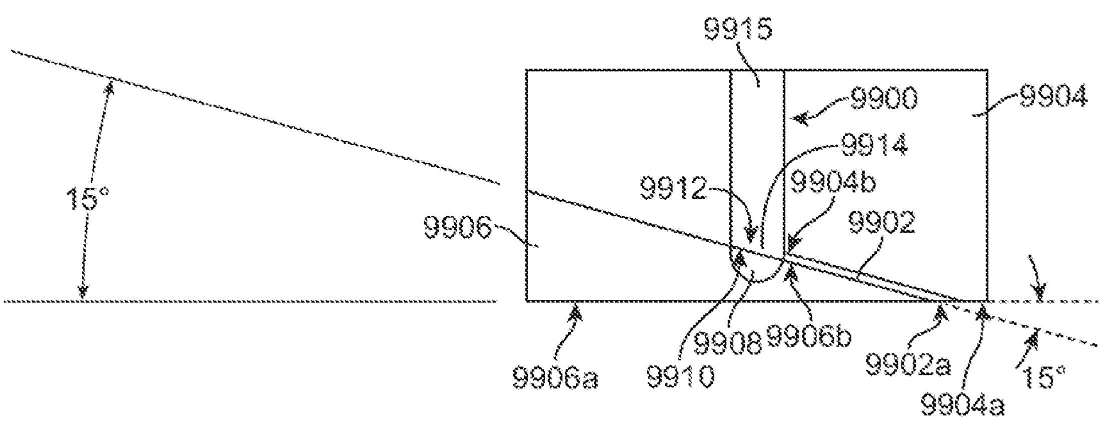

FIG. 98 shows the fan spray expected from the nozzle design of FIG. 89.

FIGS. 99A-D show views of another embodiment of a multi-piece nozzle structure.

FIGS. 100A-J show various views of another embodiment of a multi-piece nozzle structure.

Figure 101A:
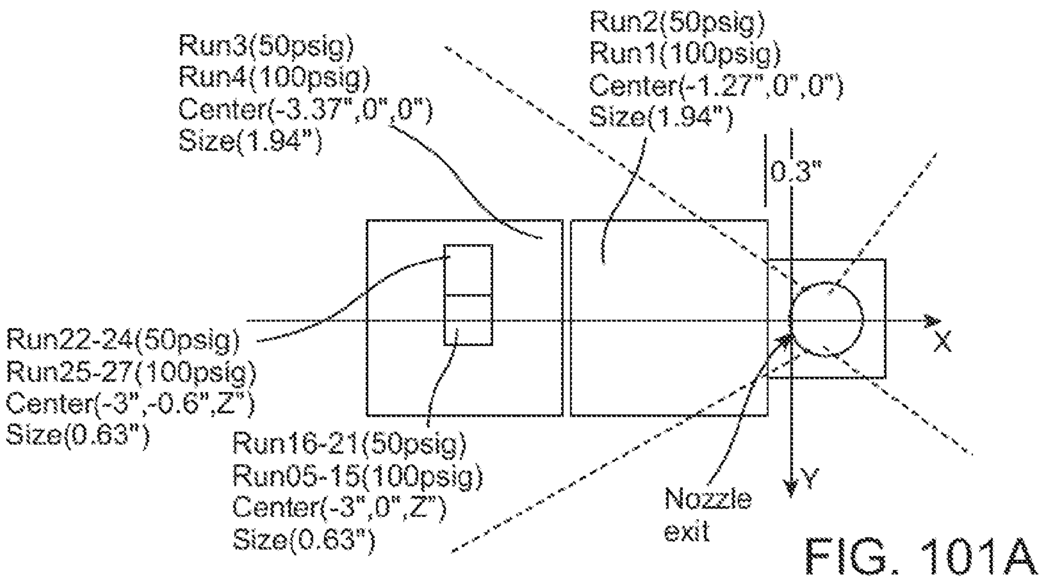
Figure 101B:
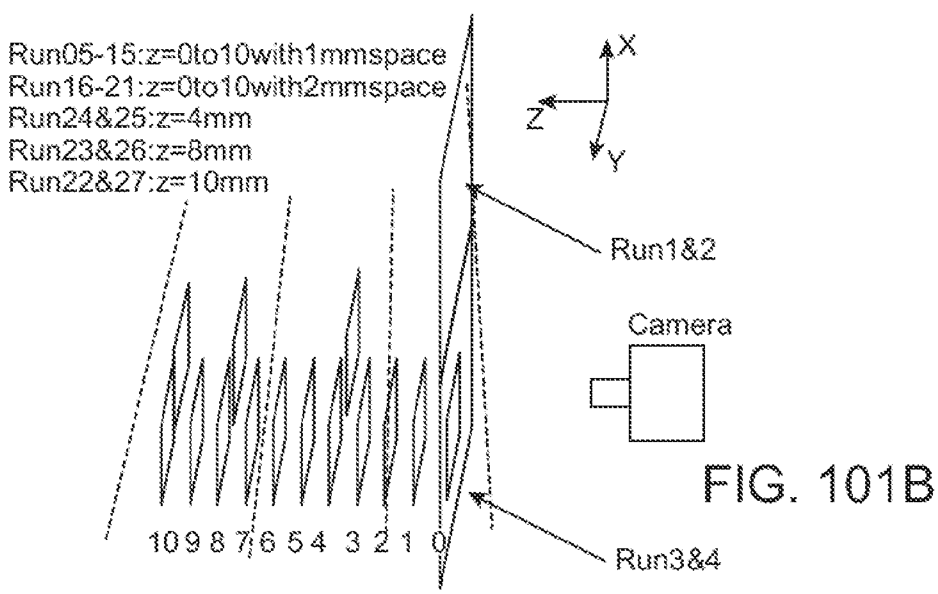
Figure 101C:
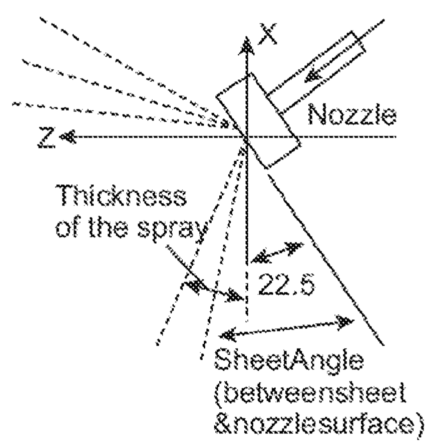

FIGS. 101A-C show an experimental setup for evaluating nozzle performance.

Figure 102:
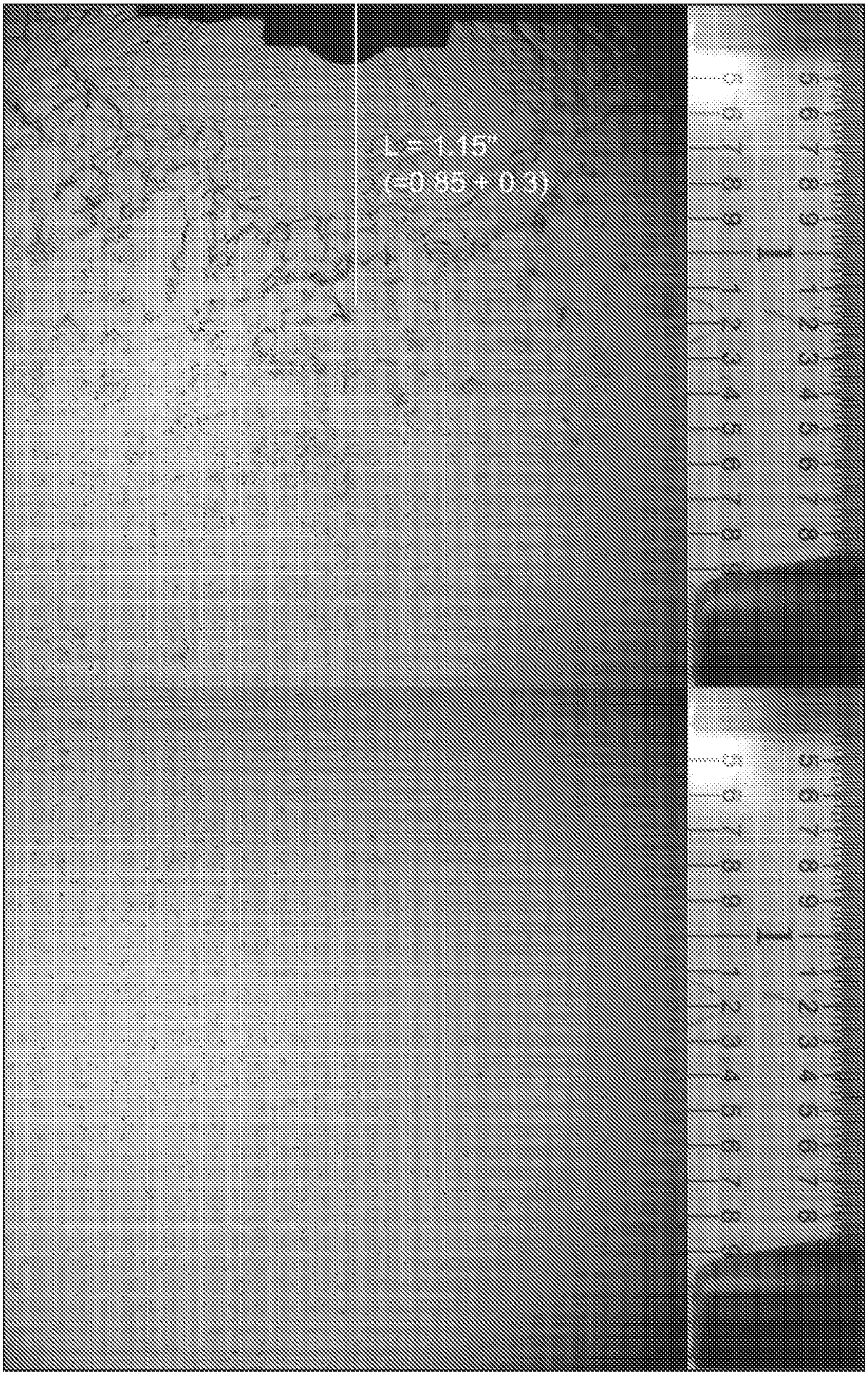

FIG. 102 shows the global flow structure at 100 PSIG water pressure from two instantaneous shadowgraphy images.

Figure 103:
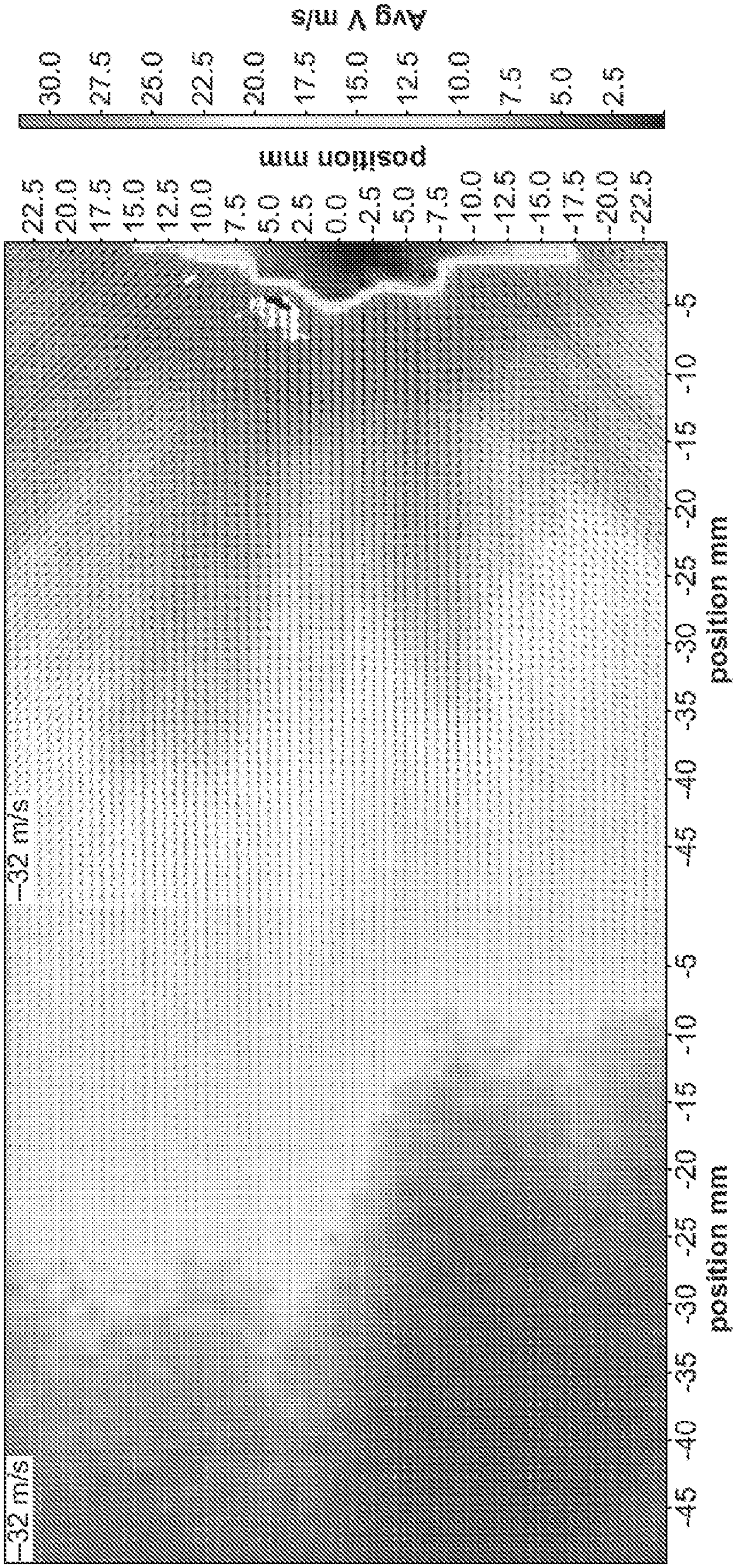

FIG. 103 shows mean velocity vectors from run 1 and run 4.

Figure 104:
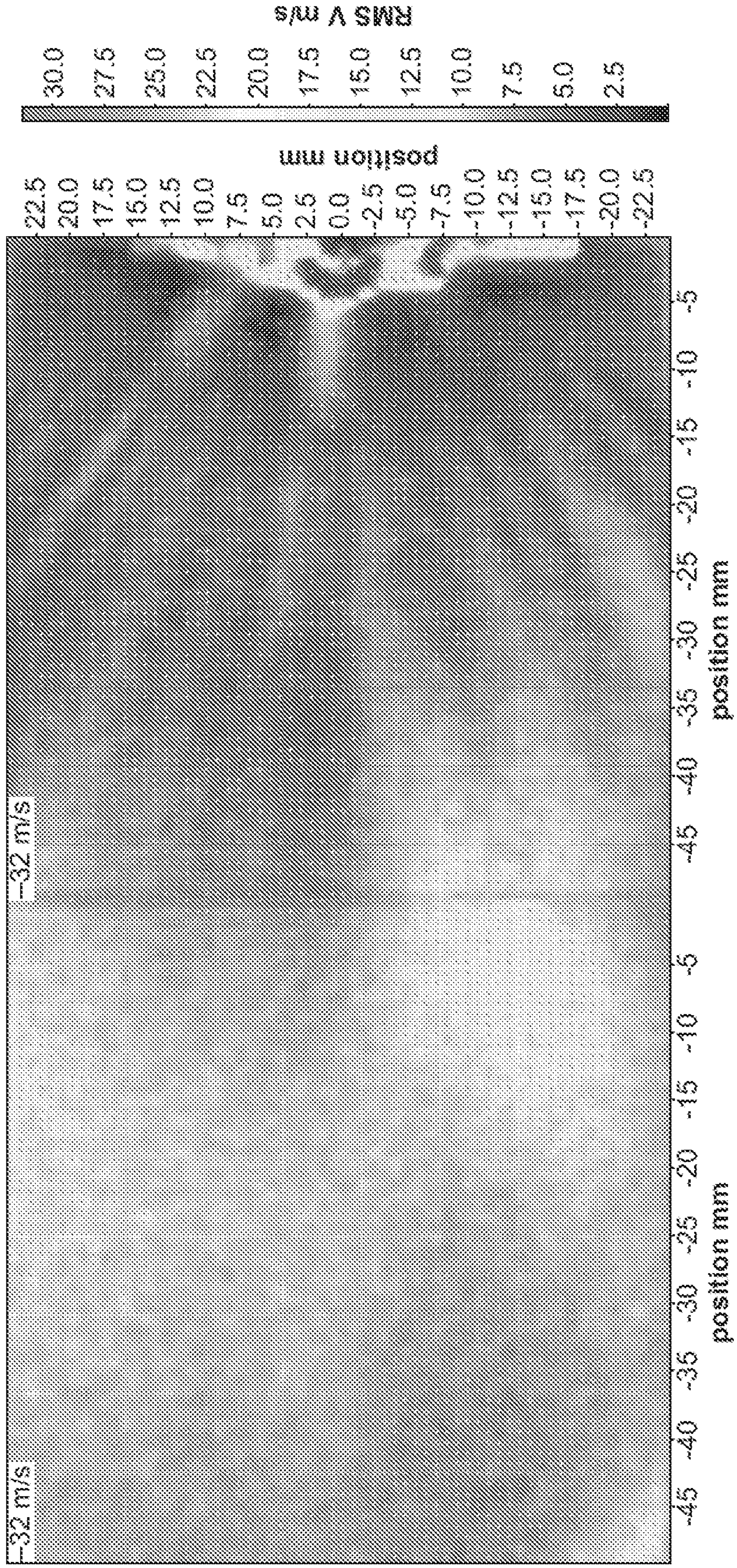

FIG. 104 shows RMS velocity vectors from run 1 and run 4.

Figure 105:
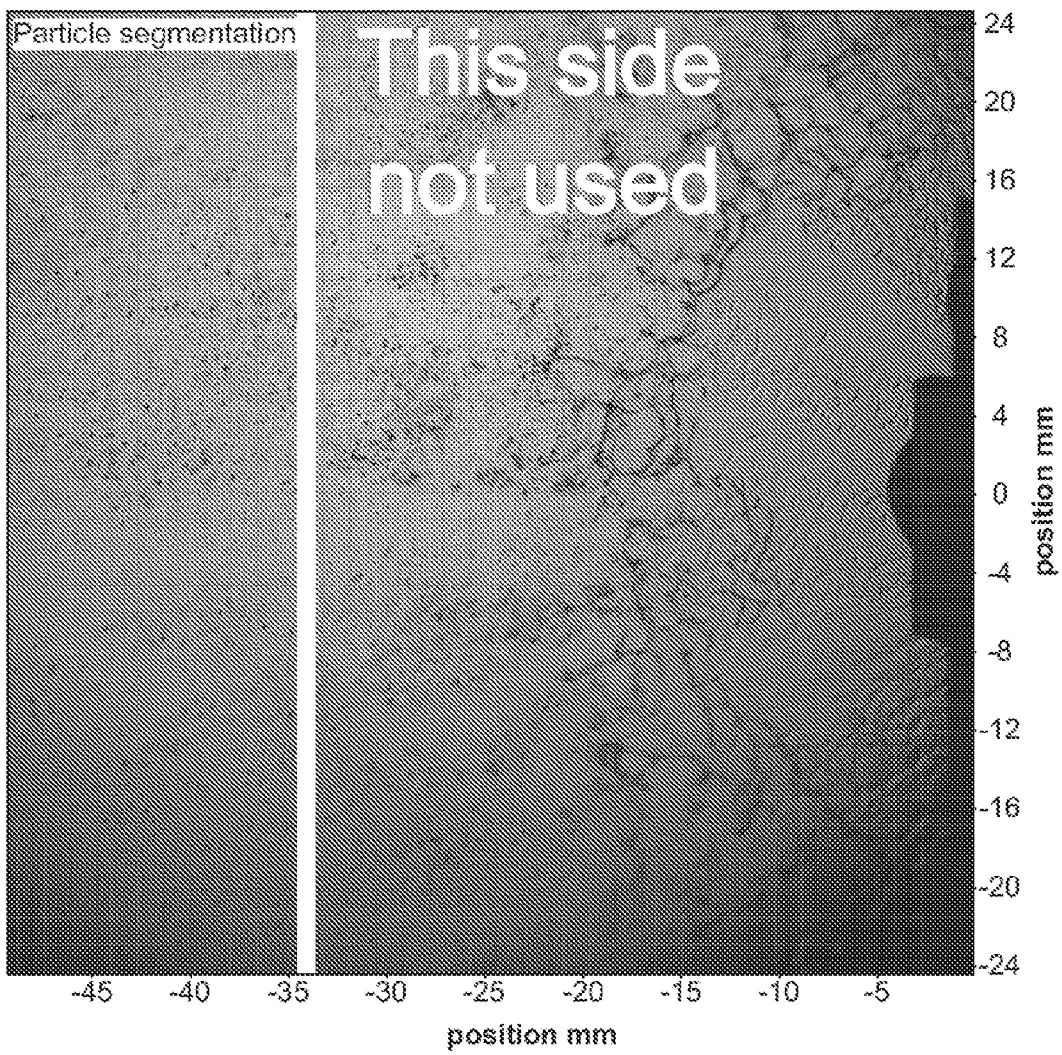

FIG. 105 shows one instantaneous image with recognized droplets from run 1.

Figure 106:
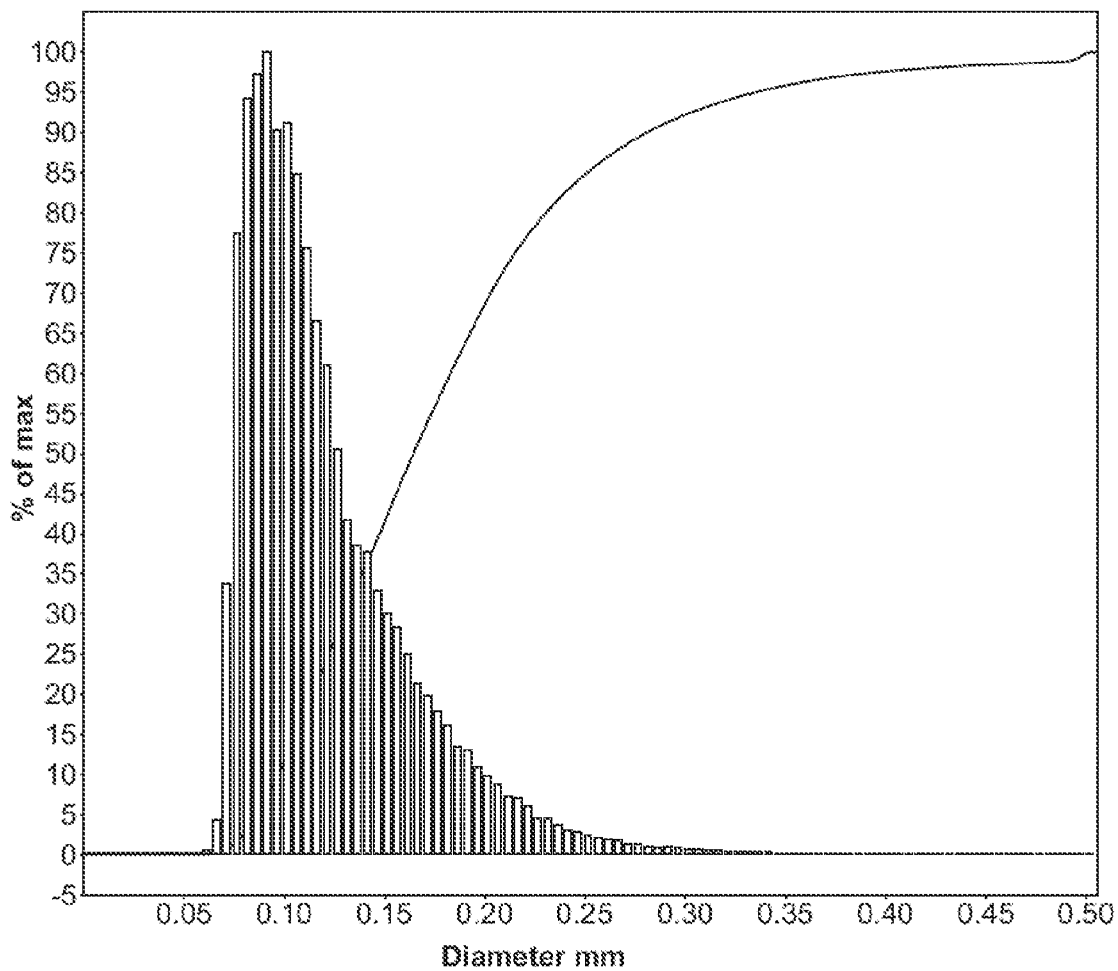

FIG. 106 showing the histogram of the droplet size of run 1.

Figure 107:
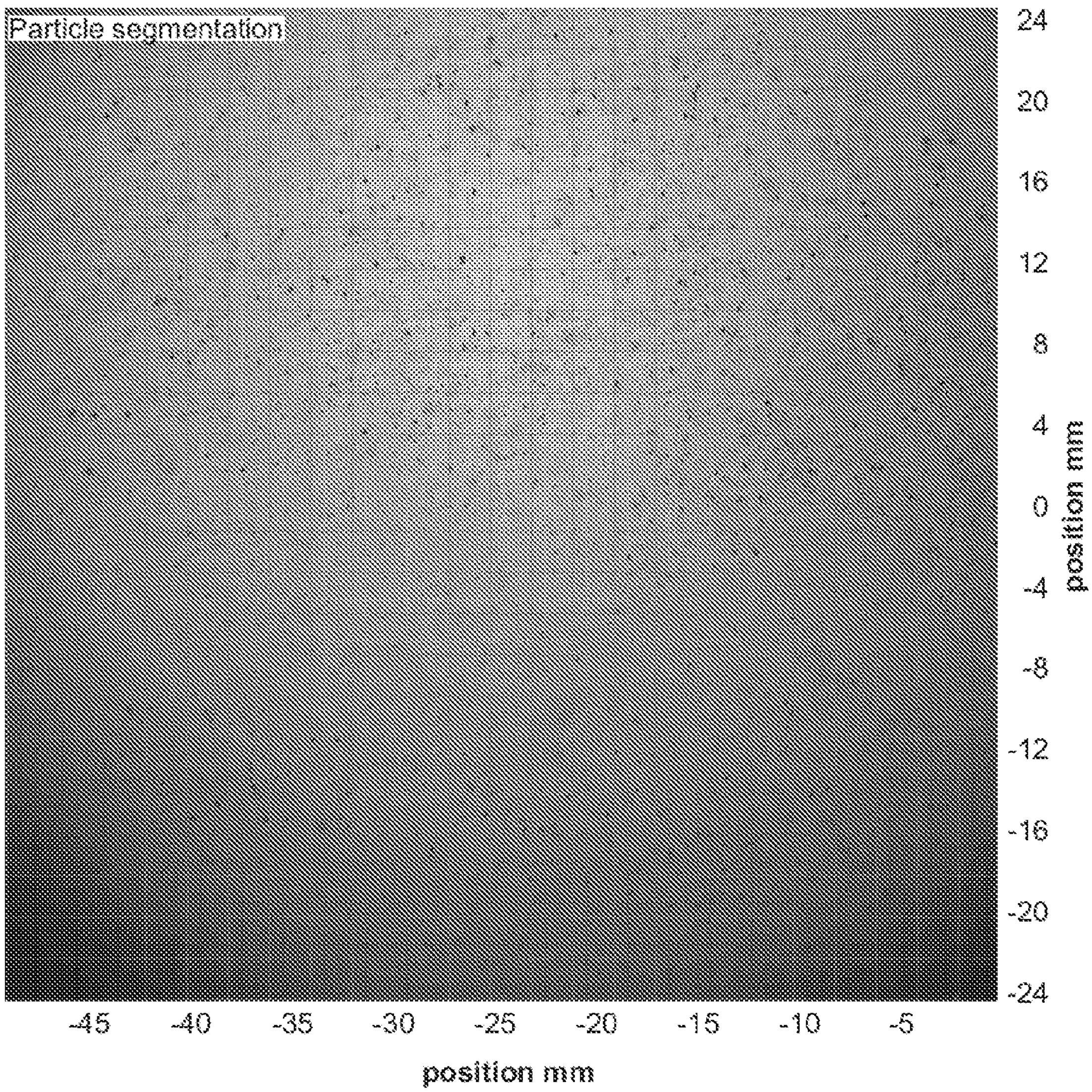

FIG. 107 shows one instantaneous image with recognized droplets from run 4.

Figure 108:
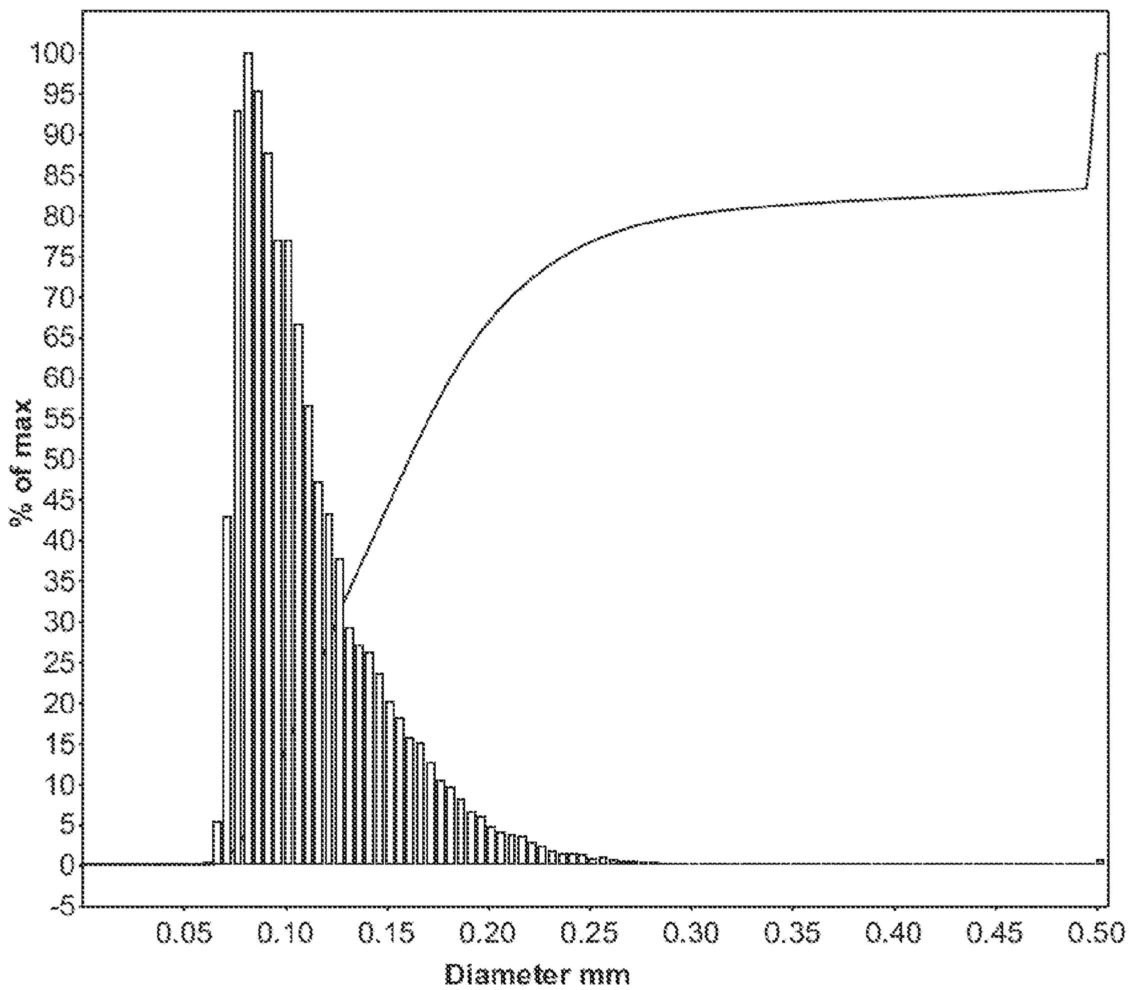

FIG. 108 shows the corresponding histogram of droplet size.

Figure 109A:
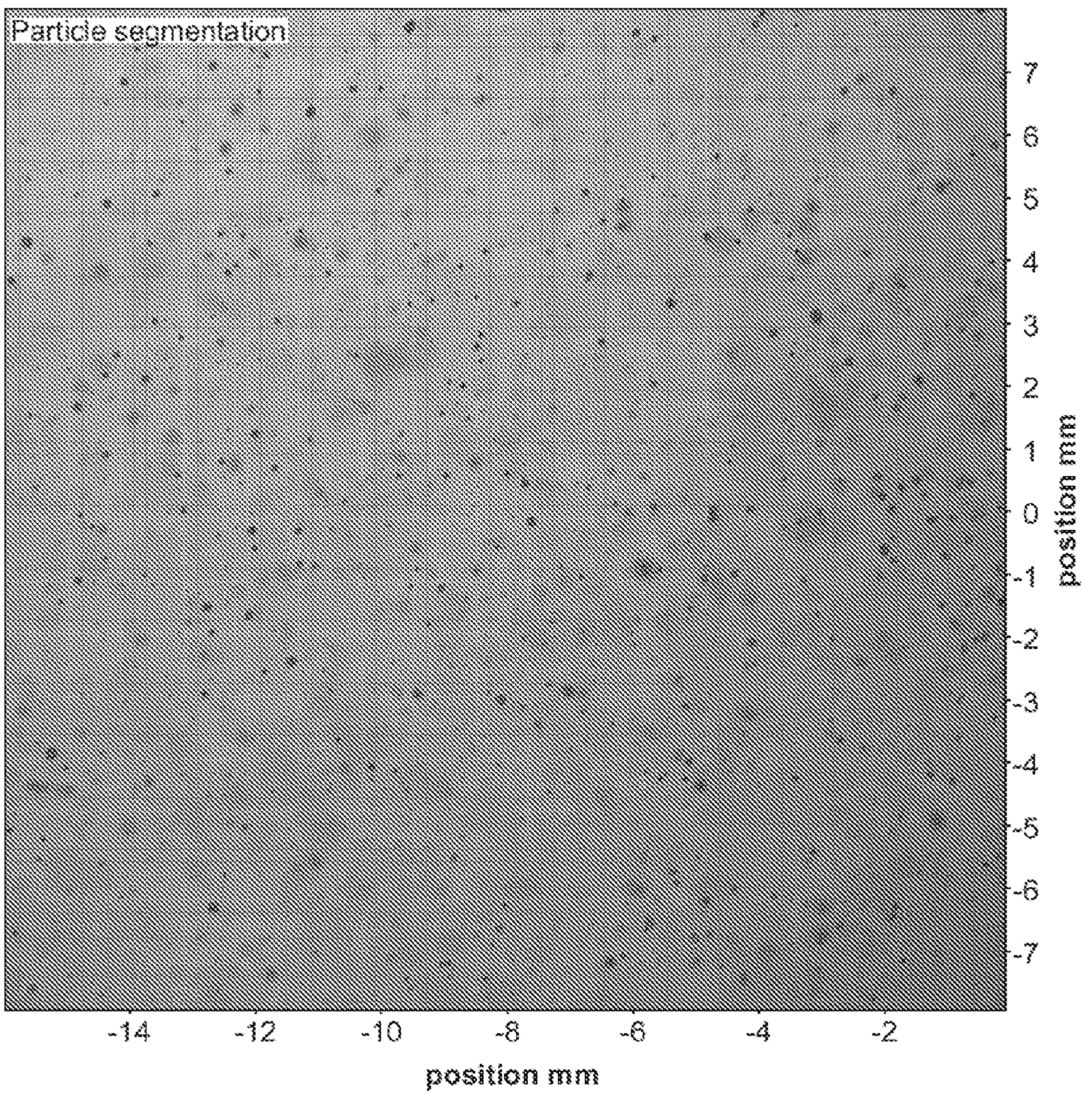
Figure 109B:
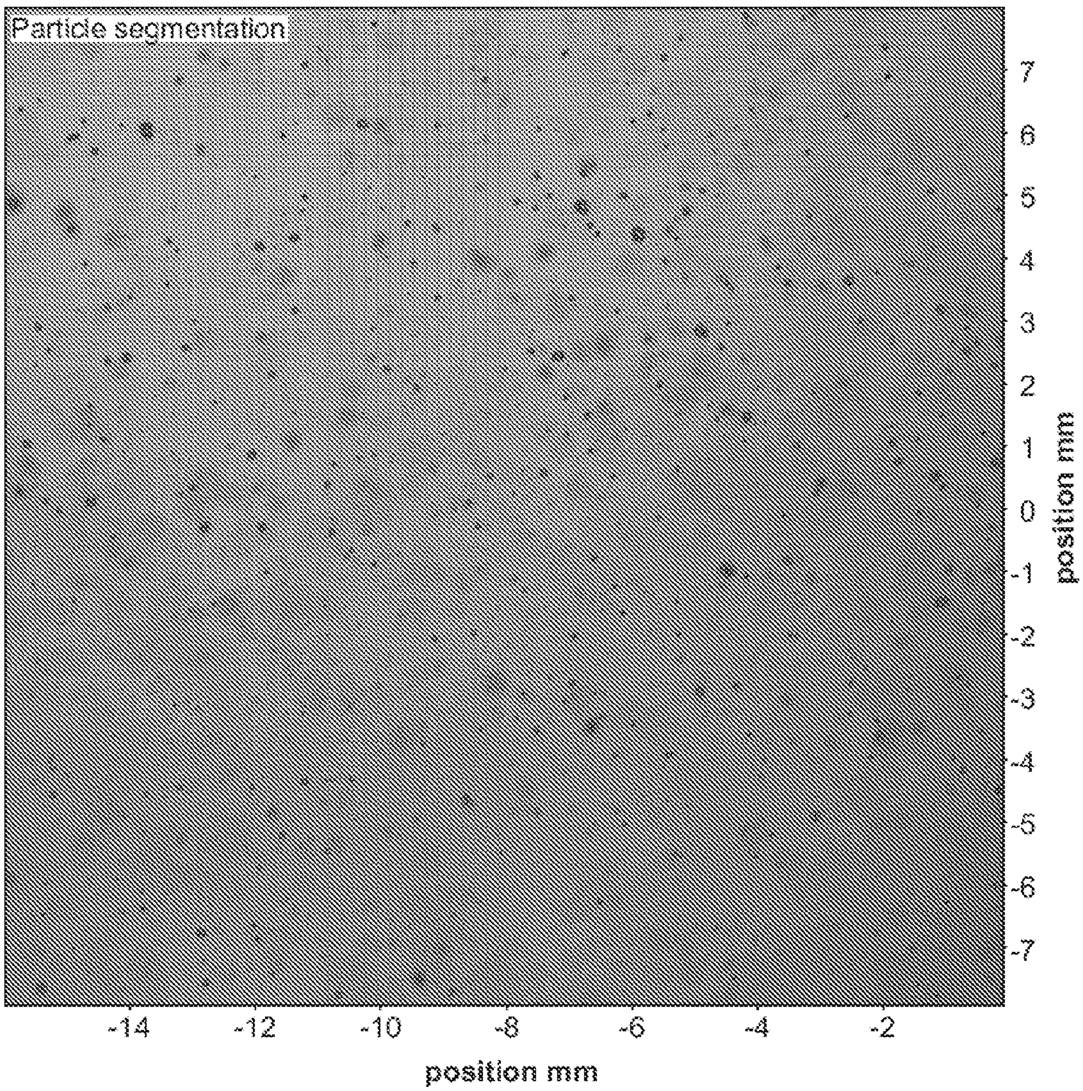

FIG. 109A shows one instantaneous image with recognized droplets of run 12. FIG. 109B shows one instantaneous image with recognized droplets of run 14.

Figure 110A:
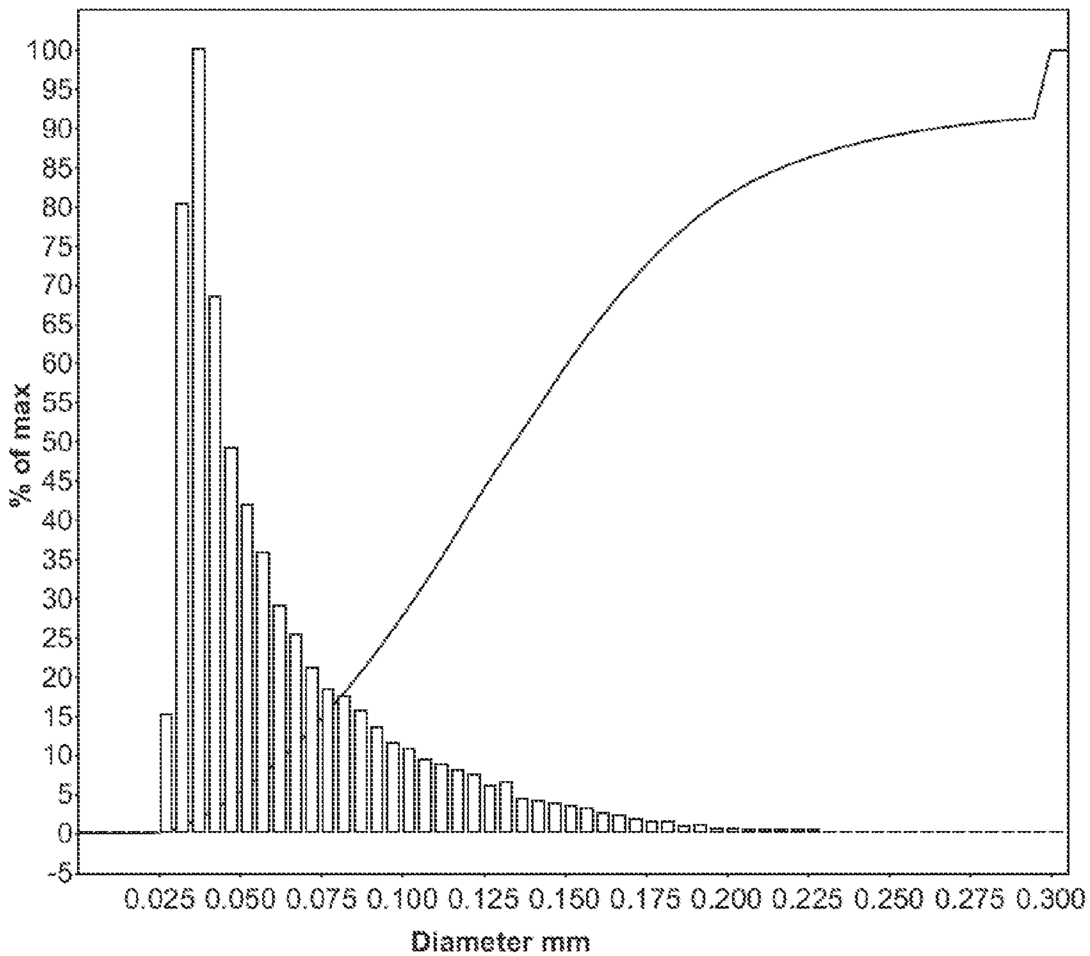
Figure 110B:
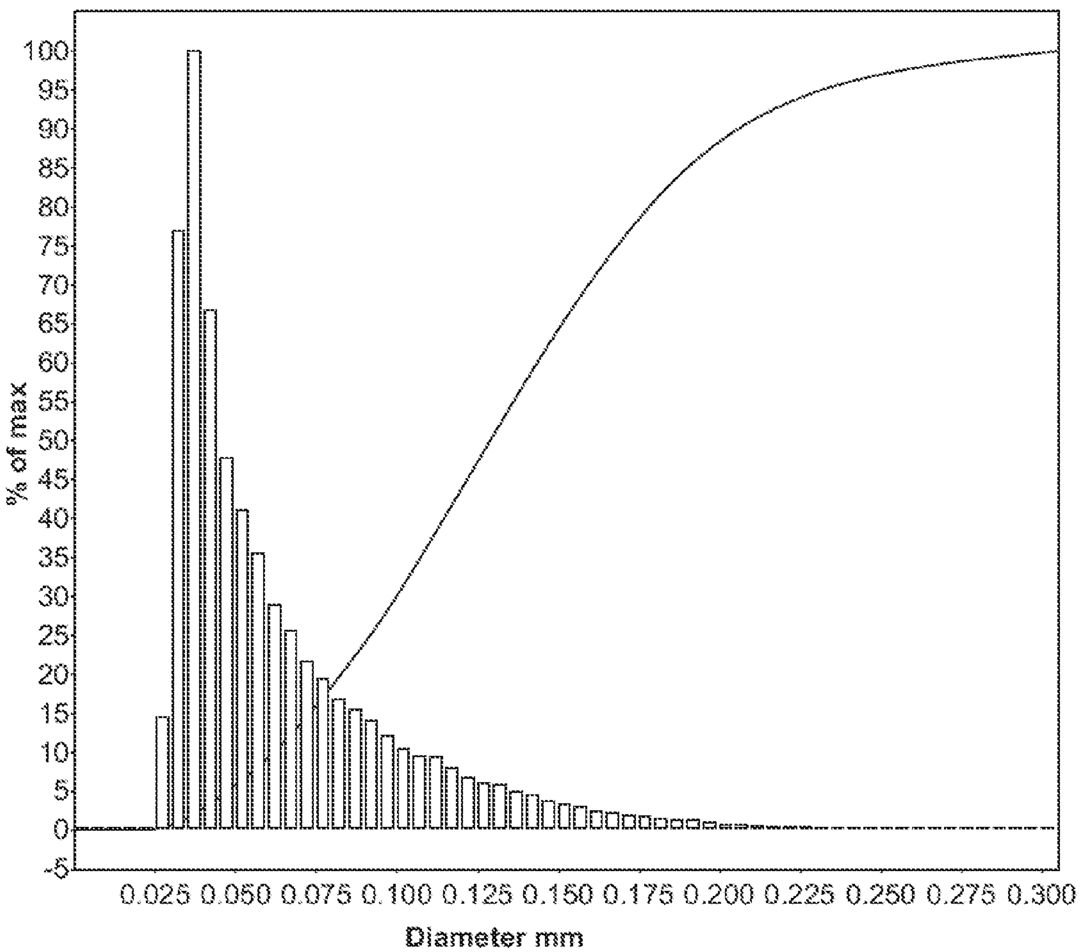

FIG. 110A shows the histogram of the droplet size of run 12. FIG. 110B shows the histogram of run 14.

Figure 111A:
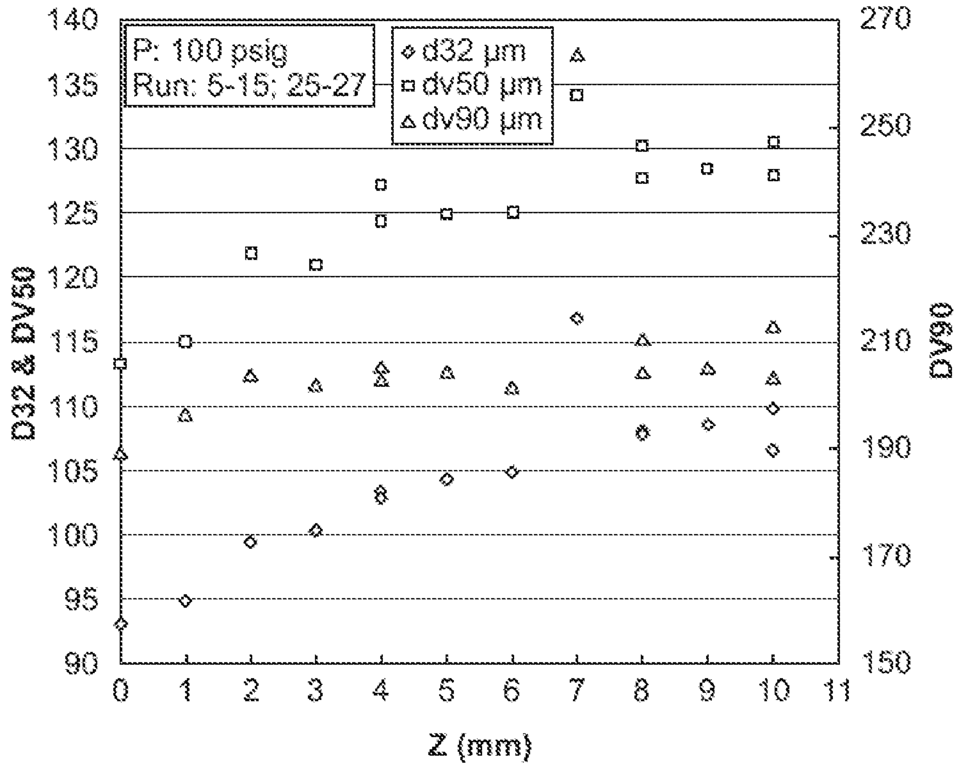
Figure 111B:
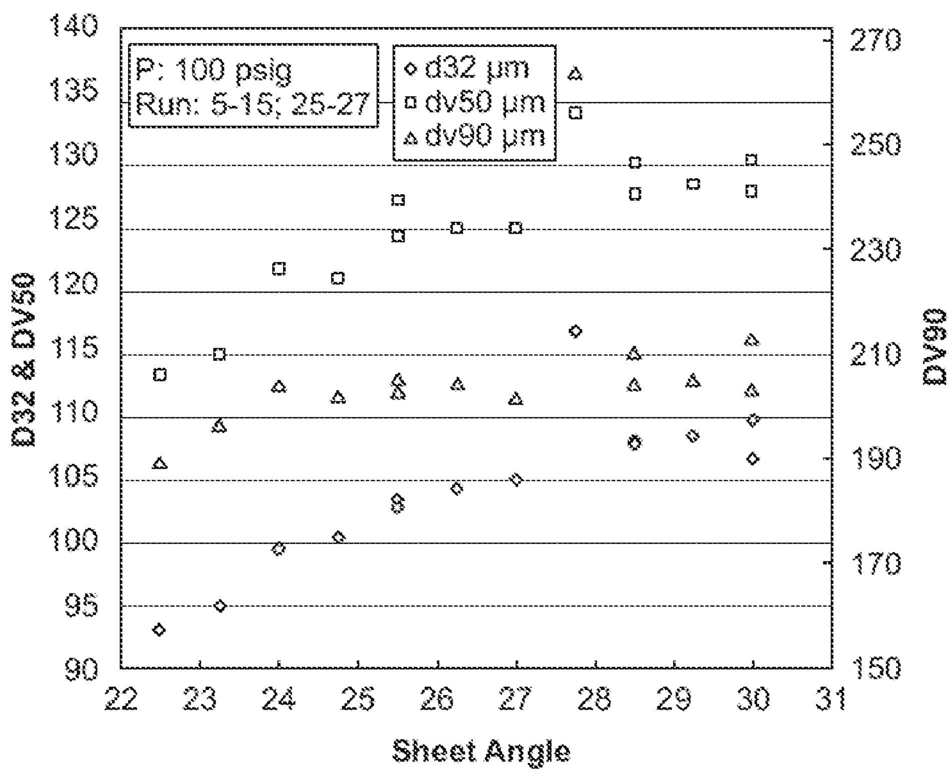

FIG. 111A shows the droplet size distribution along z axis of runs 5 to 15 and runs 25 to 27. FIG. 111B shows the same data in terms of sheet angle.

Figure 112A:
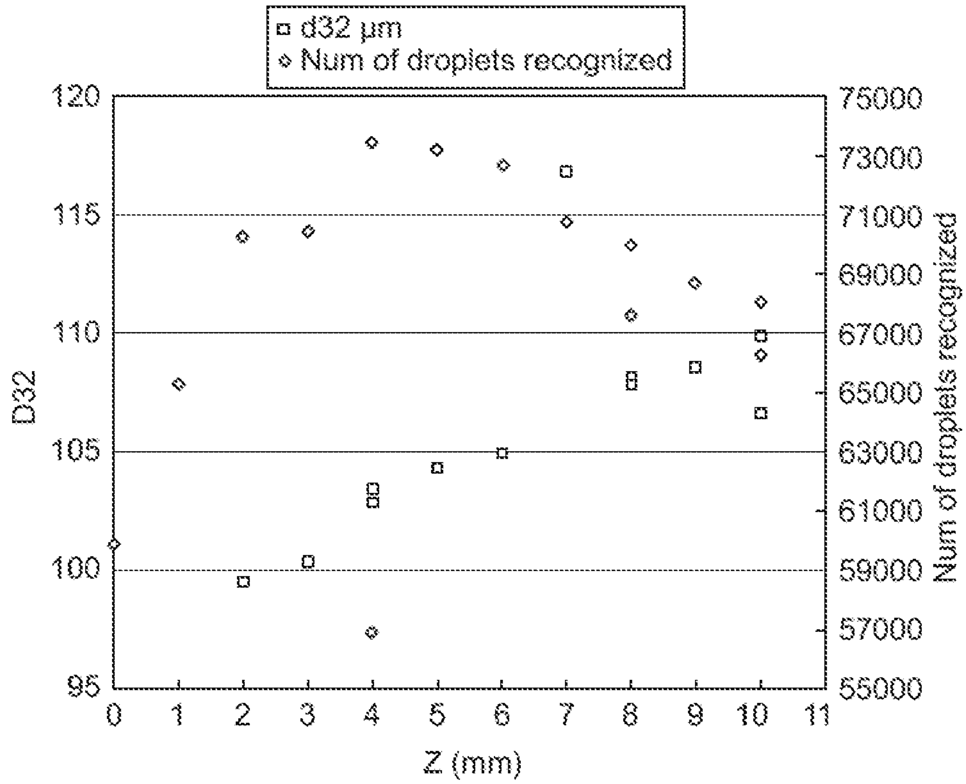
Figure 112B:
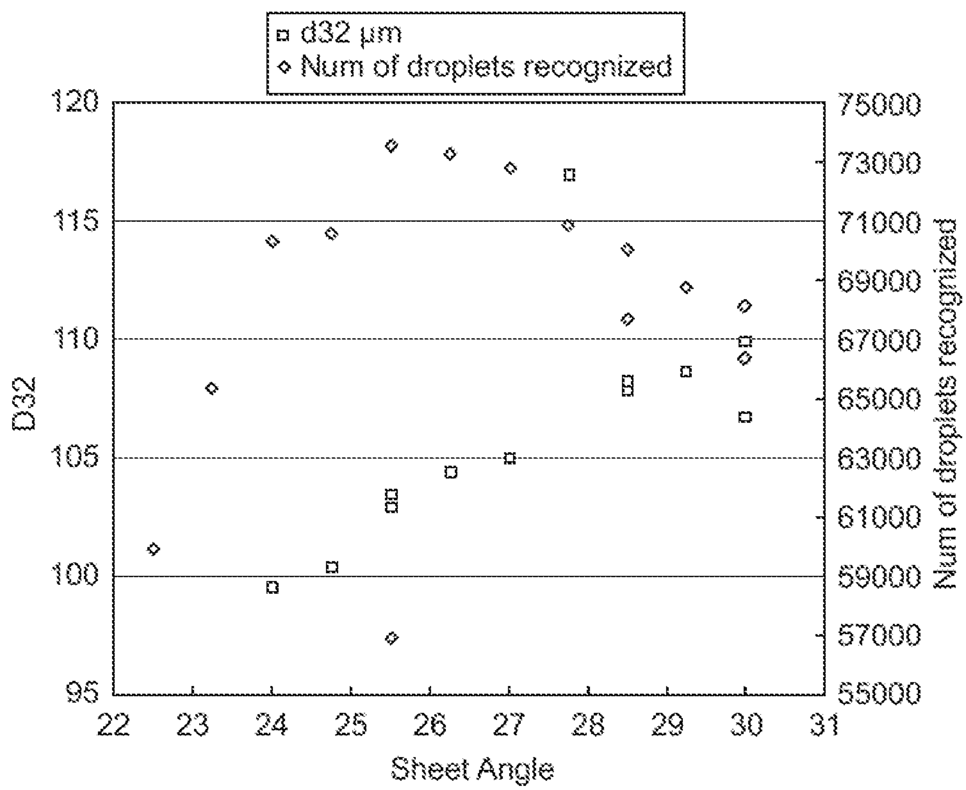

FIG. 112A shows the number of droplets recognized at each z location of runs 5 to 15 and runs 25 to 27. FIG. 112B shows the same data in terms of sheet angle.

Figure 113:
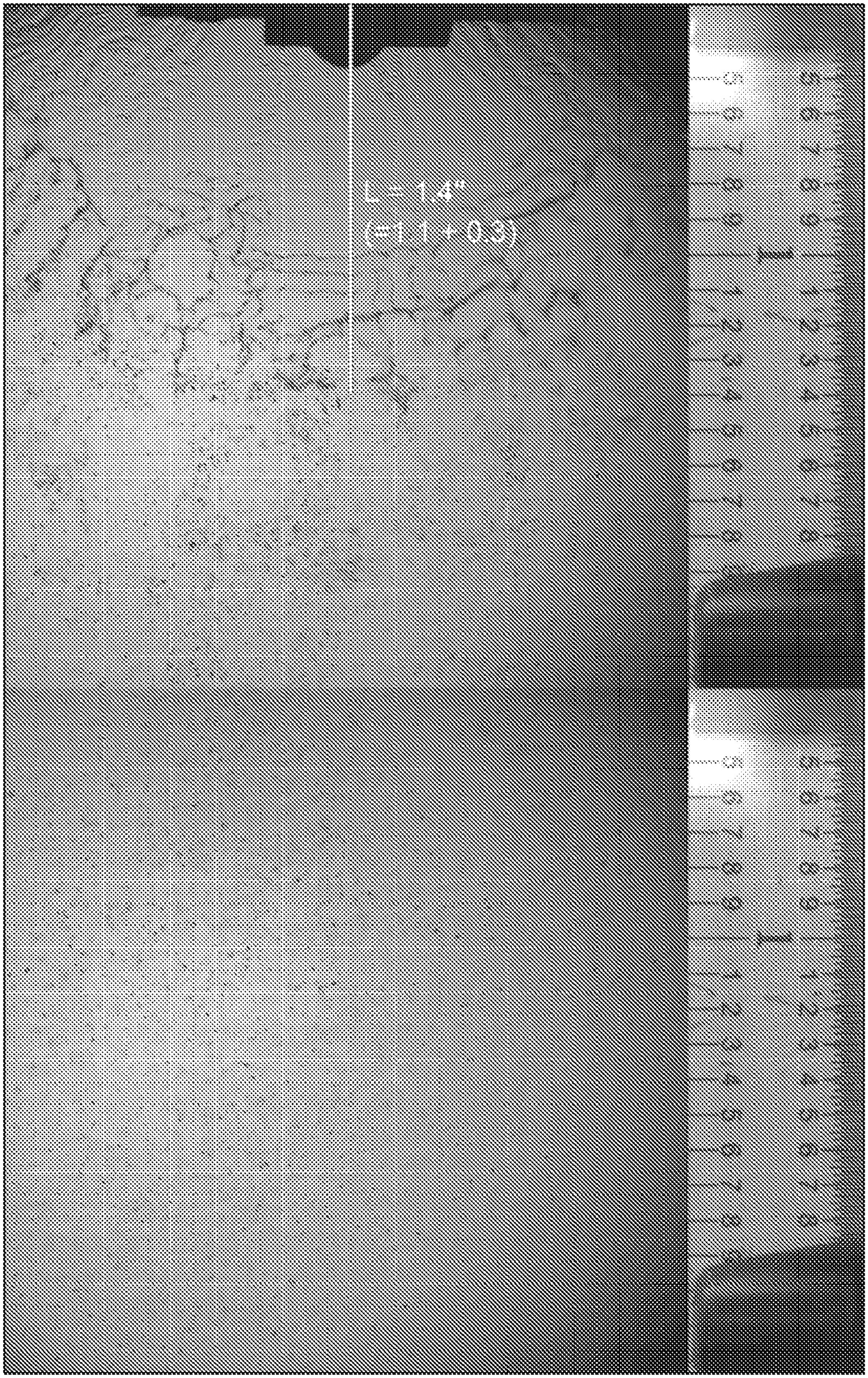

FIG. 113 shows the global flow structure at 50 PSIG water pressure from two instantaneous shadowgraphy images.

Figure 114:
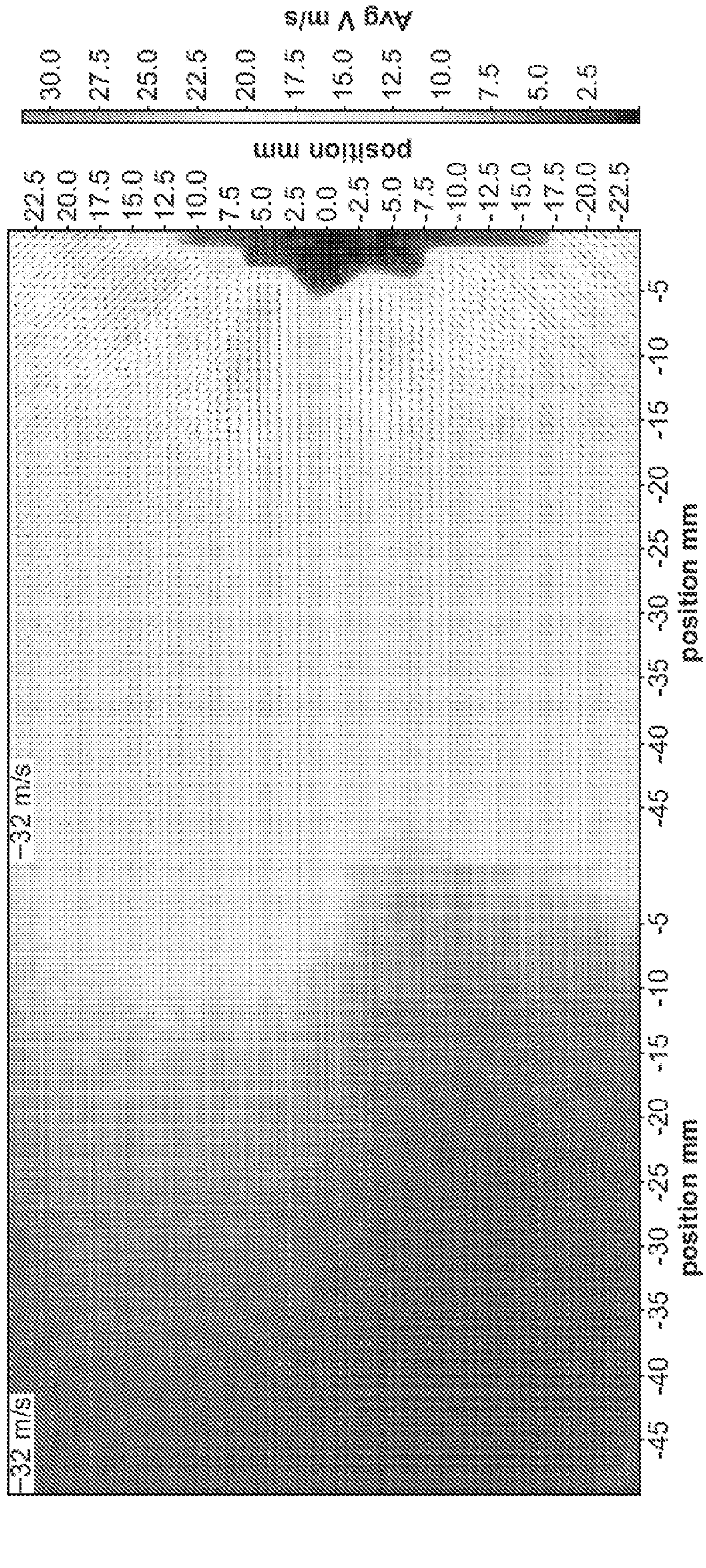

FIG. 114 shows the mean velocity vector fields from runs 2 and 3.

Figure 115:
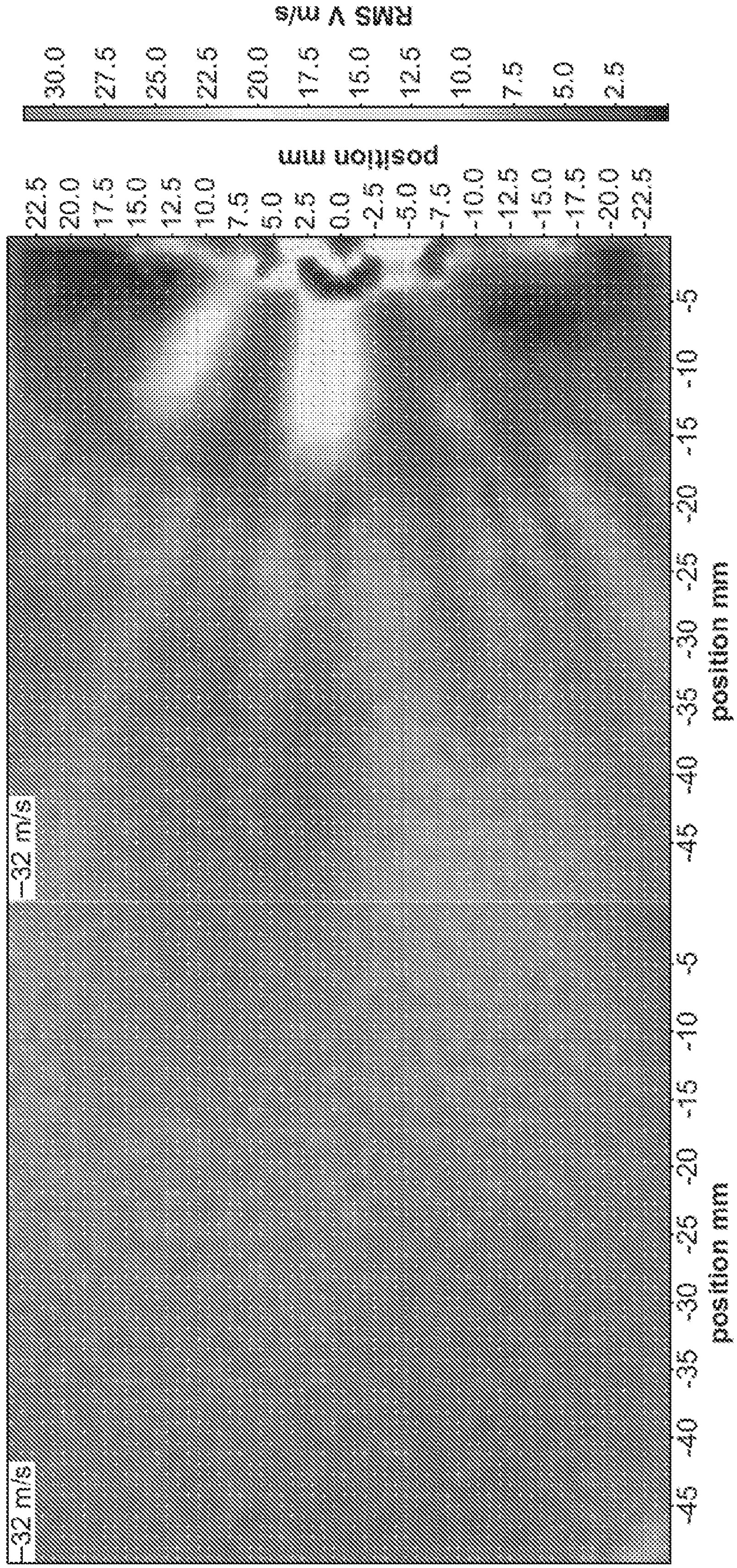

FIG. 115 shows the RMS velocity vector fields from runs 2 and 3.

Figure 116:
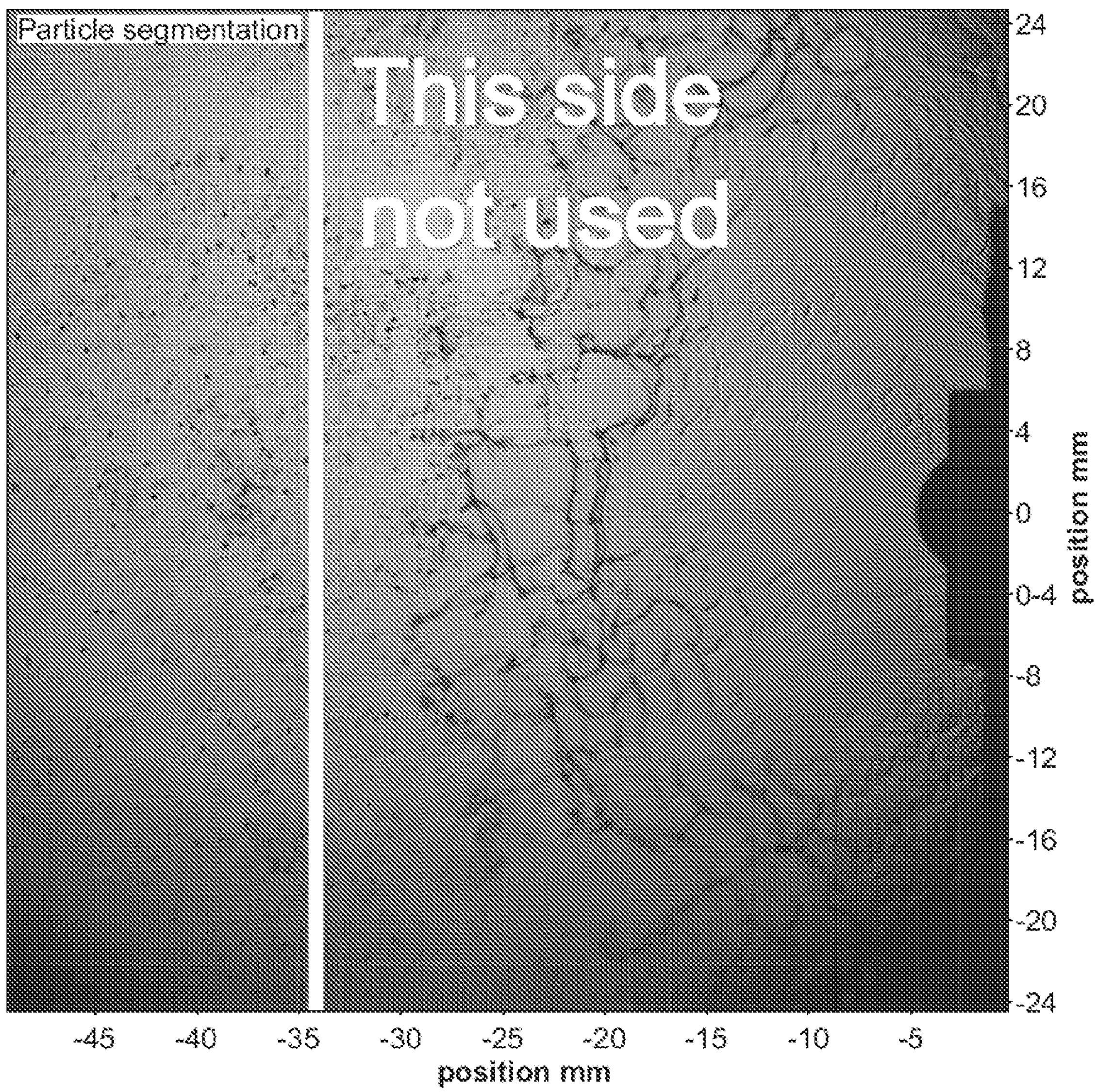

FIG. 116 shows one instantaneous image with recognized droplets from run 2.

Figure 117:
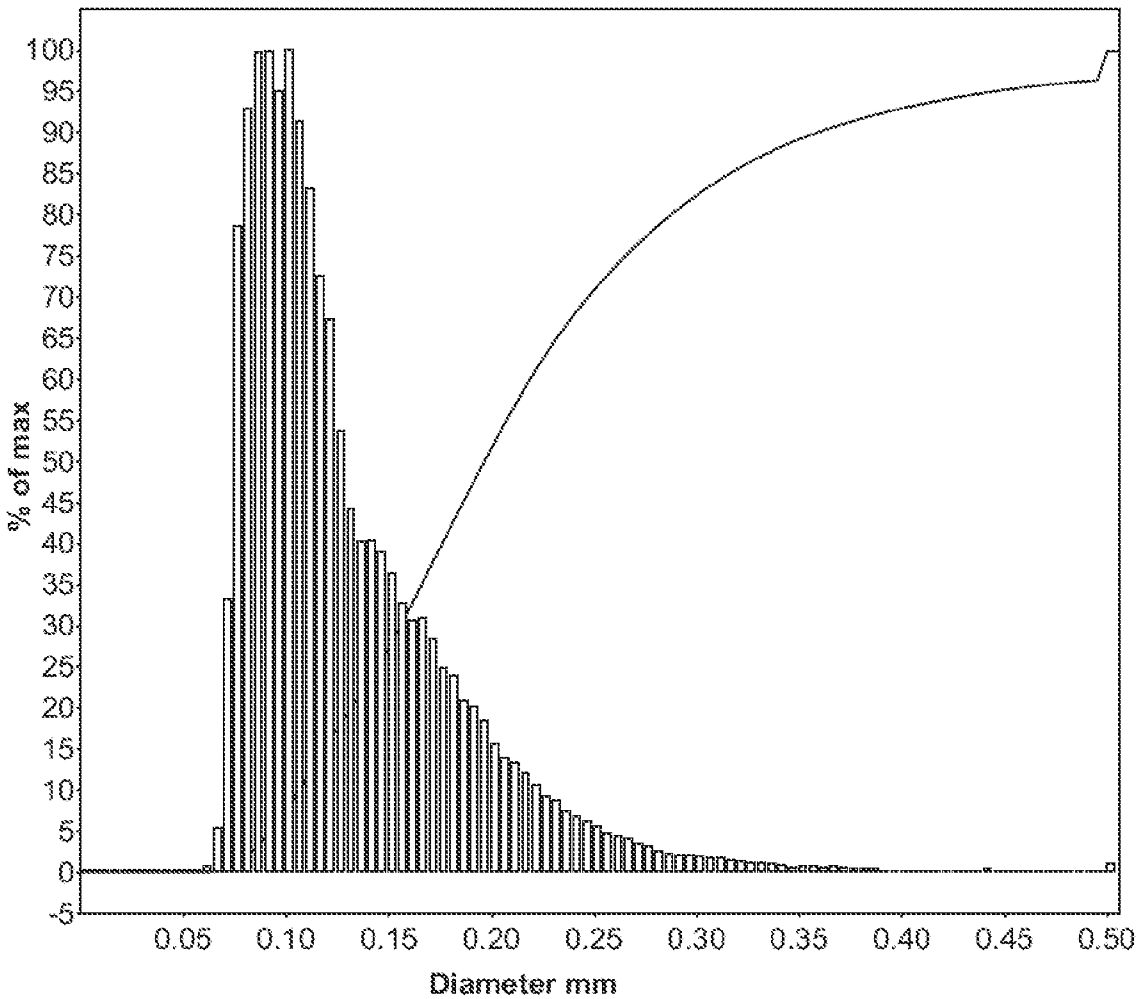

FIG. 117 shows the corresponding histogram of the droplet size.

Figure 118:
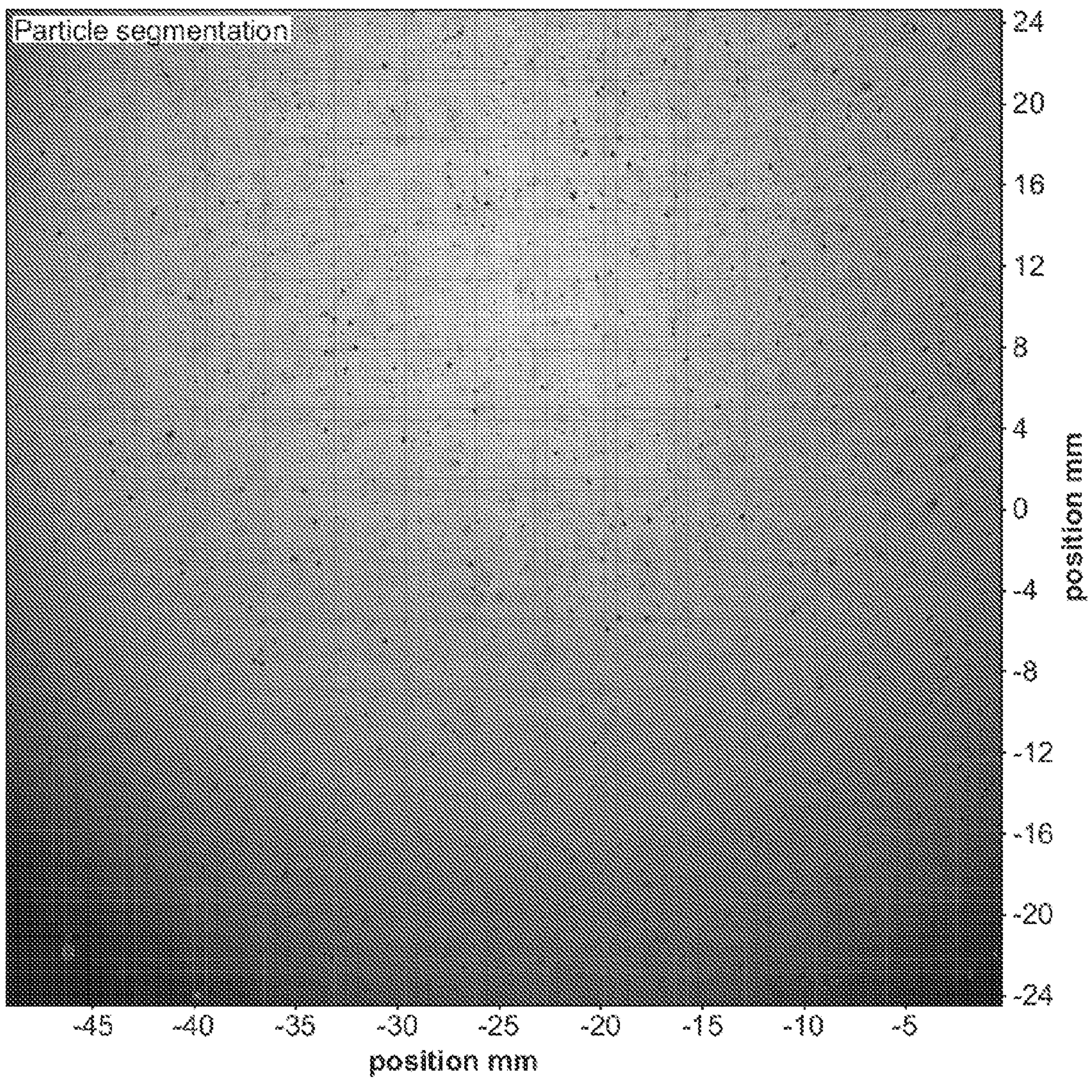

FIG. 118 shows one instantaneous image with recognized droplets from run 3.

Figure 119:
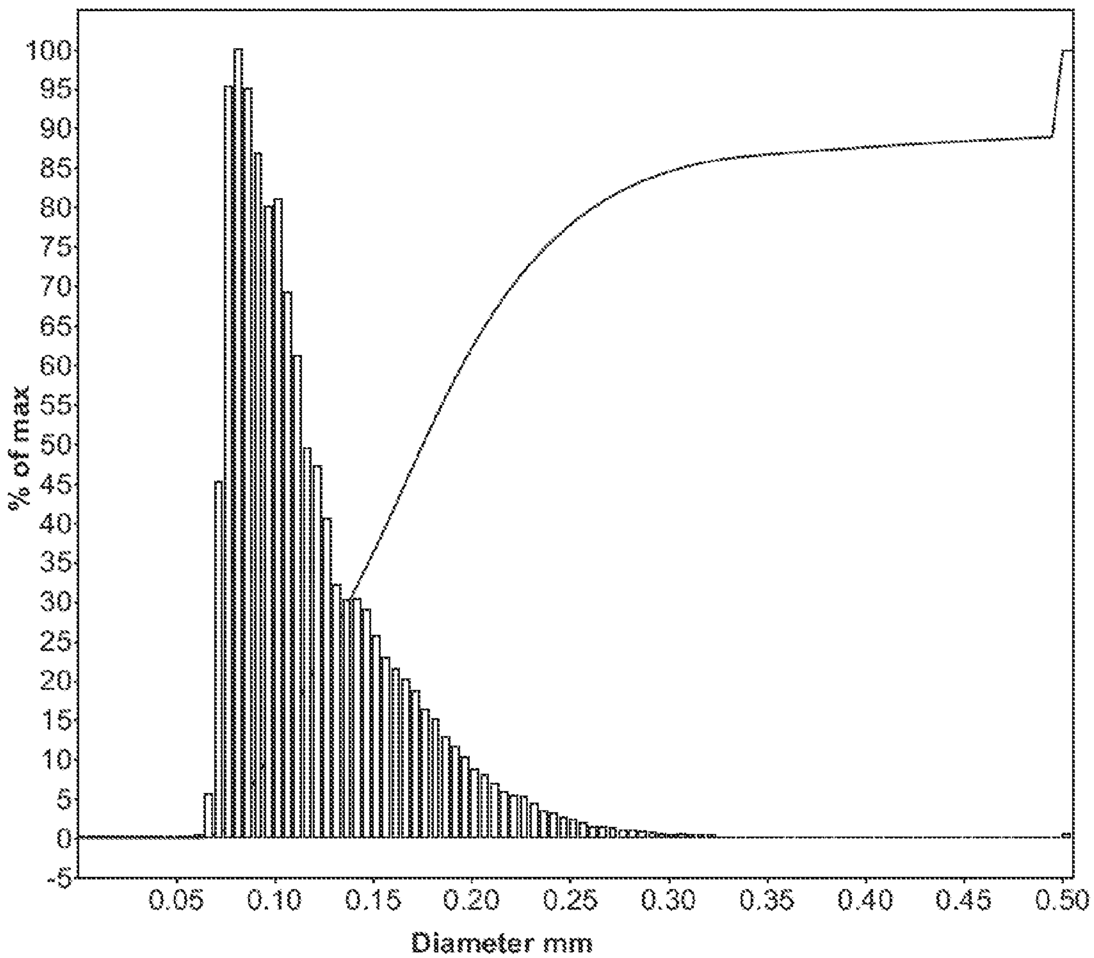

FIG. 119 shows a corresponding histogram of the droplet size from run 3.

Figure 120:
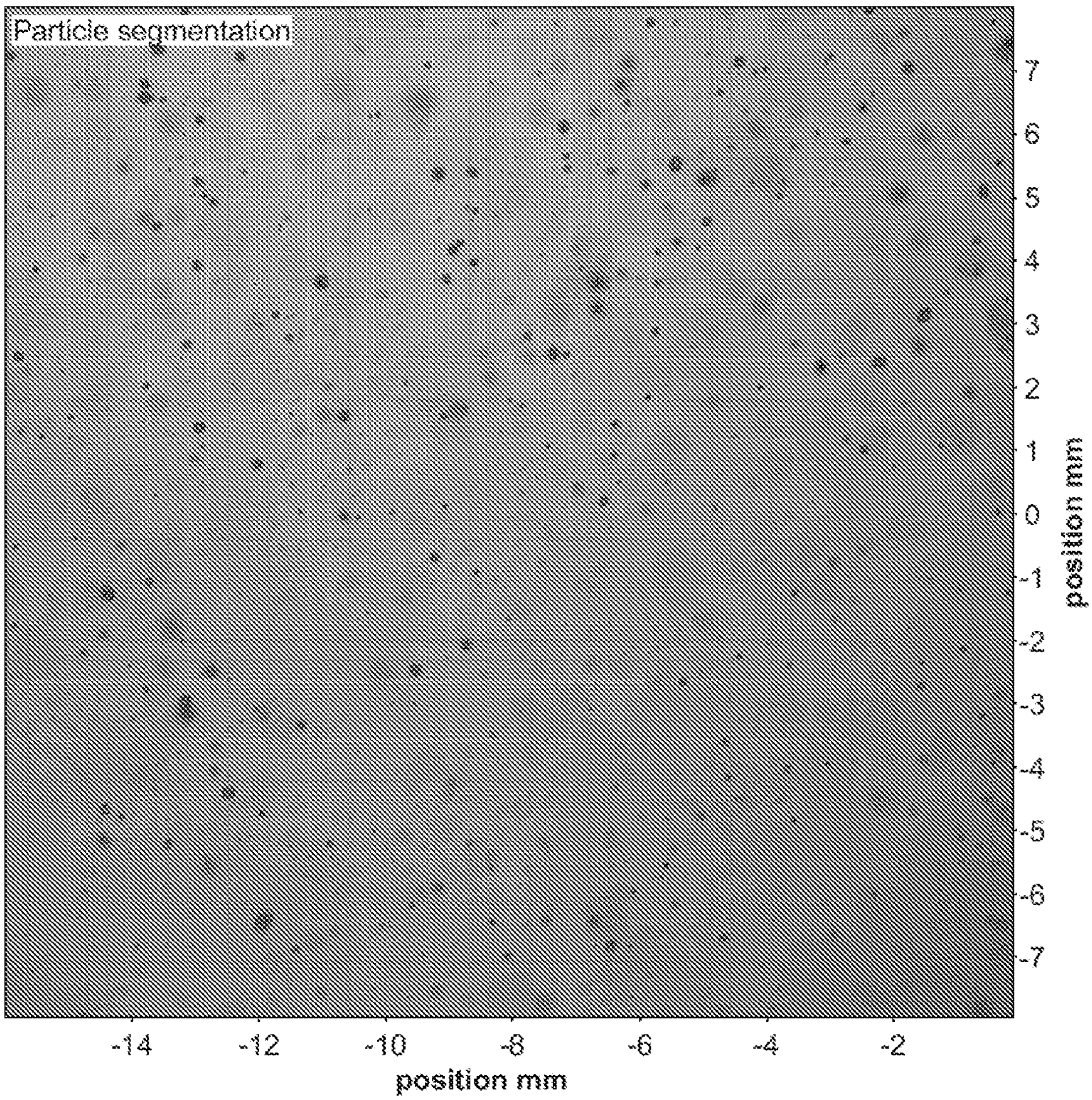

FIG. 120 shows one instantaneous image with recognized droplets of run 20.

Figure 121:
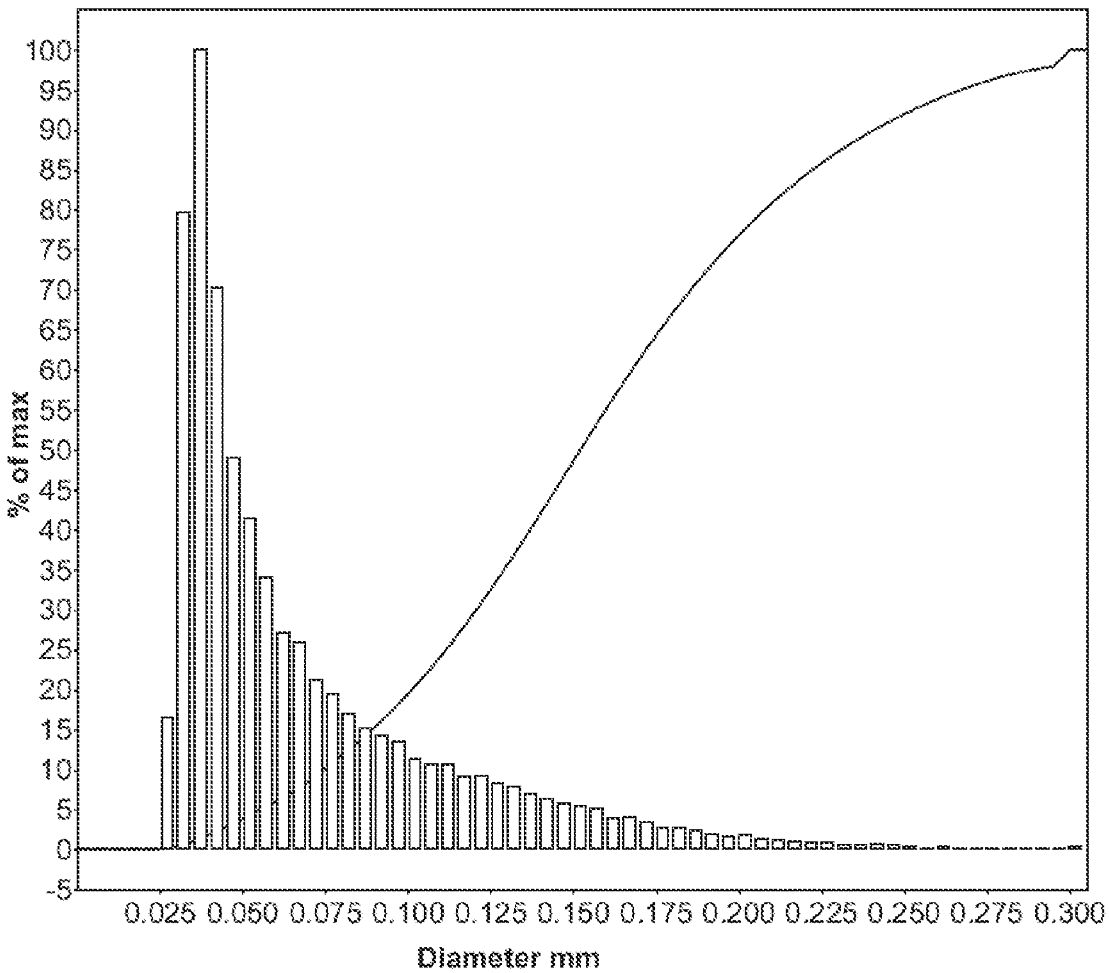

FIG. 121 shows a histogram of the corresponding droplet size from run 20.

Figure 122A:
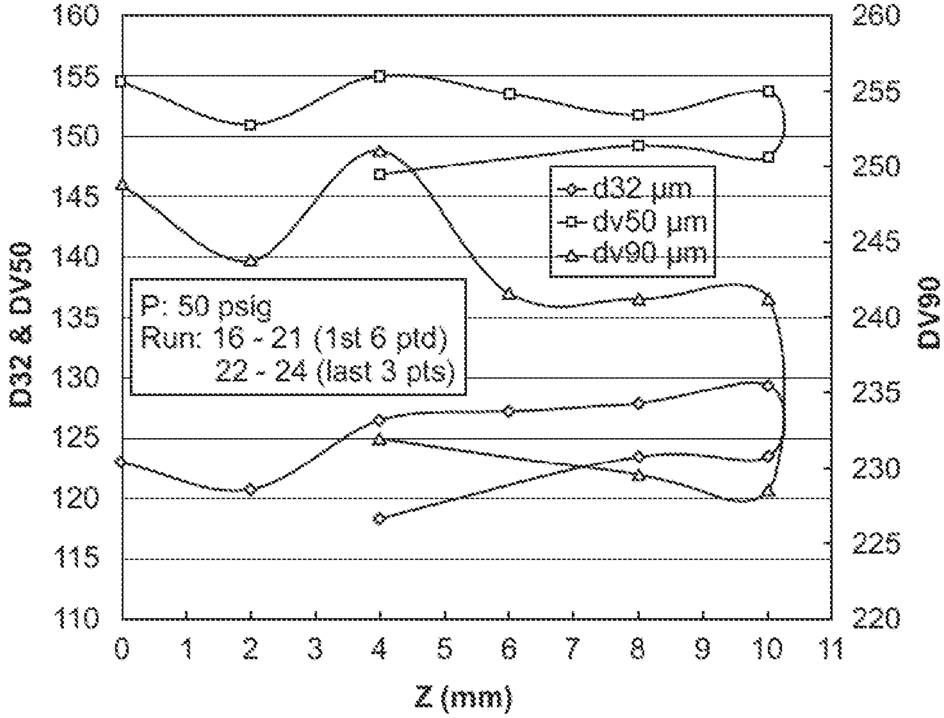
Figure 122B:
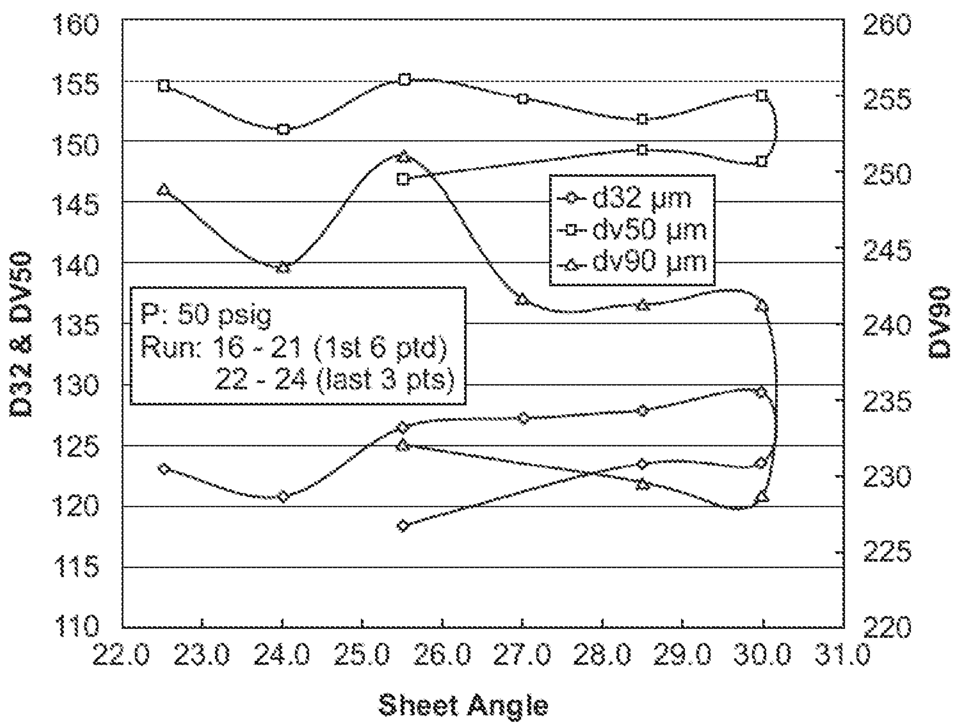

FIG. 122A plots droplet size distribution along the z axis for runs 16-21 and 22-24 in terms of mm. FIG. 122B plots this data in terms of sheet angle.

Figure 123A:
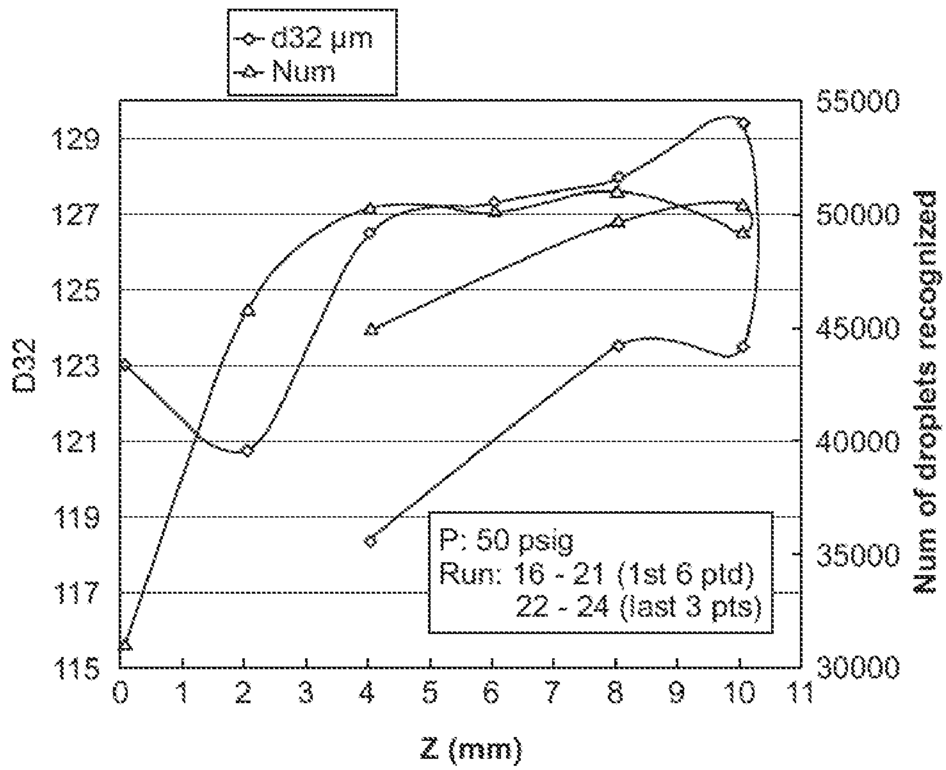

FIG. 123A shows the number of droplets recognized at each z location of runs 16 to 24.

Figure 123B:
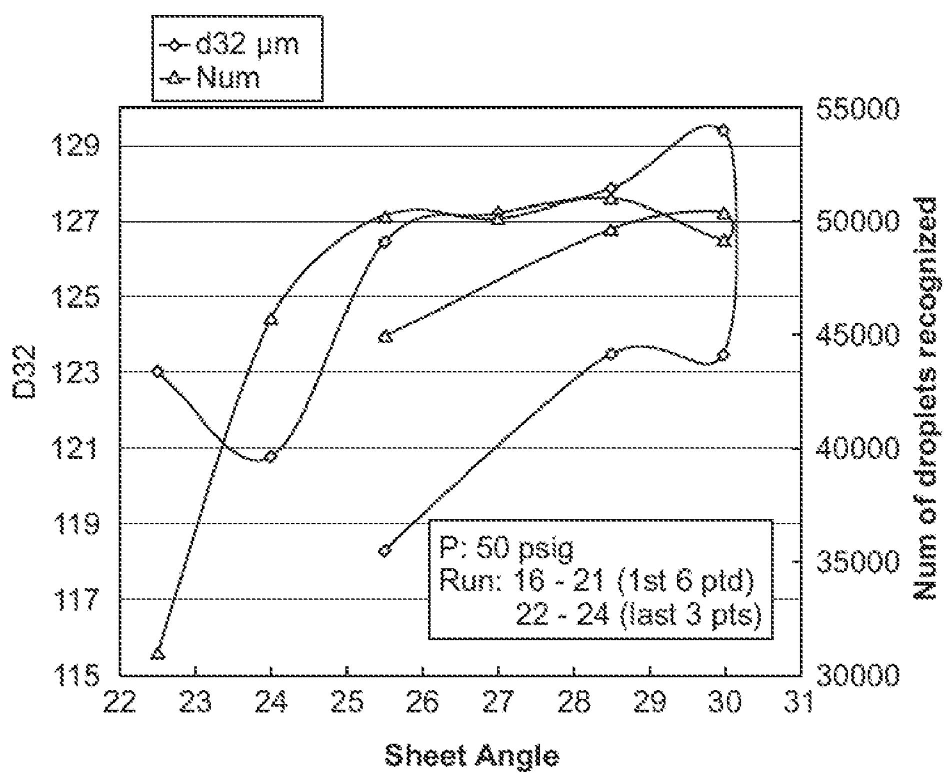

FIG. 123B shows the same data in terms of sheet angle.

Figure 124:
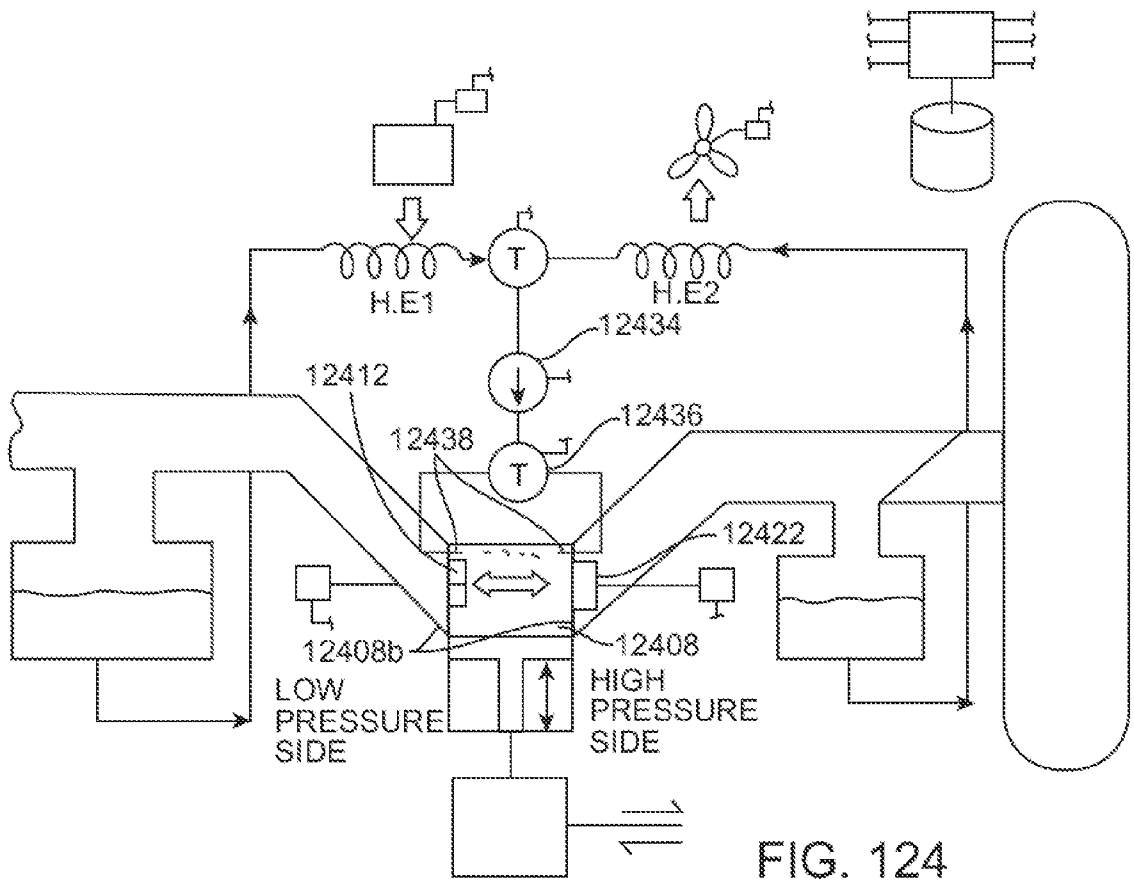

FIG. 124 is a simplified schematic view of an compressed gas energy storage and recovery system employing liquid injection according to an embodiment of the present invention.

Figure 124A:
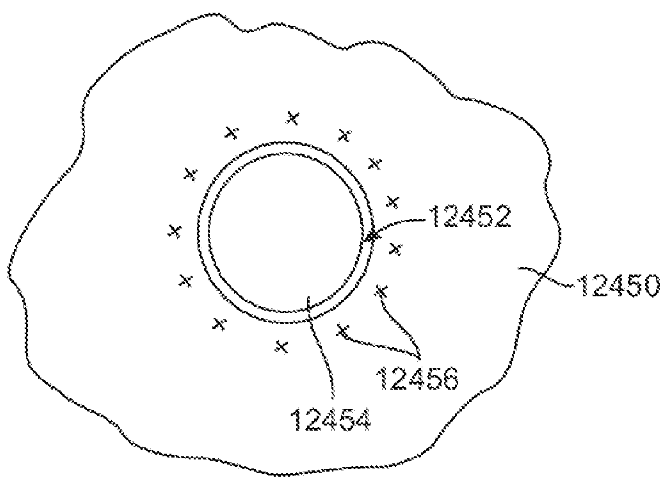

FIG. 124A shows a view of a chamber wall having a valve and sprayers according to an embodiment of the present invention.

Figure 125:
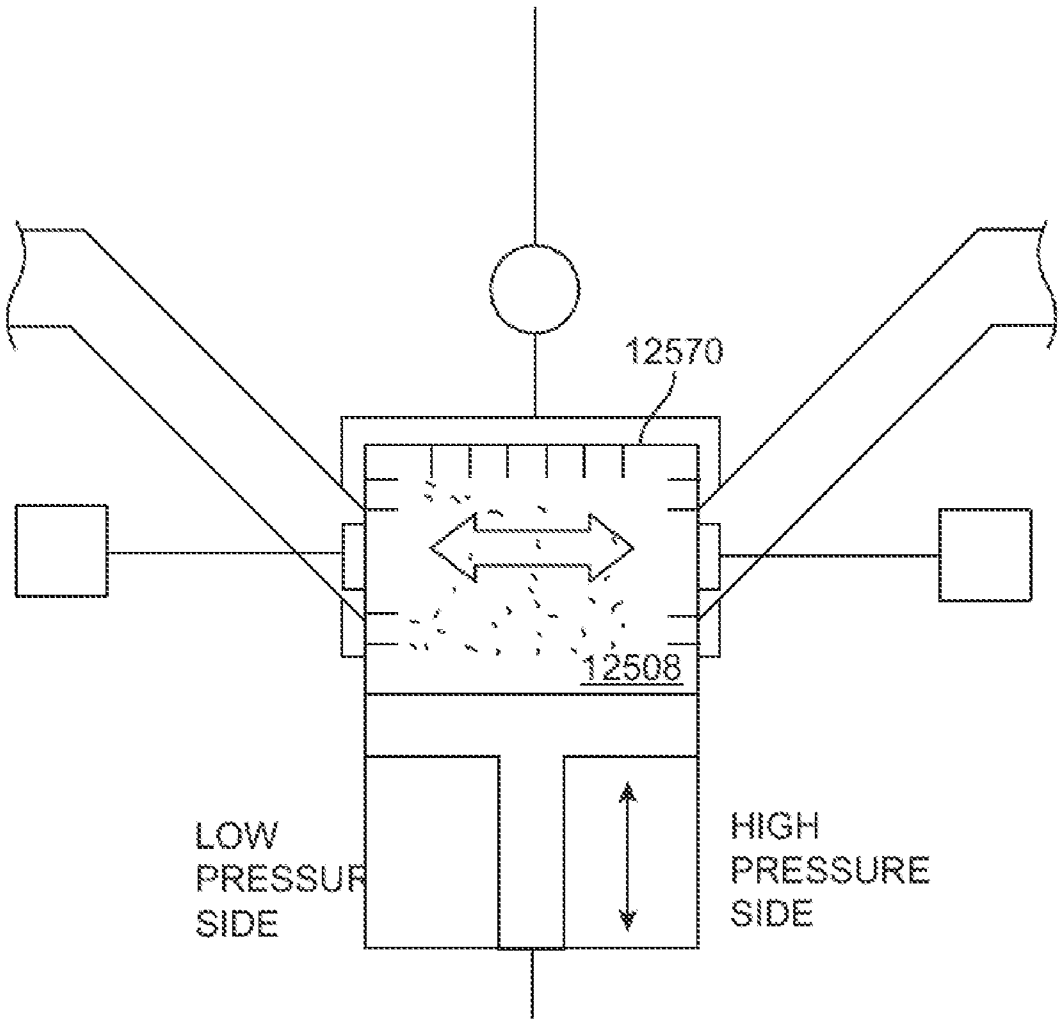

FIG. 125 is a simplified schematic view of an compressed gas energy storage and recovery system employing liquid injection according to an embodiment of the present invention.

Figure 126:
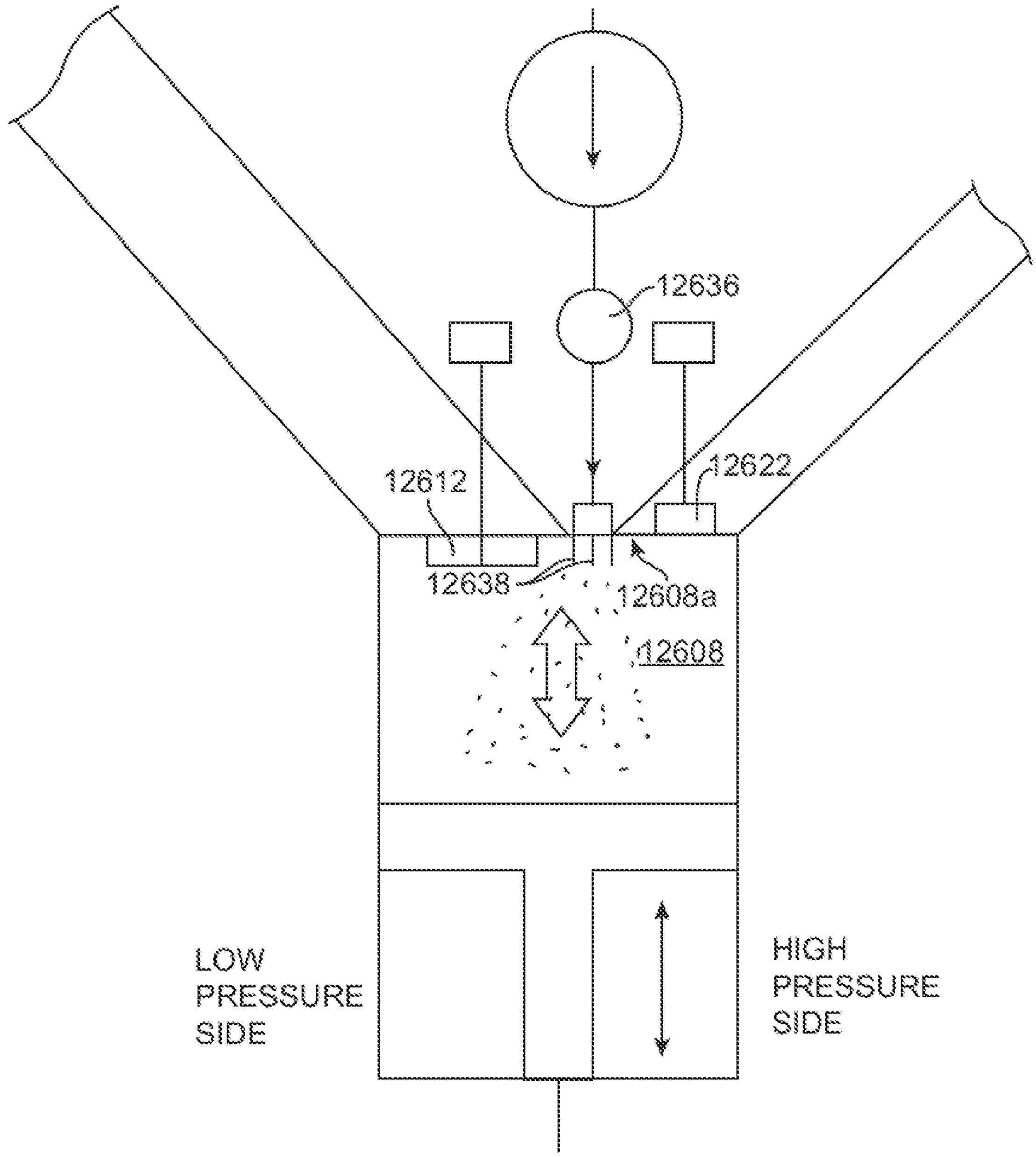

FIG. 126 is a simplified enlarged view of a compression or expansion chamber having sprayers for direct injection of liquid according to an embodiment of the present invention.

Figure 127:
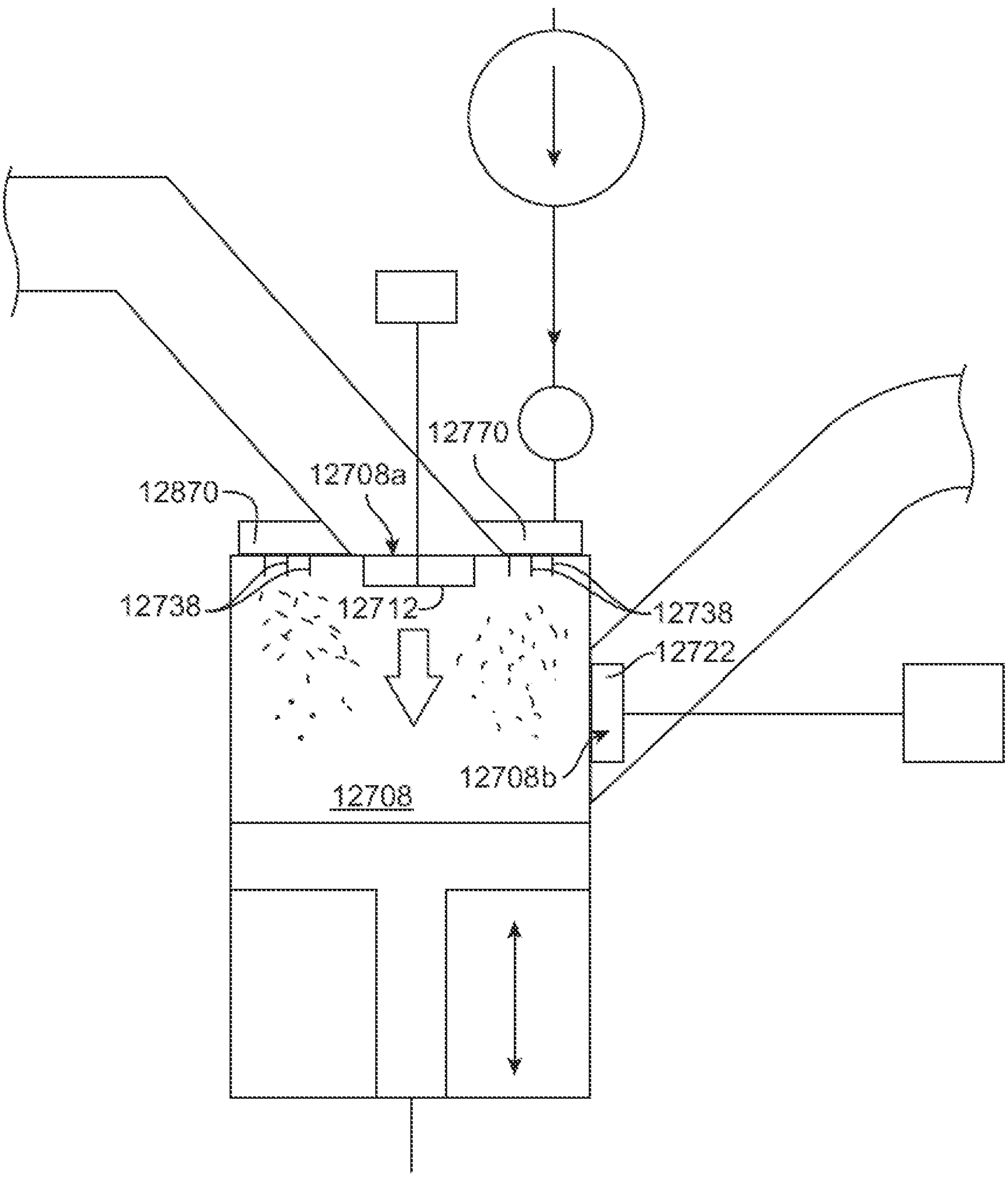

FIG. 127 is a simplified enlarged view of a compression or expansion chamber having sprayers for direct injection of liquid according to an embodiment of the present invention.

Figure 128:
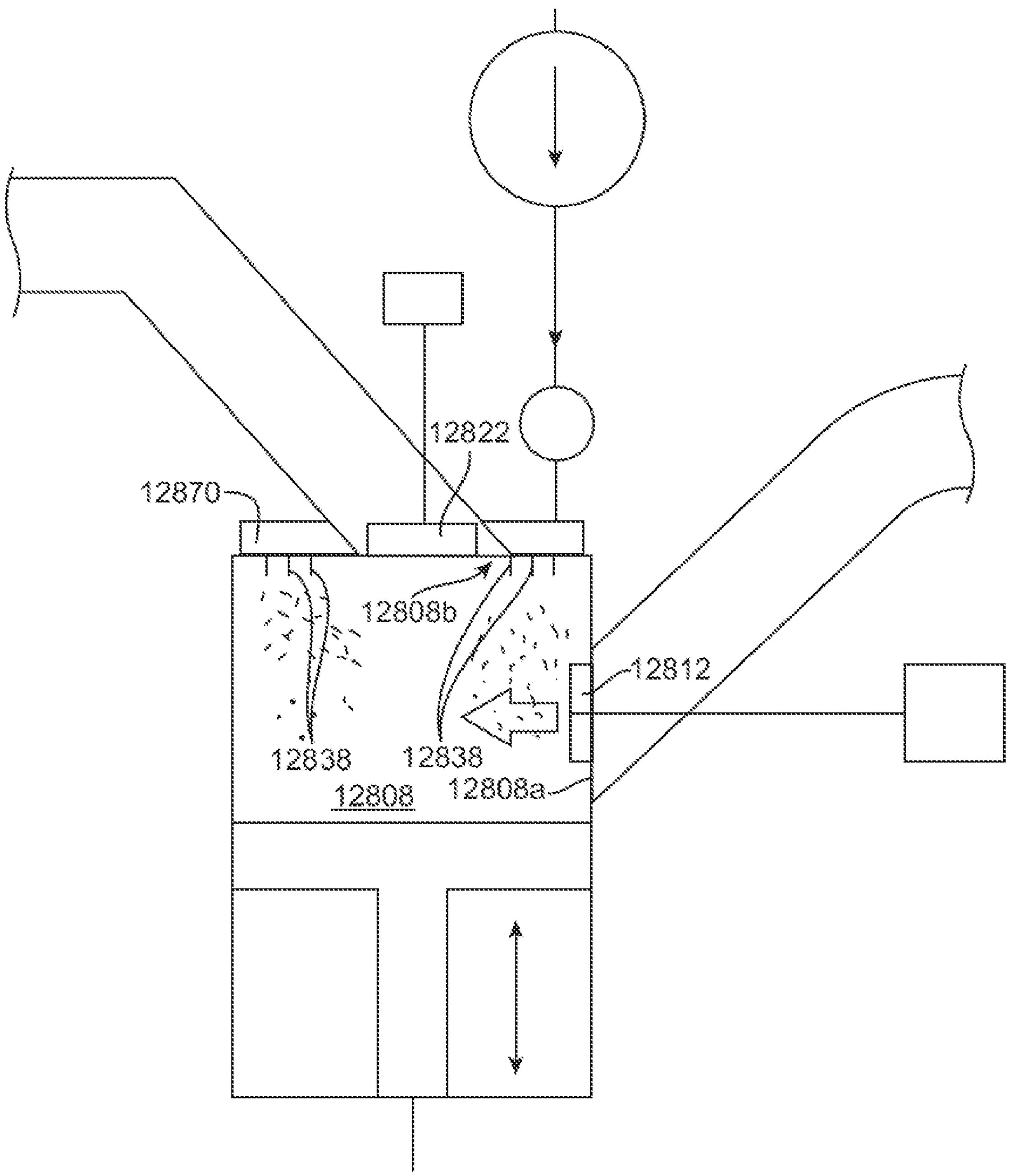

FIG. 128 is a simplified enlarged view of a compression or expansion chamber having sprayers for direct injection of liquid according to an embodiment of the present invention.

Figure 129:
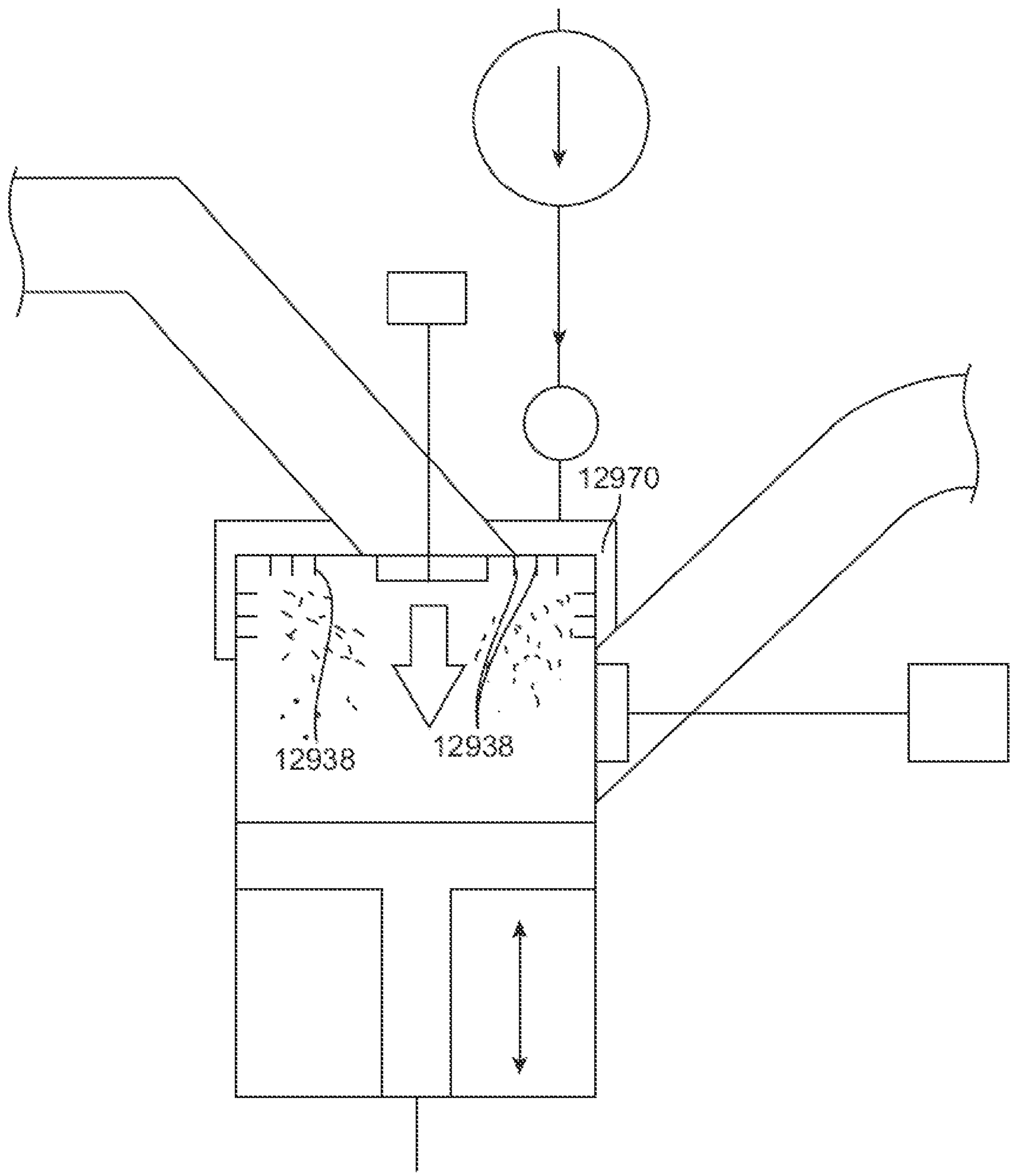

FIG. 129 is a simplified enlarged view of a compression or expansion chamber having sprayers for direct injection of liquid according to an embodiment of the present invention.

Figure 130A:
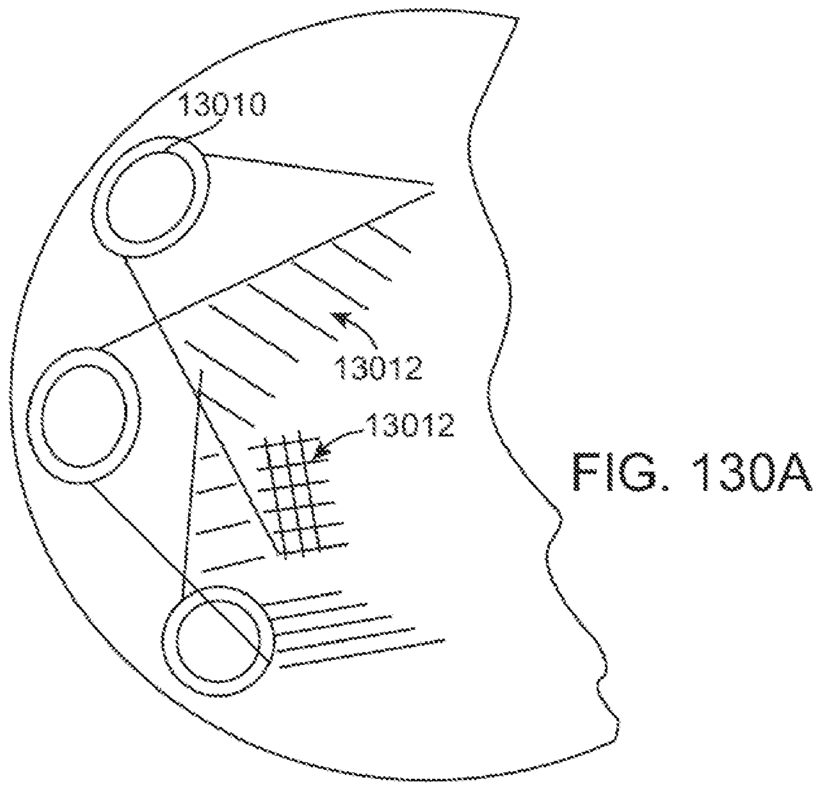

FIG. 130A shows an embodiment of a spray nozzle positioned in a cylinder head according to the present invention.

Figure 130B:
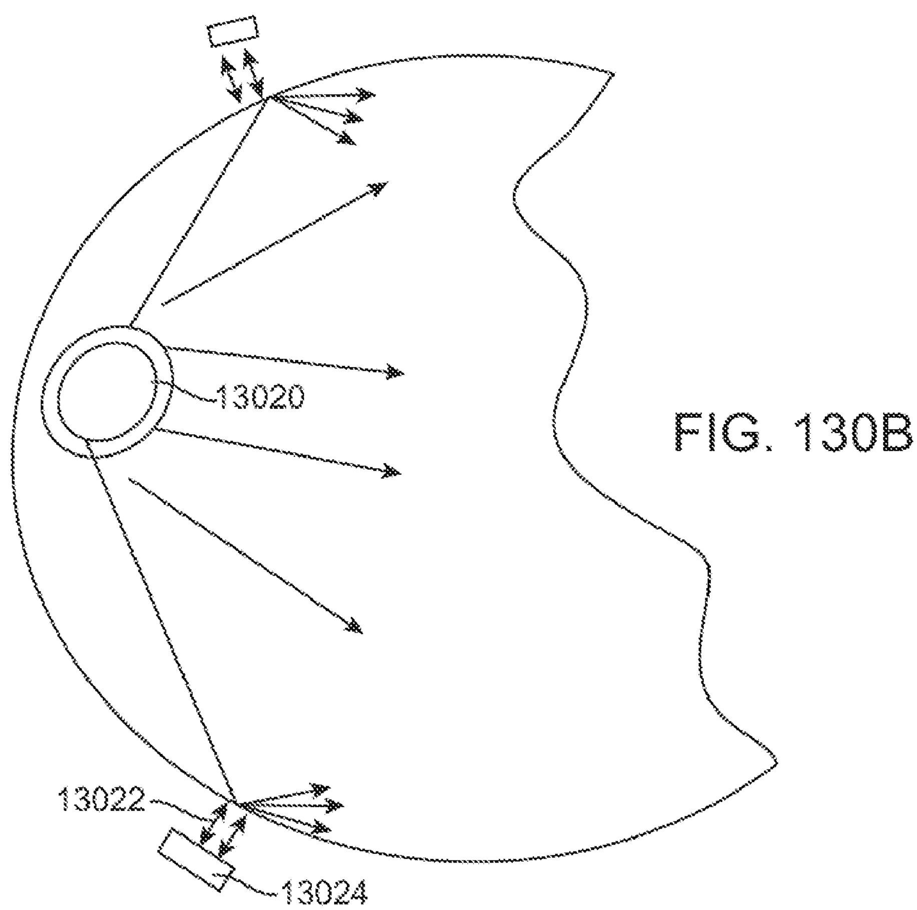

FIG. 130B shows an alternative embodiment of a spray nozzle positioned in a cylinder head according to the present invention.

Figure 131:
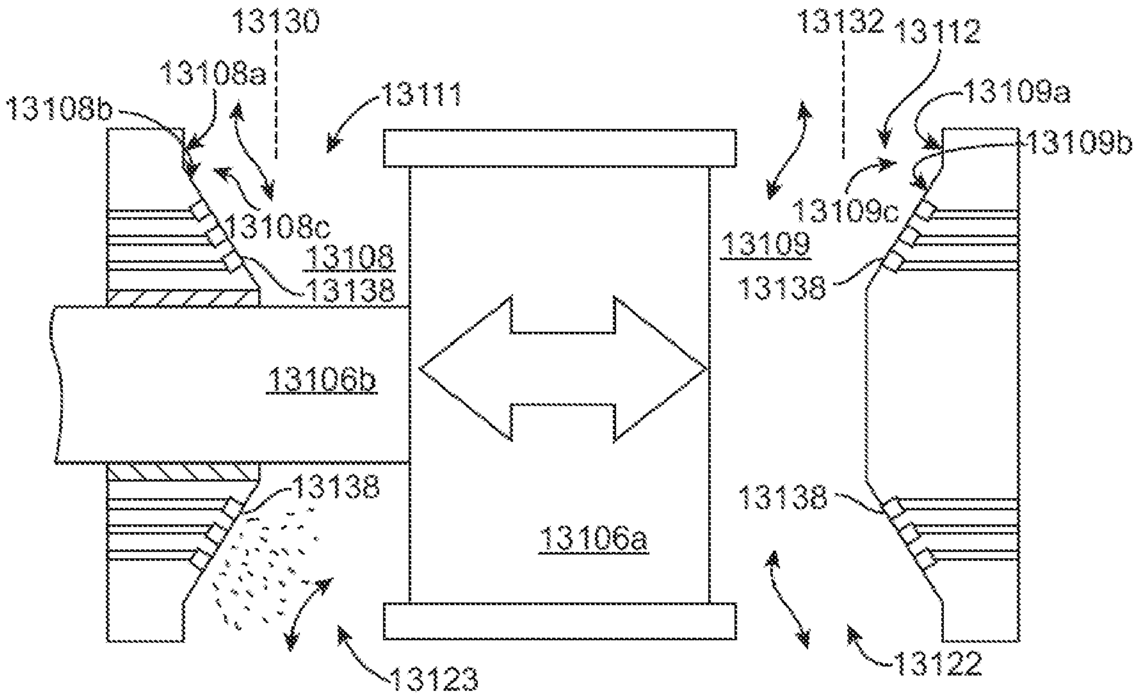

FIG. 131 shows an embodiment of an apparatus utilizing liquid injection having a complex chamber profile.

Figure 132:
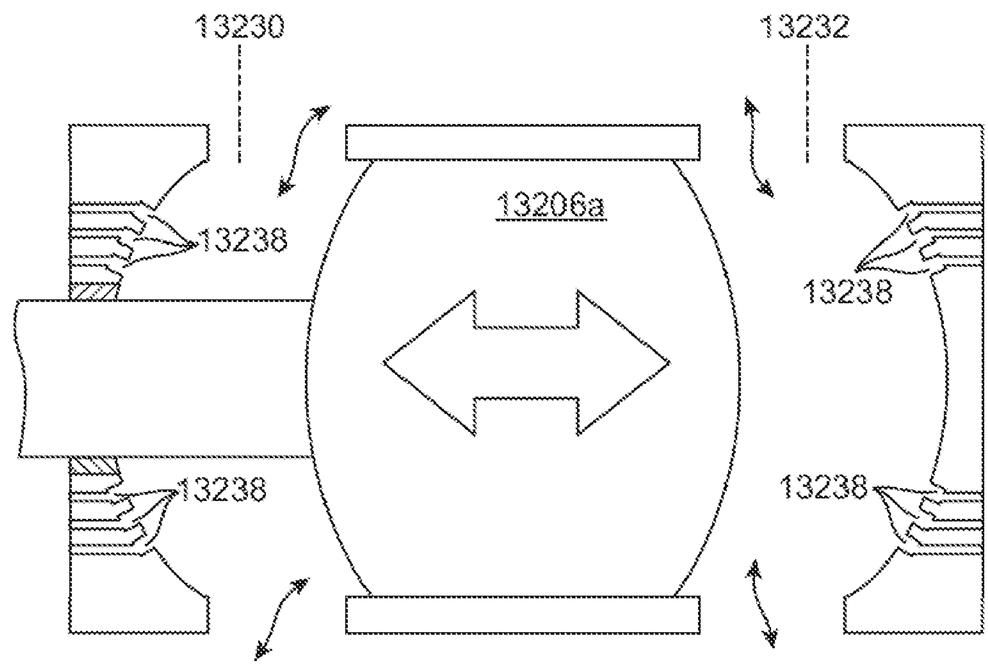

FIG. 132 shows another embodiment of an apparatus utilizing liquid injection having a complex chamber profile.

FIGS. 133A-G show views of an alternative embodiment of a nozzle design.

Figure 134A:
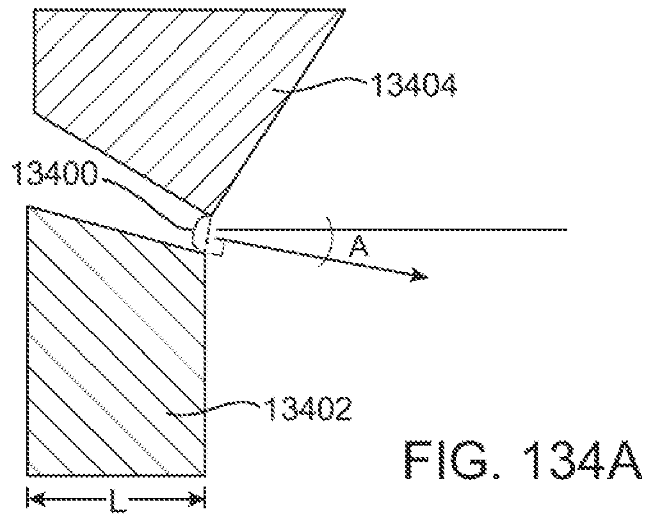
Figure 134B:
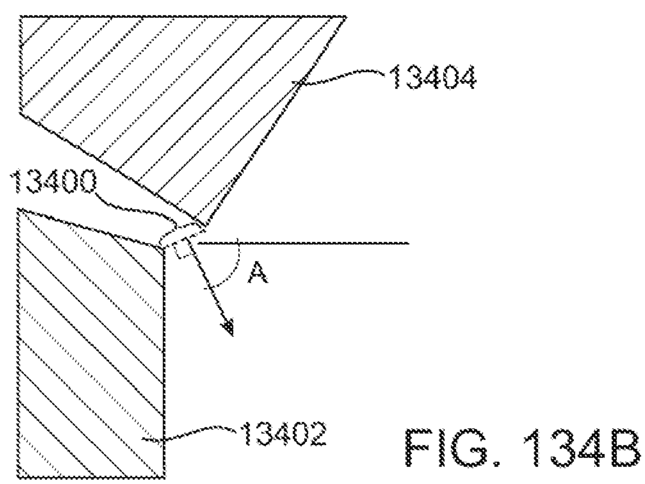
Figure 134C:
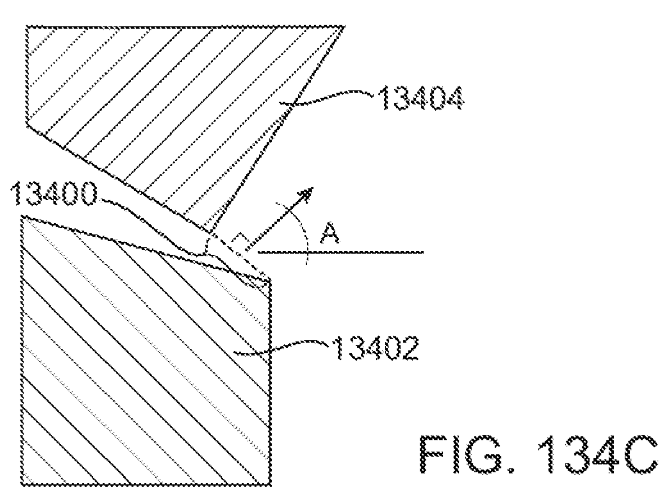

FIGS. 134A-C show views of various embodiments of nozzle designs.

FIG. 135A-E show the design of a compression or expansion apparatus having tuned resonance characteristics.

Figure 136:
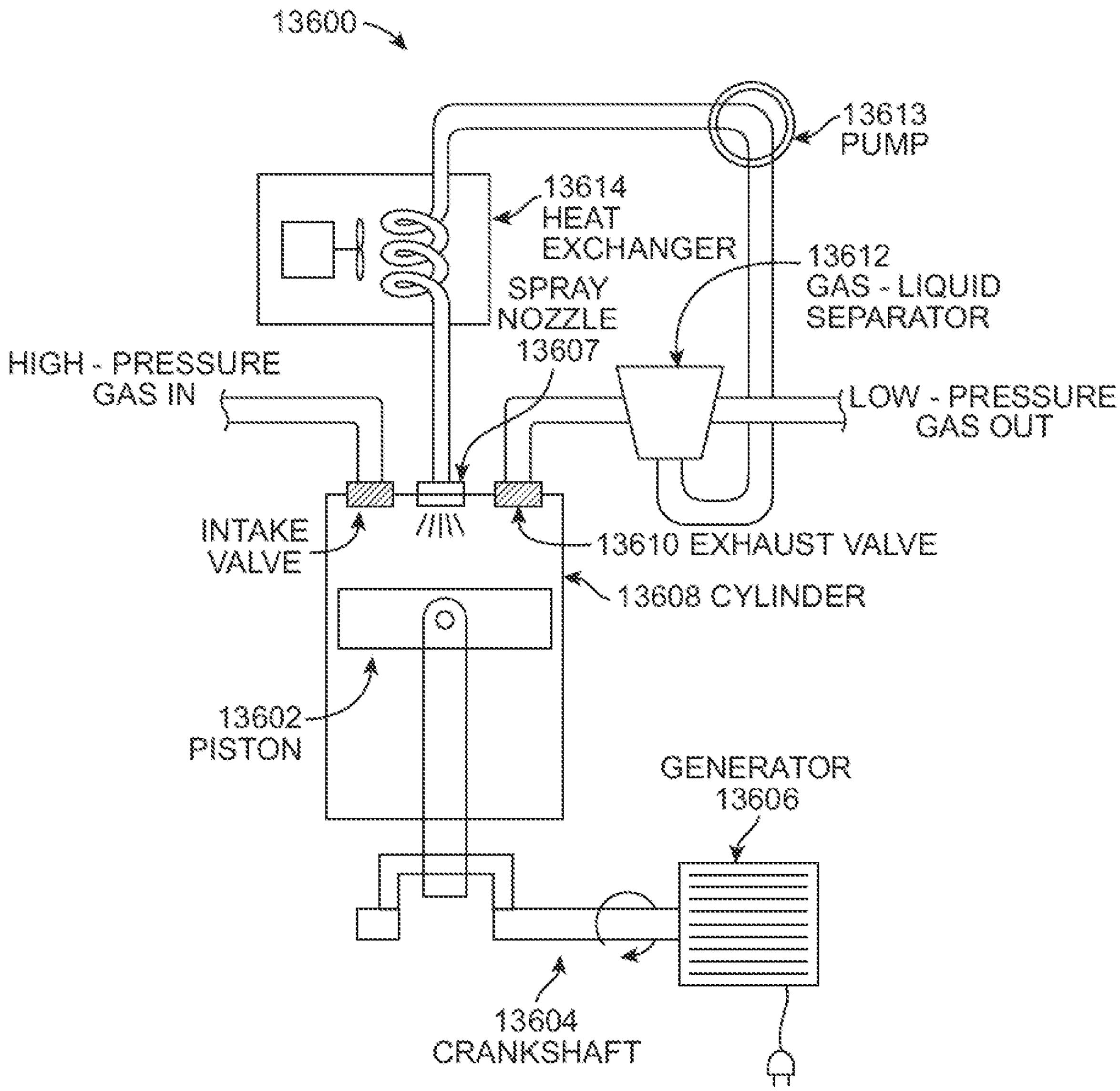

FIG. 136 shows an embodiment of an active regulator apparatus to extract power.

Figure 137:
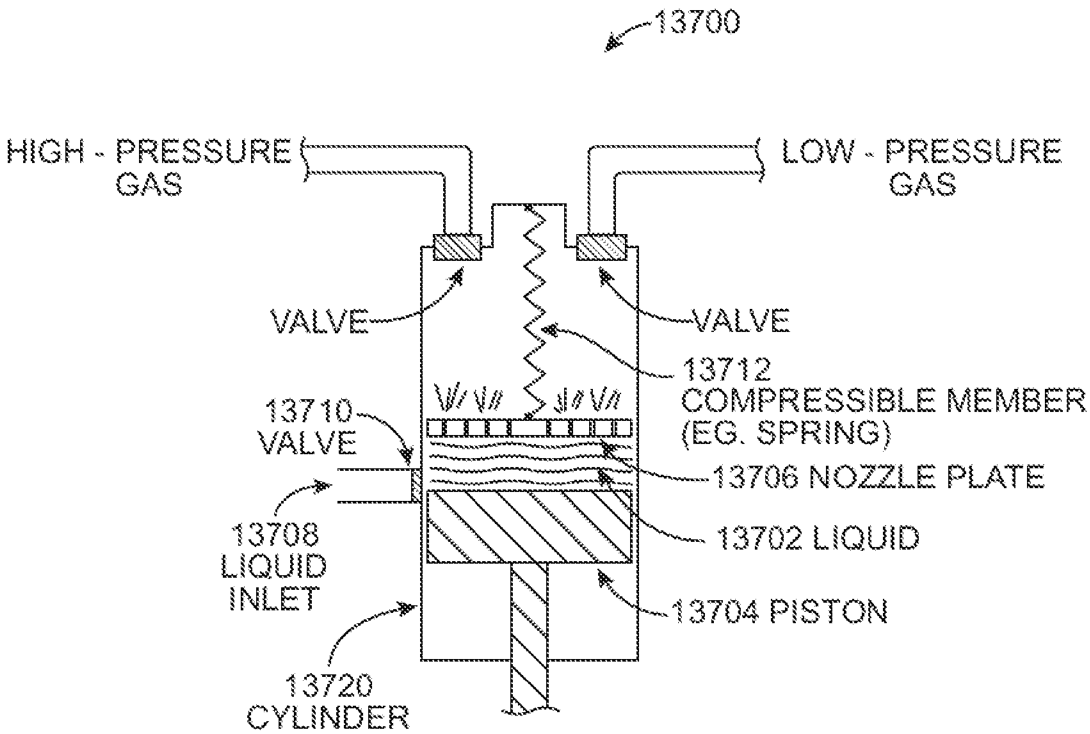

FIG. 137 shows an embodiment of an apparatus having an internal spray generation mechanism.

Figure 138:
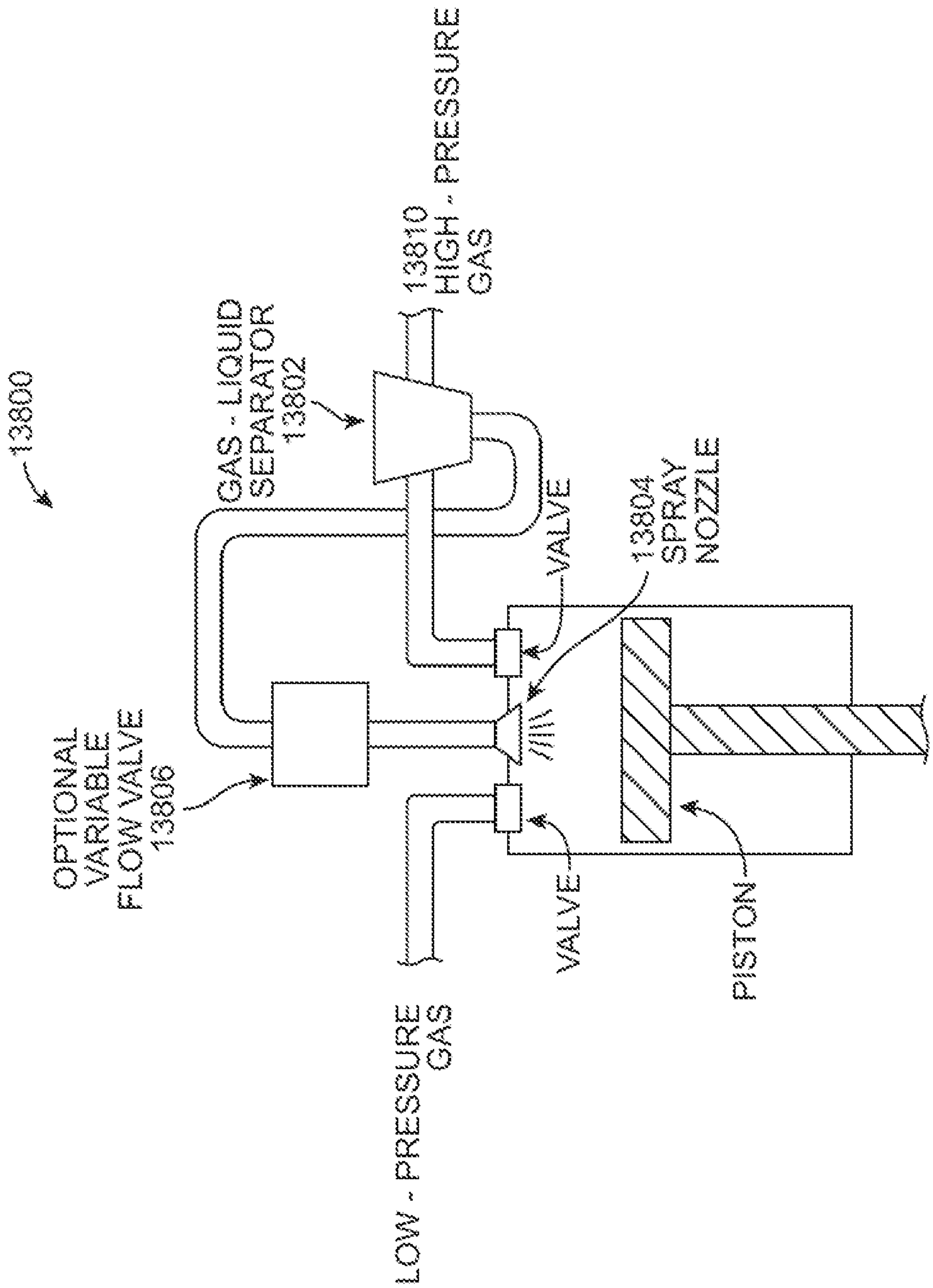

FIG. 138 shows an embodiment of an apparatus using an internal high pressure to pump liquid through a spray nozzle.

Figure 139:
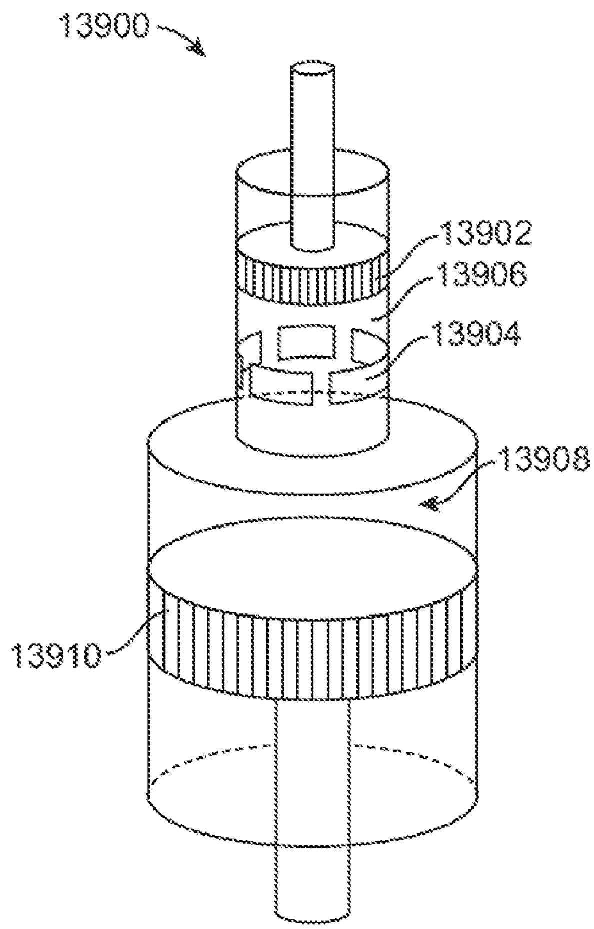

FIG. 139 shows an embodiment of an apparatus using a passive port valve with a piston actuator.

While certain drawings and systems depicted herein may be configured using standard symbols, the drawings have been prepared in a more general manner to reflect the variety of implementations that may be realized from different embodiments.

DETAILED DESCRIPTION OF THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention. It will be noted here that for a better understanding, like components are designated by like reference numerals throughout the various figures.

Single-Stage System

Figure 1:
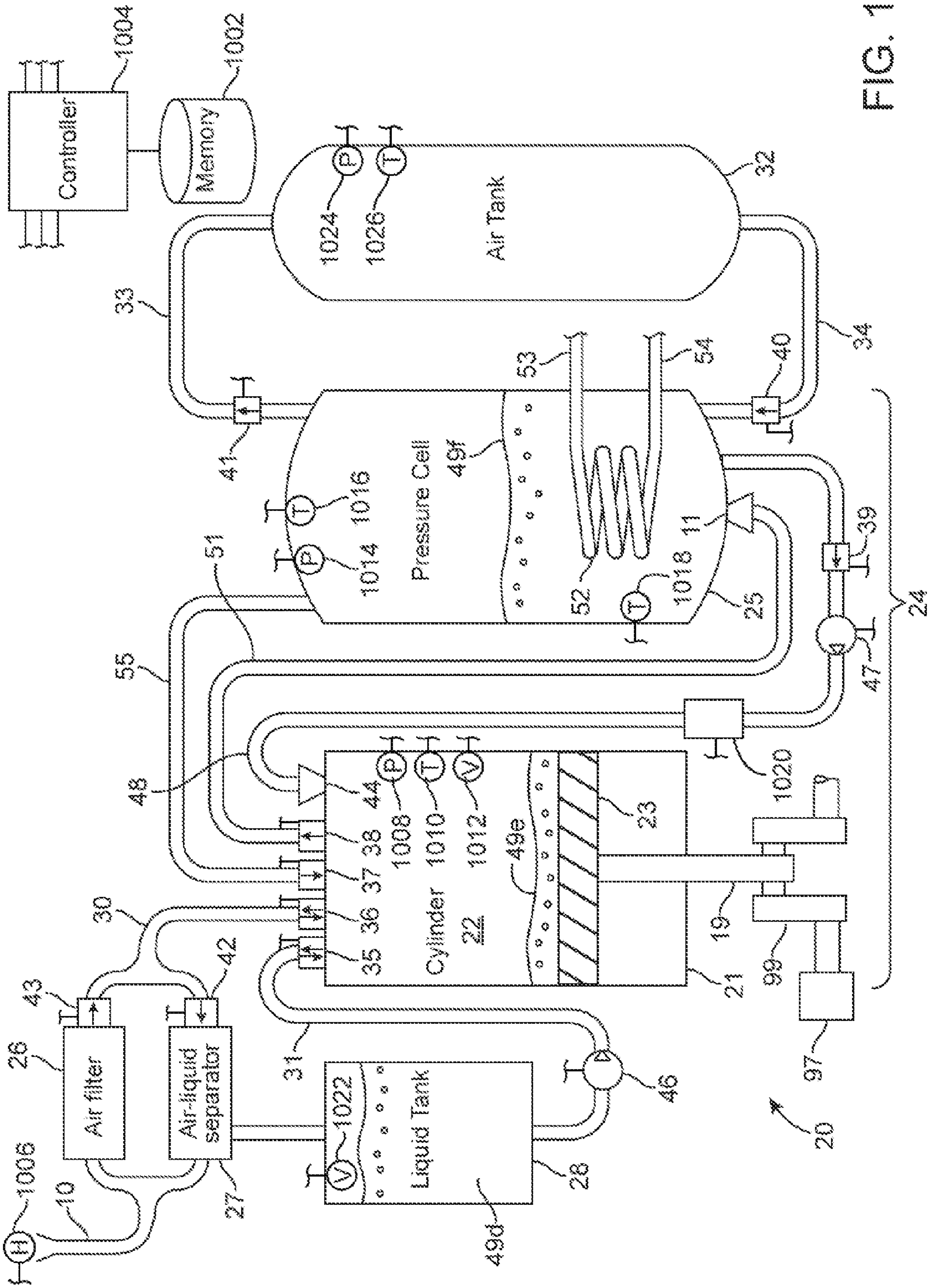
FIG. 1 is a schematic representation of the first embodiment of a compressed air energy storage system in accordance with the present invention, that is a single-stage, single-acting energy storage system using liquid mist to effect heat exchange.

FIG. 1 depicts the simplest embodiment of the compressed air energy storage system 20 of the present invention, and illustrates many of the important principles. Briefly, some of these principles which improve upon current compressed air energy storage system designs include mixing a liquid with the air to facilitate heat exchange during compression and expansion, thereby improving the efficiency of the process, and applying the same mechanism for both compressing and expanding air. Lastly, by controlling the valve timing electronically, the highest possible work output from a given volume of compressed air can be obtained.

As best shown in FIG. 1, the energy storage system 20 includes a cylinder device 21 defining a chamber 22 formed for reciprocating receipt of a piston device 23 or the like therein. The compressed air energy storage system 20 also includes a pressure cell 25 which when taken together with the cylinder device 21, as a unit, form a one stage reversible compression/expansion mechanism (i.e., a one-stage 24). There is an air filter 26, a liquid-air separator 27, and a liquid tank 28, containing a liquid 49*d* fluidly connected to the compression/expansion mechanism 24 on the low pressure side via pipes 30 and 31, respectively. On the high pressure side, an air storage tank or tanks 32 is connected to the pressure cell 25 via input pipe 33 and output pipe 34. A plurality of two-way, two position valves 35-43 are provided, along with two output nozzles 11 and 44. This particular embodiment also includes liquid pumps 46 and 47. It will be appreciated, however, that if the elevation of the liquid tank 28 is higher than that of the cylinder device 21, water will feed into the cylinder device by gravity, eliminating the need for pump 46.

Figure 8:
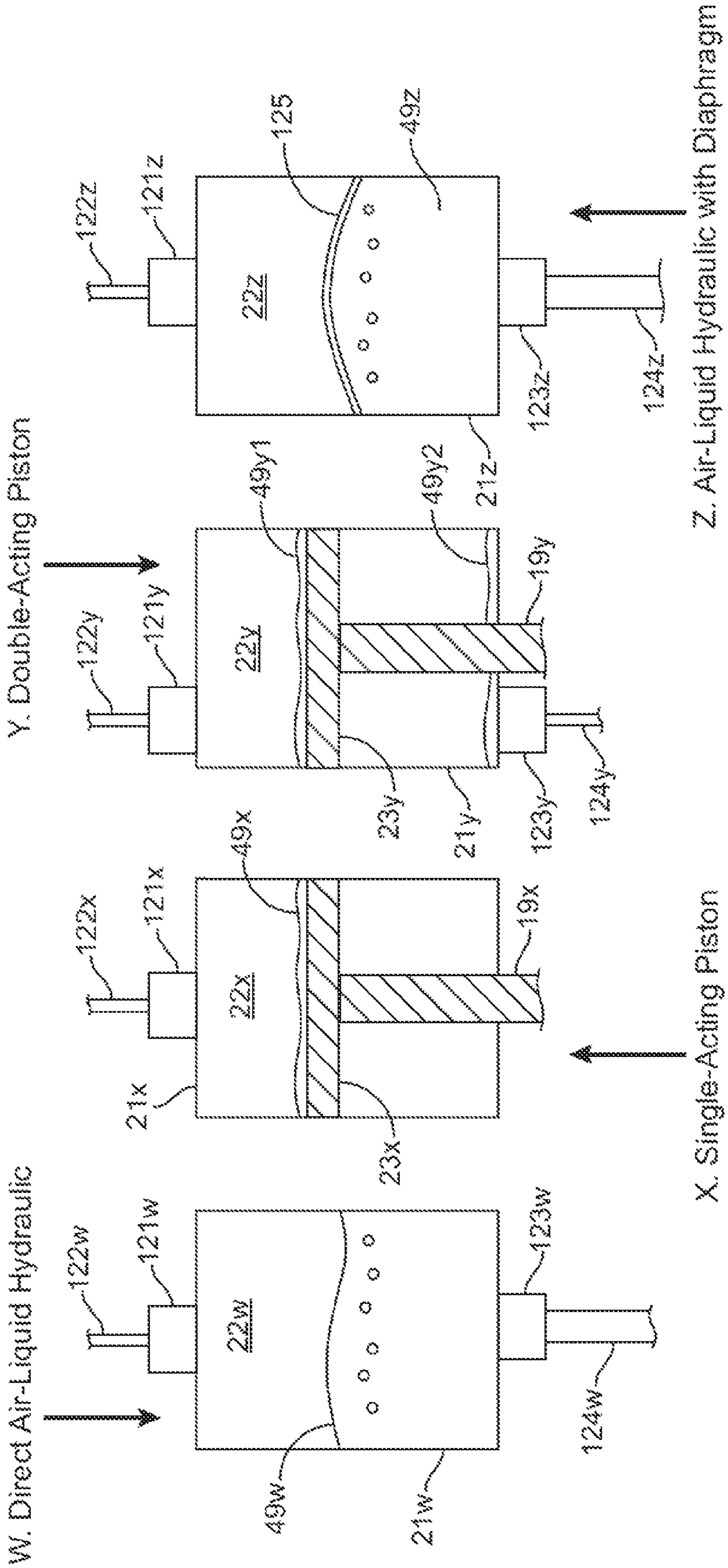
FIG. 8 is a schematic representation of four methods for conveying power into or out of the system.

Briefly, atmospheric air enters the system via pipe 10, passes through the filter 26 and enters the cylinder chamber 22 of cylinder device 21, via pipe 30, where it is compressed by the action of piston 23, by hydraulic pressure, or by other mechanical approaches (see FIG. 8). Before compression begins, a liquid mist is introduced into the chamber 22 of the cylinder device 21 using an atomizing nozzle 44, via pipe 48 from the pressure cell 25. This liquid may be water, oil, or any appropriate liquid 49*f* from the pressure cell having sufficient high heat capacity properties. The system preferably operates at substantially ambient temperature, so that liquids capable of withstanding high temperatures are not required. The primary function of the liquid mist is to absorb the heat generated during compression of the air in the cylinder chamber. The predetermined quantity of mist injected into the chamber during each compression stroke, thus, is that required to absorb all the heat generated during that stroke. As the mist condenses, it collects as a body of liquid 49*e* in the cylinder chamber 22.

The compressed air/liquid mixture is then transferred into the pressure cell 25 through outlet nozzle 11, via pipe 51. In the pressure cell 25, the transferred mixture exchanges the captured heat generated by compression to a body of liquid 49*f* contained in the cell. The air bubbles up through the liquid and on to the top of the pressure cell, and then proceeds to the air storage tank 32, via pipe 33.

The expansion cycle is essentially the reverse process of the compression cycle. Air leaves the air storage tank 32, via pipe 34, bubbling up through the liquid 49*f* in the pressure cell 25, enters the chamber 22 of cylinder device 21, via pipe 55, where it drives piston 23 or other mechanical linkage. Once again, liquid mist is introduced into the cylinder chamber 22, via outlet nozzle 44 and pipe 48, during expansion to keep a substantially constant temperature in the cylinder chamber during the expansion process. When the air expansion is complete, the spent air and mist pass through an air-liquid separator 27 so that the separated liquid can be reused. Finally, the air is exhausted to the atmosphere via pipe 10.

The liquid 49*f* contained in the pressure cell 25 is continually circulated through the heat exchanger 52 to remove the heat generated during compression or to add the heat to the chamber to be absorbed during expansion. This circulating liquid in turn exchanges heat with a thermal reservoir external to the system (e.g. the atmosphere, a pond, etc.) via a conventional air or water-cooled heat exchanger (not shown in this figure, but shown as 12 in FIG. 3). The circulating liquid is conveyed to and from that external heat exchanger via pipes 53 and 54 communicating with internal heat exchanger 52.

The apparatus of FIG. 1 further includes a controller/processor 1004 in electronic communication with a computer-readable storage device 1002, which may be of any design, including but not limited to those based on semiconductor principles, or magnetic or optical storage principles. Controller 1004 is shown as being in electronic communication with a universe of active elements in the system, including but not limited to valves, pumps, chambers, nozzles, and sensors. Specific examples of sensors utilized by the system include but are not limited to pressure sensors (P) 1008, 1014, and 1024, temperature sensors (T) 1010, 1018, 1016, and 1026, humidity sensor (H) 1006, volume sensors (V) 1012 and 1022, and flow rate sensor 1020.

As described in detail below, based upon input received from one or more system elements, and also possibly values calculated from those inputs, controller/processor 4 may dynamically control operation of the system to achieve one or more objectives, including but not limited to maximized or controlled efficiency of conversion of stored energy into useful work; maximized, minimized, or controlled power output; an expected power output; an expected output speed of a rotating shaft in communication with the piston; an expected output torque of a rotating shaft in communication with the piston; an expected input speed of a rotating shaft in communication with the piston; an expected input torque of a rotating shaft in communication with the piston; a maximum output speed of a rotating shaft in communication with the piston; a maximum output torque of a rotating shaft in communication with the piston; a minimum output speed of a rotating shaft in communication with the piston; a minimum output torque of a rotating shaft in communication with the piston; a maximum input speed of a rotating shaft in communication with the piston; a maximum input torque of a rotating shaft in communication with the piston; a minimum input speed of a rotating shaft in communication with the piston; a minimum input torque of a rotating shaft in communication with the piston; or a maximum expected temperature difference of air at each stage.

The compression cycle for this single-stage system proceeds as follows:

| | Step | | | | |
|---|---|---|---|---|---|
| | 1 | 2 | 3 | 4 | 5 |
| Description | Add liquid to cylinder device | Add mist to cylinder device | Compress | Move compressed air to pressure cell | Refill cylinder device |

-continued

| | Step | | | | |
|---|---|---|---|---|---|
| | 1 | 2 | 3 | 4 | 5 |
| Valve 35 | Open | Closed | Closed | Closed | Closed |
| Valve 36 | Open | Closed | Closed | Closed | Open |
| Valve 37 | Closed | Closed | Closed | Closed | Closed |
| Valve 38 | Closed | Closed | Closed | Open | Closed |
| Valve 39 | Closed | Open | Closed | Closed | Closed |
| Valve 40 | Closed | Closed | Closed | Closed | Closed |
| Valve 41 | Closed | Closed | Closed | Open | Closed |
| Valve 42 | Open | Closed | Closed | Closed | Closed |
| Valve 43 | Closed | Closed | Closed | Closed | Open |
| Pump 46 | On | Off | Off | Off | Off |
| Pump 47 | Off | On | Off | Off | Off |
| Piston 23 | Near bottom dead center (BDC) | Near BDC | At BDC at start of step | Between BDC and TDC | At TDC at start of step |

During step 1 of the compression cycle, liquid **49*d* is added to the chamber 22 of the cylinder device 21 from the liquid tank 28 (collecting as body of liquid 49*e*) such that, when the piston 23** reaches top dead center (TDC), the dead volume in the cylinder device is zero. This will only have to be done occasionally, so that this step is omitted on the great majority of cycles.

During step 2 of the compression cycle, liquid mist from pressure cell 25 is pumped, via pump 47, into the cylinder chamber 22, via pipe 48 and nozzle 44. The selected quantity of mist is sufficient to absorb the heat generated during the compression step (step 3). The volume fraction of liquid must sufficiently low enough that the droplets will not substantially fuse together, thus reducing the effective surface area available for heat exchange (that is, the interface between air and liquid). Typically, the pressure differential between the pressure cell 25 and the chamber 22 of the cylinder device 21 is sufficiently high so that the operation of pump 47 is not required.

During step 3 of the compression cycle, the piston 23 is driven upward by a crankshaft 99 coupled to a piston rod 19, by hydraulic pressure, or by some other mechanical structure (as shown in FIG. 8), compressing the air and mist contained in the cylinder chamber.

Step 4 of the compression cycle begins when the air pressure inside the cylinder chamber 22 is substantially equal to the pressure inside the pressure cell 25, at which point outlet valve 38 opens, allowing compressed air to flow from the cylinder chamber to the pressure cell. Because of the liquid added to the cylinder device during step 1 of the compression cycle, substantially all the air in the cylinder chamber can be pushed out during this step. The compressed air is introduced into the pressure cell 25 through an inlet nozzle 11, along with any entrained mist, creating fine bubbles so that the heat generated during compression will exchange with the liquid **49*f*** in the cell rapidly.

During step 5 of the compression cycle, the piston 23 is pulled down allowing low-pressure air to refill it, via valve 36 and pipe 30. The above table shows valve 39 as being closed during this step, and shows pump 47 as being off during this step 5. However, this is not required. In other embodiments valve 39 could be open and pump 47 could be on, during the step 5 such that mist is introduced into the cylinder chamber as it is refilled with air.

The expansion cycle for this single-stage system proceeds as follows:

| | Step | | | |
|---|---|---|---|---|
| | 1 | 2 | 3 | 4 |
| Description | Add liquid to cylinder device | Add compressed air and liquid mist to cylinder device | Expansion | Exhaust spent air |
| Valve 35 | Open | Closed | Closed | Closed |
| Valve 36 | Open | Closed | Closed | Open |
| Valve 37 | Closed | Open | Closed | Closed |
| Valve 38 | Closed | Closed | Closed | Closed |
| Valve 39 | Closed | Open | Closed | Closed |
| Valve 40 | Closed | Open | Closed | Closed |
| Valve 41 | Closed | Closed | Closed | Closed |
| Valve 42 | Closed | Closed | Closed | Open |
| Valve 43 | Closed | Closed | Closed | Closed |
| Pump 46 | On | Off | Off | Off |
| Pump 47 | Off | On | Off | Off |
| Piston 23 | Near TDC | At TDC at start of step | Near TDC at start of step | At BDC at start of step |

During step 1 of the expansion cycle, liquid is added to the cylinder chamber from the liquid tank 28 to eliminate dead volume in the system. This will be required only rarely, as mentioned above. Similar to the compression cycle, the pump 46 can be eliminated if the liquid tank 28 is oriented at an elevation higher than that of the chamber of cylinder device 21.

During step 2 of the expansion cycle, a pre-determined amount of air, $V_0$, is added to the chamber of the cylinder device by opening inlet valve 37 for the correct interval, which is dependent on the pressure of the air in the pressure cell and the desired expansion ratio. The $V_0$ required is the total cylinder device volume divided by the desired expansion ratio. For a single stage system, that ratio is less than or equal to the pressure of air in the air storage tank in atmospheres. At the same time air is being introduced into the cylinder chamber 22, liquid mist from the pressure cell is being pumped (via pump 47) through inlet nozzle 44 into the cylinder chamber. If a sufficient pressure differential exists between the pressure cell 25 and the cylinder device 21, pump 47 is not required. Once the pressure inside of the cylinder chamber is sufficiently high, valve 37 is closed. The piston 23 is urged in the direction of BDC beginning with this step, transmitting power out of the system via a crankshaft, hydraulic pressure, or other mechanical means.

During step 3 of the expansion cycle, the air introduced in step 2 is allowed to expand in the chamber 22. Liquid mist also continues to be pumped into the chamber 22 through nozzle 44. The predetermined total amount of mist introduced is that required to add enough heat to the system to keep the temperature substantially constant during air expansion. The piston 23 is driven to the bottom of the cylinder device during this step.

It will be appreciated that this two-step expansion process (a quantity of air $V_0$ introduced in the first step—step 2—and then allowed to expand in the second step—step 3) allows the system to extract substantially all the energy available in the compressed air.

During step 4 of the expansion cycle, the crankshaft or other mechanical linkage moves the piston 19 back up to top dead-center (TDC), exhausting the spent air and liquid mist from the cylinder device. The power required to drive the piston comes from the momentum of the system and/or from the motion of other out-of-phase pistons. The exhausted air passes through an air-liquid separator, and the liquid that is separated out is returned to the liquid tank 28.

Multi-Stage System

When a larger compression/expansion ratio is required than can be accommodated by the mechanical or hydraulic approach by which mechanical power is conveyed to and from the system, then multiple stages should be utilized. A multi-stage compressed air energy storage system 20 with three stages (i.e., first stage 24*a*, second stage 24*b* and third stage 24*c*) is illustrated in schematic form in FIG. 2. Systems with more or fewer stages are constructed similarly. Note that, in all figures that follow, when the letters a, b, and c are used with a number designation (e.g. 25*a*), they refer to elements in an individual stage of a multi-stage energy storage system 20.

In accordance with the present invention, each stage may typically have substantially the same expansion ratio. A stage's expansion ratio, $r_1$, is the Nth root of the overall expansion ratio. That is, $$r = \sqrt[N]{R}$$

Where R is the overall expansion ratio and N is the number of stages. It will be appreciated, however, that the different stages can have different expansion ratios, so long as the product of the expansion ratios of all of the stages is R. That is, in a three-stage system, for example:

$$r_1 \times r_2 \times r_3 = R.$$

In order for the mass flow rate through each stage to be substantially the, the lower pressure stages will need to have cylinder chambers with greater displacements. In a multi-stage system, the relative displacements of the cylinder chambers are governed by the following equation:

$$V_i = V_f \frac{r^i}{\sum_{j=1}^{N} r^j}$$

Where $V_i$ is the volume of the $i^{th}$ cylinder device, and $V_f$ is the total displacement of the system (that is, the sum of the displacements of all of the cylinder devices).

As an example, suppose that the total displacement of a three-stage system is one liter. If the stroke length of each piston is substantially the same and substantially equal to the bore (diameter) of the final cylinder chamber, then the volumes of the three cylinder chambers are about 19 $cm^3$, 127 $cm^3$, and 854 $cm^3$. The bores are about 1.54 cm, 3.96 cm, and 10.3 cm, with a stroke length of about 10.3 cm for all three. The lowest-pressure cylinder device is the largest and the highest-pressure cylinder device the smallest.

Figure 9:
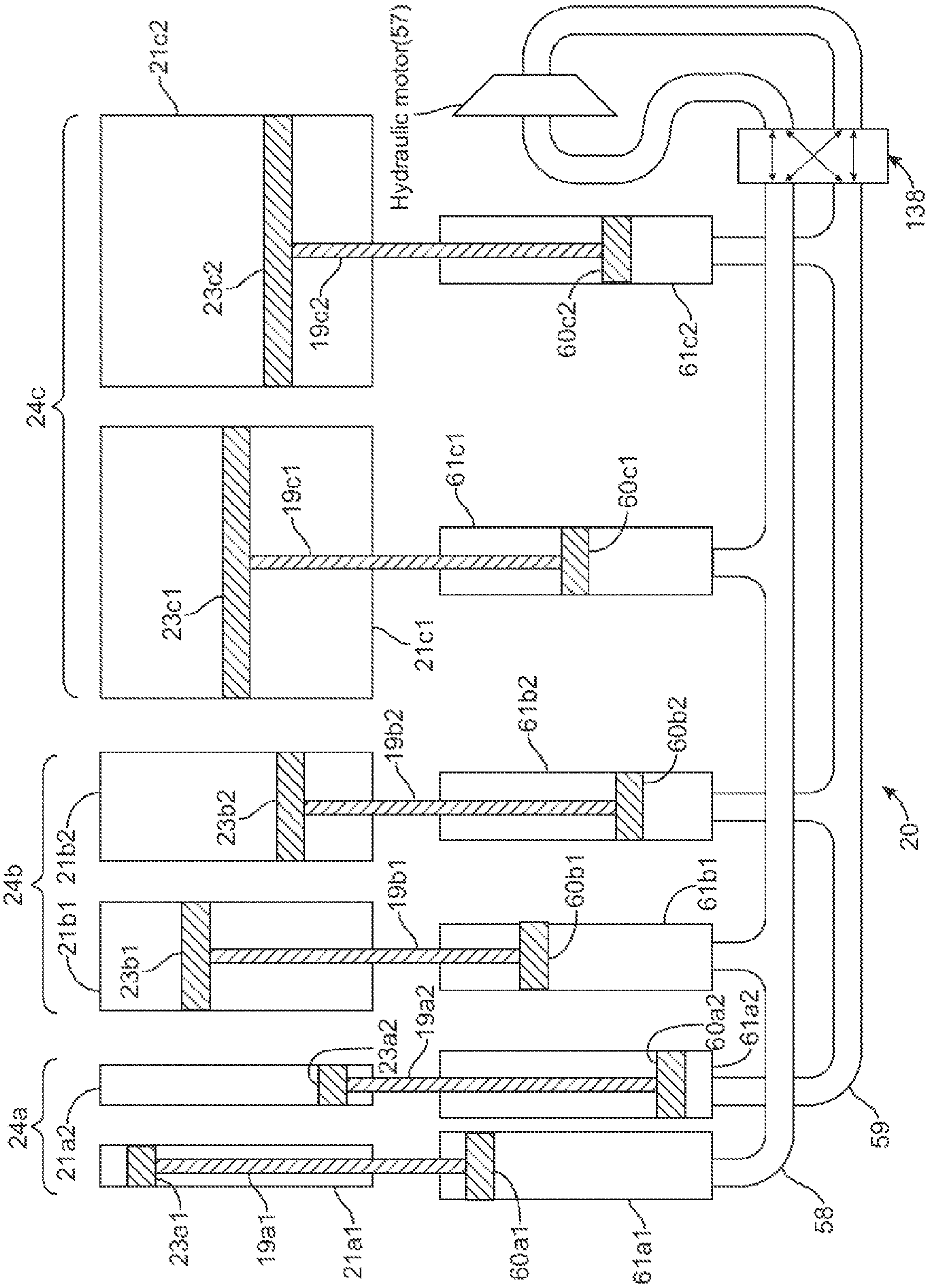
FIG. 9 is a block diagram of a multi-stage compressed air energy system that utilizes a hydraulic motor as its mechanism for conveying and receiving mechanical power.

FIG. 9 is a schematic representation of how three stages 24*a*, 24*b* and 24*c* could be coupled to a hydraulic system (e.g., a hydraulic motor 57 and six hydraulic cylinders 61*a*1-61*c*2) to produce continuous near-uniform power output. Each compressed-air-driven piston 23*a*1-23*c*2 of each corresponding compressed-air driven cylinder device 21*a*1-21*c*2 is coupled via a respective piston rod 19*a*1-19*c*2 to a corresponding piston 60*a*1-60*c*2 of a respective hydraulic cylinder device 61*a*1-61*c*2.

The chambers of the air-driven cylinder devices 21*a*1-21*c*2 vary in displacement as described above. The chambers of the hydraulic cylinder devices 61*a*1-61*c*2, however, are substantially identical in displacement. Because the force generated by each air-driven piston is substantially the same across the three stages, each hydraulic cylinder device provides substantially the same pressure to the hydraulic motor 57. Note that, in this configuration, the two air-driven pistons 21*a*1, 21*a*2 that comprise a given stage (e.g. the first stage 24*a*) operate 180 degrees out of phase with each other.

Stages Using Liquid Mist to Effect Heat Exchange in a Multi-Stage System

If a stage is single-acting and uses liquid mist to effect heat exchange, it operates according to the scheme described in the section titled Single-Stage System above. Each single-acting stage of a multi-stage system 20 (e.g., the second stage 24*b* of FIG. 2) is illustrated schematically in FIG. 4. In this configuration, air passes to a cylinder chamber 22*b* of the second stage 24*b* illustrated from the pressure cell 25*a* of the next-lower-pressure stage (e.g., first stage 24*a*) during compression, and to the pressure cell of the next-lower-pressure stage during expansion, via pipe 92*a*/90*b*. Liquid passes to and from the pressure cell 25*a* of the next-lower-pressure stage via pipe 93*a*/91*b*.

In contrast, air passes from pressure cell 25*b* of the stage illustrated (e.g., the second stage 24*b*) to the chamber of the cylinder device of the next higher-pressure stage (e.g., the third stage 24*c*) during compression and from the chamber of the cylinder device of the next higher-pressure stage during expansion via pipe 92*b*/90*c*. It will be appreciated that the air compression/expansion mechanism (i.e., second stage 24*b*) illustrated is precisely the same as the central elements (the cylinder device 21 and the pressure cell 25 of the first stage 24) shown in FIG. 1, with the exception that, in FIG. 4, there is a pipe 93*b* that conveys liquid from the pressure cell of one stage to the chamber of the cylinder device of the next higher-pressure stage. Pipe 93*b* is not required for the highest-pressure stage; hence, it doesn't appear in the diagrams, FIGS. 1 and 3, of single-stage configurations.

If the stage illustrated is the lowest-pressure-stage (e.g., first stage 24*a* in the embodiment of FIG. 2), then line 90*a* passes air to an air-liquid separator (e.g., separator 27 in FIG. 1) during the expansion cycle and from an air filter (e.g., filter 26 in FIG. 1) during the compression cycle. Similarly, if the stage illustrated is the lowest-pressure stage, then line 91*a* communicates liquid to and from the liquid tank. If the stage illustrated is the highest-pressure-stage (e.g., the third stage 24*c*), then air is conveyed to and from the air tank (e.g., air tank 32 in FIG. 1) via pipe 92*c*.

Single-Acting Stage Utilizing Bubbles to Effect Heat Exchange

Figure 6:
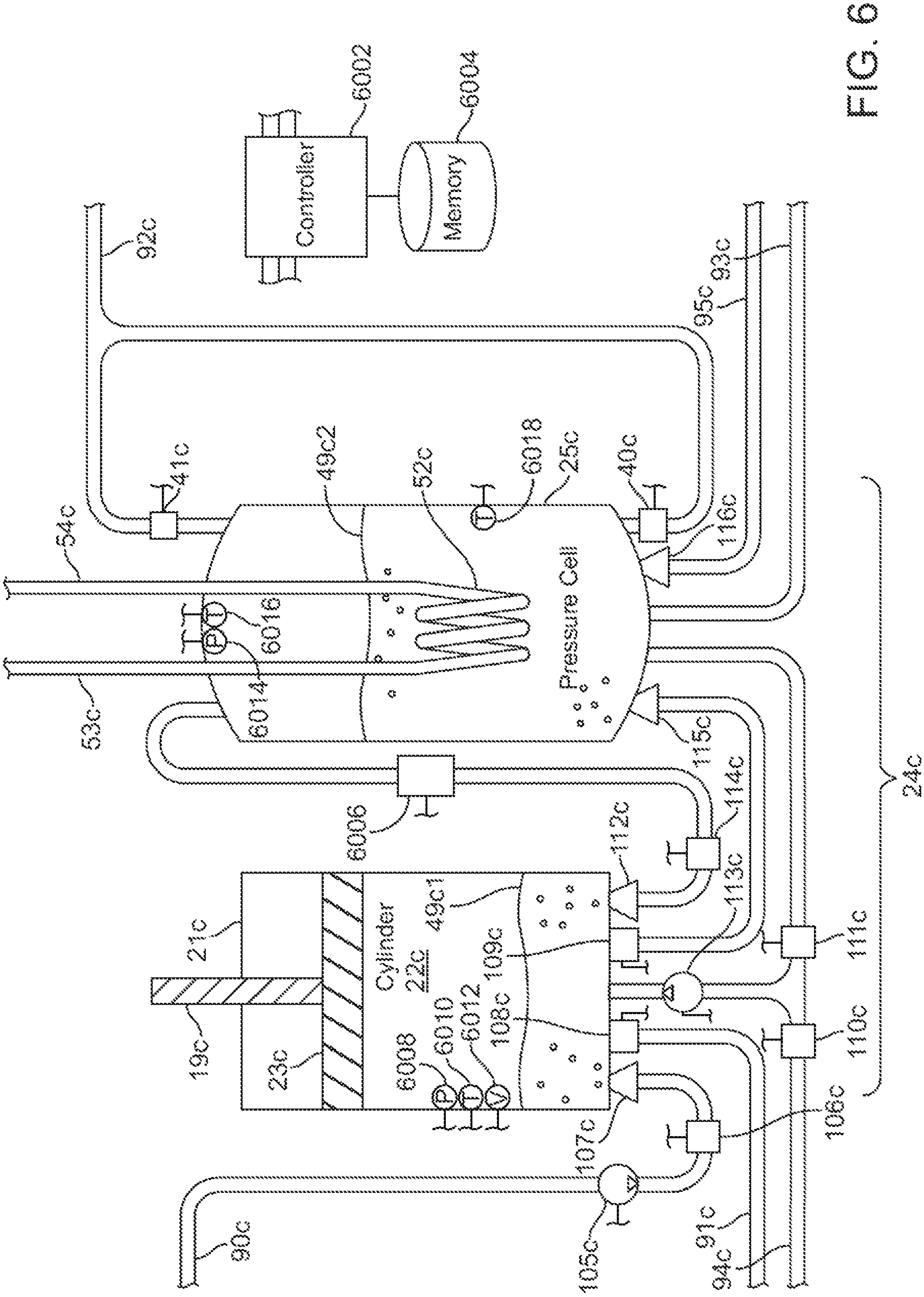
FIG. 6 is a schematic representation of one single-acting stage in a multi-stage compressed air energy storage system, in accordance with the present invention, that uses air bubbling through a body of liquid to effect heat exchange.

Instead of using liquid mist sprayed into the cylinder device or pressure cell in order to cool the air as it compresses or warm it as it expands, one specific embodiment of the present invention utilizes the inverse process. As best illustrated in FIG. 6, that is, the air is bubbled up through a body of liquid 49c1 in the chamber 22c of the cylinder device 21c. This process should be used in preference to the mist approach above discussed when the volume fraction of mist required to effect the necessary heat exchange would be sufficiently high enough to cause a high percentage of the droplets to fuse during the compression cycle. Typically, this occurs at higher pressures. Hence, the use of the designator c in FIG. 6 (e.g. 25c) indicating a third, or high-pressure stage.

As described above in connection with FIG. 1, the apparatus of FIG. 6 further includes a controller/processor 6002 in electronic communication with a computer-readable storage device 6004, which may be of any design, including but not limited to those based on semiconductor principles, or magnetic or optical storage principles. Controller 6002 is shown as being in electronic communication with a universe of active elements in the system, including but not limited to valves, pumps, chambers, nozzles, and sensors. Specific examples of sensors utilized by the system include but are not limited to pressure sensors (P) 6008 and 6014, temperature sensor (T) 6010, 6016, and 6018, and volume sensor (V) 6012.

FIG. 6 illustrates a stage that uses bubbles to facilitate heat exchange. The compression cycle for this single-acting stage system proceeds as follows:

| | Step | | | |
|---|---|---|---|---|
| | 1 | 2 | 3 | 4 |
| Description | Fill cylinder device with air | Compress | Transfer air to pressure cell | Replenish liquid |
| Valve 108c | Closed | Closed | Closed | Closed |
| Valve 109c | Closed | Closed | Open | Closed |
| Valve 114c | Closed | Closed | Closed | Closed |
| Valve 41c | Closed | Closed | Open | Closed |
| Valve 40c | Closed | Closed | Closed | Closed |
| Valve 106c | Open | Closed | Closed | Closed |
| Valve 110c | Closed | Closed | Closed | Closed |
| Valve 111c | Closed | Closed | Closed | Open |
| Pump 105c | On | Off | Off | Off |
| Pump 113c | Off | Off | Off | On |
| Piston 23c | At top of liquid at start of step | At TDC at start of step | Near BDC at start of step | At BDC at start of step |

In contrast, the expansion cycle for this single-acting stage system uses the following process:

| | Step | | | |
|---|---|---|---|---|
| | 1 | 2 | 3 | 4 |
| Description | Replenish liquid in cylinder device | Add compressed air to cylinder device | Expansion | Exhaust spent air |
| Valve 108c | Closed | Closed | Closed | Open |
| Valve 109c | Closed | Closed | Closed | Closed |
| Valve 114c | Closed | Open | Closed | Closed |
| Valve 41c | Closed | Closed | Closed | Closed |
| Valve 40c | Closed | Open | Closed | Closed |
| Valve 106c | Closed | Closed | Closed | Closed |
| Valve 110c | Open | Closed | Closed | Closed |
| Valve 111c | Closed | Closed | Closed | Closed |
| Pump 105c | Off | Off | Off | Off |
| Pump 113c | On | Off | Off | Off |
| Piston 23c | At BDC at start | At top of liquid | Near BDC at start | At TDC at start |

An air-liquid mixture from the chamber 22c of cylinder device 21c in this stage (e.g., third stage 24c) is conveyed to the pressure cell 25b of the next lower-pressure stage (e.g., second stage 24b) during the expansion cycle, via valve 108c and pipe 91c/95b. Air is conveyed to the chamber 22c of cylinder device 21c in this third stage 24c, for example, from the next lower-pressure stage 24b during compression via pipe 92b/90c.

In contrast, air from the pressure cell 25c of this second stage 24c, for instance, is conveyed to and from the cylinder chamber 22d of next higher-pressure stage via pipe 92c/90d together with the operation of in-line valve 41c. Liquid 49c from the pressure cell 25c of this stage is conveyed to the cylinder chamber 22d of the next higher-pressure stage 24d, for example, via pipe 93c/94d. An air-liquid mixture from the cylinder chamber 22d of the next higher-pressure stage (during the expansion cycle thereof) is conveyed to pressure cell 25c of this stage via pipe 91d/95c.

It will be appreciated that, in some multi-stage systems, some (lower-pressure) stages might employ the liquid mist technique while other (higher-pressure) stages may employ the bubbles technique to store and remove energy therefrom.

Multiple Phases

The systems as described so far represent a single phase embodiment. That is, all pistons operate together over the course of one cycle. During expansion, for example, this produces a varying amount of mechanical work output during one half of the cycle and requires some work input during the other half of the cycle. Such work input may be facilitated by the use of a flywheel (not shown).

To smooth out the power output over the course of one cycle and reduce the flywheel requirements, in one embodiment, multiple systems phases may be employed. N sets of pistons thus may be operated 360/N degrees apart. For example, four complete sets of pistons may be operated 90 degrees out of phase, smoothing the output power and effecting self-starting and a preferential direction of operation. Note that valves connecting cylinder devices to a pressure cell are only opened during less than one-half of a cycle, so it is possible to share a pressure cell between two phases 180 degrees apart.

Figure 5:
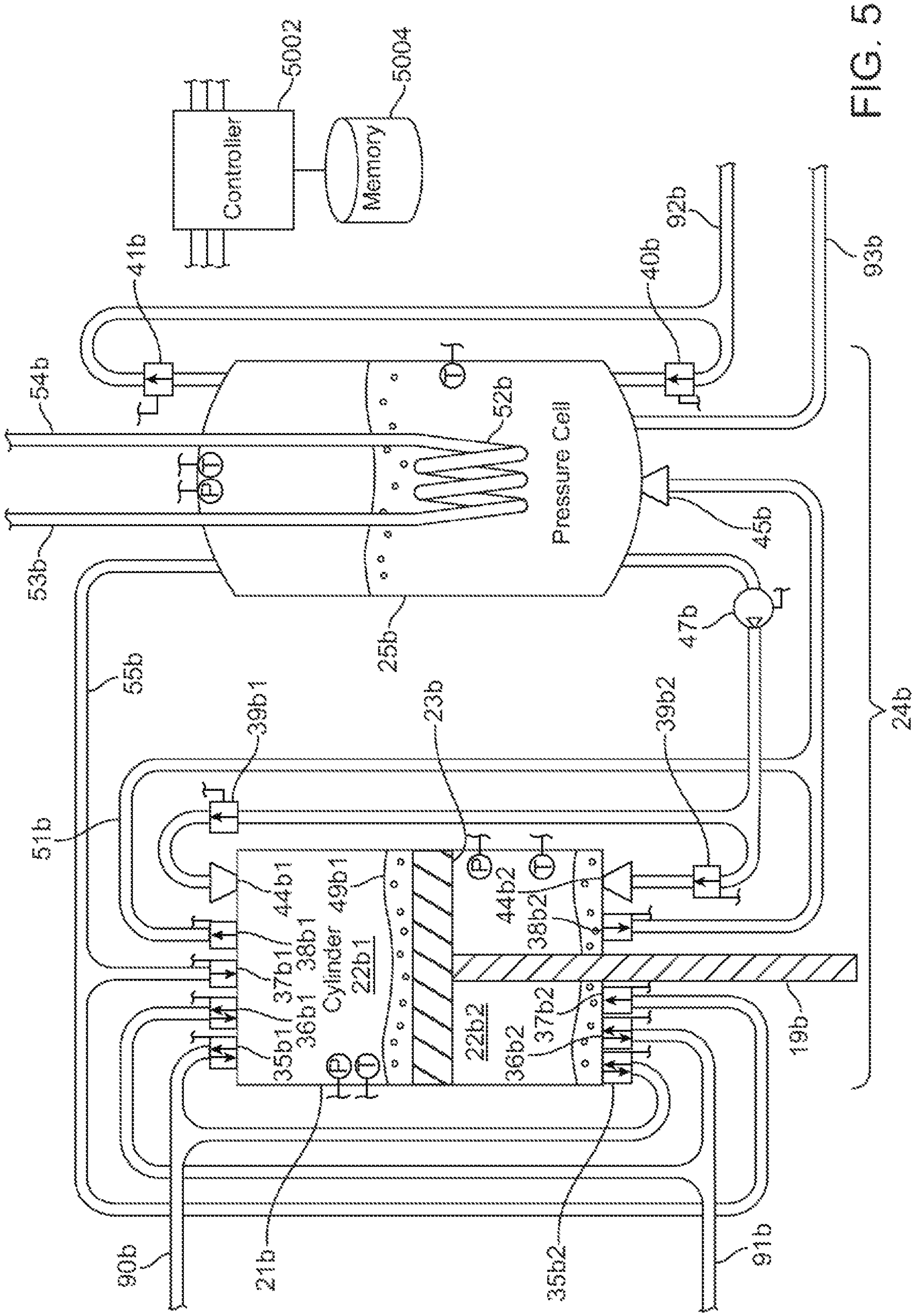
FIG. 5 is a schematic representation of one double-acting stage in a multi-stage compressed air energy storage system in accordance with the present invention.

If N phases are used, and N is even, pairs of phases are 180 degrees apart and may be implemented using double-acting pistons. FIG. 5 illustrates a double-acting stage that uses liquid mist to effect heat exchange. Each half of the piston operates according the protocol outlined in the section Single Stage System, but 180 degrees out of phase.

As described above in connection with FIG. 1, the apparatus of FIG. 5 further includes a controller/processor 5002 in electronic communication with a computer-readable storage device 5004, which may be of any design, including but not limited to those based on semiconductor principles, or magnetic or optical storage principles. Controller 5002 is shown as being in electronic communication with a universe of active elements in the system, including but not limited to valves, pumps, chambers, nozzles, and sensors. Specific examples of sensors utilized by the system include but are not limited to pressure sensors (P), temperature sensors (T), humidity sensor (H), and volume sensors (V).

The compression cycle for the double-acting stage illustrated in FIG. 5 proceeds as follows:

| | Step | | | | |
|---|---|---|---|---|---|
| | 1 | 2 | 3 | 4 | 5 |
| Description | Add mist to chamber 22b1 and move air to pressure cell from chamber 22b2 | Compress air in chamber 22b1 and refill chamber 22b2 | Move air to pressure cell from chamber 22b1 and add mist to chamber 22b2 | Refill chamber 22b1 and compress air in chamber 22b2 | Replenish liquids in cylinder device |
| Valve 35b1 | Closed | Closed | Open | Open | Closed |
| Valve 36b1 | Closed | Closed | Closed | Closed | Open |
| Valve 37b1 | Closed | Closed | Closed | Closed | Closed |
| Valve 38b1 | Closed | Closed | Open | Closed | Closed |
| Valve 39b1 | Open | Closed | Closed | Closed | Closed |
| Valve 35b2 | Open | Open | Closed | Closed | Closed |
| Valve 36b2 | Closed | Closed | Closed | Closed | Open |
| Valve 37b2 | Closed | Closed | Closed | Closed | Closed |
| Valve 38b2 | Open | Closed | Closed | Closed | Closed |
| Valve 39b2 | Closed | Closed | Open | Closed | Closed |
| Valve 40b | Closed | Closed | Closed | Closed | Closed |
| Valve 41b | Open | Closed | Open | Closed | Closed |
| Pump 47b | On | Off | On | Off | Off |
| Piston 23b | Near TDC at start of step | Between TDC and BDC, moving down | Near BDC at start of step | Between TDC and BDC, moving up | Between TDC and BDC |

Note that step 5 is unnecessary, in some specific embodiments, and can be omitted in the great majority of cycles since the liquid levels in the piston remain substantially the same across long periods of operation.

In contrast, the expansion cycle for the double-acting stage illustrated in FIG. 5 proceeds as follows:

| | Step | | | | |
|---|---|---|---|---|---|
| | 1 | 2 | 3 | 4 | 5 |
| Description | Add mist and air to chamber 22b1 and exhaust air from chamber 22b2 | Allow air in chamber 22b1 to expand and continue exhausting air from chamber 22b2 | Add mist and air to chamber 22b2 and exhaust air from chamber 22b1 | Allow air in chamber 22b2 to expand and continue exhausting air from chamber 22b1 | Replenish liquids in cylinder device |
| Valve 35b1 | Closed | Closed | Open | Open | Closed |
| Valve 36b1 | Closed | Closed | Closed | Closed | Open |
| Valve 37b1 | Open | Closed | Closed | Closed | Closed |
| Valve 38b1 | Closed | Closed | Closed | Closed | Closed |
| Valve 39b1 | Open | Closed | Closed | Closed | Closed |
| Valve 35b2 | Open | Open | Closed | Closed | Closed |
| Valve 36b2 | Closed | Closed | Closed | Closed | Open |
| Valve 37b2 | Closed | Closed | Open | Closed | Closed |
| Valve 38b2 | Closed | Closed | Closed | Closed | Closed |
| Valve 39b2 | Closed | Closed | Open | Closed | Closed |
| Valve 40b | Open | Closed | Open | Closed | Closed |
| Valve 41b | Closed | Closed | Closed | Closed | Closed |
| Pump 47b | On | Off | On | Off | Off |
| Piston 23b | Near TDC at start of step | Between TDC and BDC, moving down | Near BDC at start of step | Between TDC and BDC, moving up | Between TDC and BDC |

Note that, as with compression, step 5 is rarely necessary and can be omitted in the great majority of cycles.

Stages with Multiple Cylinder devices

If it is desirable that all the cylinder devices in a multi-stage system 20 be of substantially similar size, the larger (lower-pressure) cylinder devices may be divided up into two or more smaller cylinder devices communicating in parallel. An example of such a stage is illustrated in FIG. 7, which is an alternative embodiment of the stage of embodiment of FIG. 4.

In this configuration, four substantially similar cylinder devices 21*b*1-21*b*4 share a single pressure cell 25*b* containing body of liquid 49*b*. However, if it is desirable to operate the cylinder devices out of phase with each other so that the system as a whole may convey power more uniformly, separate pressure cells will be required for each cylinder device.

As mentioned above, the exception is cylinder devices that are 180 degrees out of phase, which then may share a common pressure cell.

Figure 7:
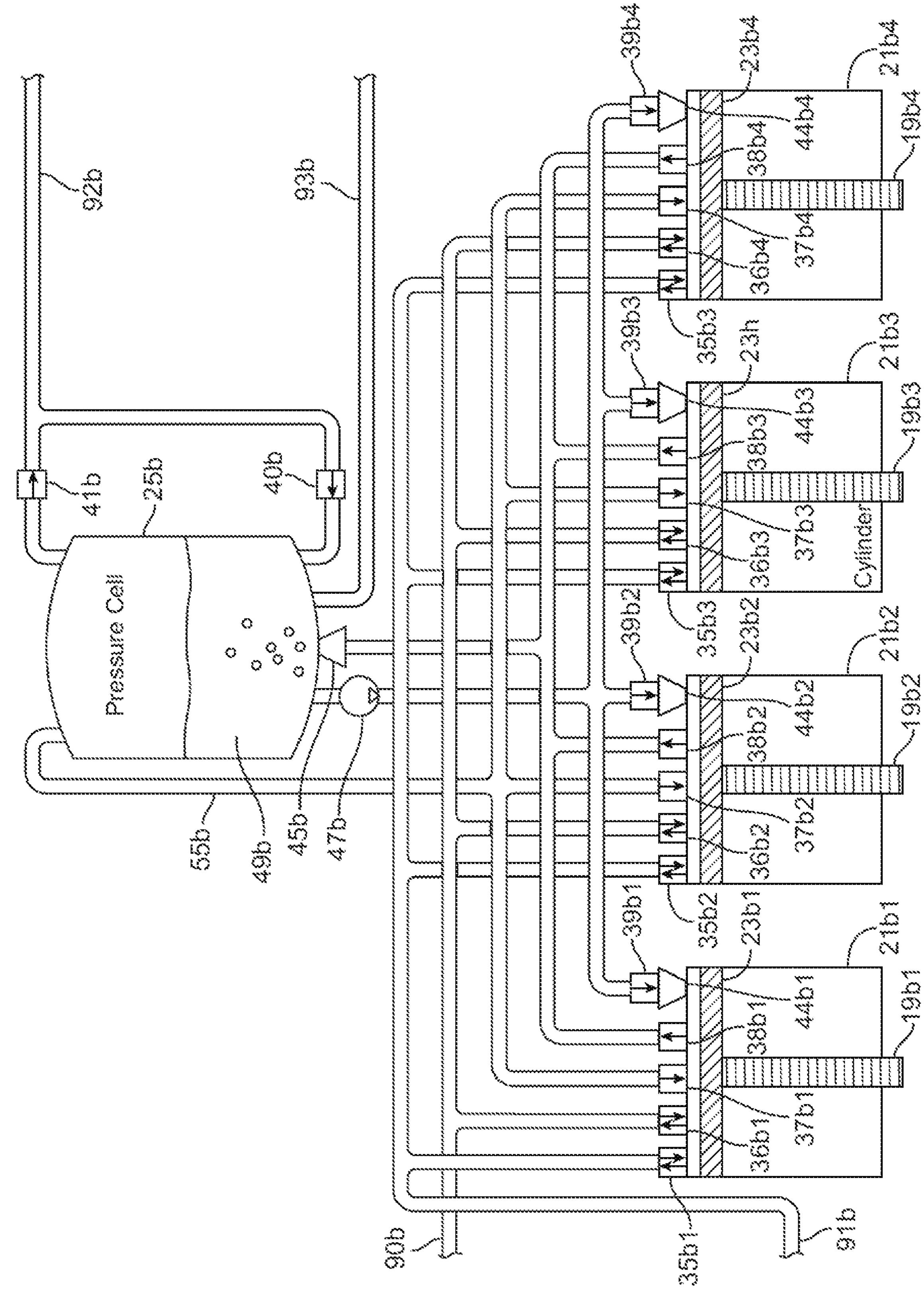
FIG. 7 is a schematic representation of a single-acting stage in a multi-stage compressed air energy storage system, in accordance with the present invention, using multiple cylinder devices.

Referring back to the embodiment of FIG. 7, each cylinder device 21*b*1-21*b*4 operates according to the scheme used for the mist-type system described in the Single-Stage System section above.

Multi-cylinder device stages may be single or double-acting, and may use either liquid mist or bubbles to effect heat exchange. A multi-stage system may have some stages with a single cylinder device and others with multiple cylinder devices.

Options for Conveying Mechanical Power to and from the System

At least four methods may be applied to convey power to and from a stage in accordance with the present invention. These are described as follows, and illustrated in FIG. 8.

W. A direct-acting hydraulic cylinder device 21*w* is shown and operates as follows. During the expansion cycle, air entering the chamber 22*w* of cylinder device 21*w*, via valve 121*w* and pipe 122*w*, urges the hydraulic liquid 49*w* out through valve 123*w*. It then flows through pipe 124*w*. The force thus pneumatically applied against the liquid can be used to operate a hydraulic device (e.g., a hydraulic motor 57, a hydraulic cylinder device or a hydro turbine as shown in FIG. 9) to create mechanical power. During the compression cycle, the reverse process occurs. An external source of mechanical power operates a hydraulic pump or cylinder device, which forces hydraulic liquid 49*w* into the cylinder chamber 22*w*, through valve 123*w*, compressing the air in the chamber. When the air has reached the desired pressure, valve 121*w* is opened, allowing the compressed air to flow from the cylinder chamber 22*w* to the next higher-pressure stage or to the air tank.

X. A single-acting piston 23*x* (also illustrated in FIG. 4) may be connected to a conventional crankshaft via a piston rod 19*x*. Its operation is described in detail in the section titled Single-Stage System above.

Y. A double-acting piston (also illustrated in FIG. 5), may similarly be connected to a crankshaft via a piston rod 19*y*. Its operation is described in detail in the section titled Multiple Phases above.

heat transfer. The necessary valves and nozzles to supply the mist or bubbles are not shown on FIG. 8.

While the above examples describe the use of pistons, other types of moveable elements may be utilized and still remain within the scope of the present invention. Examples of alternative types of apparatuses which could be utilized include but are not limited to screw compressors, multi-lobe blowers, vane compressors, gerotors, and quasi-turbines.

Figure 3:
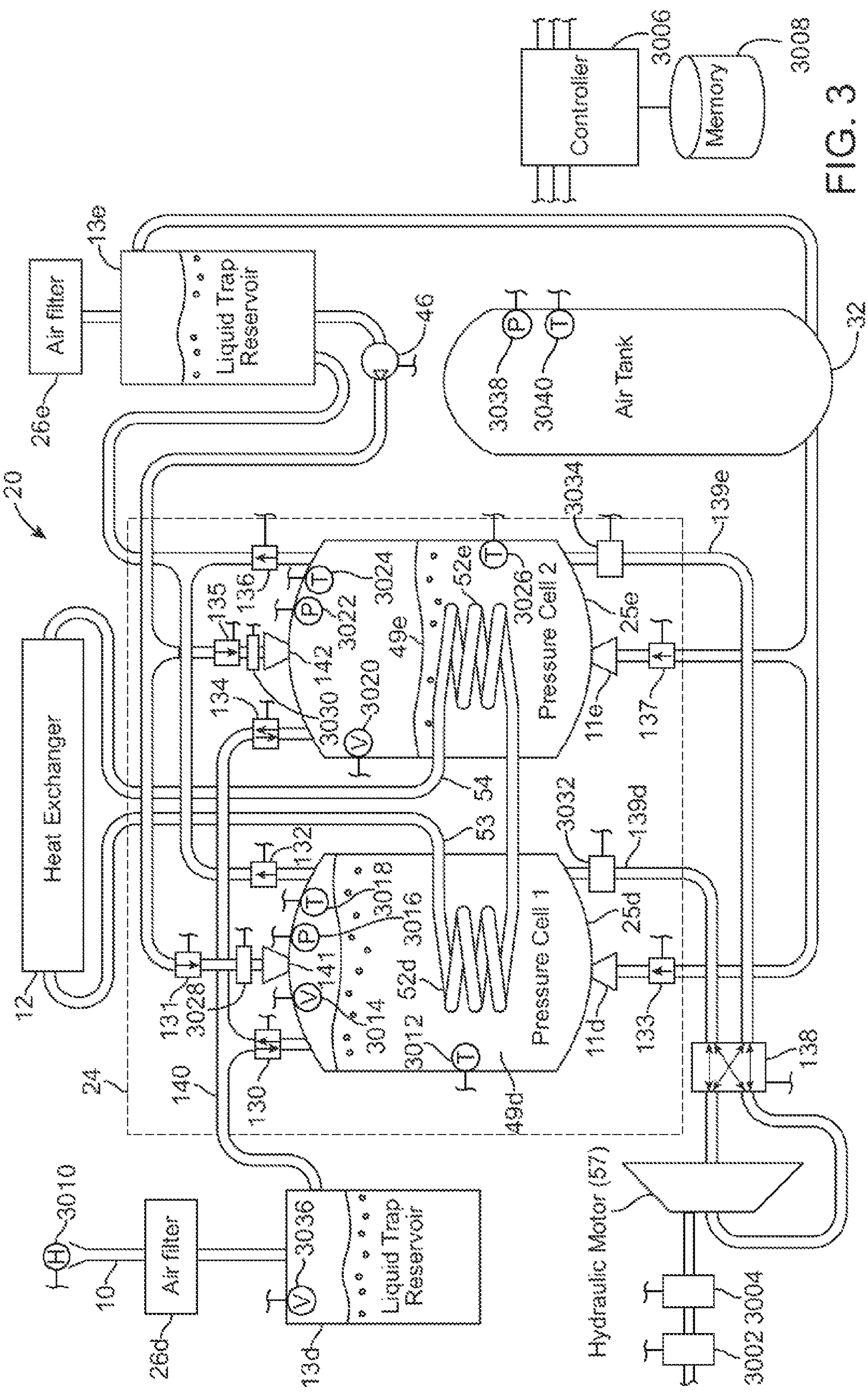
FIG. 3 is a schematic representation of a third embodiment of a compressed air energy storage system, that is a single-stage, single-acting energy storage system that uses both liquid mist and air bubbling through a body of liquid to effect heat exchange.

Single-Stage, Single-Acting Enemy Storage System:

Referring now to the embodiment of FIG. 3, a single-stage, single-acting energy storage system 20 is illustrated that utilizes two pressure cells 25*d* and 25*e* configured as direct-acting hydraulic cylinder devices (option A above). The two pressure cells operate substantially 180 degrees out of phase with each other. Liquid mist is used to effect heat exchange during the compression cycle, and both bubbles and mist are used to effect heat exchange during the expansion cycle.

As described above in connection with FIG. 1, the apparatus of FIG. 3 further includes a controller/processor 3006 in electronic communication with a computer-readable storage device 3008, which may be of any design, including but not limited to those based on semiconductor principles, or magnetic or optical storage principles. Controller 3006 is shown as being in electronic communication with a universe of active elements in the system, including but not limited to valves, pumps, chambers, nozzles, and sensors. Specific examples of sensors utilized by the system include but are not limited to pressure sensors (P) 3016, 3022, and 3038, temperature sensors (T) 3018, 3024, and 3040, humidity sensor (H) 3010, and volume sensors (V) 3036, 3014, and 3020.

The compression cycle of the single-stage, single-acting energy storage system 20 proceeds as follows:

| | Step | | | |
|---|---|---|---|---|
| | 1 | 2 | 3 | 4 |
| Description | Compress air in cell 25d while spraying mist, and replenish the air in cell 25e | Move compressed air from cell 25d to air tank | Compress air in cell 25e while spraying mist, and replenish the air in cell 25d | Move compressed air from cell 25e to air tank |
| Valve 130 | Closed | Closed | Open | Open |
| Valve 131 | Open | Open | Closed | Closed |
| Valve 132 | Closed | Open | Closed | Closed |
| Valve 133 | Closed | Closed | Closed | Closed |
| Valve 134 | Open | Open | Closed | Closed |
| Valve 135 | Closed | Closed | Open | Open |
| Valve 136 | Closed | Closed | Closed | Open |
| Valve 137 | Closed | Closed | Closed | Closed |
| Valve 138 | Pump out to cell 25d, pump in from cell 25e | Pump out to cell 25d, pump in from cell 25e | Pump out to cell 25e, pump in from cell 25d | Pump out to cell 25e, pump in from cell 25d |
| Pump 46 | On | On | On | On |

Z. A hydraulic cylinder device 21 with a diaphragm 125 is illustrated such that when air enters the cylinder chamber 22*z*, via valve 121*z*, during the expansion cycle, the diaphragm 125 is forced downwardly. Consequently, the hydraulic liquid 49*z* is urged or driven through valve 123*z* and through pipe 124*z*. Similarly, during compression, the hydraulic liquid 49*z* is driven through valve 123*z* and into the cylinder chamber 22*z*, deflecting the diaphragm 125 upwardly, compressing the air in the upper part of the chamber 22*z*, which then exits via valve 121*z*.

Note that all four of these options can be used with either the liquid mist technique or the bubbles technique to effect During step 1, fluid is pumped from pressure cell 25*e* using the hydraulic pump-motor 57 into pressure cell 25*d*, thereby compressing the air inside cell 25*d*. Fluid mist is sprayed through nozzle 141, which absorbs the heat of compression. When the pressure inside cell 25*d* has reached the pressure of the air tank 32, valve 132 is opened to let the compressed air move to the air tank. As these steps have been progressing, air at atmospheric pressure has entered the system via pipe 10 and air filter 26*d* and thence into cell 25*e* to replace the fluid pumped out of it.

When all the air has been driven out of cell 25*d*, the process reverses, and step 3 commences, with the four-way valve 138 changing state to cause liquid to be pumped out of cell 25*d* and into cell 25*e*, causing the air in cell 25*e* to be compressed. Thus, liquid is pumped back and forth between cells 25*d* and 25*e* in a continuous cycle.

The expansion cycle of the single-stage, single-acting energy storage system proceeds as follows:

In step 1, compressed air is bubbled into pressure cell 25*d* via nozzle 11*d*. As the bubbles rise, they exchange heat with the body of fluid 49*d*. Air is forced out of cell 25*d*, passing through pipe 139*d*, and then driving hydraulic motor 57, thereby delivering mechanical power In step 2, the valve 133 admitting the compressed air into cell 25*d* is closed, allowing the air in cell 25*d* to expand, continuing to operate motor 57. In step 3, once the air admitted in step 1 has risen to the top of cell 25*d* and can no longer exchange heat with the body of fluid 49*d*, fluid mist is sprayed into the cell via nozzle 141 to further warm the expanding air.

As fluid passes through the hydraulic motor 57 during steps 1, 2, and 3, it continues through pipe 139*e* and enters pressure cell 25*e*, urging the air present in that cell through pipe 140 and into the liquid trap-reservoir 13*d*, and thence into the atmosphere via air filter 26*d* and finally pipe 10.

Steps 4, 5, and 6 mirror steps 1, 2, and 3. That is, compressed air is bubbled into pressure cell 25*e*, forcing fluid through the hydraulic motor 57, and then into pressure cell 25*d*.

If reservoir 13*e* is depleted during operation, excess liquid is pumped from the bottom of reservoir 13*d* into cells 25*d* and 25*e*, using a pump, not shown in the figure, connected to pipe 140.

Over time, both liquid traps 13*d* and 13*e* will change temperature due to the air and entrained droplets transferring heat—a heat exchanger, as shown by coils 52*d* and 52*e*, in pressure cells 25*d* and 25*e*, and connected to a conventional external heat exchanger 12 that exchanges heat with the environment, will moderate the temperature to near ambient.

The volume of compressed air bubbled into the cells during steps 1 and 3 depends on the power output desired. If the air can expand fully to one atmosphere without displacing all the liquid in the cell, then the maximum amount of work will be done during the stroke. If the air does not fully expand during the stroke, all else being equal the power output will be higher at the expense of efficiency.

Note that the pressure cells cannot be of insufficient height so that the air bubbles reach the surface of the liquid during the course of the stroke, since almost all heat exchange with the body of liquid occurs while the bubbles are rising through it. However, they must be sufficiently tall for the column of bubbles to completely separate from the fluid by the time the exhaust stroke completes. If the system must be run slowly, some of the bubbles will reach the top before expansion completes. In this event, liquid mist is sprayed through nozzles 141 (in step 3) or 142 (in step 6) of the expansion cycle.

FIG. 3 is meant to illustrate the basic principles. In a system in which a large expansion ratio is desired will require the use of multiple stages 24.

System Configurations

It will be understood that a plurality of energy storage system embodiments, designed in accordance with this invention, are possible. These energy storage system 20 may be single or multi-stage. Stages may be single-cylinder device or multi-cylinder device. Heat exchange may be effected via liquid mist or via bubbles. Power may be conveyed in and out of the system via any of the at least four methods described in the previous section. Each possible configuration has advantages for a specific application or set of design priorities. It would not be practicable to describe every one of these configurations here, but it is intended that the information given should be sufficient for one practiced in the art to configure any of these possible energy storage systems as required.

Some configurations may have the following elements in common:

1. Near-isothermal expansion and compression of air, with the required heat exchange effected by a liquid phase in high-surface-area contact with the air.

2. A reversible mechanism capable of both compression and expansion of air.

3. Electronic control of valve timing so as to obtain the highest possible work output from a given volume of compressed air.

4. If the energy storage system utilizes a hydraulic motor or a hydro turbine, then the shaft of that device connects directly or via a gearbox to the motor-generator. If the energy storage system utilizes reciprocating pistons, then a crankshaft or other mechanical linkage that can convert reciprocating motion to shaft torque is used.

Use of Waste Heat During Expansion

In order to operate isothermally, the tendency of air to cool as it expands while doing work (i.e. by pushing a piston or displacing hydraulic liquid) must be counteracted by heat exchange with the ambient air or with a body of water (e.g. a stream or lake). If, however, some other source of heat is available—for example, hot water from a steam condenser—it may be used advantageously during the expansion cycle. In FIG. 1, as described in the Single-Stage System section above, pipes 53 and 54 lead to an external heat exchanger. If those pipes are routed instead to a heat source, the efficiency of the expansion process can be increased dramatically.

Because the system operates substantially at or near ambient temperature, the source of heat need only be a few degrees above ambient in order to be useful in this regard. The heat source must, however, have sufficient thermal mass to supply all the heat required to keep the expansion process at or above ambient temperature throughout the cycle.

Figure 20:
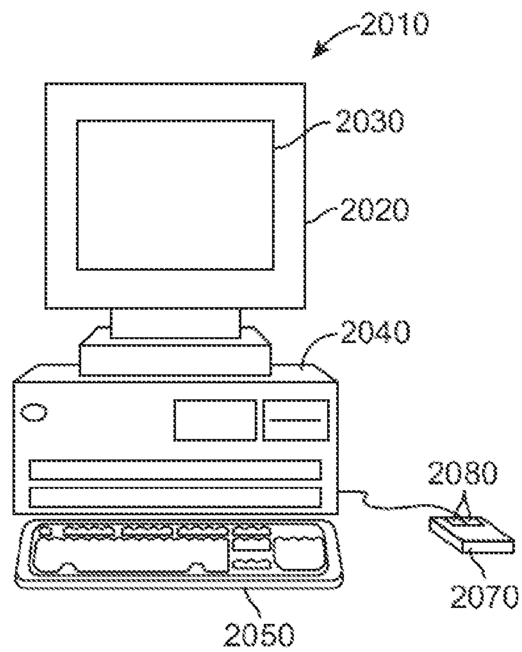
FIG. 20 shows a simplified view of a computer system suitable for use in connection with the methods and systems of the embodiments of the present invention.

As described in detail above, embodiments of systems and methods for storing and recovering energy according to the present invention are particularly suited for implementation in conjunction with a host computer including a processor and a computer-readable storage medium. Such a processor and computer-readable storage medium may be embedded in the apparatus, and/or may be controlled or monitored through external input/output devices. FIG. 20 is a simplified diagram of a computing device for processing information according to an embodiment of the present invention. This diagram is merely an example, which should not limit the scope of the claims herein. One of ordinary skill in the art would recognize many other variations, modifications, and alternatives. Embodiments according to the present invention can be implemented in a single application program such as a browser, or can be implemented as multiple programs in a distributed computing environment, such as a workstation, personal computer or a remote terminal in a client server relationship.

FIG. 20 shows computer system 2010 including display device 2020, display screen 2030, cabinet 2040, keyboard 2050, and mouse 2070. Mouse 2070 and keyboard 2050 are representative "user input devices." Mouse 2070 includes buttons 2080 for selection of buttons on a graphical user interface device. Other examples of user input devices are a touch screen, light pen, track ball, data glove, microphone, and so forth. FIG. 20 is representative of but one type of system for embodying the present invention. It will be readily apparent to one of ordinary skill in the art that many system types and configurations are suitable for use in conjunction with the present invention. In a preferred embodiment, computer system 2110 includes a Pentium™ class based computer, running Windows™ XP™ or Windows 7™ operating system by Microsoft Corporation. However, the apparatus is easily adapted to other operating systems and architectures by those of ordinary skill in the art without departing from the scope of the present invention.

As noted, mouse 2170 can have one or more buttons such as buttons 2180. Cabinet 2140 houses familiar computer components such as disk drives, a processor, storage device, etc. Storage devices include, but are not limited to, disk drives, magnetic tape, solid-state memory, bubble memory, etc. Cabinet 2140 can include additional hardware such as input/output (I/O) interface cards for connecting computer system 2110 to external devices external storage, other computers or additional peripherals, further described below.

Figure 20A:
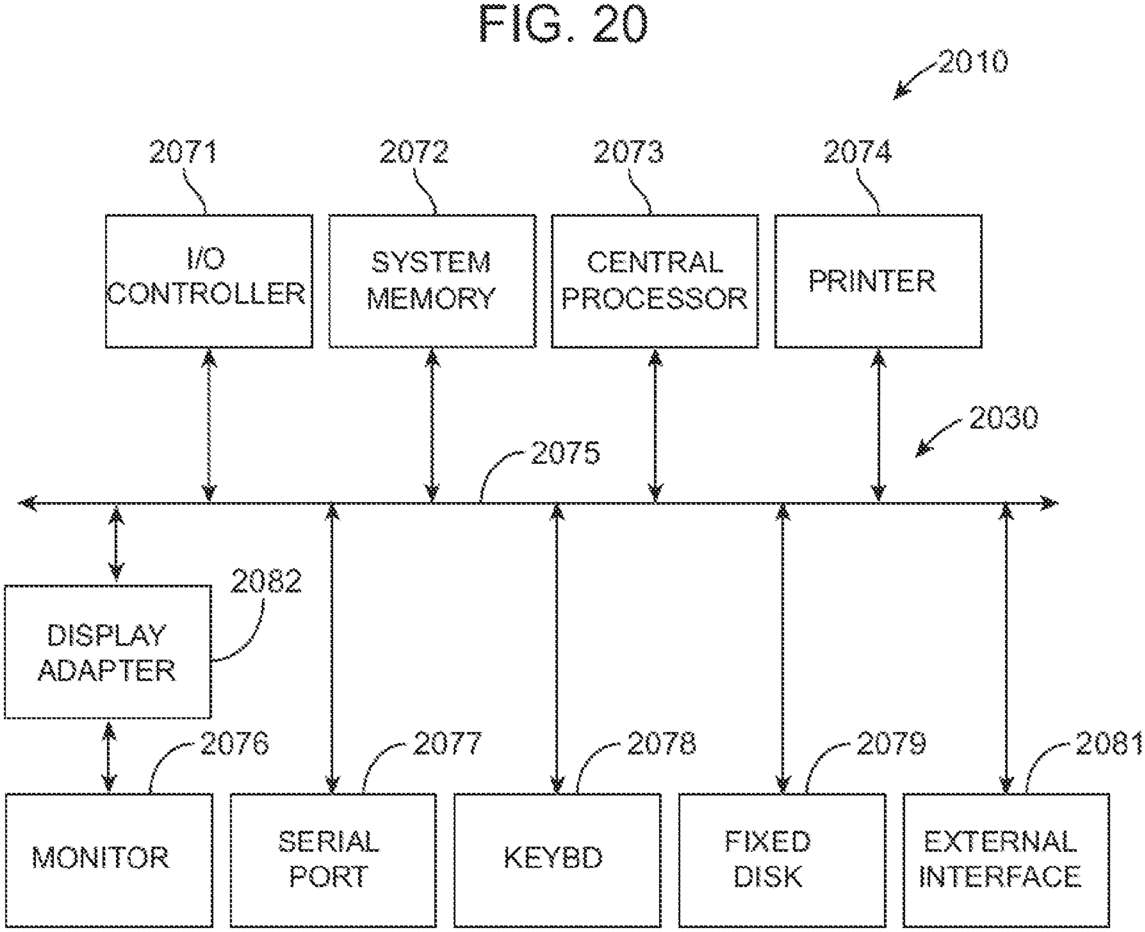
FIG. 20A is an illustration of basic subsystems in the computer system of FIG. 20.

FIG. 20A is an illustration of basic subsystems in computer system 2010 of FIG. 20. This diagram is merely an illustration and should not limit the scope of the claims herein. One of ordinary skill in the art will recognize other variations, modifications, and alternatives. In certain embodiments, the subsystems are interconnected via a system bus 2075. Additional subsystems such as a printer 2074, keyboard 2078, fixed disk 2079, monitor 2076, which is coupled to display adapter 2082, and others are shown. Peripherals and input/output (I/O) devices, which couple to I/O controller 2071, can be connected to the computer system by any number of approaches known in the art, such as serial port 2077. For example, serial port 2077 can be used to connect the computer system to a modem 2081, which in turn connects to a wide area network such as the Internet, a mouse input device, or a scanner. The interconnection via system bus allows central processor 2073 to communicate with each subsystem and to control the execution of instructions from system memory 2072 or the fixed disk 2079, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Figure 21:
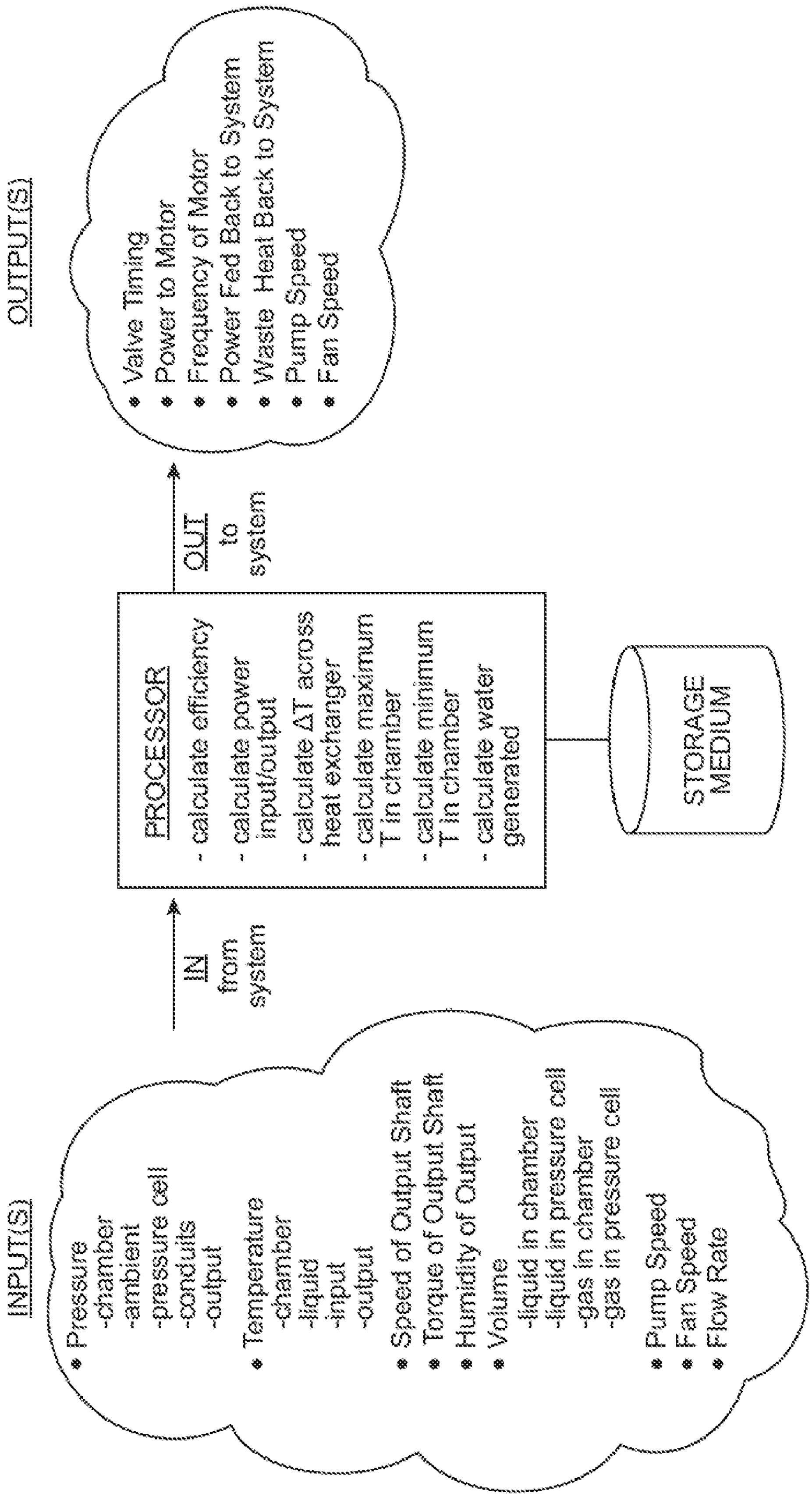
FIG. 21 is an embodiment of a block diagram showing inputs and outputs to a controller responsible for controlling operation of various elements of an apparatus according to the present invention.

FIG. 21 is a schematic diagram showing the relationship between the processor/controller, and the various inputs received, functions performed, and outputs produced by the processor controller. As indicated, the processor may control various operational properties of the apparatus, based upon one or more inputs.

Figure 11A:
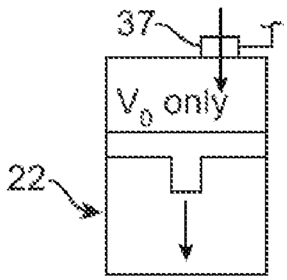
FIGS. 11A-11F show operation of the controller to control the timing of various valves.
Figure 11D:
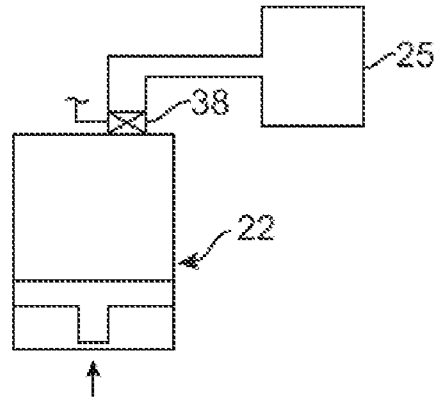
Figure 11B:
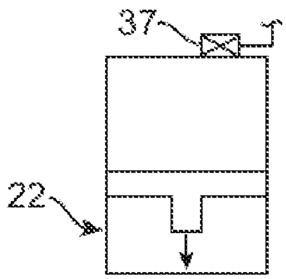
Figure 11E:
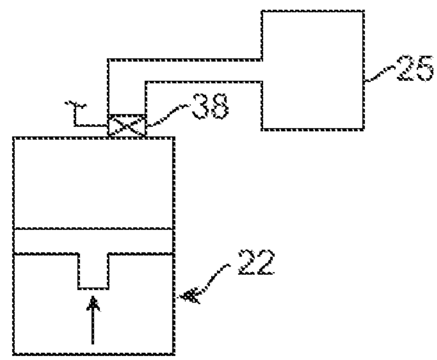
Figure 11C:
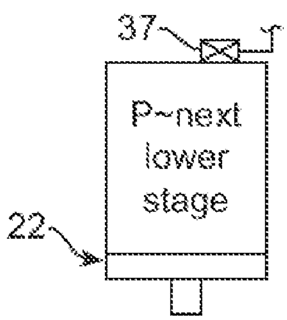

An example of such an operational parameter that may be controlled is the timing of opening and closing of a valve allowing the inlet of air to the cylinder during an expansion cycle. FIGS. 11A-C is a simplified and enlarged view of the cylinder 22 of the single-stage system of FIG. 1, undergoing an expansion cycle as described previously.

Specifically, during step 2 of the expansion cycle, a predetermined amount of air $V_0$, is added to the chamber from the pressure cell, by opening valve 37 for a controlled interval of time. This amount of air $V_0$ is calculated such that when the piston reaches the end of the expansion stroke, a desired pressure within the chamber will be achieved.

In certain cases, this desired pressure will approximately equal that of the next lower pressure stage, or atmospheric pressure if the stage is the lowest pressure stage or is the only stage. Thus at the end of the expansion stroke, the energy in the initial air volume $V_0$ has been fully expended, and little or no energy is wasted in moving that expanded air to the next lower pressure stage.

To achieve this goal, valve 37 is opened only for so long as to allow the desired amount of air ($V_0$) to enter the chamber, and thereafter in steps 3-4 (FIGS. 11B-C), valve 37 is maintained closed. In certain embodiments, the desired pressure within the chamber may be within 1 psi, within 5 psi, within 10 psi, or within 20 psi of the pressure of the next lower stage.

In other embodiments, the controller/processor may control valve 37 to cause it to admit an initial volume of air that is greater than $V_0$. Such instructions may be given, for example, when greater power is desired from a given expansion cycle, at the expense of efficiency of energy recovery.

Timing of opening and closing of valves may also be carefully controlled during compression. For example, as shown in FIGS. 11D-E, in the steps 2 and 3 of the table corresponding to the addition of mist and compression, the valve 38 between the cylinder device and the pressure cell remains closed, and pressure builds up within the cylinder.

In conventional compressor apparatuses, accumulated compressed air is contained within the vessel by a check valve, that is designed to mechanically open in response to a threshold pressure. Such use of the energy of the compressed air to actuate a check valve, detracts from the efficiency of recovery of energy from the air for performing useful work.

Figure 11F:
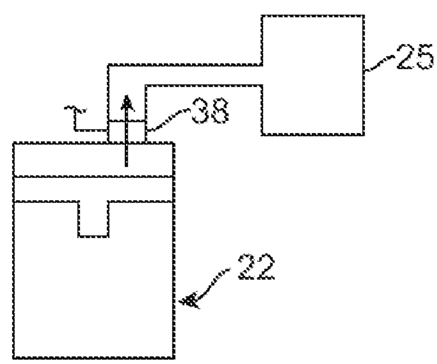

By contrast, as shown in FIG. 11F, embodiments of the present invention may utilize the controller/processor to precisely open valve 38 under the desired conditions, for example where the built-up pressure in the cylinder exceeds the pressure in the pressure cell by a certain amount. In this manner, energy from the compressed air within the cylinder is not consumed by the valve opening process, and efficiency of energy recovery is enhanced. Embodiments of valve types that may be subject to control to allow compressed air to flow out of a cylinder include but are not limited to pilot valves, cam-operated poppet valves, rotary valves, hydraulically actuated valves, and electronically actuated valves.

While the timing of operation of valves 37 and 38 of the single stage apparatus may be controlled as described above, it should be appreciated that valves in other embodiments may be similarly controlled. Examples of such valves include but are not limited to valves 130, 132, 133, 134, 136, and 137 of FIG. 3, valves 37*b* and 38*b* of FIG. 4, valves 37*b*1, 38*b*1, 37*b*2 and 38*b*2 of FIG. 5, valves 106*c* and 114*c* of FIG. 6, and the valves 37*b*1-4 and 38*b*1-4 that are shown in FIG. 7.

Another example of a system parameter that can be controlled by the processor, is the amount of liquid introduced into the chamber. Based upon one or more values such as pressure, humidity, calculated efficiency, and others, an amount of liquid that is introduced into the chamber during compression or expansion, can be carefully controlled to maintain efficiency of operation. For example, where an amount of air greater than $V_0$ is inlet into the chamber during an expansion cycle, additional liquid may need to be introduced in order to maintain the temperature of that expanding air within a desired temperature range.

The present invention is not limited to those particular embodiments described above. Other methods and apparatuses may fall within the scope of the invention. For example, the step of adding liquid to a cylinder device is not required during every cycle. In addition, liquid may be added to the chamber at the same time air is being inlet.

Figure 12A:
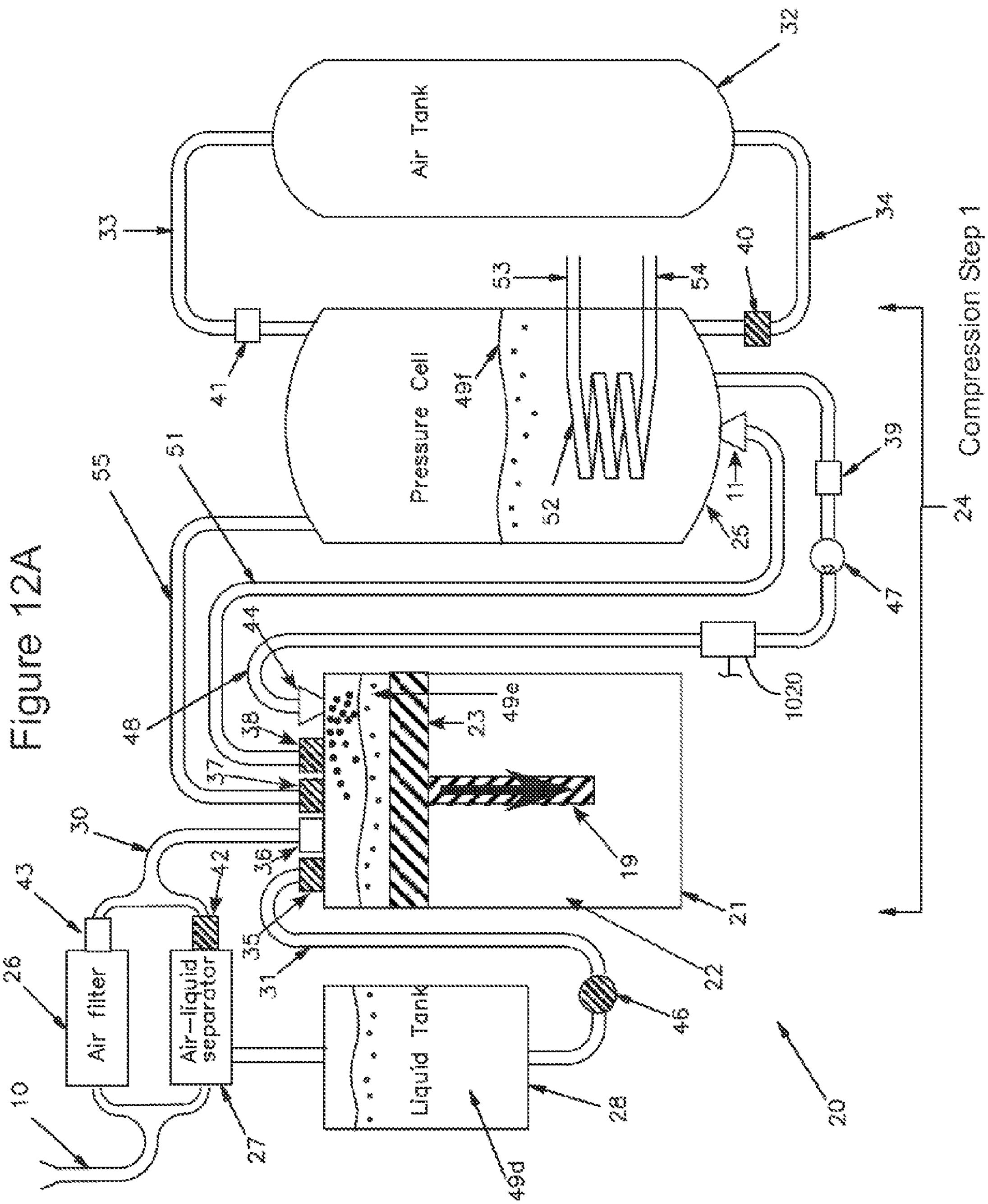
FIGS. 12A-C show the configuration of an apparatus during steps of a compression cycle according to an embodiment of the present invention.
Figure 12B:
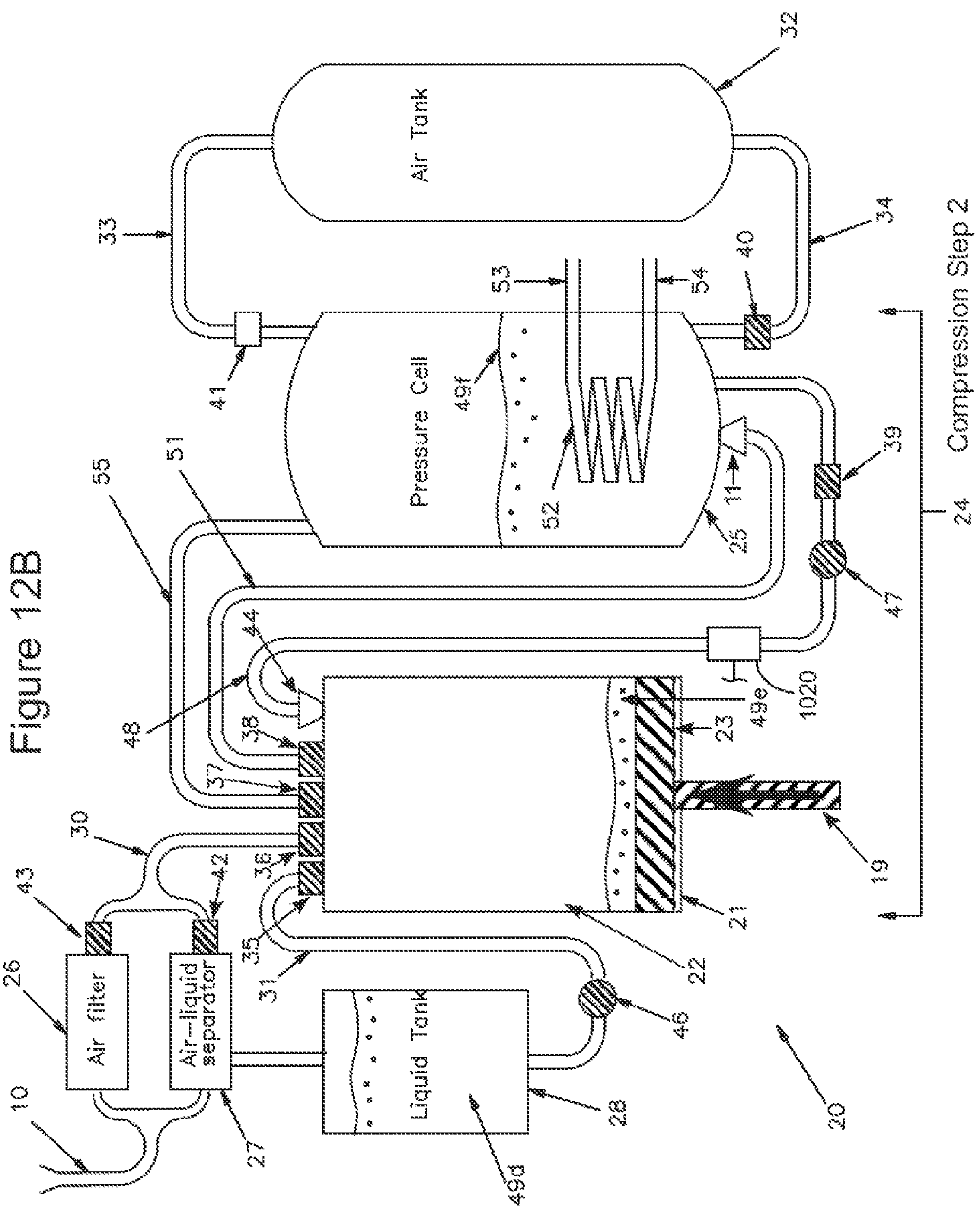
Figure 12C:
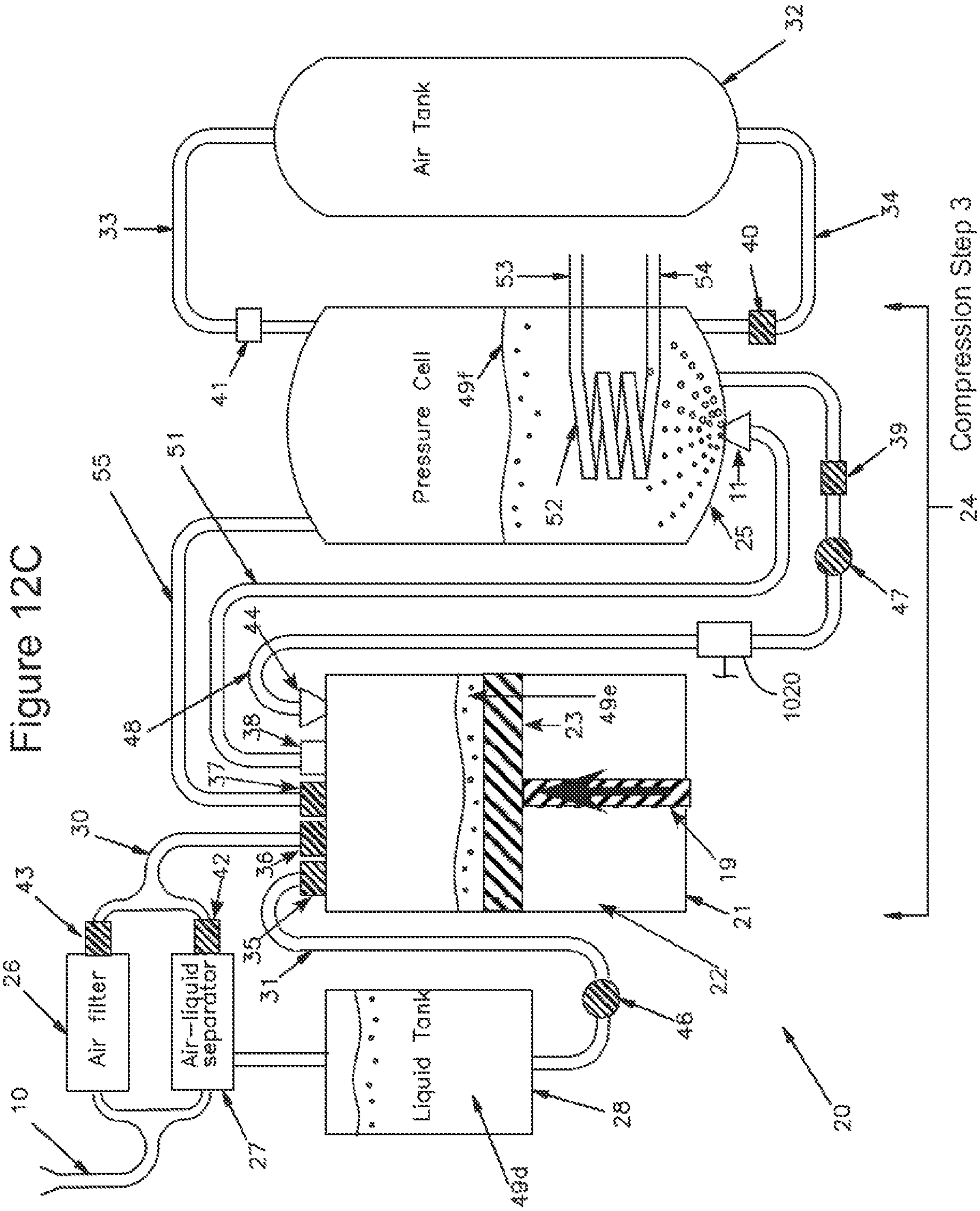

Accordingly, the following table describes steps in an embodiment of a compression cycle for a single-stage system utilizing liquid mist to effect heat exchange, as shown in connection with FIGS. 12A-C, where similar elements as in FIG. 1 are shown:

| | Step | | |
|---|---|---|---|
| | 1 | 2 | 3 |
| Description | Refill cylinder device | Compress | Move compressed air to pressure cell |
| Valve 35 | Closed | Closed | Closed |
| Valve 36 | Open | Closed | Closed |
| Valve 37 | Closed | Closed | Closed |
| Valve 38 | Closed | Closed | Open |
| Valve 39 | Open | Closed | Closed |
| Valve 40 | Closed | Closed | Closed |
| Valve 41 | Open | Open | Open |
| Valve 42 | Closed | Closed | Closed |
| Valve 43 | Open | Closed | Closed |
| Pump 46 | Off | Off | Off |
| Pump 47 | On | Off | Off |
| Piston 23 | At TDC at start of step | At BDC at start of step | Between BDC and TDC |

Figure 13A:
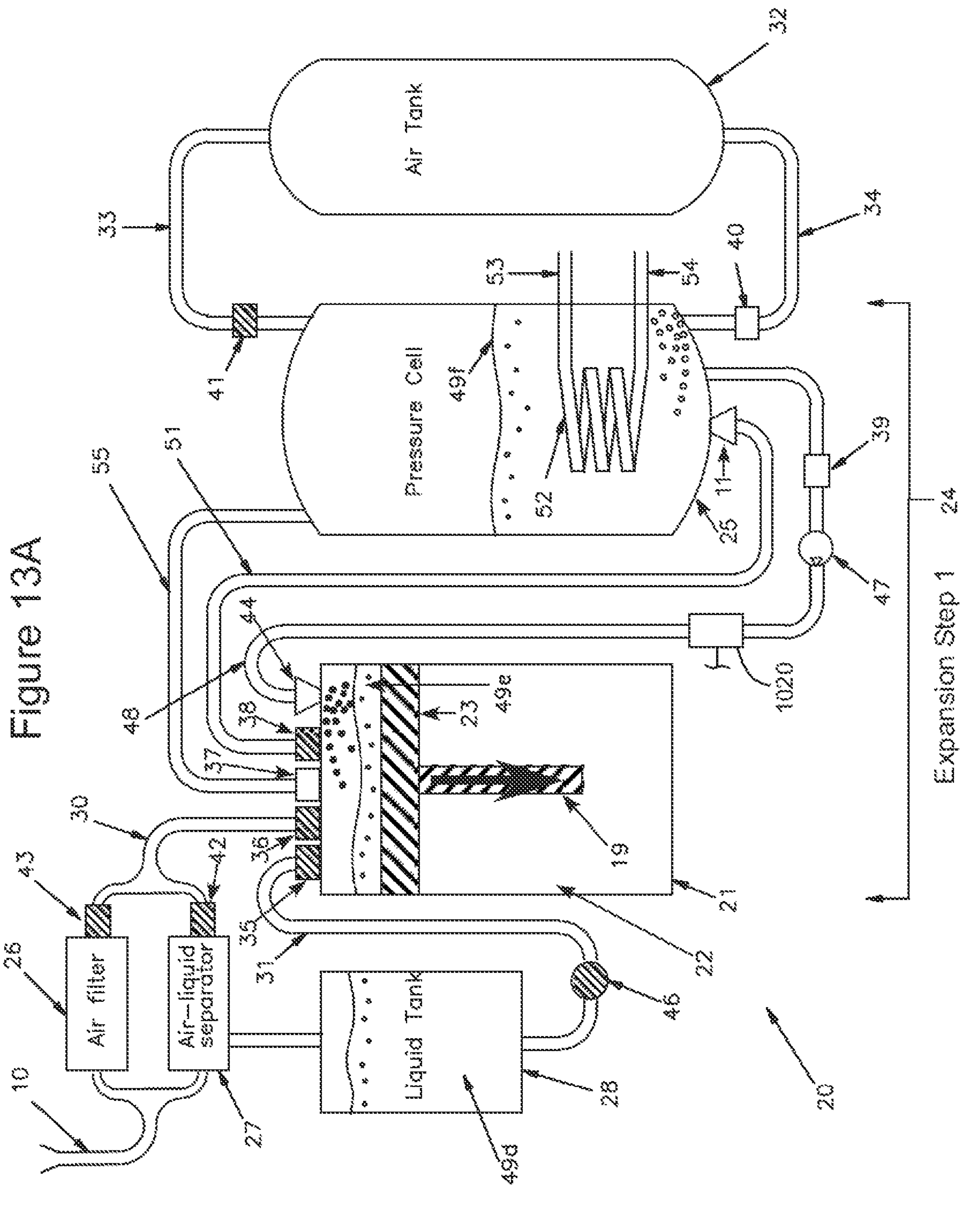
FIGS. 13A-C show the configuration of an apparatus during steps of an expansion cycle according to an embodiment of the present invention.
Figure 13B:
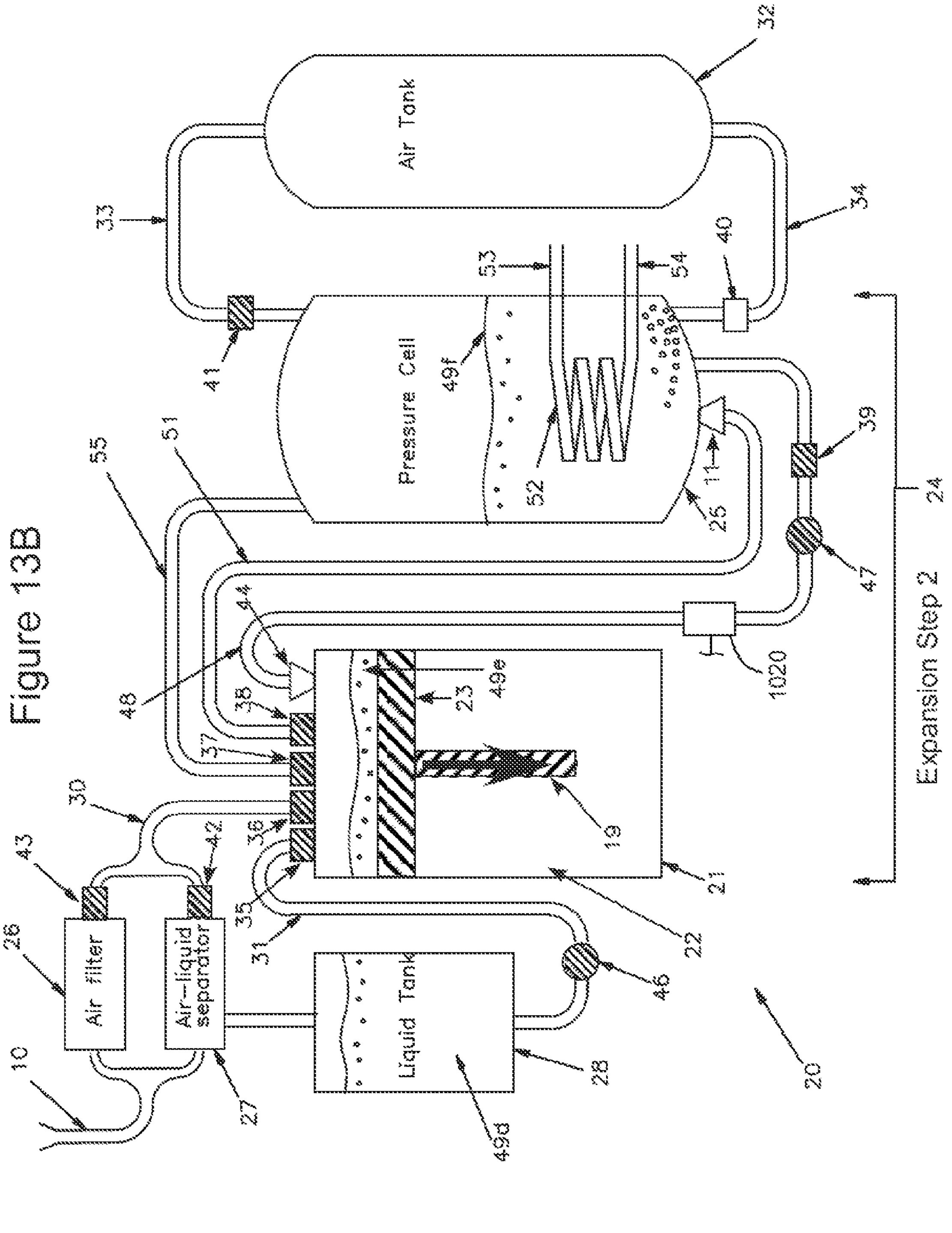
Figure 13C:
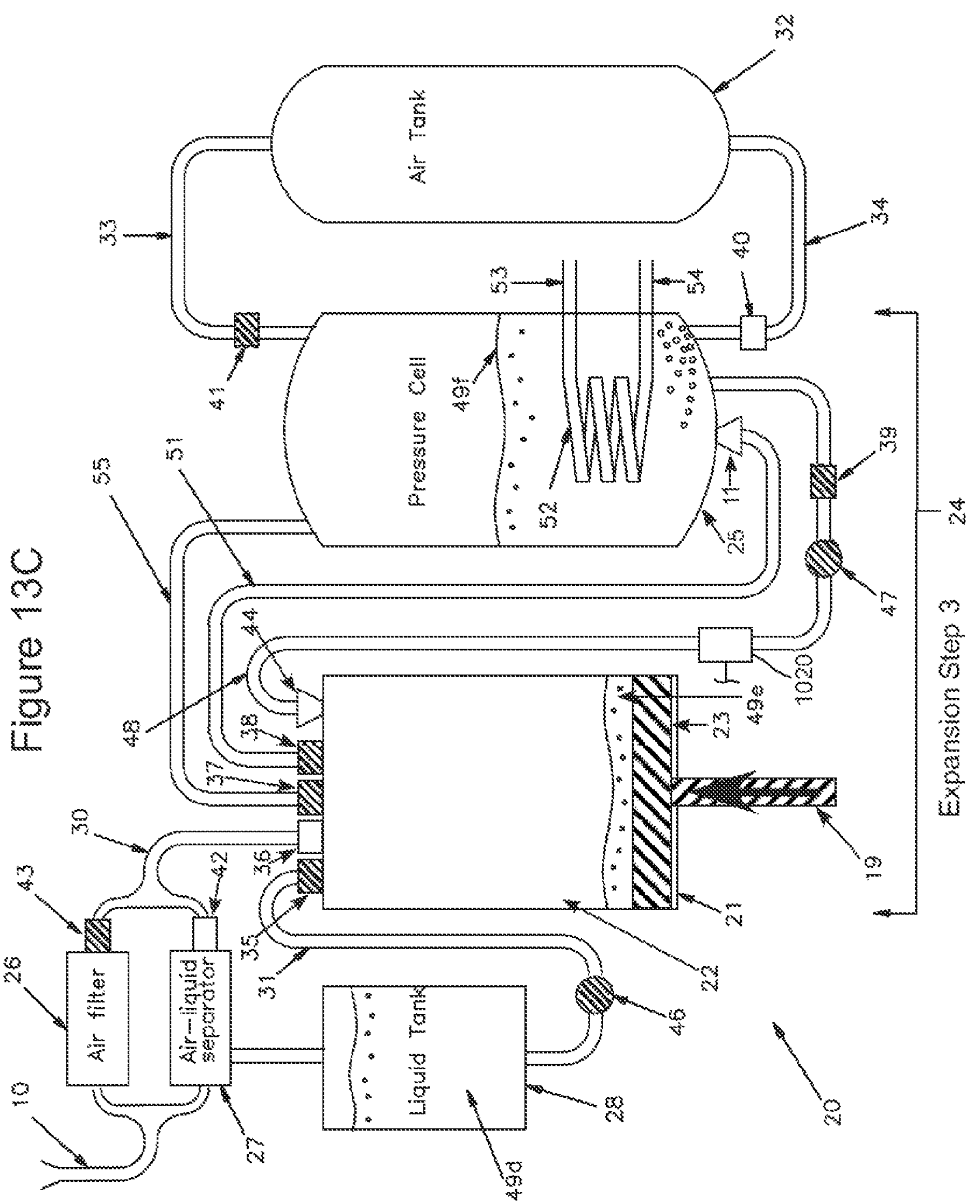

The corresponding expansion cycle where liquid is introduced at the same time as air, is shown in the table below, in connection with FIGS. 13A-C:

| | Step | | |
|---|---|---|---|
| | 1 | 2 | 3 |
| Description | Add compressed air and liquid mist to cylinder device | Expansion | Exhaust spent air |
| Valve 35 | Closed | Closed | Closed |
| Valve 36 | Closed | Closed | Open |
| Valve 37 | Open | Closed | Closed |
| Valve 38 | Closed | Closed | Closed |
| Valve 39 | Open | Closed | Closed |
| Valve 40 | Open | Open | Open |
| Valve 41 | Closed | Closed | Closed |
| Valve 42 | Closed | Closed | Open |
| Valve 43 | Closed | Closed | Closed |
| Pump 46 | Off | Off | Off |
| Pump 47 | On | Off | Off |
| Piston 23 | At TDC at start of step | Near TDC at start of step | At BDC at start of step |

Figure 14A:
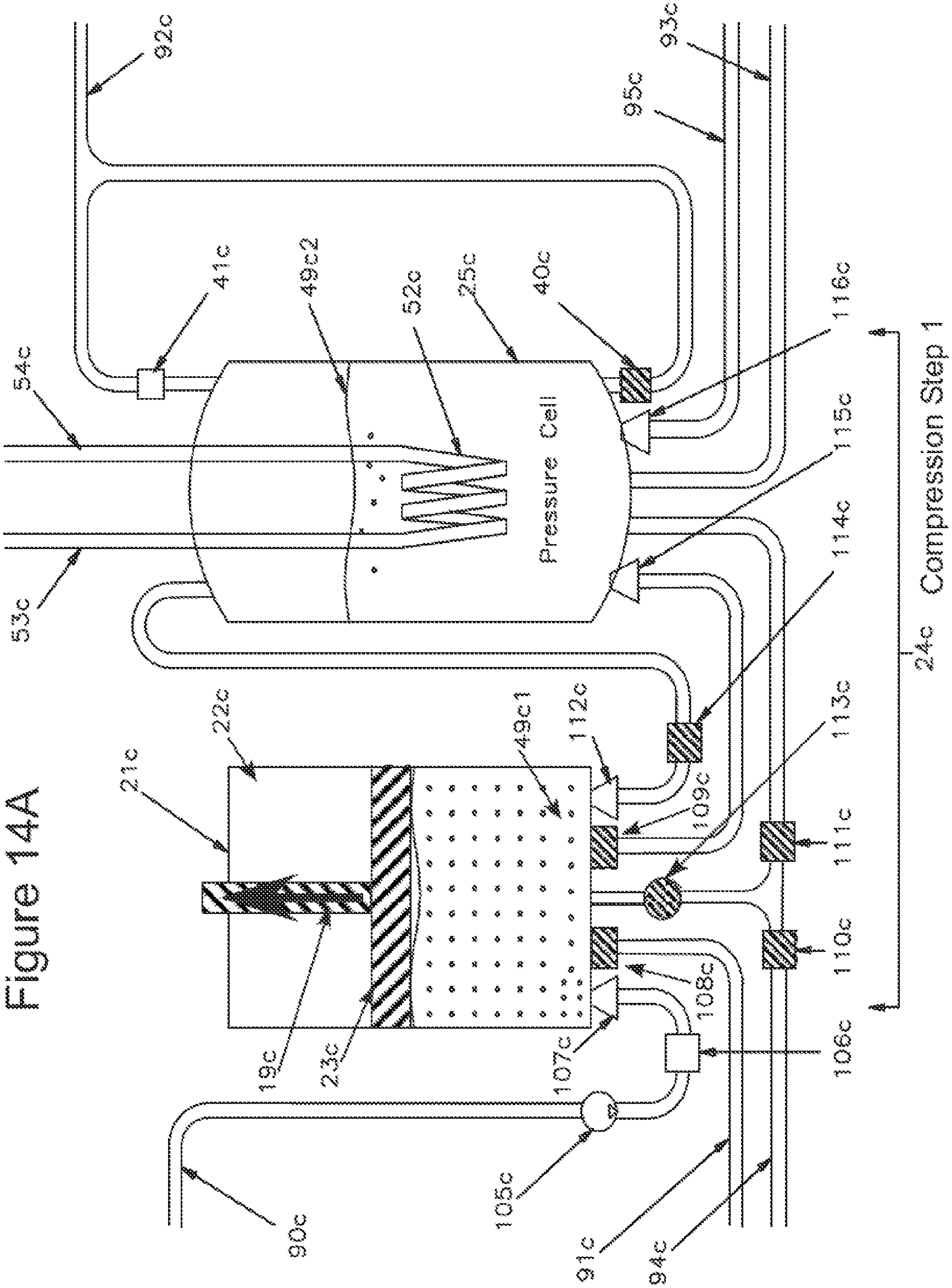
FIGS. 14A-C show the configuration of an apparatus during steps of a compression cycle according to an embodiment of the present invention.
Figure 14B:
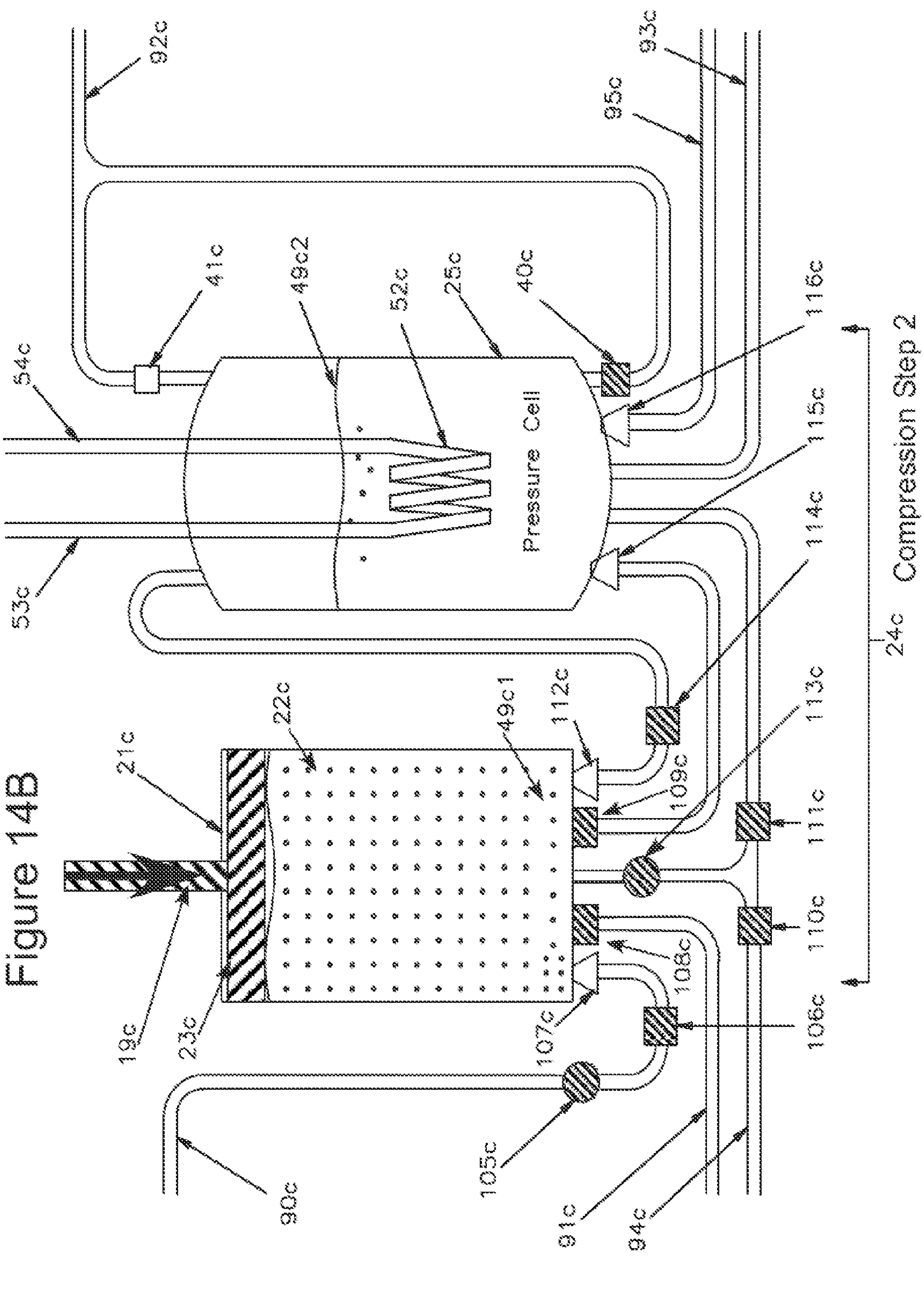
Figure 14C:
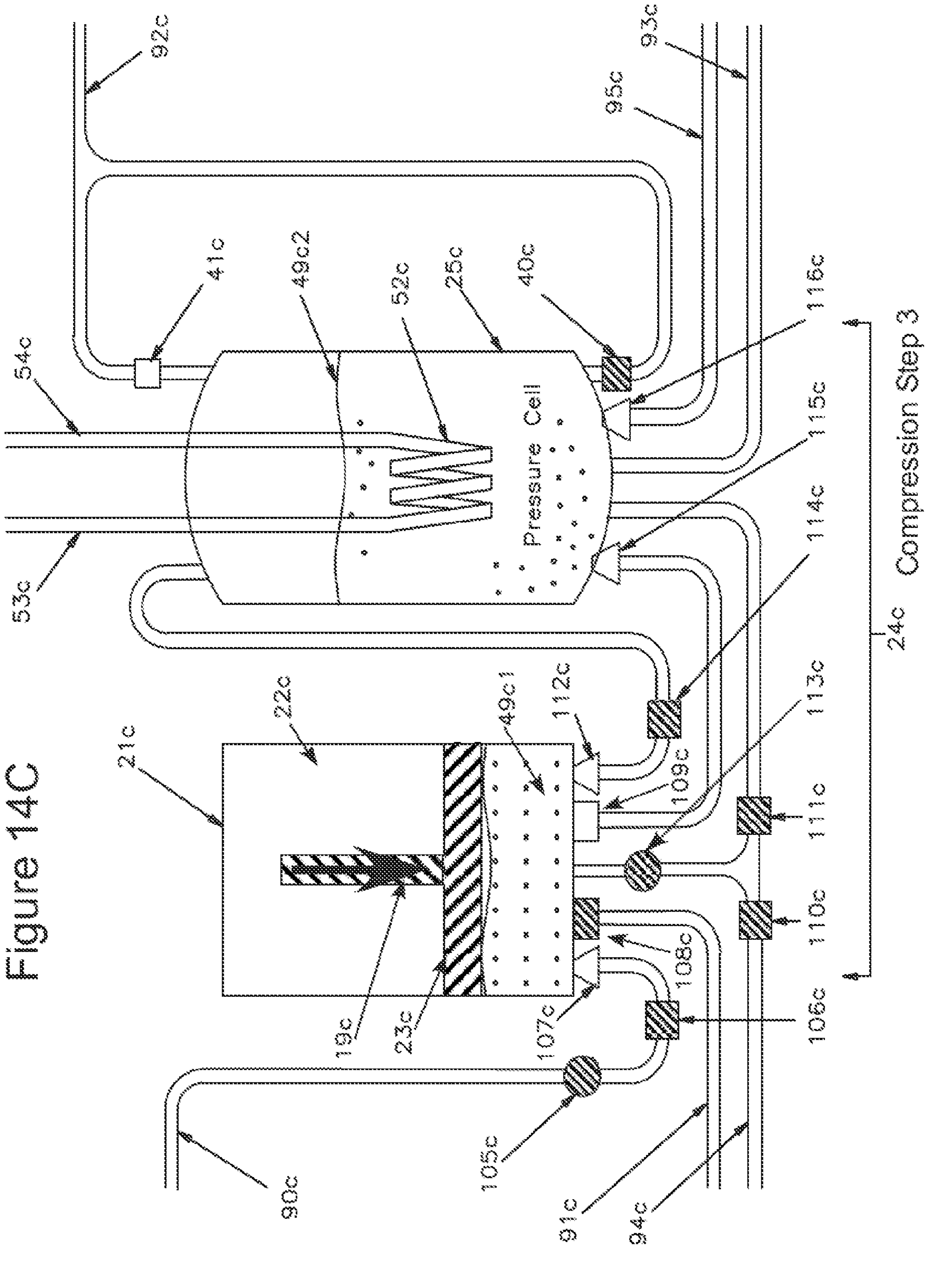

Moreover, where bubbles are utilized to effect heat exchange, the step of replenishing liquid is not required in every cycle. The following table, in conjunction with FIGS. 14A-C, describes steps in an embodiment of a compression cycle for a single-stage system utilizing bubbles to effect heat exchange, where elements similar to those in FIG. 6 are referenced:

| | Step | | |
|---|---|---|---|
| | 1 | 2 | 3 |
| Description | Fill cylinder device with air | Compress | Transfer air to pressure cell |
| Valve 108c | Closed | Closed | Closed |
| Valve 109c | Closed | Closed | Open |
| Valve 114c | Closed | Closed | Closed |
| Valve 41c | Open | Open | Open |
| Valve 40c | Closed | Closed | Closed |
| Valve 106c | Open | Closed | Closed |
| Valve 110c | Closed | Closed | Closed |
| Valve 111c | Closed | Closed | Closed |
| Pump 105c | On | Off | Off |
| Pump 113c | Off | Off | Off |
| Piston 23c | At top of liquid at start of step | At TDC at start of step | Near BDC at start of step |

Figure 15A:
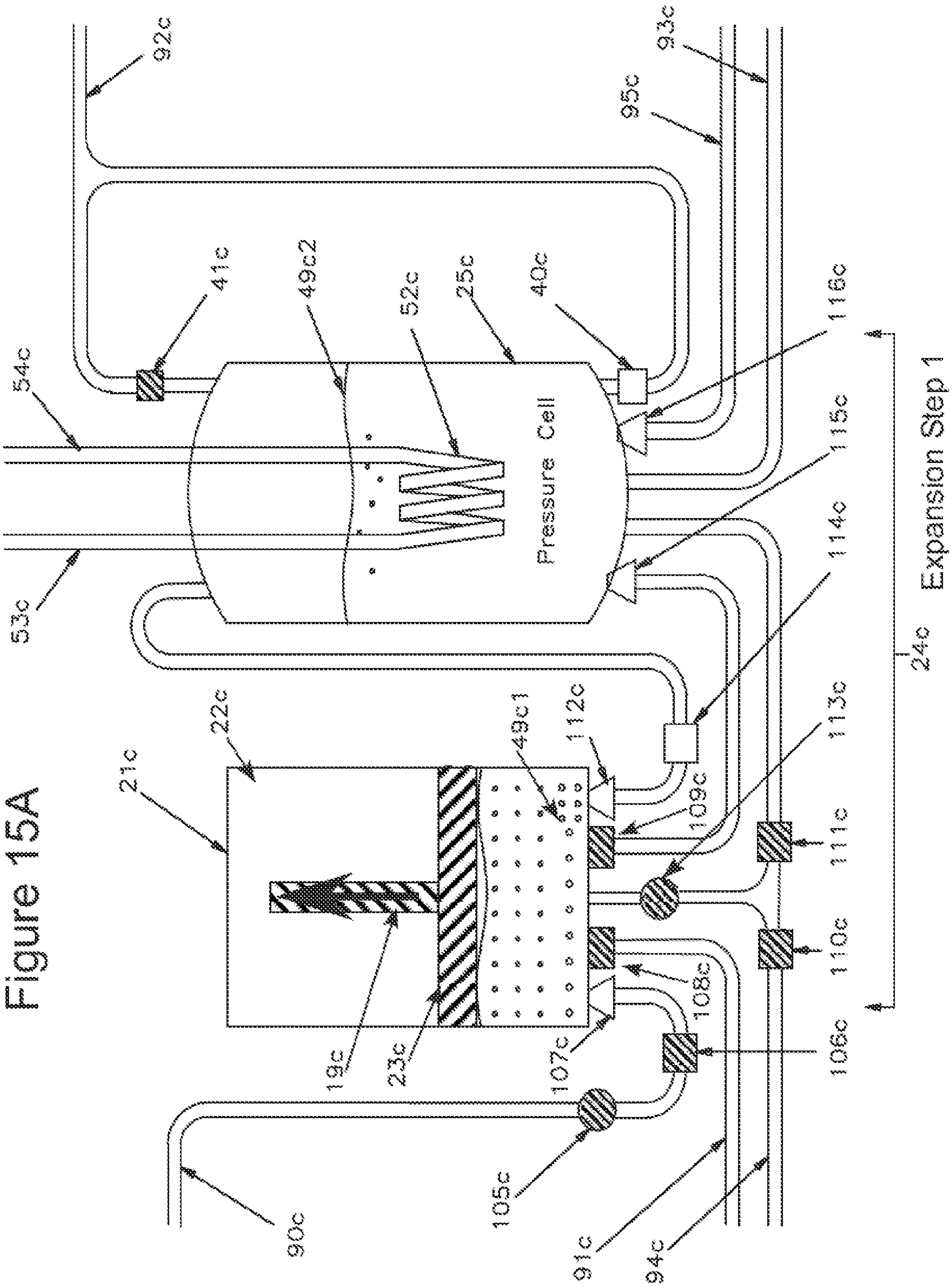
FIGS. 15A-C show the configuration of an apparatus during steps of an expansion cycle according to an embodiment of the present invention.
Figure 15B:
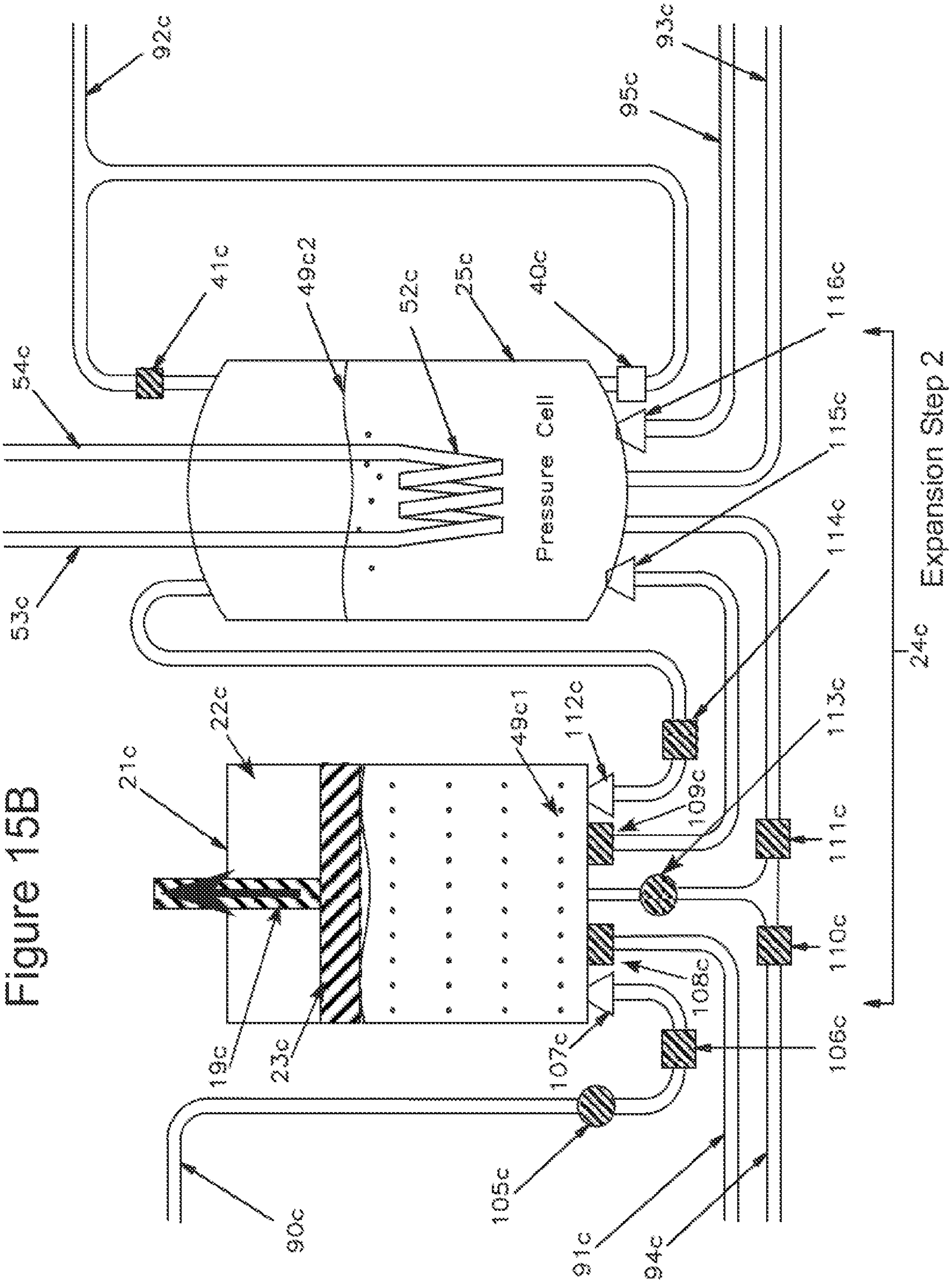
Figure 15C:
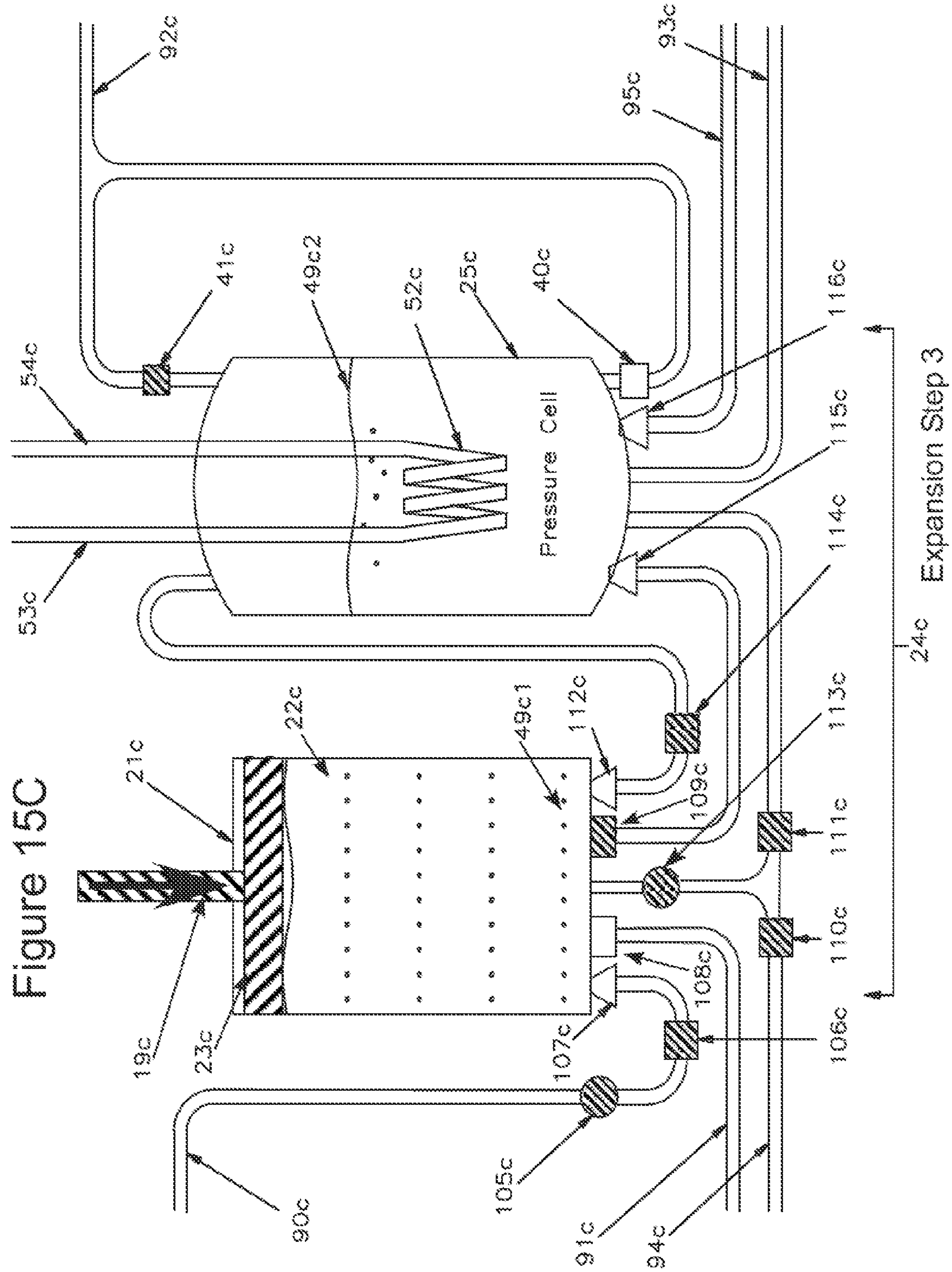
Figure 18A:
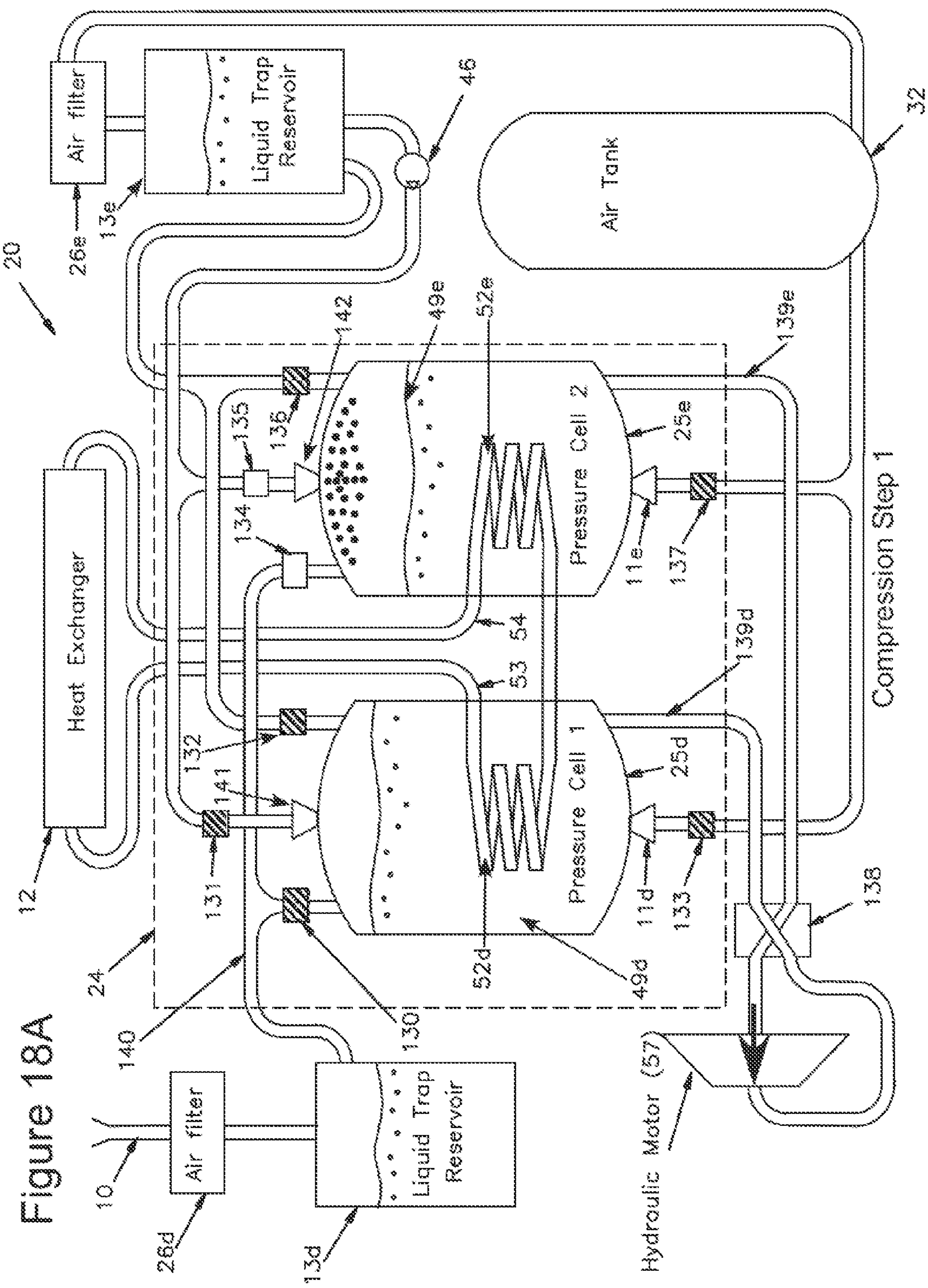
FIGS. 18A-D show the configuration of an apparatus during steps of a compression cycle according to an embodiment of the present invention.
Figure 18B:
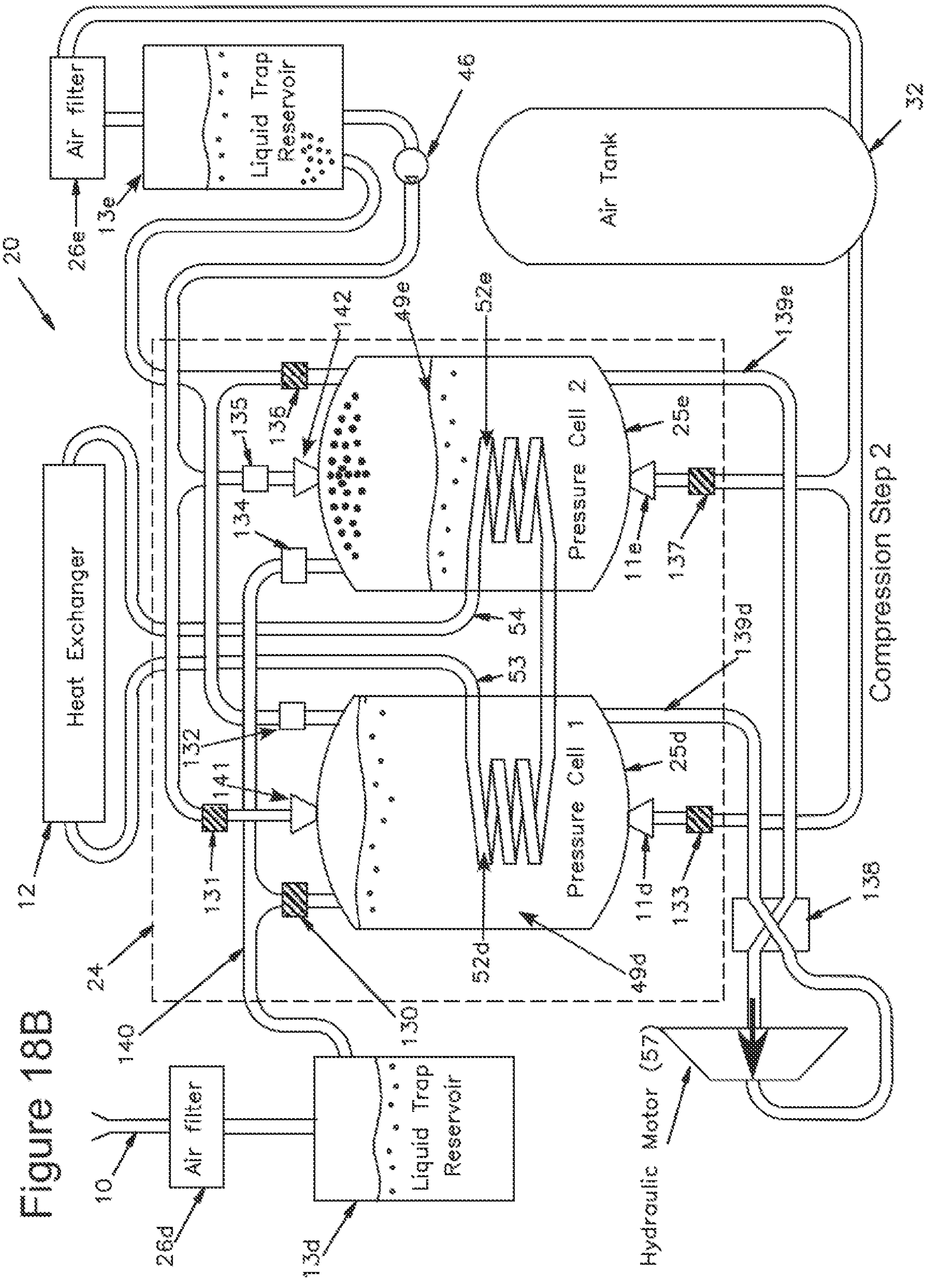
Figure 18C:
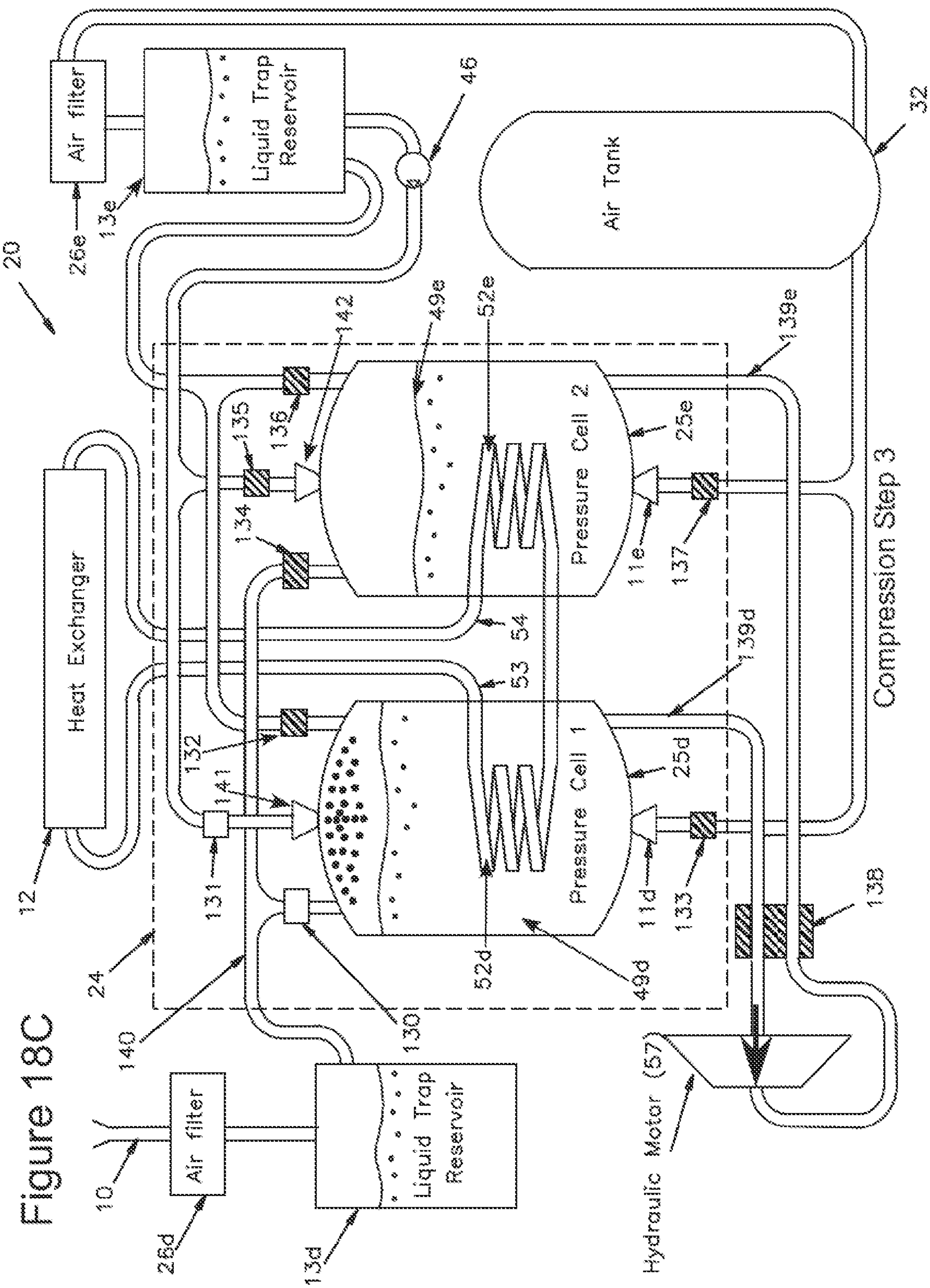
Figure 18D:
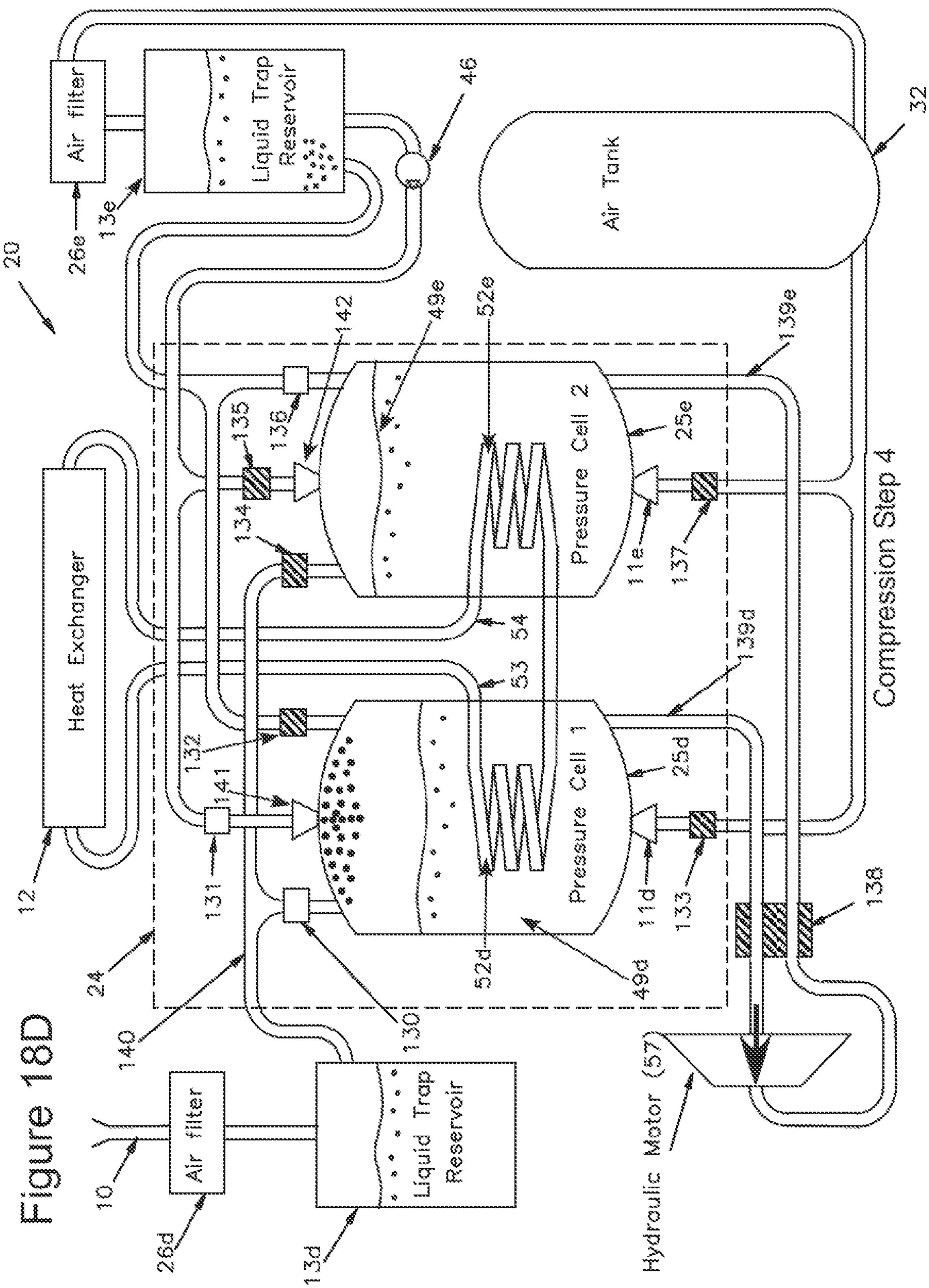
Figure 19A:
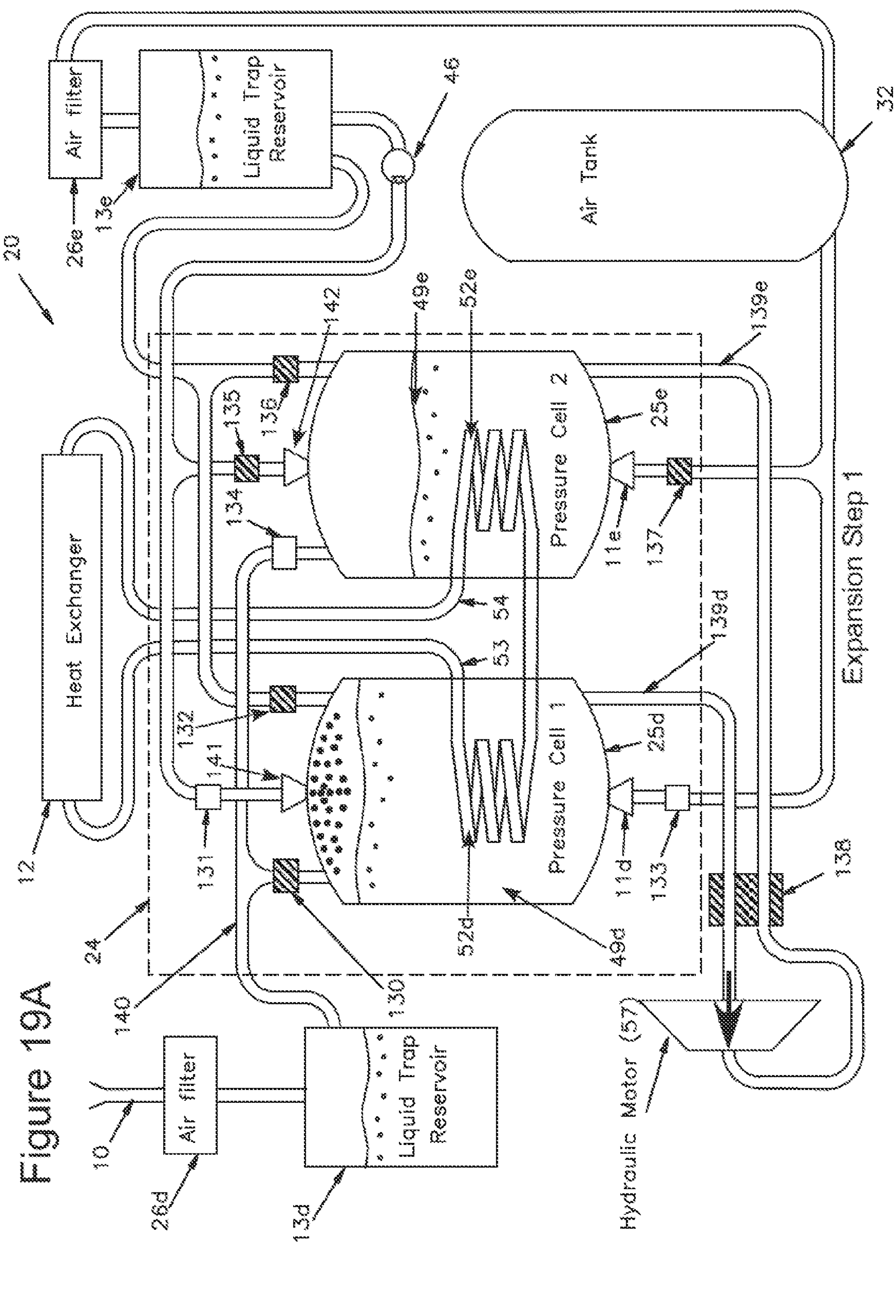
FIGS. 19A-D show the configuration of an apparatus during steps of an expansion cycle according to an embodiment of the present invention.
Figure 19B:
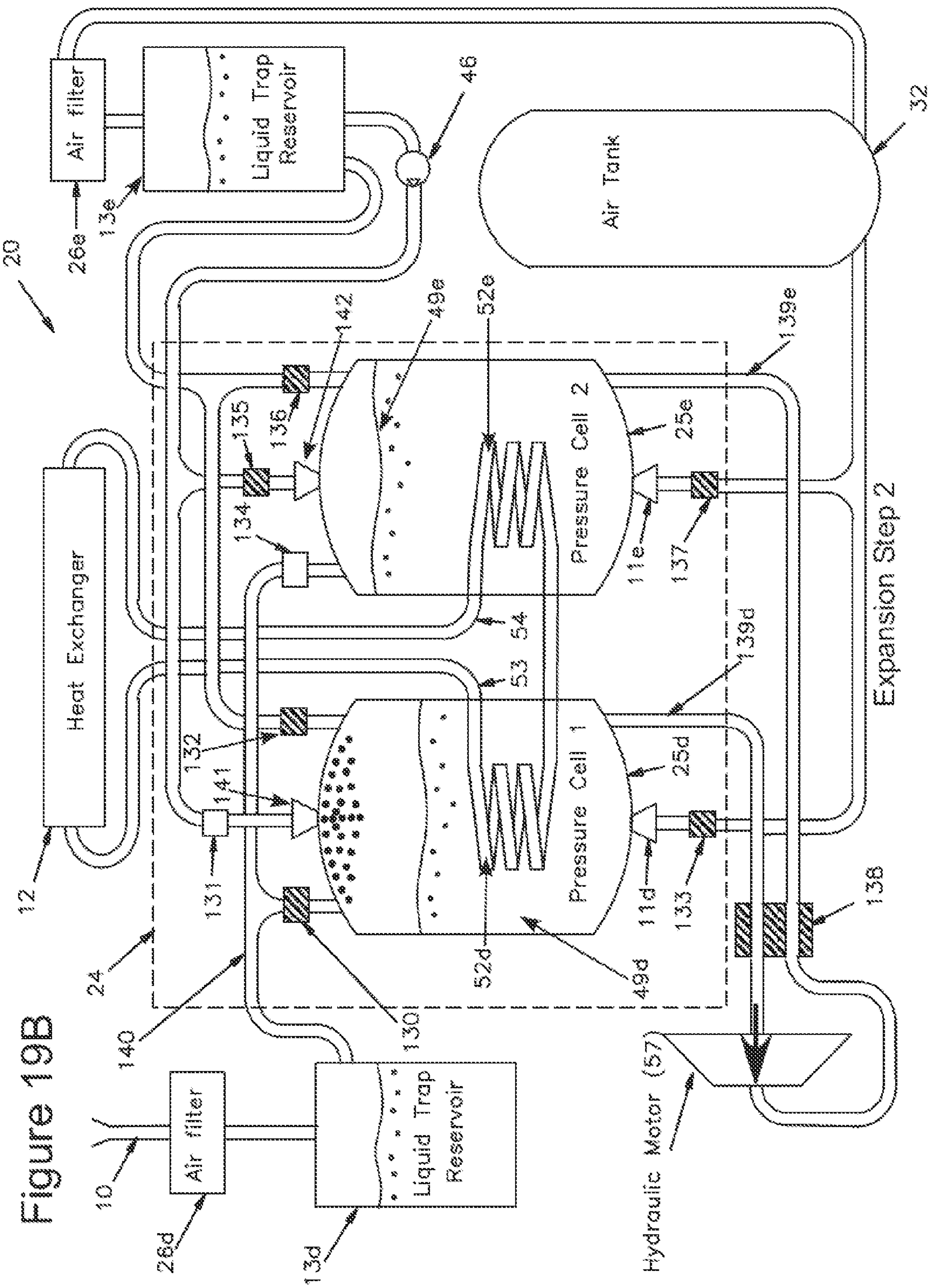
Figure 19C:
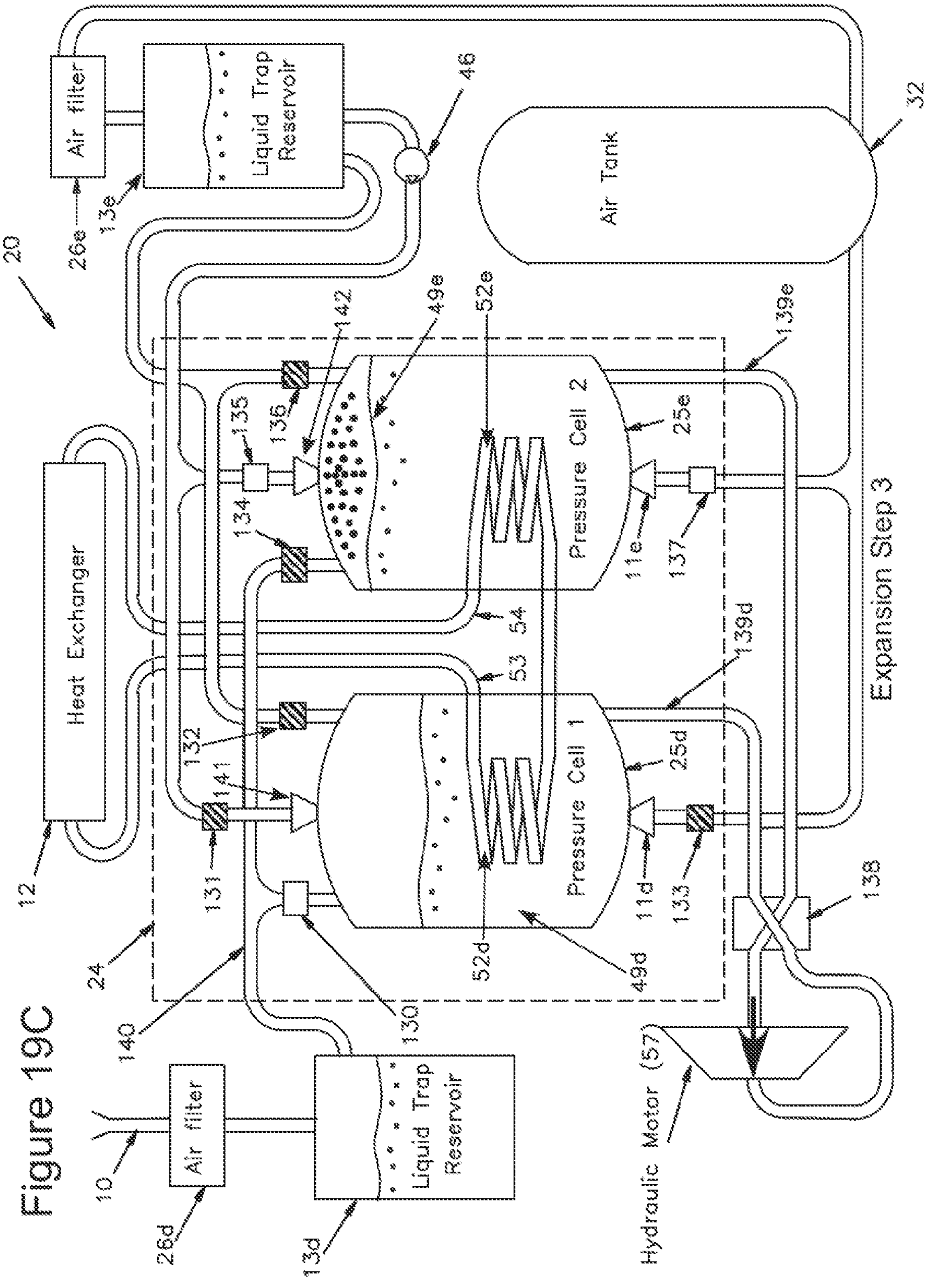
Figure 19D:
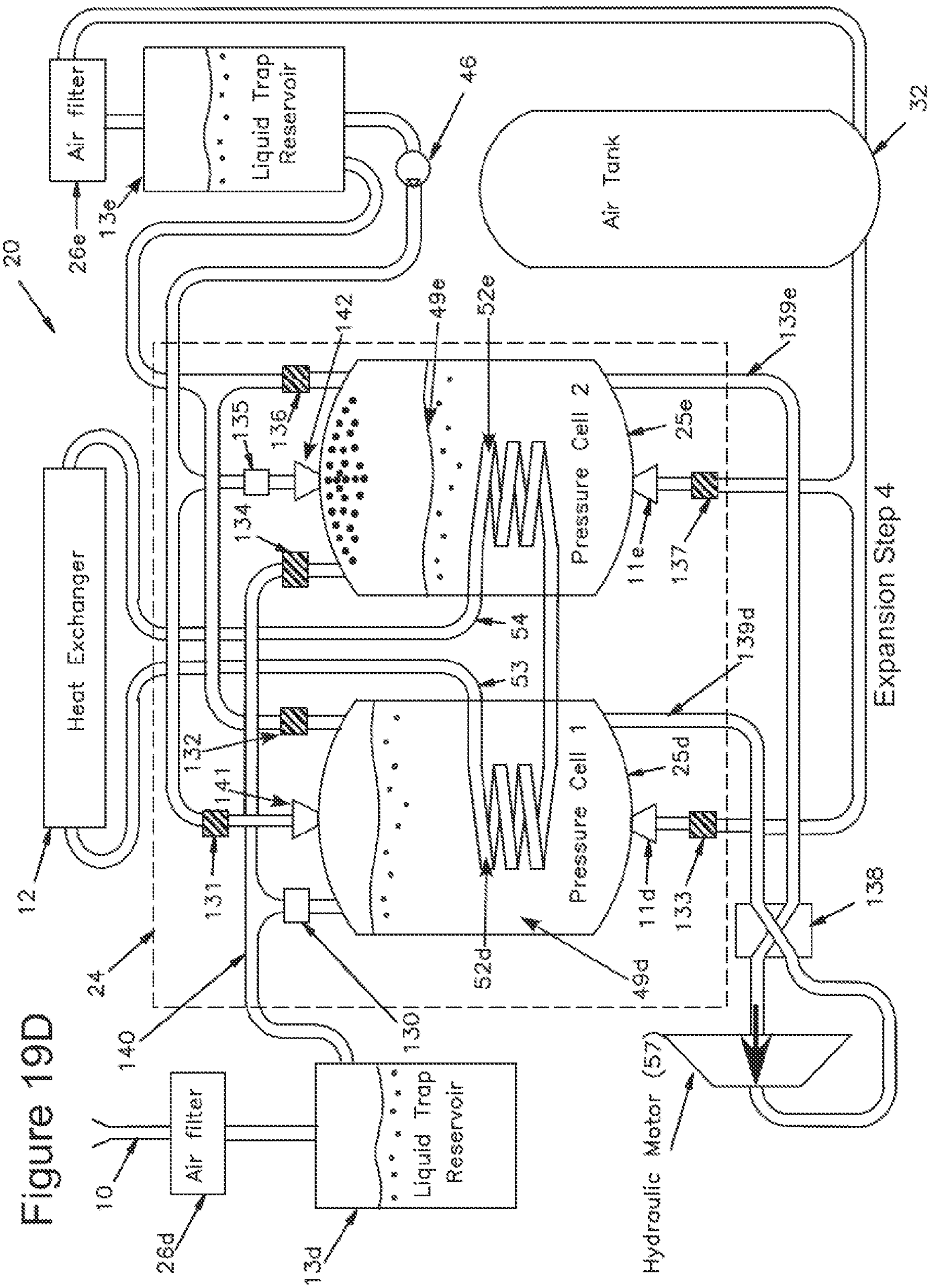

The corresponding expansion cycle for this system is shown in the table below in conjunction with FIGS. 15A-C:

| | Step | | |
|---|---|---|---|
| | 1 | 2 | 3 |
| Description | Add compressed air to cylinder device | Expansion | Exhaust spent air |
| Valve 108c | Closed | Closed | Open |
| Valve 109c | Closed | Closed | Closed |
| Valve 114c | Open | Closed | Closed |
| Valve 41c | Closed | Closed | Closed |
| Valve 40c | Open | Open | Open |
| Valve 106c | Closed | Closed | Closed |
| Valve 110c | Closed | Closed | Closed |
| Valve 111c | Closed | Closed | Closed |
| Pump 105c | Off | Off | Off |
| Pump 113c | Off | Off | Off |
| Piston 23c | At top of liquid | Near top of liquid | At TDC at start |

Shown in FIGS. 16A-D and in the table below, are the steps of an embodiment of a compression cycle for a multi-phase stage, referencing the elements of FIG. 5:

| | Step | | | |
|---|---|---|---|---|
| | 1 | 2 | 3 | 4 |
| Description | Add mist and air to chamber 22b1 and compress air in chamber 22b2 | Continue, moving air to pressure cell | Add mist and air to chamber 22b2 and compress air in chamber 22b1 | Continue, moving air to pressure cell |
| Valve 35b1 | Open | Open | Closed | Closed |
| Valve 36b1 | Closed | Closed | Closed | Closed |
| Valve 37b1 | Closed | Closed | Closed | Closed |
| Valve 38b1 | Closed | Closed | Closed | Open |
| Valve 39b1 | Open | Open | Closed | Closed |
| Valve 35b2 | Closed | Closed | Open | Open |
| Valve 36b2 | Closed | Closed | Closed | Closed |
| Valve 37b2 | Closed | Closed | Closed | Closed |
| Valve 38b2 | Closed | Open | Closed | Closed |

-continued

| | Step | | | |
|---|---|---|---|---|
| | 1 | 2 | 3 | 4 |
| Valve 39b2 | Closed | Closed | Open | Open |
| Valve 40b | Closed | Closed | Closed | Closed |
| Valve 41b | Open | Open | Open | Open |
| Pump 47b | On | On | On | On |
| Piston 23b | TDC at start of step | Between TDC and BDC, moving down | BDC at start of step | Between BDC and TDC, moving up |

The corresponding expansion cycle for the double-acting stage is illustrated in FIGS. 17A-D and in the following table:

| | Step | | | |
|---|---|---|---|---|
| | 1 | 2 | 3 | 4 |
| Description | Add mist and air to chamber 22b1 and exhaust air from chamber 22b2 | Allow air in chamber 22b1 to expand and continue exhausting air from chamber 22b2 | Add mist and air to chamber 22b2 and exhaust air from chamber 22b1 | Allow air in chamber 22b2 to expand and continue exhausting air from chamber 22b1 |
| Valve 35b1 | Closed | Closed | Open | Open |
| Valve 36b1 | Closed | Closed | Closed | Closed |
| Valve 37b1 | Open | Closed | Closed | Closed |
| Valve 38b1 | Closed | Closed | Closed | Closed |
| Valve 39b1 | Open | Closed | Closed | Closed |
| Valve 35b2 | Open | Open | Closed | Closed |
| Valve 36b2 | Closed | Closed | Closed | Closed |
| Valve 37b2 | Closed | Closed | Open | Closed |
| Valve 38b2 | Closed | Closed | Closed | Closed |
| Valve 39b2 | Closed | Closed | Open | Closed |
| Valve 40b | Open | Open | Open | Open |
| Valve 41b | Closed | Closed | Closed | Closed |
| Pump 47b | On | Off | On | Off |
| Piston 23b | TDC at start of step | Between TDC and BDC, moving down | BDC at start of step | Between BDC and TDC, moving up |

A compression cycle for a single-stage, single-acting energy storage system shown in FIGS. 18A-D, is described in the table below, with mist sprayed at the time of inlet of air into the cylinder, with similar elements as shown in FIG. 3:

| | Step | | | |
|---|---|---|---|---|
| | 1 | 2 | 3 | 4 |
| Description | Compress air in cell 25d while spraying mist, and replenish the air in cell 25e | Move compressed air from cell 25d to air tank | Compress air in cell 25e while spraying mist, and replenish the air in cell 25d | Move compressed air from cell 25e to air tank |
| Valve 130 | Closed | Closed | Open | Open |
| Valve 131 | Closed | Closed | Open | Open |
| Valve 132 | Closed | Open | Closed | Closed |
| Valve 133 | Closed | Closed | Closed | Closed |
| Valve 134 | Open | Open | Closed | Closed |
| Valve 135 | Open | Open | Closed | Closed |
| Valve 136 | Closed | Closed | Closed | Open |
| Valve 137 | Closed | Closed | Closed | Closed |
| Valve 138 | Fluid out from cell 25e, in to cell 25d | Fluid out from cell 25e, in to cell 25d | Fluid out from cell 25d, in to cell 25e | Fluid out from cell 25d, in to cell 25e |
| Pump 46 | On | On | On | On |

The corresponding expansion cycle of the single-stage, single-acting energy storage system proceeds as follows as shown in FIGS. 19A-D:

| | Step | | | |
|---|---|---|---|---|
| | 1 | 2 | 3 | 4 |
| Description | Add air to cell 25d while spraying mist, and move air from cell 25e | Expand air in cell 25d while spraying mist, continue to exhaust cell 25e | Add air to cell 25e while spraying mist, and move air from cell 25d | Expand air in cell 25e while spraying mist, continue to exhaust cell 25d |
| Valve 130 | Closed | Closed | Open | Open |
| Valve 131 | Open | Open | Closed | Closed |
| Valve 132 | Closed | Closed | Closed | Closed |
| Valve 133 | Open | Closed | Closed | Closed |
| Valve 134 | Open | Open | Closed | Closed |
| Valve 135 | Closed | Closed | Open | Open |
| Valve 136 | Closed | Closed | Closed | Closed |
| Valve 137 | Closed | Closed | Open | Closed |
| Valve 138 | Fluid out from cell 25d, in to cell 25e | Fluid out from cell 25d, in to cell 25e | Fluid out from cell 25e, in to cell 25d | Fluid out from cell 25e, in to cell 25d |
| Pump 46 | On | On | On | On |

Variations on the specific embodiments describe above, are possible. For example, in some embodiments, a plurality of pistons may be in communication with a common chamber. In other embodiments, a multistage apparatus may not include a separate pressure cell.

Figure 4:
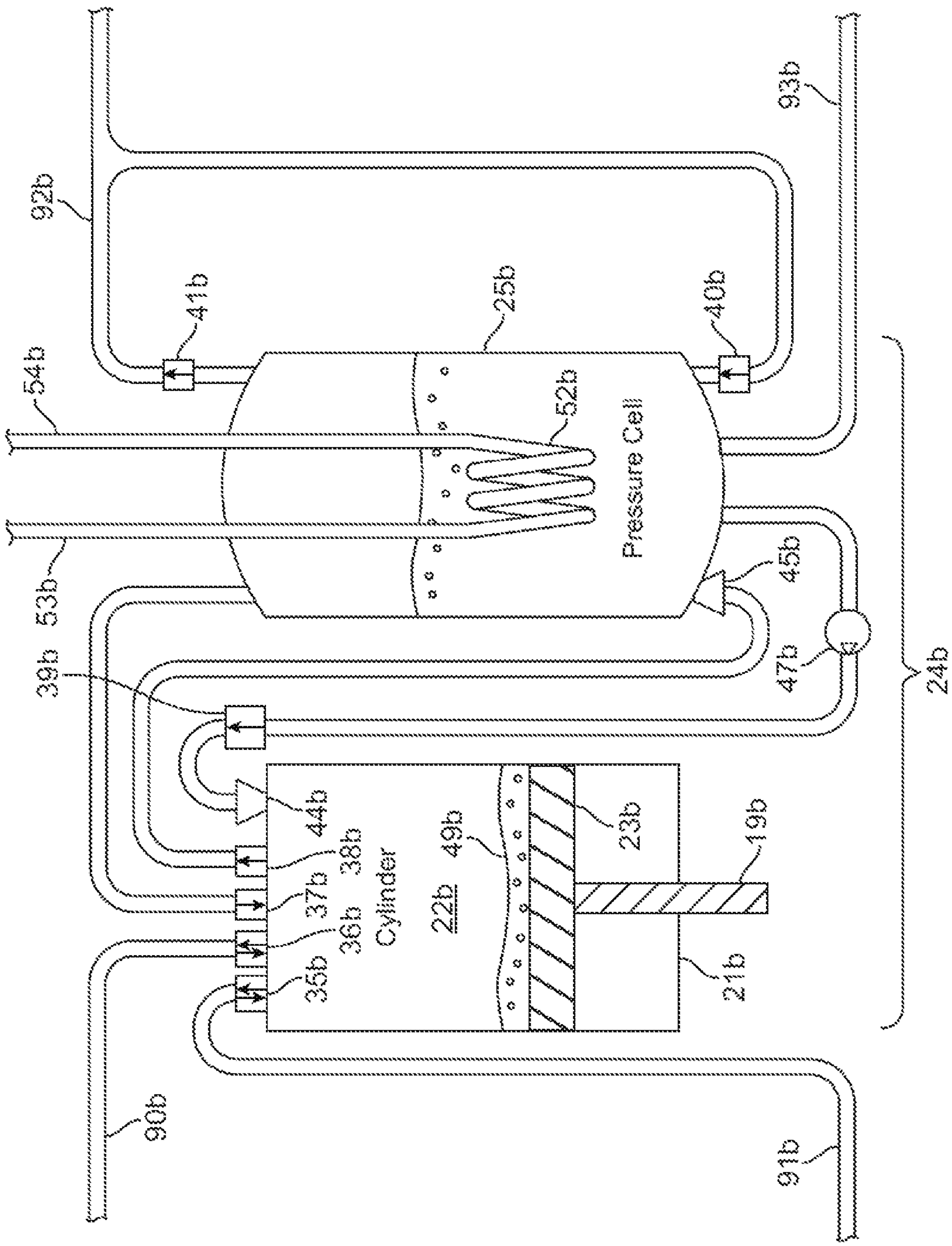
FIG. 4 is a schematic representation of a one single-acting stage that uses liquid mist to effect heat exchange in a multi-stage compressed air energy storage system in accordance with the present invention.
Figure 10:
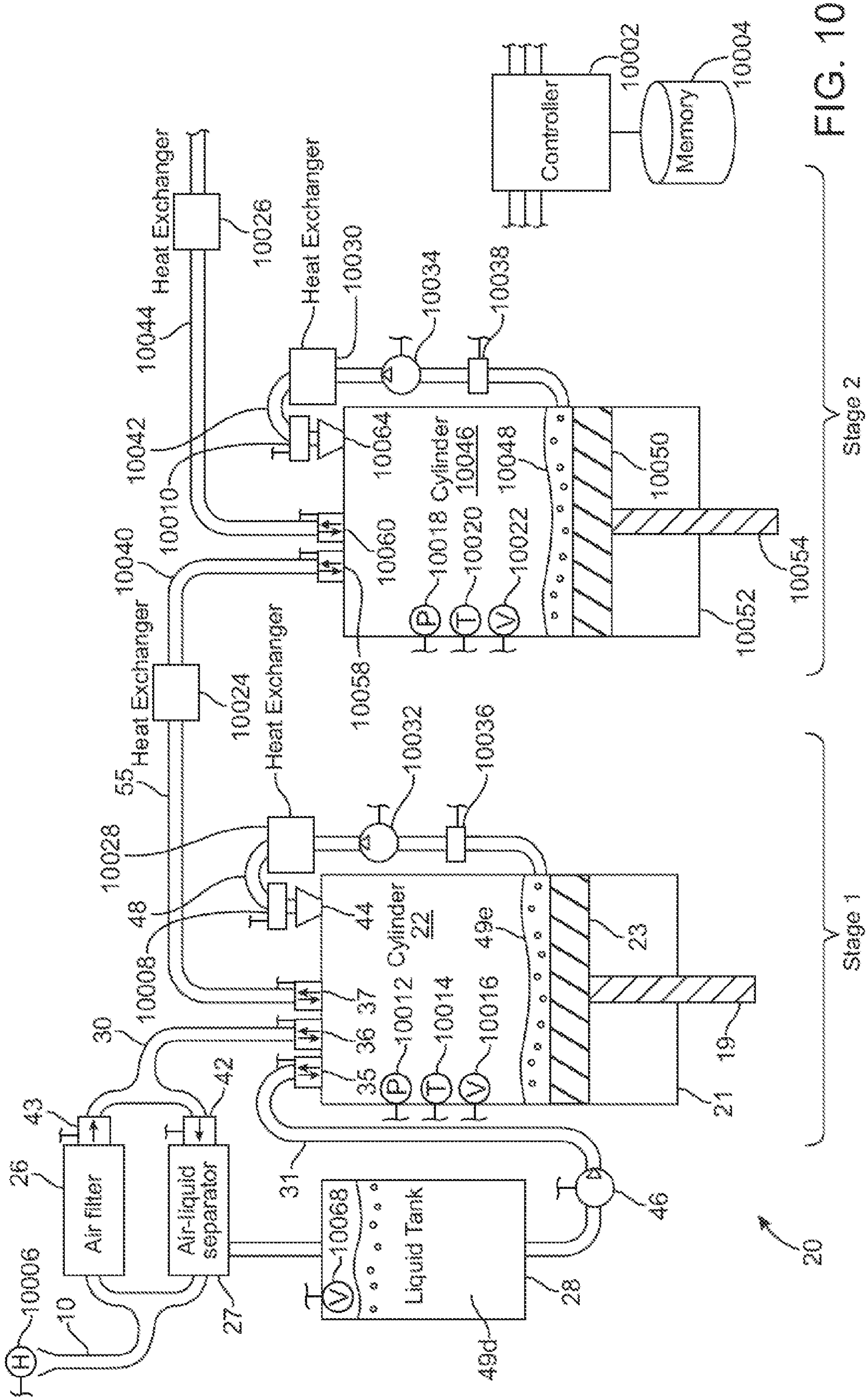
FIG. 10 shows an alternative embodiment of an apparatus in accordance with the present invention.

For example, in the embodiment of FIG. 10, the stages are connected directly together through a heat exchanger, rather than through a pressure cell as in the embodiment of FIG. 4. The relative phases of the cycles in the two stages must be carefully controlled so that when Stage 1 is performing an exhaust step, Stage 2 is performing an intake step (during compression). When Stage 2 is performing an exhaust step, Stage 1 is performing an intake step (during expansion).

The timing is controlled so the pressures on either side of heat exchanger 10024 are substantially the same when valves 37 and 10058 are open. Liquid for spray nozzle 44 is supplied from an excess water in cylinder 22 by opening valve 10036 and turning on pump 10032. Similarly, liquid for spray nozzle 10064 is supplied from an excess water in cylinder 10046 by opening valve 10038 and turning on pump 10034. Such precise timing during operation may be achieved with the operation of a controller/processor that is communication with a plurality of the system elements, as has been previously described.

The present invention is not limited to the embodiments specifically described above. For example, while water has been described as the liquid that is injected into air as a mist, other liquids could be utilized and fall within the scope of the present invention. Examples of liquids that could be used include polypropylene glycol, polyethylene glycol, and alcohols.

Embodiments in accordance with the present invention relate to the extraction of energy from a temperature difference. In particular embodiments, energy from a heat source may be extracted through the expansion of compressed air. In certain embodiments, a storage unit containing compressed gas is in fluid communication with a compressor-expander. Compressed gas received from the storage unit, expands in the compressor-expander to generate power. During this expansion, the compressor-expander is in selective thermal communication with the heat source through a heat exchanger, thereby enhancing power output by the expanding gas. In alternative embodiments, where the heat source is continuously available, a dedicated gas expander may be configured to drive a dedicated compressor. Such embodiments may employ a closed system utilizing gas having high heat capacity properties, for example helium or a high heat capacity gas (for example, carbon dioxide, hydrogen, or neon) resulting from operation of the system at an elevated baseline pressure.

Embodiments of the present invention relate generally to the extraction of energy from a temperature difference. According to certain embodiments, a temperature in the form of heat from a heat source, may be harnessed to generate useable energy from expansion of a compressed gas. A compressor-expander is in fluid communication with a compressed gas storage unit. Compressed gas received from the storage unit, expands in the compressor-expander to generate power. During expansion, the heat source is in selective thermal communication with the compressor-expander through a heat exchanger, to enhance power output. System operation may be further enhanced by introducing a fluid during expansion, and/or by controlling air flowed into and out of the compressor-expander during expansion.

In order to operate nearly isothermally, the tendency of gas to cool as it expands while doing work (i.e. by pushing a piston or displacing hydraulic liquid), can be counteracted by heat exchange with a heat source. If some form of heat is available, it may be harnessed to improve power output during an expansion cycle.

Figure 22:
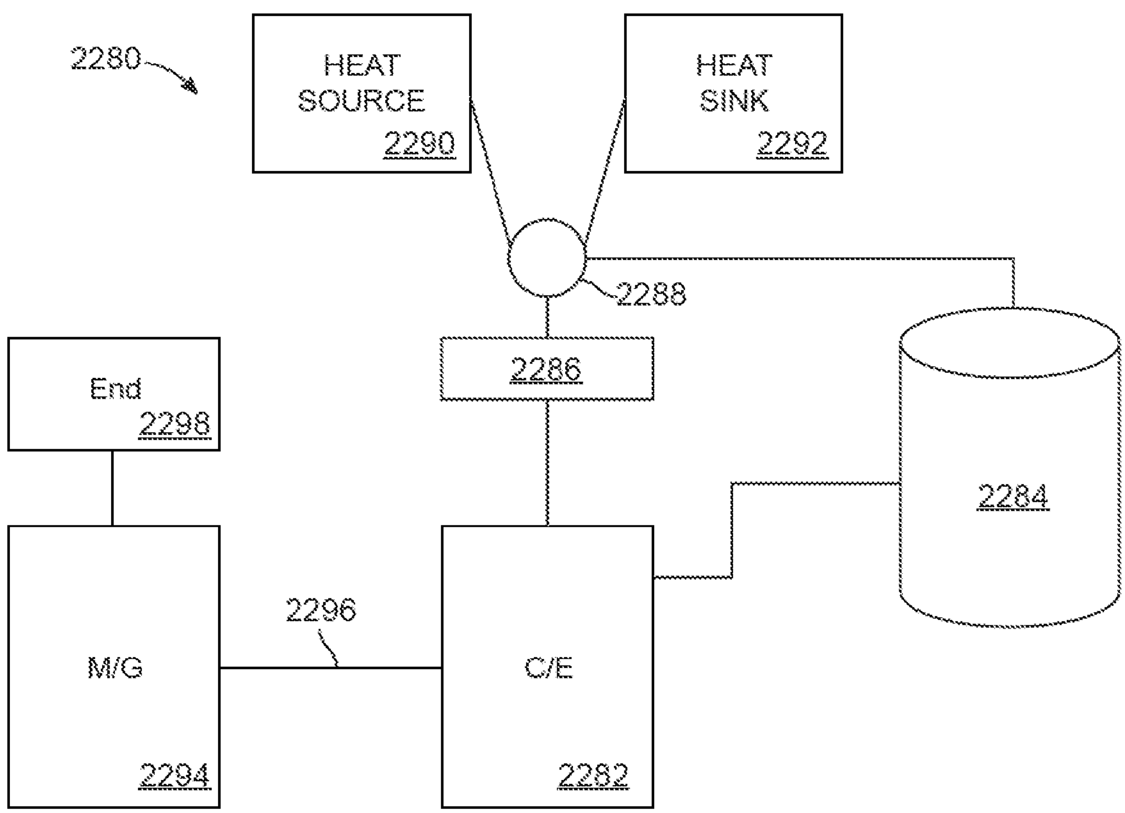
FIG. 22 is a simplified diagram showing an embodiment of an apparatus according to the present invention.

Because in many embodiments a compressed gas system is configured to operate substantially at or near ambient temperature, the source of heat need only be a few degrees above ambient in order to be useful in this regard. The heat source must, however, have sufficient thermal mass to supply all the heat required to keep the expansion process near ambient temperature throughout the cycle. Thus, embodiments of the present invention may be able to harness low grade heat, for example in the form of waste heat from another process, to enhance the power output from compressed air FIG. 22 shows a simplified block diagram of an embodiment of a system 2280 according to the present invention, for generating energy from compressed air, although other forms of compressed gas could be used. The system includes a compressor-expander 2282 which may have a structure similar to that described in U.S. provisional patent application No. 61/221,487 ("the '487 application"), but alternatively could be of another design.

Compressor-expander 2282 is in fluid communication with compressed air storage unit 2284. Compressor-expander 2282 is in selective thermal communication through heat exchanger 2286 and valve 2288, with either heat source 2290 or heat sink 2292. Heat source 2290 may be a source of low grade heat or high grade heat. Heat source 190 may be present continuously, or may be intermittent in nature.

Compressor-expander 2282 is in physical communication with motor-generator 2294 through linkage 2296. Linkage 2296 may be mechanical, hydraulic, or pneumatic, depending upon the particular embodiment. Motor-generator 2294 is in turn in electrical communication with a power source such as the electrical grid 2298.

Operation of the system 2280 is described as follows. In a first mode, system 2280 is configured to generate power by converting compressed air stored in the storage unit 2284, into useable work. The system may be configured in this first mode, for example, at times of peak power demand on the grid, for example between 7 AM and 7 PM on weekdays.

Figure 22A:
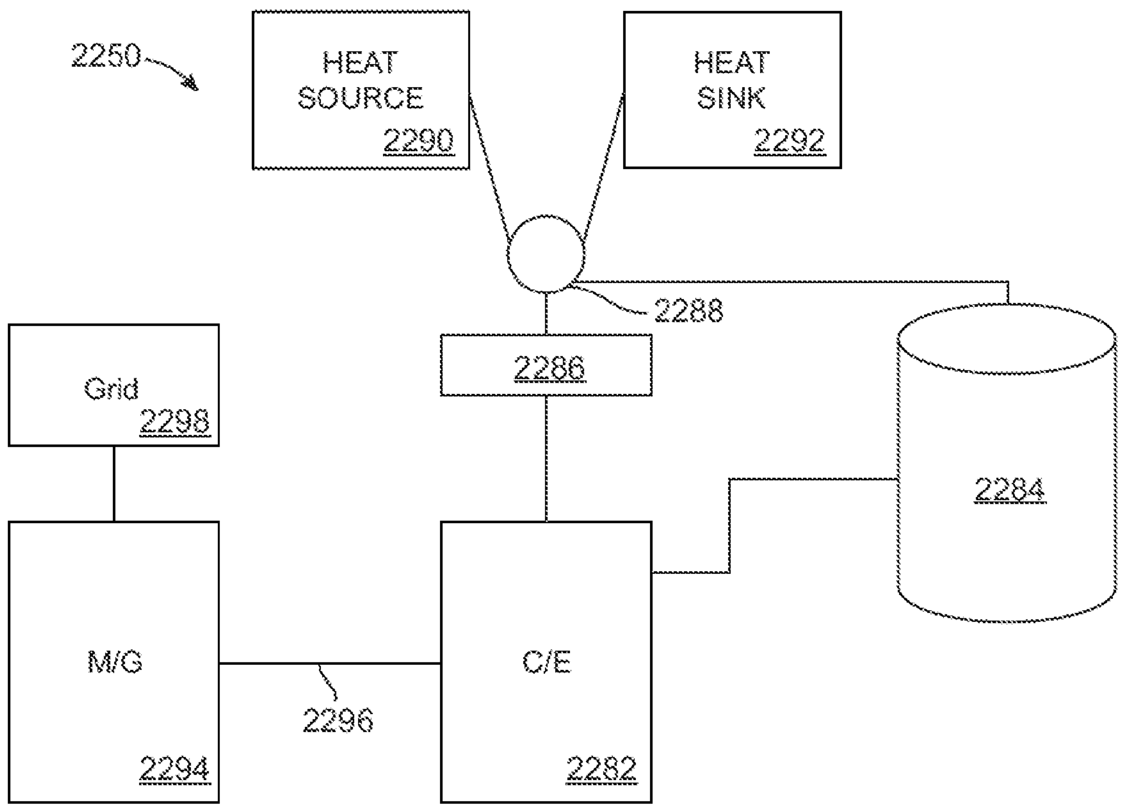
FIGS. 22A-B show the apparatus of FIG. 22 operating in different modes.

In this first mode depicted in FIG. 22A, compressed air is flowed from storage unit 2284 to compressor-expander 2282 which is functioning as an expander. Switch 2288 is configured to allow thermal communication between heat source 2290 and heat exchanger 2286 and/or storage unit 2284.

As a result of the contribution of heat from the heat source in this mode, air expanding in the compressor-expander experiences a reduced change in temperature, thereby producing an increased power output. This power output is in turn communicated through linkage 2296 to motor-generator 2294 that is functioning as a generator. Power output from the motor-generator may in turn be fed onto the power grid 2298 for consumption.

In a second mode of operation, system 2280 is configured to replenish the supply of compressed air in the storage tank. The system may be configured in this second mode, for example, at times of reduced demand for power on the power grid.

Figure 22B:
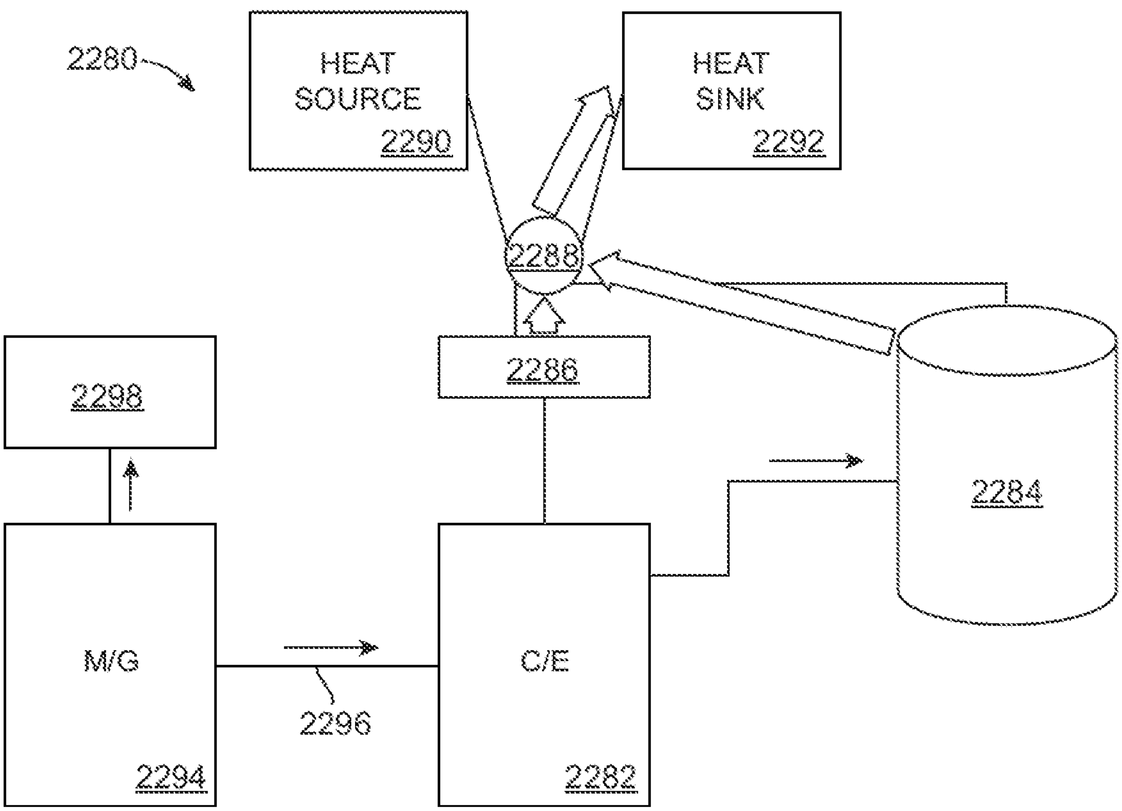

In this second mode shown in FIG. 22B, motor-generator 2294 receives power from the power grid 2298 (or directly from another source such as a wind turbine or solar energy harvesting unit), and actuates linkage to operate compressor-expander 2282 as a compressor. Switch 2288 is configured to allow thermal communication between heat sink 2292 and heat exchanger 2286 and/or storage unit 2284.

As a result of the transfer of heat from the compressor-expander to the to the heat sink in this mode, air being compressed in the compressor-expander experiences a reduced change in temperature, thereby resulting in a lower energy loss upon its conversion into compressed air. The compressed air is in turn communicated from the compressor-expander to the compressed air storage unit 2284, for later recovery in the first mode.

In certain embodiments, switch 2288 may be temporal in nature, such that it operates according to the passage of time. An example of this would be the diurnal cycle, wherein during the day the heat exchanger and/or storage unit are in thermal communication with the sun as a heat source. Conversely, at night the heat exchanger and/or storage unit would be in thermal communication with the cooling atmosphere as a heat sink. In such embodiments, the magnitude of the heat source could be amplified by techniques such as reflection onto the heat exchanger and/or storage tank, or by providing the heat exchanger and/or storage tank with a coating configured to enhance absorption of solar radiation.

In certain embodiments, switch 2288 may be physical in nature, such that it is actuable to allow warm fluid from the heat source to be in proximity with the heat exchanger and/or storage unit, or to allow cool fluid from the heat sink to be in proximity with the heat exchanger and/or storage unit. Examples of this type of configuration include a switch that is in selectively in fluid communication with pipes leading to a power plant as the heat source, or to a body of water (such as a cooling tower, lake, or the ocean) as the heat sink.

Operation of the various embodiments of systems described above, can be enhanced utilizing one or more techniques employed alone or in combination. One such technique is the introduction of a liquid into the air as it is expanding or being compressed. Specifically where the liquid exhibits a greater heat capacity than the air, the transfer of heat from compressing air, and the transfer of heat to expanding air, would be improved. This greater heat transfer would in turn allow the temperature of the compressing or expanding air to remain more constant. Such introduction of liquid during compression and expansion is discussed in detail in the '487 Application.

In certain embodiments, the liquid is introduced as a mist through a spray device. In other embodiments, the gas may be introduced by bubbling through a liquid. Other embodiments may employ both misting and bubbling, and/or multiple stages (see below) which employ misting and/or bubbling only in certain stages.

Another technique which may employed to enhance operation of the system, is precise control over gas flows within the compressor-expander. Such precise control may be achieved utilizing a controller or processor that is configured to be in electronic communication with various elements of the compressor-expander.

Figure 23:
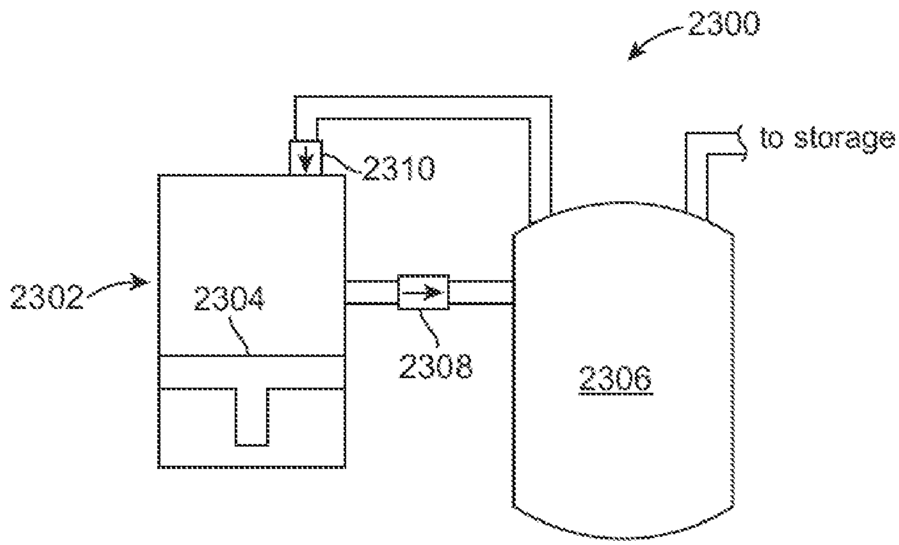
FIG. 23 is a simplified diagram showing flows of air within an embodiment of a compressor-expander.

For example, FIG. 23 shows a simplified block diagram of an embodiment of a single-stage compressor-expander 2300 in accordance with an embodiment of the present invention. Further details regarding the structure of such a compressor-expander are provided in connection with FIG. 25 below.

The compressor-expander 2300 of FIG. 23 comprises a cylinder 2302 having a moveable element such a piston 2304, disposed therein. Cylinder 2302 is in selective fluid communication with a pressure cell 2306. During compression, air (and possibly liquid) inlet into the cylinder, is compressed by the piston, and then the compressed air is flowed to the pressure cell through valve 2308.

In conventional compressor designs, valve 2308 is a check valve that is physically actuated by the force resulting from pressure exerted by compressed air in the cylinder. Such check valve actuation, however, consumes some of the energy of the compressed air.

By contrast, according to certain embodiments of the present invention, the valve 2308 may be of a different type that is operated by electronic control by a processor or controller. Examples of valves suitable for control according to embodiments of the present invention include but are not limited to pilot valves, rotary valves, cam operated poppet valves, and hydraulically, pneumatically, or electrically actuated valves. The use of electronic control in this manner would avoid the loss of energy in the compressed air associated with conventional actuation of a check valve.

Precise valve control can also enhance operation during expansion. Specifically, valve 2310 may be precisely controlled to allow the cylinder to admit only a predetermined amount of air from the pressure cell during an expansion cycle. This predetermined amount of air may be calculated to result in a desired pressure on the piston at the end of the expansion stroke. This desired pressure may be approximately equal to ambient pressure where the compressor-expander has only a single stage, or the pressure cell and cylinder comprise a lowest stage of a multi-stage design. In a multi-stage design, this desired pressure may be equal to the pressure of the next-lowest stage. Alternatively, where greater power output is desired, the timing of opening and closing of valve 2310 may be controlled to admit a sufficient quantity of air such that the desired pressure at the end of the expansion stroke is a larger value.

While the above embodiments have been described in connection with use of an element configurable to function either as a compressor or an expander of gases, this is not required by the present invention. Alternative embodiments could employ separate elements that are dedicated to performing either gas compression or expansion, and remain within the scope of the present invention.

Figure 24A:
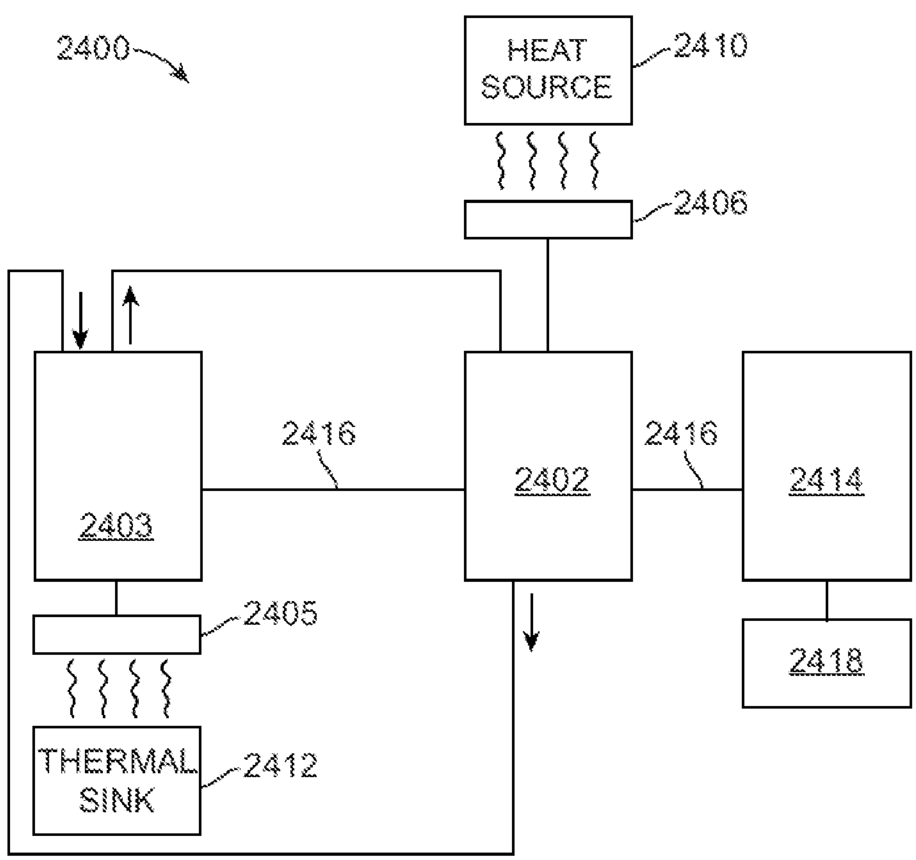
FIG. 24A is a simplified diagram showing an alternative embodiment of an apparatus according to the present invention.

One such alternative embodiment is shown in FIG. 24A, where system 2400 comprises dedicated expander 2402. The dedicated expander 2402 functions to receive compressed gas, and to allow that compressed gas to expand and be converted into useful work. For example, expansion of the compressed gas within the expander 2402 may serve to drive a common physical linkage 2416, which may be mechanical, hydraulic, pneumatic, or another type.

Dedicated expander 2402 is in turn in thermal communication with a heat exchanger 306, that is in thermal communication with heat source 2410. Energy received by the dedicated expander from the heat source 2410 via the heat exchanger 2406, may serve to enhance the power output as compressed gas flowed into the expander, expands and is converted into useful work, for example the driving of linkage 2416. Specifically, heating of the gas by the thermal source prior to or during its expansion, results in reduced thermodynamic losses attributable to non-isothermal expansion of the gas.

The linkage 2416 is in turn in physical communication with dedicated compressor 2403. Dedicated compressor 2403 may be driven by the operation of the linkage 2416, such that it compresses gas that has been output from the dedicated expander.

Dedicated compressor 2403 is in thermal communication with a heat exchanger 2405, that is in thermal communication with a thermal sink 2412. A reduced temperature experienced by the dedicated compressor by virtue of its thermal communication with thermal sink 2412 via the heat exchanger 2405, may serve to reduce the amount of energy required to compress the gas.

The linkage 2416 is also in communication with a generator 2414. Based upon movement of the linkage, generator 2414 operates to generate electrical power that is in turn fed onto power grid 2418 for consumption.

In operation, some amount of compressed gas is initially supplied to the dedicated expander, for example by driving compressor 2403 with a motor (not shown). Alternatively, generator 2414 may be operated in reverse as a motor.

Subsequently, this initial amount of compressed air is flowed out of the storage unit to the dedicated expander. Expansion of the compressed gas in the expander, serves to drive the linkage. This conversion of energy stored in compressed gas into mechanical work, is enhanced by the energy supplied from the heat source.

As a result of this energy conversion, the linkage is actuated to operate the dedicated compressor 2403 to compress gas received from the dedicated expander, and flow this compressed gas to back to the expander to allow it to operate. Specifically, cooling of the gas by the thermal sink prior to or during its compression, results in reduced thermodynamic losses attributable to non-isothermal compression of the gas.

Energy recovered from the expanding gas that exceeds the amount required to operate the compressor, may in turn be utilized to generate electricity. Specifically, actuation of the mechanical linkage may operate generator 2414 that is in communication with the power grid 2418.

Embodiments such as that shown in FIG. 24A may offer certain benefits. One possible benefit is that the system of FIG. 24A may operate with gases exhibiting desirable properties.

For example, helium may be a favorable candidate for use in energy storage systems, because it exhibits a relatively high heat capacity. The high heat capacity of helium allows it to efficiently absorb and transmit heat during compression and expansion processes, respectively.

The expense of helium generally limits its use in open systems. However, the embodiment of FIG. 24A operates as a closed system. This closed configuration allows the gas that is expanded in the dedicated expander to in turn be compressed and fed back to the dedicated expander. Such recycling may allow helium to be economically viable for use in the system of FIG. 24A.

The closed nature of the embodiment of the system of FIG. 24A, may also allow it to operate with high density gases, which improves their heat capacity. In particular, because the system of FIG. 24A is closed and does not rely upon outside air, it may operate at baseline pressures that are significantly greater than ambient. Examples of such baseline pressures include but are not limited to pressures that are 5 PSI, 10 PSI, 20 PSI, 50 PSI, 100 PSI, or 200 PSI above ambient pressure. The resulting enhanced heat capacity of the high density gases in such a system, improve their ability to transmit and absorb heat during respective compression and expansion processes, potentially enhancing the thermodynamic efficiency of these processes during energy storage and recovery.

The system of the embodiment of FIG. 24A may also offer the benefit of simple construction. For example, because operation of the dedicated expander and dedicated compressor is concurrent, the gas is generally consumed for expansion almost immediately after being compressed. This immediate expansion may obviate the need to provide a separate pressure-tight vessel element to store the compressed gas.

Moreover, because the gas in the system of FIG. 24A does not need to be stored, it may operate utilizing relatively small differences between baseline pressure and the pressure after compression. Thus, compression of the gas in the embodiment of the system of FIG. 24A can likely be accomplished utilizing only a single stage, further simplifying the design.

Figure 24B:
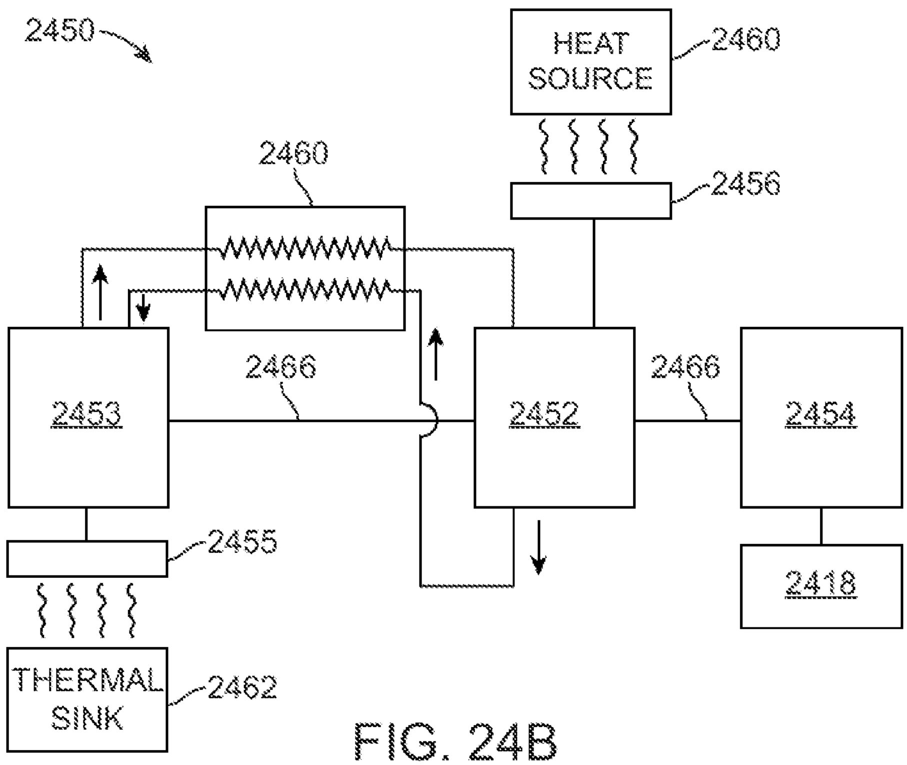
FIG. 24B is a simplified diagram showing an alternative embodiment of an apparatus according to the present invention.

In certain embodiments of the present invention, performance may be enhanced by the use of a regenerator device. FIG. 24B shows a simplified diagram showing an alternative embodiment of an apparatus which includes a regenerator. Specifically, apparatus 2450 comprises dedicated compressor 2453, dedicated expander 2452, and generator 2454 that are all in mechanical communication with a common rotating shaft 2466.

Regenerator 2460 is positioned between the gas flowing between dedicated compressor 2453 and dedicated expander 2452 in this closed loop system. In particular, while passing through regenerator 2460, gas that has been compressed in dedicated compressor 2453 and then cooled to the temperature of thermal sink 2462, is heated by transferring thermal energy from the nearby flowing gas that has been expanded in dedicated expander 2452 and heated to the temperature of heat source 2460. Conversely, the gas that has been expanded in dedicated expander 2452 and heated to the temperature of heat source 2460, is cooled by transferring thermal energy to the nearby flowing gas that has been cooled during compression in the dedicated compressor 2453. This exchange of thermal energy between the flowing gases in regenerator

2460, ultimately serves to enhance the amount of energy that is recovered from the expanding gas.

Figure 24C:
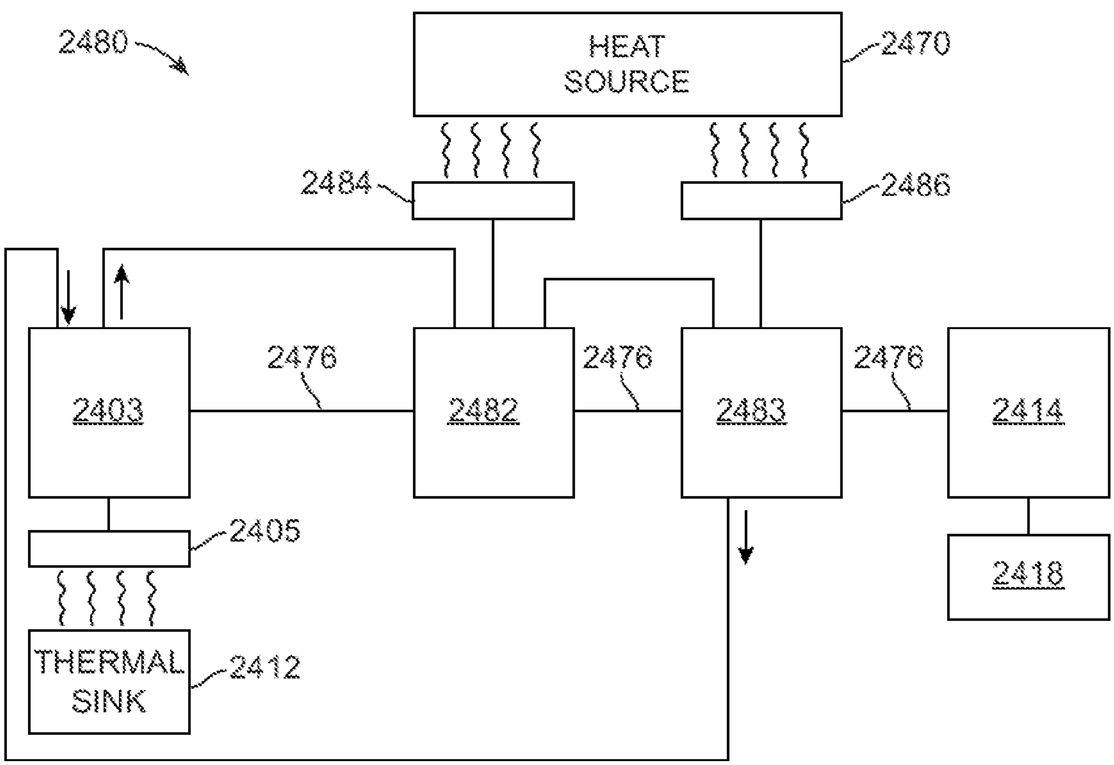
FIG. 24C is a simplified diagram showing an alternative embodiment of an apparatus according to the present invention.

In alternative embodiments, an effect similar to that performed by the regenerator element, may instead by achieved by conducting expansion over a plurality of stages. Such an embodiment is shown in FIG. 24C, wherein system 2480 is similar to system 2400, except that a first dedicated expander 2482 is in serial fluid communication with a second dedicated expander 2483, with both the first and second dedicated expanders in physical communication with common link 2476. Link 2476 may be mechanical in nature such as a rotating shaft, or alternatively may be hydraulic or pneumatic. The extraction of heat using successive dedicated expansion stages 2482 and 2483 in thermal communication with a heat source 2470 through respective heat exchangers 2484 and 2486, may result in a final temperature of the gas output by the second expansion stage being comparable with the final temperature of the gas output from the regenerator of the embodiment of FIG. 24B. In another embodiment, heat exchangers 2484 and 386 may be in thermal communication with separate heat sources, not necessarily at the same temperature.

Figure 24D:
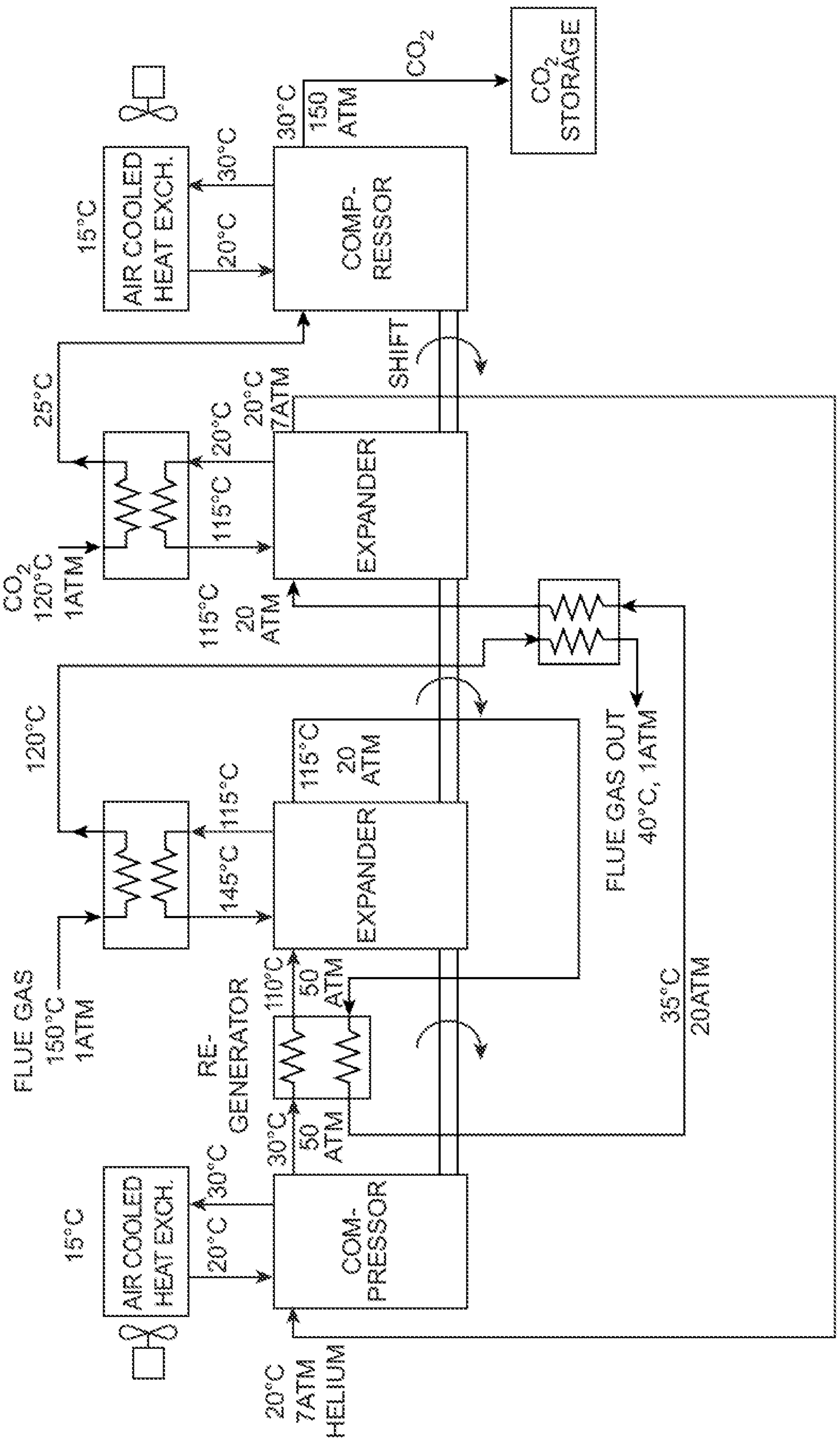
FIG. 24D is a simplified diagram showing a further alternative embodiment of an apparatus according to the present invention.

FIG. 24D is a simplified diagram showing a further alternative embodiment of an apparatus according to the present invention. As with FIG. 24A, this figure shows a closed system wherein a gas (here helium) is recycled.

The embodiment of FIG. 24D includes two expanders and two compressors all mechanically linked together on the same common rotating shaft. The particular system of FIG. 24D ultimately operates to compress carbon dioxide for storage.

Specifically, FIG. 24D shows an embodiment of a system for compressing carbon-dioxide gas separated from combustion flue gases, powered exclusively by the heat available in the flue gases.

Very nearly all of the parasitic losses associated with the amine method of carbon dioxide separation from coal flue gases arise from two processes:

1) Heating of the amine fluid in order to release the absorbed CO2, and

2) Compressing the separated CO2 gas to create a fluid suitable for transport or storage Embodiments of the present invention addresses the second category—the energy required to compress the CO2 gas—which accounts for about 35% of all the parasitic losses, or 10% of the total power generated by a coal-fired plant that incorporates CO2 capture. Technology in accordance with embodiments of the present invention can eliminate those losses in their entirety.

The low-grade heat in the combustion flue gases may be converted into mechanical power efficiently and inexpensively, and then that mechanical power is used to operate an equally efficient CO2 compressor.

Embodiments of the present invention utilize near-isothermal gas compression and expansion. A basic result from thermodynamics is that considerably less work is required to compress a gas if the compression is done isothermally.

When compression work is done on a gas, heat is generated. If this heat is removed continuously from the system so that the temperature remains constant during compression, the compression is said to occur isothermally. Similarly, more work can be obtained from the energy stored in compressed gas if heat is added to the system as the gas expands.

The design of FIG. 24D puts two devices operating on these principles on a single shaft.

A first device is a heat engine that includes coupled compression and expansion chambers operating in an Ericsson cycle. This engine uses the temperature difference between the flue gases and the ambient air to generate mechanical work—shaft torque, in this case—with high thermal efficiency.

A second device is a near-isothermal CO2 compressor.

These devices are described in detail below, beginning with the CO2 compressor, since it illustrates certain core principles underlying embodiments in accordance with the present invention.

In order to control the ΔT (that is, the temperature rise that occurs during compression) of gaseous CO2, embodiments of the present invention take advantage of the fact that liquids are much better at absorbing heat than gases are. In fact, a given volume of oil can hold about 2000 times as much heat as the same volume of CO2 gas at the temperatures of interest. Temperature equilibration between the gas and liquid phases happens more quickly if there is a large surface area where the liquid and gas are in direct contact. By spraying small droplets of liquid into the gas prior to or during compression we provide a large interface area resulting in rapid heat exchange between the two phases.

Liquid sprays, typically of lubricating oil, have been used for many years to cool gas compressors and permit higher-than-usual compression ratios (without adequate cooling, a high compression ratio creates so much heat that thermal fatigue and damage can result). Enhancements to this process according to the present invention fall into two areas:

A first area is the computation, during operation—and adjustment as necessary—the volume of liquid spray required to maintain the ΔT of compression or expansion at the desired level. This is a particularly critical requirement for this particular application: because of the nature of the amine absorption process, different stages of the system have to operate at specific temperatures.

A second area is the use of sprays to control the ΔT both for gas compression and expansion. As discussed in connection with the heat engine component, an expansion cell is required to deliver the mechanical power obtained from the waste heat available in the flue gases.

Temperature-Controlled Compression

Figure 27:
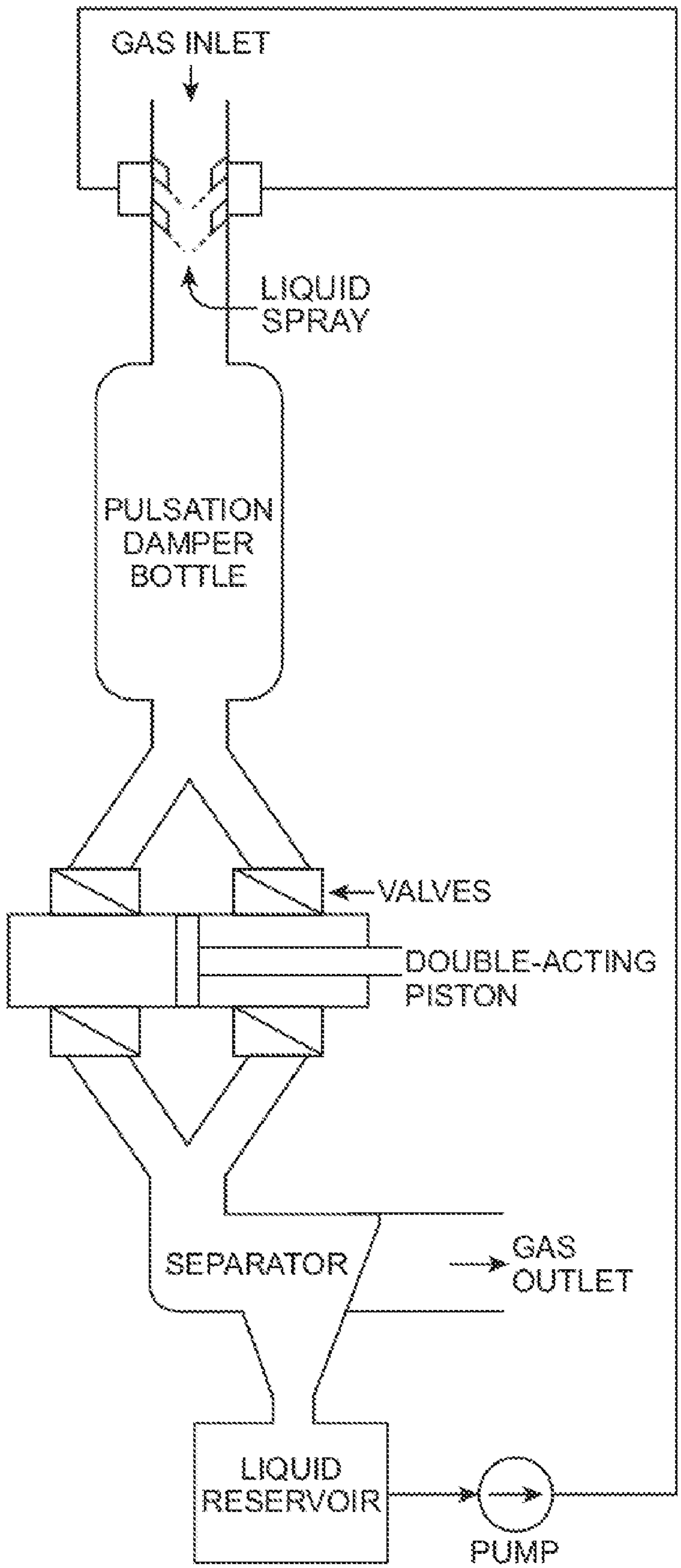
FIG. 27 shows a simplified schematic view of an embodiment of a compressor mechanism.

FIG. 27 illustrates the compressor mechanism schematically. CO2 gas enters a pre-mixing chamber where oil is sprayed into the gas stream and becomes entrained with it. The gas enters at about 25° C., and the liquid is at about 20° C. Before the gas-liquid aerosol enters the compression chamber, it passes through a pulsation dampening "bottle". This allows us to spray oil continuously even though the compressor is operating in a cycle. The compression chamber itself is a conventional reciprocating piston and cylinder arrangement, suitably modified to accommodate CO2 gas.

As the piston moves towards bottom dead center, the CO2/oil-droplet aerosol is drawn into the cylinder through one of the inlet valves (the upper valves in the diagram). The heat engine (see below) then drives the piston towards top dead center, compressing the mixture. When the desired pressure is reached (about 40 atmospheres of pressure is required to liquefy CO2 at 30° C.), the exhaust valve opens, and the mixture is exhausted into the separator. The separator (a conventional cyclone system) extracts the oil from the CO2 and sends the CO2 to a tank or pipeline for transport. The oil, now warmed to 30° C. by the compression process, is sent through a heat exchanger (not shown) to return it to 20° C., ready to be sprayed into the pre-mixing chamber again.

The system illustrated in FIG. 27 is double-acting. As one side of the cylinder is being compressed, the other side is being exhausted. The inlet and exhaust valves on either side open and close 180 degrees out of phase with each other.

Note that the system described in FIG. 27 is a single-stage compressor. The final design may require three or four stages to keep the compression ratios within a practical range. Only a single pump and a single heat exchanger are required for all the stages, however. Typically, in a multi-stage compressor, all stages have the same compression ratio. Another proprietary feature of our system is that the compression ratios are adjusted so as to produce equal ΔT's in each stage. Balancing the ΔT's maximizes efficiency and power density.

System Architecture

The compressor with its integrated liquid spray system comprise a "cell". Such a cell can operate as a gas compressor or expander, depending on how the valves are timed. In an expansion cell, gas enters the cylinder via an inlet valve, then expands to move the piston and turn the crankshaft.

In the system of FIG. 24D, the CO2 compressor is one cell, and the heat engine that drives the compressor consists of three tightly-coupled cells. All four cells share a single crankshaft.

In the three cells that form the heat engine, shown inside of the dashed-line box, the first (labeled "COMPRESSOR") operates as a compressor and the other two ("EXPANDER 1" and "EXPANDER 2") are expanders. The compressor operates in the same manner as the CO2 compressor described above, except as noted below.

The expanders operate a little differently. Gas expanding and doing work on a piston will cool. By adding heat obtained from the flue gases via heat exchangers 1 and 2, the expanders will generate enough mechanical energy in the form of crankshaft torque to power both compression cells (the heat engine's compressor and the CO2 compressor). That is, by adding heat to the system via the hot flue gases, the expanders will generate more shaft torque than is required to operate the heat engine's compressor, leading to a net positive work output. The amount of excess work generated depends on the difference in temperatures between the incoming flue gases and the ambient air.

There two expanders because there are two sources of heat available at two different temperatures. The flue gases from coal combustion, which are mostly nitrogen and only about 10% CO2, are at 150° C., while the separated CO2 stream is about 110° C. to 120° C. As a result, to maximize the energy obtained from the heat sources, the expansion part of the heat engine uses two heat exchangers and two regenerators, each tuned to the specific temperature available.

One beneficial effect of the heat engine is that the flue gases are cooled, a process which has to occur prior to the amine absorption process regardless. Likewise, the separated CO2 gas stream has to be cooled so that it will liquefy upon compression. As a result, these heat exchangers are a necessary part of the conventional amine process. In our system, they do double-duty, cooling the gas streams and providing energy for the CO2 compressor.

Heat addition and rejection occur at nearly constant pressure, making the heat engine's cycle an Ericsson cycle. Ericsson engines often use a double-acting piston, with compression and expansion occurring on opposite sides. In our system, compression and expansion happen in separate cylinders.

Because the compression and expansion cells of the heat engine form a closed system, any suitable gas can be used. A good choice for the gas is helium, since its heat transfer properties permit the regenerators (often the most expensive part of this kind of heat engine) to be compact and inexpensive.

The thermodynamics of the system are complex. The key analytical result is that there is enough heat energy available in the flue gases of a coal-fired power plant to operate the entire system, including thermal and mechanical losses, and to compress all the separated CO2 without any additional energy input. That is, the entire system can be self-contained: No electricity is required to operate it.

The following provides a discussion of various embodiments of apparatuses for performing compression and expansion. However, the present invention is not limited to these specific embodiments, and other apparatuses (such as dedicated compressors and expanders) could be utilized.

Single-Stage System

Figure 25:
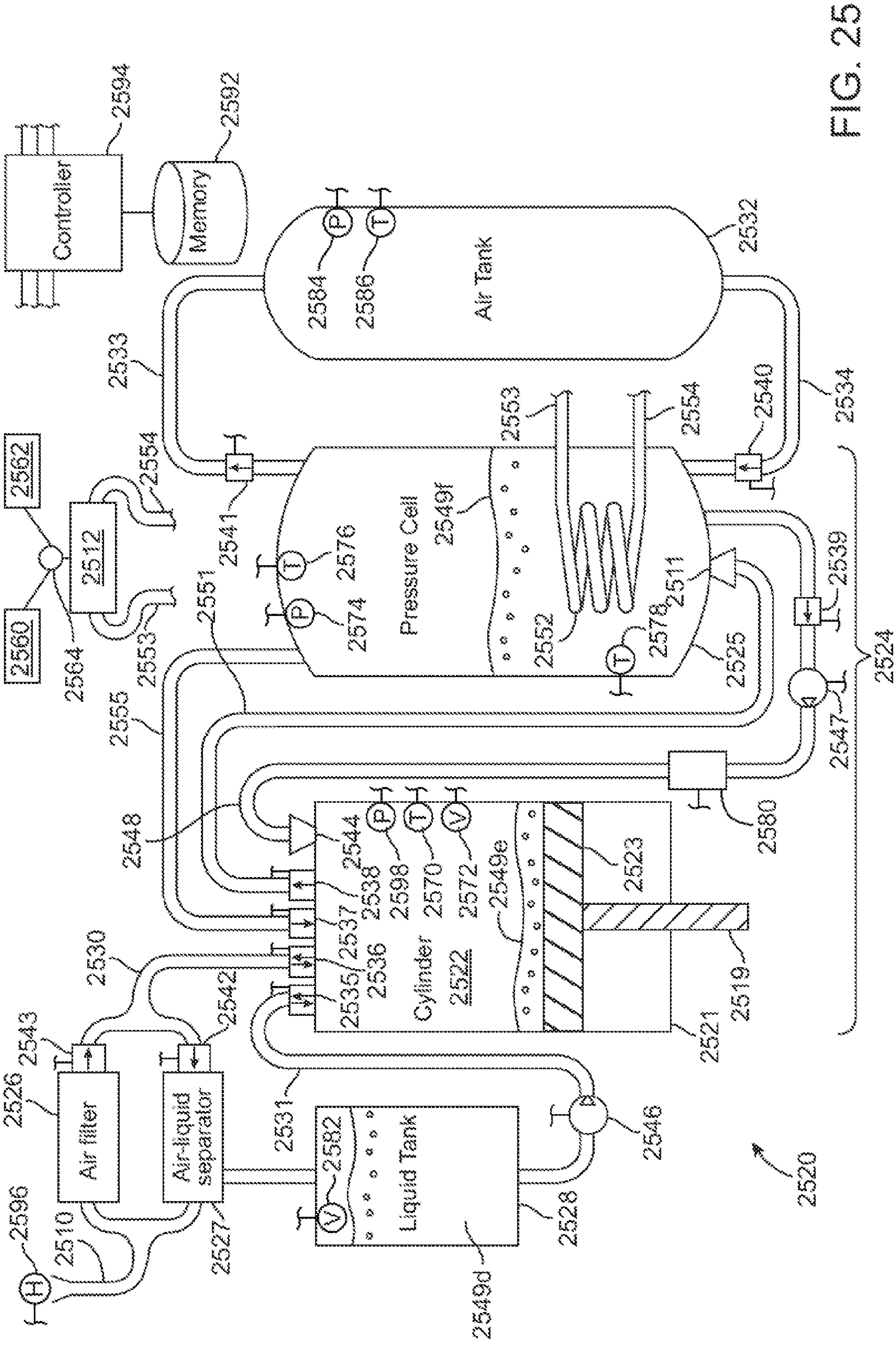
FIG. 25 is a simplified schematic view showing an embodiment of a compressor-expander.

FIG. 25 depicts an embodiment of a system 2520 of the present invention. This embodiment includes mixing a liquid with the air to facilitate heat exchange during compression and expansion, and applying the same mechanism for both compressing and expanding air. By electronic control over valve timing, high power output from a given volume of compressed air can be obtained.

As best shown in FIG. 25, the energy storage system 2520 includes a cylinder device 2521 defining a chamber 2522 formed for reciprocating receipt of a piston device 2523 or the like therein. The compressed air energy storage system 2520 also includes a pressure cell 2525 which when taken together with the cylinder device 2521, as a unit, form a one stage reversible compression/expansion mechanism (i.e., a one-stage 2524). There is an air filter 2526, a liquid-air separator 2527, and a liquid tank 2528, containing a liquid **2549*d* fluidly connected to the compression/expansion mechanism 2524 on the low pressure side via pipes 2530 and 2531, respectively. On the high pressure side, an air storage tank or tanks 2532 is connected to the pressure cell 2525 via input pipe 2533 and output pipe 2534. A plurality of two-way, two position valves 2535-2543 are provided, along with two output nozzles 2511 and 2544. This particular embodiment also includes liquid pumps 2546 and 2547. It will be appreciated, however, that if the elevation of the liquid tank 2528 is higher than that of the cylinder device 2521, water will feed into the cylinder device by gravity, eliminating the need for pump 2546**.

Briefly, atmospheric air enters the system via pipe 2510, passes through the filter 2526 and enters the cylinder chamber 2522 of cylinder device 2521, via pipe 2530, where it is compressed by the action of piston 2523, by hydraulic pressure, or by other mechanical approaches (see FIG. 8). Before compression begins, a liquid mist is introduced into the chamber 2522 of the cylinder device 2521 using an atomizing nozzle 2544, via pipe 2548 from the pressure cell 2525. This liquid may be water, oil, or any appropriate liquid **2549*f* from the pressure cell having sufficient high heat capacity properties. The system preferably operates at substantially ambient temperature, so that liquids capable of withstanding high temperatures are not required. The primary function of the liquid mist is to absorb the heat generated during compression of the air in the cylinder chamber. The predetermined quantity of mist injected into the chamber during each compression stroke, thus, is that required to absorb substantially all the heat generated during that stroke. As the mist coalesces, it collects as a body of liquid 2549*e* in the cylinder chamber 2522**.

The compressed air/liquid mixture is then transferred into the pressure cell 2525 through outlet nozzle 2511, via pipe 2551. In the pressure cell 2525, the transferred mixture exchanges the captured heat generated by compression to a body of liquid **2549*f* contained in the cell. The air bubbles up through the liquid and on to the top of the pressure cell, and then proceeds to the air storage tank 2532, via pipe 2533**.

The expansion cycle is essentially the reverse process of the compression cycle. Air leaves the air storage tank 2532, via pipe 2534, bubbling up through the liquid 2549*f* in the pressure cell 2525, enters the chamber 2522 of cylinder device 2521, via pipe 2555, where it drives piston 2523 or other mechanical linkage. Once again, liquid mist is introduced into the cylinder chamber 2522, via outlet nozzle 2544 and pipe 2548, during expansion to keep a substantially constant temperature in the cylinder chamber during the expansion process. When the air expansion is complete, the spent air and mist pass through an air-liquid separator 2527 so that the separated liquid can be reused. Finally, the air is exhausted to the atmosphere via pipe 2510.

The liquid 2549*f* contained in the pressure cell 2525 is continually circulated through the heat exchanger 2552 to remove the heat generated during compression or to add the heat to the chamber to be absorbed during expansion. This circulating liquid in turn selectively exchanges heat with either a heat sink 2560 or a heat source 2562, via a switch 2564 and heat exchanger 2512. The circulating liquid is conveyed to and from that external heat exchanger 2512 via pipes 2553 and 2554 communicating with internal heat exchanger 2552.

The apparatus of FIG. 25 further includes a controller/processor 2594 in electronic communication with a computer-readable storage device 2592, which may be of any design, including but not limited to those based on semiconductor principles, or magnetic or optical storage principles. Controller 2594 is shown as being in electronic communication with a universe of active elements in the system, including but not limited to valves, pumps, chambers, nozzles, and sensors. Specific examples of sensors utilized by the system include but are not limited to pressure sensors (P) 2598, 2574, and 2584, temperature sensors (T) 2570, 2578, 2586, and 2576, humidity sensor (H) 2596, volume sensors (V) 2582 and 2572, and flow rate sensor 2580.

As described in detail below, based upon input received from one or more system elements, and also possibly values calculated from those inputs, controller/processor 2594 may dynamically control operation of the system to achieve one or more objectives, including but not limited to maximized or controlled efficiency of conversion of stored energy into useful work; maximized, minimized, or controlled power output; an expected power output; an expected output speed of a rotating shaft in communication with the piston; an expected output torque of a rotating shaft in communication with the piston; an expected input speed of a rotating shaft in communication with the piston; an expected input torque of a rotating shaft in communication with the piston; a maximum output speed of a rotating shaft in communication with the piston; a maximum output torque of a rotating shaft in communication with the piston; a minimum output speed of a rotating shaft in communication with the piston; a minimum output torque of a rotating shaft in communication with the piston; a maximum input speed of a rotating shaft in communication with the piston; a maximum input torque of a rotating shaft in communication with the piston; a minimum input speed of a rotating shaft in communication with the piston; a minimum input torque of a rotating shaft in communication with the piston; or a maximum expected temperature difference of air at each stage.

The tables previously described in conjunction with FIGS. 12A-C describes steps in an embodiment of a compression cycle for a single-stage system utilizing liquid mist to effect heat exchange. During a compression cycle, the heat exchanger of the pressure cell is not in thermal communication with a heat source, but it is in thermal communication with a heat sink.

The corresponding expansion cycle is shown in the tables described above in connection with FIGS. 13A-C. During an expansion cycle, the heat exchanger of the pressure cell is in thermal communication with a heat source.

Use of the same mechanism for both compression and expansion is not required by the present invention, but can serve to reduce system cost, size, and complexity.

Multi-Stage System

Figure 26:
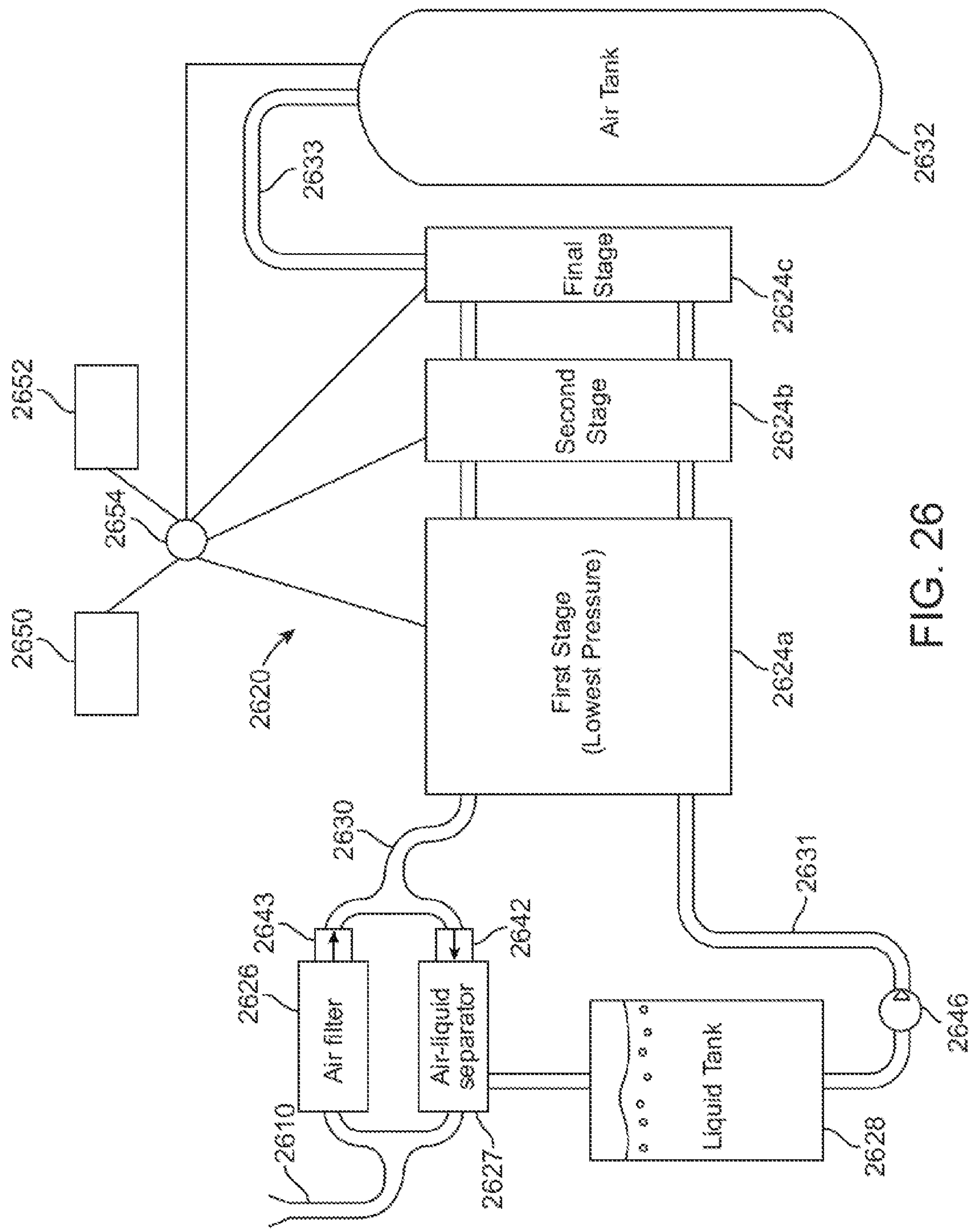
FIG. 26 shows a simplified view of an embodiment of a multi-stage apparatus.

When a larger compression/expansion ratio is required than can be accommodated by the mechanical or hydraulic approach by which mechanical power is conveyed to and from the system, then multiple stages should be utilized. A multi-stage compressed air energy storage system 2620 with three stages (i.e., first stage 2624*a*, second stage 2624*b* and third stage 2624*c*) is illustrated in schematic form in FIG. 26. Systems with more or fewer stages are constructed similarly. Note that, in all figures that follow, when the letters a, b, and c are used with a number designation (e.g. 2625*a*), they refer to elements in an individual stage of a multi-stage energy storage system 2620. FIG. 26 shows that the various stages may selectively be in communication with heat source 2650 or heat sink 2652 through a switch 2654.

Figure 26A:
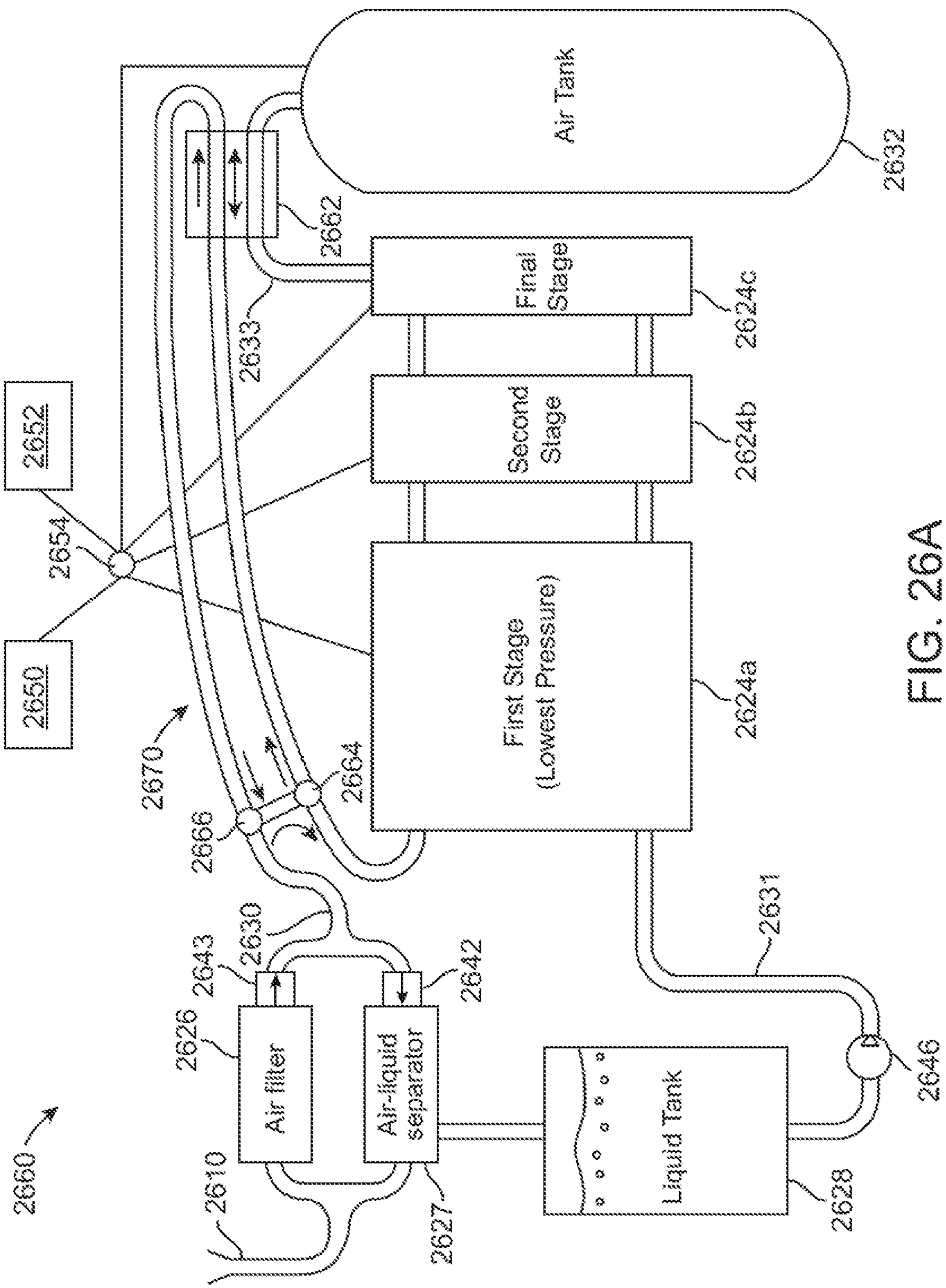
FIG. 26A shows a simplified view of an alternative embodiment of a multi-stage apparatus.

A multi-stage embodiment of an apparatus having compression and expansion functions performed by the same elements, can also benefit from the use of a regenerator device. FIG. 26A shows a simplified view of an alternative embodiment of a system 2650 that is similar to the system of FIG. 26, except it includes a regenerator 2652. Regenerator 2652 is in selective fluid communication with conduit 2633 between the highest pressure stage 2624*c* and the compressed gas storage unit 2632.

When the system is operating in a compression mode, the stages 2624*a-c* are in thermal communication with heat sink 2652 through switch 2654. Valves 2654 and 2656 are configured to flow the inlet air directly to the first stage 2624*a*, avoiding conduit 2620.

When the system is operating in an expansion mode, valves 2654 and 2656 are configured to place conduit 2620 in thermal communication with the output of the first stage 2624*a*. In addition, the stages 2624*a-c* are in thermal communication with heat source 2650 through switch 2654.

As a result of this configuration, during expansion gas that is flowing out of the storage unit 2632 through regenerator 2652 is warmed by receipt of thermal energy from the nearby flowing gas that is outlet from the lowest pressure stage 2624*a*. In particular, the gas outlet from the lowest pressure stage 2624*a* has been warmed by exposure to the heat source for three consecutive stages. This exchange of thermal energy between the flowing gases in the regenerator serves to enhance the energy output from expansion of the compressed gas. In turn, the gas that had been outlet from the lowest pressure stage is cooled to ambient temperature before being released to the atmosphere.

Figure 26B:
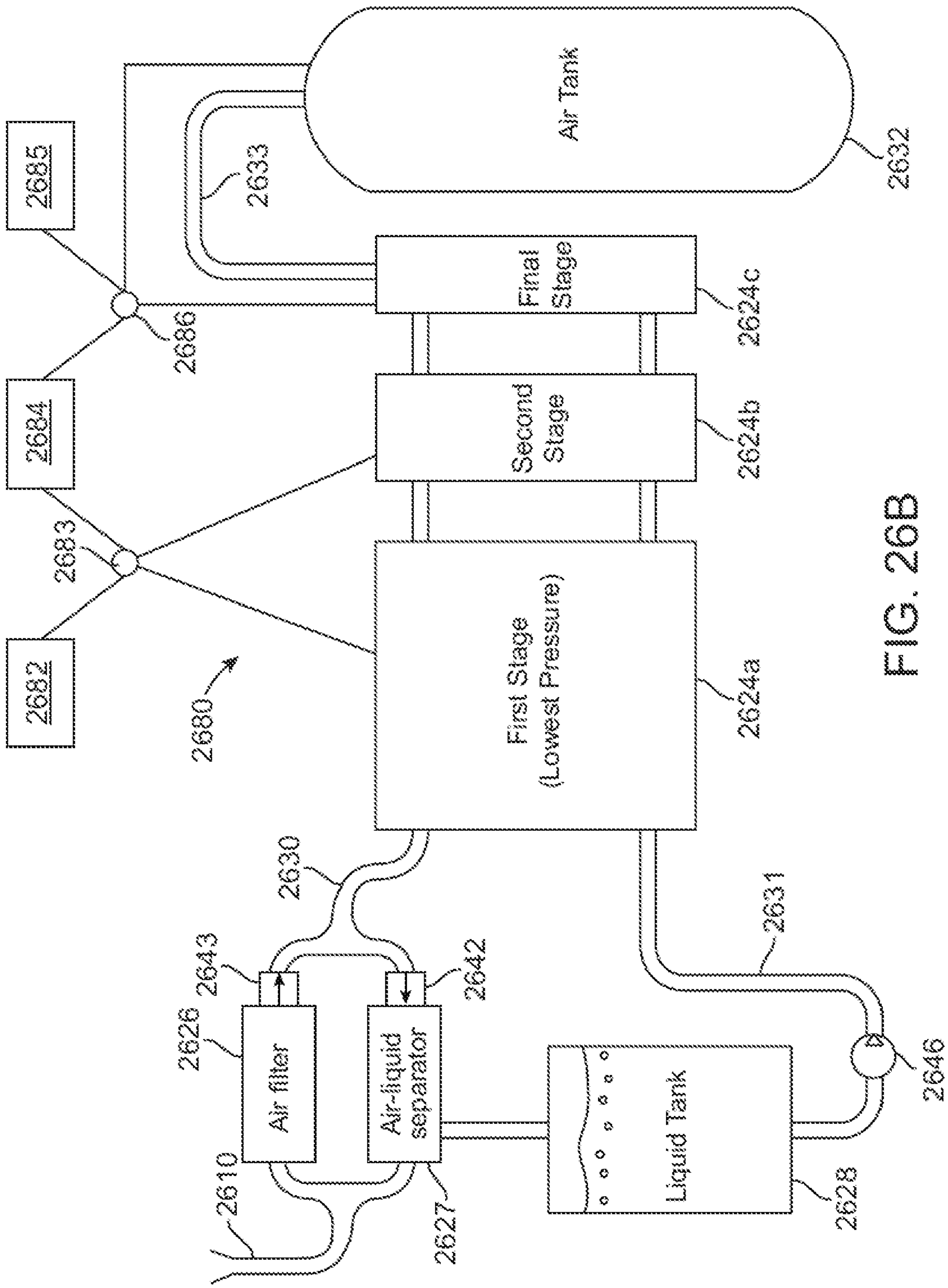
FIG. 26B shows a simplified view of an alternative embodiment of a multi-stage apparatus.

While the embodiments of FIGS. 26 and 26A show all of the stages of a multi-stage device as being in thermal communication with the same temperature or heat source, this is not required by the present invention. FIG. 26B shows an alternative embodiment of a system 2680 in which different stages are in selective communication with different heat sources having different temperatures. In the specific embodiment of FIG. 26B, a lowest pressure stage 2624*a* and a second stage 2624*b* are selectively in thermal communication with first heat source 2682 and heat sink 2684 through first switch 2683. The final stage 2624*c* and the storage unit 32 are selectively in thermal communication with heat sink 2684 and second heat source 2685 through second switch 2686.

Embodiments such as are shown in FIG. 26B, may allow the extracting of energy from secondary temperature differences. For example, intense heat from an industrial process may be reduced to ambient temperature through a succession of cooling steps, each having a temperature closer to ambient than the previous step.

Moreover, during compression and/or expansion the various stages of multi-stage apparatuses according to embodiments of the present invention, may experience different changes in temperature. Configurations such as are shown in FIG. 26B may allow more precise matching of such stages, to heat sources with specific temperatures, thereby allowing most efficient extraction of energy available from the various temperatures.

FIG. 24D shows an embodiment featuring a dedicated compressor and expander elements, which utilizes multiple expansion stages that are each in communication with different heat sources.

In summary, various embodiments of the present invention may have one or more of the following elements in common.

1. Selective thermal communication with the heat source during expansion cycles.

2. Near-isothermal expansion and compression of air, with the required heat exchange effected by a liquid phase in high-surface-area contact with the air.

3. A reversible mechanism capable of both compression and expansion of air.

4. Electronic control of valve timing so as to obtain the highest possible work output from a given volume of compressed air.

As described in detail above, embodiments of systems and methods for storing and recovering energy according to the present invention are particularly suited for implementation in conjunction with a host computer including a processor and a computer-readable storage medium. Such a processor and computer-readable storage medium may be embedded in the apparatus, and/or may be controlled or monitored through external input/output devices. FIG. 20 is a simplified diagram of a computing device for processing information according to an embodiment of the present invention. This diagram is merely an example, which should not limit the scope of the claims herein. One of ordinary skill in the art would recognize many other variations, modifications, and alternatives. Embodiments according to the present invention can be implemented in a single application program such as a browser, or can be implemented as multiple programs in a distributed computing environment, such as a workstation, personal computer or a remote terminal in a client server relationship.

FIG. 20 shows computer system 2010 including display device 2020, display screen 2030, cabinet 2040, keyboard 2050, and mouse 2070. Mouse 2070 and keyboard 2050 are representative "user input devices." Mouse 2070 includes buttons 2080 for selection of buttons on a graphical user interface device. Other examples of user input devices are a touch screen, light pen, track ball, data glove, microphone, and so forth. FIG. 20 is representative of but one type of system for embodying the present invention. It will be readily apparent to one of ordinary skill in the art that many system types and configurations are suitable for use in conjunction with the present invention. In a preferred embodiment, computer system 2010 includes a Pentium™ class based computer, running Windows™ XP™ or Windows 7™ operating system by Microsoft Corporation. However, the apparatus is easily adapted to other operating systems and architectures by those of ordinary skill in the art without departing from the scope of the present invention.

As noted, mouse 2070 can have one or more buttons such as buttons 2080. Cabinet 2040 houses familiar computer components such as disk drives, a processor, storage device, etc. Storage devices include, but are not limited to, disk drives, magnetic tape, solid-state memory, bubble memory, etc. Cabinet 2040 can include additional hardware such as input/output (I/O) interface cards for connecting computer system 2010 to external devices external storage, other computers or additional peripherals, further described below.

FIG. 20A is an illustration of basic subsystems in computer system 2010 of FIG. 20. This diagram is merely an illustration and should not limit the scope of the claims herein. One of ordinary skill in the art will recognize other variations, modifications, and alternatives. In certain embodiments, the subsystems are interconnected via a system bus 2075. Additional subsystems such as a printer 2074, keyboard 2078, fixed disk 2079, monitor 2076, which is coupled to display adapter 2082, and others are shown. Peripherals and input/output (I/O) devices, which couple to I/O controller 2071, can be connected to the computer system by any number of approaches known in the art, such as serial port 2077. For example, serial port 2077 can be used to connect the computer system to a modem 2081, which in turn connects to a wide area network such as the Internet, a mouse input device, or a scanner. The interconnection via system bus allows central processor 2073 to communicate with each subsystem and to control the execution of instructions from system memory 2072 or the fixed disk 2079, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

FIG. 21 is a schematic diagram showing the relationship between the processor/controller, and the various inputs received, functions performed, and outputs produced by the processor controller. As indicated, the processor may control various operational properties of the apparatus, based upon one or more inputs.

An example of such an operational parameter that may be controlled is the timing of opening and closing of a valve allowing the inlet of air to the cylinder during an expansion cycle, as described above in connection with FIGS. 13A-C.

Specifically, during step 1 of the expansion cycle, a predetermined amount of air $V_0$, is added to the chamber from the pressure cell, by opening valve 37 for a controlled interval of time. This amount of air $V_0$ is calculated such that when the piston reaches the end of the expansion stroke, a desired pressure within the chamber will be achieved.

In certain cases, this desired pressure will approximately equal that of the next lower pressure stage, or atmospheric pressure if the stage is the lowest pressure stage or is the only stage. Thus at the end of the expansion stroke, the energy in the initial air volume $V_0$ has been fully expended, and little or no energy is wasted in moving that expanded air to the next lower pressure stage.

To achieve this goal, valve 37 is opened only for so long as to allow the desired amount of air ($V_0$) to enter the chamber, and thereafter in steps 3-4, valve 37 is maintained closed. In certain embodiments, the desired pressure within the chamber may be within 1 PSI, within 5 PSI, within 10 PSI, or within 20 PSI of the pressure of the next lower stage.

In other embodiments, the controller/processor may control valve 37 to admit an initial volume of air that is greater than $V_0$. Such instructions may be given, for example, when greater power is desired from a given expansion cycle, at the expense of efficiency of energy recovery.

Timing of opening and closing of valves may also be carefully controlled during compression. For example in the steps 1 and 2 of the table corresponding to the addition of mist and compression, the valve 38 between the cylinder device and the pressure cell remains closed, and pressure builds up within the cylinder.

In conventional compressor apparatuses, accumulated compressed air is contained within the vessel by a check valve, that is designed to mechanically open in response to a threshold pressure. Such use of the energy of the compressed air to actuate a check valve, detracts from the efficiency of recovery of energy from the air for performing useful work.

By contrast, embodiments of the present invention may utilize the controller/processor to precisely open valve 38 under the desired conditions, for example where the built-up pressure in the cylinder exceeds the pressure in the pressure cell by a certain amount. In this manner, energy from the compressed air within the cylinder is not consumed by the valve opening process, and efficiency of energy recovery is enhanced. Embodiments of valve types that may be subject to electronic control to allow compressed air to flow out of a cylinder include but are not limited to pilot valves, cam-operated poppet valves, rotary valves, hydraulically actuated valves, and electronically actuated valves.

While the timing of operation of valves 37 and 38 of the single stage apparatus may be controlled as described above, it should be appreciated that other valves may be similarly controlled.

Another example of a system parameter that can be controlled by the processor, is the amount of liquid introduced into the chamber. Based upon one or more values such as pressure, humidity, calculated efficiency, and others, an amount of liquid that is introduced into the chamber during compression or expansion, can be carefully controlled to maintain efficiency of operation. For example, where an amount of air greater than $V_0$ is inlet into the chamber during an expansion cycle, additional liquid may need to be introduced in order to maintain the temperature of that expanding air within a desired temperature range.

Variations on the specific embodiments describe above, are possible. For example, in some embodiments, a plurality of pistons may be in communication with a common chamber.

And while the above embodiments have shown the heat exchanger as being in contact with the liquid portion of the pressure cell, this is not required by the present invention. In accordance with alternative embodiments, the heat exchanger could be in contact with gas portions of the pressure cell, or with both gas and liquid portions of the pressure cell. In embodiments lacking a dedicated pressure cell (for example as shown in FIG. 10), a heat exchanger could be in contact with gas or liquid present in or flowing into the cylinder, and remain within the scope of the present invention.

And while the above embodiments have shown a dedicated pressure cell, a multistage apparatus may not include a separate pressure cell. For example, in the embodiment of FIG. 10, the stages are connected directly together through a heat exchanger, rather than through a pressure cell. The relative phases of the cycles in the two stages must be carefully controlled so that when Stage 1 is performing an exhaust step, Stage 2 is performing an intake step (during compression). When Stage 2 is performing an exhaust step, Stage 1 is performing an intake step (during expansion).

The timing is controlled so the pressures on either side of heat exchanger 10024 are substantially the same when valves 37 and 10058 are open. Liquid for spray nozzle 44 is supplied from an excess water in cylinder 22 by opening valve 10036 and turning on pump 10032. Similarly, liquid for spray nozzle 10064 is supplied from an excess water in cylinder 10046 by opening valve 10038 and turning on pump 10034. Such precise timing during operation may be achieved with the operation of a controller/processor that is communication with a plurality of the system elements, as has been previously described.

The use of expansion of a liquid-gas aerosol for cooling purposes, is discussed in U.S. Provisional Patent Application No. 61/320,150, which is incorporated by reference in its entirety herein for all purposes. Embodiments of the present invention relate to compressed gas energy storage and recovery systems which can operate using such an aerosol refrigeration cycle.

In particular, embodiments of such cooling systems operate by compressing and expanding air nearly isothermally, using a water spray to facilitate heat exchange. Because in certain embodiments the refrigerant comprises an air-water aerosol, the system can operate efficiently and reliably without greenhouse gas (GHG) emissions.

Embodiments of the present invention allow air to be compressed and expanded nearly isothermally, with only a small temperature change. This follows from a basic result in thermodynamics: less work is required to compress a gas if the heat generated by the compression process is removed during the compression stroke. Similarly, more work can be obtained from expanding air if heat is added during expansion.

Liquid water exhibits a volumetric heat capacity about five thousand times greater than the heat capacity of atmospheric air. Embodiments of the present invention spray fine water droplets into compression and expansion chambers. This allows a small amount of water spray to absorb the great majority of the heat generated, resulting in nearly isothermal operation.

Certain embodiments utilize a reciprocating piston mechanism to perform compression and expansion. Such a reciprocating piston mechanism allows the spraying of liquid directly into the compression or expansion chambers. Systems in which liquid droplets can be introduced in the form of a spray directly into an expansion chamber are described in U.S. Nonprovisional patent application Ser. No. 12/701,023, which is incorporated by reference in its entirety herein for all purposes. U.S. Provisional Patent Application No. 61/306,122 describes alternative embodiments in which the liquid spray can be introduced into a mixing chamber located upstream of the chamber in which gas undergoes expansion. This provisional patent application is also incorporated by reference in its entirety herein for all purposes.

In addition, the rate and timing of the liquid spray can be controlled. This permits varying of the flow rate and $\Delta T$ independently, thereby optimizing efficiency and comfort.

Coupling of a near-isothermal compressor and expander allows an aerosol refrigeration cycle to be run. In certain embodiments, this allows the use of only air and water as working fluids. Other embodiments may employ other combinations of gas and liquid, such as helium and lubricating oil. Use of gas liquid combinations delivers a high coefficient of performance (COP) without GHG emissions.

An aerosol refrigeration cycle according to embodiments of the present invention can operate efficiently despite not moving much heat via phase change. This efficiency is achieved by extracting work of the expanding gas and reinvesting that work into compression.

Figure 28:
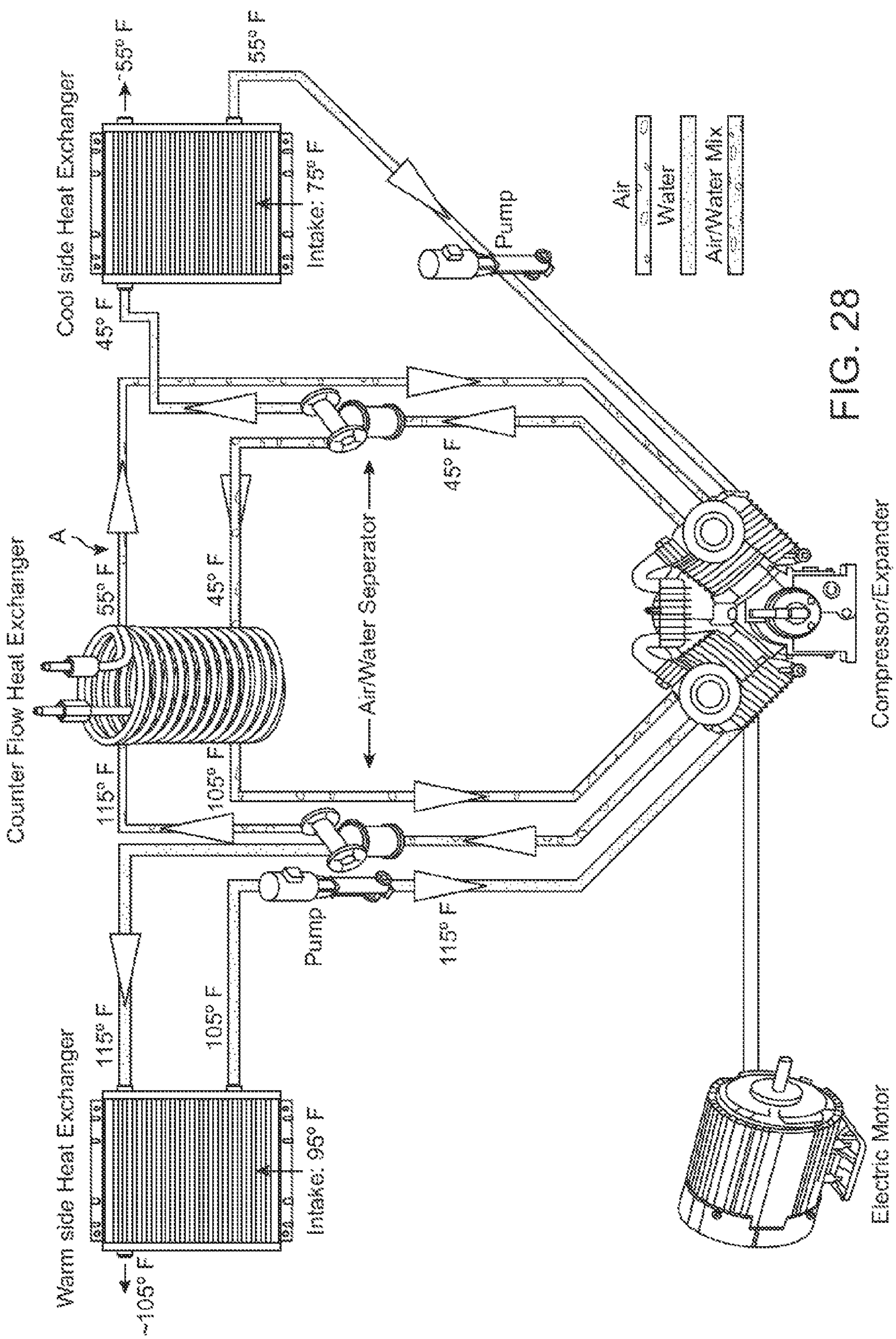
FIGS. 28-28A are simplified schematic views of embodiments of aerosol refrigeration cycles.

FIG. 28 is a simplified diagram illustrating a refrigeration cycle according to one embodiment of the present invention. Specifically, the motor drives the compressor piston upward from bottom dead center (BDC), compressing the air in the cylinder, which starts off at 150 psi.

As the piston travels toward top dead center (TDC), a pump sprays water into the cylinder, keeping the temperature rise to about 10° F. When the pressure in the cylinder reaches about 500 psi, the exhaust valve opens, sending the compressed air-water droplet mixture into an air-water separator.

The separated water passes through a heat exchanger, rejecting the heat gained during compression to the outside. The air passes through a cross-flow heat exchanger on its way to the expander cylinder, where it transfers some of its heat to air traveling in the other direction (from the expander to the compressor).

The cooled air begins to enter the expander cylinder at TDC, where, once again, water is sprayed into the cylinder. The expanding air drives the piston towards BDC, turning the shaft and providing additional power to move the compressor cylinder.

The air-water mix passes through another separator, and the separated water passes through the cool side heat exchanger, drawing heat from inside the building. The separated air returns to the compressor via the cross-flow heat exchanger, completing the cycle.

A optional benefit of this design is that, if an air storage tank is placed at point A in FIG. 28, the compressor can be run during periods of low electricity demand to fill the tank. The cooling effect achieved by expansion can then be delivered at periods of peak demand (for example between 7 AM-7 PM on weekdays), with no additional electricity usage.

Figure 28A:
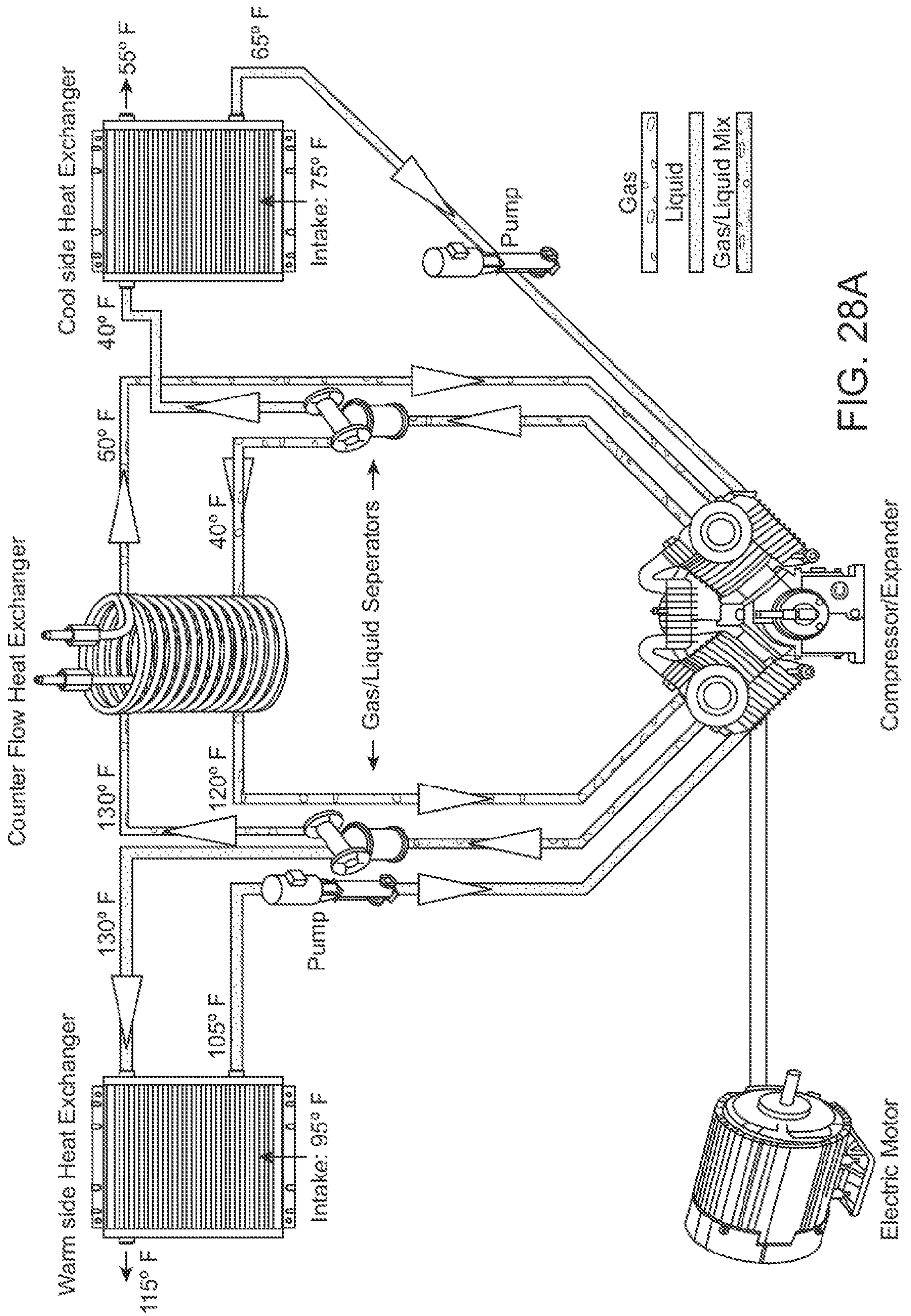

Embodiments of the present invention are not limited to the particular temperatures described above. For example, FIG. 28A shows an alternative embodiment of an aerosol refrigeration cycle comprising the following steps 1-6.

1. Cool gas (at ~65° F.) expands in a reciprocating expander, drawing heat from a liquid spray entrained within. Both leave the expander at ~40° F. The work extracted is reinvested into the compressor and the pumps.

2. The cool aerosol is separated from the gas, collected into a liquid stream, and routed to a heat exchanger, cooling the intake airstream, to ~55° F., and cycled back to be sprayed into expanding gas once more.

3. The cool liquid-free gas is passed through a counter-flow heat exchanger, countering a flow of warm liquid-free gas. The cool gas is heated at constant pressure to slightly above ambient temperature (~120° F.).

4. Warm liquid is sprayed into the warm gas, and is then compressed. The compressor is driven in part by the expander, and in part by an electric motor. The heat of compression is drawn into the aerosol. Both leave the compressor at ~130° F.

5. Warm liquid is separated from the gas, collected into a stream, and routed to the heat exchanger, which cools by dumping the heat to the ambient environment, and is then recycled to be sprayed into the compressing gas once again.

6. The warm liquid-free gas is passed through the counter-flow heat exchanger, countering the flow of cool liquid-free gas. The warm gas is cooled at constant pressure to slightly below air conditioner exhaust temperature (to ~50° F.). The gas flows into the expander, is entrained with cool liquid, and the cycle continues.

Certain embodiments may achieve a COP exceeding 4 at reasonable cost. Control of parasitic losses may aid in improving the efficiency of the device. For example, the efficiency of the compressor and expander mechanisms can exceed 79% roundtrip if the efficiency of the electrical motor and drive together is 95%. This level of efficiency is achievable if high-quality mechanical components are used, and if the temperature change during compression, expansion, and across all the heat exchangers can be kept to between about 10° F. to 20° F.

Embodiments of the present invention utilize an approach that is similar in certain respects to a gas refrigeration cycle with a turbine expander, such as may be used in an air-cycle cooler in jet aircraft. For example, much of the cooling occurs via transfer of sensible heat rather than latent heat.

Embodiments of an aerosol refrigeration cycle according to the present invention, however, differ from such a conventional gas refrigeration cycle in certain respects. For example, use of an aerosol in the compression and expansion processes, and the rejection of the heat via the liquid component of the aerosol, allows for a more compact and inexpensive system.

Specifically, an air-water aerosol carries more heat per unit volume at a given pressure than the same volume of air. This allows more heat to be pumped per stroke than could be achieved by a conventional (adiabatic) compressor/expander, using a high compression ratio, while tightly controlling ΔT to desired efficient ranges.

The low, tightly controlled ΔT yields high thermodynamic efficiencies. The great amount of heat pumped per stroke diminishes the effect of mechanical and fluid efficiency losses. The superior heat carrying and heat transfer capability of the water component of air-water aerosols, lowers the cost and bulk of the required heat exchanger.

Achieving near-isothermal compression and expansion in an aerosol refrigeration cycle according to embodiments of the present invention, may depend upon development of spray nozzles that will introduce water into the compression and expansion chambers at the necessary mass flow and droplet size. Such spray systems can be characterized using particle velocity imaging and computational fluid dynamics (CFD) analysis.

Figure 29:
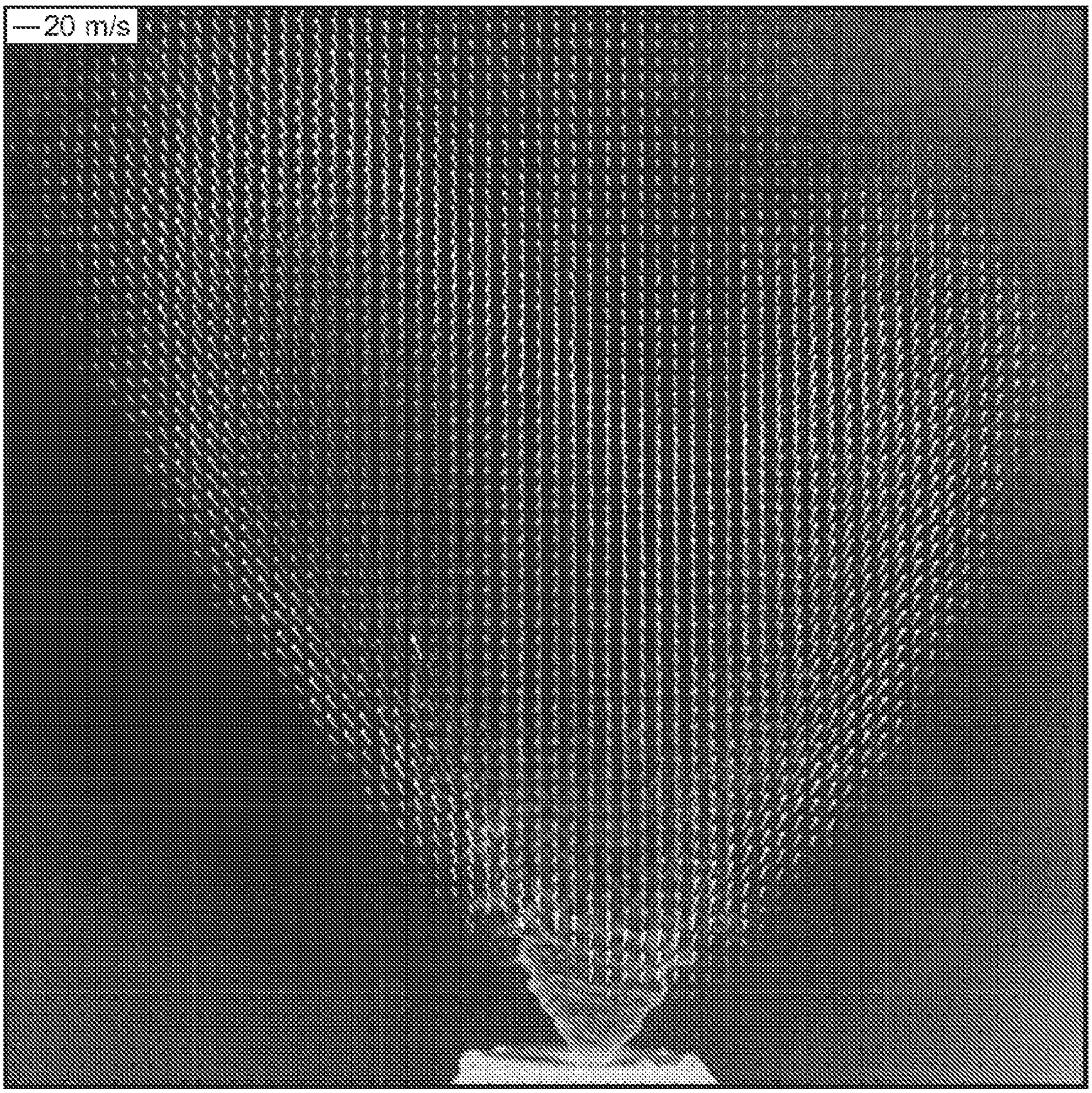
FIG. 29 shows a velocity field for a hollow-cone nozzle design.
Figure 30:
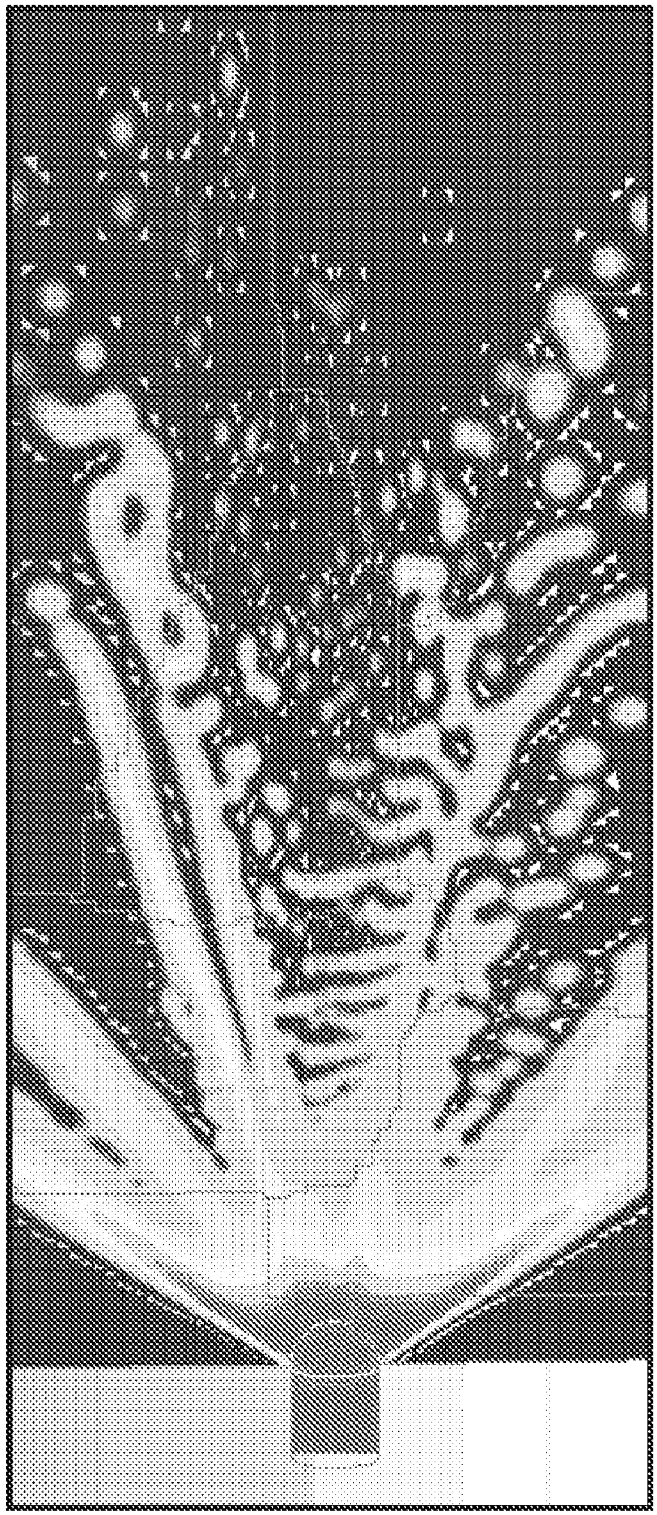
FIG. 30 shows a simulation of a fan nozzle.

FIG. 29 shows the velocity field for a hollow-cone nozzle that provides very uniform droplet distribution, appropriate for a high compression ratio. FIG. 30 shows a CFD simulation of a fan nozzle, which provides a high mass flow.

As mentioned above, the coefficient of performance (COP) is one quantifiable characteristic of refrigeration systems. Conventional commercial air conditioning units may operate at a COP of 3.5.

Embodiments of systems utilizing an aerosol refrigeration cycle may target a COP of about 4. However, the exact value of COP actually delivered depends upon a number of values.

Figure 31:
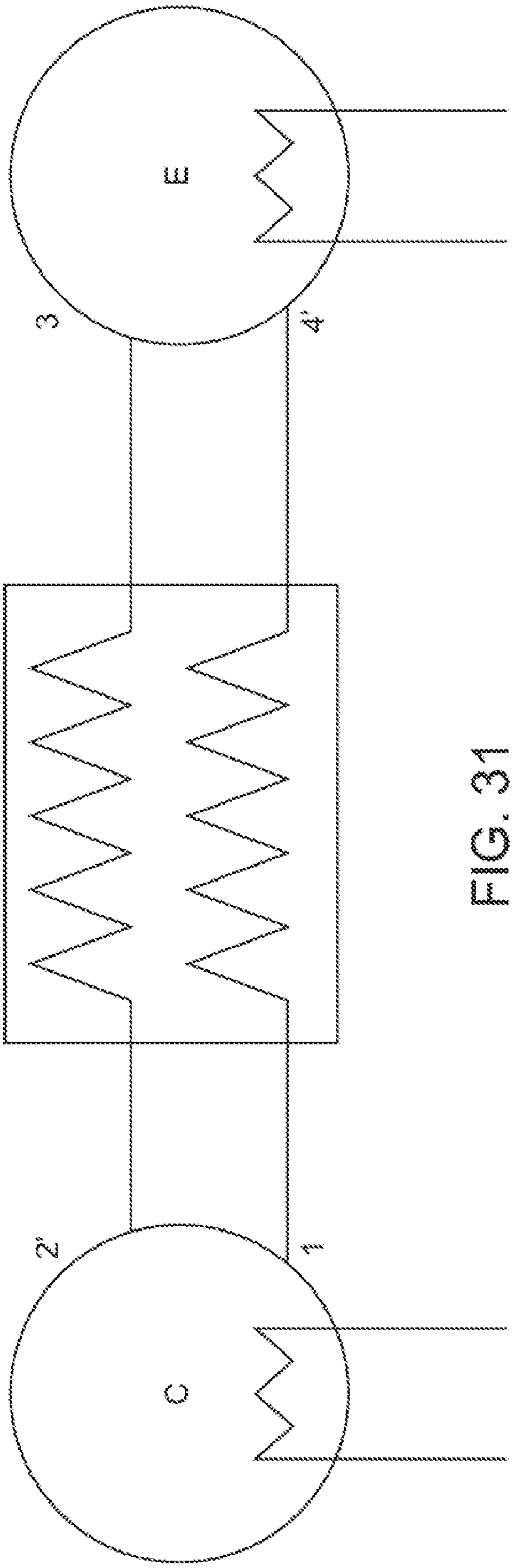
FIG. 31 shows a system diagram for an embodiment of an aerosol refrigeration cycle.
Figure 32:
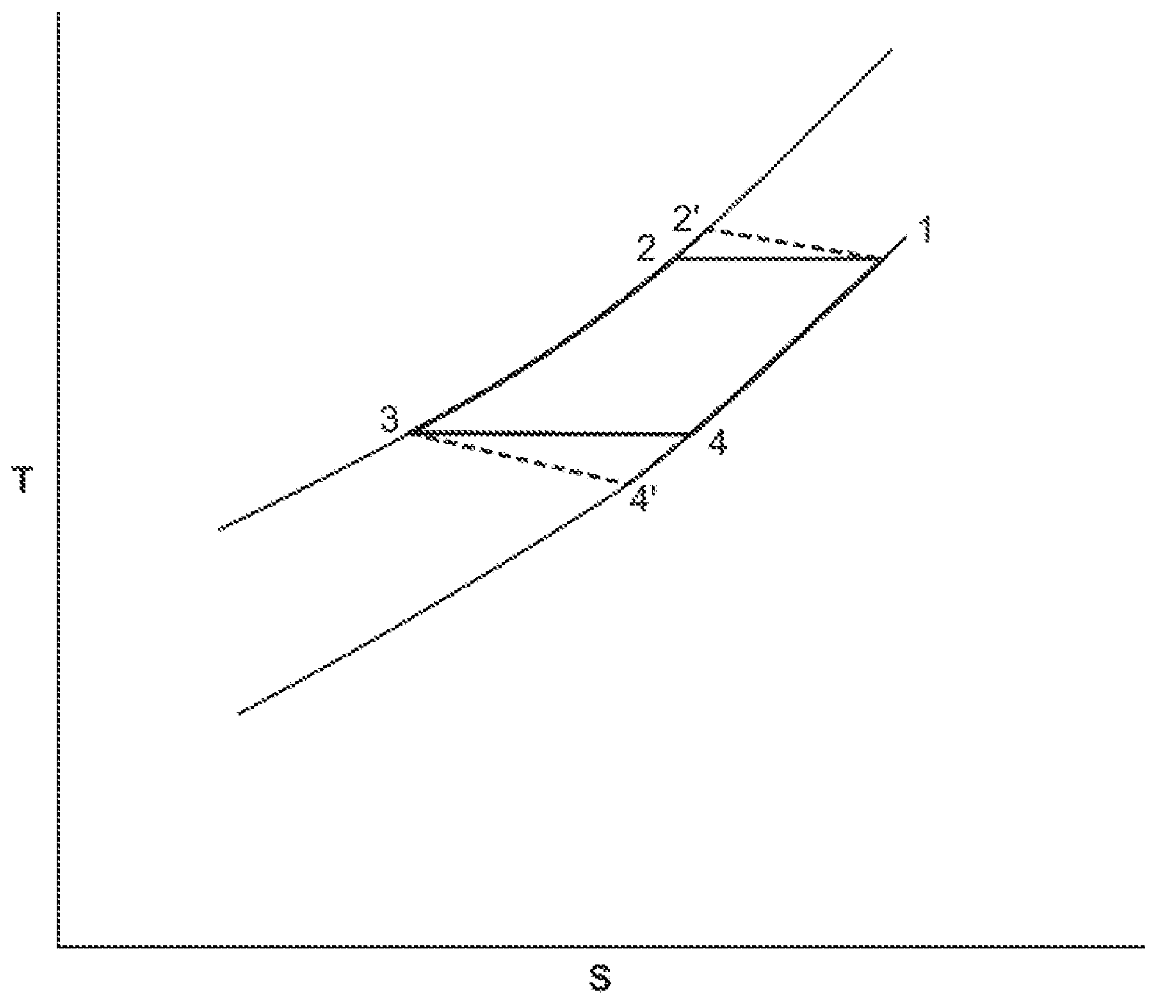
FIG. 32 plots temperature versus entropy for an embodiment of an aerosol refrigeration cycle.

An example of such a computation of COP is now provided in connection with the following mathematical expressions (1)-(14), with FIG. 31 showing a system diagram for an aerosol refrigeration cycle, and with FIG. 32 showing a temperature-entropy diagram for a aerosol refrigeration cycle, The work done during the isothermal compression process between points 1 and 2 is given as:

$$W_{1\rightarrow 2}\left(\frac{\text{kJ}}{\text{kg}}\right) = P_1 V_1 \ln\left(\frac{P_2}{P_1}\right) = RT_1 \ln\left(\frac{P_2}{P_1}\right) \tag{1}$$

The compressor efficiency is defined as the ratio of work done during an isothermal compression process to the actual work done.

$$\eta_{Compressor} = \frac{W_{1\to 2}}{W_{1\to 2'}} \tag{2}$$

The work during the isothermal expansion process is given as:

$$W_{3\to 4}\left(\frac{\text{kJ}}{\text{kg}}\right) = P_4 V_4 \ln\left(\frac{P_3}{P_4}\right) = RT_4 \ln\left(\frac{P_3}{P_4}\right) \tag{3}$$

The expander efficiency is given as the ratio of actual work extracted to the work extracted in an isothermal process.

$$\eta_{Expander} = \frac{W_{3\to 4'}}{W_{3\to 4}} \tag{4}$$

The heat extracted from the room by an isothermally operating expander is given as:

$$Q_{3\to 4}\left(\frac{\text{kJ}}{\text{kg}}\right) = W_{3\to 4} = RT_4 \ln\left(\frac{P_3}{P_4}\right) \tag{5}$$

The COP can now be calculated as:

$$COP = \frac{Q_{3\to 4'}}{W_{1\to 2} - W_{3\to 4}} \tag{6}$$

Specific parameters for one embodiment of a system are provided as follows: $T_1$=75° F.=297K; $T_2$=75° F.=297K, $T_3$=55° F.=286K, $T_4$=55° F.=286K.

The pressure ratio is taken to be 2.71.

$$\frac{P_2}{P_1} = \frac{P_3}{P_4} = 2.71 \tag{7}$$

Work done in isothermal compression is now given as:

$$W_{1\to 2} = RT_1 \ln\left(\frac{P_2}{P_1}\right) = 0.287 \times 297 \times \ln(2.71) = 84.98\frac{\text{kJ}}{\text{kg}} \tag{8}$$

Assuming thermal efficiency of expansion is 98% as well as total mechanical and leakage efficiency 95.6%, the actual work done is:

$$W_{1\to 2'} = \frac{W_{1\to 2}}{\eta_{thermal} \times \eta_{mech}} = \frac{84.98}{0.956 \times 0.98} = 90.7\frac{\text{kJ}}{\text{kg}} \tag{9}$$

Work extracted from isothermal expansion is given as:

$$W_{3\to 4} = RT_4 \ln\left(\frac{P_3}{P_4}\right) = 0.287 \times 286 \times \ln(2.71) = 81.83\frac{\text{kJ}}{\text{kg}} \tag{10}$$

Assuming thermal efficiency of expansion is 92.7% as well as mechanical and leakage efficiency of 95.6%, actual work extracted is given as:

$$W_{3\to 4'} = \eta_{Expander} W_{3\to 4} = 0.927 \times 0.956 \times 81.83 = 72.52\frac{\text{kJ}}{\text{kg}} \tag{11}$$

Heat extracted from the room is given by:

$$Q_{3\to 4} = W_{3\to 4} = 81.83\frac{\text{kJ}}{\text{kg}} \tag{12}$$

The COP is now given as:

$$\begin{aligned} COP &== \left(\frac{Q_{3\to 4}}{W_{1\to 2'} - W_{3\to 4'}}\right) \times \eta_{motor} \times \eta_{drive} \\ &= \left(\frac{81.83}{90.7 - 72.52}\right) \times 0.95 \times 0.97 = 4.15 \end{aligned} \tag{13}$$

Figure 32A:
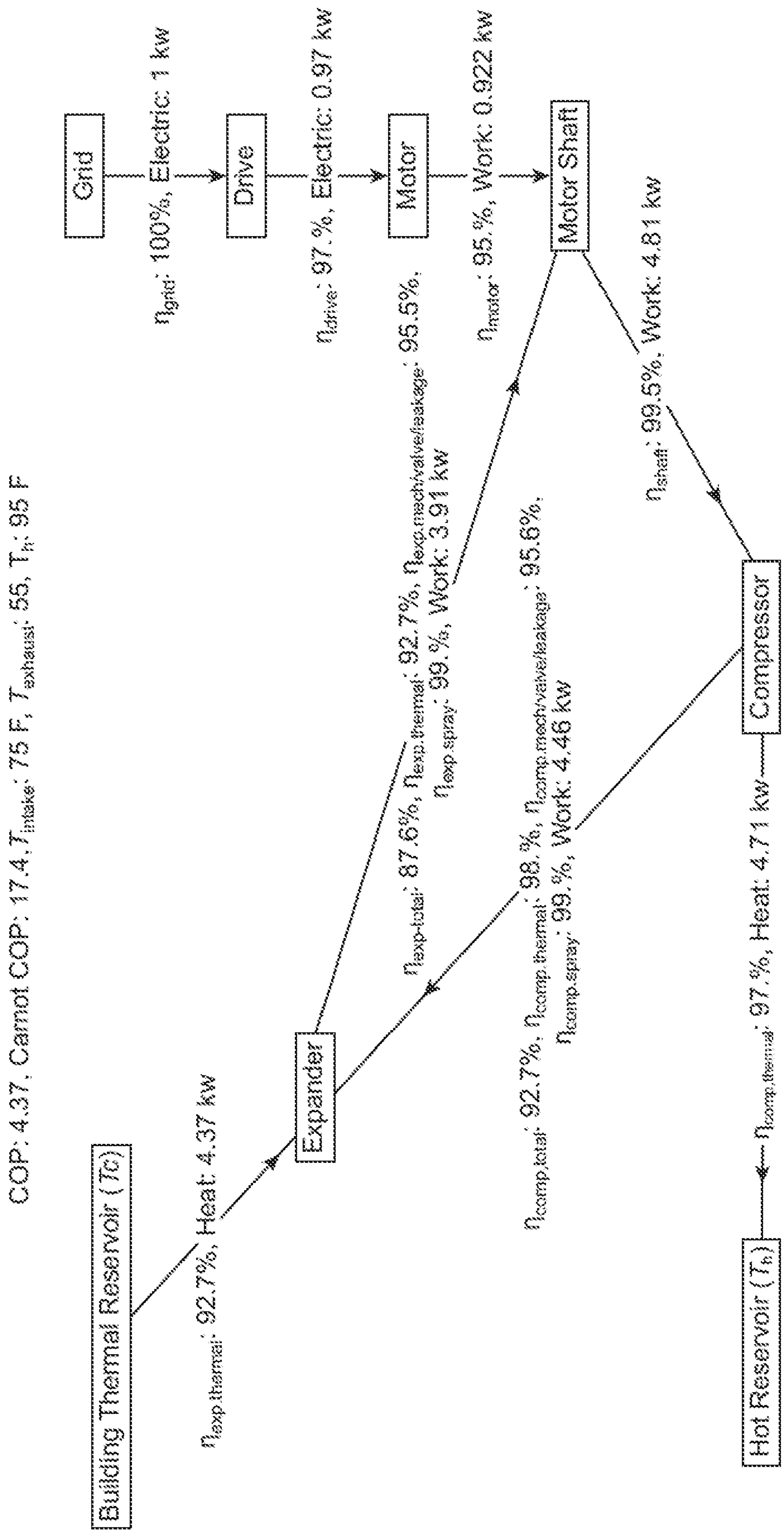
FIG. 32A is a power flow graph illustrating work and heat flowing through an embodiment of an aerosol refrigeration cycle.

FIG. 32A is a power flow graph illustrating work and heat flowing through an embodiment of an aerosol refrigeration cycle. Power values are normalized to the electric power flowing in from the grid.

First, 1 kw of electric power is processed through a motor drive with an efficiency of 97%, followed by a motor with an efficiency of 95%. This progresses through a motor shaft, which loses 0.5% of its power as friction. This shaft drives the compressor.

The compressor may have several possible sources of inefficiency, including but not limited to spray, leakage, mechanical, and thermal. For the mass ratio of 10:1 water to helium, spray losses come to only 1% of the work cycled through the system.

Mechanical and leakage losses of a reciprocating compressor or expander, are typically around 95%. However, the friction losses are concentrated in the valve actuators, the orifice friction and pipe losses and the piston rings.

These friction losses do not scale up linearly as the pressure mounts, and valve/pipe losses are low for light gases like helium. With operation at an internally pressurize of about 25 bar, with a pressure ratio of 2.71, it may be possible to maintain these mechanical efficiencies collectively above 95.6%.

Thermal efficiencies are also shown in the embodiment of FIG. 32A. Expansion efficiencies are 92.7% and compression efficiencies are 98% for the temperatures shown, when the temperature difference between the gas and liquid stays below about 5° F.

A size of a system utilizing an aerosol refrigeration cycle according an embodiment of the present invention, can be based upon a number of factors. Certain components of the system, such as reciprocating pistons, pumps, heat exchangers, and an AC motor, are standard devices that can be used either off-the-shelf or with relatively simple modifications. This allows construction of devices and prototypes of convenient sizes.

For example, a one-ton system running at 1200 RPM and 150 psi could utilize a 1 hp electric motor, two reciprocating pistons of 350 cc total displacement, and fan-cooled heat exchangers with an interfacial surface area of about 15 square meters. These components may be fit into a desired form-factor (for example 1.5'×1'×9").

In particular embodiments, the components in a system can reasonably be expected to operate with little or no maintenance for a target specification of 10+years. One factor affecting lifetime may involve the use of water in the compressor and expander cylinders, as water can be corrosive to many metals. Water-tolerant materials may also be useful in the constructions of elements such as sliding seals, valve seats, wear surfaces, and fasteners. Embodiments in accordance with the present invention may use aluminum components, nickel-polymer coatings, and/or PTFT sliding components, in order to improve the lifetime of elements exposed to water.

In summary, embodiments of the present invention may potential benefits as compared with conventional approaches to refrigeration. For example, conventional refrigeration apparatuses may have hot and cold temperatures nearly fixed as a function of compression ratio, leading to an overshoot of $\Delta T$ beyond that which is actually needed, and leading to potentially significant thermodynamic losses. By contrast, embodiments of the present invention are able to control $\Delta T$ independently of load and compression ratio, allow avoidance of this particularly significant efficiency loss.

Another potential advantage that may be offered by systems according to the present invention, is the capture of energy that is otherwise wasted in conventional systems. For example, a typical air conditioner performs expansion through a nozzle (for example the expansion valve). Energy is released during this process that is wasted. This may be because the relative efficiency bonus for vapor compression is small—a COP bonus of about 1.

By contrast, the relative efficiency bonus for aerosol cycles is much larger—a COP bonus of 4 or more. Accordingly, embodiments of the present invention are able to efficiently compress aerosols, exchange heat, and generate mechanical work from expansion of the aerosol. Given good mechanical and thermodynamic design, to deliver a high COP.

Still another potential advantage of refrigeration systems according to embodiments of the present invention, is the avoidance of GHGs. In particular, the components of an air-water aerosol or helium-oil aerosol do not exhibit greenhouse properties, and hence systems according to the present invention may be environmentally advantageous as compared with conventional systems utilizing HCFCs or other working fluids.

In summary, embodiments in accordance with the present invention relate to the extraction of energy from a temperature difference. In particular embodiments, energy from a heat source may be extracted through the expansion of compressed air. In certain embodiments, a storage unit containing compressed gas is in fluid communication with a compressor-expander. Compressed gas received from the storage unit, expands in the compressor-expander to generate power. During this expansion, the compressor-expander is in selective thermal communication with the heat source through a heat exchanger, thereby enhancing power output by the expanding gas. In alternative embodiments, where the heat source is continuously available, a dedicated gas expander may be configured to drive a dedicated compressor. Such embodiments may employ a closed system utilizing gas having high heat capacity properties, for example helium or a high density gas resulting from operation of the system at an elevated baseline pressure.

One source of compressed air is wind. It is known that the efficiency of power generation from wind, improves with increased height of elevation of the fan blades of the wind turbine from the ground. Such elevation, however, requires provision of a large, fixed structure of sufficient mechanical strength to safely support the relatively heavy structure of the turbine, including the blades, under a variety of wind conditions.

The expense of constructing and maintaining such a support structure is an inherent expense of the system, detracting from the overall profitability of the wind generation device. Accordingly, there is a need in the art for novel structures and methods for supporting a wind turbine.

An energy storage and recovery system employs air compressed utilizing power from an operating wind turbine. This compressed air is stored within one or more chambers of a structure supporting the wind turbine above the ground. By functioning as both a physical support and as a vessel for storing compressed air, the relative contribution of the support structure to the overall cost of the energy storage and recovery system may be reduced, thereby improving economic realization for the combined turbine/support apparatus. In certain embodiments, expansion forces of the compressed air stored within the chamber may be relied upon to augment the physical stability of a support structure, further reducing material costs of the support structure.

An embodiment of a method in accordance with the present invention comprises storing compressed gas generated from power of an operating wind turbine, within a chamber defined by walls of a structure supporting the wind turbine.

An embodiment of an apparatus in accordance with the present invention comprises a support structure configured to elevate a wind turbine above the ground, the support structure comprising walls defining a chamber configured to be in fluid communication with a gas compressor operated by the wind turbine, the chamber also configured to store gas compressed by the compressor.

An embodiment of an apparatus in accordance with the present invention comprises an energy storage system comprising a wind turbine, a gas compressor configured to be operated by the wind turbine, and a support structure configured to elevate the wind turbine above the ground, the support structure comprising walls defining a chamber in fluid communication with the gas compressor, the chamber configured to store gas compressed by the gas compressor. A generator is configured to generate electrical power from expansion of compressed gas flowed from the chamber.

As previously described, a wind turbine operates to capture wind energy more effectively the higher it is elevated above the ground. In particular, wind speed is roughly proportional to the seventh root of the height. Power is proportional to the cube of the wind speed, and also proportional to the area of the wind turbine. A greater height, H, could theoretically allow a larger diameter turbine, giving area proportional to H2 and power proportional to Hx, with x perhaps as great as 2³⁄₇. The support structure is thus a necessary element of the system. According to embodiments of the present invention, this support structure can perform the further duty of housing one or more chambers or vessels configured to receive and store compressed air generated from output of the wind turbine.

Such a support structure for a wind turbine is initially well suited for this task, as it is typically formed from an exterior shell that encloses an interior space. This structure provides the desired mechanical support for the wind turbine at the top, while not consuming the large amount of material and avoiding the heavy weight that would otherwise be associated with an entirely solid supporting structure.

Figure 33:
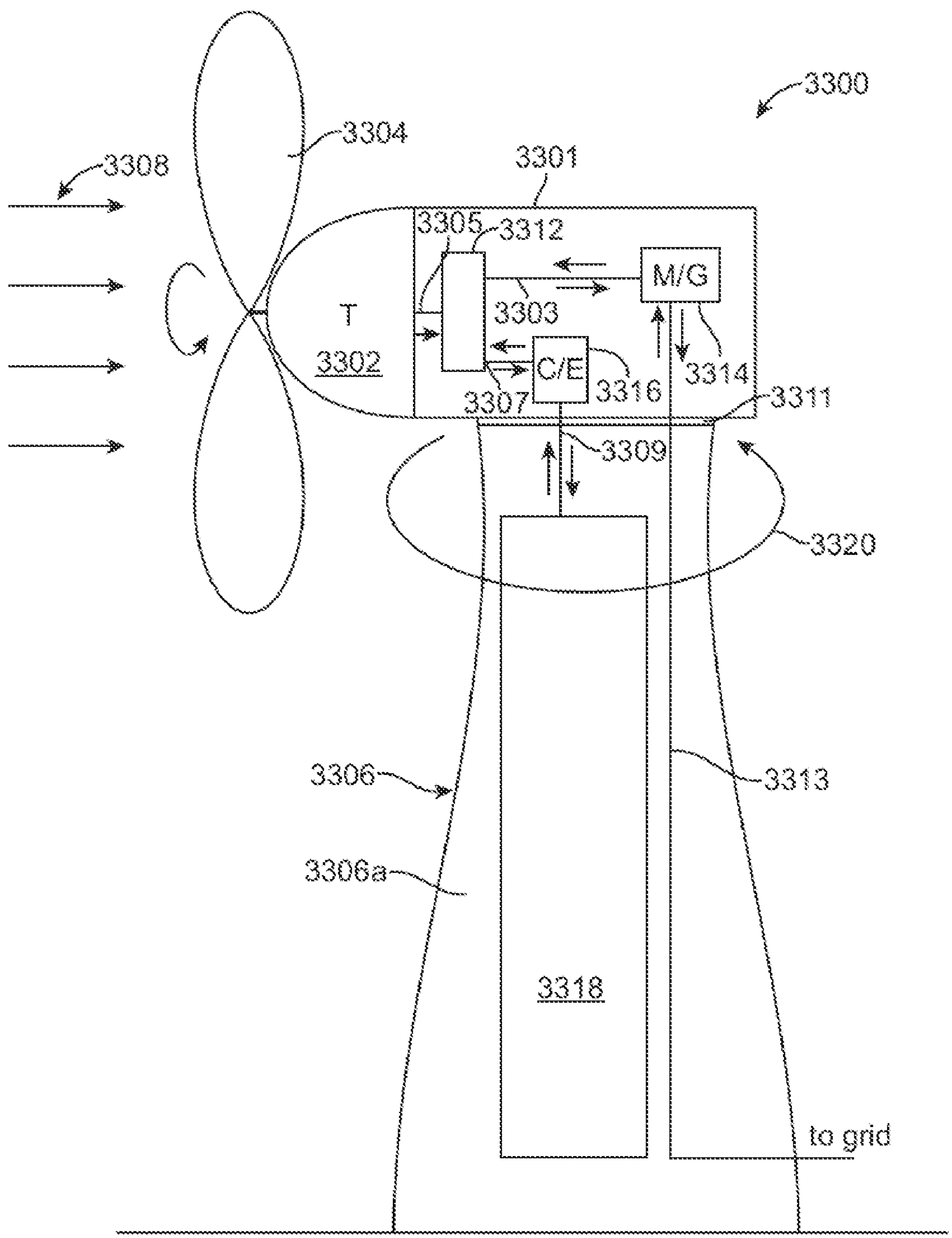
FIG. 33 is a simplified schematic representation of an embodiment of a system in accordance with the present invention.

FIG. 33 shows a simplified schematic view of an embodiment of a system in accordance with the present invention. Specifically, system 3300 comprises a nacelle 3301 that is positioned on top of support tower 3306. Nacelle 3301 includes a wind turbine 3302 having rotatable blades 3304.

Nacelle 3301 may be in rotatable communication (indicated by arrow 3320) with support tower 3306 through joint 3311, thereby allowing the blades of the wind turbine to be oriented to face the direction of the prevailing wind. An example of a wind turbine suitable for use in accordance with embodiment of the present invention is the model 1.5 sle turbine available from the General Electric Company of Fairfield, Conn.

Upon exposure to wind 3308, the blades 3304 of the turbine 3302 turn, thereby converting the power of the wind into energy that is output on linkage 3305. Linkage 3305 may be mechanical, hydraulic, or pneumatic in nature.

Linkage 3305 is in turn in physical communication with a motor/generator 3314 through gear system 3312 and linkage 3303. Gear system 3312 is also in physical communication with compressor/expander element 3316 through linkage 3307. Linkages 3303 and 3307 may be mechanical, hydraulic, or pneumatic in nature.

The gear system may be configured to permit movement of all linkages at the same time, in a subtractive or additive manner. The gear system may also be configured to accommodate movement of fewer than all of the linkages. In certain embodiments, a planetary gear system may be well-suited to perform these tasks.

Compressed gas storage chamber 3318 is defined within the walls 3318*a* of the support tower. Compressor/expander 3316 is in fluid communication with storage chamber 3318 through conduit 3309.

Several modes of operation of system 3300 are now described. In one mode of operation, the wind is blowing, and demand for power on the grid is high. Under these conditions, substantially all of the energy output from rotation of the blades of the turbine, is communicated through linkages 3305 and 3303 and gear system 3312 to motor/generator 3314 that is acting as a generator. Electrical power generated by motor/generator 3314 is in turn communicated through conduit 3313 to be output onto the grid for consumption. The compressor/expander 3316 is not operated in this mode.

In another mode of operation, the wind is blowing but demand for power is not as high. Under these conditions, a portion of the energy output from rotation of the blades of the turbine is converted into electrical power through elements 3305, 3312, 3303, and 3314 as described above.

Moreover, some portion of the energy output from the operating turbine is also communicated through linkages 3305 and 3307 and gear system 3312 to operate compressor/expander 3316 that is functioning as a compressor. Compressor/expander 3316 functions to intake air, compress that air, and then flow the compressed air into the storage chamber 3318 located in the support tower. As described below, energy that is stored in the form of this compressed air can later be recovered to produce useful work.

Specifically, in another mode of operation of system 3300, the compressor/expander 3316 is configured to operate as an expander. In this mode, compressed air from the storage chamber is flowed through conduit 3309 into the expander 3316, where it is allowed to expand. Expansion of the air drives a moveable element that is in physical communication with linkage 3307. One example of such a moveable element is a piston that is positioned within a cylinder of the compressor/expander 3316.

The energy of actuated linkage 3307 is in turn communicated through gear system 3312 and linkage 3303 to motor/generator 3314 that is acting as a generator. Electrical power generated by motor/generator as a result of actuation of linkage 3303, may in turn be output to the power grid through conduit 3313.

In the mode of operation just described, the wind may or may not be blowing. If the wind is blowing, the energy output by the compressor/expander 3316 may be combined in the gear system with the energy output by the turbine 3312. The combined energy from these sources (wind, compressed air) may then be communicated by gear system 3312 through linkage 3303 to motor/generator 3314.

In still another mode of operation, the wind may not be blowing and power demand is low. Under these conditions, the compressor/expander 3316 may operate as a compressor. The motor/generator 3314 operates as a motor, drawing power off of the grid to actuate the compressor/expander 3316 (functioning as a compressor) through linkages 3303 and 3307 and gear system 3312. This mode of operation allows excess power from the grid to be consumed to replenish the compressed air stored in the chamber 3318 for consumption at a later time.

Embodiments of systems which provide for the efficient storage and recovery of energy as compressed gas, are described in the U.S. Provisional Patent Application No. 61/221,487 filed Jun. 29, 2009, and in the U.S. nonprovisional patent application Ser. No. 12/695,922 filed Jan. 28, 2010, both of which are incorporated by reference in their entireties herein for all purposes. However, embodiments of the present invention are not limited to use with these or any other particular designs of compressed air storage and recovery systems. Also incorporated by reference in its entirety herein for all purposes, is the provisional patent application No. 61/294, 396, filed Jan. 12, 2010.

As previously mentioned, certain embodiments of the present invention may favorably employ a planetary gear system to allow the transfer of mechanical energy between different elements of the system. In particular, such a planetary gear system may offer the flexibility to accommodate different relative motions between the linkages in the various modes of operation described above.

Figure 33A:
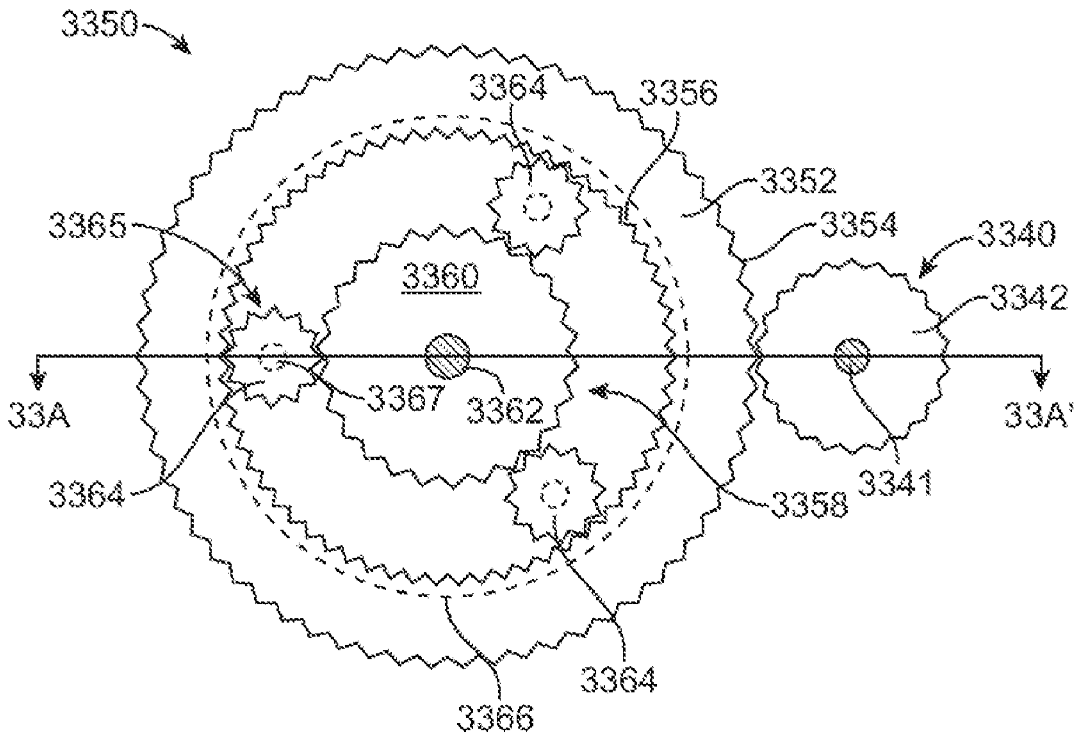
FIG. 33A shows a simplified top view of one embodiment of a planetary gear system which could be used in embodiments of the present invention.
Figure 33A:
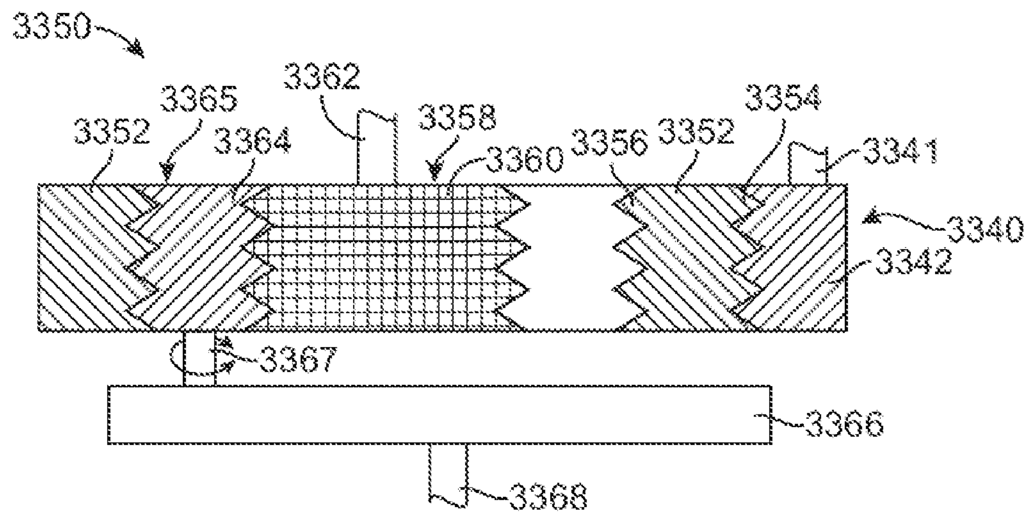

FIG. 33A shows a simplified top view of one embodiment of a planetary gear system which could be used in embodiments of the present invention. FIG. 33AA shows a simplified cross-sectional view of the planetary gear system of FIG. 33A taken along line 33A-33A'.

Specifically, planetary gear system 3350 comprises a ring gear 3352 having a first set of teeth 3354 on an outer periphery, and having a second set of teeth 3356 on an inner portion. Ring gear 3352 is engaged with, and moveable in either direction relative to, three other gear assemblies.

In particular, first gear assembly 3340 comprises side gear 3342 that is positioned outside of ring gear 3352, and is fixed to rotatable shaft 3341 which serves as a first linkage to the planetary gear system. The teeth of side gear 3342 are in mechanical communication with the teeth 3354 located on the outer periphery of the ring gear. Rotation of shaft 3341 in either direction will translate into a corresponding movement of ring gear 3352.

A second gear assembly 3358 comprises a central (sun) gear 3360 that is positioned inside of ring gear 3352. Central gear 3360 is fixed to rotatable shaft 3362 which serves as a second linkage to the planetary gear system.

Third gear assembly 3365 allows central gear 3360 to be in mechanical communication with the second set of teeth 3356 of ring gear 3352. In particular, third gear assembly 3365 comprises a plurality of (planet) gears 3364 that are in free rotational communication through respective pins 3367 with a (planet carrier) plate 3366. Plate 3366 is fixed to a third shaft 3368 serving as a third linkage to the planetary gear system.

The planetary gear system 3350 of FIGS. 33A-33AA provides mechanical communication with three rotatable linkages 3341, 3362, and 3368. Each of these linkages may be in physical communication with the various other elements of the system, for example the wind turbine, a generator, a motor, a motor/generator, a compressor, an expander, or a compressor/expander.

The planetary gear system 3350 permits movement of all of the linkages at the same time, in a subtractive or additive manner. For example where the wind is blowing, energy from the turbine linkage may be distributed to drive both the linkage to a generator and the linkage to a compressor. In another example, where the wind is blowing and demand for energy is high, the planetary gear system permits output of the turbine linkage to be combined with output of an expander linkage, to drive the linkage to the generator.

Moreover, the planetary gear system is also configured to accommodate movement of fewer than all of the linkages. For example, rotation of shaft 3341 may result in the rotation of shaft 3362 or vice-versa, where shaft 3368 is prevented from rotating. Similarly, rotation of shaft 3341 may result in the rotation of only shaft 3368 and vice-versa, or rotation of shaft 3362 may result in the rotation of only shaft 3368 and vice-versa. This configuration allows for mechanical energy to be selectively communicated between only two elements of the system, for example where the wind turbine is stationary and it is desired to operate a compressor based upon output of a motor.

Returning to FIG. 33, certain embodiments of compressed gas storage and recovery systems according to the present invention may offer a number of potentially desirable characteristics. First, the system leverages equipment that may be present in an existing wind turbine system. That is, the compressed air energy storage and recovery system may utilize the same electrical generator that is used to output power from the wind turbine onto the grid. Such use of the generator to generate electrical power both from the wind and from the stored compressed air, reduces the cost of the overall system.

Another potential benefit associated with the embodiment of FIG. 33 is improved efficiency of power generation. Specifically, the mechanical energy output by the rotating wind turbine blades, is able to be communicated in mechanical form to the compressor without the need for conversion into another form (such as electrical energy). By utilizing the output of the power source (the wind turbine) in its native mechanical form, the efficiency of transfer of that power into compressed air may be enhanced.

Still another potential benefit associated with the embodiment of FIG. 33 is a reduced number of components. In particular, two of the elements of the system perform dual functions. Specifically, the motor/generator can operate as a motor and as a generator, and the compressor/expander can operate as a compressor or an expander. This eliminates the need for separate, dedicated elements for performing each of these functions.

Still another potential benefit of the embodiment of FIG. 33 is relative simplicity of the linkages connecting various elements with moving parts. Specifically, in the embodiment of FIG. 33, the turbine, the gear system, the motor/generator, and the compressor/expander are all located in the nacelle. Such a configuration offers the benefit of compatibility with a rotational connection between a nacelle and the underlying support structure. In particular, none of the linkages between the elements needs to traverse the rotating joint, and thus the linkages do not need to accommodate relative motion between the nacelle and support structure. Such a configuration allows the design and operation of those linkages to be substantially simplified.

Figure 34:
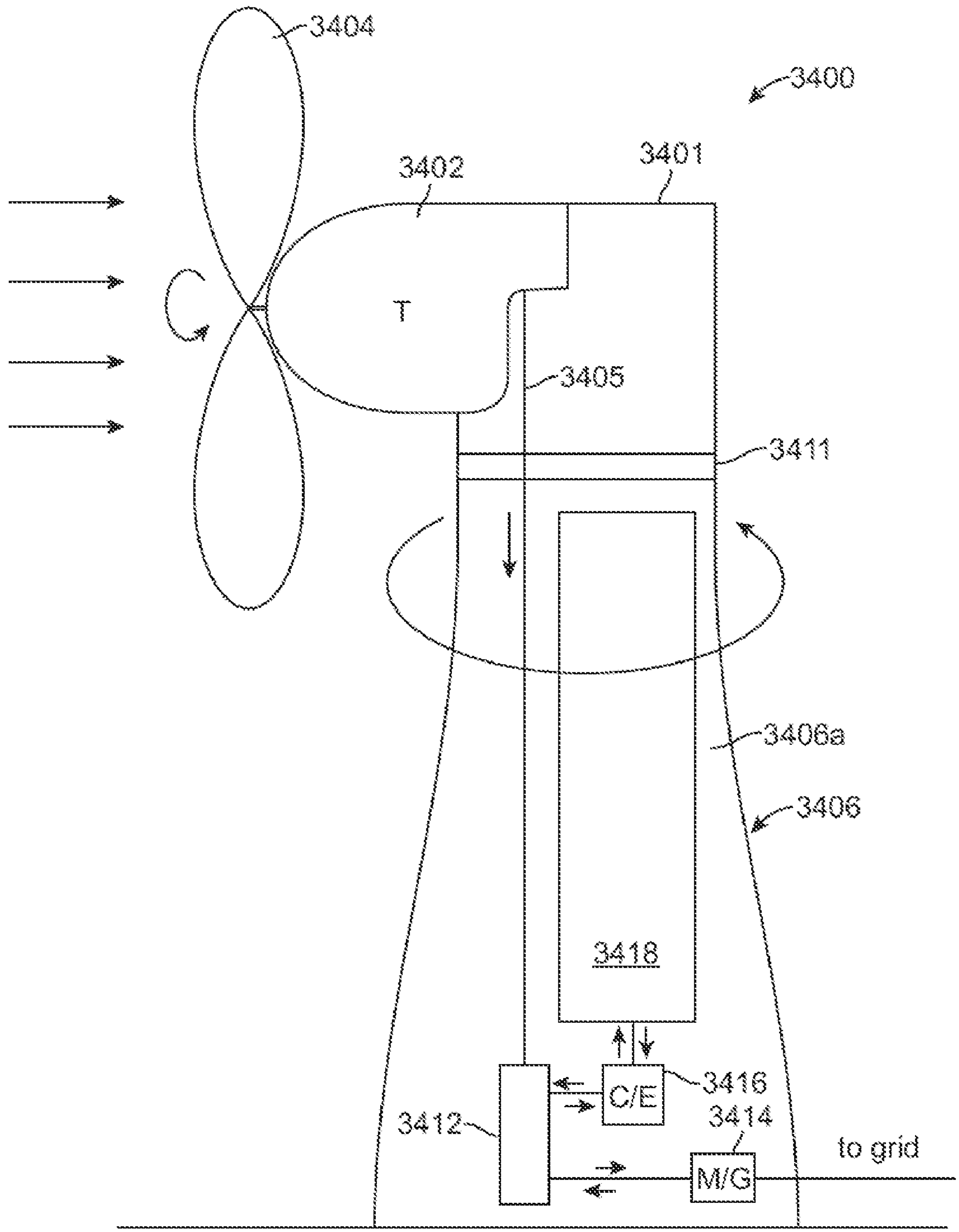
FIG. 34 is a simplified schematic representation of an alternative embodiment of a system in accordance with the present invention.

According to alternative embodiments, however, one or more of the gear system, the compressor/expander, and the motor/generator may be positioned outside of the nacelle. FIG. 34 shows a simplified view of such an alternative embodiment of a system 3400 in accordance with the present invention.

In this embodiment, while the turbine 3402 is positioned in the nacelle 3401, the gear system 3412, compressor/expander 3416, and motor generator 3414 are located at the base of the tower 3406. This placement is made possible by the use of an elongated linkage 3405 running between turbine 3402 and gear system 3412. Elongated linkage 3405 may be mechanical, hydraulic, or pneumatic in nature.

The design of the embodiment of FIG. 34 may offer some additional complexity, in that the linkage 3405 traverses rotating joint 3411 and accordingly must be able to accommodate relative motion of the turbine 3402 relative to the gear system 3412. Some of this complexity may be reduced by considering that linkage 3405 is limited to communicating energy in only one direction (from the turbine to the gear system).

Moreover, the cost of complexity associated with having linkage 3405 traverse rotating joint 3411, may be offset by the ease of access to the motor/generator, compressor/expander, and gear system. Specifically, these elements include a large number of moving parts and are subject to wear. Positioning these elements at the base of the tower (rather than at the top) facilitates access for purposes of inspection and maintenance, thereby reducing cost.

Still other embodiments are possible. For example, while FIG. 34 shows the gear system, motor/generator, and compressor/expander elements as being housed within the support structure, this is not required. In other embodiments, one or more of these elements could be located outside of the support structure, and still communicate with the wind turbine through a linkage extending from the support tower. In such embodiments, conduits for compressed air and for electricity, and mechanical, hydraulic, or pneumatic linkages could provide for the necessary communication between system elements.

Figure 2:
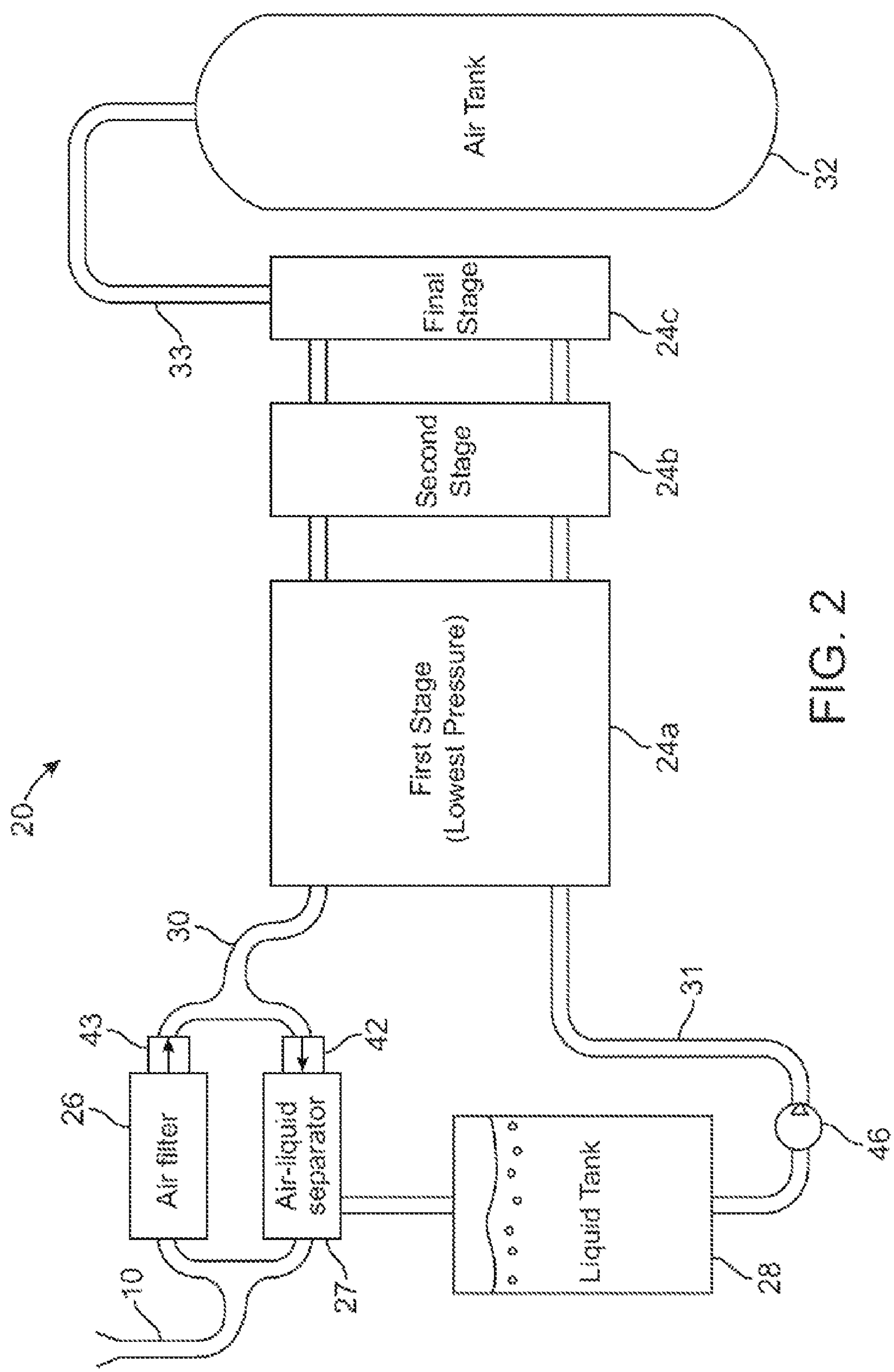
FIG. 2 is a block diagram of a second embodiment of a compressed air energy storage system showing how multiple stages are incorporated into a complete system in accordance with the present invention.

Embodiments of the present invention are not limited to the particular elements described above. For example, while FIGS. 1 and 2 show compressed gas storage system comprising compressor/expander elements and motor/generator elements having combined functionality, this is not required by the present invention.

Figure 35:
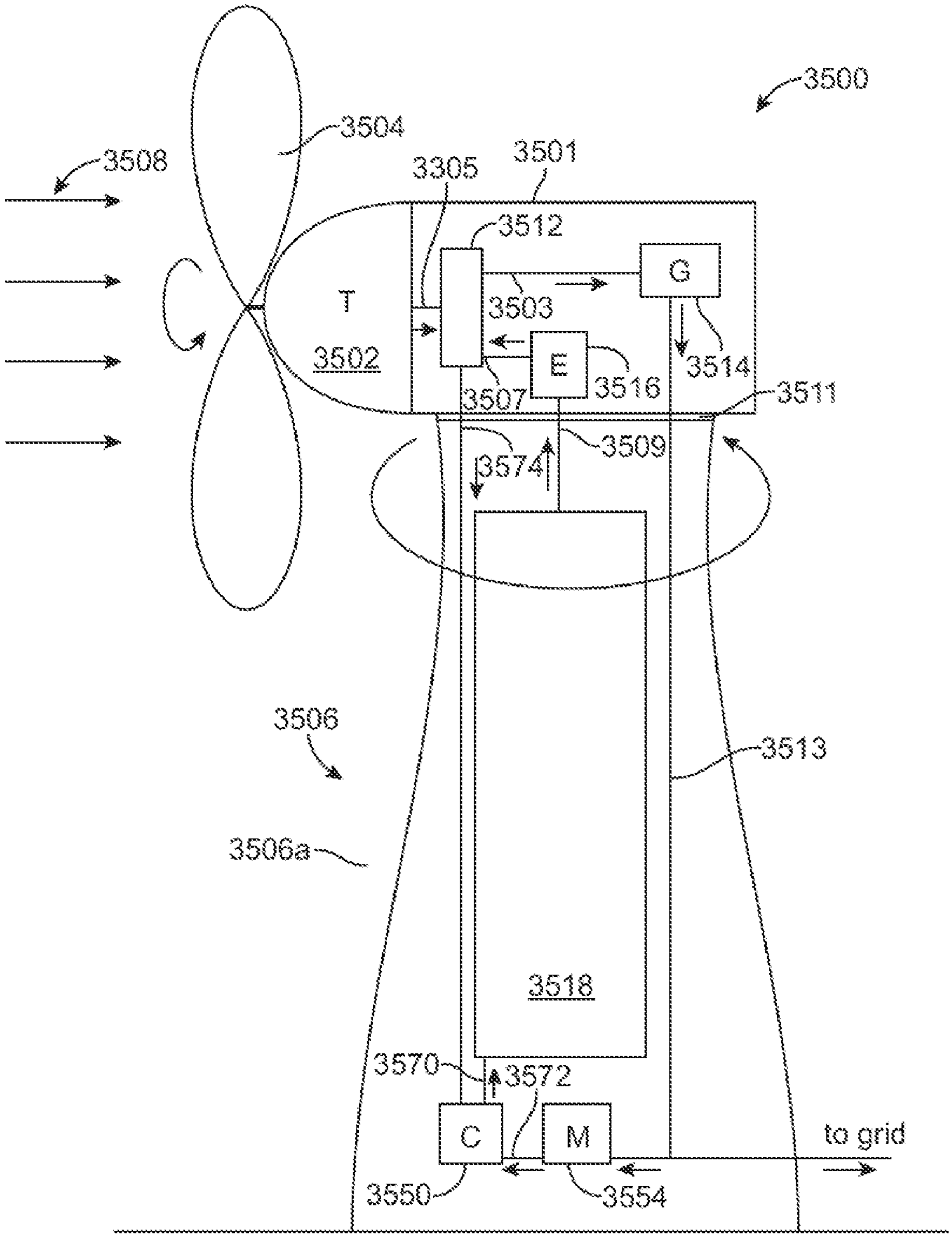
FIG. 35 is a simplified schematic representation of an alternative embodiment of a system in accordance with the present invention.

FIG. 35 shows an alternative embodiment a system 3500 according to the present invention, utilizing separate, dedicated compressor 3550, dedicated expander 3516, dedicated motor 3554, and dedicated generator 3514 elements. Such an embodiment may be useful to adapt an existing wind turbine to accommodate a compressed gas storage system.

Specifically, pre-existing packages for wind turbines may feature the dedicated generator element 3514 in communication with the turbine 3502 through gear system 3512 and linkages 3503 and 3505. Generator 3514, however, is not designed to also exhibit functionality as a motor.

To such an existing configuration, a dedicated expander 3516, a dedicated compressor 3550, a dedicated motor 3554, linkages 3507 and 3573, and conduit 3570 may be added to incorporate a compressed gas storage system. In one embodiment, a dedicated expander 3516 may be positioned in the nacelle 3501 in communication with the gear system 3512 through linkage 3507. Dedicated expander 3516 is in fluid communication with a top portion of the compressed gas storage chamber 3518 defined within the walls 3506*a* of support tower 3506 through conduit 3509.

Dedicated compressor 3550 and a dedicated motor 3554 are readily included, for example at or near the base of the support tower, thereby facilitating access to these elements. Dedicated compressor 3550 is in fluid communication with storage chamber 3518 through conduit 3570, and in physical communication with dedicated motor 3554 through linkage 3572. Dedicated motor 3554 is in turn in electronic communication with the generator and/or grid to receive power to operate the compressor to replenish the supply of compressed gas stored in the chamber 3518.

As shown in FIG. 35, this embodiment may further include an optional elongated mechanical, hydraulic, or pneumatic linkage 3574 extending between the gear system 3512 in the nacelle 3501, and the dedicated compressor 3550 located outside of the nacelle 3501. Such a linkage would allow the dedicated compressor to be directly operated by the output of the turbine, avoiding losses associated with converting mechanical into electrical form by the dedicated generator, and re-converting the electrical power back into mechanical form by the dedicated motor in order to operate the compressor.

Figure 35A:
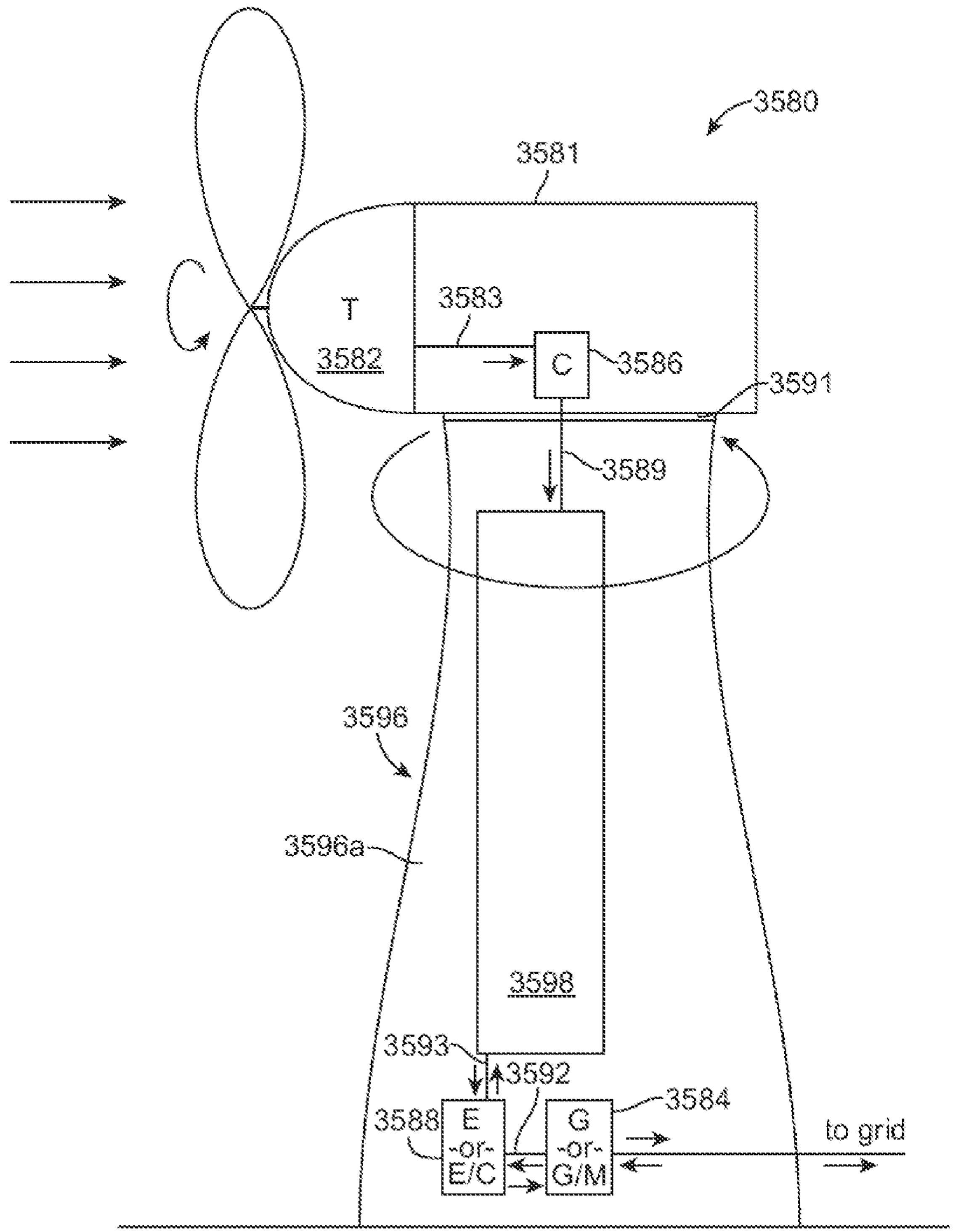
FIG. 35A is a simplified schematic representation of an alternative embodiment of a system in accordance with the present invention.

FIG. 35A shows a simplified view of yet another embodiment of a system in accordance with the present invention. In the embodiment of the system 3580 of FIG. 35A, only the turbine 3582, linkage 3583, and dedicated compressor 3586 elements are located in the nacelle 3581 that is positioned atop support tower 3596. Dedicated compressor 3586 is in communication with the turbine through linkage 3583 (which may be mechanical, hydraulic, or pneumatic), which serves to drive compression of air by the dedicated compressor. Compressed air output by the dedicated compressor is flowed through conduit 3589 across joint 3591 into chamber 3598 present in the support tower 3596.

The remaining elements are positioned outside of the nacelle, either in the support tower, or alternatively outside of the support tower. For example, a dedicated expander or expander/compressor 3588 is in communication with the chamber 3598 defined within walls 3596*a*, to receive compressed air through conduit 3593. Element 3588 is configured to allow expansion of the compressed air, and to communicate energy recovered from this expansion through linkage 3592 to generator or generator/motor 3584. Element 3584 in turn operates to generate electricity that is fed onto the grid.

The embodiment of FIG. 35A can also function to store energy off of the grid. Where element 3584 is a generator/motor and element 3588 is an expander/compressor, element 3584 may operate as a motor to drive element 3588 operating as a compressor, such that air is compressed and flowed into chamber 3598 for storage and later recovery.

The embodiment of FIG. 35A offers a potential advantage in that power is transported from the top to the bottom of the tower utilizing the chamber, without requiring a separate elongated linkage or conduit. Another possible advantage of the embodiment of FIG. 35A is a reduction in the weight at the top of the tower. While this embodiment may incur losses where the mechanical power output of the turbine is converted first into compressed air and then back into mechanical power for driving the generator, such losses may be offset by a reduction in weight at the top of the tower, allowing the tower to be higher and to access more wind power.

The present invention is not limited to a support structure having any particular shape. In the particular embodiments shown in FIGS. 33 and 34, the support structure exhibits a cross-sectional shape that varies along its length. For example, the support structure 3306 is wide at its base, and then tapers to a point at which it meets the wind turbine. By allocating material to where it will best serve the supporting function, such a design minimizes materials and reduces cost.

Figure 36:
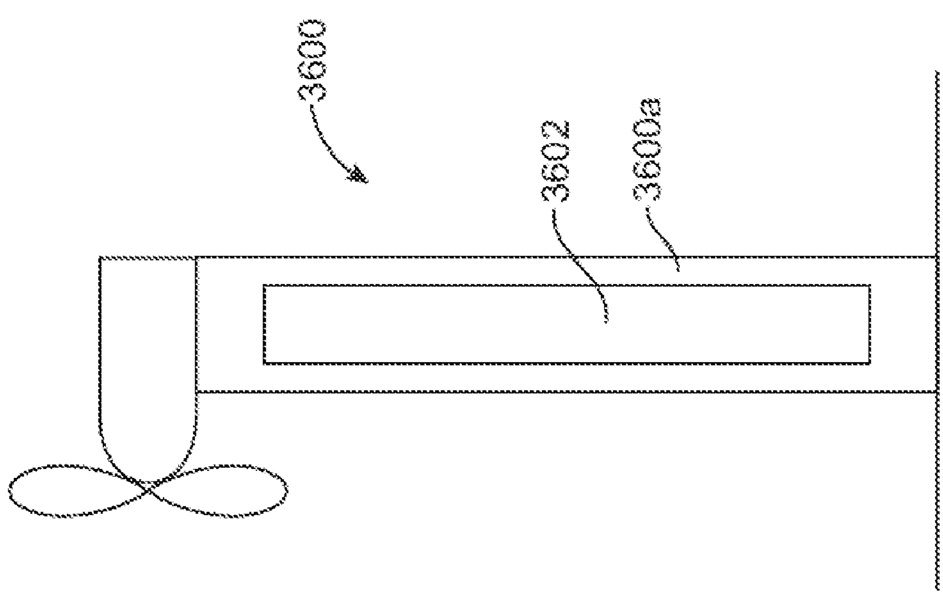
FIG. 36 is a simplified schematic representation of an alternative embodiment of a system in accordance with the present invention.

However, the present invention also encompasses supporting structures having other shapes. For example, FIG. 36 shows a support structure 3600 comprising a hollow tube having a circular or elliptical cross section that is substantially uniform. The walls 3600*a* of this hollow tube 3600 in turn define a chamber 3602 for storing compressed gas. While possibly utilizing more mass, such a tube is a simpler structure that is employed for a various applications in many other industries. Accordingly, such a tube is likely available at a relatively low price that may offset any greater material cost.

Still further alternative embodiments are possible. For example, in certain embodiments a support structure may be designed to take advantage of the forces exerted by the compressed air stored therein, in order to impart additional stability to the support structure.

Figure 37:
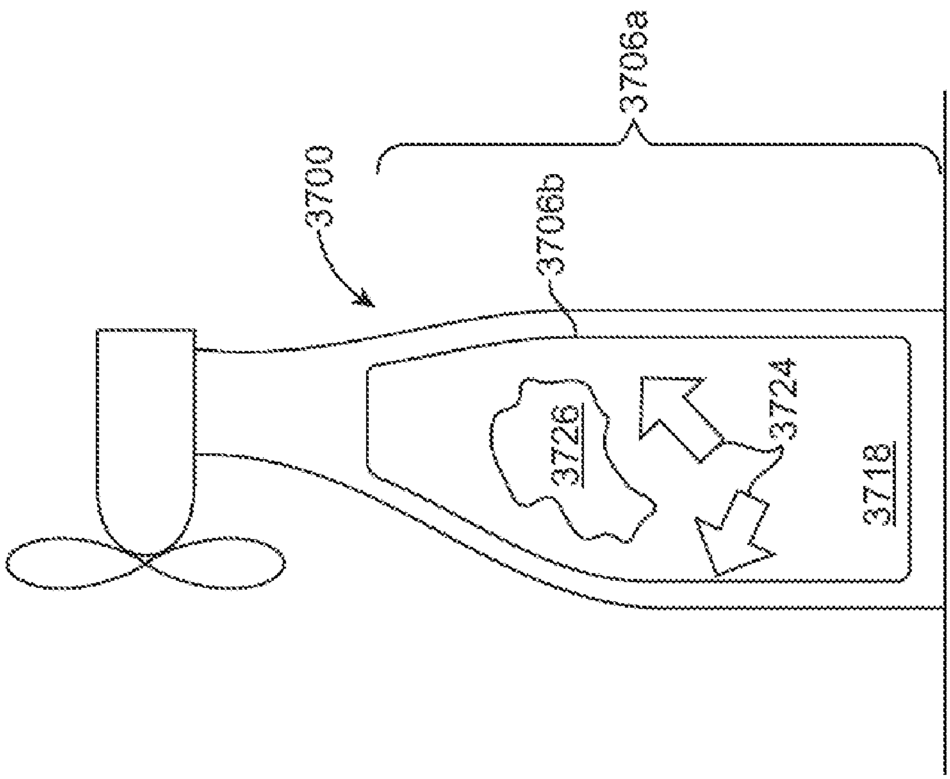
FIG. 37 is a simplified schematic representation of an alternative embodiment of a system in accordance with the present invention.

Thus, FIG. 37 shows an embodiment wherein the support structure 3700 comprises a portion 3706*a* having thinner walls 3706*b* exhibiting less inherent strength than those of the prior embodiments. This reduced strength may be attributable to one or more factors, including but not limited to, use of a different design or shape for the support, use of a reduced amount of material in the support, or use of a different material in the support.

According to embodiments of the present invention, however, any reduction in the inherent strength of the support structure 3706 may be offset by expansion forces 3724 exerted by the compressed air 3726 that is contained within the chamber 3718. Specifically, in a manner analogous to the stiffening of walls of an inflated balloon, the expansion force of the compressed air may contribute additional strength to the support structure. This expansion effect is shown grossly exaggerated in FIG. 37, for purposes of illustration.

One possible application for such a design, employs a support structure that is fabricated from a material that is capable of at least some flexion, for example carbon fiber. In such an embodiment, expansion forces from the compressed air within the chamber of a flexible support member, may act against the walls of the chamber, thereby stiffening it and contributing to the structural stability of that support. Such a support structure could alternatively be formed from other materials, and remain within the scope of the present invention.

A design incorporating carbon fiber could offer even further advantages. For example, carbon fiber structures may exhibit enhanced strength in particular dimensions, depending upon the manner of their fabrication. Thus, a carbon fiber support structure could be fabricated to exhibit strength and/or flexion in particular dimensions, for example those in which the expansion forces of the compressed air are expected to operate, and/or dimension in which the support is expected to experience external stress (e.g. a prevailing wind direction).

Of course, a design taking advantage of expansion forces of the stored compressed air, would need to exhibit sufficient inherent strength in the face of expected (and unexpected) changes in the quantity of compressed air stored therein, as that compressed air is drawn away and allowed to expand for energy recovery. Nevertheless, expansion forces associated with minimal amounts of compressed air remaining within the support structure, could impart sufficient stability to support structure to reduce its cost of manufacture and maintenance.

In summary, embodiments of energy storage and recovery systems employ air compressed utilizing power from an operating wind turbine. This compressed air is stored within one or more chambers of a structure supporting the wind turbine above the ground. By functioning as both a physical support and as a vessel for storing compressed air, the relative contribution of the support structure to the overall cost of the energy storage and recovery system may be reduced, thereby improving economic realization for the combined turbine/support apparatus. In certain embodiments, expansion forces of the compressed air stored within the chamber, may be relied upon to augment the physical stability of a support structure, further reducing material costs of the support structure.

In certain embodiments, storage and recovery of energy from compressed gas may be enhanced utilizing one or more techniques, applied alone or in combination. One technique introduces a mist of liquid droplets to a dedicated chamber positioned upstream of a second chamber in which gas compression and/or expansion is to take place. In some embodiments, uniformity of the resulting liquid-gas mixture may be enhanced by interposing a pulsation damper bottle between the dedicated mixing chamber and the second chamber, allowing continuous flow through the mixing chamber. Another technique utilizes valve configurations actuable with low energy, to control flows of gas to and from a compression and/or expansion chamber. The valve configuration utilizes inherent pressure differentials arising during system operation, to allow valve actuation with low consumption of energy.

Figure 38:
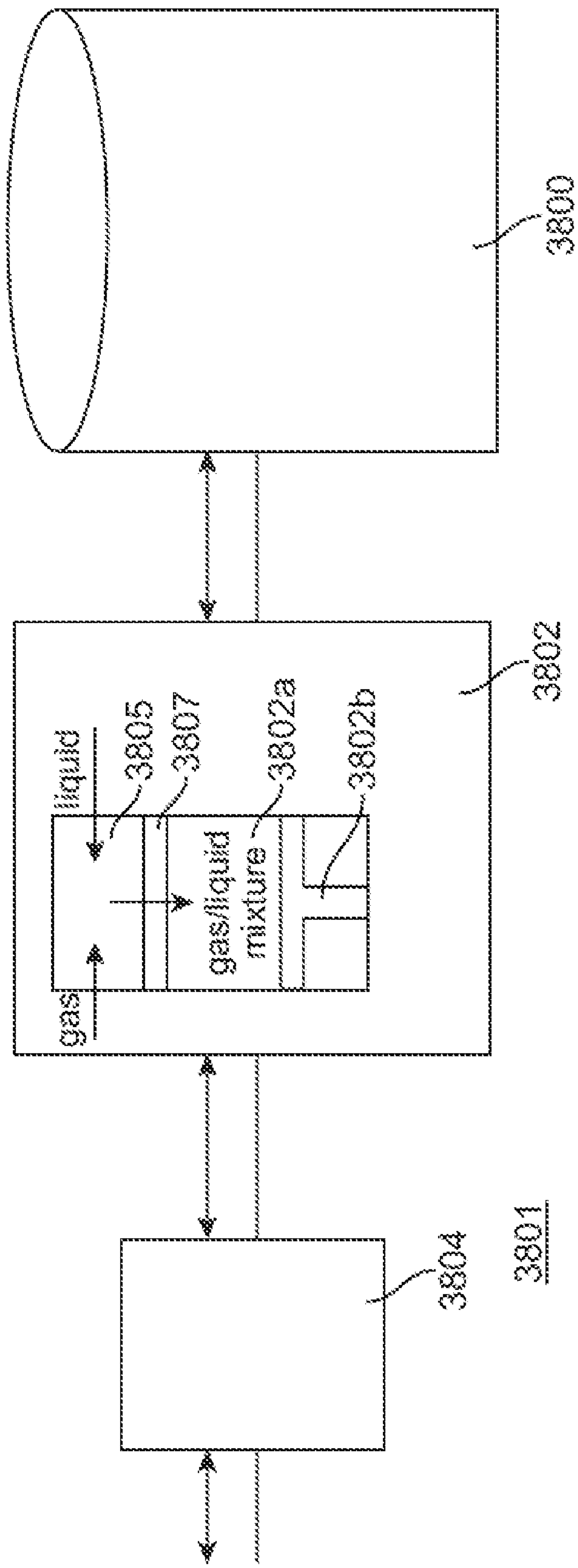
FIG. 38 is a schematic view of an air storage and recovery system employing a mixing chamber in accordance with an embodiment of the present invention.

FIG. 38 shows a simplified block diagram of one embodiment of an energy storage and recovery system 3801 in accordance with the present invention. FIG. 38 shows compressor/expander 3802 in selective fluid communication with a compressed air storage unit 3803. Motor/generator 3804 is in selective communication with compressor/expander 3802.

In a first mode of operation, energy is stored in the form of compressed air, and motor/generator 3804 operates as a motor. Motor/generator 3804 receives power from an external source, and causes compressor/expander 3802 to function as a compressor. Compressor/expander 3802 receives uncompressed air, compresses the air in a chamber 3802*a* utilizing a moveable element 3802*b* such as a piston, and flows the compressed air to the storage unit.

In a second mode of operation, energy stored in the compressed air is recovered, and compressor/expander 3802 operates as an expander. Compressor/expander 3802 receives compressed air from the storage unit 3803, and then allows the compressed air to expand in the chamber 3802*a*. This expansion drives the moveable member 3802*b*, which is in communication with motor/generator 3804 that is functioning as a generator. Power generated by motor/generator 3804 can in turn be input onto a power grid and consumed.

The processes of compressing and decompressing the air as described above, may experience some thermal and mechanical losses. However, a compression process will occur with reduced thermal loss if it proceeds with a minimum increase in temperature, and an expansion process will occur with reduced thermal loss if it proceeds with a minimum decrease in temperature.

Accordingly, embodiments of the present invention may introduce a liquid during the compression and/or expansion processes. An elevated heat capacity of the liquid relative to the gas, allows the liquid to receive heat from the air during compression, and to transfer heat to the air during expansion. This transfer of energy to and from the liquid may be enhanced by a large surface area of the liquid, if the liquid is introduced as a mist within the compressing or expanding air.

The conditions (such as droplet size, uniformity of droplet distribution, liquid volume fraction, temperature, and pressure) of the liquid/gas mixture that is introduced during compression and/or expansion, may be important in determining the transfer of energy to and from the gas. However, due to the inherent nature of compression and expansion, the conditions such as temperature, volume, and pressure are likely changing as those processes occur.

Accordingly, in order to achieve greater control over the liquid/gas mixture, and to ensure consistency and reproducibility of the thermal properties of that mixture during compression and expansion, embodiments of the present invention utilize a separate mixing chamber 3805 that is located upstream of the second chamber in which expansion and compression are taking place. This separate mixing chamber 3805 is in selective fluid communication with chamber 3802*a* through valve 3807. In this manner, a liquid-gas mixture prepared under relatively stable conditions in the mixing chamber 3805, is flowed into the compression/expansion chamber 3802*a* in order to absorb heat from, or transfer heat to, gas within the compression/expansion chamber.

While the embodiment described above utilizes a single apparatus that is configured to operate as a gas compressor and as a gas expander, this is not required by the present invention. Alternative embodiments could utilize separate, dedicated elements for performing compression and expansion, and remain within the scope of the present invention.

Figure 39:
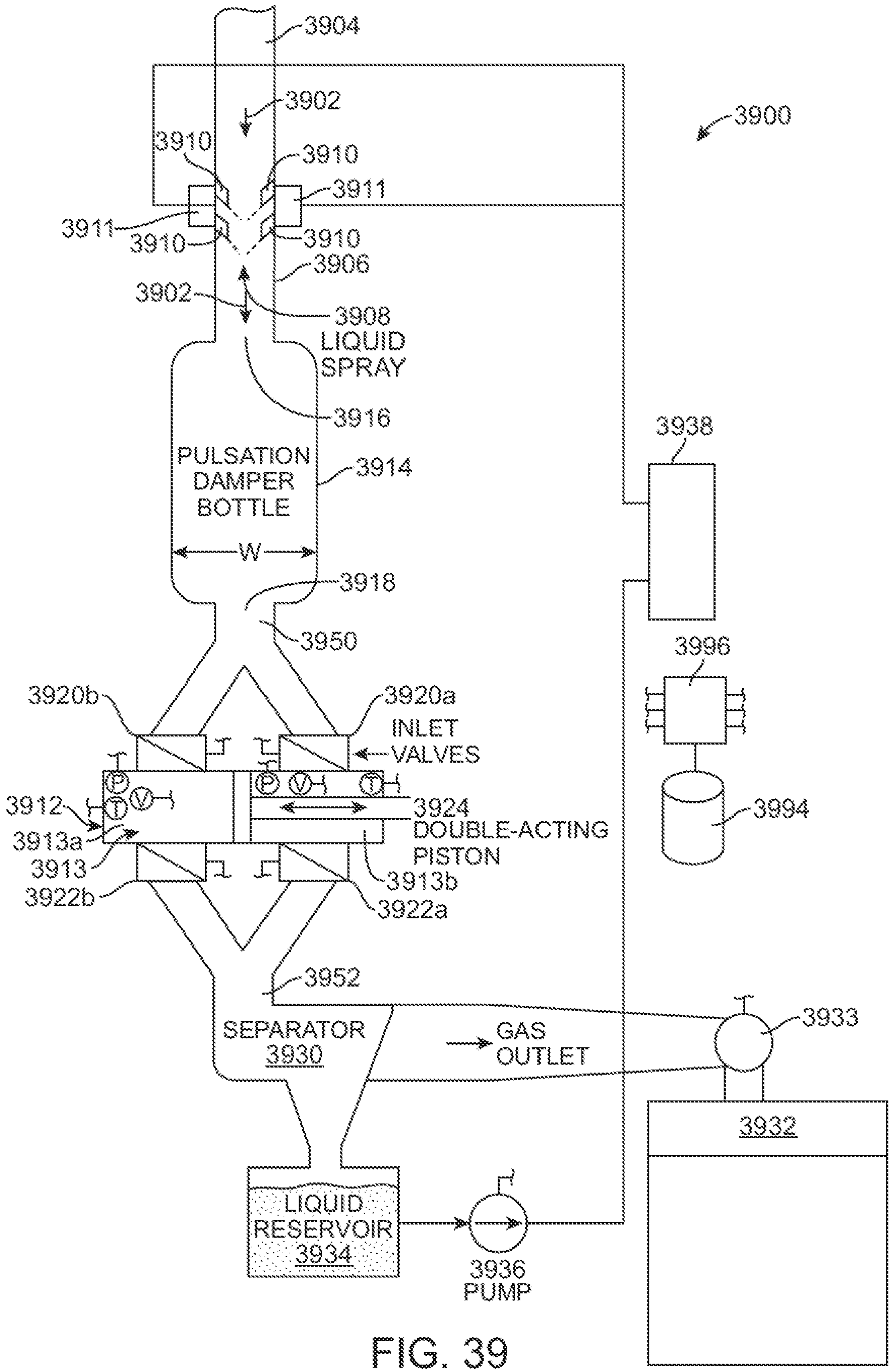
FIG. 39 is a schematic view of a single stage apparatus including a mixing chamber and a compression chamber in accordance with one embodiment of the present invention.

For example, FIG. 39 shows a simplified diagram of an apparatus 3900 for performing gas compression in accordance with an embodiment of the present invention. A stream of gas 3902 enters through an inlet pipe 3904 and flows into a mixing chamber 3906.

Liquid spray 3908 is sprayed into the mixing chamber 3906 through manifold 3911 in fluid communication with a plurality of nozzles 3910, and becomes entrained with the gas stream 3902. Owing to the presence and the configuration of the mixing chamber 3906 (for example its dimensions and/or the number and arrangement of spray orifices or nozzles), the liquid spray 3908 becomes evenly distributed within the gas to form a uniform mixture, such as a gas-liquid aerosol, prior to encountering the compression chamber 3912.

In certain embodiments, it may be desirable to create a mixture having liquid droplets of an average diameter of about 20 um or less. In some embodiments, formation of a mixture having droplets of the appropriate size may be facilitated by the inclusion of a surfactant in the liquid. One example of a surfactant which may be used is octylphenoxypolyethoxyethanol, CAS #: 9002-93-1 and known as Triton X-100.

Before the gas-liquid aerosol enters the compression chamber 3912, it passes through another feature, the pulsation damper bottle 3914. This volume of this pulsation damper bottle is significantly larger than the volume of the compression chamber, and in general at least 10× the volume of that chamber.

The pulsation damper bottle 3914 also exhibits a width dimension (w) that is different from that of the inlet 3916 and outlet 3918 to the bottle 3914. The difference in dimension between the bottle and its inlet and outlet, creates a succession of impedance mismatches for any acoustic waves attempting to travel from the inlet valves 3920*a-b* of the compression chamber 3912, back to the mixing chamber 3906. In particular, these impedance mismatches disrupt unwanted changes in fluid movement in the mixing chamber, that would otherwise disrupt the uniformity of the gas-liquid mixture being created therein.

Figure 39A:
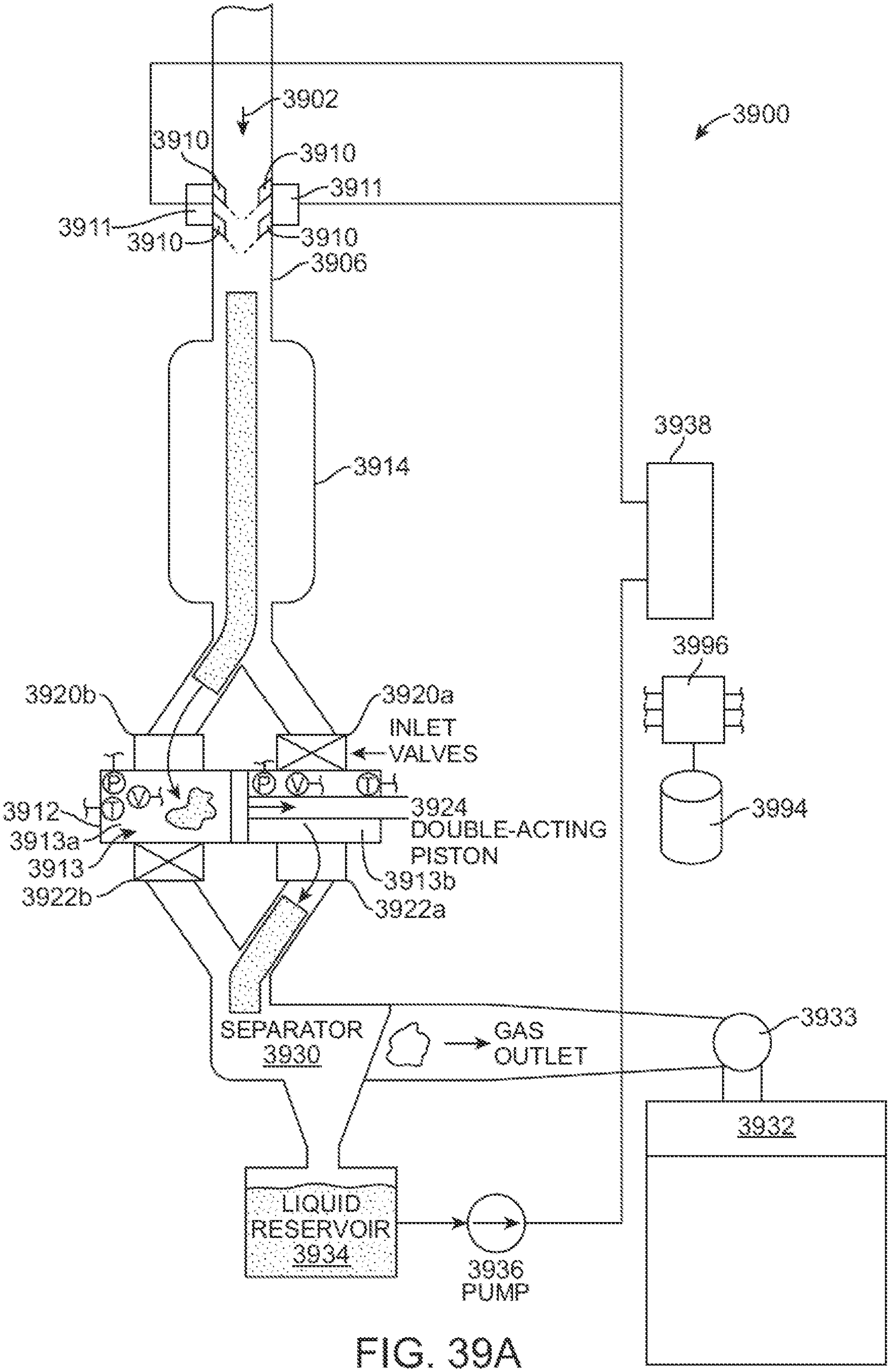
FIGS. 39A-39B are simplified schematic representations of the embodiment of FIG. 39 in operation.

Specifically, such unwanted fluid movement can arise because of cyclic operation of the compressor, with inlet valves 3920*a* and 3920*b* alternatively being opened and closed, as is discussed in detail below in connection with FIGS. 39A-B. This cyclic valve operation can give rise to pulsations, that would potentially cause nonuniformities in the gas-liquid mixture being created in the mixing chamber 3906.

By imposing the pulsation damper bottle between the valves and the mixing chamber, embodiments according to the present invention can suppress these pulsations.

The compression chamber 3912 comprises an arrangement including a reciprocating piston 3924 within cylinder 3913. The piston is in physical communication with an energy source (not shown).

The compression chamber 3912 is in selective fluid communication with inlet conduit 3950 and with outlet conduit 3952 through valves 3920*a-b* and 3922*a-b*, respectively. One particular configuration of these valves that may be particularly suited for use in an apparatus combining compression and expansion functions, is described in detail below in connection with FIG. 41.

Operation of the compressor is now described in detail in connection with FIGS. 39A-B. FIG. 39A shows that as the piston moves towards bottom dead center, the liquid-gas mixture is drawn into a left portion 3913*a* of the cylinder through inlet valve 3920*b*. At the same time, the outlet valve 3922*a* is opened, exhausting into the separator 3930 the liquid-gas mixture that was compressed in the lower portion of the chamber in the previous stroke. Inlet valve 3920*a* is closed during this piston stroke.

Figure 39B:
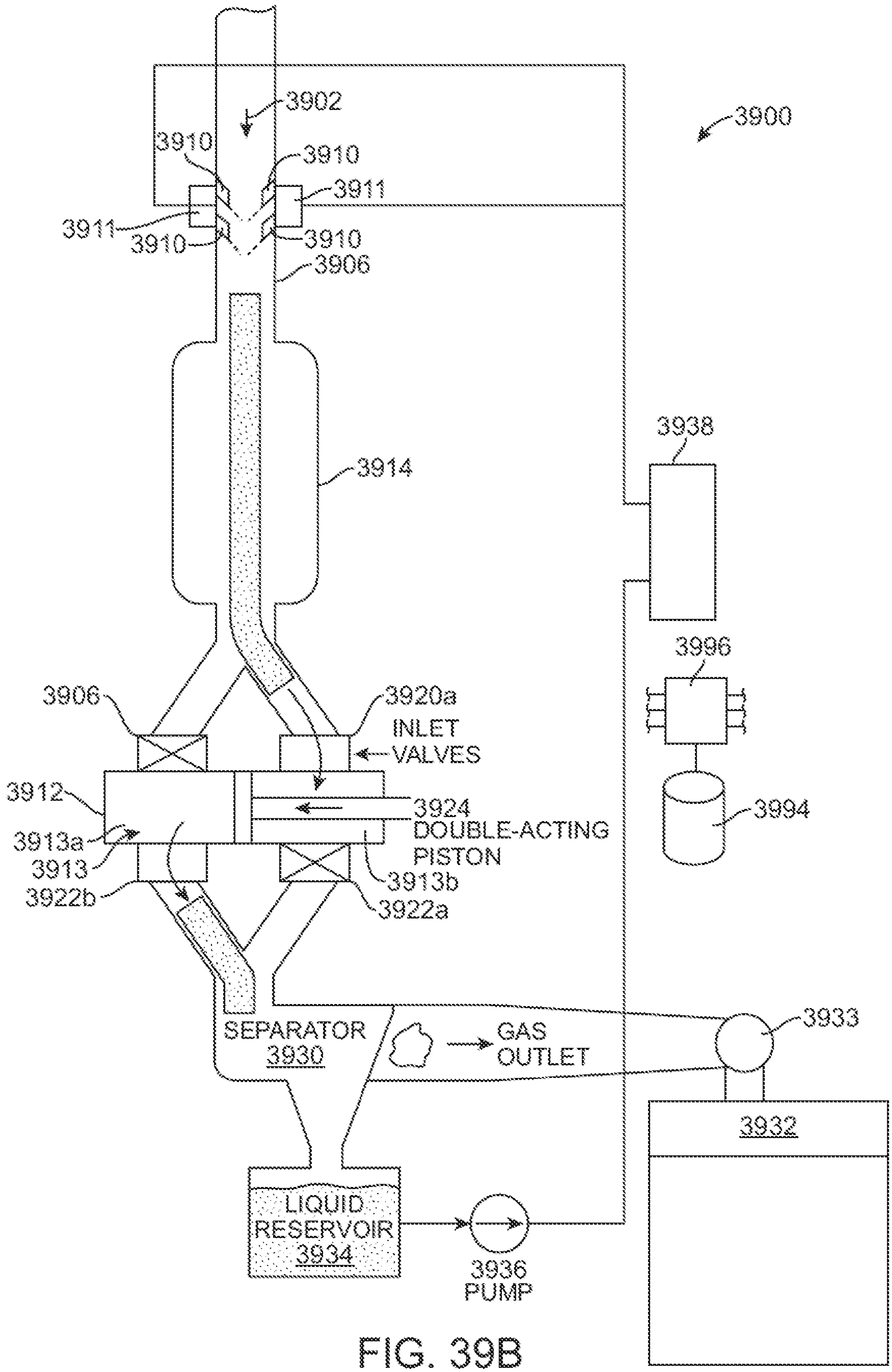

FIG. 39B shows the next stroke, where inlet valve 3920*b* is closed and the piston is driven toward the top dead center. This compresses the liquid-gas mixture in the left portion 3913*a* of the cylinder. When a desired pressure is reached, the exhaust valve 3922*b* opens, and the compressed mixture is exhausted into the separator 3930. During the piston stroke shown in FIG. 39B, inlet valve 3920*a* is opened to admit additional gas-liquid mixture for compression in the next cycle. Outlet valve 3922*a* is closed during this piston stroke.

Separator 3930 serves to separate the liquid from the gas-liquid mixture. Examples of separator types which may be used in accordance with embodiments of the present invention include but are not limited to cyclone separators, centrifugal separators, gravity separators, and demister separators (utilizing a mesh type coalescer, a vane pack, or another structure).

While the above figures show the separator as a single element, it may comprise one or more apparatuses arranged in series. Thus the separator could employ a first structure designed to initially remove bulk amounts of liquid from the flowed gas-liquid mixture. An example of such a structure is a chamber having a series of overlapping plates or baffles defining a serpentine path for the flowed mixture, and offering a large surface area for the coalescence of water. This initial structure could be followed up in series by another structure, such as a cyclone separator, that is designed to remove smaller amounts of liquid from the mixture.

The compressed gas is then flowed from the separator to a compressed gas storage unit 3932 through valve 3933.

Liquid recovered by separator 3930 collects in the liquid reservoir 3934. This liquid is circulated by pump 3936 through heat exchanger 3938 to nozzles 3910, where it is again injected into the incoming gas stream as a spray.

The system illustrated in FIG. 39 is double-acting. In particular, as a liquid-gas mixture on one side of the cylinder is being compressed, the liquid-gas mixture on the other side of the cylinder is being exhausted. Thus, the inlet valves 3920*a-b* and the exhaust valves 3922*a-b* on either side of the cylinder, are configured to open and close 180 degrees out of phase with each other. It is this repeated opening and closing of valves that can give rise to the acoustic waves that are suppressed by the pulsation damper bottle.

The apparatus of FIG. 39 further includes a controller/processor 3996 in electronic communication with a computer-readable storage device 3994, which may be of any design, including but not limited to those based on semiconductor principles, or magnetic or optical storage principles. Controller 3996 is shown as being in electronic communication with a universe of active elements in the system, including but not limited to valves, pumps, chambers, nozzles, and sensors. Specific examples of sensors utilized by the system include but are not limited to pressure sensors (P), temperature sensors (T), volume sensors (V), and a humidity sensor (H) located at the inlet of the system.

As described in detail below, based upon input received from one or more system elements, and also possibly values calculated from those inputs, controller/processor 296 may dynamically control operation of the system to achieve one or more objectives, including but not limited to maximized or controlled efficiency of conversion of stored energy into useful work; maximized, minimized, or controlled power output; an expected power output; an expected output speed of a rotating shaft in communication with the piston; an expected output torque of a rotating shaft in communication with the piston; an expected input speed of a rotating shaft in communication with the piston; an expected input torque of a rotating shaft in communication with the piston; a maximum output speed of a rotating shaft in communication with the piston; a maximum output torque of a rotating shaft in communication with the piston; a minimum output speed of a rotating shaft in communication with the piston; a minimum output torque of a rotating shaft in communication with the piston; a maximum input speed of a rotating shaft in communication with the piston; a maximum input torque of a rotating shaft in communication with the piston; a minimum input speed of a rotating shaft in communication with the piston; a minimum input torque of a rotating shaft in communication with the piston; or a maximum expected temperature difference of air at each stage.

While the above example describes the use of a piston, other types of moveable elements could be utilized and still remain within the scope of the present invention. Examples of alternative types of apparatuses which could be utilized include but are not limited to screw compressors, multi-lobe blowers, vane compressors, gerotors, and quasi-turbines.

Features of various possible embodiments of mixing chambers are now described. A goal of the mixing chamber is to inject liquid into a flow of gas, that results in a uniform gas-liquid mixture. A mixing chamber can be designed to achieve such a uniform gas-liquid mixture utilizing one or more features.

For example, one manner of injection of liquid into a gas may be accomplished by flowing liquid through one or more orifices formed in a wall of a conduit along which the gas is flowing. The cross-sectional dimensions and orientation of such orifices relative to the gas flow, may be used to determine the characteristics of the resulting gas-liquid mixture.

Alternatively, liquid may be introduced by spraying through a nozzle structure designed to impose changes on the properties (velocity, pressure change) of the injected liquid in a manner that is calculated to result in the desired mixture. Certain nozzle designs may utilize forms of energy in addition to a pressure change, to achieve desired spray characteristics. The application of ultrasonic energy may result in the formation of particularly fine droplets having small diameters, for example in the range of between about 5-10 um.

Figure 39C:
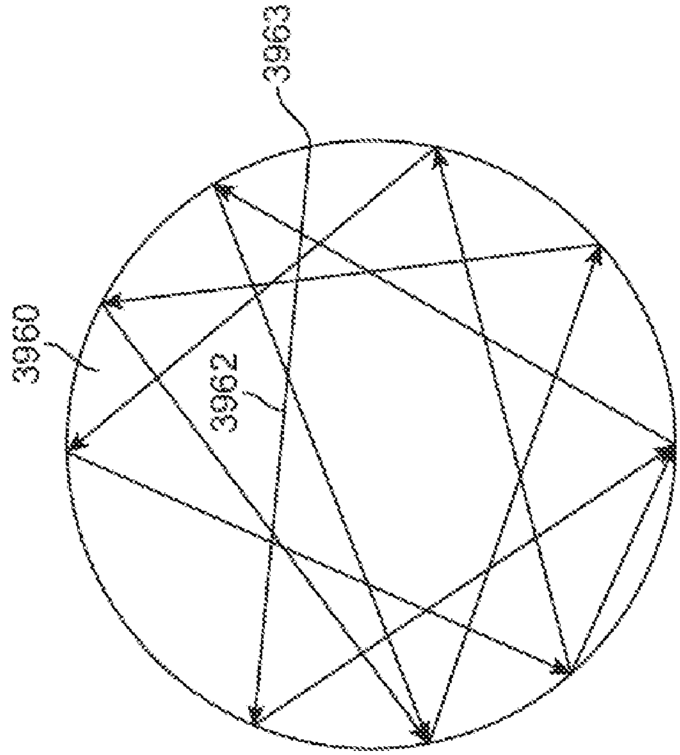
FIGS. 39CA-39CB are simplified schematic representations of possible trajectories of injected liquids.
Figure 39C:
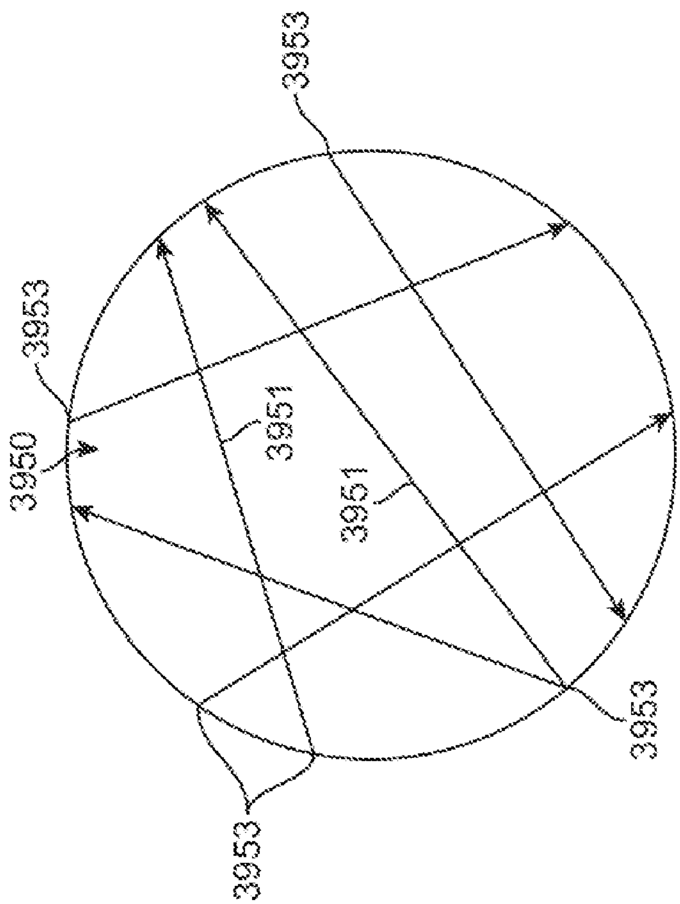

FIG. 39CA shows an overhead view of a mixing chamber 3950, along the direction of flow of the gas, showing possible trajectories 3951 of liquids injected according to one embodiment of the present invention. As shown in this figure, the liquid trajectories are oriented to maximize exposure of various portions of the column of flowing gas to the liquid, viewed here as arrows intersecting the circular cross-section of the gas column defined by the walls of the mixing chamber. The orifices or nozzles 3953 producing these trajectories 3951 need not be present at the same level of the mixing chamber, but instead may be staggered at different points along its length.

FIG. 39CB shows an overhead view of an alternative design of a mixing chamber 3960, along the direction of flow of the gas, showing possible trajectories 3962 liquids injected according to an embodiment of the present invention. As shown in this figure, the liquid trajectories may be oriented according to the so-called Fibonacci spiral. Again, the orifices or nozzles 3963 producing these trajectories 3962 need not be present at the same level of the mixing chamber, but instead may be at points along its length.

Aspects other than relative orientation of spray trajectories may be used to design a mixing chamber for a particular application. As discussed in detail below, certain embodiments may perform compression or expansion over several stages, with the inlet gas flowed to each stage at a different pressure. Accordingly, a mixing chamber configured to inject liquid into gases at a higher pressure, may have a design that is different from a mixing chamber intended for use with lower pressure gas flows.

Specifically, embodiments for injection into higher pressure gas flows may exhibit dimensions that are elongated and narrower relative to lower pressure mixing chambers. Such a design would overcome the difficulty of spray trajectories penetrating into the center of high pressure gas flows.

Returning to FIG. 39, the particular embodiment shown in that figure is an apparatus dedicated to performing compression. According to other embodiments, a similar apparatus can operate as an expander.

Figure 40:
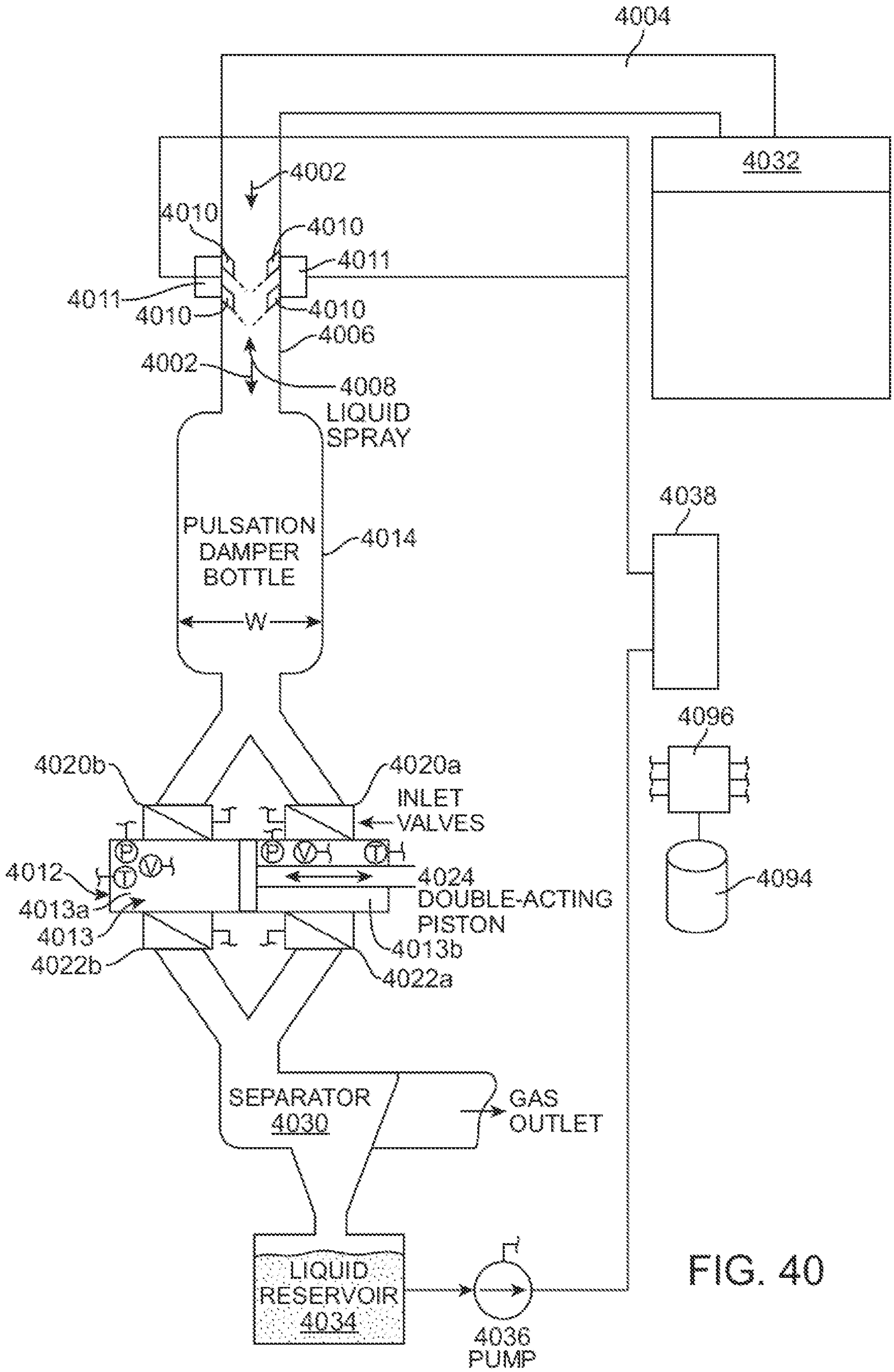
FIG. 40 is a schematic view of a single stage apparatus including a mixing chamber and an expansion chamber in accordance with one embodiment of the present invention.

FIG. 40 shows an embodiment of an expander apparatus according to the present invention. During an expansion cycle, compressed gas would enter the mixing chamber 4006 from a storage unit 4032 via inlet pipe 4004.

Through manifold 4011, a liquid spray 4008 would be injected using nozzles 4010. The liquid-gas mixture would flow through the pulsation damper bottle 4014 to the chamber of cylinder 4013, which would be acting as an expander.

Figure 40A:
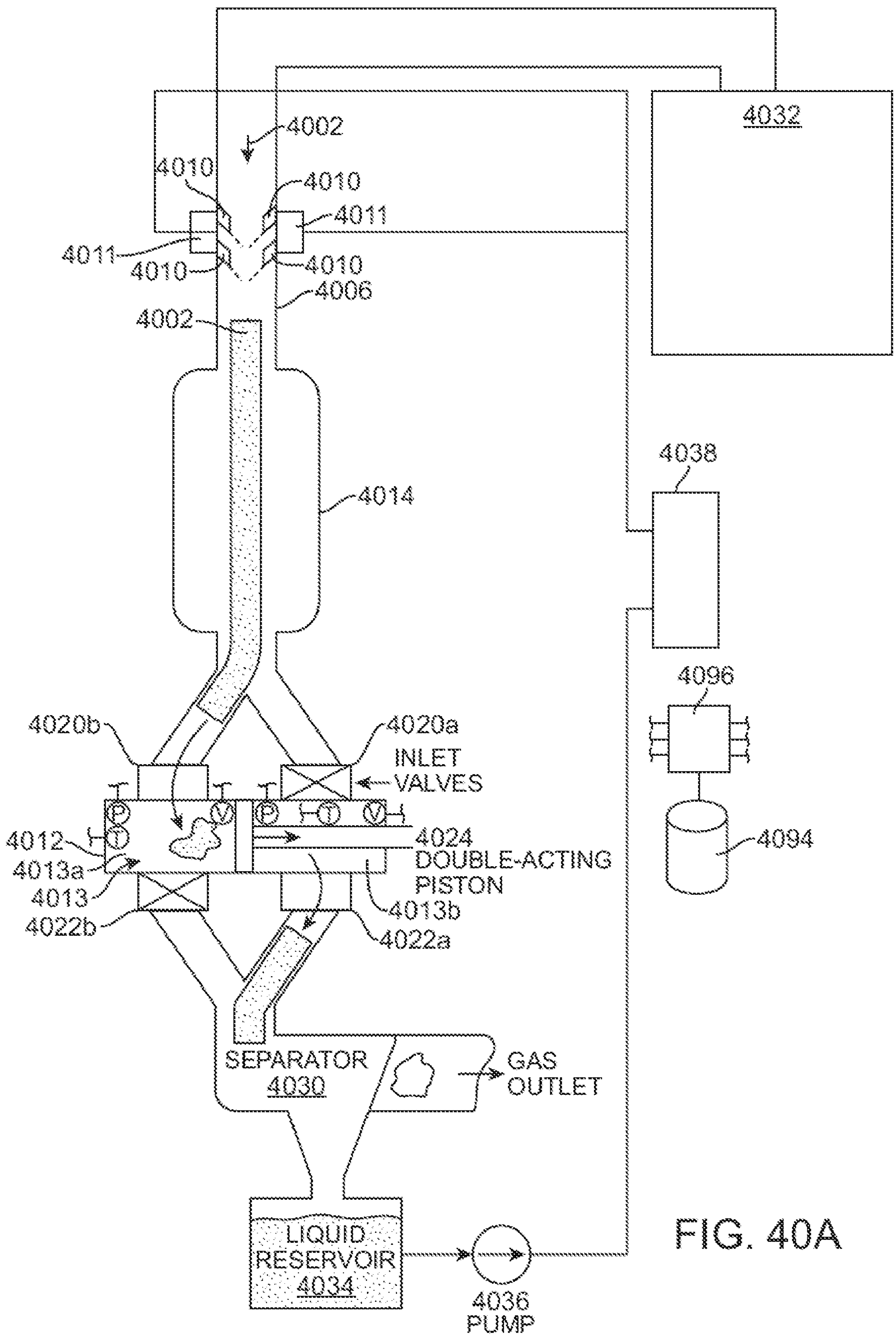
FIGS. 40A-40B are simplified schematic representations of the embodiment of FIG. 40 in operation.

As shown in FIG. 40A, in this mode the expansion of that gas within chamber 4013*a* of the cylinder 4013 will move the piston 4024 to the right and turn a crankshaft (not shown). Also during that piston stroke, gas expanded during the prior piston stroke would be output from the other chamber 4013*b* of the cylinder 4013.

Figure 40B:
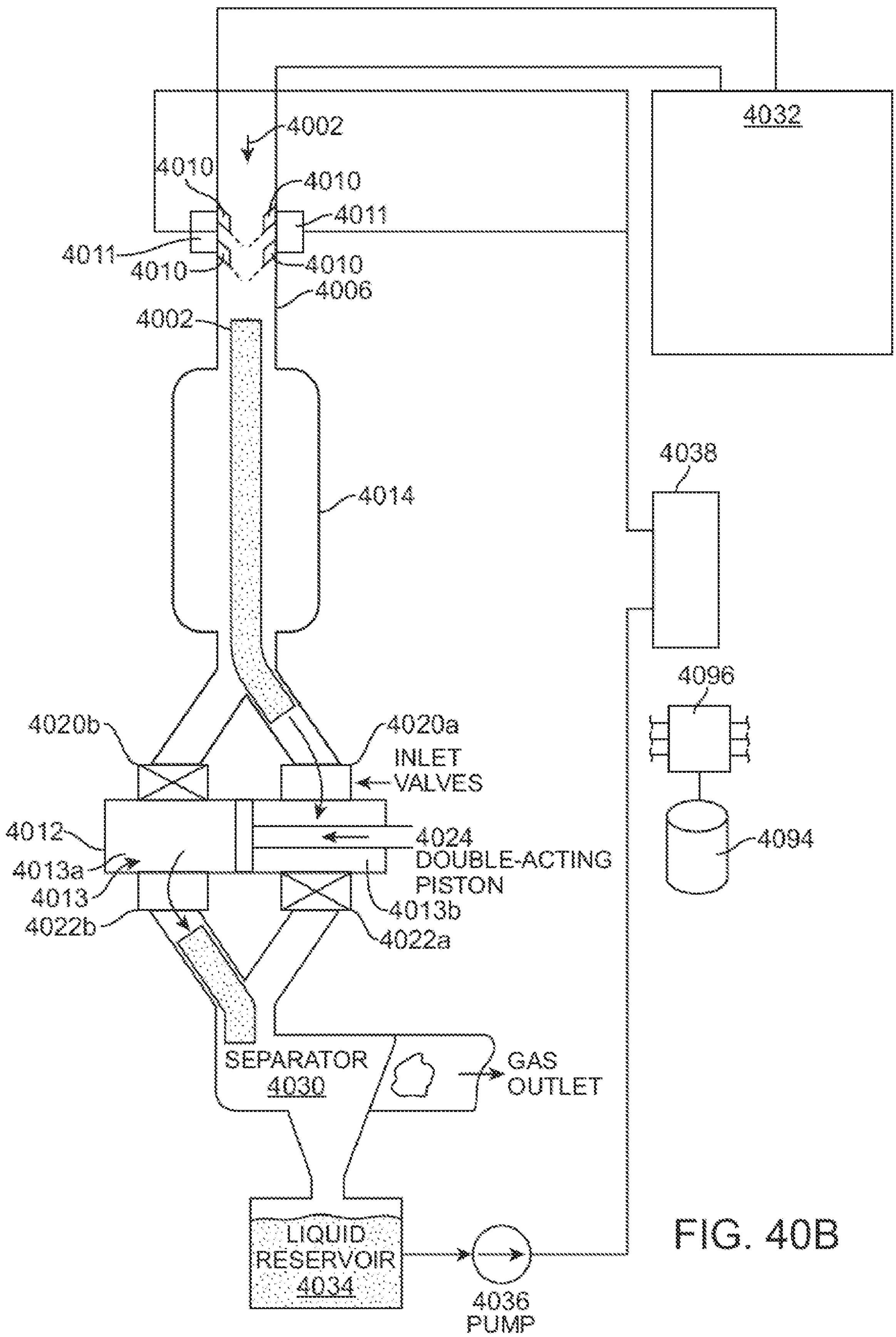

FIG. 40B shows the following piston stroke, wherein expansion of gas within the other chamber 4013*b* moves the piston in the opposite direction to turn the crankshaft. The gas that has previously expanded in the first chamber 4013*a* is output from the cylinder.

Separator 4030 receives the expanded liquid-gas output from the chamber, and separates the liquid from the gas-liquid mixture. Examples of separator types which may be used in accordance with embodiments of the present invention include but are not limited to cyclone separators, centrifugal separators, gravity separators, and demister separators (utilizing a mesh type coalescer, a vane pack, or another structure). The gas is then flowed out of the system.

Liquid recovered by separator 4030 collects in the liquid reservoir 4034. This liquid is circulated by pump 4036 through heat exchanger 4038 to nozzles 4010, where it is again injected into the gas stream as a spray.

The apparatus of FIG. 40 will operate somewhat differently during an expansion cycle than during a compression cycle. Specifically, gas expanding and doing work on a piston will cool. In certain embodiments, heat obtained from a heat source may be added to the compressed gas that is inlet to the compressor or to the liquid that is sprayed into the mixing chamber, such that the expanders will generate mechanical energy in the form of crankshaft torque. That is, by adding heat to the system, the expanders will generate more shaft torque and power output can be enhanced. The amount of power output depends on the difference in temperature between the heat source and ambient air.

In certain embodiments, to maximize the energy obtained from one or more heat sources, heat may be transferred to the gas through a regenerator, which exchanges heat efficiently.

Combined Compression/Expansion

Certain embodiments previously described relate to structures configured to operate as dedicated compressors or expanders. Alternative embodiments, however, may be configurable to operate either in a compression mode or an expansion mode.

Figure 41:
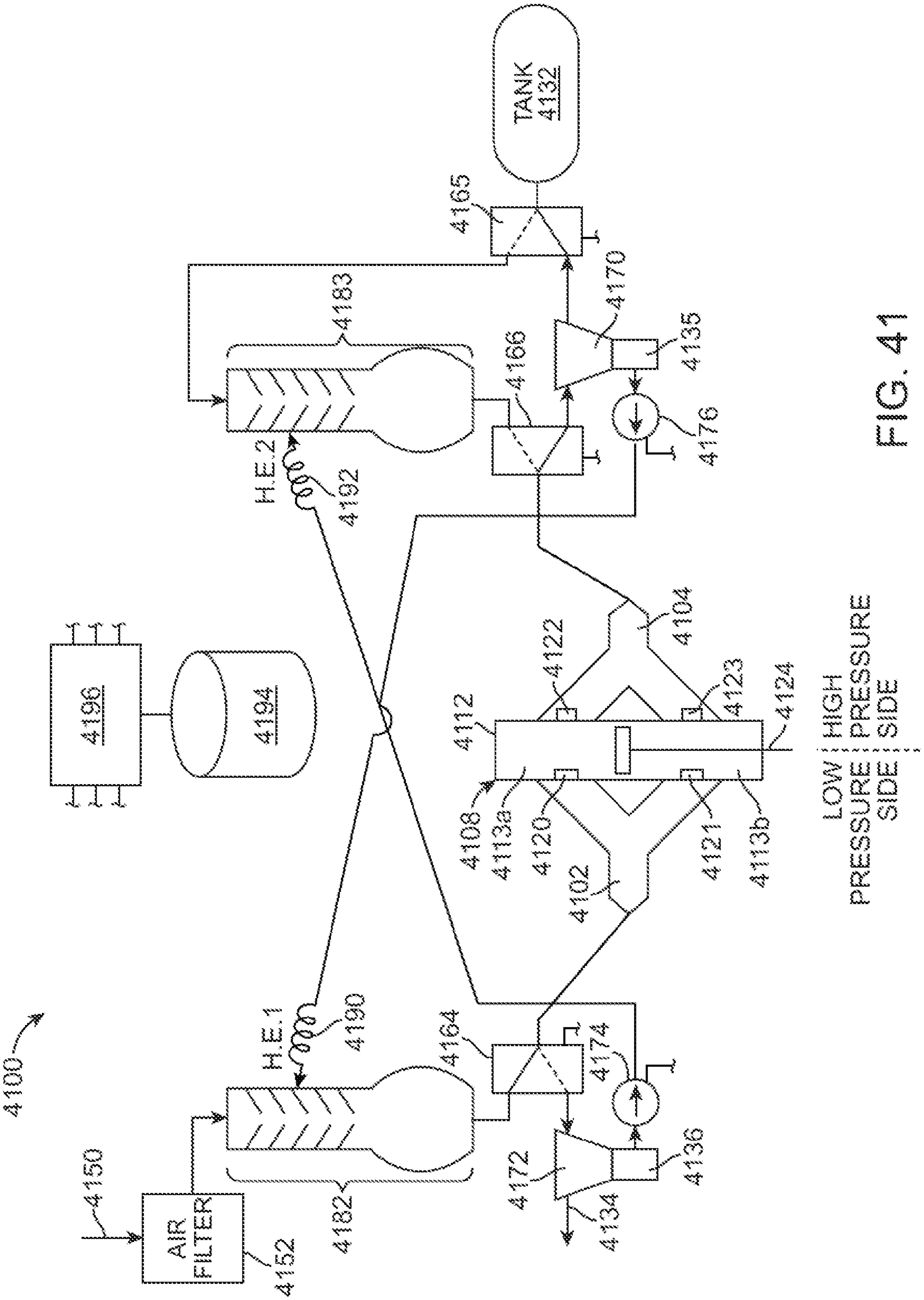
FIG. 41 is a schematic view of an embodiment of an apparatus for performing both compression and expansion according to an embodiment of the present invention.

FIG. 41 shows a simplified diagram of one embodiment of a such an apparatus that is able to perform in both compression and expansion roles. In FIG. 41, solid lines are used to show the configuration of three-way valves in a compression mode, and dashed lines are used to show the configuration of three-way valves in an expansion mode. FIG. 41 also shows the compression/expansion cylinder and valve configuration, as well as conduits leading thereto for purposes of illustration, and this figure should not be understood as depicting the relative sizes of the elements.

Apparatus 4100 comprises a first combined mixing chamber/pulsation damper bottle 4182 that is in fluid communication with inlet 4150 through air filter 4152. In a compression mode, outlet of element 4182 is in selective communication through three-way valve 4164 with compression/expansion cylinder and valve configuration 4108 whose operation is described in detail below. In the compression mode, the output of element 4108 is flowed through a second three-way valve 4166 to separator 4170, where separated liquid is flowed to reservoir 4135. The separated gas is in turn flowed through three-way valve 4165 to compressed gas storage unit 4132. Liquid from the reservoir 4135 is pumped by pump 4176 through heat exchanger 4190 for re-injection into the mixing chamber of the mixing chamber/pulsation bottle structure 4182.

In an expansion mode, compressed gas from storage unit 4132 is flowed through three way valve 4165 into second combined mixing chamber/pulsation damper bottle 4183. The outlet of element 4183 is in turn in selective communication through three-way valve 4166 with compression/expansion cylinder and valve configuration 4108 whose operation is described in detail below. In the expansion mode, the output of element 4108 is flowed through three-way valve 4164 to separator 4172, where separated liquid is flowed to reservoir 4136. The separated gas is in turn flowed out of the system through outlet 4134. Liquid from the reservoir 4136 is pumped by pump 4174 through heat exchanger 4192 for re-injection into the mixing chamber of the mixing chamber/pulsation bottle structure 4183.

A particular cylinder and valve configuration 4108 of the embodiment of FIG. 41 is now described. Cylinder and valve configuration 4108 features double-acting piston 4124 disposed within cylinder 4112, thereby defining a first chamber 4113*a* and a second chamber 4113*b*. First valve 4120 is actuable to allow fluid communication between first chamber 4113*a* and first, low pressure side conduit 4102. Second valve 4122 is actuable to allow fluid communication between first chamber 4113*a* and second high pressure side conduit 4104.

Third valve 4121 is actuable to allow fluid communication between second chamber 4113*b* and the first conduit 4102. Fourth valve 4123 is actuable to allow fluid communication between second chamber 4113*b* and the second conduit 4104.

FIG. 41 is provided for purposes of illustration only, and should not be understood as limiting the scope of the invention. For example, while this figures shows the piston as being moveable in the vertical direction, this is not required. The direction of movement of a piston could be different (for example in the horizontal direction) depending upon a particular implementation.

And while FIG. 41 shows the various valves as being positioned in the side walls of the cylinder, such a configuration is also not required. In accordance with alternative embodiments, valves could be positioned in other locations (for example the end walls of the cylinder), and the structure would remain within the scope of the present invention.

Operation of the cylinder and valve configuration 4108 in various modes is now described in connection with the detailed view of FIGS. 41A-D. Each of the first through fourth valves 4120-4123 comprise a valve plate 412_*a* that is moveable relative to respective valve seat 412_*b*. Respective solenoids 412_*c* are in physical communication to actuate the valves 4120-4123 by moving the valve plates relative to the valve seats. Solenoids 412_*c* are in communication with a controller/processor, such as controller/processor 4196 of FIG. 41.

Figure 41B:
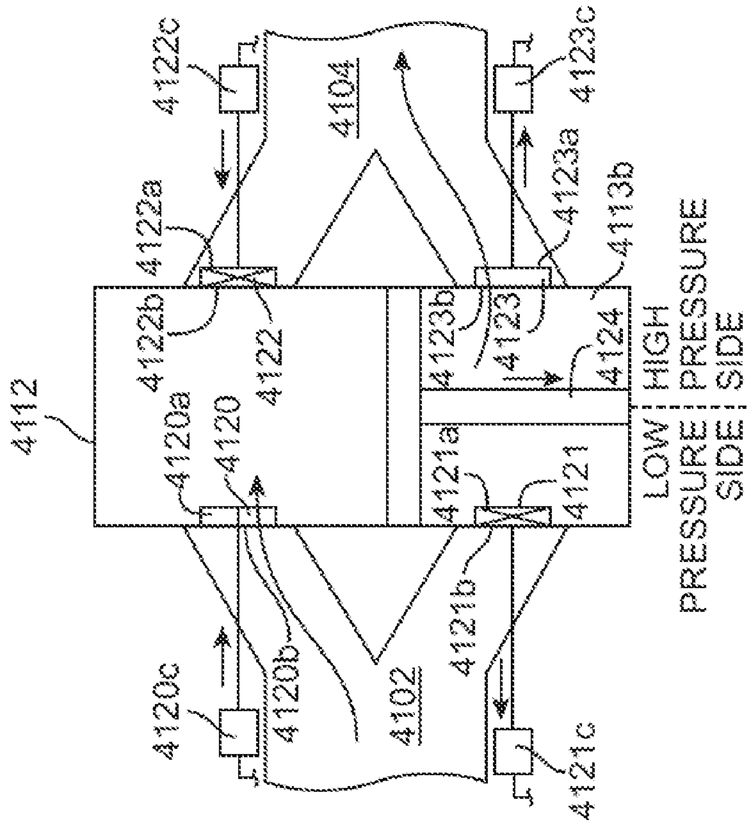
FIGS. 41A-D are simplified schematic representations of the embodiment of FIG. 41 in operation.
Figure 41A:
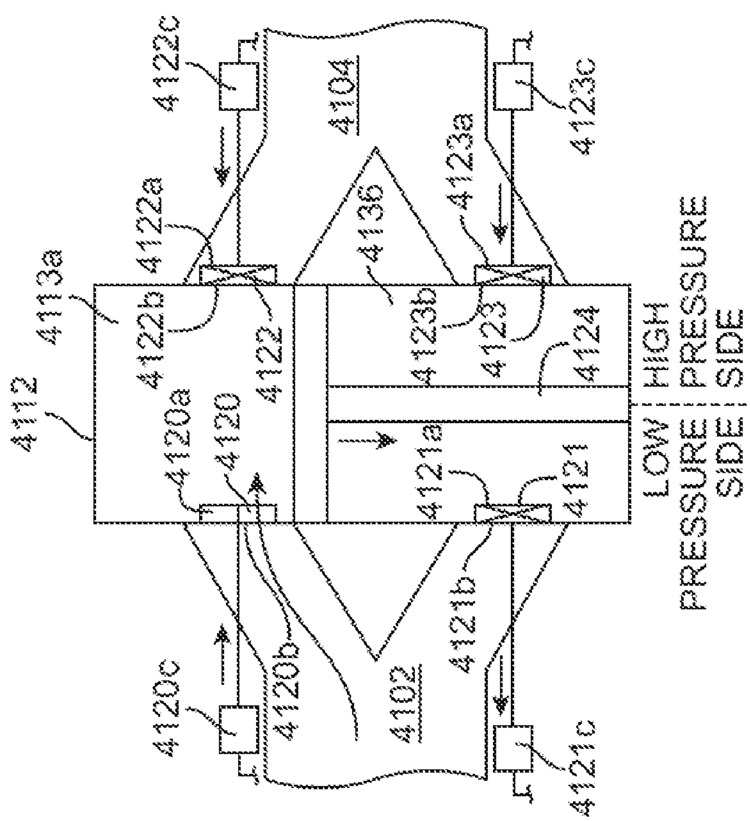

According to certain configurations, the valve seats and valve plates of the various valves may be oriented to convey flows of gas with low consumption of energy. For example, FIGS. 41A-B show the case where cylinder 4112 is configured to operate as a compressor. Specifically, as piston 4124 moves down in FIG. 41A, valves 4121 and 4123 are initially closed, and a gas within the second chamber 4113*b* is compressed, increasing the pressure in the second chamber 4113 relative to the pressure in first conduit 4102. This pressure differential serves to naturally bias valve plate 4121*a* against valve seat 4121*b*, thereby allowing solenoid 4121*c* to maintain valve 4121 in a closed position with minimal expenditure of energy.

As shown in FIG. 41B, the piston continues to move down, ultimately causing the pressure within the second chamber 4113*b* to reach that of the high pressure side. Again, the specific configuration of the valve plate 4121*a* relative to valve seat 4121*b* allows valve 4121 to remain closed with minimal energy from solenoid 4121*c* during this process.

Moreover, relatively little energy need be consumed by solenoid 4123*c* to open valve 4123 to allow the compressed gas to flow out of the second chamber 4113*b*. This is because the pressure within second chamber 4113*b* approximates that of the high pressure side conduit 4104, and thus actuation of the valve 4123 need not overcome a large pressure differential.

During the piston stroke shown in FIGS. 41A-B, valve 4120 is opened to allow an incoming flow of gas to fill first chamber 4113*a* for compression in the next piston stroke. The specific configuration of the valve plates and valve seats of valves 4120 and 4122 also allows this task to be accomplished with minimal energy consumption.

In particular, as piston 4124 moves down in FIGS. 41A-B, the effective volume of first chamber 4113*a* increases and the pressure within that chamber decreases relative to the first conduit 4102. This pressure differential serves to naturally bias valve plate 4120*a* away from valve seat 4120*b*, allowing the solenoid 4120*c* to open valve 4120 with minimal expenditure of energy. In addition, the low pressure in first chamber 4113*a* relative to second conduit 4104 naturally results in the biasing of valve plate 4122*a* toward valve seat 4122*b*, thereby desirably maintaining valve 4122 in a closed position with minimum energy from solenoid 4122*c*.

In the subsequent compression stroke (not shown here), piston 4124 moves upward to compress air in the first chamber. In a manner similar to that described above in conjunction with FIGS. 41A-B, the orientation of the valve plates relative to the valve seats allows this compression to take place with minimal consumption of energy. In particular, the pressure differentials that naturally occur during this compression stroke tend to bias valves 4120 and 4123 shut, and allow valves 4121 and 4122 to open.

Figure 41D:
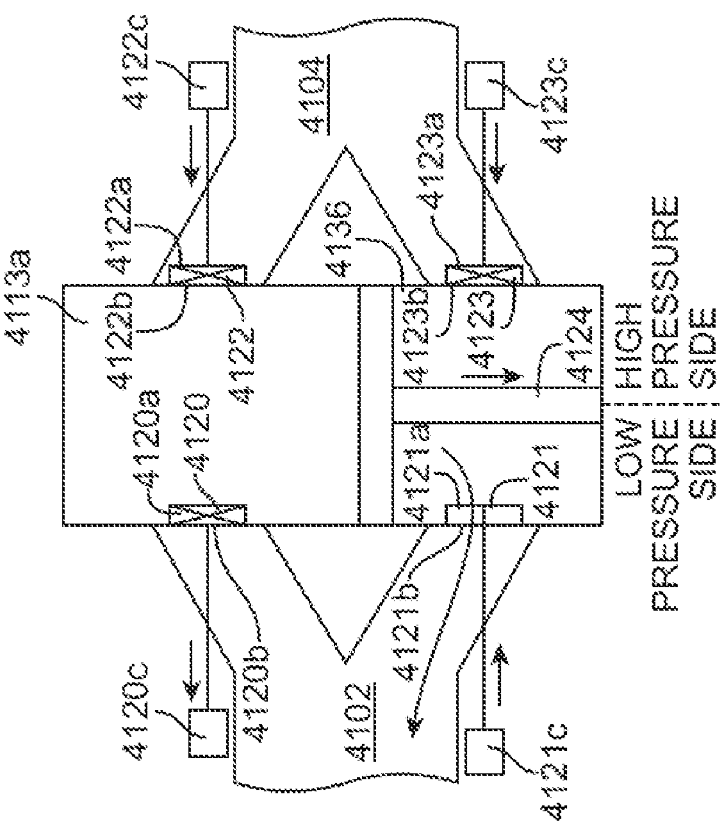
Figure 41C:
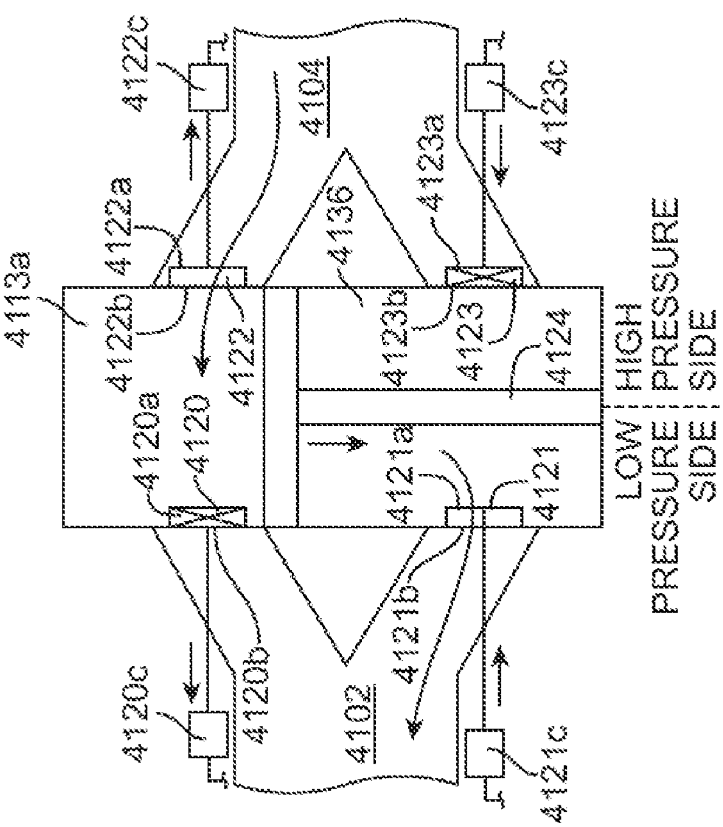

FIGS. 41C-D show the case where cylinder 4112 is configured to operate as an expander. Again, the orientation of the plates and seats of certain valves allows for this expansion to be accomplished with reduced energy consumption.

In particular, as piston 4124 moves downward in FIG. 41C, valve 4122 is opened with valve 4120 remaining closed, and compressed air is admitted into the first chamber 4113*a* for expansion. At this point, the pressure within the first chamber 4113*a* is high relative to that of the first conduit 4102 on the low pressure side. This pressure differential serves to naturally bias valve plate 4120*a* against valve seat 4120*b*, allowing the solenoid 4120*c* to maintain valve 4120 in a closed position with minimal expenditure of energy.

As also shown in FIG. 41C, valve 4123 is closed and valve 4121 opened, allowing reduced pressure air expanded during the previous piston stroke, to be flowed out of the second chamber 4113*b* to the first conduit 4102. Here, the pressure of the expanded air within the second chamber approximates that of the conduit 4102 on the low pressure side, requiring little or no energy for solenoid 4121*c* to open valve 4121. In addition, the pressure differential between second conduit 4104 and second chamber 4113*b* naturally biases the valve plate 4123*a* against the valve seat 4123*b*, allowing solenoid to maintain valve 4123 closed with low expenditure of energy.

As shown in FIG. 41D, once valve 4122 is closed and air expands in the first chamber 4113*a* to further drive piston 4124 downward, the valve 4123 remains closed based upon the pressure differential between the second conduit and the second chamber. Because of the orientation of valve plate 4123*a* relative to valve seat 4123*b*, this closed state of valve 4123 may be maintained with a minimum of energy expenditure by solenoid 4123*c*.

FIG. 41D also shows valve 4120 as remaining closed. Because of the orientation of valve plate 4120*a* relative to valve seat 4120*b*, the closed state of valve 4120 may be maintained based upon the pressure differential between the first chamber 4113*a* and the first conduit 4102, with a minimal energy consumption by solenoid 4120*c*.

In the subsequent expansion stroke (not shown here), piston 4124 moves upward as air expands in the second chamber. In a manner similar to that described above in conjunction with FIGS. 41C-D, the orientation of certain valve plates relative to the valve seats allows this expansion to take place with minimal consumption of energy. In particular, the inherent pressure differential tends to naturally bias shut the valves 4121 and 4122.

To avoid wasting energy in valve actuation, the system may be designed such that following expansion, the gas within the cylinder is at a pressure nearly equal to that of the low pressure side. Such pressure balancing reduces the amount of energy required to actuate valve 4121 in FIGS. 41C-D, and valve 4120 in the piston's subsequent stroke during expansion.

In addition, valve 4121 in FIG. 41C may be closed before piston 4124 reaches the bottom of the stroke. The remaining air in second chamber 4113*b* is compressed as the piston continues to the bottom of its stroke. The time at which valve 4121 is closed is chosen so that the final pressure in chamber 4113*b* is substantially the same as the pressure in manifold 4104, thereby reducing the energy required to open valve 4123 and reducing the losses that would occur if gas were allowed to expand across a pressure drop without doing work. In another embodiment, water may be admitted to chamber 4113*b* through a valve (not shown) to equalize the pressure across valve 4123.

The particular cylinder and valve configuration of FIGS. 41-41D provides another advantage by automatically reverting to a compression mode in the event of a system failure. In particular, where no valve actuation instructions are received by the controller, relative pressure differentials in the cylinder arising from continued motion of the piston, will by default cause valves 4120-4123 to admit gas from the low pressure side into the cylinder. This will in turn result in the failsafe mode being compression, with remaining kinetic energy in the system gradually absorbed and the system brought to a halt.

The specific valve and cylinder configuration shown in FIGS. 41A-D is not limited to use in systems involving the injection of liquid into gas for heat exchange, and could be employed in systems not requiring such liquid injection. Moreover, the specific valve and cylinder configuration shown in FIGS. 41A-D is not limited to use in systems where the cylinder is used for both compression and expansion, and could be employed in dedicated compression or dedicated expansion systems.

While the particular embodiment of FIGS. 41A-D shows the gas flow valves as being selectively actuated by a solenoid, the present invention is not limited to using any particular type of valve for liquid injection. Examples of valves which may be suitable for liquid injection according to embodiments of the present invention include, but are not limited to, solenoid-actuated valves, spool valves, gate valves, cylindrical valves, needle valves, or poppet valves.

One example of an alternative gas flow valve design which may be suitable for use in the present invention, is a voice coil-actuated valve that includes a servo loop. Use of such a valve structure may be advantageous to control the velocity profile of actuation, for example reducing velocity at the end of plate travel prior to a stop, thereby relieving stress on valve components.

Other approaches to valve dampening are possible. For example, certain embodiments could use air cushions, dimples, cylindrical holes, and or other geometries of depression in the valve body or valve seat, with corresponding raised areas on the opposite member, to create air springs that absorb some of the energy of the motion of the movable component of the valve as it approaches the valve seat.

According to other embodiments the gas flow valves may be pneumatically actuated, an example being a proportional pneumatic air valve. In still other embodiments, the valves may be hydraulically actuated, for example a high pressure hydraulic valve.

And while FIGS. 41A-D show timing of the opening and closing of the valves according to certain embodiments, this timing scheme is not required. In accordance with other embodiments, alternative timing of the valves could be employed and remain within the present invention.

Figure 49A:
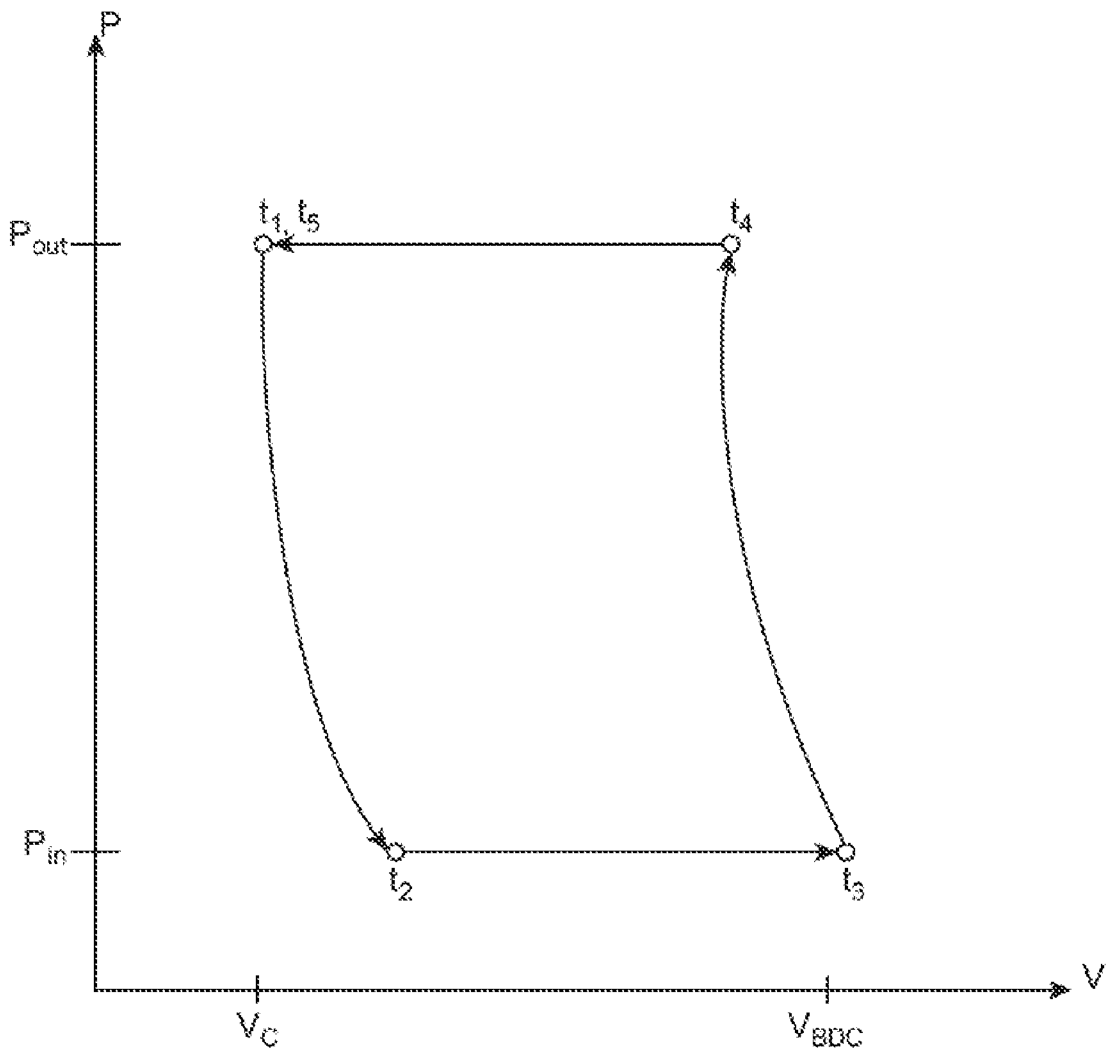
FIGS. 49A-C plot pressure versus volume in chambers experiencing compression and expansion modes.
Figure 49B:
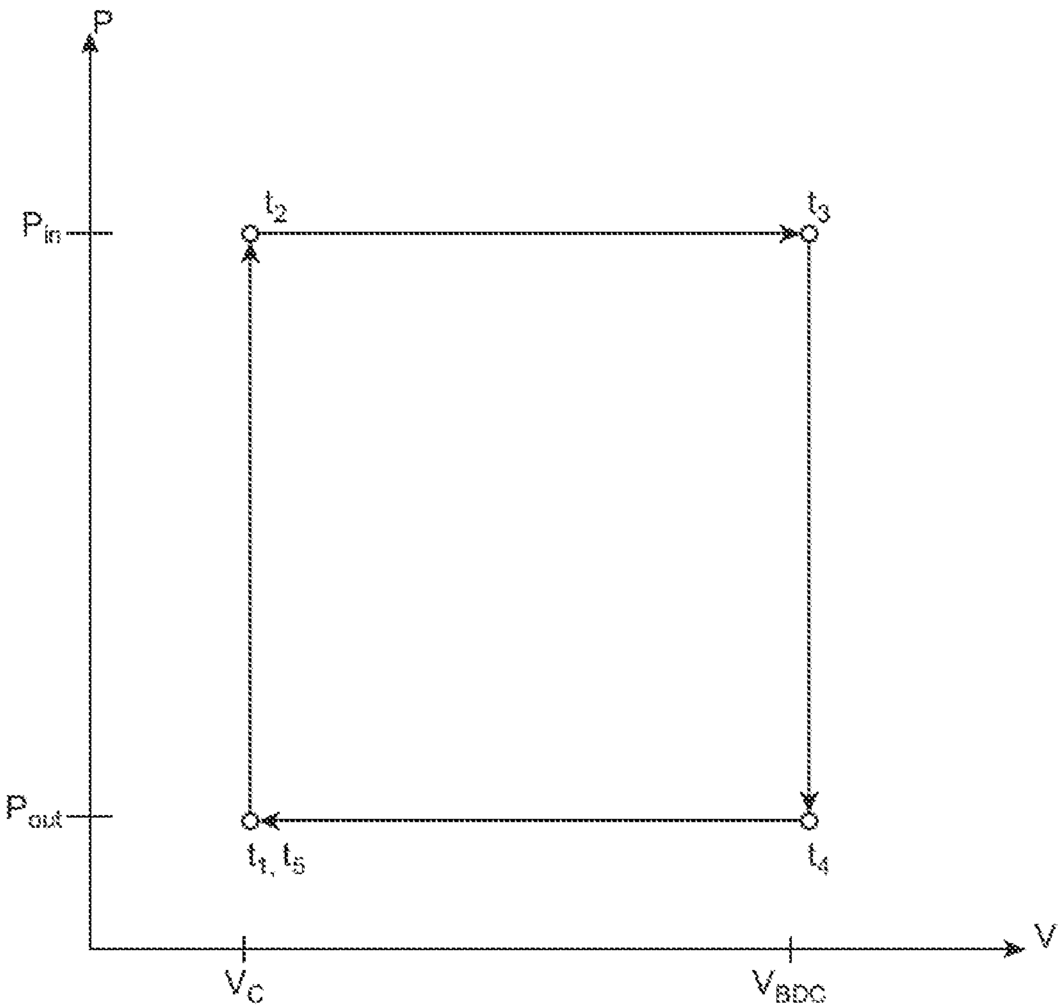
Figure 49C:
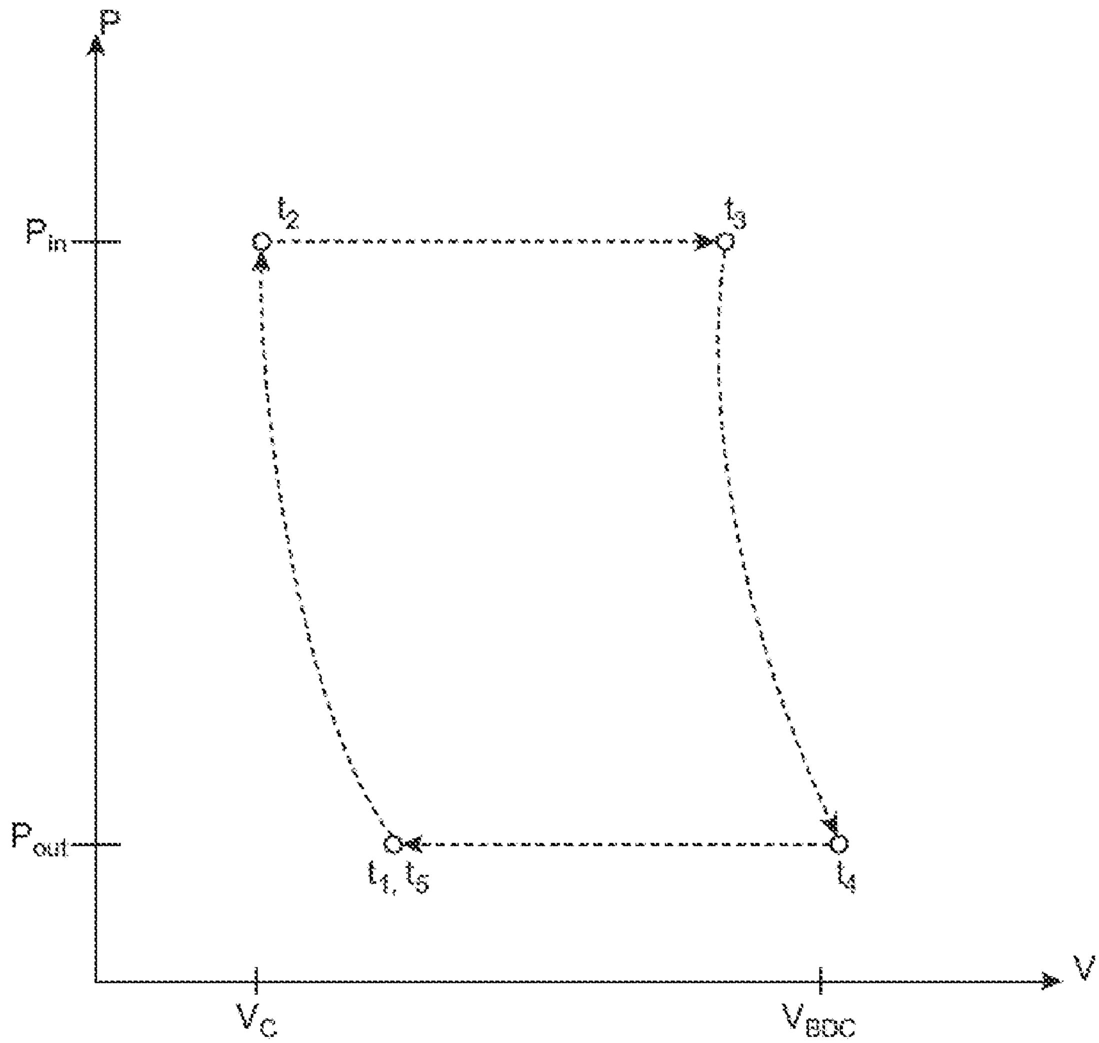

For example, FIGS. 49A-C show relations between pressure and volume in a chamber undergoing compression and expansion. These plots are representative, idealized plots, and do not include valve losses. In particular, FIG. 49A plots pressure versus volume, within a chamber experiencing a compression cycle.

During the first piston stroke, the piston moves from a Top Dead Center (TDC) position at time $t_1$ to reach the Bottom Dead Center (BDC) position at time $t_3$. At time $t_1$ the volume within the chamber is a clearance volume ($V_C$) extant in the chamber when the piston head is at TDC. At time $t_3$ the volume within the chamber is that where the piston is at the BDC position ($V_{BAC}$).

At a time $t_2$ between $t_1$ and $t_3$, a pressure within the chamber is less than that of the low pressure side, causing opening of a valve to admit gas to the chamber from the low pressure side at an inlet pressure ($P_{in}$).

At the end of the first piston stroke (time $t_3$), the valve is closed. In the next stroke of the piston, the piston begins to move in the opposite direction (from BDC to TDC) to compress the gas within the chamber. At time $t_4$, the pressure within the chamber reaches an outlet pressure ($P_{out}$) of a high pressure side. A valve between the chamber and the high pressure side then opens, and continued movement of the piston flows the compressed gas to the higher pressure side.

At time $t_5$ the piston has reached the end of the second stroke. The valve between the chamber and the high pressure side closes and then the piston begins to move in the opposite direction to commence another compression cycle.

The valves of the compression cycle shown in FIG. 49A operate efficiently. In particular, the first valve opens (at time $t_2$) when the pressure within the chamber has matched that of the low pressure side, requiring little energy for valve actuation. In addition, the balancing of pressure at this point minimizes the energy wasted in flowing gas from the low pressure side into the chamber.

Similarly, the second valve opens (at time $t_4$) when the pressure within the chamber has matched that of the high pressure side, again requiring little energy for valve actuation. This balancing of pressure further minimizes the energy that is wasted in flowing gas from the chamber to the high pressure side.

FIG. 49B plots pressure versus volume, within a chamber that is undergoing a conventional expansion cycle. During the first piston stroke of the conventional expansion cycle, the piston moves from a TDC position at time $t_1$ to reach the BDC position at time $t_3$. At $t_1$ the volume within the chamber is a clearance volume ($V_C$). At $t_3$ the volume within the chamber is $V_{BDC}$.

At time $t_1$ the valve between the chamber and the high pressure side is opened. Owing to the existing pressure differential, gas flows rapidly through the valve into the chamber, expanding to fill the available volume and causing the pressure to rapidly reach $P_{in}$ at time $t_2$. The air within the chamber expands between times $t_2$ and $t_3$, and the piston moves toward BDC.

At the end of the first piston stroke (time $t_3$), the valve is closed and a valve between the chamber and the low pressure side is opened. The pressure in the chamber rapidly drops to $P_{out}$. In the next stroke, the piston moves in the opposite direction (from BDC to TDC) to exhaust the expanded gas from the chamber to the low pressure side ($P_{out}$).

At time $t_5$ the piston has reached the end of the second stroke. The outlet valve closes and the piston begins to move in the opposite direction to commence another expansion cycle.

In contrast with the compression cycle of FIG. 49A, valves in the conventional expansion cycle of FIG. 49B may operate less efficiently. In particular, energy of the compressed gas may be lost to recovery, during either or both of the steps of admitting air into the chamber, and exhausting the expanded air from the chamber.

For example, at the time of opening the valve between the high pressure side and the chamber (at time $t_1$), a pressure differential exists. The valve must be actuated against this pressure differential, consuming energy at the expense of efficiency. In addition, available energy of the compressed gas is wasted as it flows rapidly into the chamber between times $t_1$ and $t_2$. This energy is lost and not available to be recovered by movement of the piston, further reducing system efficiency.

Efficiency may also be lost in the flowing of expanded gas from the chamber. In particular, at the time of actuation of the valve between the chamber and the low pressure side at time $t_3$, the pressure within the chamber may exceed that of the low pressure side. In such a case, the valve must be actuated against this pressure differential, consuming energy at the expense of efficiency. Furthermore, available energy of the gas would be consumed would be consumed as it flows rapidly into the low pressure side between times $t_3$ and $t_4$. This energy is lost and not available to be recovered by movement of the piston, further reducing system efficiency.

Accordingly, embodiments of the present invention are configured to control valve actuation in an expansion mode to allow more efficient operation. FIG. 49C plots in dashed lines, the pressure-volume relationship of an embodiment of an expansion cycle in accordance with an embodiment of the present invention.

The plot of FIG. 49C is similar to that of FIG. 49B, except that the timing of opening of valves is not necessarily coincident with the end of the piston strokes. For example, the valve between the high pressure side and the chamber is closed at time $t_3$, prior to the piston reaching the BDC position. As a result of this actuation timing, a smaller amount of gas is introduced for expansion, and the resulting pressure of gas within the chamber at the end of the expansion stroke, may match the low pressure side. Such a reduced pressure differential permits low energy actuation of the valve between the chamber and the low pressure side, and reduces energy losses associated with rapid flows of gas expanded within the chamber, to the low pressure side.

The valve between the chamber and the low pressure side may be closed at a time $t_1$, prior to the piston reaching the TDC position. As a result of this valve actuation timing, there remains in the chamber some amount of gas when the valve between the high pressure side and the chamber is again opened. This residual gas serves to lower a pressure differential at the time of inlet of the compressed gas into the chamber. The reduced pressure differential in turn slows the rate of flow of compressed gas into the chamber at the moment the inlet valve is opened, making more energy available for recovery by expansion. The reduced pressure differential also lowers the amount of energy needed to actuate the valve against the pressure differential to admit the compressed gas into the chamber for expansion.

The total amount of power extracted by following the curve of FIG. 49B is greater than that of FIG. 49C, but efficiency is lower. By controlling the valve timing, any intermediate curve between FIG. 49B and FIG. 49C may be followed, allowing the system to trade off power output for efficiency.

Figure 41E:
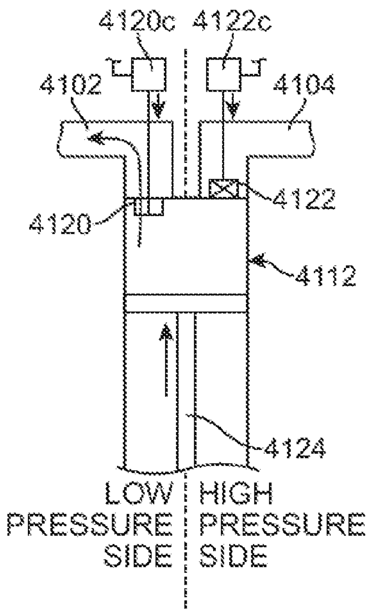
FIGS. 41EA-EE are simplified schematic representations showing operation of a valve and cylinder configuration.
Figure 41E:
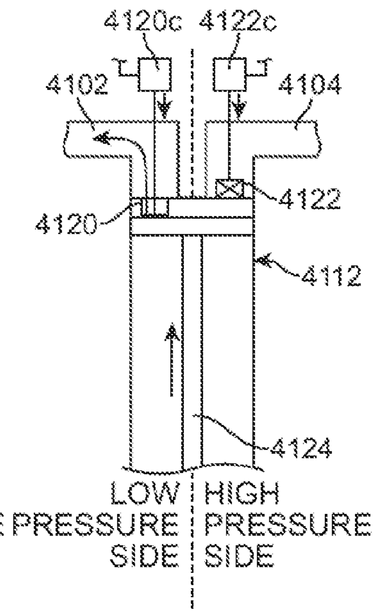
Figure 41E:
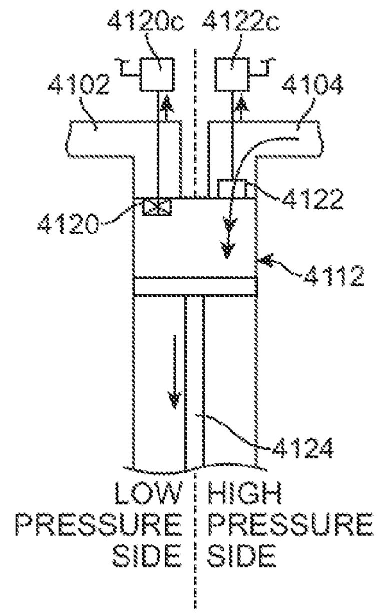
Figure 41E:
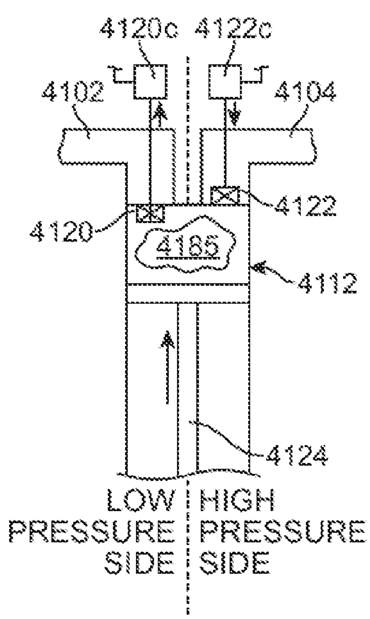
Figure 41E:
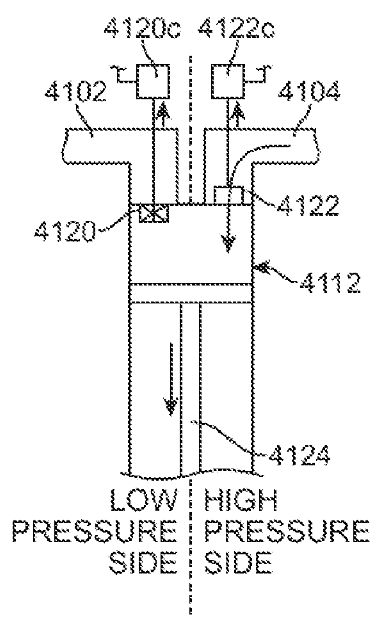

FIGS. 41EA-EE show timing of opening and closing of valves during expansion mode in accordance with an alternative embodiment of the present invention. FIGS. 41EA-EE show the valves in an end wall of the cylinder for purposes of illustration, but the valves could be positioned anywhere in the chamber proximate to the maximum upward extent of the piston head, as generically depicted in the previous FIGS. 41-41D.

In FIG. 41EA, the piston 4124 is approaching the top of the cylinder 4112, and gas expanded during the previous piston stroke is now being exhausted to the low pressure side through open valve 4120. As shown in FIG. 41EB, in one approach valve 4120 may be maintained open until the piston reaches the very end of its expansion stroke, thereby exhausting all of the expanded air.

Such timing of actuation of valve 4120, however, could result in the loss of energy from the system. As specifically shown in FIG. 41EC, at the beginning of the next (downward) stroke of the piston, valve 4122 in communication with the high pressure side would open, and high pressure gas would rush into the chamber. The energy associated with such rapid flow of the high pressure gas would be lost to subsequent expansion, thereby reducing the power output.

According to the alternative valve timing approach of FIG. 41ED, this energy loss may be avoided by closing valve 4120 prior to the piston head reaching the top of the cylinder. In this configuration, the remaining expanded gas 4185 within the cylinder would be compressed by continued upward movement of the piston. This compression would elevate the pressure in the top of the cylinder, reducing the pressure differential as valve 4122 is subsequently opened in FIG. 4*l* EE. In this manner, the incoming gas would flow at a lower rate, reducing energy losses associated with pressure differentials.

The approach of FIGS. 41ED-41EE would also reduce the energy consumed by valve actuation. In order to open, solenoid 4122*c* must move the plate of valve 4122 against the pressure exerted by the high pressure side. However, the increased backpressure within the cylinder resulting from early closing of valve 4120, would provide additional bias to assist this movement of the valve plate during opening of valve 4122.

The valve timing approach just described utilizes the presence of residual gas within the cylinder, to reduce the pressure differential at the end of a piston stroke during expansion. Alternatively or in conjunction with this approach, a liquid material could be introduced to the cylinder to reduce this pressure differential.

Figure 41F:
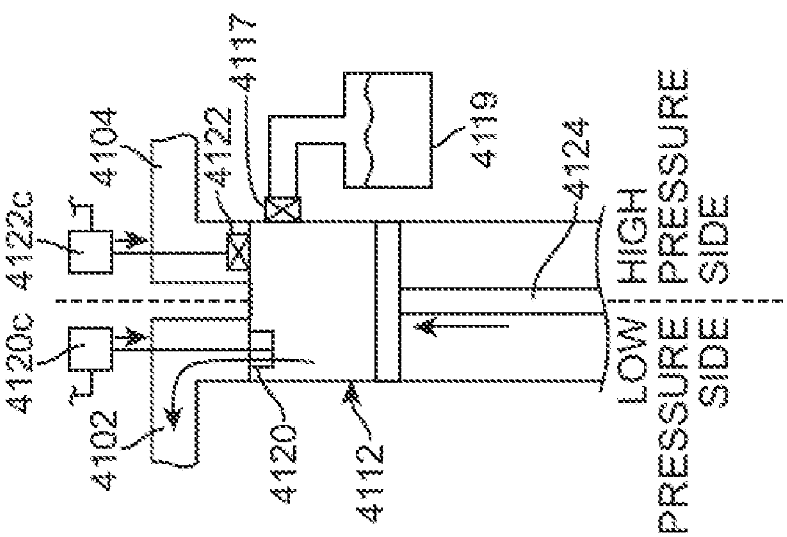
FIGS. 41FA-FC are simplified schematic representations showing operation of one embodiment.
Figure 41F:
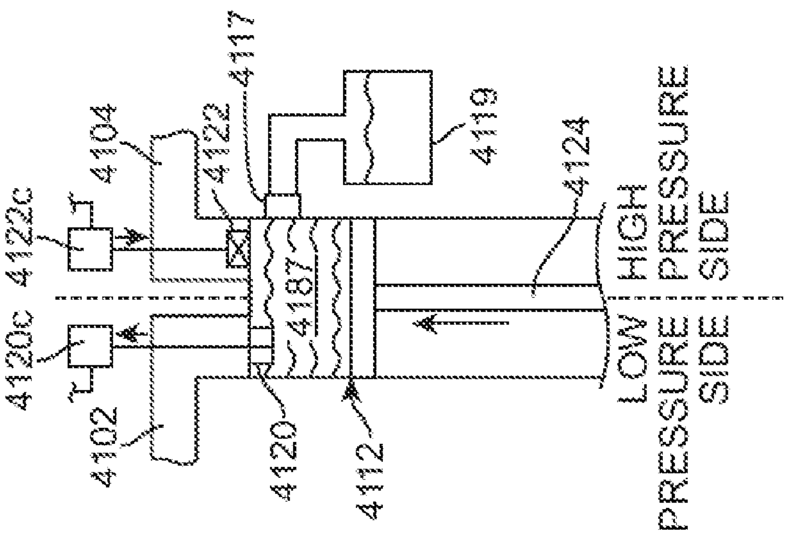
Figure 41F:
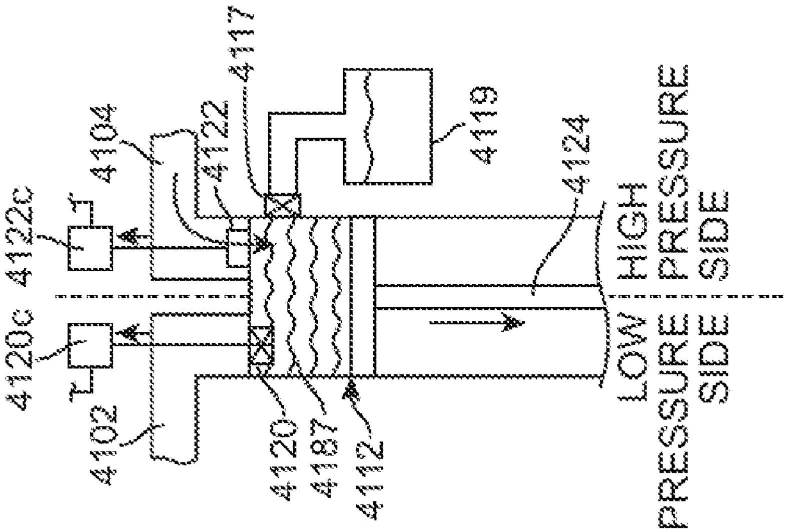

FIGS. 41FA-41FC show cross-sectional views of such an embodiment. In FIG. 41FA, the piston is again approaching the top of the cylinder, with expanded air being exhausted to the low pressure side through valve 4120. In FIG. 41FB, valve 4120 is closed prior to the piston reaching the top of the cylinder. A liquid 4187 such as water, is admitted to the cylinder through valve 4117 from reservoir 4119. The liquid serves to reduce the volume available in the cylinder for the remaining gas, making it easier to compress that remaining gas to a higher pressure. As shown in FIG. 41FC, as the piston begins to descend in the next stroke, the increased pressure in the cylinder attributable to the presence of water, would reduce the pressure differential across valve 4122 and corresponding energy losses as that valve is opened to permit the flow of gas from the high pressure side. If the pressure differential is reduced to zero, there would be no free expansion, and efficiency would be maximized.

Liquid may be introduced into cylinder in a number of ways. In certain embodiments (for example those employing liquid injection to reduce the clearance volume) a separate valve could allow selective communication between the cylinder and a liquid supply. Certain embodiments could alternatively provide some or all of the liquid within the cylinder from the liquid injection, and some as droplets from the mist.

In embodiments where liquid is present within the cylinder, the amounts of liquid that are introduced or remain within the cylinder could be controlled to optimize system performance. For example, a sensor within the chamber could indicate the liquid levels, and operation of system elements controlled to vary this liquid amount. In certain embodiments, liquid could be removed from the cylinder by a drain, with rates of liquid flowing out of the cylinder being controlled by the processor or controller.

Returning to FIG. 41, this embodiment includes two separate mixing chambers and pulsation damper bottles. The use of such separate structures may be desirable, as conditions of formation of the liquid-gas mixture will likely be different for compression versus expansion. For example in a compression mode the gas flow that is receiving the liquid spray, will be at low pressure. By contrast in the expansion mode, the gas flow that is receiving the liquid spray will be at a higher pressure. Use of separate mixing chambers as in the embodiment of FIG. 4, allows for optimal liquid introduction under these different conditions.

According to embodiments of the present invention, a combined compression/expansion chamber, a dedicated compression chamber, or a dedicated expansion chamber, may be in fluid communication with the mixing chamber (as well as any intervening structures such as a pulsation damper bottle) through a variety of valve designs. As shown in the embodiment of FIGS. 39-41D, a plurality of valves may allow selective fluid communication between a mixing chamber and more than one compression/expansion chamber (for example, the two chambers defined by the presence of double-acting piston within a cylinder).

As shown in the previous embodiments, the valves may be mechanically actuated by a solenoid in physical communication with a shaft to cause movement of a valve plate relative to a valve seat. Such designs may include additional features to enhance system performance.

Figure 41G:
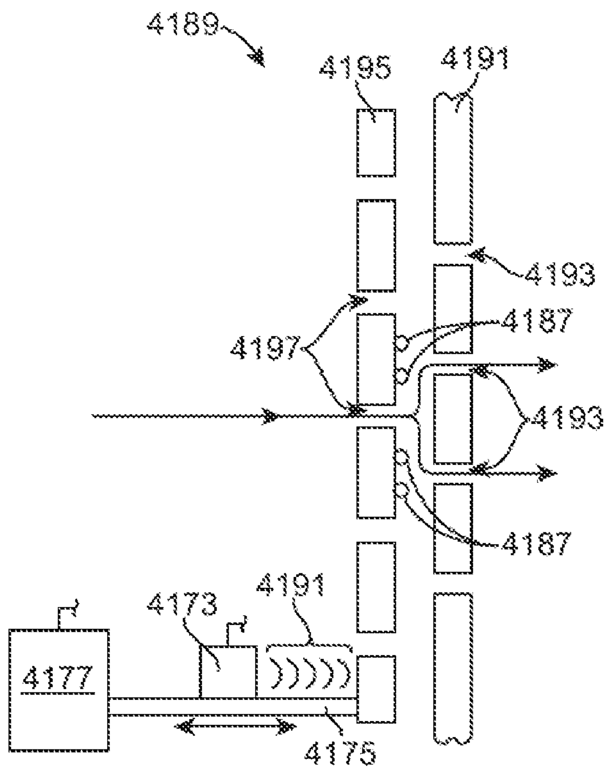
FIG. 41G is a simplified schematic view of one embodiment of a valve structure.

For example, FIG. 41G shows a simplified view of one embodiment of a valve design which utilizes an ultrasonic transducer. This figure is provided for purposes of illustration only, and the relative dimensions and sizes of the components of this figure are not to scale.

In particular, valve 4189 includes a valve seat 4191 having apertures 4193, and includes a valve plate 4195 having apertures 4197 and which is moveable to engage the valve seat. The apertures of the valve seat are offset relative to the apertures of the valve plate, such that upon their engagement, gas is prevented from flowing through the valve.

When the valve seat and the valve plate are not engaged, sufficient space exists between these elements allowing gas to traverse the valve by passing through the apertures 4197 and 4193. As shown in FIG. 41G, however, the path imposed upon gas flowing through the open valve can be torturous, with sharp turns potentially resulting in coalescence of liquid droplets 4187 on exposed surfaces. Such coalescence can undesirably alter the uniformity of those droplets in the chamber during compression or expansion. Coalescence can be reduced by shaping the edges of the valve plate and seat to minimize sharp turns, but the effect may not be eliminated by this method alone.

Thus, according to one embodiment, a valve structure of the present invention may be placed into communication with an ultrasonic transducer. The ultrasonic energy received from this transducer can serve to disrupt the coalescence of liquid on the valve, allowing that liquid to flow into the chamber for heat exchange during compression and/or expansion.

FIG. 41G shows one embodiment, wherein valve plate 4195 is moveable relative to valve seat 4191 by a shaft 4175 in communication with a solenoid 4177. In this embodiment, an ultrasonic transducer 4173 may be fixed to the shaft 4175. Actuation of the ultrasonic transducer 4173 results in the communication of ultrasonic waves to 4191 the valve plate, which vibrates and disperses liquid that may have coalesced on its surfaces. The ultrasonic energy may also reach the valve seat to disrupt liquid coalescence on its surfaces.

While FIG. 41G shows an embodiment wherein the ultrasonic transducer is in direct contact with the valve plate through the shaft, this is not required by the present invention. In alternative embodiments, the ultrasonic transducer could be separated from the valve plate and/or seat by some distance, with ultrasonic energy impinging upon these valve elements to disrupt coalescence of liquid upon their surfaces.

While the apparatus of FIG. 41G positions an ultrasonic transducer in acoustic communication with a valve structure controlling flows of gas to a chamber, an ultrasonic transducer could alternatively be positioned in other locations and remain within the scope of the present invention.

For example, the coalescence of droplets from an injected liquid mist is not limited to the surfaces of a valve plate or valve seat. Such coalescence can also occur within the cylinder itself, on the walls of the chamber and/or on the piston head and piston shaft.

Accordingly, certain embodiments of the present invention may position an ultrasonic transducer within the cylinder itself. In such an embodiment, ultrasonic energy from the transducer could be communicated to the chamber walls and/or the surface of the piston.

Such transmission of ultrasonic energy to within the cylinder could enhance heat exchange for compression or expansion processes in at least a couple of ways. First, the ultrasonic energy would disperse liquid from the surfaces back into the gas, where the liquid is better suited to thermally interact with the gas. In addition, the ultrasonic energy may serve to break up the coalesced liquid into finer droplets having smaller diameters, thereby creating a larger surface area and enhancing heat exchange.

Returning to the subject of valve structure, embodiments of the present invention are not limited to the use of solenoid-actuated valves. Alternative embodiments my utilize other valve types and remain within the scope of the present invention.

One example of such an alternative valve design which may be suitable for use in the present invention, is a voice coil-actuated valve that includes a servo loop. Use of such a valve structure may be advantageous to control the velocity profile of actuation, for example reducing velocity at the end of plate travel prior to a stop, thereby relieving stress on valve components.

According to other embodiments the valves may be pneumatically actuated, an example being a proportional pneumatic air valve. In still other embodiments, the valves may be hydraulically actuated, for example a high pressure hydraulic valve.

Figure 41H:
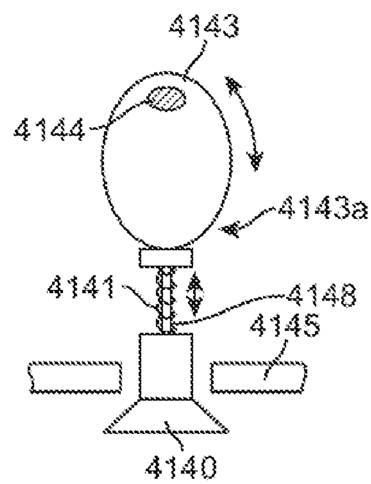
FIG. 41H is a simplified schematic view of a cam-based valve design which may be used in accordance with embodiments of the present invention.

Embodiments of valves for use in accordance with the present invention may be designed to exhibit specific time profiles of opening and/or closing. For example, FIG. 41H shows one possible embodiment wherein valve plate 4140 is actuated relative to valve plate 4145 through shaft 4148, by contact between a cam follower 4142 and a surface 4143*a* of cam 4143 as the cam rotates about shaft 4144. The cam follower is held in contact with the cam surface by spring 4141. In this embodiment, the particular shape of the cam, and the corresponding orientation of its surfaces relative to the cam follower, can be designed to determine the time profile of the actuation of the valve, in the closing and opening directions. Valve timing may be varied by providing a mechanism to vary the angle or effective profile of the cam.

Moreover, embodiments in accordance with the present invention are not limited to the use of two-way valves. In accordance with certain embodiments, a mixing chamber may be in selective fluid communication with a plurality of compression/expansion chambers, through a multi-way valve having two or a greater number of outputs.

Figure 46B:
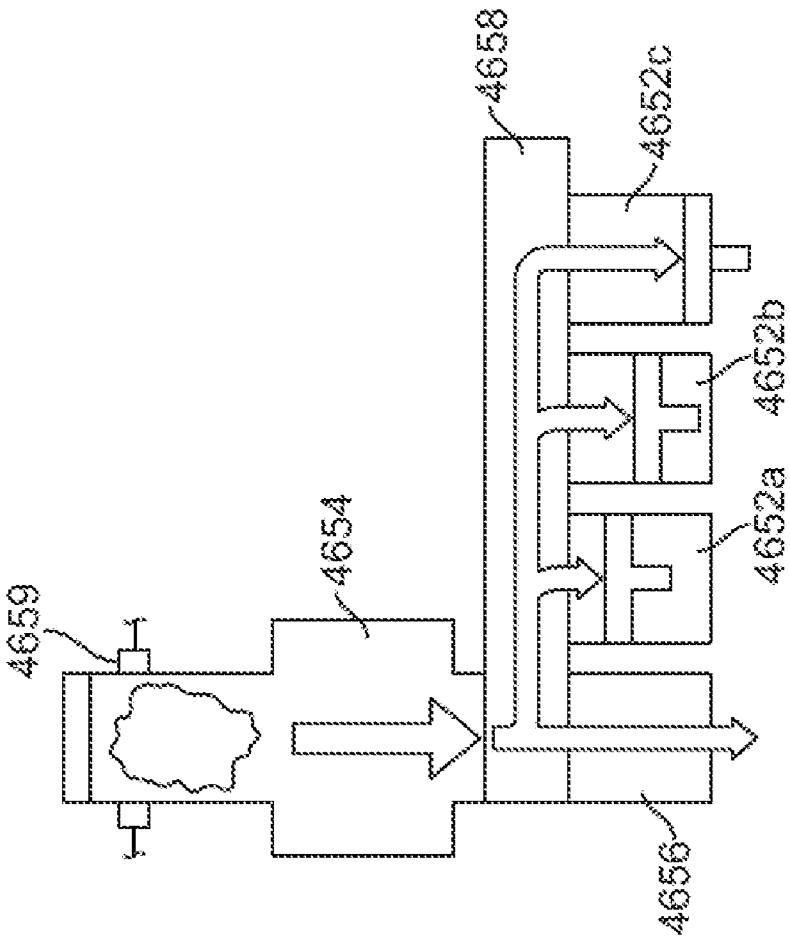
FIG. 46B is a simplified view of an embodiment of the present invention wherein output of a mixing chamber may be shunted to a dump.
Figure 46A:
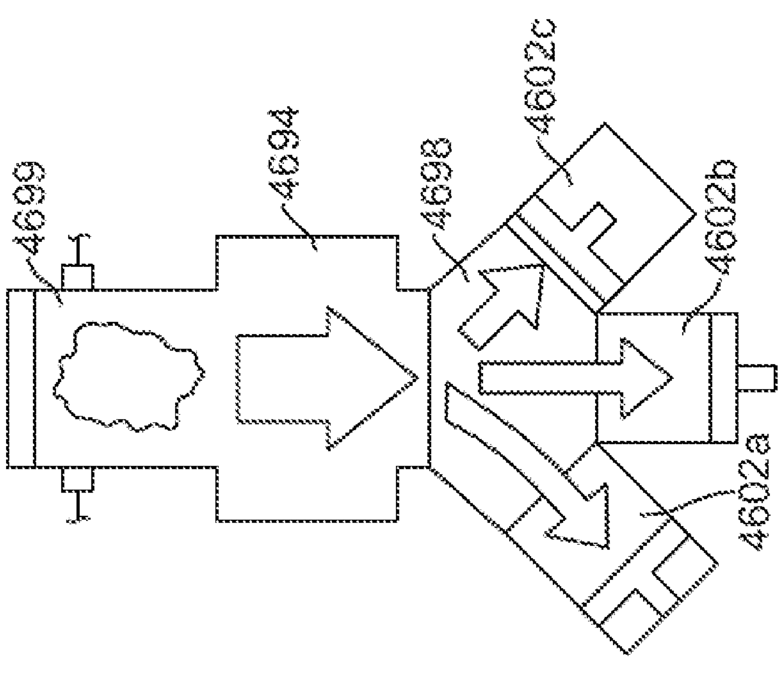
FIG. 46A is a simplified view of an embodiment of the present invention wherein output of a mixing chamber is selectively output to three compression/expansion cylinders.

A system employing a valve between a mixing chamber and compression/expansion chambers, having more than two outputs, is shown in the embodiment of FIG. 46A. In this structure, the output of mixing chamber 4699 is in selective fluid communication with one of a plurality of compression/expansion chambers 4602*a-c*, through a pulsation damper bottle 4694 and a multi-way valve 4698.

This embodiment of a system is designed such that at most times, a gas/liquid mixture is generally being flowed to at least one of the compression/expansion chambers 4602*a-c*. Such ongoing operation of the mixing chamber to create the gas/liquid mixture, helps to ensure the uniformity of the properties of that mixture over time, as flows of gases, liquids, and the resulting gas/liquid mixture itself, is not repeatedly halted and restarted depending upon the varying demands of the different compression/expansion chambers.

In still another embodiment shown in FIG. 46B, a gas/liquid mixture prepared in the mixing chamber 4659, is not required at all times by one of the compression/expansion chambers 4654*a-c*. However, the benefits of ongoing generation of the gas/liquid mixture may be achieved by placing one output of the multi-way valve 4658 in fluid communication with a dump 4656. Thus when the gas/liquid mixture is not required for compression/expansion in any chamber, the mixture is flowed from the mixing chamber 4659 through a pulsation damper bottle 4654 to the dump 4656, where the liquid may or may not be recovered for later use, such as re-injection.

It is further noted that the character of the gas/liquid mixture generated in the mixing chamber and flowed to the compression/expansion chamber, may or may not be the same during expansion cycles and compression cycles. Thus, where the desired gas-liquid mixture is to be changed, it may be advantageous to flow the transitional mixture to the dump until uniform conditions of the changed gas/liquid mixture have been achieved.

Figure 48A:
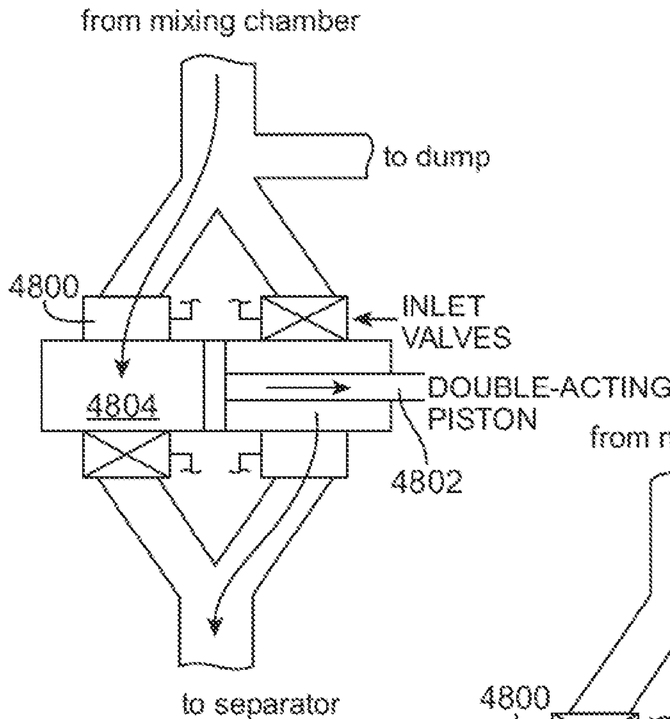
FIGS. 48A-C show operation of the controller to control the timing of various valves in the system.
Figure 48B:
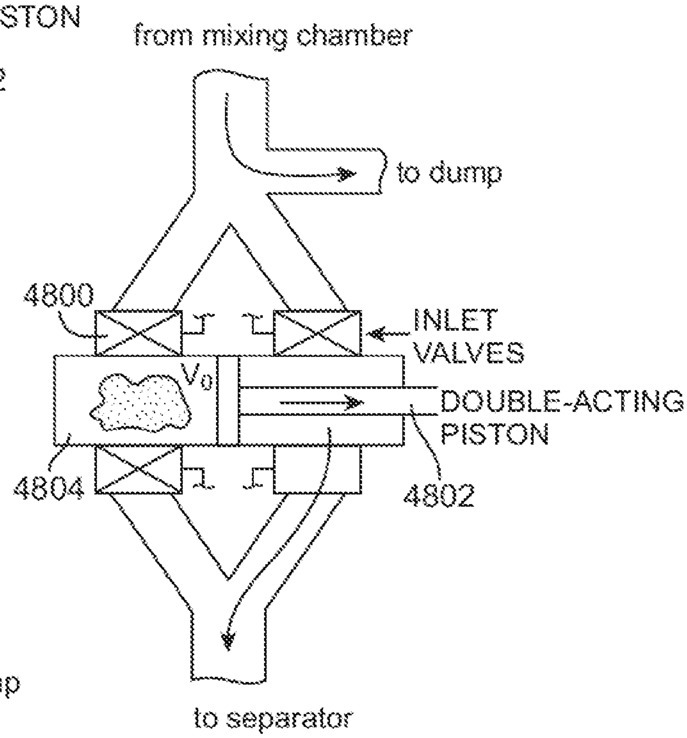
Figure 48C:
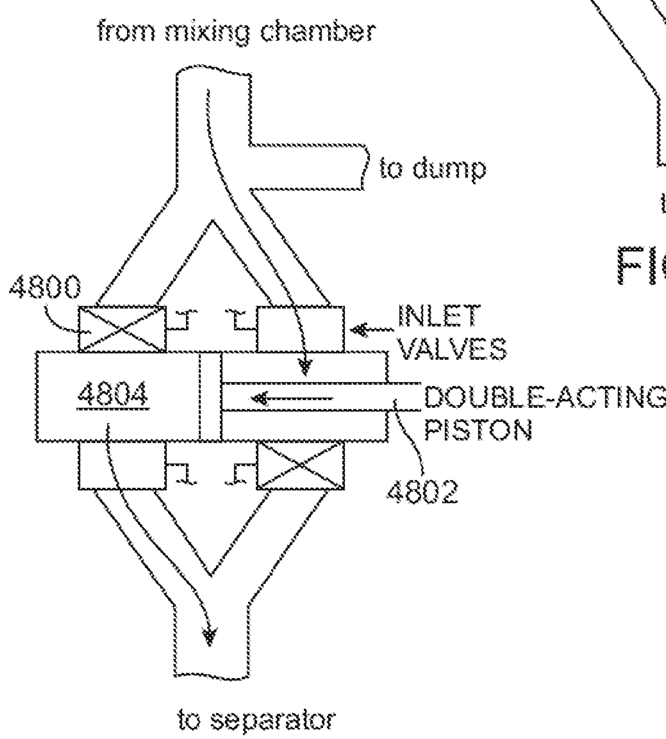

One particular embodiment in which it may be useful to selectively route a liquid-gas mixture to a dump, is depicted in FIGS. 48A-48C. In particular, some embodiments may employ precise control over valve actuation to admit a pre-determined limited volume of the liquid-gas mixture during an expansion cycle.

Specifically, a pre-determined amount of air $V_0$, is added to the chamber from the high pressure side (such as the previous stage or the storage tank), by opening an inlet valve 4800 for a controlled interval of time. This amount of air $V_0$ is calculated such that when the piston 4802 reaches the end of the expansion stroke, a desired pressure within the chamber 4804 will be achieved.

In certain cases, this desired pressure will be approximately equal that of the next lower pressure stage, or will be approximately atmospheric pressure if the stage is the lowest pressure stage or is the only stage. In certain embodiments, the desired pressure within the chamber may be within 1 PSI, within 5 PSI, within 10 PSI, or within 20 PSI of the pressure of the next lower stage. Thus at the end of the expansion stroke, the energy in the initial air volume $V_0$ has been fully expended, and little or no energy is wasted in moving that expanded air to the next lower pressure stage.

To achieve this goal, inlet valve 4800 is opened only for so long as to allow the desired amount of air ($V_0$) to enter the chamber. Thereafter, as shown in FIGS. 48B-C, valve 4800 is maintained closed.

In such a configuration, the inlet valve 4800 is closed before the piston has completed its expansion stroke. Moreover, the timing of closing of inlet valve 4800 may not be exactly synchronized with the opening of another inlet valve to admit a liquid-gas flow into another chamber (or portion thereof in the case of a double-acting piston.). Thus, at the time of closing of inlet valve 4800, no other chamber may yet be ready to receive a flow of a compressed liquid-gas mixture for expansion. Accordingly, such embodiments could benefit from the ability to shunt the continuously flowing liquid-gas mixture to a dump, until such time (shown in FIG. 48C) that a chamber in the system is to configured to receive that flow for expansion.

In other embodiments, a controller/processor may control inlet valve 4800 to cause it to admit to the expansion chamber an initial volume of air that is greater than $V_0$. Such instructions may be given, for example, when greater power is desired from a given expansion cycle, at the expense of efficiency of energy recovery.

As described in detail above, embodiments of systems and methods for storing and recovering energy according to the present invention are particularly suited for implementation in conjunction with a host computer including a processor and a computer-readable storage medium. Such a processor and computer-readable storage medium may be embedded in the apparatus, and/or may be controlled or monitored through external input/output devices.

Figure 47:
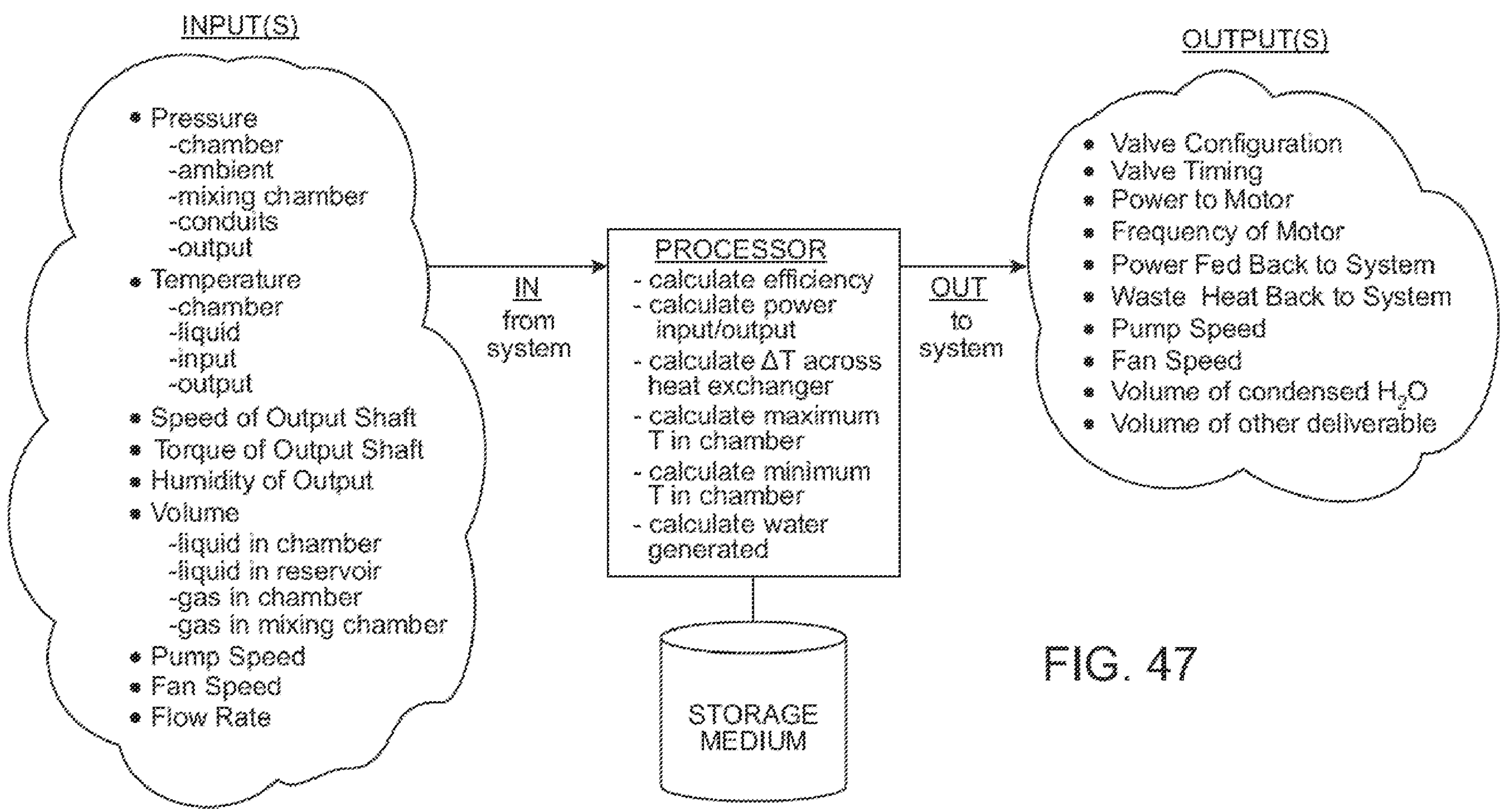
FIG. 47 is a block diagram showing inputs and outputs to a controller responsible for controlling operation of various elements of an apparatus according to embodiments of the present invention.

FIG. 47 is a schematic diagram showing the relationship between the processor/controller, and the various inputs received, functions performed, and outputs produced by the processor controller. As indicated, the processor may control various operational properties of the apparatus, based upon one or more inputs.

An example of such an operational parameter that may be controlled is the timing and configuration of the valves that control the flow of air and liquids into the mixing chamber, and in turn from the mixing chamber to the compression/expansion chamber. For example, as described above, in some embodiments the valve between the mixing chamber and the compression/expansion chamber is selectively opened and closed to allow flow of a gas/liquid mixture into an appropriate compression/expansion chamber. In a system where multiple such chambers are in communication with the mixing chamber, the valve would need to be carefully controlled to route the gas/liquid mixture to the proper chamber for the proper period, and in certain embodiments to route the gas/liquid mixture to a dump as appropriate.

Such timing of operation of the valve between the mixing chamber and the compression/expansion chamber may also need to be controlled to ensure that only a pre-determined amount of the air and gas/liquid mixture is introduced into the compression/expansion chamber. This is discussed above in connection with FIGS. 48A-C.

Timing of opening and closing of valves may also be carefully controlled during compression. For example, embodiments of the present invention may utilize the controller/processor to precisely open an outlet valve of a compression chamber under the desired conditions, for example where the built-up pressure in the cylinder exceeds a pressure in a next stage or a final storage pressure by a certain amount. In this manner, energy from the compressed air within the cylinder is not consumed in actuating the outlet valve (as is the case with a conventional check valve), and energy stored in the compressed air is maintained for later recovery by expansion.

While the timing of operation of inlet and outlet valves of a compression and/or expansion chamber may be controlled as described above, it should be appreciated that in certain embodiments other valves, or system elements other than valves, may be similarly controlled. For example, another example of a system parameter that can be controlled by the processor, is the amount of liquid introduced into the chamber. Based upon one or more values such as pressure, humidity, calculated efficiency, and others, an amount of liquid that is introduced into the chamber during compression or expansion, can be carefully controlled to maintain efficiency of operation. For example, where an amount of air greater than $V_0$ is inlet into the chamber during an expansion cycle, additional liquid may need to be introduced in order to maintain the temperature of that expanding air within a desired temperature range. This can be accomplished by processor control over a valve connecting the fluid reservoir with the spray nozzles, or a pump responsible for flowing fluid to the spray nozzles Multi-Stage System The particular embodiments just described employ compression or expansion over a single stage. However, alternative embodiments in accordance with the present invention may utilize more than one compression and/or expansion stage.

For example, when a larger compression/expansion ratio is required than can be accommodated by the mechanical or hydraulic approach by which mechanical power is conveyed to and from the system, then multiple stages can be utilized.

Figure 42A:
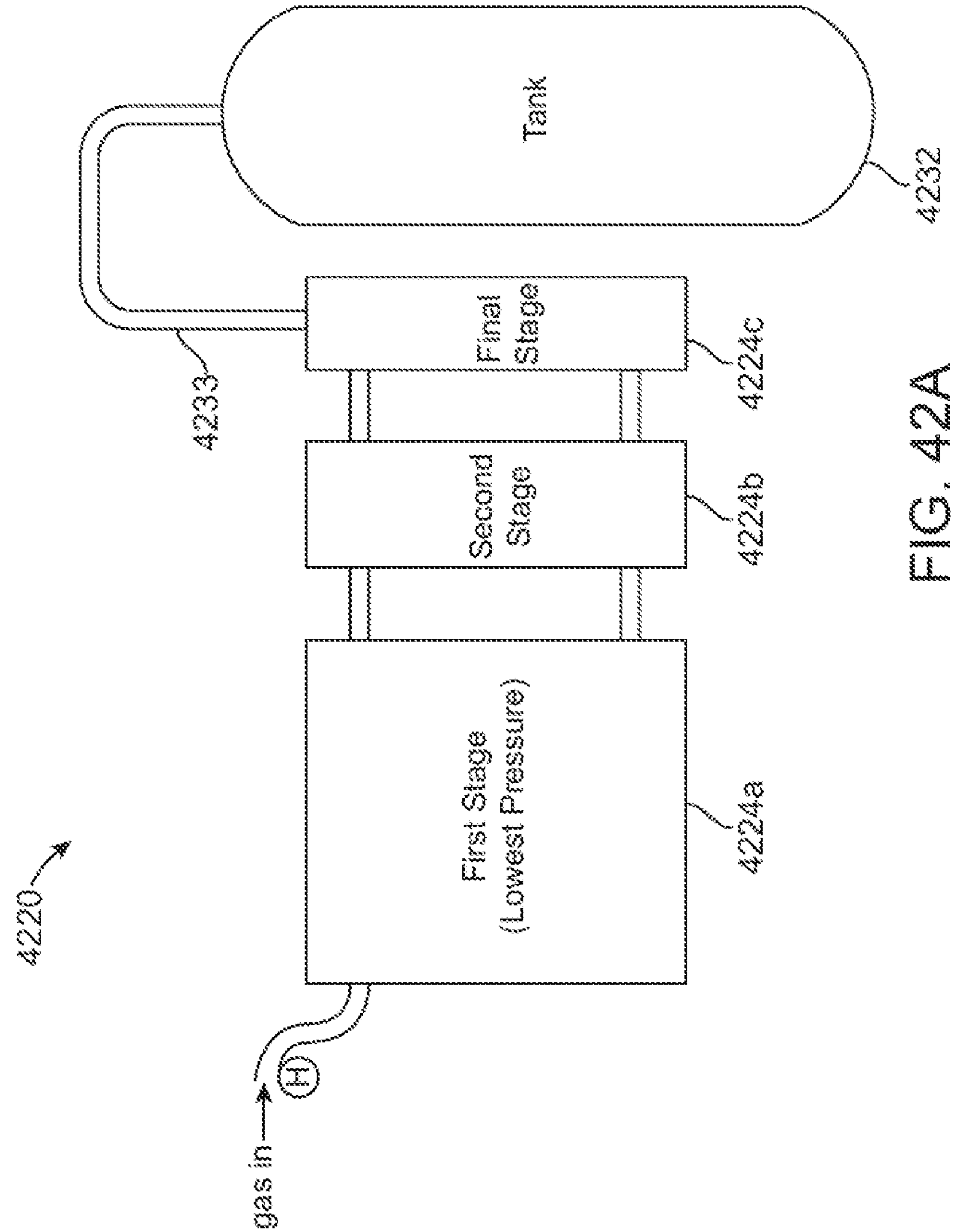
FIG. 42A is a simplified diagram of an embodiment of a multistage apparatus for gas compression according to the present invention.

FIG. 42A presents a highly simplified view of an embodiment of a multi-stage system 4220 for compressing air for storage in tank 4232 with three stages (i.e., first stage 4224*a*, second stage 4224*b* and third stage 4224*c*). Systems with more or fewer stages may be constructed similarly. As shown in the system 4220 of FIG. 42A, in multi-stage embodiments the output of one compression stage is flowed to the inlet of a successive compression stage for further compression, and so on, until a final desired pressure for storage is reached. In this manner, gas can be compressed over several stages to final pressures that would be difficult to achieve with only one stage.

Figure 42B:
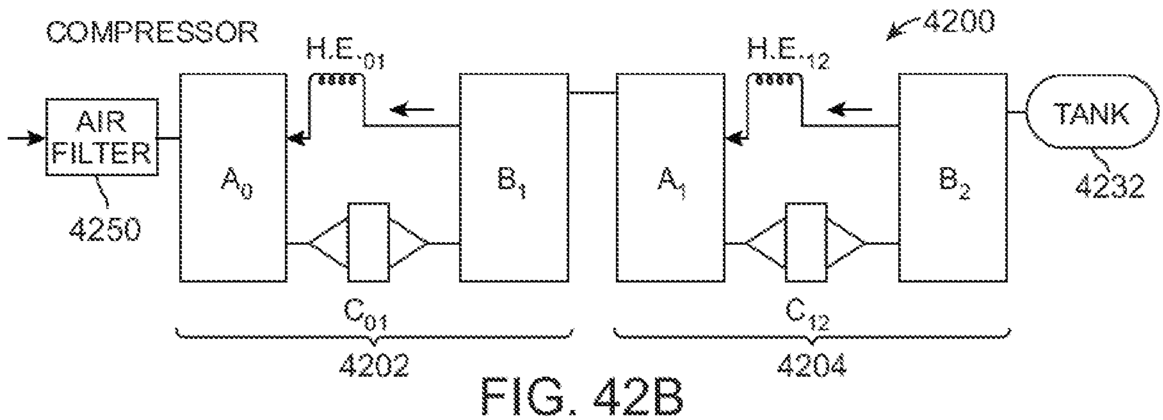
FIG. 42B is a simplified block diagram of one embodiment of a multistage dedicated compressor according to the present invention.
Figure 42B:
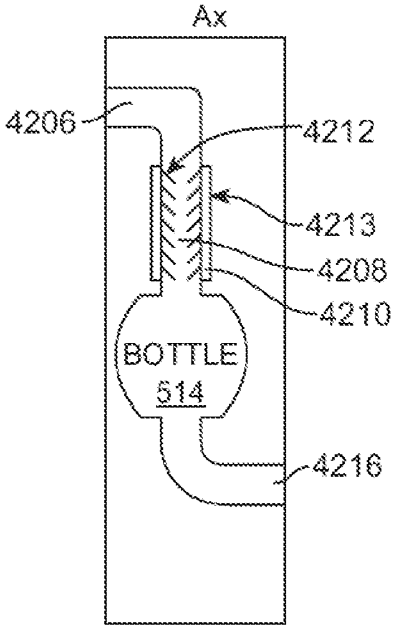
Figure 42B:
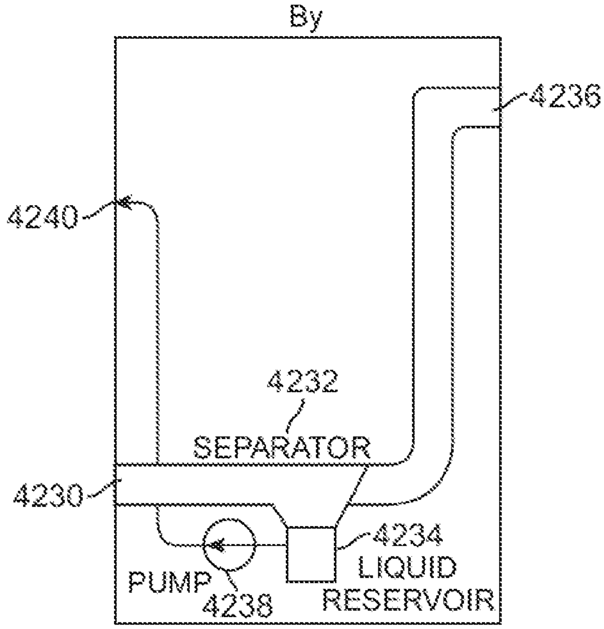
Figure 42B:
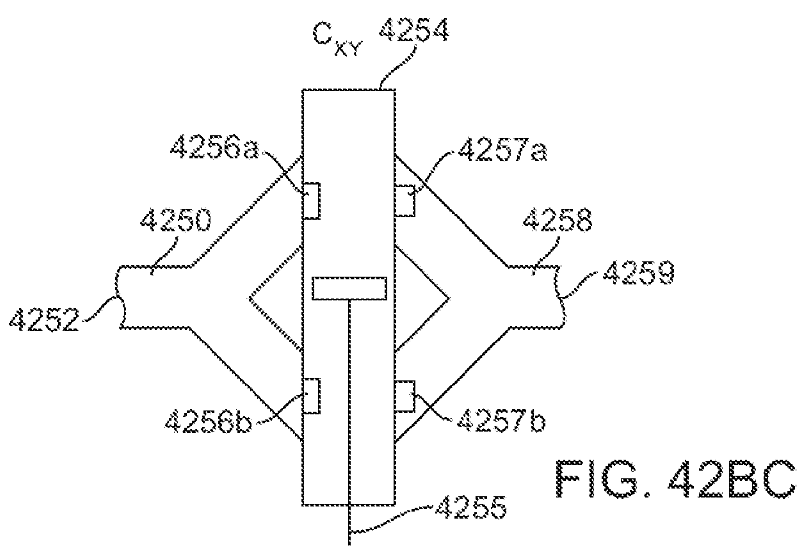

FIG. 42B presents a detailed view of one embodiment of a multi-stage dedicated compressor apparatus 4200 according to the present invention. In particular, FIG. 42B shows system 4200 including first stage 4202, second stage 4204, and storage unit 4232. First stage 4202 comprises mixing chamber module $A_0$ in fluid communication with separator module $B_1$ through compression chamber module $C_{01}$. First stage 4202 receives air for compression through air filter 4250.

First stage 4202 is in turn in fluid communication with second stage 4204. Second stage comprises mixing chamber module $A_1$ in fluid communication with separator module $B_2$ through compression module $C_{12}$. Second stage 4204 is in turn in fluid communication with storage unit 4232.

FIGS. 42BA, 42BB, and 42BC show simplified views of the different component modules of the multi-stage apparatus of FIG. 42B. In particular, the mixing module $A_x$ comprises gas inlet 4206 in fluid communication with mixing chamber 4208. Mixing chamber 4208 is configured to receive a flow of liquid through liquid inlet 4213, and to inject that liquid into a flowing gas through manifold 4210 and spray nozzles 4212. Mixing module $A_x$ further includes a pulsation damper bottle 4214 in fluid communication with an outlet 4216.

Separator module $B_y$ is shown in FIG. 42BB. Separation module comprises an inlet 4230 in fluid communication with a liquid-gas separator 4232. Liquid separated by separator is configured to flow to liquid reservoir 4234. Gas from the separator is configured to flow to outlet 4236 of the separator module. Pump 4238 is configured to flow liquid from reservoir to liquid outlet 4240.

A compression module $C_{xy}$ is shown in FIG. 42BC. The architecture of one embodiment of a compression module is described in detail above in connection with FIGS. 41-41B. In particular, the compression module comprises a conduit 4250 in fluid communication with an inlet 4252 and in fluid communication with a cylinder 4254 through valves 4256*a* and 4256*b*. Conduit 4258 is in fluid communication with cylinder 4254 through valves 4257*a* and 4257*b*, and in fluid communication with an outlet 4259.

Double-acting piston 4255 is disposed within cylinder 4254. Double-acting piston is in communication with an energy source (not shown), and its movement serves to compress gas present within the cylinder. Such compression is generally shown and described above in connection with FIGS. 39-39B and 41-41B.

In the first stage 4202 of multi-stage dedicated compressor apparatus 4200, the liquid outlet of the separator module $B_1$ is in fluid communication with the liquid inlet of the mixing module $A_0$, through a first heat exchanger $H.E._{01}$. In the second stage 4204 of multi-stage dedicated compressor apparatus 4200, the liquid outlet of the separator module $B_2$ is in fluid communication with the liquid inlet of the mixing module $A_1$, through a second heat exchanger $H.E._{02}$.

The embodiment of FIG. 42B may utilizes the pressure differential created by a stage, to facilitate injection of liquid. In particular, the embodiment of FIG. 42B has the separated liquid flowed back to the into a gas flow having the reduced pressure of the previous lower pressure stage. This reduces the force required for the liquid injection, and thus the power consumed by the pump in flowing the liquid.

A dedicated multi-stage compressor apparatus according to the present invention is not limited to the particular embodiment shown in FIG. 42B. In particular, while the embodiment of FIG. 42B shows an apparatus wherein separated liquid is recycled for re-injection into the gas flow within an individual stage, this is not required by the present invention.

Figure 42C:
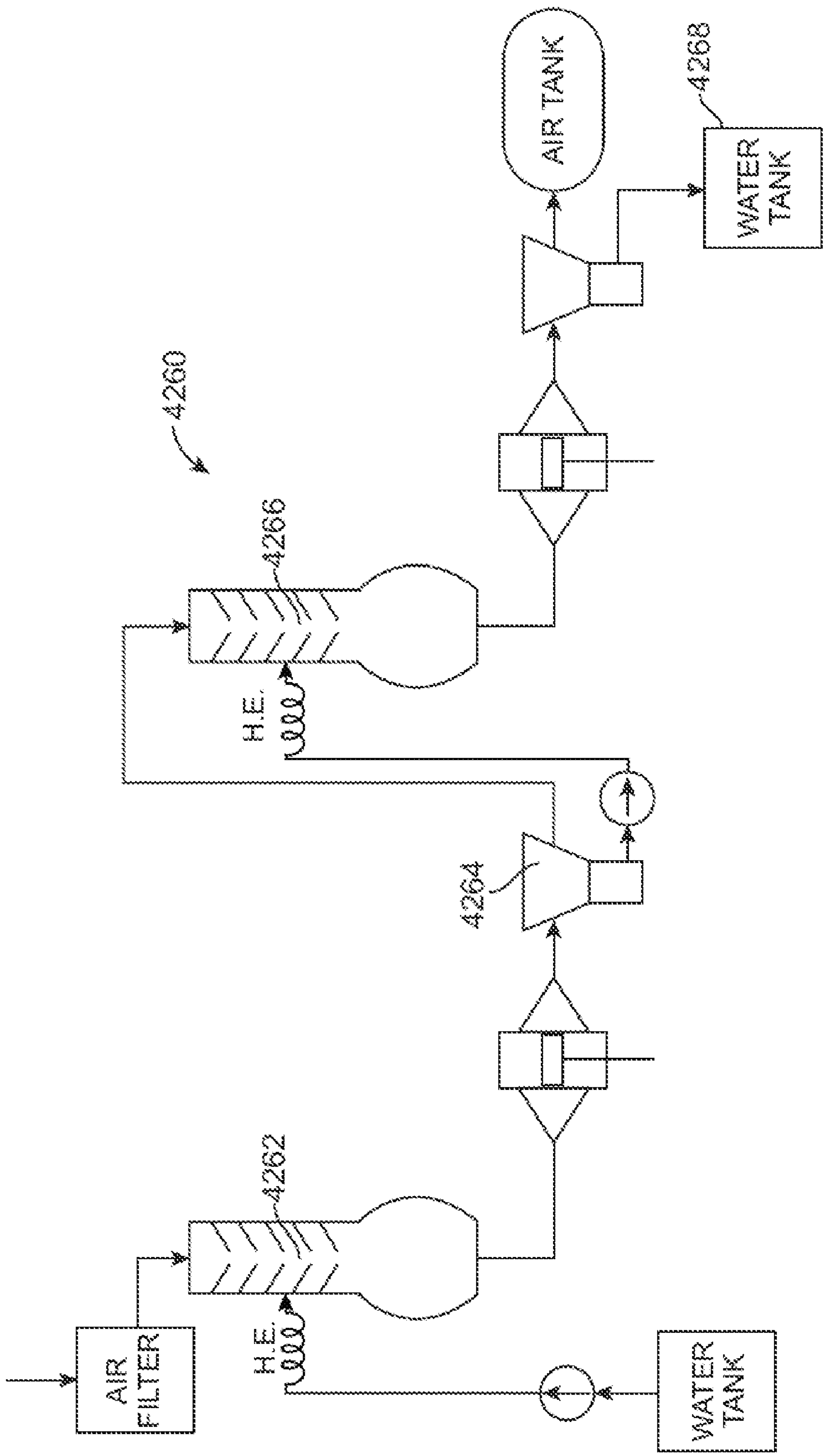
FIG. 42C is a simplified diagram showing an alternative embodiment of a multistage dedicated compressor according to the present invention.

FIG. 42C thus shows an alternative embodiment of a dedicated multi-stage compressor apparatus in accordance with the present invention. In the system 4260 according to this embodiment, liquid injected into the mixing chamber 4262 of a first stage, is subsequently separated by separator 4264 and then flowed for injection into the mixing chamber 4266 of the next stage. This configuration results in accumulation of the finally separated liquid in the tank 4268.

While FIGS. 42A-C shows compression over two stages, embodiments of the present invention are not limited to this approach. Alternative embodiments in accordance with the present invention can also perform expansion over any number of stages, with the output of one expansion stage flowed to the inlet of a successive expansion stage for further expansion, and so on, until an amount of energy has been recovered from the compressed gas. In this manner, energy can be recovered from gas expanded over several stages, that would be difficult to obtain with expansion in only one stage.

Figure 43:
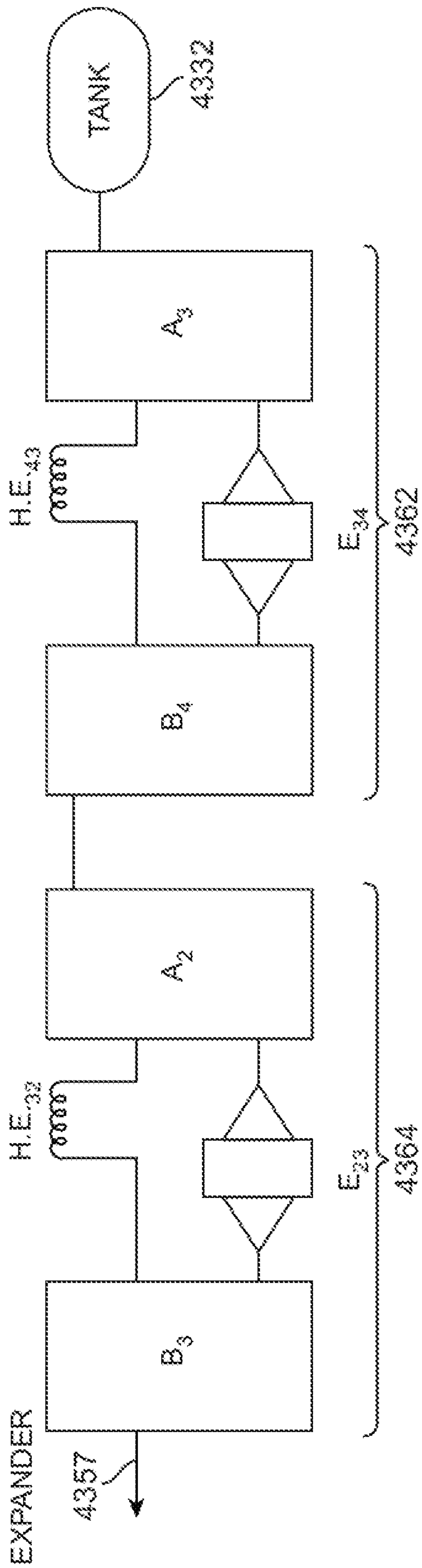
FIG. 43 is a simplified block diagram of one embodiment of a multistage dedicated expander according to the present invention.

FIG. 43 presents a detailed view of one embodiment of a multi-stage dedicated expander apparatus according to the present invention. In particular, FIG. 43 shows apparatus 4360 including storage unit 4332, first stage 4362, and second stage 4364. First stage 4362 comprises mixing chamber module $A_3$ in fluid communication with separator module $B_4$ through expansion module $E_{34}$. First stage 4362 receives air for compression from storage unit 4332.

First stage 4362 is in turn in fluid communication with second stage 4364. Second stage 4364 comprises mixing chamber module $A_2$ in fluid communication with separator module $B_3$ through expansion module $E_{23}$. Second stage 4364 is in turn in fluid communication with an outlet 4357.

Figure 43A:
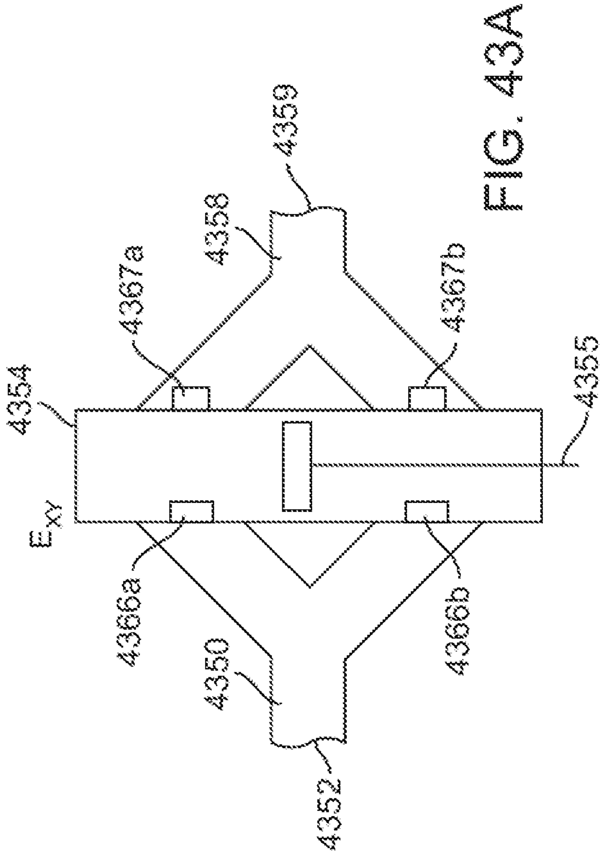
FIG. 43A shows a simplified view of an embodiment of one modular element of the system of FIG. 43.

The different component modules of the multi-stage dedicated expander apparatus 4360 may also be represented in FIGS. 42BA and 42BB as described above. Dedicated expander apparatus 4360 further includes expansion module $E_{xy}$ shown in FIG. 43A.

In particular, the architecture and operation of one embodiment of such an expansion module is described in detail above in connection with FIGS. 41 and 41C-D. In particular, the expansion module comprises a conduit 4350 in fluid communication with an inlet 4352 and in fluid communication with a cylinder 4354 through valves 4366*a* and 4366*b*. Conduit 4358 is in fluid communication with cylinder 4354 through valves 4367*a* and 4367*b*, and in fluid communication with an outlet 4359.

Double-acting piston 4355 is disposed within cylinder 4354. Double-acting piston is in communication with an apparatus (not shown) for converting mechanical power into energy, for example a generator. Expansion of air within the cylinder serves to drive movement of the piston. Such expansion is generally shown and described above in connection with FIGS. 40-40B, 41, and 41C-D.

In the first stage 4362 of multi-stage dedicated expander apparatus 4360, the liquid outlet of the separator module $B_4$ is in fluid communication with the liquid inlet of the mixing module $A_3$, through a first heat exchanger $H.E._{43}$. In the second stage 4364 of multi-stage dedicated expander apparatus 4360, the liquid outlet of the separator module $B_3$ is in fluid communication with the liquid inlet of the mixing module $A_2$, through a second heat exchanger $H.E._{32}$.

A dedicated multi-stage expander apparatus according to the present invention is not limited to the particular embodiment shown in FIG. 43. In particular, while the embodiment of FIG. 43 shows an apparatus wherein separated liquid is recycled for re-injection into the gas flow within an individual stage, this is not required by the present invention.

Figure 43B:
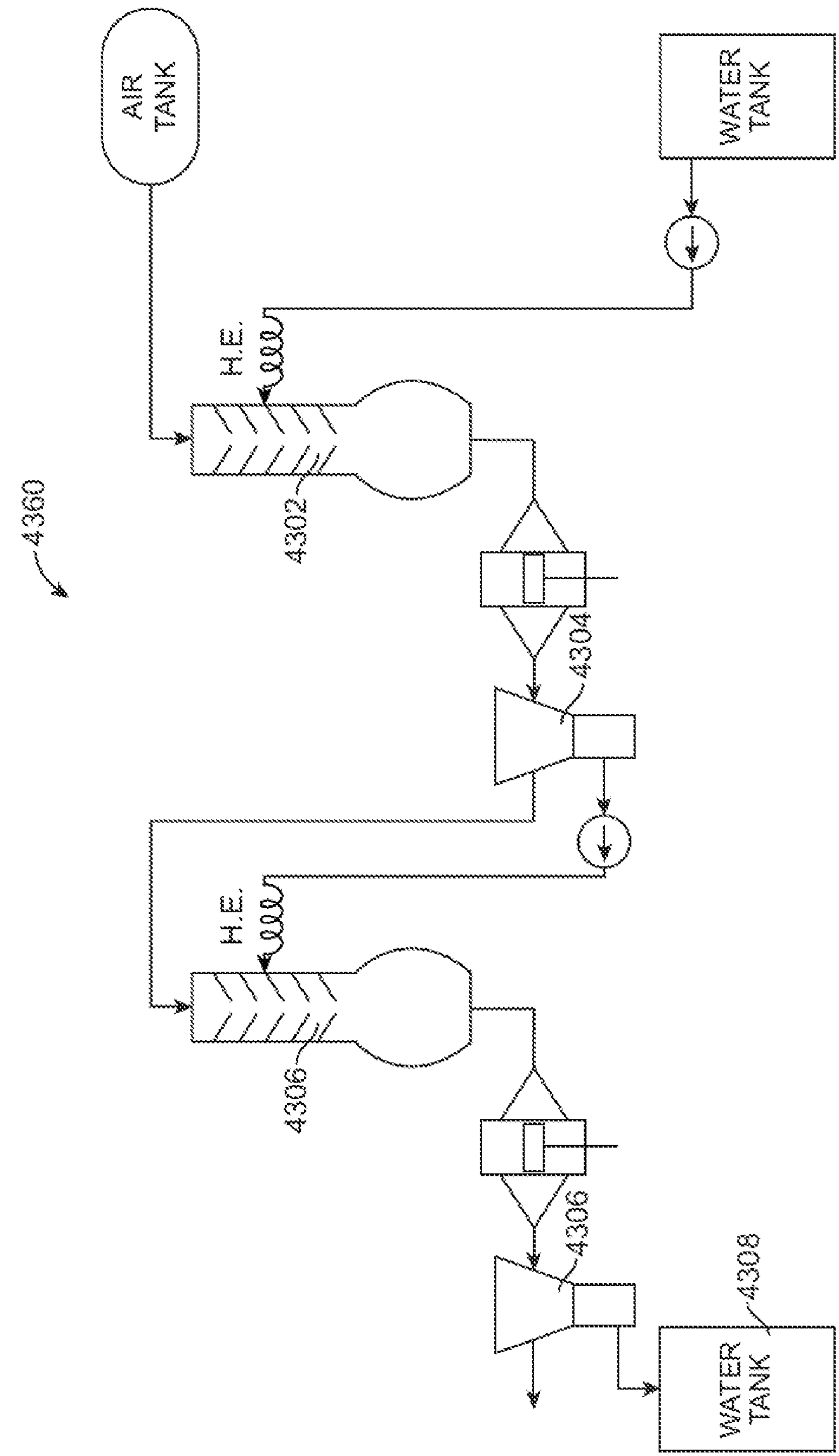
FIG. 43B is a simplified diagram showing an alternative embodiment of a multistage dedicated expander according to the present invention.

FIG. 43B shows an alternative embodiment of a dedicated multi-stage expander apparatus in accordance with the present invention. In the system 4300 according to this embodiment, liquid injected into the mixing chamber 4302 of a first stage, is subsequently separated by separator 4304 and then flowed for injection into the mixing chamber 4306 of the next stage. This configuration results in accumulation of the finally separated liquid in the tank 4308.

The embodiment of FIG. 43B does not require liquid to be injected against the pressure differential that is created by a stage. In the particular embodiment of FIG. 43A the separated liquid is flowed back to the into the inlet gas flow having the elevated pressure of the previous higher pressure stage. By contrast, the embodiment of FIG. 43B has the separated liquid flowed into the expanded gas that is inlet to the next stage, reducing the power consumed by the pump in flowing the liquid.

Figure 44:
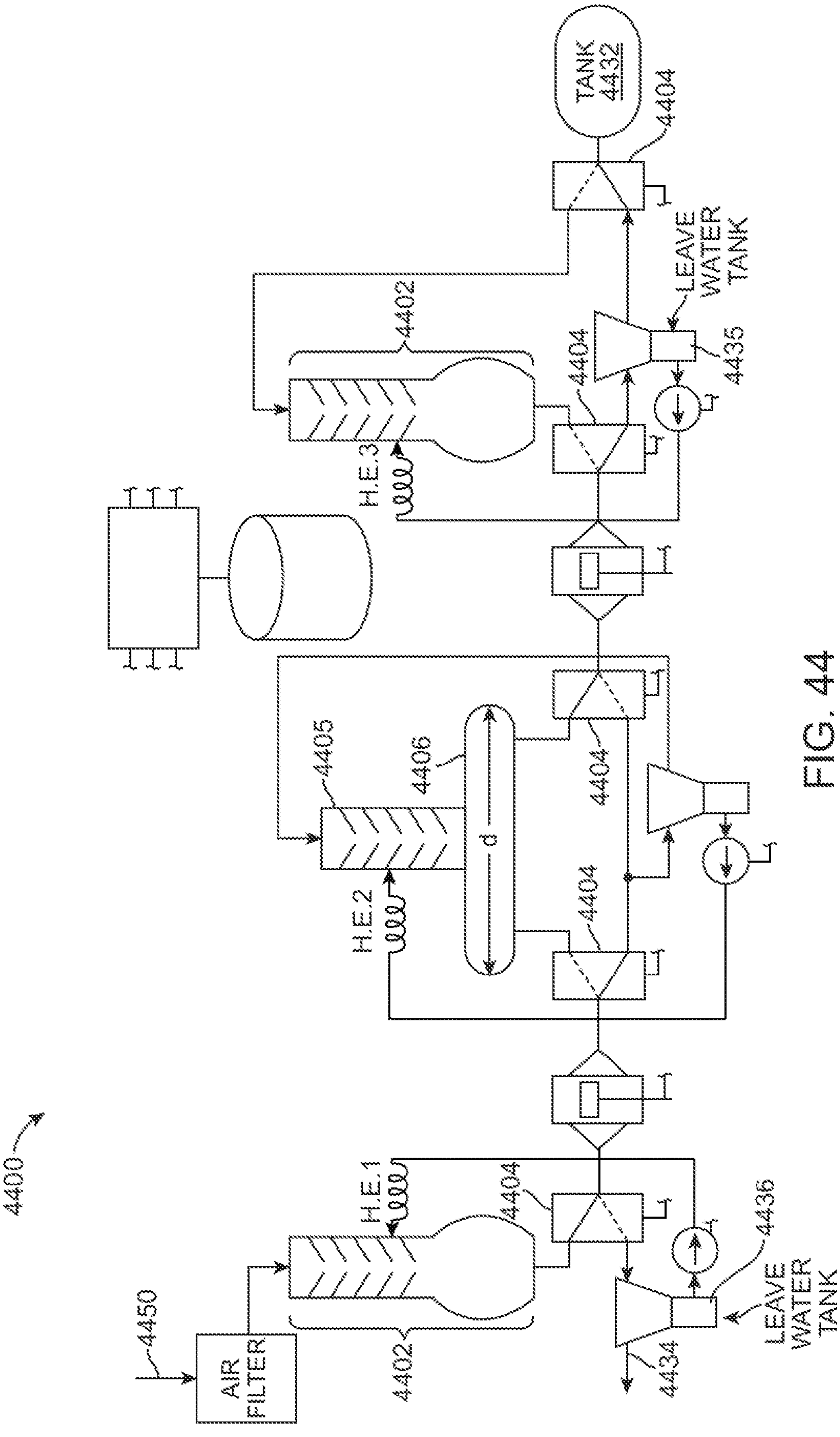
FIG. 44 is a simplified diagram showing one embodiment of a multistage compressor/expander apparatus according to the present invention.

While the embodiments of multi-stage apparatus described so far are dedicated to either compression or expansion, alternative embodiments in accordance with the present invention could perform both compression and expansion. FIG. 44 shows a simplified schematic view of one embodiment of such an two-stage apparatus that allows both compression and expansion.

In particular, the embodiment of FIG. 44 combines a number of design features to produce a system that is capable of performing both compression and expansion. One feature of system 4400 is connection of certain elements of the system through three-way valves 4404. FIG. 44 depicts the configuration of the three-way valves as solid in the compression mode, and as dashed in the expansion mode.

One feature of the system 4400 is the use of the same mixing chamber 4405 for the introduction of liquid in both the compression mode and in the expansion mode. Specifically, during compression the mixing chamber 4405 is utilized to inject liquid into gas that is already at a high pressure by virtue of compression in the previous stage. During expansion, the mixing chamber 4405 is utilized to inject gas into the high pressure gas at the first stage. In multi-stage apparatuses having mixing chambers commonly used in both compression and expansion, the pressures of inlet gas flows to those mixing chambers would be approximately the same in order achieve the desired gas-liquid mixture.

Still another feature of the system 4400 is the use of a pulsation damper bottle 4406 that is elongated in one or more dimensions (here, along dimension d). The elongated shape of the pulsation damper bottle 4406 allows for multiple connections between the bottle and adjacent elements, while allowing the conduits for fluid communication with those adjacent elements to remain short.

Specifically, the size of the pulsation damper bottle offers a relatively large volume for receiving the liquid-gas mixture. This volume accommodates the liquid droplets within the main body of the gas flow, with relatively low proportional exposure to the surface area of the walls of the bottle. By minimizing such exposure of the liquid droplets to the walls, the liquid droplets will tend to remain dispersed within the gas flow and hence available for heat exchange, rather than coalescing on the surfaces.

FIG. 44 is a simplified view showing the elongated pulsation damper bottle in schematic form only, and the shape of the elongated bottle should not be construed as being limited to this or any other particular profile. For example, alternative embodiments of a pulsation damper bottle could include one or more lobes or other elongated features.

Absent the use of such a pulsation damper bottle having an elongated shape, corresponding fluid conduits exhibiting greater complexity (for example having a longer length and/or more turns) could used to connect the bottle with different system elements. Such complex conduits could create localized pressure differences that disrupt the uniformity of the liquid-gas mixture, for example by giving rise to undesirable localized coalescence of liquid within the conduits.

Under operation in a compression mode, gas enters system through inlet 4450 and is exposed to two successive liquid injection and compression stages, before being flowed to storage unit 4432. Separated liquid accumulates in tank 4435, which may be insulated to conserve heat for subsequent re-injection to achieve near-isothermal expansion in an expansion mode.

Specifically, under operation in an expansion mode, compressed gas from storage unit is exposed to two successive liquid injection and expansion compression stages, before being flowed out of the system at outlet 4434. Separated liquid accumulates in tank 4436, and may be subsequently re-injected to achieve near-isothermal compression in a compression mode.

In the embodiment of the system of FIG. 44, the flow of separated liquid across different stages results in accumulation at a final separator, in a manner analogous to the embodiments of FIG. 42C (dedicated compressor) and FIG. 43B (dedicated expander). Such embodiments require the fluid reservoirs to be larger to accommodate the directional flows of liquids which occur.

Figure 45:
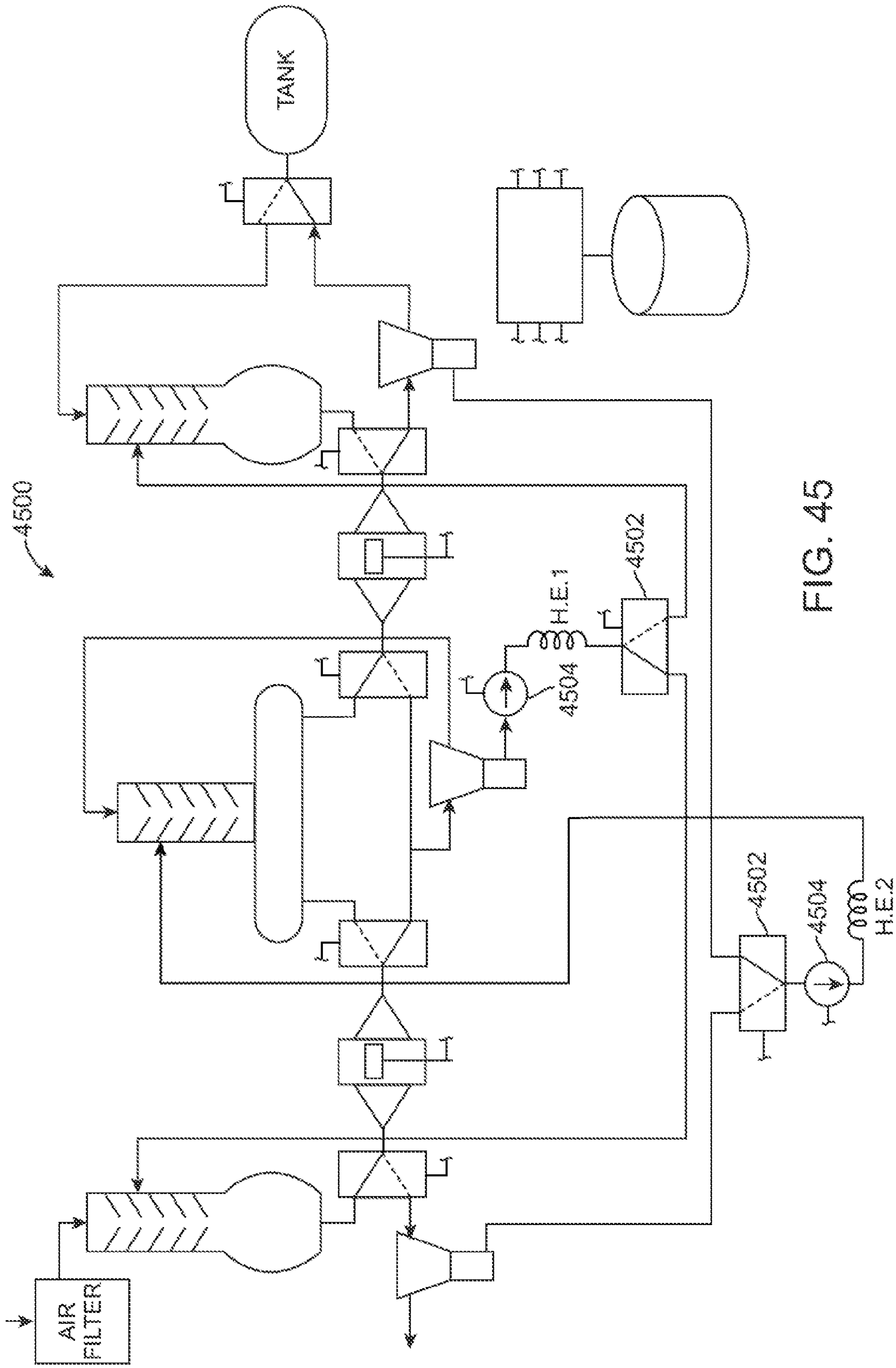
FIG. 45 is a simplified diagram showing an alternative embodiment of a multistage compressor/expander apparatus according to the present invention.

FIG. 45 is a simplified diagram showing a multi-stage apparatus in accordance with an embodiment of the present invention, which is configurable to perform both compression and expansion. In particular, system 4500 represents a modification of the embodiment of FIG. 44, to include additional three-way valves 4502 and additional conduits between certain separator elements and certain mixing chambers. Again, FIG. 45 depicts the configuration of the three-way valves as solid in the compression mode, and as dashed in the expansion mode.

While the embodiment of FIG. 45 offers some additional valve and conduit complexity, it may eliminate certain elements. In particular, it is noted that compression and expansion do not occur simultaneously, and hence all three heat exchangers and pumps of the embodiment of FIG. 44 are not required to be in use at the same time. Thus, system 4500 utilizes only two heat exchangers (H.E.1 and H.E.2) and two pumps (4504), versus the three heat exchangers and three pumps of the embodiment of FIG. 44.

Moreover, the embodiment of FIG. 45 restricts the circulation of liquids to within a stage. Thus, the flow of liquids is not such that liquids accumulate in one reservoir, and so the liquid reservoirs do not need to be made larger as in the embodiment of FIG. 44.

In summary, various embodiments according to the present invention may incorporate one or more of the following elements:

1. Use of a mixing chamber for mixing gas and liquid, upstream of a chamber in which compression and/or expansion of gas is to take place.

2. Use of a pulsation damper bottle between a mixing chamber and a chamber in which compression and/or expansion of gas is to take place.

3. Continuous generation of a gas/liquid mixture within a mixing chamber, with the gas/liquid mixture either being continuously flowed to compression/expansion chamber(s), or being flowed to a dump when not needed.

4. Near-isothermal expansion and compression of gas, with the required heat exchange effected by a liquid phase in high-surface-area contact with the gas, as created in a mixing chamber separate from that in which compression/expansion is occurring.

5. A mechanism capable of both compression and expansion of air.

6. Electronic control of valve timing so as to obtain high work output from expansion of a given volume of compressed air.

Various configurations described herein use and generate power in mechanical form, be it hydraulic pressure or the reciprocating action of a piston. In most applications, however, the requirement will be for the storage of electrical energy. In that case, a generator, along with appropriate power conditioning electronics, can be used to convert the mechanical power supplied by the system during expansion, to electrical power. Similarly, the mechanical power required by the system during compression may be supplied by a motor. Since compression and expansion are never done simultaneously by the same chamber, in certain embodiments a motor/generator may be used to perform both functions.

If the energy storage system utilizes a hydraulic motor or a hydro turbine, then the shaft of that device may connect directly or via a gearbox to the motor/generator. If the energy storage system utilizes reciprocating pistons, then a crankshaft or other mechanical linkage that can convert reciprocating motion to shaft torque, may be used.

Moreover, embodiments of the present invention do not require the use of a mixing chamber with every stage. Certain embodiments could employ a mixing chamber in only some stages, with other stages having gas introduced to the compression/expansion chamber by other than a mixing chamber, for example by injection of a mist or spray directly into the chamber in which compression/expansion is taking place.

Still other embodiments may utilize stages in which liquid is introduced into the gas by other than a spray, for example by bubbling gas through a liquid. For example, in certain embodiments some (lower-pressure) stages might employ the liquid mist technique utilizing a mixing chamber, while other (higher-pressure) stages may employ the bubbles technique to store and remove energy therefrom.

Storage and recovery of energy from compressed gas may be enhanced utilizing one or more techniques, applied alone or in combination. One technique introduces a mist of liquid droplets to a dedicated chamber positioned upstream of a second chamber in which gas compression and/or expansion is to take place. In some embodiments, uniformity of the resulting liquid-gas mixture may be enhanced by interposing a pulsation damper bottle between the dedicated mixing chamber and the second chamber, allowing continuous flow through the mixing chamber. Another technique utilizes valve configurations actuable with low energy, to control flows of gas to and from a compression and/or expansion chamber. The valve configuration utilizes inherent pressure differentials arising during system operation, to allow valve actuation with low consumption of energy.

Certain embodiments of the present invention may provide a liquid-gas mixture during the compression and/or expansion processes. An elevated heat capacity of the liquid relative to the gas, allows the liquid to receive heat from the gas during compression, and allows the liquid to transfer heat to the gas during expansion. This transfer of energy to and from the liquid may be enhanced by a large surface area of the liquid, if the liquid is introduced as a mist or a spray of droplets within the compressing or expanding air.

In general, liquid introduced to a gas compression or expansion chamber to accomplish heat exchange according to embodiments of the present invention, is not expected to undergo combustion within that chamber. Thus while the liquid being injected to perform heat exchange may be combustible (for example an oil, alcohol, kerosene, diesel, or biodiesel), in many embodiments it is not anticipated that the liquid will combust within the chamber. In at least this respect, liquid introduction according to embodiments of the present invention may differ from cases where liquids are introduced into turbines and motors for combustion.

Cost and inefficiency of variable frequency drives are another possible area of improvement. A synchronous motor generator with load control could instead be used, and on the compressor/expander, the valve pulse length and frequency may be controlled to vary the power for voltage and frequency regulation. Such an approach could trade off efficiency in exchange for increased or decreased power in real time.

According to embodiments of the present invention, energy may be imparted to a gas by compression, and/or recovered from a gas by expansion, utilizing a moveable member present within the chamber. In certain embodiments the moveable member may be in communication with other system elements (such as a motor or generator) through one or more physical linkages mechanical, hydraulic, pneumatic, magnetic, electro-magnetic, or electrostatic in nature.

In some embodiments, the moveable member may communicate exclusively through linkages of one particular type. For example, certain embodiments of the present invention may communicate energy to/from the moveable member exclusively utilizing mechanical linkages which may include a rotating shaft. Such configurations may offer enhanced efficiency by avoiding losses associated with conversion of energy between one form and another.

Certain embodiments may utilize hydraulic linkages with the moveable member.

Conditions of the liquid/gas mixture (including but not limited to droplet size, uniformity of droplet distribution, spray velocity, liquid volume fraction, temperature, and pressure) may influence the exchange of thermal energy between the gas and the liquid. While certain embodiments previously described introduce liquids utilizing a mixing chamber, this is not required by the present invention. Some embodiments may utilize liquid injection directly into a compression chamber, expansion chamber, or chamber in which expansion and compression are performed.

Figure 50A:
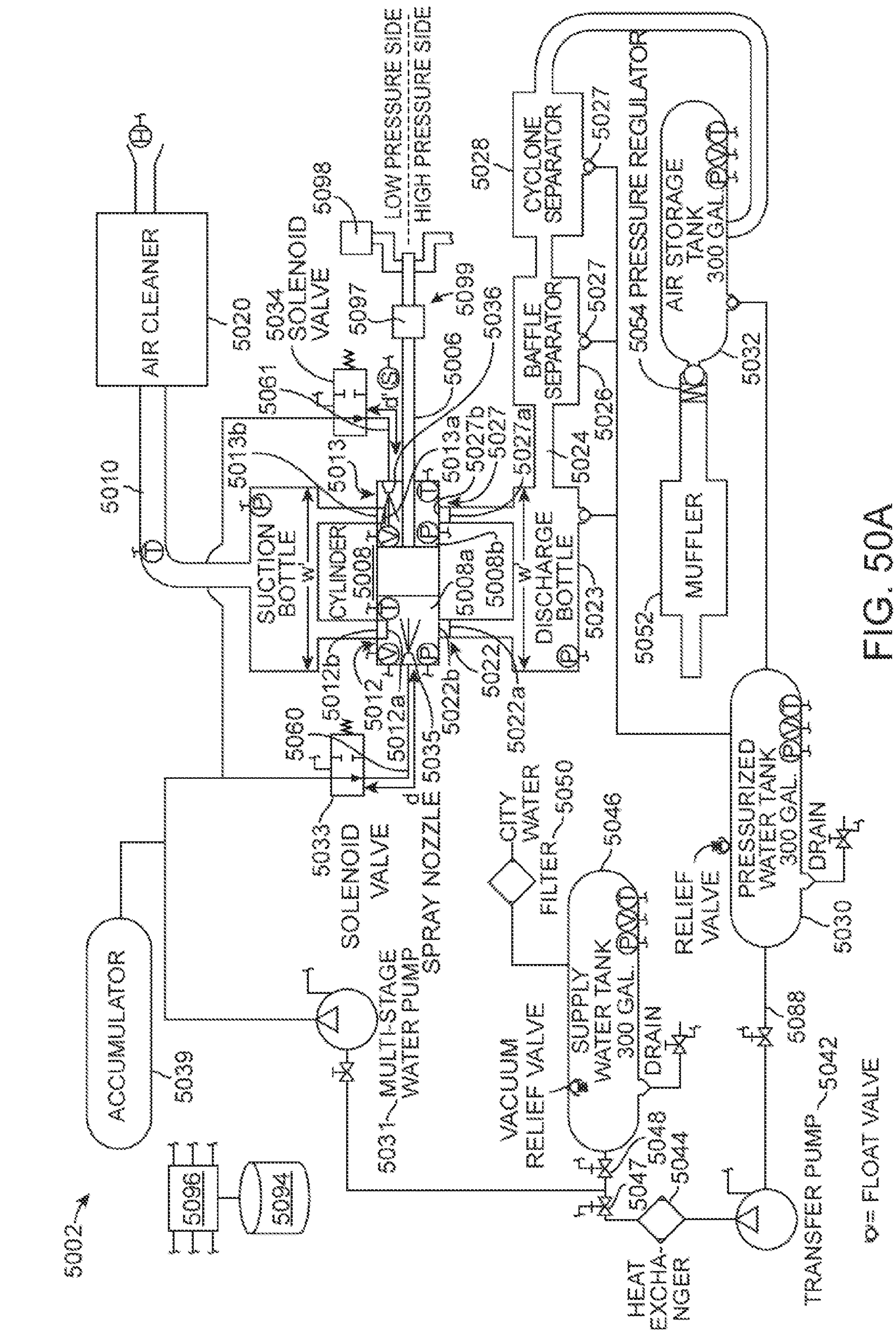
FIG. 50A is a simplified schematic view of an compressed gas energy storage system employing liquid injection according to an embodiment of the present invention.

For example, FIG. 50A shows a simplified schematic diagram of one possible embodiment of an energy storage apparatus according to the present invention, which may utilize compressed air as the gas, and water as the injected liquid. FIG. 50A shows system 5002 comprising moveable member 5006 (here a reciprocating solid piston comprising a piston head and piston rod) disposed within cylinder 5008 having compression chambers 5018*a* and 5018*b*.

In certain embodiments (not limited to that particularly shown in FIG. 50A), the piston may be of a cross-head 5097 design. Such embodiments may provide additional benefit by further isolating the water of the expansion/compression cylinder from the oil or other liquid likely present in a crankcase.

The moveable member may be in selective physical communication with a motor, generator, or motor/generator 5098 through one or more linkages 5099. These linkages may be mechanical, hydraulic, or pneumatic in nature.

In certain embodiments the piston may be a free piston. Such a free piston could communicate energy through a physical linkage such as a magnetic or electromagnetic linkage.

In certain embodiments the piston may comprise a piston head and a piston rod that is coupled to a linkage. This linkage could comprise circular gears, and/or gears having another shape (such as elliptical). In certain embodiments the teeth of one or more gears could have a straight, beveled, or helical shape, with the latter possibly providing a thrust bearing. In certain embodiments worm gears could be used.

A wide variety of mechanical linkages are possible. Examples include but are not limited to multi-node gearing systems such as planetary gear systems. Examples of mechanical linkages include shafts such as crankshafts, chains, belts, driver-follower linkages, pivot linkages, Peaucellier-Lipkin linkages, Sarrus linkages, Scott Russel linkages, Chebyshev linkages, Hoekins linkages, swashplate or wobble plate linkages, bent axis linkages, Watts linkages, track follower linkages, and cam linkages. Cam linkages may employ cams of different shapes, including but not limited to sinusoidal and other shapes. Various types of mechanical linkages are described in Jones in "Ingenious Mechanisms for Designers and Inventors, Vols. I and II", The Industrial Press (New York 1935), which is hereby incorporated by reference in its entirety herein for all purposes.

While the particular embodiment shown in FIG. 50A utilizes a piston that is disposed to move horizontally, the present invention is not limited to such a design. Alternative embodiments could employ pistons or other types of members that are disposed to move in other directions (for example vertically, diagonally), For example, in certain embodiments, it may be useful to have the piston be configured to reciprocate in the vertical direction, with the compression and/or expansion chamber located below. An example of this type of configuration has already been shown in FIG. 6, although such embodiments do not require bubbling and liquid introduction by spraying could alternatively be used. This type of configuration could help to avoid liquid from leaking out of the chamber through the packing under the force of gravity, and undesirably entering a crankcase or other space.

Particular embodiments of the present invention may include one or more stages having a moveable member that moves in other than a linear manner. For example, members of certain apparatuses such as screws, quasi-turbines, gerotors, and other structures, are configured to move in a rotational manner.

Various types of structures that may be useful for the compression and/or expansion of gas are disclosed by Charles Fayette Taylor in "The Internal Combustion Engine in Theory and Practice, Vols. 1 and 2", 2nd Ed., Revised, The MIT Press (1985), which is incorporated by reference in its entirety herein for all purposes.

Certain embodiments in accordance with the present invention may utilize tuned intake and exhaust ports. Specifically, the inlet manifold, conduits, valves, and cylinder (or cylinders) in general form a complex resonant system. The gas to be compressed or expanded moves through this resonant system, reflecting off of walls whenever there is a change in the cross-sectional area, and compressing and reflecting off of the gas trapped in closed cavities. An example of such a closed cavity is a conduit with a closed valve at the far end.

The inertia of the gas and these reflections generate compression and expansion waves. Analyzed using the techniques of computational fluid dynamics (CFD), it is possible to tune the geometry of the intake system so as to time the arrival of the compression waves to coincide with the closing of the intake valve or valves. This may be done, for example, by adjusting the length of the pipe leading to the cylinder.

Figure 135A:
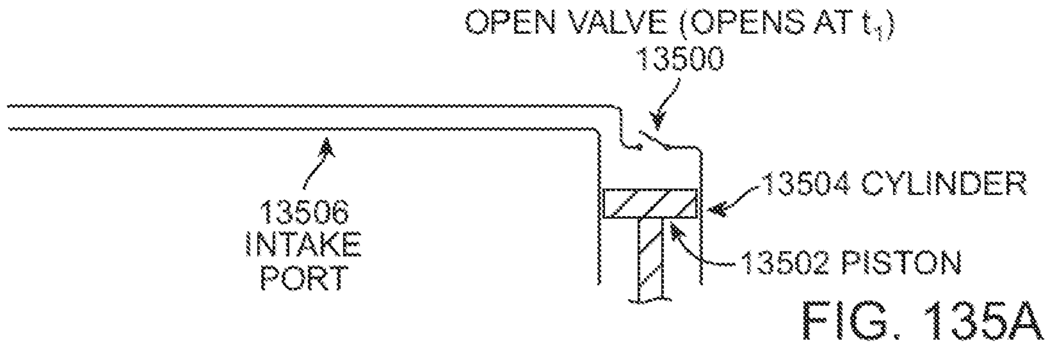
Figure 135B:
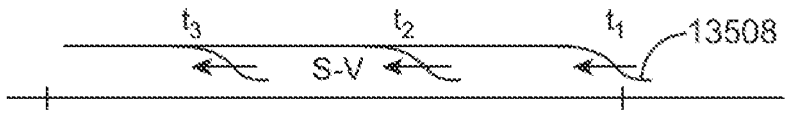

For example, as shown in FIG. 135A, shortly after the inlet valve 13500 opens at TDC of a piston 13502 moveable within a cylinder 13504, the pressure drops relative to the intake port 13506. As shown in FIG. 135B, this generates an expansion wave 13508 that moves away from the valve and down the pipe.

The expansion wave travels at a speed of (s−v), where s is the speed of sound and v is the velocity of the fluid. The fluid may be a mixture of gas and liquid droplets.

Figure 135C:
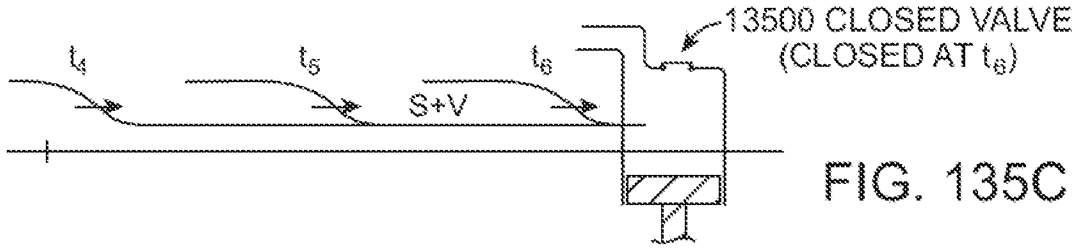

As shown in FIG. 135C, the wave is reflected by the opening at the far end of the pipe. The wave then travels back towards the valve as a compression wave at speed (s+v).

The arriving compression wave will help to fill the cylinder. If the pipe length is L, the total round-trip travel time for the wave is:

$$\Delta t_1 + \Delta t_2 = \frac{2sL}{s^2 - v^2}$$

To maximize the beneficial effect, this travel time may be about the same time the valve is open during a crank revolution ($\theta/2\pi N$), where $\theta$ is the open angle and N is the rotational speed. For this to be the case:

$$L = \frac{\theta(s^2 - v^2)}{4\pi aN}$$

Figure 135D:
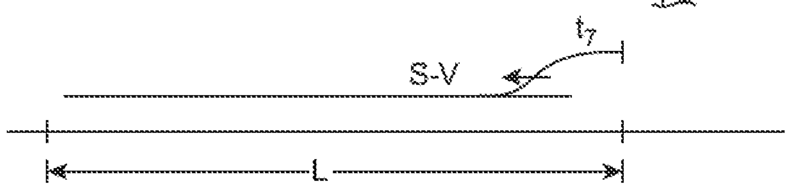

Thus as shown in FIG. 135D, L is the pipe length that maximizes air flow into the cylinder.

Figure 135E:
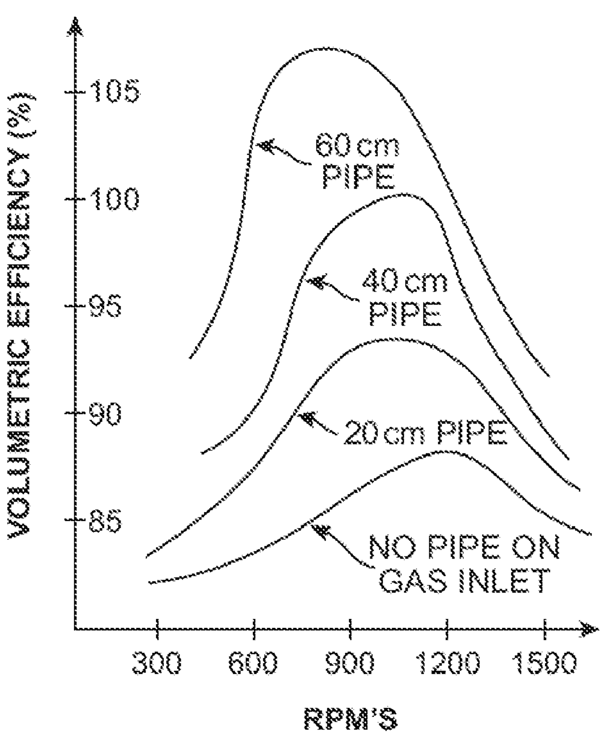

FIG. 135E shows the effect of varying the intake port length on the volumetric efficiency (that is, the amount of gas that can be drawn through a valve) for a typical cylinder design at different rotation speeds. The optimal pipe length is a function of rotational speed, among other variables.

The tuning just described may have the effect of pumping additional gas into the cylinder, improving volumetric efficiency. Similarly, adjusting the geometry of the exhaust system can aid in exhausting gas from the cylinder more completely, likewise improving volumetric efficiency. An analysis of these effects may be found in John L. Lumley, Engines, An Introduction, Cambridge University Press, Cambridge (1999), which is incorporated by reference in its entirety herein for all purposes.

The optimal intake and exhaust system geometry can depend on engine speed. An efficiency advantage may ensue if the mechanism is run at the particular speed that optimizes the performance of the design.

The above description has focused in large part upon use of compression/expansion apparatuses involving liquid injection. However, tuning approaches of the present invention are not limited to such devices. According to alternative embodiments, intake and/or exhaust system geometries may be tuned to use the sonic energy in the flow to improve volumetric efficiency in a variety of types of gas compressors and gas expanders.

Returning now to the particular embodiment shown in FIG. 50A, on a low pressure side the compression chamber 5018*a* is in selective fluid communication with outside air through air cleaner 5020, low pressure side conduit 5010, suction bottle 5011, and valve 5012. Valve 5012 comprises valve plate 5012*a* moveable relative to valve seat 5012*b* to open or close the valve. In certain embodiments the valve may be actuated by a solenoid or other controllable actuator, such as a hydraulic or pneumatic piston or electric motor. Compression chamber 5018*b* is similarly in selective fluid communication with the outside air through the air cleaner, the low pressure side conduit, the suction bottle, and a valve 5013 comprising a valve plate 5013*a* moveable relative to a valve seat 5013*b*.

On a high pressure side, compression chamber 5018*a* is in selective fluid communication with a compressed gas storage tank 5032 through valve 5022, discharge bottle 5023, high pressure side conduit 5024, baffle separator 5026, and cyclone separator 5028, respectively. Valve 5022 comprises valve plate 5022*a* moveable relative to valve seat 5022*b* to open or close the valve.

The valves of various embodiments of the present invention may be actuated by a solenoid. Various types of valve actuation are possible, including but not limited to cam-driven actuation, piezoelectric actuation, hydraulic actuation, electronic actuation, magnetic actuation, pneumatic actuation, and others. Depending upon the particular embodiment, valve actuation may be driven according to variable timing, or may be driven according to fixed timing.

While the above embodiment is described as utilizing gas flow valves in the form of plate valves, this is not required. The present invention is not limited to apparatuses utilizing any particular gas valve type, and other gas valve types may be suited for use in various embodiments. Examples of valves according to embodiments of the present invention include but are not limited to pilot valves, rotary valves, cam operated poppet valves, and hydraulically, pneumatically, or electrically actuated valves.

In certain embodiments, valves and other components may be fabricated utilizing materials which will enhance their performance. For example, certain embodiments of valves may bear a hydrophobic coating, such as TEFLON, on one or more surfaces. In some embodiments, the hydrophobic coating may include a texture to further impart a super-hydrophobic character.

Other types of coatings can be used. Certain types of coatings can inhibit corrosion and wear. One example of a possible type of coating is diamond-like carbon (DLC). Nickel/polymer coatings could also be used.

Figure 84:
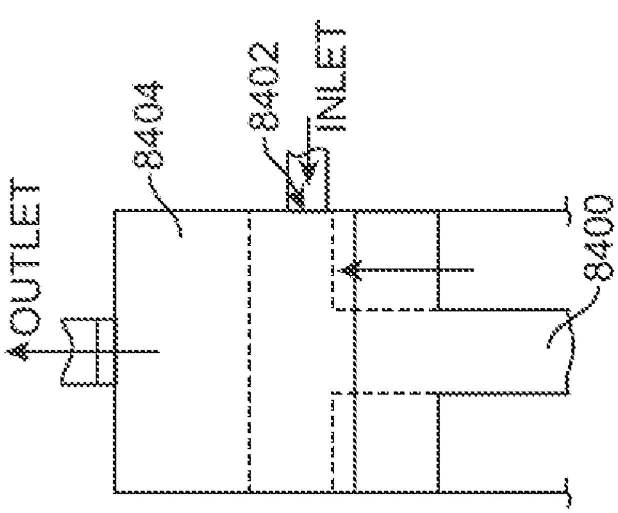

In certain embodiments, the function of one or more gas or liquid flow valves may be performed by the moveable member itself. For example as shown in FIG. 84 described elsewhere in this document, in certain embodiments movement of the piston head may selectively obstruct a port to the chamber, thereby effectively serving as a valve.

Compression chamber 5008*b* is similarly in selective fluid communication with the air storage tank through valve 5027, the high pressure side conduit, the baffle separator, and the cyclone separator, respectively. Valve 5027 comprises a valve plate 5027*a* moveable relative to a valve seat 5027*b*, in certain embodiments by a solenoid.

The compressed gas storage tank 5032 is in fluid communication with a muffler 5052 through a pressure regulator 5054. The air storage tank 5032 is also in liquid communication with a pressurized water tank 5030 of the liquid circulation system through a float valve.

A variety of types of compressed gas storage units may be suitable for use in different embodiments of the present invention. For example, in certain embodiments a compressed gas storage unit may comprise enclosed volumes having a high capacity, for example man-made structures such as abandoned mines, or oil or natural gas fields. High volumes of compressed gas may also be stored in naturally-occurring geological formations such as caverns, salt domes, or other porous features.

Other suitable compressed gas storage units may include vessels specially constructed for this purpose. In certain embodiments the gas may be stored in one or more steel tanks (which may be selectively connected with each other) having a length of about 1.6 meters and which are capable of storing air at 200 atmospheres and equipped with a valve. Some embodiments may utilize larger steel tank(s) having a length of about 16 meters long, which could reduce a cost of spinning the tank closed and to a neck, and could also reduce the cost of the valves.

Embodiments of the present invention may utilize a compressed gas storage unit made out of other than a simple metal material such as steel. For example, as been previously described above, certain embodiments of a compressed gas storage unit may have a special shape and/or comprise a composite material including carbon fiber or other materials.

In certain embodiments, the gas storage unit may be constructed of a composite material consisting of one or more layers of high tensile-strength wire or fiber, this wire or fiber being made of metal or natural or synthetic material and wrapped in a helical manner around an impermeable liner and secured in place by a matrix material. The advantage of using high tensile-strength drawn wire is that it is much stronger in tension than the equivalent weight of the same alloy in bulk form, so less material may be used, reducing cost.

In certain embodiments, a compressed gas storage unit may be in thermal communication with an energy source. For example, in certain embodiments the storage unit may comprise a tank in thermal communication with the sun. The tank could be coated with a thermal-absorbing material (for example black paint). In certain embodiments the storage unit could be positioned behind a transparent barrier (such as glass), such that infra-red (IR) solar energy is trapped and further promotes thermal communication.

Operation of the system of FIG. 50A is similar to that described in many of the figures shown above. The moveable member 5006 moves in a reciprocating manner within the cylinder. Movement of the member 5006 to the right side corresponding to Bottom Dead Center (BDC) of chamber 5018*a*, results in a pressure differential arising between chamber 5008*a* and the suction bottle of the low pressure side. This pressure differential biases valve plate 5012*a* away from valve seat 5012*b*, allowing valve 5012 to open and admit uncompressed air into the chamber 5018*a*. This pressure differential between chamber 5018*a* and discharge bottle also biases valve plate 5022*a* toward valve seat 5022*b*, closing valve 5022 to allow the admitted uncompressed air to accumulate in the chamber 5018*a*.

The same motion of the moveable member (toward BDC) of chamber 5018*a*, which is TDC of chamber 5018*b*) in this stroke, also creates a pressure differential between the chamber 5018*b* and the suction bottle. Specifically, air admitted into the chamber 5018*b* during the previous stroke is compressed, thereby biasing valve plate 5013*a* toward valve seat 5013*b* and closing valve 5013.

The pressure differential between chamber 5018*b* and the discharge bottle maintains valve 5027 in the closed state. However, as the moveable member continues to move toward BDC, the pressure within chamber 5018*b* rises. When this pressure within chamber 5018*b* reaches that of the discharge bottle on the high pressure side, valve plate 5027*a* ceases to be biased toward valve seat 5027*b*, and the valve 5027 is opened, allowing the compressed gas to move out to the discharge bottle and ultimately to the storage unit through the conduit and the baffle and cyclone separators.

In the following stroke of the moveable member 5006 toward the left, which is Top Dead Center (TDC) of chamber 5018*a* and BDC of chamber 5018*b*, the compression chambers 5018*a* and 5018*b* switch roles. That is, uncompressed gas is admitted into chamber 5018*b* through open valve 5013, while uncompressed gas previously admitted to chamber 5018*a* is compressed by the moveable member until it reaches high pressure and flows out through valve 5022 actuated by a slight pressure differential over the high pressure side.

As shown in FIG. 50A, a suction bottle positioned on the low pressure side upstream of the inlet valves to the compression chambers, and a discharge bottle is positioned on the high pressure side downstream of the outlet valves of the compression chambers. The volumes of these bottles are significantly larger than the volumes of each of the compression chambers, and in general at least 10× the volume of those compression chambers.

The bottles exhibit a width dimension (w, w') that is different from that of their inlets and outlets. The dimensional difference creates a succession of impedance mismatches for any acoustic waves attempting to travel from the valves of the compression chamber to the rest of the system, thereby disrupting unwanted changes in pressure. By imposing the suction bottle and the discharge bottle between the gas valves and the other elements of the system, embodiments according to the present invention can suppress these pulsations.

During compression, gas within the chamber experiences an increase in temperature. To allow this compression to proceed in a thermodynamically efficient manner, embodiments of the present invention create a liquid-gas mixture by directly spraying droplets of liquid (here water) into the chamber. The liquid component of the liquid-gas mixture absorbs thermal energy from the gas under compression, thereby reducing the magnitude of any temperature increase.

Accordingly, FIG. 50A also shows a liquid circulation system that is configured to flow liquid for injection into the chambers for exchange of heat with the gas undergoing the compression process. In particular, this liquid circulation system comprises a pressurized water tank 5030 in fluid communication with the compression chambers through a conduit 5088, transfer pump 5042, heat exchanger 5044, valve 5047, a multi-stage water pump 5031, valves 5033 and 5034, and respective spray nozzles 5035 and 5036. An accumulator 5039 is in fluid communication with the liquid circulation system to absorb pulsations of energy arising therein.

Valves 5033 and 5034 are actuable to allow water to flow through the spray nozzles 5035 and 5036 into the respective compression chambers 5018*a* and 5018*b* at select times. In certain embodiments, the valves may be configured to be opened to flow liquid into the compression chambers at the same time that air is being admitted. In such embodiments, direct liquid injection coincident with inlet air flow, may promote mixing of the water droplets within the air, enhancing the effectiveness of the desired heat exchange.

In certain embodiments, the valves 5033 and 5034 may be configured to be opened to flow liquid into the compression chambers only once the air has already been admitted and the respective gas inlet valve has been closed. In such embodiments, direct liquid injection into the closed chamber may serve to compress the air in addition to performing heat exchange.

In certain embodiments, the valves 5033 and 5034 may be configured to be opened during movement of the member within the closed chamber to compress the gas. As is discussed below, in certain embodiments liquid injection into gas undergoing compression, may take place utilizing more than one subsystem of sprayers having different characteristics.

In some embodiments, actuation of the valves 5033 and 5034 may allow a flow of liquid to the chamber over multiple periods of a compression cycle. For example, the valves may be actuated both during and after air inlet but prior to compression, or may be actuated after air inlet and during compression, or may be actuated during air inlet and during compression.

As just indicated, in certain embodiments the liquid may not be continuously introduced into the compression chamber. Moreover, during periods when liquid is not being introduced, the compression chamber may experience changing pressures as the member moves within the chamber, and/or compressed gas flows from the chamber.

Accordingly, the valves 5033 and 5034 in FIG. 50A can serve to isolate the sprayers from other components of the liquid circulation system during such periods of non-injection. This isolation helps to prevent changes in liquid pressure (such as transient back pressures), that could adversely affect the flows of liquid through the system. In embodiments where liquid is being introduced in a continuous manner, the liquid flow valves may not be needed.

The liquid circulation system may include other features that are designed to avoid the effects of pressure changes within the liquid. For example during system operation the circulating water is injected into the gas to create a liquid-gas mixture that undergoes compression to a higher pressure. Liquid is then removed from this high pressure liquid-gas mixture by the separators.

As a result of the compression process, however, some amount of gas may be dissolved in the liquid. Then, as the separated liquid flowed through the liquid circulating system encounters the inlet gas at low pressure, this dissolved gas may come out of solution (outgas).

Such outgassing can create unwanted bubbles in various portions of the liquid circulation system, most notably in the valves 5033 and 5034, spray nozzles 5035 and 5036, and/or the respective conduits 5060 and 5061 between those elements. The presence of such bubbles in these locations of the liquid circulation system could interfere with the predictability and/or reliability of the controlled flows of liquid into the compression chambers.

Accordingly, certain embodiments of the present invention may seek to make as short as possible, the lengths (d, d') of the conduits between the liquid flow valves and the spray nozzles that are exposed to the low pressure. Such minimization of distance can effectively reduce the opportunity for outgassing from the pressurized liquid, thereby desirably avoiding bubble formation.

In the particular embodiment of FIG. 50A, the liquid flow valves 5033 and 5034 are shown as being selectively actuated by a solenoid. However, the present invention is not limited to using any particular type of valve for liquid injection. Examples of valves which may be suitable for liquid injection according to embodiments of the present invention include, but are not limited to, solenoid-actuated valves, spool valves, gate valves, cylindrical valves, needle valves, or poppet valves.

One example of an alternative valve design which may be suitable for use in the present invention, is a voice coil-actuated valve that includes a servo loop. Use of such a valve structure may be advantageous to control the velocity profile of actuation, for example reducing velocity at the end of plate travel prior to a stop, thereby relieving stress on valve components.

Other approaches to valve dampening are possible. For example, certain embodiments could use air cushions, dimples, cylindrical holes, and or other geometries of depression in the valve body or valve seat, with corresponding raised areas on the opposite member, to create air springs that absorb some of the energy of the motion of the movable component of the valve as it approaches the valve seat.

According to other embodiments the valves may be pneumatically actuated, an example being a proportional pneumatic air valve. In still other embodiments, the valves may be hydraulically actuated, for example a high pressure hydraulic valve In certain embodiments, it may be desirable to create a mixture having liquid droplets of a particular size. In some embodiments, formation of such a mixture may be facilitated by the inclusion of a surfactant in the liquid. One example of a surfactant which may be used is octylphenoxypolyethoxyethanol and known as Triton X-100.

After compression, the liquid-gas mixture is flowed through the respective outlet valves 5022 and 5027 to the discharge bottle 5023, the high pressure side conduit 5024, and the separators 5026, 5028 where liquid is removed. The baffle separator structure 5026 employs a first structure designed to initially remove bulk amounts of liquid from the flowed gas-liquid mixture. An example of such a structure is a chamber having a series of overlapping plates or baffles defining a serpentine path for the flowed mixture, and offering a large surface area for water coalescence.

In the specific embodiment of FIG. 50A, the initial baffle separator structure is followed in series by the second separator structure 5028 (here a cyclone separator), that is designed to remove smaller amounts of liquid from the mixture. Embodiments of the present invention are not limited to this or any particular type of separator or separator configuration. Examples of separators which may potentially be used, include but are not limited to, cyclone separators, centrifugal separators, gravity separators, and demister separators (utilizing a mesh type coalescer, a vane pack, or another structure). Various separator designs are described in M. Stewart and K. Arnold, Gas-Liquid and Liquid-Liquid Separators, Gulf Professional Publishing (2008), which is incorporated by reference in its entirety herein for all purposes.

Liquid removed from the mixture by the separators 5026 and 5028, is returned via respective float valves 5027 and conduits to the pressurized water tank 5030, which includes a pressure relief valve and a drain valve. From the pressurized water tank, the liquid is recirculated utilizing transfer pump 5042 through heat exchanger 5044 for cooling, and then by multi-stage water pump 5031 for reinjection into the compression chambers.

The liquid circulation system of FIG. 50A is also in selective fluid communication with a water supply tank 5046 through valve 5048. This tank receives unpressurized water through a filter 5050 from a base water supply (such as a municipal water supply). Water from this supply tank may be selectively flowed through valve 5048 to initially charge, or to replenish, the water of the circulation system. Water supply tank 5046 also includes a vacuum relief valve and a drain valve.

In the particular embodiment of FIG. 50A, the sprayers are arranged on opposing end walls of the cylinder that do not also include the gas flow valves. The sprayers may comprise an arrangement of one or more orifices or nozzles that create liquid droplets, jets, or sheets, and facilitate exchange of thermal energy with gas inside the chamber. These nozzles or orifices may be in liquid communication with a common manifold.

The present invention is not limited to the introduction of liquid into the chamber through any particular type of sprayer. Some examples of possible nozzle structures which may be suited for use in accordance with embodiments of the present invention are described in the following U.S. patents, each of which is incorporated by reference herein for all purposes: U.S. Pat. No. 3,659,787; U.S. Pat. No. 4,905,911; U.S. Pat. No. 2,745,701, U.S. Pat. No. 2,284,443; U.S. Pat. No. 4,097,000; and U.S. Pat. No. 3,858,812.

One type of spray structure which may be utilized to introduce liquid according to embodiments of the present invention, is an impingement sprayer. An example of such an impingement sprayer structure is the PJ Misting Nozzle available from BETE Fog Nozzle, Inc., of Greenfield, Mass. In certain embodiments, a liquid sprayer may use energy in addition to liquid flow, for example sonic energy, in order to form droplets having the desired characteristics.

Still other types of spray structures are known. Examples of spray structures which may be suited for use in accordance with embodiments of the present invention, include but are not limited to rotating disk atomizers, electrostatic atomizers, pressure swirl nozzles, fan jet nozzles, impact nozzles, and rotating cup atomizers.

In certain embodiments, a plurality of sprayers may be configured to interact with one another to produce a spray having the desired character. For example, the spray of one nozzle may fill a vacant portion of an adjacent nozzle. The following patents and published patent applications describing various configurations of sprayers, are incorporated by reference in their entireties herein for all purposes: U.S. Pat. No. 6,206,660; U.S. Patent Publication No. 2004/0244580; and U.S. Patent Publication No. 2003/0180155.

Embodiments according to the present invention are not limited to the use of sprayers to introduce liquids into gases. According to alternative embodiments, one or more stages of a compressed gas energy storage apparatus according to the present invention could introduce liquids through the use of bubblers, as has previously been described in connection with FIG. 6.

At high pressures, the volume fraction of liquid to achieve a high mass fraction of liquid, may be so large that a liquid droplet—gas aerosol may be difficult to sustain. Instead, the volume fraction may turn into "slug flow" or "annular flow".

Such slug flow or annular flow may be undesirable in that it does not permit rapid heat transfer. In addition, such slug flow or annular flow may cause mechanical problems or degradation of valve performance.

Introducing gas into the liquid in bubble form, however, supports a high surface area of contact between gas and liquid without leading to non-uniform flows. Certain embodiments may utilize a sparger pattern that creates a convection-like flow within the liquid. Such flow may increase the rate of heat transfer between the gas in the bubbles and the liquid, by distributing the bubbles more uniformly in the cylinder.

The apparatus of FIG. 50A further includes a controller/processor 5096 in electronic communication with a computer-readable storage device 5094, which may be of any design, including but not limited to those based on semiconductor principles, or magnetic or optical storage principles. Controller/processor 5096 is shown as being in electronic communication with a universe of active elements in the system, including but not limited to valves, pumps, sprayers, and sensors. Specific examples of sensors utilized by the system include but are not limited to pressure sensors (P), temperature sensors (T), volume sensors (V), a humidity sensor (H) located at the inlet of the system, and other sensors (S) which may indicate the state of a moveable component such as a valve or piston, or another parameter of the system.

As described in detail below, based upon input received from one or more system elements, and also possibly values calculated from those inputs, controller/processor 96 may dynamically control operation of the system to achieve one or more objectives, including but not limited to maximized or controlled efficiency of compression, controlled consumption of power to store energy in the form of compressed gas; an expected input speed of the moveable member that is performing compression; a maximum input speed of a rotating shaft in communication with the moveable member; a maximum input torque of a rotating shaft in communication with the moveable member; a minimum input speed of a rotating shaft in communication with the moveable member; a minimum input torque of a rotating shaft in communication with the moveable member; or a maximum expected temperature increase of water at different stages of a multi-stage apparatus (discussed below); or a maximum expected temperature increase of air at different stages of a multi-stage apparatus.

Code that is present on the computer-readable storage medium may be configured to direct the controller or processor to cause the system to perform in various modes of operation. For example, while FIG. 50A shows an apparatus that is configured to operate as a dedicated compressor, this is not required by the present invention. Alternative embodiments could be configurable to function as dedicated expanders, converting the energy stored in the compressed gas, into power to perform useful work (for example electrical power output onto a power grid).

Figure 50B:
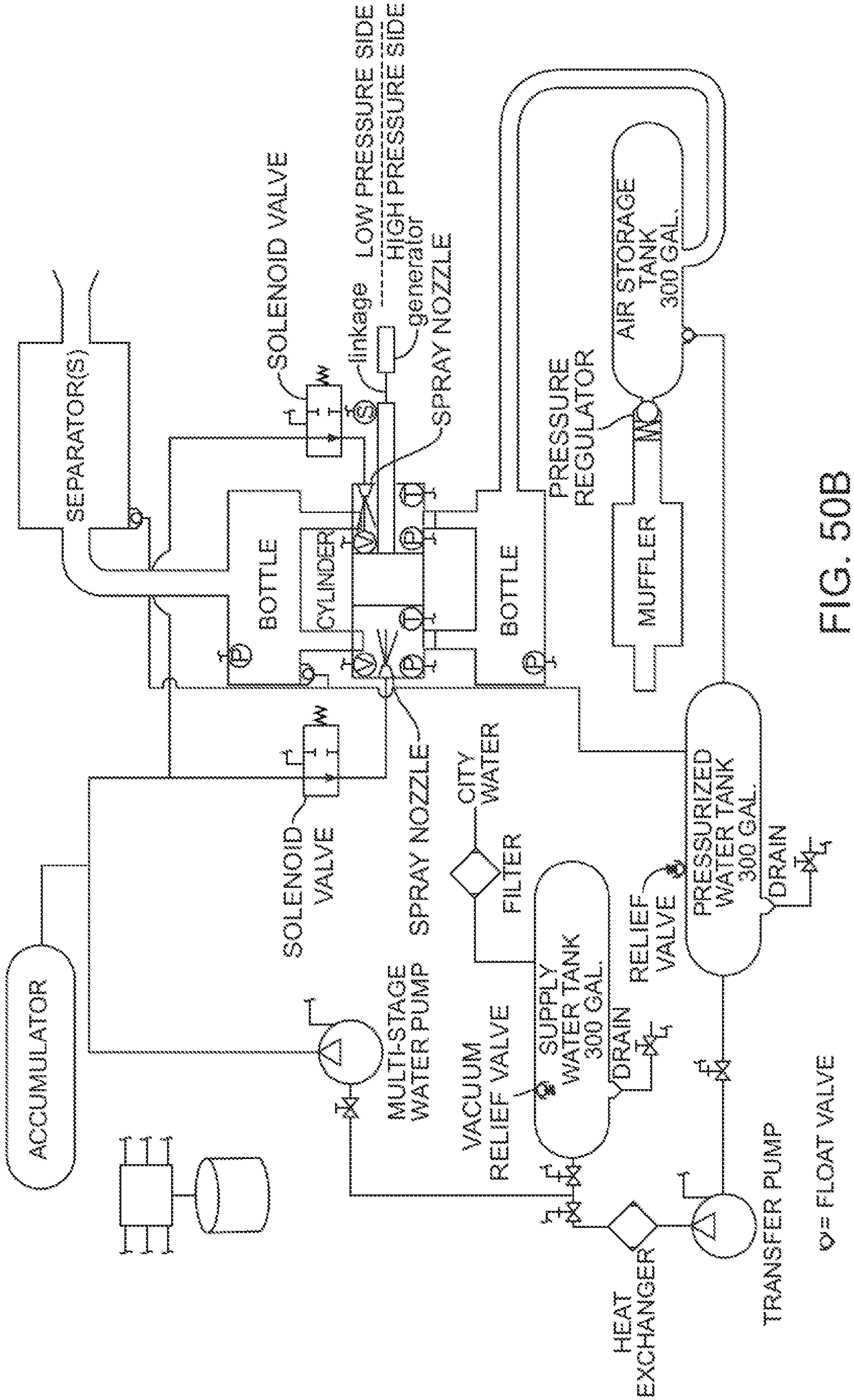
FIG. 50B is a simplified schematic view of an compressed gas energy recovery system employing liquid injection according to an embodiment of the present invention.

FIG. 50B shows a simplified view of such an embodiment of a dedicated expander. The embodiment of FIG. 50B operates along similar principles as that of FIG. 50A, except that chambers serve to receive compressed air from the storage tank on the high pressure side. The piston rod moves in response to gas expanding within the chamber. Liquid injected into the chambers serves to transfer heat to expanding air, reducing an amount of a temperature decrease. The liquid separators (depicted here as a single unit for ease of illustration) are positioned on the low pressure side to remove the liquid for recirculation, and then the expanded air is flowed out of the system.

Figure 51:
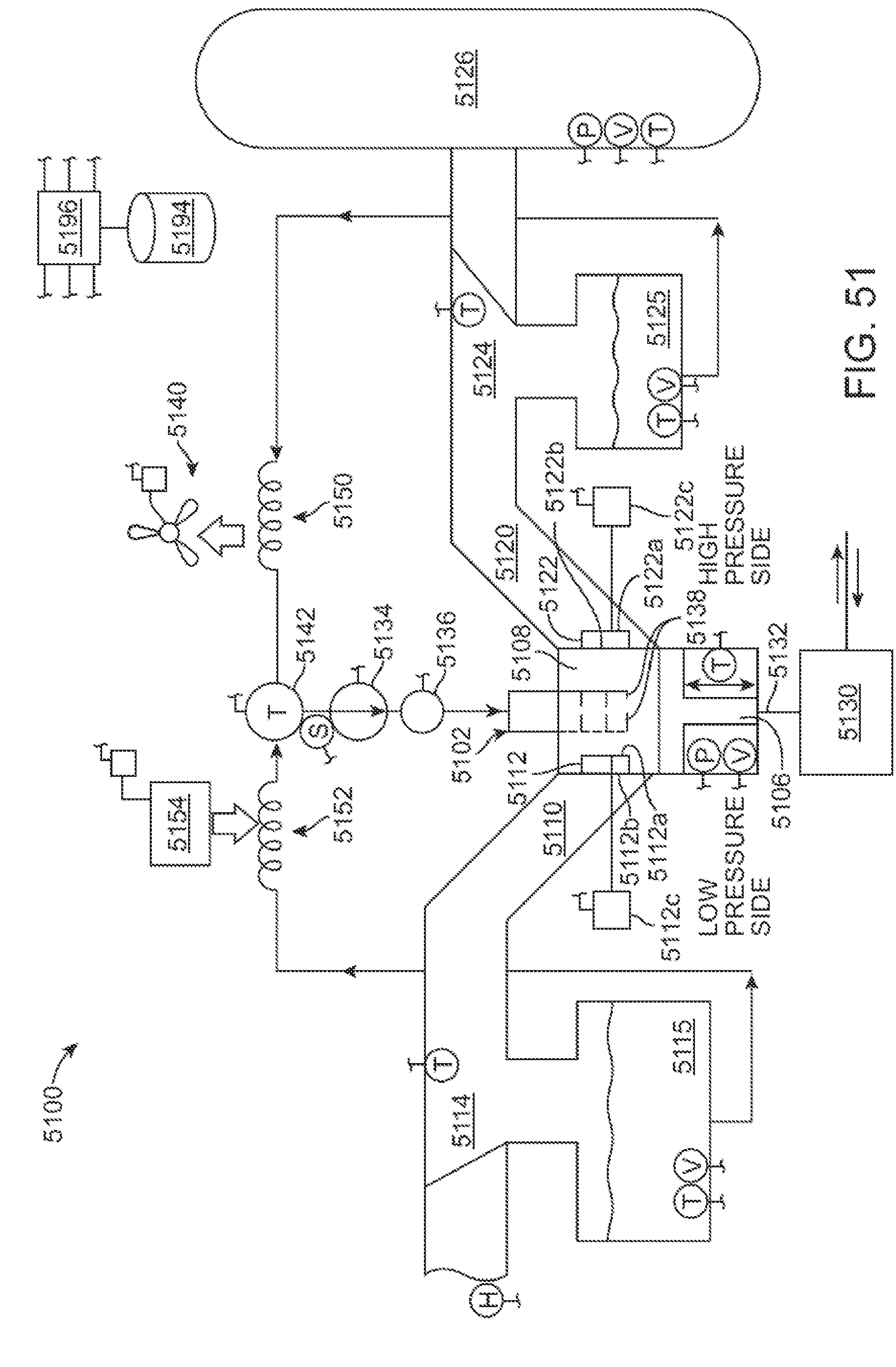
FIG. 51 is a simplified schematic view of an compressed gas energy storage and recovery system employing liquid injection according to an embodiment of the present invention.

FIG. 51 shows a simplified schematic view of an alternative embodiment of an apparatus 500 for use in a compressed gas storage system according to the present invention. This alternative embodiment is configurable to perform compression or expansion.

Specifically, in one mode of operation the apparatus consumes power to store energy in the form of compressed gas. Compressor/expander 5102 receives energy through linkage 5132 from motor/generator 5130, which drives movement of member 5106 to compress gas that has been admitted to chamber 5108 from low pressure side conduit 5110 through valve 5112.

During compression, gas within the chamber experiences an increase in temperature. To allow this compression to proceed in a thermodynamically efficient manner, embodiments of the present invention create a liquid-gas mixture by spraying liquid droplets into the chamber. The liquid component of the liquid-gas mixture receives thermal energy from the gas under compression, thereby reducing the magnitude of any temperature increase.

Compressed gas is then flowed through valve 5122 to the high pressure side conduit 5120 and separator element 5124 (which may comprise multiple separators) to storage unit 5126. Liquid removed from the mixture is contained in reservoir 5125, from where it can be cooled by exposure through heat exchanger 5150 to heat sink 5140, and then flowed by pump 5134 for re-injection into the chamber containing additional gas for compression.

In another mode of operation of the system 5100, energy is recovered by expansion of the compressed gas. Compressor/expander 5102 receives compressed gas from storage unit 5126 through high pressure side conduit 5120 and valve 5122, and allows the compressed gas to expand in the chamber 5108 to cause motion of the moveable member 5106. The expanded air is flowed through valve 5112 and low pressure side conduit 5110 as exhaust. Motor/generator 5130 operates as a generator, receiving energy from the motion of the moveable member, and outputting electrical power.

During expansion, gas within the chamber experiences a decrease in temperature. To allow this expansion to proceed in a thermodynamically efficient manner, embodiments of the present invention create a liquid-gas mixture by spraying liquid droplets into the chamber. The liquid component of the liquid-gas mixture transfers thermal energy to the gas under expansion, thereby reducing the magnitude of any temperature decrease.

After expansion, the liquid-gas mixture is flowed through valve 5112 and low pressure side conduit 5110 to liquid separator 5114. Liquid removed from the mixture is contained in reservoir 5115, from where it can be heated by exposure through heat exchanger 5152 to heat source 5154, and then flowed by pump 5134 for re-injection into the chamber containing additional compressed gas for expansion.

While the particular embodiment of FIG. 51 shows a cylinder housing a single piston acting in the vertical direction and accessed via a valve assembly comprising two valves, the present invention is not limited to this particular configuration. Embodiments according to the present invention may utilize other configurations, for example a double acting piston moveable in the horizontal direction and housed within a valve and cylinder assembly comprising four valves, as has been previously described in detail.

As described in detail above, embodiments of systems and methods for storing and recovering energy according to the present invention are particularly suited for implementation in conjunction with a host computer including a processor and a computer-readable storage medium. Such a processor and computer-readable storage medium may be embedded in the apparatus, and/or may be controlled or monitored through external input/output devices.

Figure 52:
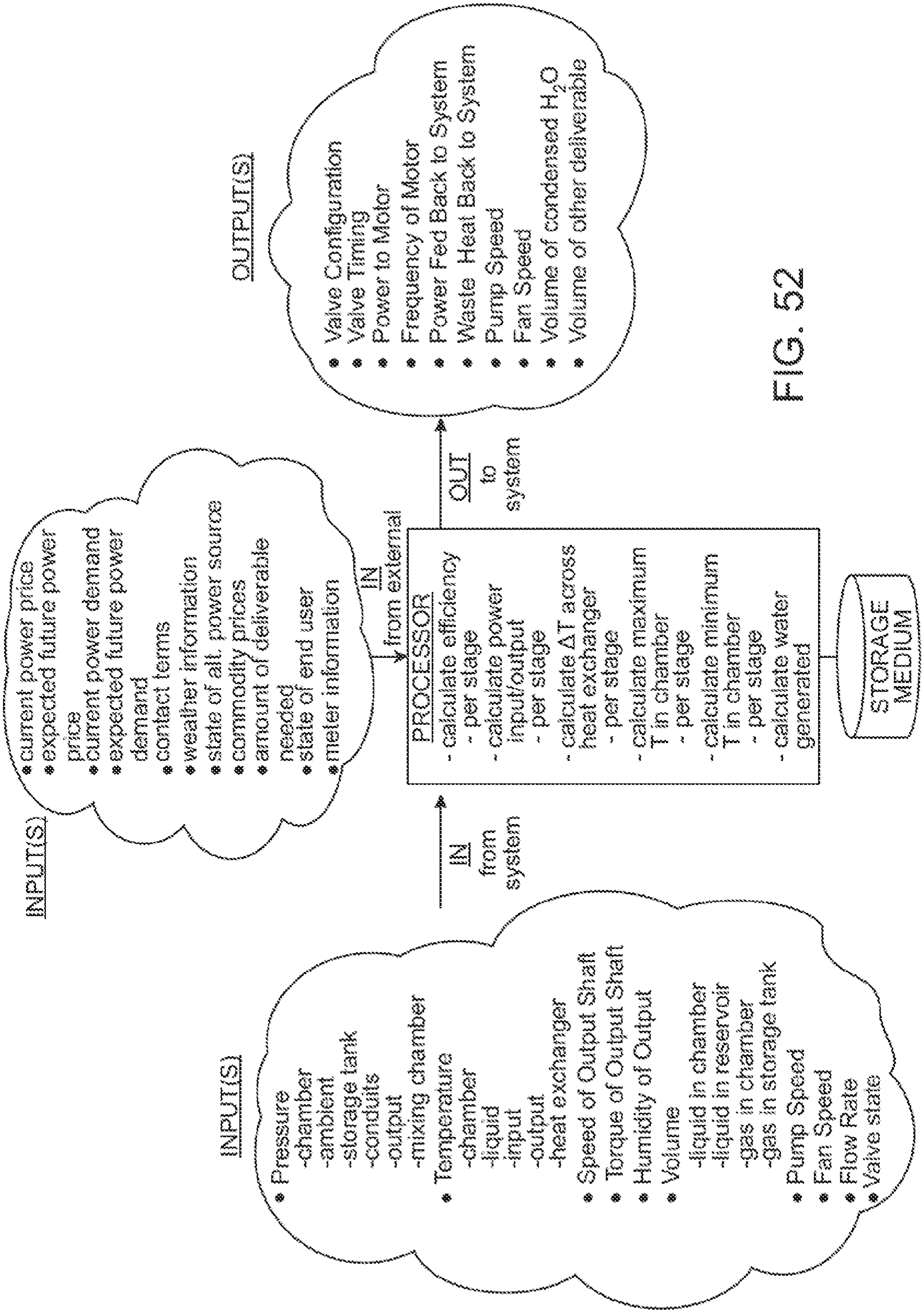
FIG. 52 is a block diagram showing inputs and outputs to a controller responsible for controlling operation of various elements of an apparatus according to embodiments of the present invention.

FIG. 52 is a schematic diagram showing the relationship between the processor/controller, and the various inputs received, functions performed, and outputs produced by the processor controller. As indicated, the processor may control various operational properties of the apparatus, based upon one or more inputs. Such operational parameters include but are not limited to the timing of opening/closing of gas flow valves and liquid flow valves, as described in detail above.

FIGS. 20-20A previously described show simplified diagrams of a computing device for processing information according to an embodiment of the present invention. This diagram is merely an example, which should not limit the scope of the claims herein. One of ordinary skill in the art would recognize many other variations, modifications, and alternatives. Embodiments according to the present invention can be implemented in a single application program such as a browser, or can be implemented as multiple programs in a distributed computing environment, such as a workstation, personal computer or a remote terminal in a client server relationship.

Because of its ubiquity and large heat capacity, liquid water is one medium that is commonly used in exchanging thermal energy with a heat sink or heat source. However, the thermal exchange properties of liquid water can be limited by changes in phase.

For example, liquid water at room temperature can absorb heat from a compressed gas and experience a positive temperature change of about >+80° C., before undergoing a phase change to a gas. However, room temperature liquid water can transfer heat to an expanding gas and experience a negative temperature change of only about <−15° C., before undergoing a phase change to a solid.

This narrower range of available temperature drop, can serve as a constraint in the operation of any one stage of a multi-stage apparatus for gas expansion. However, embodiments of the present invention are not limited to the use of liquid water as a heat exchange medium. Various embodiments could utilize other fluids for heat exchange, and remain within the scope of the present invention. For example, the freezing point of propylene glycol solutions can be well below that of liquid water, depending upon the relative amount of propylene glycol that is present. Such alternative heat exchange media could be used in environments not amenable to the flow of pure liquid water, for example at high latitudes or high elevations.

Examples of liquids or components thereof that may be used in various embodiments of the present invention, may include but are not limited to anti-freezes, surfactants, boiling point elevating agents, anti-corrosive agents, lubricating agents, foaming agents, dissolved solids, and dissolved gases.

Particular embodiments shown and described above, depict systems in which gases are inlet and exhausted to an exterior environment. An example of such a system is one that is based upon the compression and expansion of atmospheric air.

The present invention, however, is not limited to such embodiments. Alternative embodiments may be drawn to closed systems, wherein the gas that is inlet to the system for compression, is that which was exhausted during a prior expansion process. One example of such a system is where the compressed gas comprises other than air, for example helium or other gases exhibiting favorable heat capacity.

Examples of gases which may be compressed, expanded, or compressed and expanded according to certain embodiments of the present invention, in an open system or a closed system, include but are not limited to the following (ASHRAE=American Society of Heating, Refrigerating, and Air-Conditioning Engineers):

(ASHRAE No./Name/Formula/CAS No.; where available):
R-600/Butane/CH3CH2CH2CH3/106-97-8; R-600a/Isobutane/CH(CH3)2CH3/75-28-5;
R-601/Pentane/CH3CH2CH2CH2CH3/109-66-0;
R-601a/Isopentane/(CH3)2CHCH2CH3/78-78-4;
R-610/Diethyl ether/C2H5OC2H5/60-29-7; R-611/Methyl formate/C2H4O/107-31-3;
R-630/Methylamine/CH2NH2/74-89-5; R-631/Ethylamine/C2H5NH2/75-04-7;
R-702/Hydrogen/H2/1333-74-0; R-704/Helium/He/7440-59-7;
R-717/Ammonia/NH3/7664-41-7; R-718/Water/H2O/7732-18-5; R-720/Neon/Ne/7440-01-9;
R-728/Nitrogen/N2/7727-37-9; R-732/Oxygen/O2/7782-44-7; R-740/Argon/Ar/7440-37-1;
R-744/Carbon dioxide/CO2/124-38-9; R-744A/Nitrous oxide/N2O/10024-97-2;
R-764/Sulfur dioxide/SO2/7446-09-5; R-784/Krypton/Kr/7439-90-9;
R-1112a/1,1-Dichloro-2,2-difluoro ethylene/C2Cl2F2/79-35-6;
R-1113/Chlorotrifluoroethylene/C2ClF3/79-38-9; R-1114/Tetrafluoroethylene/C2F4/116-14-3;
R-1120/Trichloroethylene/C2HCl3/79-01-6;
R-1130/cis-1,2-Dichloroethylene/C2H2Cl2/156-59-2;
R-1132/1,1-Difluoroethylene/C2H2F2/75-38-7; R-1140/Chloroethylene/C2H3Cl/75-01-4;
R-1141/Fluoroethylene/C2H3F/75-02-5; R-1150/Ethylene/C2H4/74-85-1;
R-1216/Hexafluoropropylene/C3F6/116-15-4;
NA/Hexafluoropropene trimer/(C3F6)3/6792-31-0; R-1270/Propylene/C3H6/115-07-1;
R-10/Tetrachloromethane/CCl4/56-23-5; R-11/Trichlorofluoromethane/CCl3F/75-69-4;
R-12/Dichlorodifluoromethane/CCl2F2/75-71-8;
R-12B1/Bromochlorodifluoromethane/CBrClF2/353-59-3;
R-12B2/Dibromodifluoromethane/CBr2F2/75-61-6;

R-13/Chlorotrifluoromethane/CClF3/75-72-9; R-13B1/Bromotrifluoromethane/CF3Br/75-63-8
R-14/Tetrafluoromethane/CF4/75-73-0; R-20 Trichloromethane CHCl3 67-66-3;
R-21/Dichlorofluoromethane/CHFCl2/75-43-4; R-22/Chlorodifluoromethane/CHClF2/75-45-6;
R-22B1/Bromodifluoromethane/CHBrF2/1511-62-2; R-23/Trifluoromethane/CHF3/75-46-7;
R-30/Dichloromethane/CH2Cl2/75-09-2; R-31 Chlorofluoromethane CH2FCl593-70-4;
R-32/Difluoromethane/CH2F2/75-10-5; R-40/Chloromethane/CH3Cl/74-87-3;
R-41/Fluoromethane/CH3F/593-53-3; R-50/Methane/CH4/74-82-8;
R-110/Hexachloroethane/C2Cl6/67-72-1; R-111/Pentachlorofluoroethane/C2FCl5/354-56-3
R-112/1,1,2,2-Tetrachloro-1,2-difluoroethane/C2F2Cl4/76-12-0;
R-112a/1,1,1,2-Tetrachloro-2,2-difluoroethane/C2F2Cl4/76-11-9;
R-113/1,1,2-Trichlorotrifluoroethane/C2F3Cl3/76-13-1;
R-113a/1,1,1-Trichlorotrifluoroethane/C2F3Cl3/354-58-5;
R-114/1,2-Dichlorotetrafluoroethane/C2F4Cl2/76-14-2;
R-114a/1,1-Dichlorotetrafluoroethane/C2F4Cl2/374-07-2;
R-114B2/Dibromotetrafluoroethane/C2F4Br2/124-73-2;
R-115/Chloropentafluoroethane/C2F5Cl/76-15-3; R-116/Hexafluoroethane/C2F6/76-16-4;
R-120/Pentachloroethane/C2HCl5/76-01-7;
R-121/1,1,2,2-Tetrachloro-1-fluoroethane/C2HFCl4/354-14-3;
R-121a/1,1,1,2-Tetrachloro-2-fluoroethane/C2HFCl4/354-11-0;
R-122/1,1,2-Trichloro-2,2-difluoroethane/C2HF2Cl3/354-21-2;
R-122a/1,1,2-Trichloro-1,2-difluoroethane/C2HF2Cl3/354-15-4;
R-122b/1,1,1-Trichloro-2,2-difluoroethane/C2HF2Cl3/354-12-1;
R-123/2,2-Dichloro-1,1,1-trifluoroethane/C2HF3Cl2/306-83-2;
R-123a/1,2-Dichloro-1,1,2-trifluoroethane/C2HF3Cl2/354-23-4;
R-123b/1,1-Dichloro-1,2,2-trifluoroethane/C2HF3Cl2/812-04-4;
R-124/2-Chloro-1,1,1,2-tetrafluoroethane/C2HF4Cl/2837-89-0;
R-124a/1-Chloro-1,1,2,2-tetrafluoroethane/C2HF4Cl/354-25-6;
R-125/Pentafluoroethane/C2HF5/354-33-6;
R-E125/(Difluoromethoxy)(trifluoro)methane/C2HF5O/3822-68-2;
R-130/1,1,2,2-Tetrachloroethane/C2H2Cl4/79-34-5;
R-130a/1,1,1,2-Tetrachloroethane/C2H2Cl4/630-20-6;
R-131/1,1,2-trichloro-2-fluoroethane/C2H2Cl3/359-28-4;
R-131a/1,1,2-trichloro-1-fluoroethane/C2H2Cl3/811-95-0;
R-131b/1,1,1-trichloro-2-fluoroethane/C2H2Cl3/2366-36-1;
R-132/Dichlorodifluoroethane/C2H2F2Cl2/25915-78-0;
R-132a/1,1-Dichloro-2,2-difluoroethane/C2H2F2Cl2/471-43-2;
R-132b/1,2-Dichloro-1,1-difluoroethane/C2H2F2Cl2/1649-08-7;
R-132c/1,1-Dichloro-1,2-difluoroethane/C2H2F2Cl2/1842-05-3;
R-132bB2/1,2-Dibromo-1,1-difluoroethane/C2H2Br2F2/75-82-1;
R-133/1-Chloro-1,2,2-Trifluoroethane/C2H2F3Cl/431-07-2;
R-133a/1-Chloro-2,2,2-Trifluoroethane/C2H2F3Cl/75-88-7;
R-133b/1-Chloro-1,1,2-Trifluoroethane/C2H2F3Cl/421-04-5;
R-134/1,1,2,2-Tetrafluoroethane/C2H2F4/359-35-3;
R-134a/1,1,1,2-Tetrafluoroethane/C2H2F4/811-97-2;
R-E134/Bis(difluoromethyl)ether/C2H2F4O/1691-17-4;
R-140/1,1,2-Trichloroethane/C2H3Cl3/79-00-5;
R-140a/1,1,1-Trichloroethane/C2H3Cl3/71-55-6;
R-141/1,2-Dichloro-1-fluoroethane/C2H3Cl2/430-57-9;
R-141B2/1,2-Dibromo-1-fluoroethane/C2H3Br2F/358-97-4;
R-141a/1,1-Dichloro-2-fluoroethane/C2H3Cl2/430-53-5;
R-141b/1,1-Dichloro-1-fluoroethane/C2H3Cl2/1717-00-6;
R-142/Chlorodifluoroethane/C2H3F2Cl/25497-29-4;
R-142a/1-Chloro-1,2-difluoroethane/C2H3F2Cl/25497-29-4;
R-142b/1-Chloro-1,1-difluoroethane/C2H3F2Cl/75-68-3;
R-143/1,1,2-Trifluoroethane/C2H3F3/430-66-0 300;
R-143a/1,1,1-Trifluoroethane/C2H3F3/420-46-2 3,800;
R-143m/Methyl trifluoromethyl ether/C2H3F3O/421-14-7;
R-E143a/2,2,2-Trifluoroethyl methyl ether/C3H5F3O/460-43-5;
R-150/1,2-Dichloroethane/C2H4Cl2/107-06-2;
R-150a/1,1-Dichloroethane/C2H4Cl2/75-34-3;
R-151/Chlorofluoroethane/C2H4ClF/110587-14-9;
R-151a/1-Chloro-1-fluoroethane/C2H4ClF/1615-75-4;
R-152/1,2-Difluoroethane/C2H4F2/624-72-6;
R-152a/1,1-Difluoroethane/C2H4F2/75-37-6;
R-160/Chloroethane/C2H5Cl/75-00-3;
R-161/Fluoroethane/C2H5F/353-36-6;
R-170/Ethane/C2H6/74-84-0;
R-211/1,1,1,2,2,3,3-Heptachloro-3-fluoropropane/C3FCl7/422-78-6;
R-212/Hexachlorodifluoropropane/C3F2Cl6/76546-99-3;
R-213/1,1,1,3,3-Pentachloro-2,2,3-trifluoropropane/C3F3Cl5/2354-06-5;
R-214/1,2,2,3-Tetrachloro-1,1,3,3-tetrafluoropropane/C3F4Cl4/2268-46-4;
R-215/1,1,1-Trichloro-2,2,3,3,3-pentafluoropropane/C3F5Cl3/4259-43-2;
R-216/1,2-Dichloro-1,1,2,3,3,3-hexafluoropropane/C3F6Cl2/661-97-2;
R-216ca/1,3-Dichloro-1,1,2,2,3,3-hexafluoropropane/C3F6Cl2/662-01-1;
R-217/1-Chloro-1,1,2,2,3,3,3-heptafluoropropane/C3F7Cl/422-86-6;
R-217ba/2-Chloro-1,1,1,2,3,3,3-heptafluoropropane/C3F7Cl/76-18-6;
R-218/Octafluoropropane/C3F8/76-19-7;
R-221/1,1,1,2,2,3-Hexachloro-3-fluoropropane/C3HFCl6/422-26-4;
R-222/Pentachlorodifluoropropane/C3HF2Cl5/134237-36-8;
R-222c/1,1,1,3,3-Pentachloro-2,2-difluoropropane/C3HF2Cl5/422-49-1;
R-223/Tetrachlorotrifluoropropane/C3HF3Cl4/134237-37-9;
R-223 ca/1,1,3,3-Tetrachloro-1,2,2-trifluoropropane/C3HF3Cl4/422-52-6;
R-223 cb/1,1,1,3-Tetrachloro-2,2,3-trifluoropropane/C3HF3Cl4/422-50-4;
R-224/Trichlorotetrafluoropropane/C3HF4Cl3/134237-38-0;

R-224ca/1,3,3-Trichloro-1,1,2,2-tetrafluoropropane/C3HF4Cl3/422-54-8;
R-224cb/1,1,3-Trichloro-1,2,2,3-tetrafluoropropane/C3HF4Cl3/422-53-7;
R-224 cc/1,1,1-Trichloro-2,2,3,3-tetrafluoropropane/C3HF4Cl3/422-51-5;
R-225/Dichloropentafluoropropane/C3HF5Cl2/127564-92-5;
R-225aa/2,2-Dichloro-1,1,1,3,3-pentafluoropropane/C3HF5Cl2/128903-21-9;
R-225ba/2,3-Dichloro-1,1,1,2,3-pentafluoropropane/C3HF5Cl2/422-48-0;
R-225bb/1,2-Dichloro-1,1,2,3,3-pentafluoropropane/C3HF5Cl2/422-44-6;
R-225 ca/3,3-Dichloro-1,1,1,2,2-pentafluoropropane/C3HF5Cl2/422-56-0;
R-225 cb/1,3-Dichloro-1,1,2,2,3-pentafluoropropane/C3HF5Cl2/507-55-1;
R-225 cc/1,1-Dichloro-1,2,2,3,3-pentafluoropropane/C3HF5Cl2/13474-88-9;
R-225da/1,2-Dichloro-1,1,3,3,3-pentafluoropropane/C3HF5Cl2/431-86-7;
R-225ea/1,3-Dichloro-1,1,2,3,3-pentafluoropropane/C3HF5Cl2/136013-79-1;
R-225eb/1,1-Dichloro-1,2,3,3,3-pentafluoropropane/C3HF5Cl2/111512-56-2;
R-226/Chlorohexafluoropropane/C3HF6Cl/134308-72-8;
R-226ba/2-Chloro-1,1,1,2,3,3-hexafluoropropane/C3HF6Cl/51346-64-6;
R-226ca/3-Chloro-1,1,1,2,2,3-hexafluoropropane/C3HF6Cl/422-57-1;
R-226cb/1-Chloro-1,1,2,2,3,3-hexafluoropropane/C3HF6Cl/422-55-9;
R-226da/2-Chloro-1,1,1,3,3,3-hexafluoropropane/C3HF6Cl/431-87-8;
R-226ea/1-Chloro-1,1,2,3,3,3-hexafluoropropane/C3HF6Cl/359-58-0;
R-227ca/1,1,2,2,3,3,3-Heptafluoropropane/C3HF7/2252-84-8;
R-227ca2/Trifluoromethyl 1,1,2,2-tetrafluoroethyl ether/C3HF7O/2356-61-8;
R-227ea/1,1,1,2,3,3,3-Heptafluoropropane/C3HF7/431-89-0;
R-227me/Trifluoromethyl 1,2,2,2-tetrafluoroethyl ether/C3HF7O/2356-62-9;
R-231/Pentachlorofluoropropane/C3H2Cl5/134190-48-0;
R-232/Tetrachlorodifluoropropane/C3H2F2Cl4/134237-39-1;
R-232ca/1,1,3,3-Tetrachloro-2,2-difluoropropane/C3H2F2Cl4/1112-14-7;
R-232cb/1,1,1,3-Tetrachloro-2,2-difluoropropane/C3H2F2Cl4/677-54-3;
R-233/Trichlorotrifluoropropane/C3H2F3Cl3/134237-40-4;
R-233 ca/1,1,3-Trichloro-2,2,3-trifluoropropane/$C3H2F_3Cl3$/131221-36-8;
R-233 cb/1,1,3-Trichloro-1,2,2-trifluoropropane/C3H2F3Cl3/421-99-8;
R-233cc/1,1,1-Trichloro-2,2,3-trifluoropropane/C3H2F3Cl3/131211-71-7;
R-234/Dichlorotetrafluoropropane/C3H2F4Cl2/127564-83-4;
R-234aa/2,2-Dichloro-1,1,3,3-tetrafluoropropane/C3H2F4Cl2/17705-30-5;
R-234ab/2,2-Dichloro-1,1,1,3-tetrafluoropropane/C3H2F4Cl2/149329-24-8;
R-234ba/1,2-Dichloro-1,2,3,3-tetrafluoropropane/C3H2F4Cl2/425-94-5;
R-234bb/2,3-Dichloro-1,1,1,2-tetrafluoropropane/C3H2F4Cl2/149329-25-9;
R-234bc/1,2-Dichloro-1,1,2,3-tetrafluoropropane/C3H2F4Cl2/149329-26-0;
R-234ca/1,3-Dichloro-1,2,2,3-tetrafluoropropane/C3H2F4Cl2/70341-81-0;
R-234cb/1,1-Dichloro-2,2,3,3-tetrafluoropropane/C3H2F4Cl2/4071-01-6;
R-234cc/1,3-Dichloro-1,1,2,2-tetrafluoropropane/C3H2F4Cl2/422-00-5;
R-234cd/1,1-Dichloro-1,2,2,3-tetrafluoropropane/C3H2F4Cl2/70192-63-1;
R-234da/2,3-Dichloro-1,1,1,3-tetrafluoropropane/C3H2F4Cl2/146916-90-7;
R-234fa/1,3-Dichloro-1,1,3,3-tetrafluoropropane/C3H2F4Cl2/76140-39-1;
R-234fb/1,1-Dichloro-1,3,3,3-tetrafluoropropane/C3H2F4Cl2/64712-27-2;
R-235/Chloropentafluoropropane/C3H2F5Cl/134237-41-5;
R-235ca/1-Chloro-1,2,2,3,3-pentafluoropropane/C3H2F5Cl/28103-66-4;
R-235cb/3-Chloro-1,1,1,2,3-pentafluoropropane/C3H2F5Cl/422-02-6;
R-235cc/1-Chloro-1,1,2,2,3-pentafluoropropane/C3H2F5Cl/679-99-2;
R-235da/2-Chloro-1,1,1,3,3-pentafluoropropane/C3H2F5Cl/134251-06-2;
R-235fa/1-Chloro-1,1,3,3,3-pentafluoropropane/C3H2F5Cl/677-55-4;
R-236cb/1,1,1,2,2,3-Hexafluoropropane/C3H2F6/677-56-5;
R-236ea/1,1,1,2,3,3-Hexafluoropropane/C3H2F6/431-63-0;
R-236fa/1,1,1,3,3,3-Hexafluoropropane/C3H2F6/690-39-1;
R-236me/1,2,2,2-Tetrafluoroethyl difluoromethyl ether/C3H2F6O/57041-67-5;
R-FE-36/Hexafluoropropane/C3H2F6/359-58-0;
R-241/Tetrachlorofluoropropane/C3H3Cl4/134190-49-1;
R-242/Trichlorodifluoropropane/C3H3F2Cl3/134237-42-6;
R-243/Dichlorotrifluoropropane/C3H3F3Cl2/134237-43-7;
R-243ca/1,3-Dichloro-1,2,2-trifluoropropane/C3H3F3Cl2/67406-68-2;
R-243cb/1,1-Dichloro-2,2,3-trifluoropropane/C3H3F3Cl2/70192-70-0;
R-243cc/1,1-Dichloro-1,2,2-trifluoropropane/C3H3F3Cl2/7125-99-7;
R-243da/2,3-Dichloro-1,1,1-trifluoropropane/C3H3F3Cl2/338-75-0;
R-243 ea/1,3-Dichloro-1,2,3-trifluoropropane/C3H3F3Cl2/151771-08-3;
R-243ec/1,3-Dichloro-1,1,2-trifluoropropane/C3H3F3Cl2/149329-27-1;
R-244/Chlorotetrafluoropropane/C3H3F4Cl/134190-50-4;
R-244ba/2-Chloro-1,2,3,3-tetrafluoropropane/C3H3F4Cl;
R-244bb/2-Chloro-1,1,1,2-tetrafluoropropane/C3H3F4Cl/421-73-8;
R-244ca/3-Chloro-1,1,2,2-tetrafluoropropane/C3H3F4Cl/679-85-6;
R-244cb/1-Chloro-1,2,2,3-tetrafluoropropane/C3H3F4Cl/67406-66-0;
R-244cc/1-Chloro-1,1,2,2-tetrafluoropropane/C3H3F4Cl/421-75-0;
R-244da/2-Chloro-1,1,3,3-tetrafluoropropane/C3H3F4Cl/19041-02-2;
R-244db/2-Chloro-1,1,1,3-tetrafluoropropane/C3H3F4Cl/117970-90-8;
R-244ea/3-Chloro-1,1,2,3-tetrafluoropropane/C3H3F4Cl;
R-244eb/3-Chloro-1,1,1,2-tetrafluoropropane/C3H3F4Cl;
R-244ec/1-Chloro-1,1,2,3-tetrafluoropropane/C3H3F4Cl;

R-244fa/3-Chloro-1,1,1,3-tetrafluoropropane/C3H3F4Cl;
R-244fb/1-Chloro-1,1,3,3-tetrafluoropropane/C3H3F4Cl/2730-64-5;
R-245ca/1,1,2,2,3-Pentafluoropropane/C3H3F5/679-86-7 560;
R-245cb/Pentafluoropropane/C3H3F5/1814-88-6;
R-245ea/1,1,2,3,3-Pentafluoropropane/C3H3F5/24270-66-4;
R-245eb/1,1,1,2,3-Pentafluoropropane/C3H3F5/431-31-2;
R-245fa/1,1,1,3,3-Pentafluoropropane/C3H3F5/460-73-1;
R-245mc/Methyl pentafluoroethyl ether/C3H3F5O/22410-44-2;
R-245mf/Difluoromethyl 2,2,2-trifluoroethyl ether/C3H3F5O/1885-48-9;
R-245qc/Difluoromethyl 1,1,2-trifluoroethyl ether/C3H3F5O/69948-24-9;
R-251/Trichlorofluoropropane/C3H4Cl3/134190-51-5;
R-252/Dichlorodifluoropropane/C3H4F2Cl2/134190-52-6;
R-252ca/1,3-Dichloro-2,2-difluoropropane/C3H4F2Cl2/1112-36-3;
R-252cb/1,1-Dichloro-2,2-difluoropropane/C3H4F2Cl2/1112-01-2;
R-252dc/1,2-Dichloro-1,1-difluoropropane/C3H4F2Cl2;
R-252ec/1,1-Dichloro-1,2-difluoropropane/C3H4F2Cl2;
R-253/Chlorotrifluoropropane/C3H4F3Cl 134237-44-8;
R-253ba/2-Chloro-1,2,3-trifluoropropane/C3H4F3Cl;
R-253bb/2-Chloro-1,1,2-trifluoropropane/C3H4F3Cl;
R-253ca/1-Chloro-2,2,3-trifluoropropane/C3H4F3Cl/56758-54-4;
R-253cb/1-Chloro-1,2,2-trifluoropropane/C3H4F3Cl/70192-76-6;
R-253ea/3-Chloro-1,1,2-trifluoropropane/C3H4F3Cl;
R-253eb/1-Chloro-1,2,3-trifluoropropane/C3H4F3Cl;
R-253ec/1-Chloro-1,1,2-trifluoropropane/C3H4F3Cl;
R-253fa/3-Chloro-1,3,3-trifluoropropane/C3H4F3Cl;
R-253fb/3-Chloro-1,1,1-trifluoropropane/C3H4F3Cl/460-35-5;
R-253fc/1-Chloro-1,1,3-trifluoropropane/C3H4F3Cl;
R-254cb/1,1,2,2-Tetrafluoropropane/C3H4F4/40723-63-5;
R-254pc/Methyl 1,1,2,2-tetrafluoroethyl ether/C3H4F4O/425-88-7;
R-261/Dichlorofluoropropane/C3H5Cl2/134237-45-9;
R-261ba/1,2-Dichloro-2-fluoropropane/C3H5Cl2/420-97-3;
R-262/Chlorodifluoropropane/C3H5F2Cl/134190-53-7;
R-262ca/1-Chloro-2,2-difluoropropane/C3H5F2Cl/420-99-5;
R-262fa/3-Chloro-1,1-difluoropropane/C3H5F2Cl;
R-262fb/1-Chloro-1,3-difluoropropane/C3H5F2Cl;
R-263/Trifluoropropane/C3H5F3;
R-271/Chlorofluoropropane/C3H6Cl/134190-54-8;
R-271b/2-Chloro-2-fluoropropane/C3H6Cl/420-44-0;
R-271d/2-Chloro-1-fluoropropane/C3H6Cl;
R-271fb/1-Chloro-1-fluoropropane/C3H6Cl;
R-272/Difluoropropane/C3H6F2;
R-281/Fluoropropane/C3H7F;
R-290/Propane/C3H8/74-98-6;
R-C316/Dichlorohexafluorocyclobutane/C4Cl2F6/356-18-3;
R-C317/Chloroheptafluorocyclobutane/C4ClF7/377-41-3;
R-C318/Octafluorocyclobutane/C4F8/115-25-3;
R-3-1-10/Decafluorobutane/C4F10;
R-329ccb/375-17-7;
R-338eea/75995-72-1;
R-347ccd/662-00-0;
R-347mcc/Perfluoropropyl methyl ether/C4H3F7O/375-03-1;
R-347mmy/Perfluoroisopropyl methyl ether/C4H3F7O/22052-84-2;
R-356mcf/
R-356mffm/
R-365mfc/1,1,1,3,3-Pentafluorobutane/C4H5F5
FC-72/Tetradecafluorohexane/C6F14 355-42-0
R-400 R-12/R-114 (60/40 wt %) binary blend
R-401A R-22/R-152a/R-124 (53/13/34)
R-401B R-22/R-152a/R-124 (61/11/28)
R-401C R-22/R-152a/R-124 (33/15/52)
R-402A R-125/R-290/R-22 (60/2/38)
R-402B R-125/R-290/R-22 (38/2/60)
R-403A R-290/R-22/R-218 (5/75/20)
R-403B R-290/R-22/R-218 (5/56/39)
R-404A R-125/R-143a/R-134a (44/52/4)
R-405A R-22/R-152a/R-142b/R-C318 (45/7/5.5/42.5)
R-406A R-22/R-600a/R-142b (55/04/41)
R-407A R-32/R-125/R-134a (20/40/40)
R-407B R-32/R-125/R-134a (10/70/20)
R-407C R-32/R-125/R-134a (23/25/52)
R-407D R-32/R-125/R-134a (15/15/70)
R-407E R-32/R-125/R-134a (25/15/60)
R-408A R-125/R-143a/R-22 (7/46/47)
R-409A R-22/R-124/R-142b (60/25/15)
R-409B R-22/R-124/R-142b (65/25/10)
R-410A R-32/R-125 (50/50)
R-410B R-32/R-125 (45/55)
R-411A R-1270/R-22/R-152a (1.5/87.5/11)
R-411B R-1270/R-22/R-152a (3/94/3)
R-412A R-22/R-218/R-142b (70/5/25)
R-413A R-218/R-134a/R-600a (9/88/3)
R-414A R-22/R-124/R-600a/R-142b (51/28.5/4.0/16.5)
R-414B R-22/R-124/R-600a/R-142b (50/39/1.5/9.5)
R-415A R-22/R-152a (82/18)
R-415B R-22/R-152a (25/75)
R-416A R-134a/R-124/R-600 (59/39.5/1.5)
R-417A R-125/R-134a/R-600 (46.6/50.0/3.4)
R-418A R-290/R-22/R-152a (1.5/96/2.5)
R-419A R-125/R-134a/R-E170 (77/19/4)
R-420A R-134a/R-142b (88/12)
R-421A R-125/R-134a (58/42)
R-421B R-125/R-134a (85/15)
R-422A R-125/R-134a/R-600a (85.1/11.5/3.4)
R-422B R-125/R-134a/R-600a (55/42/3)
R-422C R-125/R-134a/R-600a (82/15/3)
R-422D R-125/R-134a/R-600a (65.1/31.5/3.4)
R-423A R-134a/R-227ea (52.5/47.5)
R-424A R-125/R-134a/R-600a/R-600/R-601a (50.5/47/0.9/1/0.6)
R-425A R-32/R-134a/R-227ea (18.5/69.5/12)
R-426A R-125/R-134a/R-600/R-601a (5.1/93/1.3/0.6)
R-427A R-32/R-125/R-143a/R-134a (15/25/10/50)
R-428A R-125/R-143a/R-290/R-600a (77.5/20/0.6/1.9)
R-500 R-12/R-152a (73.8/26.2)
R-501 R-22/R-12 (75/25)
R-502 R-22/R-115 (48.8/51.2)
R-503 R-23/R-13 (40.1/59.9)
R-504 R-32/R-115 (48.2/51.8)
R-505 R-12/R-31 (78/22)
R-506 R-31/R-114 (55.1/44.9)
R-507 R-125/R-143a (50/50)
R-508A R-23/R-116 (39/61)
R-508B R-23/R-116 (46/54)
R-509A R-22/R-218 (44/56)

In certain embodiments of the present invention, mixtures of one or more of the above gases may also be subjected to compression, expansion, or compression and expansion. One example of such a gas mixture is natural gas that is commonly used for combustion.

According to certain embodiments of the present invention, energy for performing useful work may be recovered by the expansion of compressed gas (such as natural gas) that is flowed through a network. For example, a conventional "city gate" or other passive pressure regulator allows gas to expand from a higher pressure to a lower pressure freely. The resulting low pressure gas has higher entropy, meaning that less work can be extracted from it.

In certain applications it may be desirable to minimize this loss of the work available in the gas. An example of such an application occurs during the expansion of gas in a natural gas pipeline to city pressure via a city gate system.

Accordingly, embodiments of the present invention may include an active regulator in which the gas does mechanical work against a piston or other movable member as it expands. That mechanical work can be used to operate a generator, creating electricity, or to drive some other mechanical system.

Thus rather than allowing gas to expand freely, the active regulator 13600 disclosed in FIG. 136 uses the pressure of the expanding gas to drive a piston 13602. This movement of the piston, in turn, may be harnessed to provide useful work. For example, in the embodiment of FIG. 136, the piston rotates crankshaft 13604 to operate generator 13606 to create electricity.

In order to maximize the efficiency of the process and to prevent any moisture in the gas from freezing during expansion, a liquid compatible with the gas is sprayed through sprayer 13607 into the cylinder 13608 during expansion. As described above, this liquid transfers heat into the cylinder, controlling the temperature of the expansion process, for example making this temperature near-constant.

The expanded gas-liquid mixture is exhausted from the cylinder via a valve 13610 and passed through a gas-liquid separator 13612. The liquid is pumped by pump 13613 through a heat exchanger 13614 to return it to near-ambient temperature before being sprayed into the cylinder again.

The specific embodiments just described, perform compression or expansion over a single stage. However, alternative embodiments in accordance with the present invention may utilize more than one compression and/or expansion stage arranged in series.

For example, when a larger compression/expansion ratio is required than can comfortably be accommodated by the mechanical or hydraulic approach by which mechanical power is conveyed to and from the system, then multiple stages can be utilized.

Figure 53A:
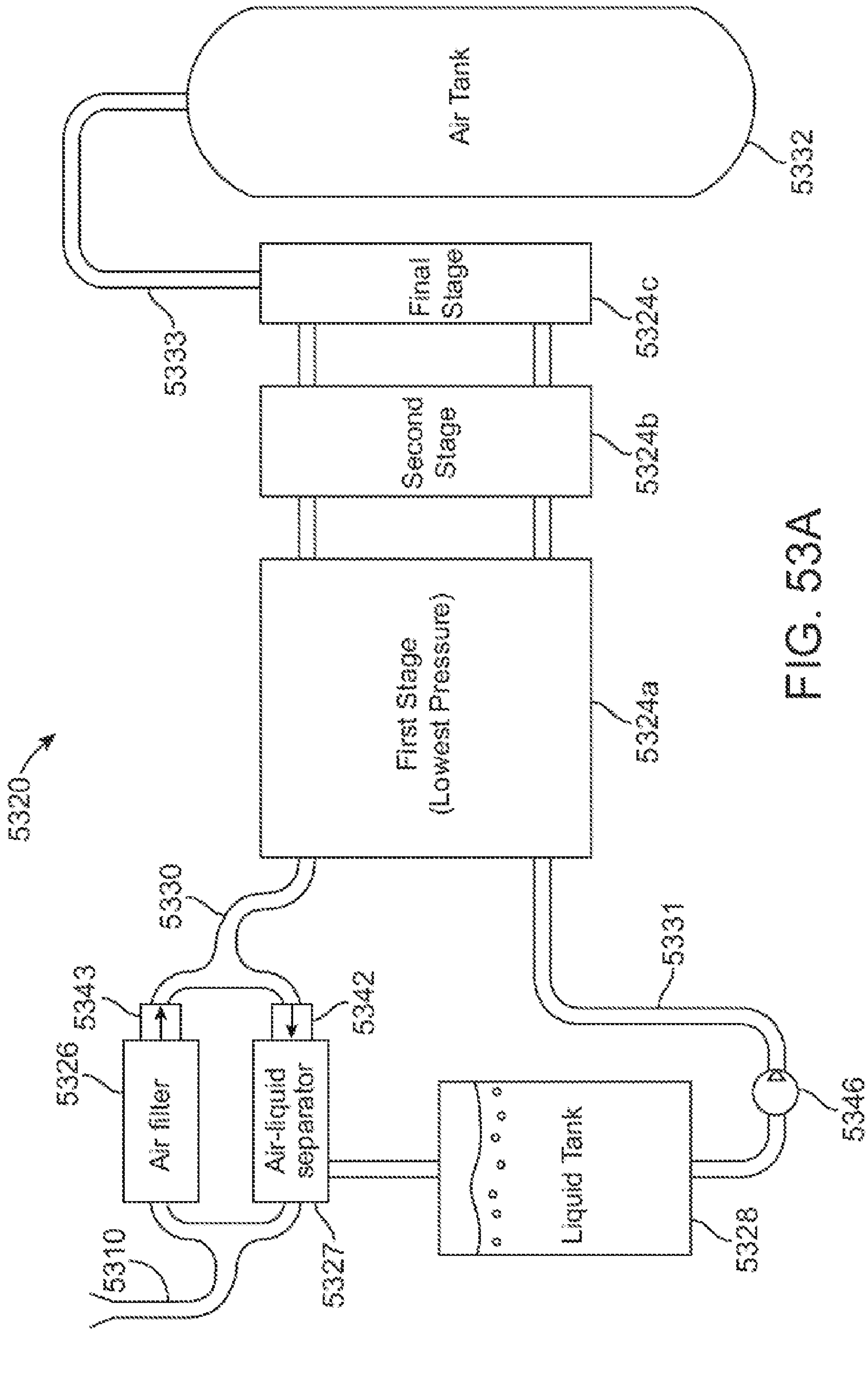
FIG. 53A is a simplified diagram of an embodiment of a multistage apparatus for gas compression according to the present invention.

FIG. 53A presents a highly simplified view of an embodiment of a multi-stage system 5320 for compressing air for storage in tank 5332 with three stages (i.e., first stage 5324*a*, second stage 5324*b* and third stage 5324*c*). Systems with more or fewer stages may be constructed similarly. As shown in the system 5320 of FIG. 53A, in multi-stage embodiments the output of one compression stage is flowed to the inlet of a successive compression stage for further compression, and so on, until a final desired pressure for storage is reached. In this manner, gas can be compressed over several stages to final pressures that would be difficult to achieve with only one stage.

Figure 53B:
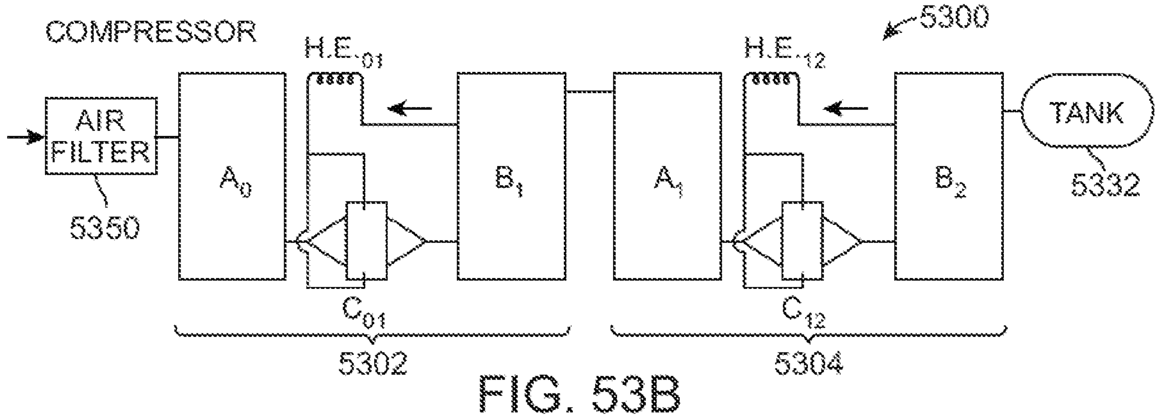
FIG. 53B is a simplified block diagram of one embodiment of a multistage dedicated compressor according to the present invention.
Figure 53B:
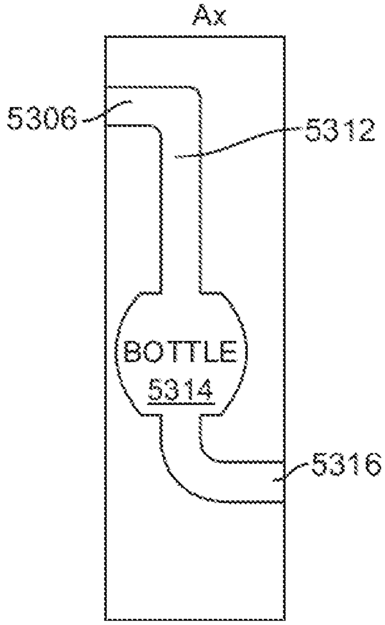
Figure 53B:
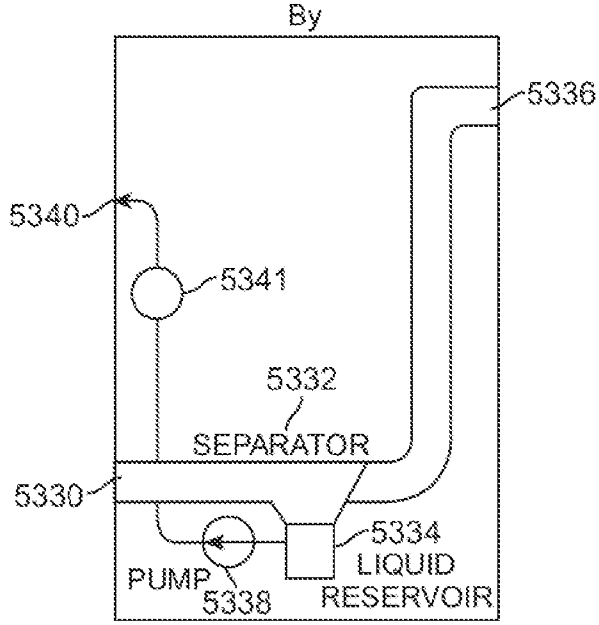
Figure 53B:
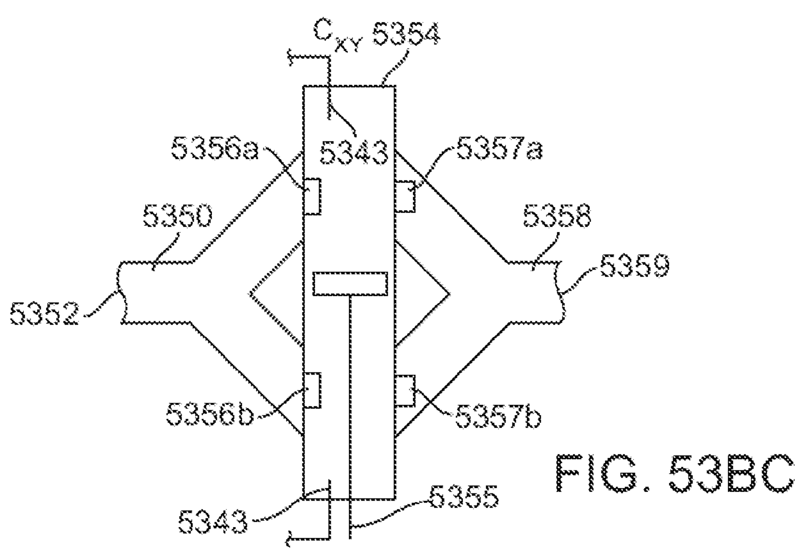

FIG. 53B presents a view of one embodiment of a multi-stage dedicated compressor apparatus 5300 according to the present invention. In particular, FIG. 53B shows system 5300 including first stage 5302, second stage 5304, and storage unit 5332. First stage 5302 comprises inlet module $A_0$ in fluid communication with separator module $B_1$ through compression chamber module $C_{01}$. First stage 5302 receives air for compression through air filter 5350.

First stage 5302 is in turn in fluid communication with second stage 5304 comprising inlet module $A_1$ in fluid communication with separator module $B_2$ through compression module $C_{12}$. Second stage 5304 is in turn in fluid communication with storage unit 5332.

FIGS. 53BA, 53BB, and 53BC show simplified views of the different component modules of the multi-stage compression apparatus of FIG. 53B. In particular, the inlet module $A_x$ comprises gas inlet 5306 in fluid communication through conduit 5312 with a pulsation damper bottle 5314, that is in fluid communication with an outlet 5316.

The separator module $B_y$ is shown in FIG. 53BB. Separation module comprises an inlet 5330 in fluid communication with a liquid-gas separator 5332. Liquid separated by separator is configured to flow to liquid reservoir 5334. Gas from the separator is configured to flow to outlet 5336 of the separator module.

Pump 5338 is configured to flow liquid from the reservoir to the liquid outlet 5340 through liquid valve 5341. Liquid valve 5341 serves to control the liquid flow out of the separator module to the sprayer structures of the compression module. Actuation of the liquid flow valve can serve to isolate the pump and reservoir from pressure fluctuations occurring within the chamber when injection of liquid is not taking place. In certain embodiments, the liquid flow conduit may be in communication with an accumulator structure to dampen pressure changes.

A compression module $C_{xy}$ is shown in FIG. 53BC. The architecture of one embodiment of a compression module is described in detail above. In particular, the compression module comprises a conduit 5350 in fluid communication with an inlet 5352 and in fluid communication with a cylinder 5354 through valves 5356*a* and 5356*b*. Conduit 5358 is in fluid communication with cylinder 5354 through valves 5357*a* and 5357*b*, and in fluid communication with an outlet 5359.

Double-acting piston 5355 is disposed within cylinder 5354. Double-acting piston is in communication with an energy source (not shown), and its movement serves to compress gas present within the cylinder. Such compression is generally shown and described above.

Sprayers 5343 are in liquid communication with the cylinder to introduce liquid therein. Sprayers 5343 receive the liquid from the liquid outlet of the separator module. In certain embodiments, the distance between the liquid flow valve and the sprayers may be minimized to reduce an opportunity for outgassing.

In the first stage 5302 of multi-stage dedicated compressor apparatus 5300, the liquid outlet of the separator module $B_1$ is in fluid communication with the compression module $C_{01}$ through a first heat exchanger H.E.$_{01}$. In the second stage 5304 of multi-stage dedicated compressor apparatus 5300, the liquid outlet of the separator module $B_2$ is in fluid communication with the liquid inlet of the compression module $C_{12}$ through a second heat exchanger H.E.$_{12}$.

The embodiment of FIG. 53B may thus utilize the pressure differential created by a stage, to facilitate injection of liquid. In particular, the embodiment of FIG. 53B has the separated liquid flowed back into a gas flow having the reduced pressure of the previous lower pressure stage. This reduces the force required for the liquid injection, and thus the power consumed by a pump in flowing the liquid.

A dedicated multi-stage compressor apparatus according to the present invention is not limited to the particular embodiment shown in FIG. 53B. In particular, while the embodiment of FIG. 53B shows an apparatus wherein separated liquid is recycled for re-injection into the gas flow within an individual stage, this is not required by the present invention.

Figure 53C:
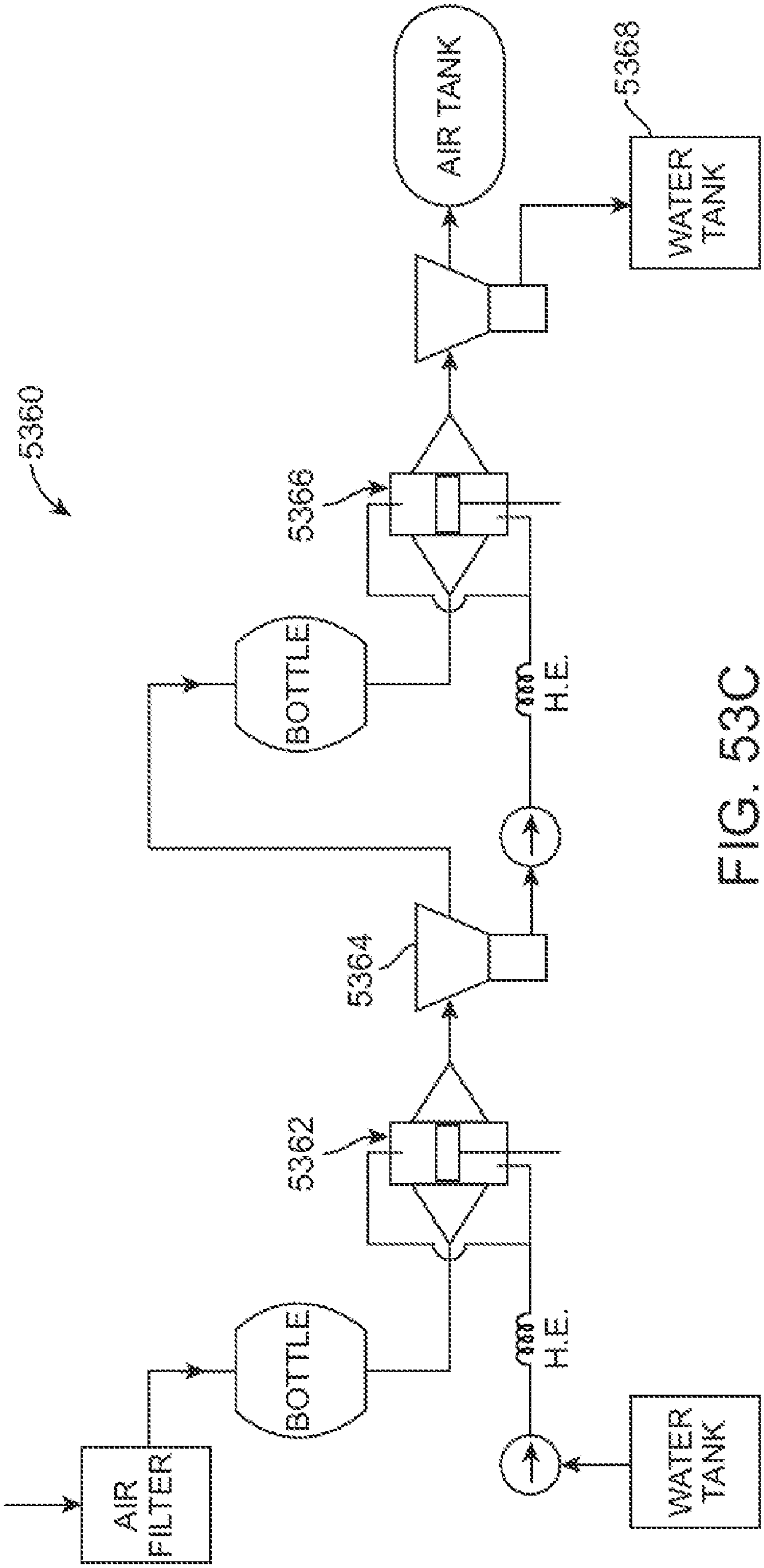
FIG. 53C is a simplified diagram showing an alternative embodiment of a multistage dedicated compressor according to the present invention.

FIG. 53C thus shows an alternative embodiment of a dedicated multi-stage compressor apparatus in accordance with the present invention. In the system 5360 according to this embodiment, liquid injected into the compression chamber 5362 of a first stage, is subsequently removed by separator 5364 and then flowed for injection into the compression chamber 5366 of the next stage. This configuration results in accumulation of the finally separated liquid in the tank 5368. The embodiment of FIG. 53C may offer a benefit, in that energy of the compressed gas is conserved and not consumed by the flowing liquids for reinjection into the compression chamber of the same stage.

While FIGS. 53A-C show compression over multiple stages, embodiments of the present invention are not limited to this approach. Alternative embodiments in accordance with the present invention can also perform expansion over multiple stages, with the output of one expansion stage flowed to the inlet of a successive expansion stage for further expansion, and so on, until an amount of energy has been recovered from the compressed gas. In this way, energy can be recovered from gas expanded over several stages in a manner that would be difficult to obtain with expansion in only one stage.

Figure 54:
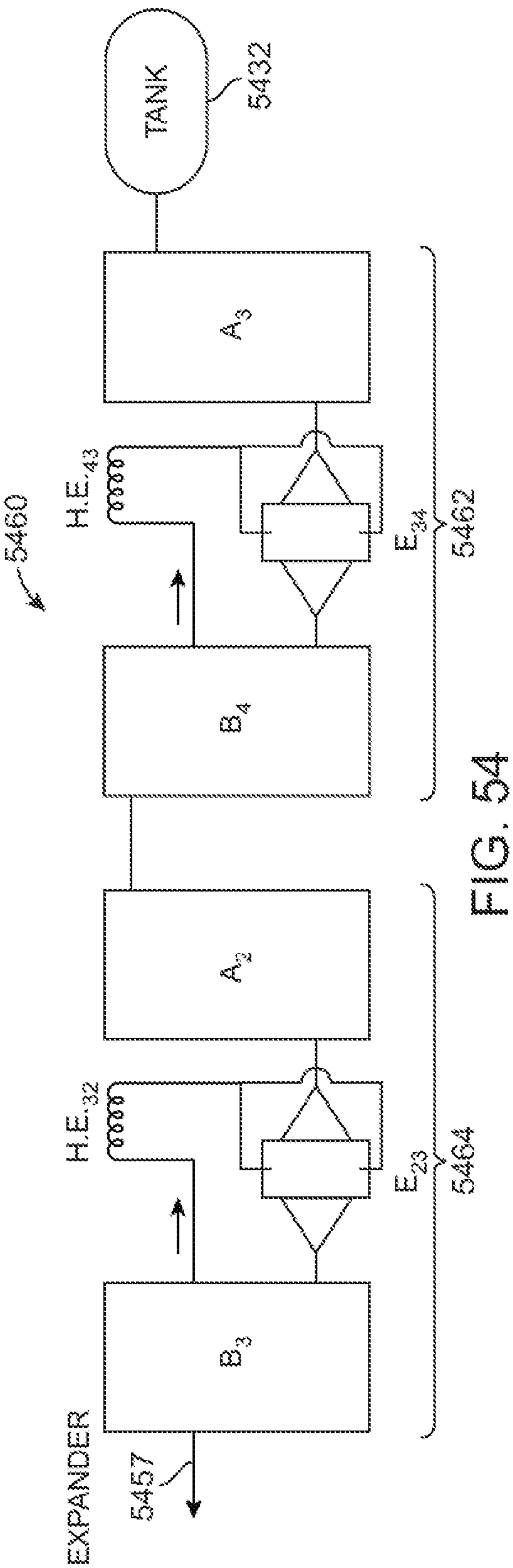
FIG. 54 is a simplified block diagram of one embodiment of a multistage dedicated expander according to the present invention.

FIG. 54 presents a detailed view of one embodiment of a multi-stage dedicated expander apparatus according to the present invention. In particular, FIG. 54 shows apparatus 5460 including storage unit 5432, first stage 5462, and second stage 5464. First stage 5462 comprises inlet module $A_3$ in fluid communication with separator module $B_4$ through expansion module $E_{34}$. First stage 5462 receives air for compression from storage unit 5432.

First stage 5462 is in turn in fluid communication with second stage 5464. Second stage 5464 comprises inlet module $A_2$ in fluid communication with separator module $B_3$ through expansion module $E_{23}$. Second stage 5464 is in turn in fluid communication with an outlet 5457.

Figure 54A:
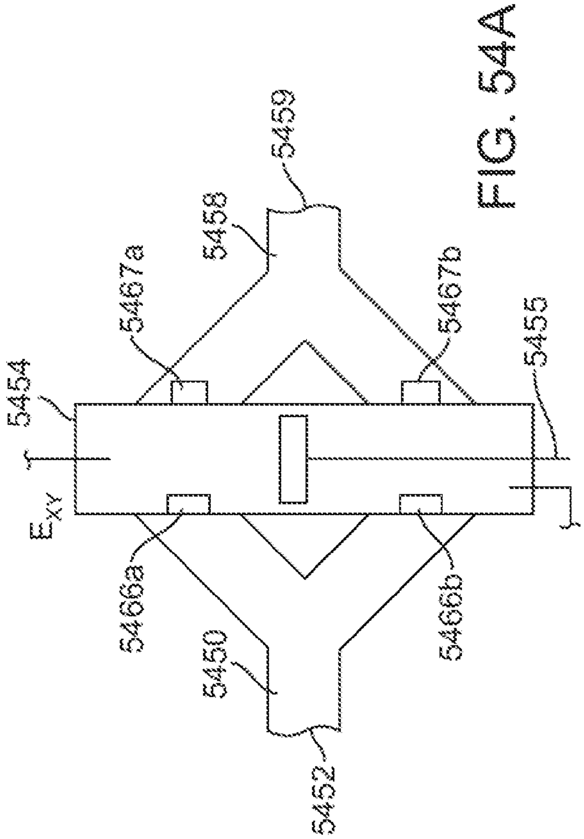
FIG. 54A shows a simplified view of an embodiment of one modular element of the system of FIG. 54.

Certain of the different component modules of the multi-stage dedicated expander apparatus 5460 may also be represented in FIGS. 53BA and 53BB as described above. Dedicated expander apparatus 5460 further includes expansion module $E_x$, shown in FIG. 54A.

The architecture and operation of one embodiment of such an expansion module has been previously described. In particular, the expansion module comprises a conduit 5458 in fluid communication with an inlet 5459 and in fluid communication with a cylinder 5454 through valves 5467*a* and 5467*b*. Conduit 5450 is in fluid communication with cylinder 5454 through valves 5466*a* and 5466*b*, and in fluid communication with an outlet 5452.

Double-acting piston 5455 is disposed within cylinder 5454. Double-acting piston is in communication with an apparatus (not shown) for converting mechanical power into energy, for example a generator. Expansion of air within the cylinder serves to drive movement of the piston. Such expansion is generally shown and described above.

In the first stage 5462 of multi-stage dedicated expander apparatus 5460, the liquid outlet of the separator module $B_4$ is in fluid communication with the chamber of the expansion module $E_{34}$ through a first heat exchanger H.E.$_{43}$. In the second stage 5464 of multi-stage dedicated expander apparatus 5460, the liquid outlet of the separator module $B_3$ is in fluid communication with the chamber of the expansion module $E_{23}$, through a second heat exchanger H.E.$_{32}$.

A dedicated multi-stage expander apparatus according to the present invention is not limited to the particular embodiment shown in FIG. 54. In particular, while the embodiment of FIG. 54 shows an apparatus wherein separated liquid is recycled for re-injection into the gas flow within an individual stage, this is not required by the present invention.

Figure 55:
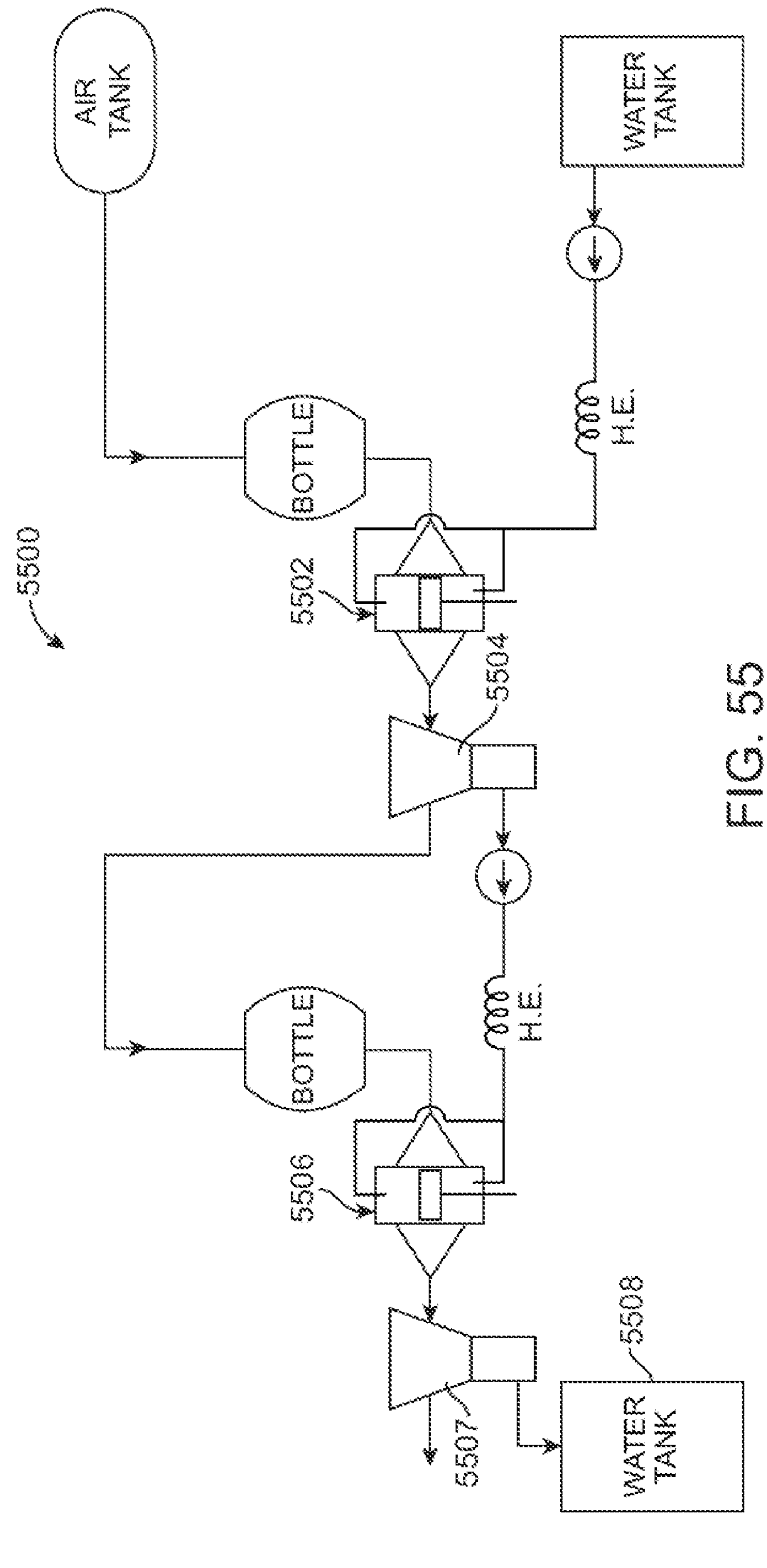
FIG. 55 is a simplified diagram showing an alternative embodiment of a multistage dedicated expander according to the present invention.

FIG. 55 shows an alternative embodiment of a dedicated multi-stage expander apparatus in accordance with the present invention. In the system 5500 according to this embodiment, liquid injected into the expansion chamber 5502 of a first stage, is subsequently separated by separator 5504 and then flowed for injection into the expansion chamber 5506 of the next stage. This configuration results in separator 5507 causing accumulation of the finally separated liquid in the tank 5508.

The embodiment of FIG. 55 does not require liquid to be injected against a pressure differential. In the particular embodiment of FIG. 54A, the separated liquid is flowed back to the into the inlet gas flow having the elevated pressure of the previous higher pressure stage. By contrast, the embodiment of FIG. 55 has the separated liquid flowed into the expanded gas that is inlet to the next stage, reducing the power consumed by the pump in flowing the liquid.

Figure 56:
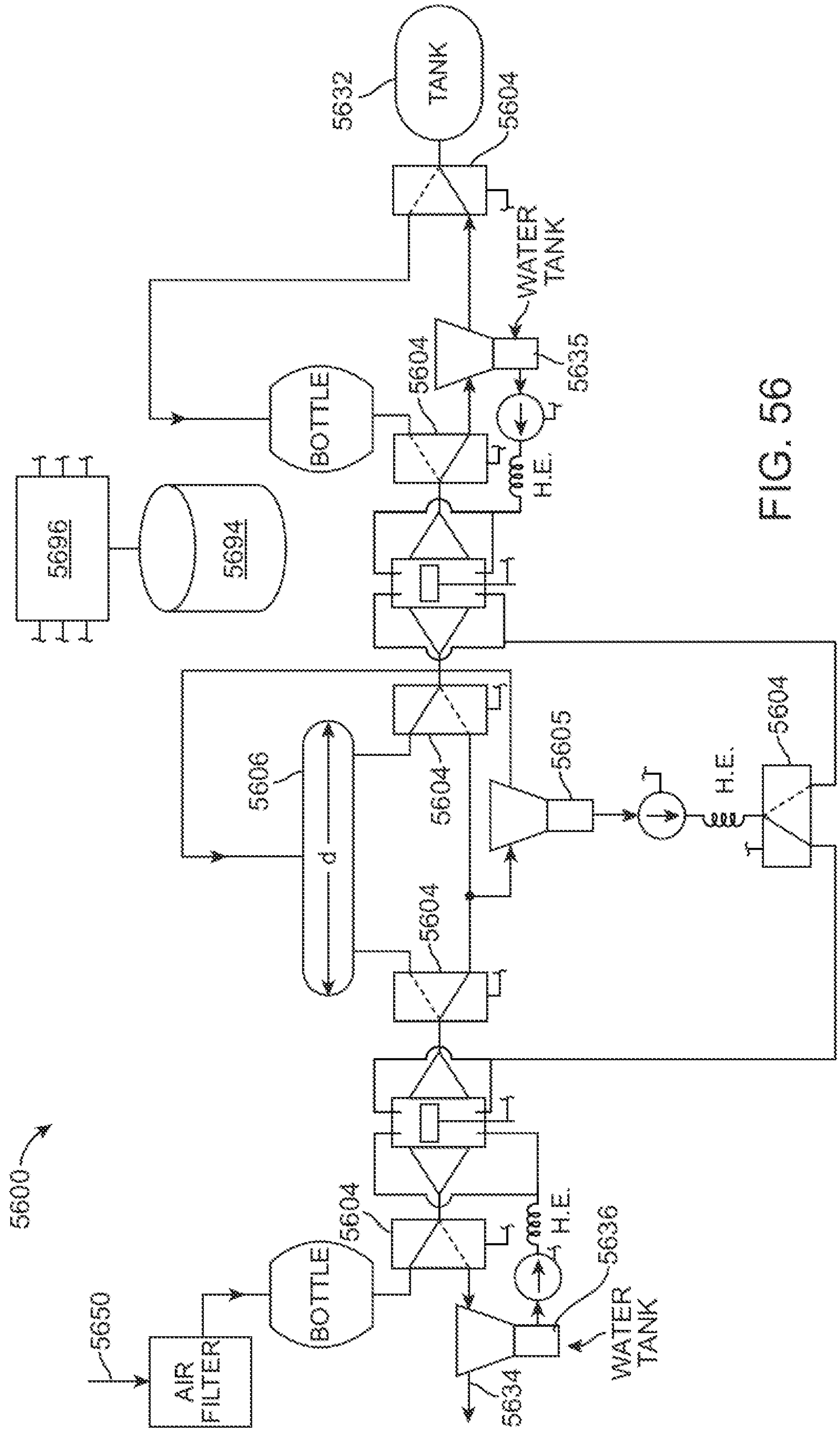
FIG. 56 is a simplified diagram showing an embodiment of a multistage apparatus according to the present invention that is configurable to perform compression or expansion.

While the embodiments of multi-stage apparatus described so far have been dedicated to either compression or expansion, alternative embodiments in accordance with the present invention could perform both compression and expansion. FIG. 56 shows a simplified schematic view of one embodiment of such an two-stage apparatus that allows both compression and expansion.

In particular, the embodiment of FIG. 56 combines a number of design features to produce a system that is capable of performing both compression and expansion. One feature of system 5600 is connection of certain elements of the system through three-way valves 5604. FIG. 56 depicts the configuration of the three-way valves as solid in the compression mode, and as dashed in the expansion mode.

One feature of the system 5600 is the use of the same reservoir 5605 to contain liquid for introduction in both the compression mode and in the expansion mode. Specifically, during compression the reservoir 5605 is utilized to inject liquid into gas that is already at a high pressure by virtue of compression in the previous stage. During expansion, the reservoir 5605 is utilized to inject gas into the high pressure gas at the first stage. In multi-stage apparatuses having mixing chambers commonly used in both compression and expansion, the pressures of inlet gas flows to those mixing chambers would be approximately the same in order achieve the desired gas-liquid mixture.

Still another feature of the system 5600 is the use of a pulsation damper bottle 5606 that is elongated in one or more dimensions (here, along dimension d). The elongated shape of the pulsation damper bottle 5606 allows for multiple connections between the bottle and adjacent elements, while allowing the conduits for fluid communication with those adjacent elements to remain short. This bottle functions to dampen pulsations in fundamentally the same manner as has been previously described for the bottles of the single-stage embodiments.

FIG. 56 is a simplified view showing the elongated pulsation damper bottle in schematic form only, and the shape of the elongated bottle should not be construed as being limited to this or any other particular profile. For example, alternative embodiments of a pulsation damper bottle could include one or more lobes or other elongated features.

Under operation in a compression mode, gas enters system 5600 through inlet 5650 and is exposed to two successive liquid injection and compression stages, before being flowed to storage unit 5632. Separated liquid accumulates in tank 5635, which may be insulated to conserve heat for subsequent reinjection to achieve near-isothermal expansion in an expansion mode.

Specifically, under operation in an expansion mode, compressed gas from storage unit 5632 is exposed to two successive liquid injection and expansion compression stages, before being flowed out of the system at outlet 5634. Separated liquid accumulates in tank 5636, and may be subsequently re-injected to achieve near-isothermal compression in a compression mode.

In the embodiment of the system of FIG. 56, the flow of separated liquid across different stages results in accumulation at a final separator, in a manner analogous to the embodiments of FIG. 53C (dedicated compressor) and FIG. 55 (dedicated expander). Such embodiments require the fluid reservoirs to be larger to accommodate the directional flows of liquids which occur. These accumulated liquids can be flowed back to their original reservoirs by reversing the mode of operation of the system.

Figure 57:
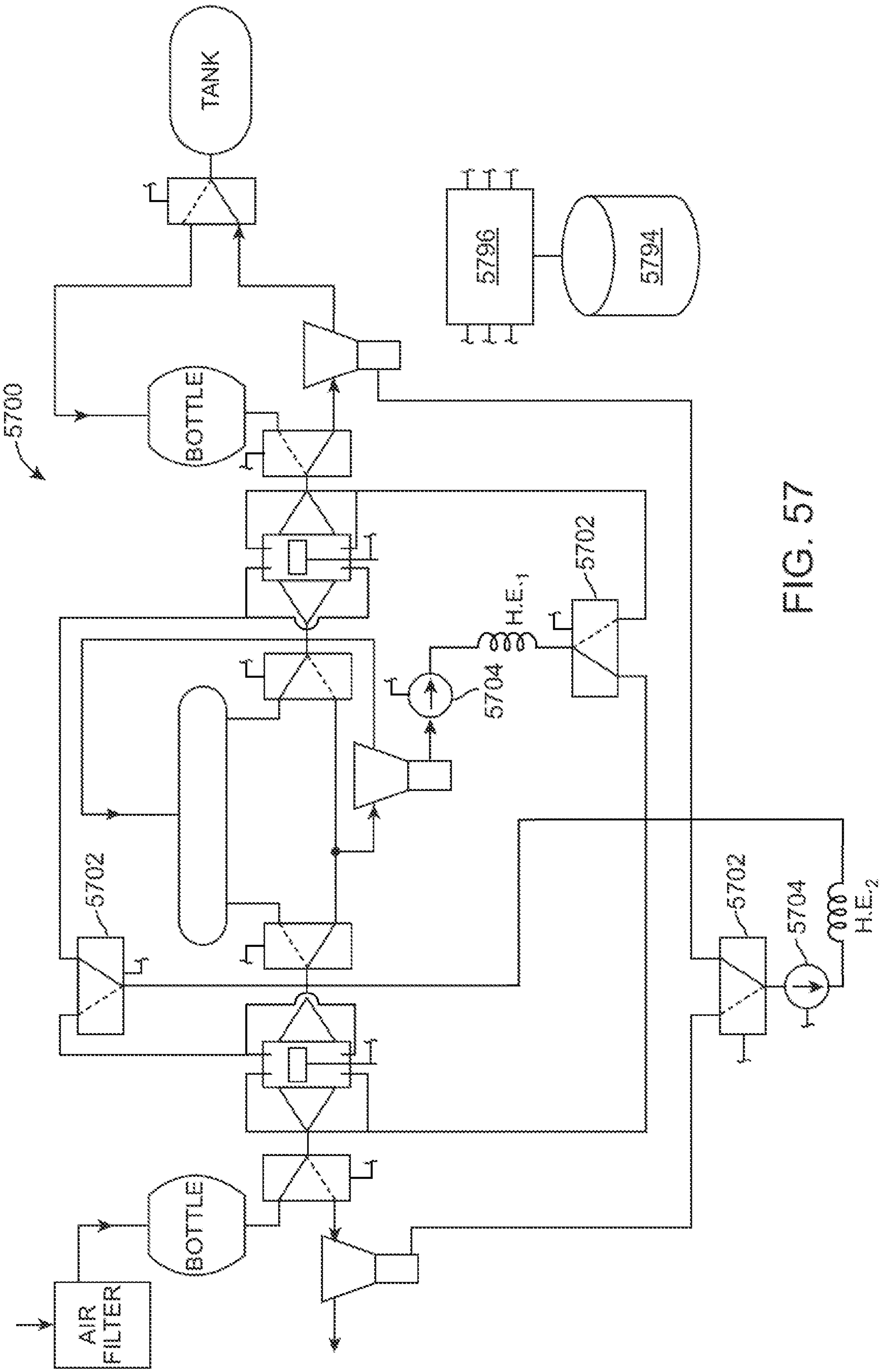
FIG. 57 is a simplified diagram showing an alternative embodiment of a multistage apparatus according to the present invention that is configurable to perform compression or expansion.

FIG. 57 is a simplified diagram showing a multi-stage apparatus in accordance with an embodiment of the present invention, which is configurable to perform both compression and expansion. In particular, system 5700 represents a modification of the embodiment of FIG. 56, to include additional three-way valves 5702 and additional conduits between certain separator elements and certain compression/expansion chambers. Again, FIG. 57 depicts the configuration of the three-way valves as solid in the compression mode, and as dashed in the expansion mode.

While the embodiment of FIG. 57 offers some additional valve and conduit complexity, it may eliminate certain elements. In particular, it is noted that compression and expansion do not occur simultaneously, and hence all three heat exchangers and pumps of the embodiment of FIG. 57 are not required to be in use at the same time. Thus, system 5700 utilizes only two heat exchangers (H.E.1 and H.E.2) and two pumps (5704), versus the three heat exchangers and three pumps of the embodiment of FIG. 56.

Moreover, the embodiment of FIG. 57 restricts the circulation of liquids to within a stage. Thus, the flow of liquids is not such that liquids accumulate in one reservoir, and so the liquid reservoirs do not need to be made larger as in the embodiment of FIG. 56. In addition, the embodiment of FIG. 57 does not erode the energy of the compressed air in accomplishing liquid injection across stages.

Certain of the previous embodiments have described the use of one or more pumps to flow liquids for introduction into gas undergoing compression or expansion. In certain embodiments, one or more such pumps may be actuated separately from the moveable member (such as a piston) present within the compression or expansion chamber. For example the pump(s) could be powered by electricity, which may or may not be that which is generated by operation of the system.

Embodiments discussed previously have shown liquid as being flowed through the system utilizing a pump, which can be of various types, including non-positive displacement pumps such as centrifugal, diaphragm, or other forms. Because, however, the pressure within a compression or expansion chamber is generally changing, certain embodiments of the present invention may benefit from the use of positive displacement pumps to provide a liquid flow into an expansion/compression chamber.

Figure 85:
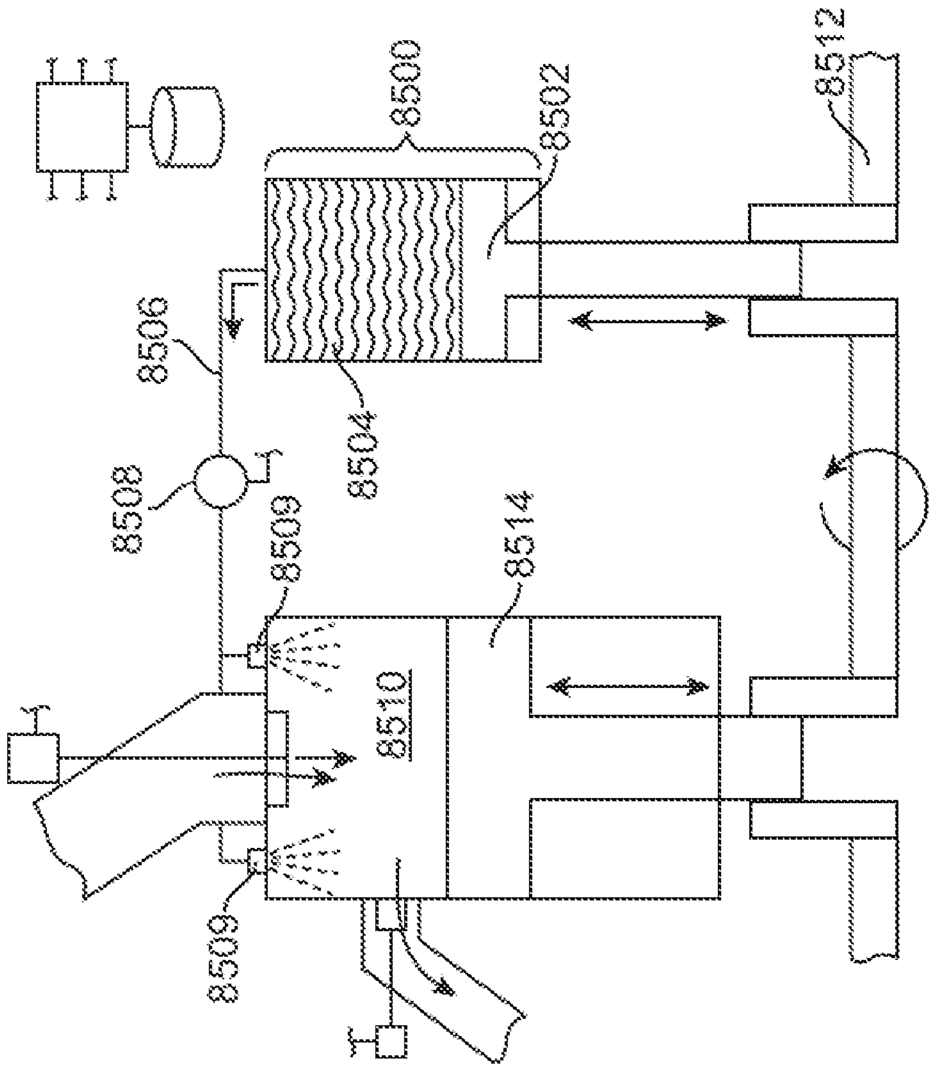

Accordingly, FIG. 85 shows an embodiment where a positive displacement pump 8500 in the form of a piston 8502 moveable within liquid-filled cylinder 8504, is used. Liquid is flowed out of the cylinder 8504 through valve 8508 and conduit 8506 leading to sprayers 8509 within compression and/or expansion chamber 8510.

The positive displacement pump of FIG. 85 may provide a flow of liquid having desirable characteristics. In particular, as piston 8514 moves, the pressure changes within cylinder 8510. If nozzles 8509 were supplied with liquid at a fixed pressure, the differential pressure across the nozzle could vary over the course of a piston stroke.

Thus at certain times the differential pressure could have been higher than needed (possibly wasting energy). At other times the differential pressure could have been too low (making the spray ineffective and thus reducing compressor efficiency). By driving the nozzles with a constant displacement pump, however, the differential pressure may be maintained at a desirable value throughout a stroke by controlling the pump synchronous with the compressor piston.

During compression, it may be beneficial for pistons 8514 and 8502 to move in phase with each other. During expansion, it may be advantageous for the pistons to move 180° out of phase. In other embodiments, different phase angles may be appropriate. Other embodiments may be effective with asynchronous actuation of pump and compressor/expander elements.

In addition to providing more uniform flows of liquid in the face of varying pressures within compression/expansion cylinder, the particular embodiment of FIG. 85 may efficiently harness available energy. Specifically, because the piston 8502 of the liquid pump 8500 is driven by the same physical linkage 8512 (here a crankshaft) as the piston 8514 of the compression/expansion cylinder, energy is not consumed from a second source, nor is the original energy of the compression/expansion needed to be converted into another form in order to drive the flow of the liquid.

While the particular embodiment of FIG. 85 shows liquid flowed to a chamber from a positive displacement pump in the form of a piston pump, this is not required by the present invention. Certain embodiments could employ other forms of positive displacement pumps to flow liquid, including but not limited to peristaltic pumps, progressing cavity pumps, gear pumps, or roots-type pumps.

Certain embodiments of systems according to the present invention may utilize a plurality of liquid pumps. For example FIG. 86 shows an embodiment of a compression system including a non-positive displacement (centrifugal) transfer pump in fluid communication with a positive displacement multi-stage water pump. Flows of liquid from the transfer pump to the multi-stage water pump utilize a Proportional-Integral-Derivative (PID) loop around the transfer pump as shown. The PID loop is configured to maintain a target pressure (or other parameter such as flow rate) into the multi-stage water pump.

While certain embodiments of the present invention may employ a pump to flow liquid through a system, in other embodiments a separate liquid pump structure may not be required. For example, FIG. 87 shows an embodiment wherein liquid is flowed utilizing pressure within a compression or expansion chamber.

Specifically, in FIG. 87 liquid from reservoir 8700 of is flowed into sprayer 8702 of chamber 8704 of stage 8706 of multi-stage system 8708. Reservoir 8700 includes a head space 8710 containing gas whose pressure provides the force that flows the liquid to the sprayer.

In particular, the head space 8710 is in selective gaseous communication with the chambers of other stages 8712, through liquid flow valve network 8714. Liquid flow valve network 8714 is precisely actuated based upon inputs received by a controller.

At a point when a gas pressure within another stage is strong enough to flow liquid from the reservoir into the chamber 8704, the liquid flow valve network 8714 is actuated to allow gaseous communication between head space 8712 and that other stage. Precise control over the liquid flow valve network can allow conveyance of only an amount of pressure necessary to flow the liquid, thereby conserving overall energy within the system.

In certain embodiments, the function of one or more gas or liquid flow valves may be performed by the moveable member itself. For example, passive port valves are conventionally used in two-stroke internal combustion engines. These ports control the transfer of air-fuel mixture from the crankcase to the cylinder, where combustion occurs, and the exhausting of the combusted gases from the cylinder.

FIG. 84 shows an embodiment in which vertical movement of the piston 8400 may selectively obstruct a port 8402 to the chamber 8404 (here a gas flow inlet port to a compression chamber), thereby effectively serving as an inlet valve. Such a configuration has been employed in the design of conventional two-stroke engines.

By eliminating the need for some valve structures, such embodiments may simplify the design of the apparatus, potentially reducing cost and maintenance. Embodiments obviating the need for certain valves may also facilitate introduction of liquid into the chamber, for example as droplets created in an upstream mixing chamber. In particular, elimination of elements (such as valve seats, valve plates) otherwise offering surfaces for possible coalescence of liquid droplets, could ultimately improve the quality (volume, velocity, droplet size uniformity, number of droplets, etc.) of liquid introduced for heat exchange during compression/expansion.

While the embodiment of FIG. 84 shows movement of the piston serving to control flows of gas into a chamber for compression, the present invention is not limited to this particular configuration. Various embodiments could employ movement of a piston to control flows of liquids to/from a chamber, and/or flows of gases inlet or outlet from a chamber in which expansion or compression is taking place.

Moreover, while the particular embodiment of FIG. 84 shows a piston and chamber having symmetrical shapes, this is also not required by the present invention. In alternative embodiments a piston and cylinder surfaces may be shaped to allow flows of material while achieving goals such as minimizing dead volume and/or accommodating the actuation of other valves within the chamber.

Embodiments of the present invention utilizing port valves may exhibit one or more possible benefits over other valve types such as plate and poppet valves. One possible benefit is that port valves lack moving parts beyond the moveable member itself, and are therefore less expensive and more reliable. Another possible benefit of systems utilizing port valves is that the port valve opening can be quite large, allowing a high flow rate.

Still another possible benefit is that gas can pass through the port valve without having to make rapid turns or changes in direction. Such a configuration may further improve flow rate. This configuration also may allow gas-liquid aerosols (for example as may have been created in an upstream mixing chamber) to pass through with minimal obstruction, thereby making it easier to keep the liquid droplets entrained in the gas.

Passive port valves may not be able to be controlled separately from the piston or other moveable member. If the port valve or valves are to be controlled separately from the moveable member, this can be accomplished for example by using a second piston (or other type of moveable member) controlled via a second linkage such as a crankshaft or other mechanism.

For example, FIG. 139 shows a simplified view of a system 13900 comprising a piston actuator 13902 and one or more port openings 13904 in the side of a cylindrical chamber 13906 that is in fluid communication with the compression/expansion chamber 13908. The port openings 13904 may be used to introduce gas (or a mixture of gas and liquid droplets) into the compression/expansion chamber 13908.

The piston actuator may move separately from, and in the opposite direction to, the moving member 13910 (for example, a piston) responsible for compression or expansion of gas.

In some embodiments, the actuator piston may be operated via a mechanical linkage connected to the same crankshaft or other mechanism that is driving the movable member. In these embodiments, the actuator piston and the movable member move synchronously and reach TDC simultaneously.

In some embodiments, the timing of the actuator piston is independent of that of the movable member. This may allow control of the compression/expansion ratio and other system parameters.

Some embodiments utilizing passive port valves may include a moveable sliding window that can partially occlude the opening of the port. This allows the flow of gas or gas-liquid mixture through the port to be controlled. Such flow control may in turn allow the system power to be "throttled"—that is, increased or decreased during operation. According to certain embodiments a position of a moveable sliding window may be adjusted by a separate actuating mechanism that is under computer or mechanical control.

While certain embodiments according to the present invention utilize a liquid for injection in a plurality of the stages, this is not required. For example one or more stages of particular multi-stage embodiments may not utilize the introduction of liquids at all. Moveable members suitable for use in such stages include regular turbines, blowers, and centrifugal pumps, in addition to those previously described above.

Moreover, while certain embodiments of multi-stage apparatuses may utilize the injection of the same liquid between stages, this is not required by the present invention, and certain embodiments may feature the injection of different liquids in different stages. In some such embodiments, these liquids may be maintained entirely distinct between the stages, for example utilizing separate, dedicated gas-liquid separators, reservoirs, and pumps.

According to alternative embodiments, however, different liquids sharing one or more components could be injected at various stages. In such embodiments, the non-common component of the liquid could be separated, allowing the common component to be circulated between stages.

For example, in some embodiments one or more expansion stages may utilize injection of liquid as pure water, while other expansion stages utilize injection of liquid as a water-propylene glycol solution. In such embodiments, the propylene glycol could be separated prior to flowing the water between the stages.

Moreover, as described above, some embodiments of single or multi-stage apparatuses may be configured to use the same chamber(s) for both compression and expansion. Certain embodiments of such apparatuses may introduce different liquids, depending upon their particular operational mode.

According to certain embodiments of the present invention, these different liquids introduced during compression and expansion, may be maintained separate, within a stage and/or between stages. And where the different liquids share common components, liquid-liquid separation may be employed to allow circulation of liquid components between different stages or within the same stage operating in different modes.

Embodiments of the present invention utilizing separation of components from a liquid may be depicted generically in FIG. 88 as including liquid flow and separation network 8800 receiving liquid separated from gas in separator structures 8802. Liquid flow and separation network 8800 may comprise a variety of elements selected from conduits, valves, pumps, reservoirs, heat exchangers, accumulators, filters, and separator structures, arranged in appropriate combinations. In certain embodiments, such a liquid flow and separation network may be combined with a liquid flow valve network as described above in FIG. 87.

In some embodiments, motive force driving the liquid through the spray nozzle or nozzles into the cylinder may arise from the pressure differential created by the action of the compressor or expander. FIG. 138 shows a simplified view of an embodiment 13800 of such as system.

In the case of compression, the liquid separated from the gas-liquid mixture via the gas-liquid separator 13802 is at a higher pressure than that of the gas entering the compression chamber. Thus, there is a pressure differential across the spray nozzle 13804.

In some embodiments, this differential is sufficient to overcome the pressure drop through the nozzle. The system can be designed to provide the proper pressure difference to cause the liquid to introduced into the nozzle to create the desired spray.

In some embodiments the system could be designed with a variable flow valve 13806 to provide the proper pressure difference. Certain embodiments of systems may be designed with suitable choices of system components and geometry to achieve the proper pressure difference.

Once expansion has begun, the gas-liquid mixture flowing from the next higher-pressure stage will have a higher pressure than the cylinder contents. This pressure differential from the high-pressure gas 13810 can be used (as in the compression case described above) to drive the liquid separated from the gas via the gas-liquid separator through the spray nozzle.

Some embodiments previously described use a spray nozzle structure to introduce liquid spray into a cylinder during compression or expansion. However this is not required by the present invention, and certain embodiments may utilize other types of spray systems.

For example, FIG. 137 shows a simplified cross-sectional view of one such embodiment of an apparatus 13700. Specifically, liquid 13702 is introduced into a volume between the top of the piston 13704 and a nozzle plate 13706 via a liquid inlet 13708 and valve 13710 when the piston is near BDC.

During compression, as the piston is driven from BDC towards TDC, the piston pushes the liquid volume against the nozzle plate. The motion of the nozzle plate is resisted by the force of a compressible member 13712 (for example a spring) connecting the top of the cylinder 13720 to the nozzle plate.

The force differential between the pressure exerted by the cylinder and the spring drives the liquid through the orifices (which may define internal spaces more complex than simple openings) in the nozzle plate. This creates a spray in the upper portion of the cylinder.

During expansion the behavior is similar, although in the opposite direction. The spring is compressed at the beginning of the expansion stroke near TDC. As the spring expands, it pushes the nozzle plate down into the liquid volume, driving some of the liquid through the orifices to form a spray.

Embodiments of the present invention do not require the direct injection of liquids into the compression or expansion chamber of every stage. Certain embodiments could employ direct liquid injection in no stages or only in some stages. Stages not employing direct liquid injection may be coupled with stages having a gas-liquid mixture introduced to the compression/expansion chamber through a separate mixing chamber.

Certain embodiments may utilize one or more stages in which liquid is introduced into the gas by other than a spray, for example by bubbling gas through a liquid. For example, in certain embodiments some (typically lower-pressure) stages might employ the liquid mist technique utilizing a mixing chamber or direct injection, while other (typically higher-pressure) stages may employ the introduction of liquid by bubbling.

Embodiments of compressed gas storage systems in accordance with the present invention are not limited to any particular size. In certain applications, it may be useful for the system to fit within a particular form factor, such as a standard shipping container. Another example of a form factor are standard sizes/weights of the trailer of a tractor-trailer rig, which could potentially allow the use of embodiments of energy storage systems in portable applications.

In some cases it may be useful for the system to be able to be assembled by a single person, for example with the system assembled from individual components weighing 50 lbs or less. In some instances it may be desirable for the system to be installable in one day or less.

Particular embodiments of the present invention may allow for control over the temperature change of one or more stages. Certain embodiments may allow the compression and/or expansion of gas across multiple stages, wherein approximately the same change in temperature of the gas occurs at each stage.

In designing a system, the designer may choose the initial and final gas temperature, and then iteratively solve a system of equations to determine the other system parameters, notably the compression ratio, that will achieve the desired delta-T.

In operating a system, a temperature change during the compression or expansion stroke may be a number chosen by the designer (or operator) of the system. This temperature change may represent a trade-off against efficiency. The higher the delta-T, the higher the power but the lower the efficiency.

According to some embodiments, such substantially equivalent change in gas temperature at different stages may be achieved where each of the stages does not necessarily utilize the same compression or expansion ratio. In some embodiments, the compression ratio or expansion ratio of a stage may be dynamically controlled, for example based upon a timing of actuation of valve responsible for the intake or exhaust of gas from the compression and/or expansion chamber.

Figure 58:
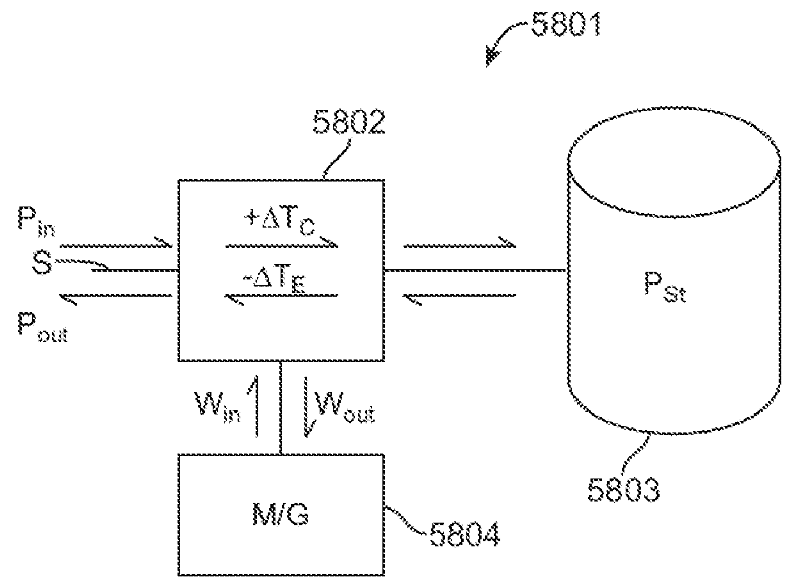
FIG. 58 is a simplified schematic representation of an embodiment of a single stage compressed air storage and recovery system.

FIG. 58 shows a simplified block diagram of one embodiment of a single-stage system 5801 in accordance with the present invention. FIG. 58 shows compressor/expander 5802 in fluid communication with gas inlet 5805, and with compressed gas storage unit 5803. Motor/generator 5804 is in selective communication with compressor/expander 5802.

In a first mode of operation, energy is stored in the form of a compressed gas (for example air), and motor-generator 5804 operates as a motor. Motor/generator 5804 receives power from an external source, and communicates that power ($W_{in}$) to cause compressor/expander 5802 to function as a compressor. Compressor/expander 5802 receives uncompressed gas at an inlet pressure ($P_{in}$), compresses the gas to a greater pressure for storage ($P_{st}$) in a chamber utilizing a moveable element such as a piston, and flows the compressed gas to the storage unit 5803.

In a second mode of operation, energy stored in the compressed gas is recovered, and compressor-expander 5802 operates as an expander. Compressor/expander 5802 receives the compressed gas at the stored pressure $P_{st}$ from the storage unit 5803, and then allows the compressed gas to expand to a lower outlet pressure $P_{out}$ in the chamber. This expansion drives a moveable member which is in communication with motor/generator 5804 that is functioning as a generator. Power output ($W_{out}$) from the compressor/expander and communicated to the motor/generator 5804, can in turn be input onto a power grid and consumed.

The processes of compressing and decompressing the gas as described above, may experience some thermal and mechanical losses. However, these processes will occur with reduced thermal loss if they proceed at near-isothermal conditions with a minimum change in temperature. Thus compression will occur with reduced thermal loss if it proceeds with a minimum increase ($+\Delta T_C$) in temperature, and expansion will occur with reduced thermal loss if it proceeds with a minimum decrease ($-\Delta T_E$) in temperature.

Embodiments of the present invention may seek to minimize the change in temperature associated with gas compression and/or expansion, and hence accompanying thermal losses, by performing such compression/expansion over a plurality of stages. Such compression and expansion over multiple stages is now discussed below.

Figure 58A:
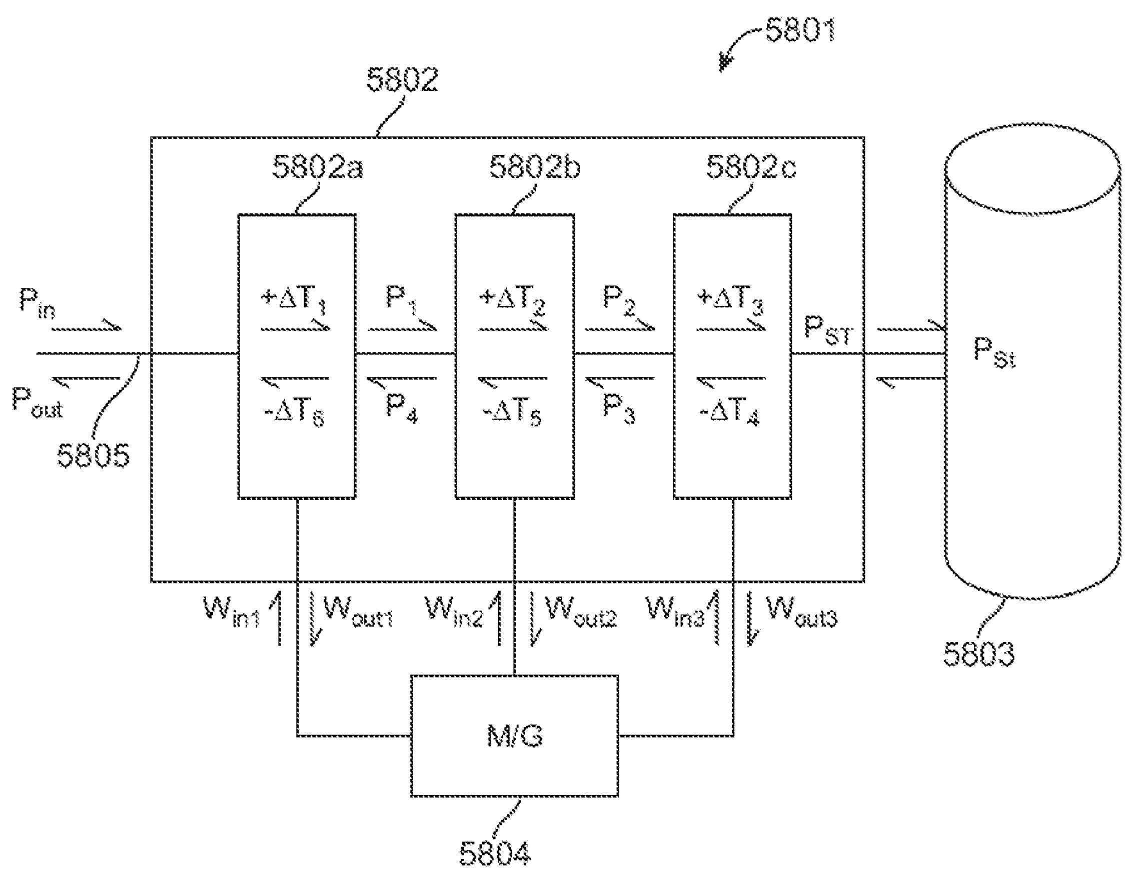
FIGS. 58A-C are simplified schematic representations of embodiments of multi-stage compressed air storage systems according to the present invention.

FIG. 58A shows a simplified generic view of an embodiment of a multi-stage compression-expansion apparatus. FIG. 58A shows compressor/expander 5802 in fluid communication with gas inlet 5805, and with compressed gas storage unit 5803. Motor/generator 5804 is in selective communication with compressor/expander 5802.

In this embodiment, compressor/expander 5802 actually comprises a plurality of stages 5802*a-c* that are connected in serial fluid communication. While the particular embodiment of FIG. 58A shows a system having three such stages, in accordance with embodiments of the present invention two or any greater number of stages could be employed.

In a compression mode of operation, each stage of the compressor/expander 5802 is configured to receive an inlet gas at a lower pressure, to compress that gas to a higher pressure, and then to flow the compressed gas to the next higher pressure stage (or in the case of the highest pressure stage, to flow the compressed gas to the storage unit). Thus FIG. 58A shows inlet gas experiencing a first increase in pressure from $P_{in}$ to $P_1$ in stage 5802*a*, experiencing a second increase in pressure from $P_1$ to $P_2$ in stage 5802*b*, and then experiencing a final increase in pressure from $P_2$ to $P_{st}$ in third stage 5802*c*.

At each stage, a certain amount of power (here $W_{in1}$, $W_{in2}$, and $W_{in3}$, respectively) is consumed from motor/generator 5804 that is operating as a motor. Also at each stage, the increased pressure of the compressed gas is associated with a corresponding increase in the temperature of the gas (here $+\Delta T_1+$, $\Delta T_2$, and $+\Delta T_3$ respectively).

In an expansion mode of operation, each stage of the compressor/expander 5802 is configured to receive an inlet gas at a higher pressure, to allow that gas to expand to a lower pressure, and then to flow the expanded gas either to the next lower pressure stage (or in the case of the lower pressure stage, to flow the expanded air out of the system). Thus FIG. 58A also shows stored gas experiencing a first decrease in pressure from $P_{st}$ to $P_3$ in stage 5802*c*, experiencing a second decrease in pressure from $P_3$ to $P_4$ in stage 5802*b*, and then experiencing a final decrease in pressure from $P_4$ to $P_{out}$ in third stage 5802*c*. It is noted that the pressure output from the system can, but need not be the same as the original inlet pressure.

At each stage, a certain amount of power (here $W_{out3}$, $W_{out2}$, and $W_{out1}$, respectively) is produced and output to motor-generator 5804, operating as a generator. Also at each stage, the decreased gas pressure is associated with a corresponding decrease in temperature of the gas (here $-\Delta T_4$, $-\Delta T_5$, and $-\Delta T_6$ respectively).

Figure 58B:
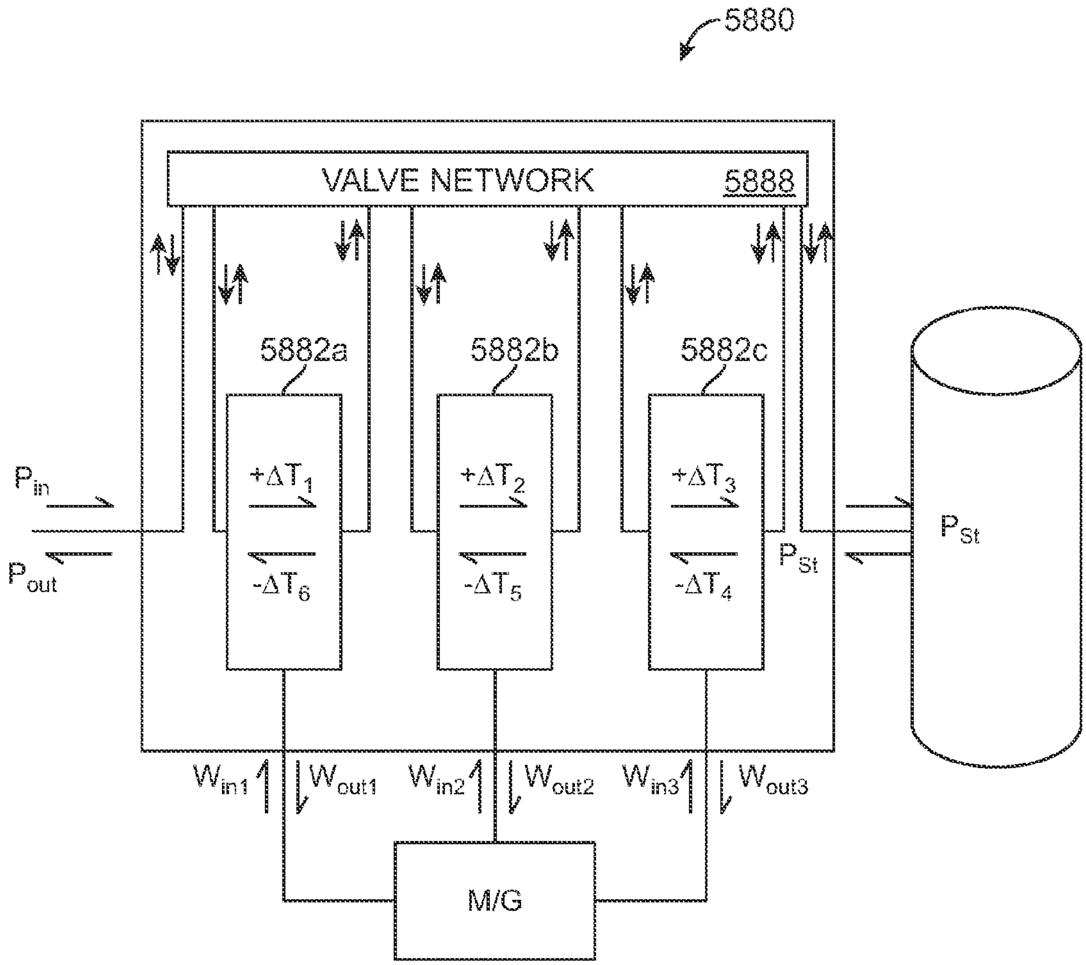

While FIG. 58A shows an apparatus in which each stage is in communication with the preceding and following stages, this is not required by the present invention. FIG. 58B shows a simplified view of an embodiment of a system 5880 wherein the stages 5882*a-c* are in fluid communication with a valve network 5888, whose actuation allows selective routing of gas flows between stages. Thus utilizing the embodiment of FIG. 58B, one or more stages could selectively be utilized, or by-passed, depending upon the specific conditions. For example, where prior expansion of gas from the storage tank has reduced the pressure to a low relatively value, continued expansion may not need to be performed over all of the stages. Similarly, compression to lower pressures may not require all stages, and use of the valve network permits one or more stages to be selectively by-passed.

Figure 58C:
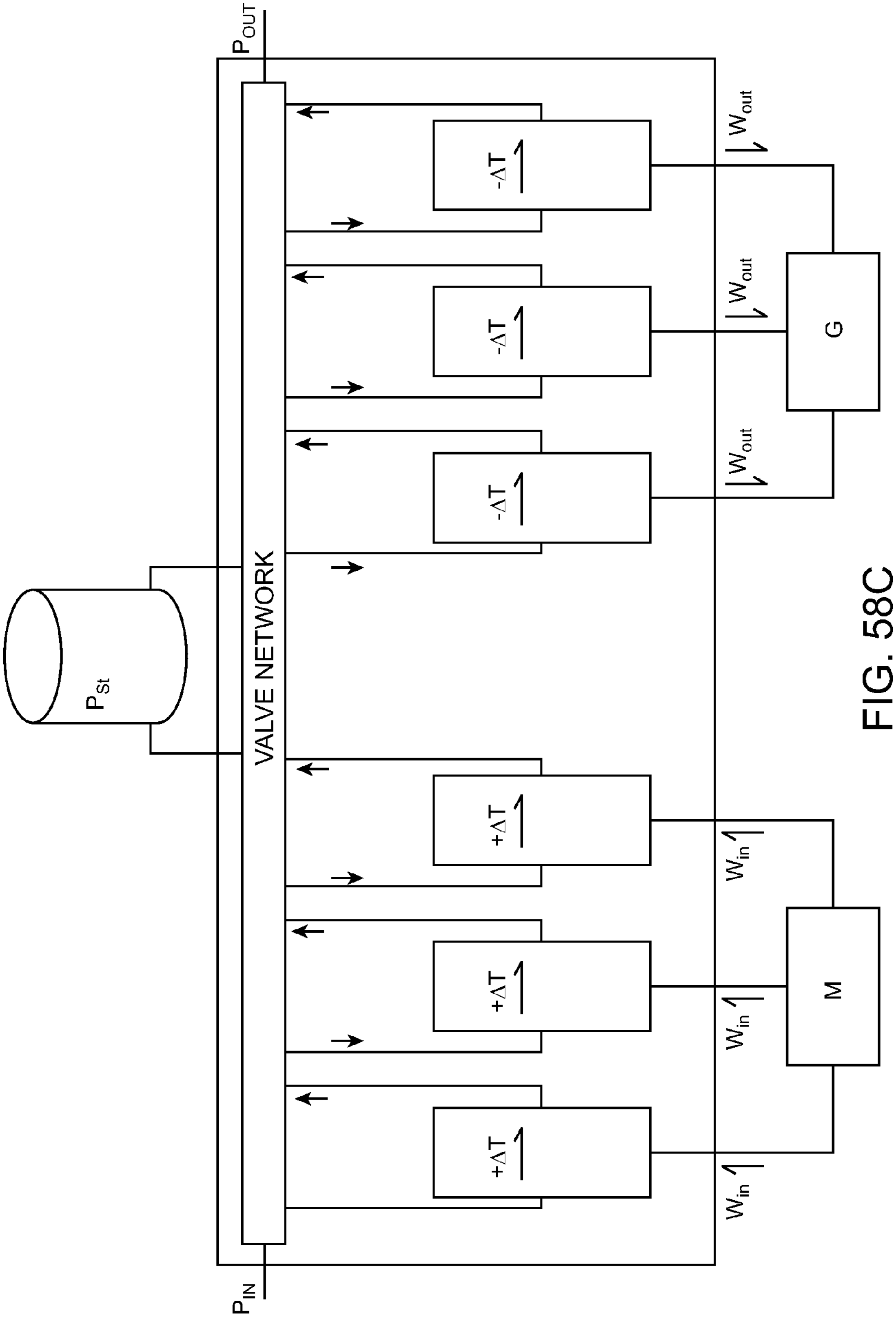

And while FIGS. 58A-B show apparatuses that are configurable to perform either compression or expansion in each stage, the present invention is not limited to such embodiments. Alternative embodiments of apparatuses in accordance with the present invention can be drawn to multi-stage apparatuses dedicated to performing only compression or only expansion. A simplified view of such an embodiment is shown in FIG. 58C.

In certain embodiments according to the present invention, a temperature change experienced by each stage may be substantially equivalent (whether the process comprises gas compression or gas expansion). As referenced herein, the term "substantially equivalent" refers to a temperature change that differs by 500° C. or less, by 300° C. or less, by 100° C. or less, by 75° C. or less, by 50° C. or less, by 25° C. or less by 20° C. or less, by 15° C. or less, by 10° C. or less, or by 5° C. or less. The temperature change experienced by one or more particular stages, may be controlled according to embodiments of the present invention, utilizing one or more techniques applied alone or in combination.

Controlling Compression/Expansion Ratio

Temperature of one or more stages may be may be realized by regulating a compression or expansion ratio of the stages. According to some embodiments comprising multiple stages, the compression or expansion ratios of the stages may differ significantly from one another.

Each stage of a multi-stage apparatus for performing compression, expansion, or compression and expansion, will be characterized by a compression ratio and/or expansion ratio. These compression and/or expansion ratios may or may not be the same for different stages.

Figure 59B:
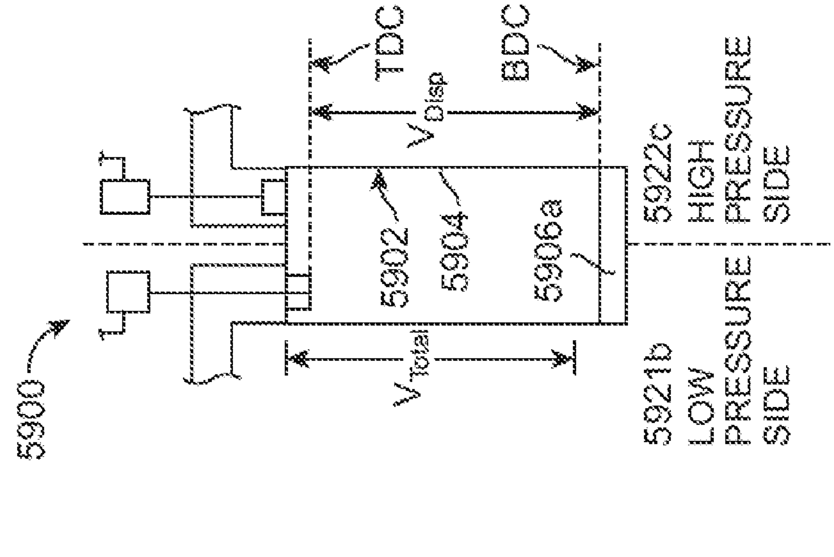
FIGS. 59-59B show views of an embodiment of a stage comprising a cylinder having a moveable piston disposed therein.
Figure 59A:
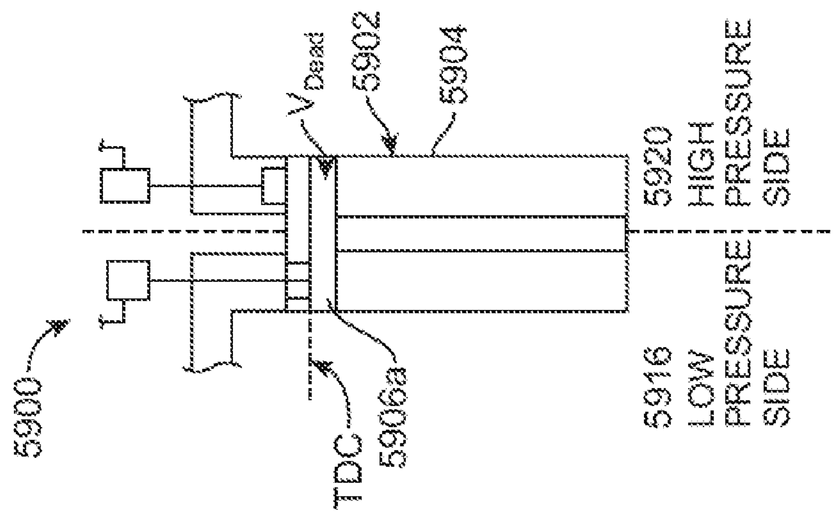
Figure 59:
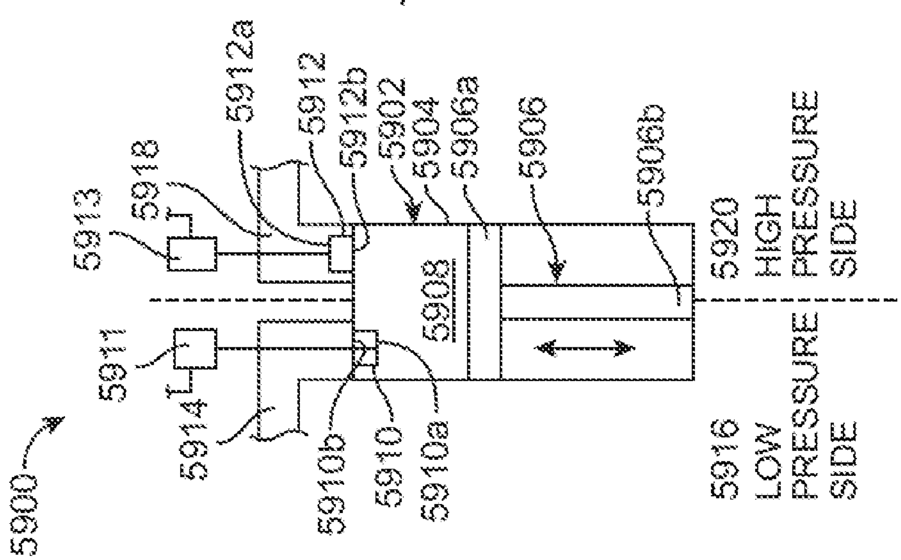

In certain embodiments, the compression and/or expansion processes taking place in each stage, may be performed utilizing a piston that is moveable within a cylinder. FIGS. 59-59B show generic views of such an apparatus.

In particular, FIG. 59 shows that compression and/or expansion stage 5900 comprises cylinder 5902 having walls 5904. Disposed within cylinder 5902 is a moveable piston 5906 comprising a piston head 5906*a* connected to piston rod 5906*b*.

Where the stage is configured to perform compression, the piston rod is in physical communication with an energy source (not shown) through a linkage, which may be mechanical in nature such as a crankshaft. Alternatively, the linkage between the energy source and the piston rod may be hydraulic or pneumatic in nature. The energy source drives movement of the piston within the cylinder to compress air therein.

Where the stage is configured to perform expansion, the piston shaft is in physical communication with a generator (not shown) through the linkage. The generator generates energy from the movement of the piston rod communicated through the linkage.

FIG. 59 presents only a simplified generic view of an embodiment of a compression/expansion stage, and the present invention should not be understood as being limited to a specific element of this diagram. For example, while FIG. 59 shows the piston as being moveable in the vertical direction, this is not required and in various embodiments the piston could be moveable in the horizontal or other directions.

Also, in the particular embodiment of FIG. 59, the gas flow valves 5910 and 5912 are formed in an end wall of the cylinder 5902. FIGS. 59A-59B also show the valves in an end wall of the cylinder for purposes of illustration, but the valves could be positioned elsewhere in the chamber.

Valve 5910 is selectively actuable by an element 5911 such as a solenoid, to move valve plate 5910*a* away from valve seat 5910*b*, thereby allowing fluid communication between the compression and/or expansion chamber 5908 and a conduit 5914 on a low pressure side 5916. Valve 5912 is selectively actuable by an element 5913 such as a solenoid to move valve plate 5912*a* away from valve seat 5912*b*, thereby allowing fluid communication between the compression and/or expansion chamber 5908 and a conduit 5918 on a high pressure side 5920.

As mentioned previously, embodiments of the present invention are not limited to use with valves having any particular structure or configuration relative to the chamber(s). As also mentioned previously, embodiments of the present invention are not limited to a moveable member comprising a reciprocating piston, and other structures could be used, including but not limited to screws, quasi-turbines, and gerotors.

FIG. 59A shows the stage 5900 where the piston head 5906*a* has moved to be at the top (Top Dead Center—TDC) of the cylinder. FIG. 59A shows that at TDC, there is some amount of dead volume ($V_{dead}$) between the upper surface of the piston head 5906, and the end wall of the cylinder.

According to particular embodiments of the present invention, a multi-stage compressor, expander, or compressor/expander may be designed to meet certain criteria regarding the temperature change at each stage.

FIG. 59B shows the stage 5900 where the piston head 5906 has moved to be at the bottom (Bottom Dead Center—BDC) of the cylinder. FIG. 59B shows two volumes.

A total volume ($V_{total}$) of the stage is defined between the top surface of the piston and the upper wall of the cylinder at BDC. A displacement volume ($V_{displacement}$) of the stage is defined between the top surface of the piston at BDC and at (Top Dead Center—TDC). The dead volume represents the difference between the total volume and the displacement: $V_{dead}=V_{total}-V_{displacement}$.

A value quantifying the action of stage 5900 is its compression ratio or expansion ratio, generically referred to here as r. The compression or expansion ratio may be expressed in the following Equation (1'):

$$r = \frac{V_{total}}{V_{closed}}, \tag{1'}$$

where:

Where $V_{closed}$ is the volume of the cylinder when the intake valve closes during expansion or the exhaust valve opens during compression.

In the expansion case, the volumes $V_{closed}$ and $V_{total}$ may differ from each other due not only to the dead volume, but also due to closure of a gas inlet valve prior to the piston reaching BDC during an expansion stroke, and also due to closure of a gas exhaust valve prior to the piston reaching TDC during an exhaust stroke. In the case of compression, $V_{closed}$ may differ from $V_{total}$ due not only to the dead volume, but also due to opening of a gas exhaust valve prior to the piston reaching TDC during a compression stroke.

In a multi-stage compression/expansion apparatus having the same compression or expansion ratio at each stage, a stage's compression or expansion ratio r is the Nth root of the overall compression or expansion ratio. That is:

$$r = \sqrt[N]{R} \tag{2'}$$

Where R is the overall compression or expansion ratio, and N is the number of stages.

This is an idealization where intercooling (or interheating) occurs between stages. That is, if the temperature of the compressed or expanded gas is brought back to ambient temperature before it enters the next stage. The formula (2') also neglects any volumetric inefficiency.

The different stages can have different compression or expansion ratios, so long as the product of the compression or expansion ratios of all of the stages is R. That is, in a three-stage system, for example:

$$r_1 \times r_2 \times r_3 = R. \tag{3'}$$

In a multi-stage system, the relative displacements of the cylinder chambers are governed by the following equation:

$$V_i = V_f \frac{r^i}{\sum_{j=1}^{N} r^j}, \tag{4'}$$

$V_i$ is the displacement volume of the $i^{th}$ cylinder device, and $V_f$ is the total displacement of the system (that is, the sum of the displacements of all of the cylinder devices).

According to certain embodiments of the present invention, each stage of a multi-stage compression or expansion apparatus may be configured to operate with a particular temperature change during the course of the expansion or compression stroke. The design and operation of such embodiments may be accomplished utilizing a series of mathematical relationships defining the performance of individual stages in terms of physical quantities. One example of such a set of mathematical relationships is described below in Equations (5')-(16') in connection with a gas expansion stage.

The final temperature of the gas following compression or expansion, and the related final pressure of the gas following compression or expansion depend on a host of quantities. The following Equations (6', 7') express these final values for the pressure and temperature of a stage.

The pressure ratio of such a stage is given by:

$$r = \frac{(T_{gas\ initial} + \Delta T_{gas\text{-}liquid})}{T_{gas\ initial}}\left(\frac{v_{closed}}{v_{displacement}}\right)^{\gamma_{effective}} \text{ or,} \tag{5'}$$

$$p_{final} = p_{initial}\frac{(T_{gas\ initial} + \Delta T_{gas\text{-}liquid})}{T_{gas\ initial}}\left(\frac{v_{closed}}{v_{displacement}}\right)^{\gamma_{effective}} \tag{6'}$$

$$T_{gas\ final} = (T_{gas\ initial} + \Delta T_{gas\text{-}liquid})\left(\frac{v_{closed}}{v_{displacement}}\right)^{\gamma_{effective}-1} \tag{7'}$$

$V_{closed}$ is the volume of the cylinder when the intake valve closes during expansion or the exhaust valve opens during compression ($V_{total}/_r$).

$V_{displacement}$ is the total displacement of the cylinder.

$\Delta T_{gas\text{-}liquid}$ is the difference is temperature between the gas and the liquid inside the compression/expansion chamber at the end of the stroke.

$\gamma_{effective}$ is the effective polytropic index.

As will be described in detail below, the quantities $\gamma_{effective}$ and $\Delta T_{gas\text{-}liquid}$ depend upon a number of values. Based upon these values, Equations (5', 6', 7') may be solved to determine the resulting temperature change for a single expansion stage.

Control over expansion ratio may be achieved in several possible ways. In one approach, the expansion ratio may be determined by controlling $V_{closed}$. For example $V_{closed}$ may be controlled through the timing of actuation of valves responsible for admitting flows of compressed gas into the chamber for expansion.

Figures 61A, 61B, 61C:
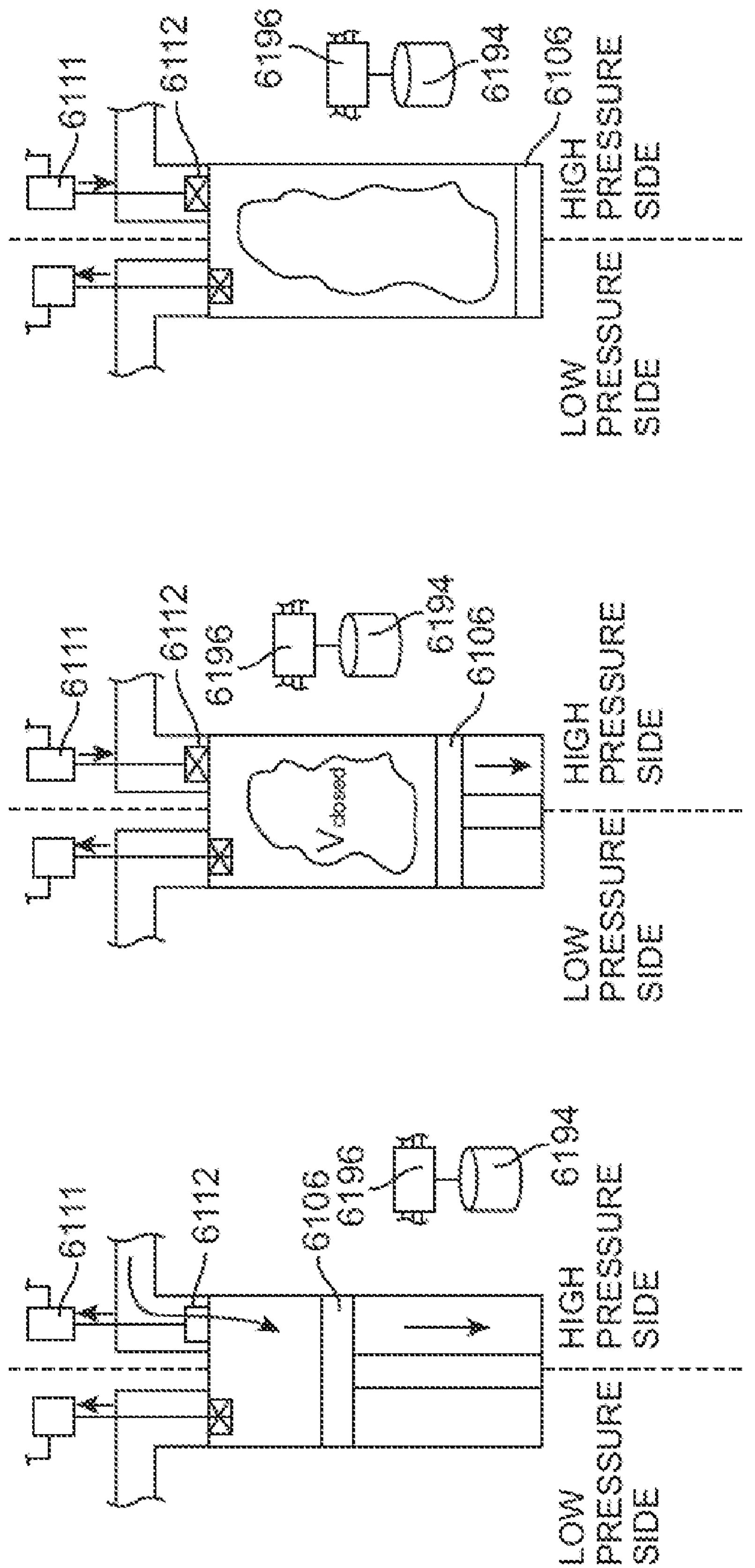
FIGS. 61A-C show views of a stage operating as an expander.

FIGS. 61A-C accordingly show an expansion stage 6100 where piston 6106 is undergoing an expansion stroke. FIG. 61A shows valve 6110 closed with piston 6106 moving downward, and valve 6112 open to admit a flow of compressed gas into the chamber for energy recovery by expansion. In FIG. 61B, valve 6112 is closed to halt the inlet of gas prior to the piston reaching the BDC position, thereby limiting to $V_{closed}$ the quantity of gas that may be expanded during this piston stroke. FIG. 61C shows the continued movement of the piston in the downward direction as the gas quantity $V_{closed}$ expands.

Thus by regulating the timing of closing of valve 6112, the quantity of gas which is expanded in the cylinder is limited. Specifically, because in FIG. 61B the valve 6112 is closed prior to the piston reaching BDC, the volume of gas in the cylinder is limited, and the expansion ratio and temperature change experienced by the stage are also correspondingly limited.

The timing of actuation of the inlet valve 6112, may be regulated by a controller or processor, such as the controller that is performing the iterated calculation over multiple stages that has been previously described. Accordingly, FIGS. 61A-C show the actuating element 6111 of valve 6112 as being in electronic communication with a controller 6196. Controller 496 is in turn in electronic communication with a computer-readable storage medium 6194, having stored thereon code for instructing actuation of valve 6112.

An adjustment of expansion ratio as described above, may represent a trade-off with the amount of energy stored or released by the system. Specifically, expansion of a smaller volume of gas in FIGS. 61B-C than could be otherwise be contained within the cylinder, reduces the power output to the piston by the expanding gas. Such an energy loss, however, may be desirable in order to achieve a desired temperature change, for example to bring the temperature change of a stage in line with that experienced by other stages.

Liquid introduced in an expansion chamber can also serve to alter the expansion ratio. A cylinder with no water in it has an expansion ratio of $r=V_{total}/V_{closed}$. If a volume of water, $V_{water}$ is introduced to the cylinder, the expansion ratio becomes $r=(V_{total}-V_{water})/(V_{closed}-V_{water})$. Thus the expansion ratio depends on $V_{water}$.

Returning to Equations (5', 6', 7'), the quantity $\gamma_{effective}$ is derived from a number of values. Calculation of $\gamma_{eff}$ is now discussed in connection with Equations (8') and (9'):

$$\gamma_{effective} = \frac{\hat{c}_{p_{effective}}}{(\hat{c}_{p_{effective}} - 1)(1 + \phi_\gamma)} \tag{8'}$$

$$\hat{c}_{p_{effective}} = \hat{c}_{p_{gas}}\left(1 + m_r\frac{c_{p_{liquid}}}{c_{p_{gas}}}\right) \tag{9'}$$

$\phi_\gamma \stackrel{def}{=}$ polytropic non-uniformity (the factor by which the polytropic index is increased due to a non-uniform distribution of liquid droplets in the compression/expansion chamber)

$\hat{c}_{p_{gas}} \stackrel{def}{=}$ constant pressure heat capacity of the gas divided by $R$ $c_{p_{liquid}} \stackrel{def}{=}$ constant pressure heat capacity of the liquid $m_r \stackrel{def}{=}$ mass ratio of liquid to gas $R \stackrel{def}{=}$ gas constant The quantity $\Delta T_{gas\text{-}liquid}$ appearing in Equations (6', 7') is also derived from a number of variables. This is now discussed in connection with Equations (10')-(17'):

$$\Delta T_{gas-liquid} \stackrel{def}{=} \frac{\Delta T_{gas\text{-}liquid_{initial}}}{\left(1 - \frac{\Delta T_{gas\text{-}liquid_{initial}}}{T_{gas_{initial}}}\right)} \tag{10'}$$

$$\Delta T_{gas\text{-}liquid_{initial}} \stackrel{def}{=} \left[\frac{\gamma_{effective}}{\left(h_{v_{gl}}\frac{v_{closed}}{v_{total}}\right)}\right]\left(\frac{p_{max}}{v_{total}}\right)\left(\frac{m_r c_{p_{liquid}}}{c_{p_{gas}} + m_r c_{p_{liquid}}}\right) \tag{11'}$$

$$h_{v_{gl}} \stackrel{def}{=} \frac{3h_{gas\to liquid}\alpha_{liquid}}{r_{droplet}} \tag{12'}$$

is the volumetric thermal conductivity between gas and liquid $$h_{gas\to liquid} \stackrel{def}{=} \frac{k_{gas}N_U}{r_{droplet}} \tag{13'}$$

is the overall thermal conductivity from gas to liquid

-continued $$\frac{p_{max}}{v_{total}} = -wp_{gas}\frac{\frac{dV}{d\theta}}{v_{total}} \tag{14'}$$

$r_{droplet}$ = mean radius of liquid droplets $\alpha_{liquid}$ = proportion of liquid $k_{gas}$ = thermal conductivity of the gas $\omega$ = rotational speed $$\frac{dV}{d\theta} = \frac{\text{change in compression}}{\text{expansion chamber volume with crank angle } \theta}$$

$$Nu \stackrel{def}{=} 2\left[1 + 03419Pr^{\frac{1}{3}}\left(\frac{\alpha_{gravity}\rho_{gas}}{\mu_{gas}^2 c_{drag}}(\rho_{liquid} - \rho_{gas})\right)^{\frac{1}{4}} r_{droplet}^{\frac{3}{4}}\right] \tag{15'}$$

is the Nusselt number $\alpha_{gravity}$ = acceleration due to gravity $\rho$ = density $c_{drag}$ = drag coefficient of droplet(sphere = .47)

$$Pr \stackrel{def}{=} \frac{\mu_{gas}c_{p_{gas}}}{k_{gas}} \text{ is the Prandtl number} \tag{16'}$$

The Equations (5', 6', 7') may also be used to determine properties of multiple expansion stages arranged in series with each other. As discussed further below, the equations may be solved for each stage, with the temperature and pressure output by one stage being fed as inputs to the equations for the next successive stage.

In addition, the Equations (5', 6', 7') showing properties of each stage in a multi-stage system, may be solved in an iterative manner to determine the structure and/or operational parameters of individual stages exhibiting changes in temperature when arranged in series with one another. Such iterative solution of these equations as applied to multiple expansion stages, is further described below.

If, in a multi-stage compression or expansion apparatus the mass flow rate, intake pressures, and dead volumes are fixed, the temperature change during the compression/expansion stroke and the compression/expansion ratio represent a single free parameter. That is, controlling one gives the other. Thus, when designing each stage, choosing a compression/expansion ratio using equation (5'), will, nominally, result in the desired temperature change occurring during the course of the compression or expansion stroke. By choosing a suitably effective heat exchanger, it is possible to design a multi-stage system iteratively such that each stage exhibits the desired temperature change.

The various relationships described in connection with Equations (5')-(16') can be used to produce an output for a given expansion stage. In particular, the various types of inputs to the equations, produce a corresponding output in the form of the temperature and pressure ($T_{gas\ final}$, $p_{final}$) of the gas exhausted from that expansion stage, as well as the temperature change ($\Delta T_{gas,\ final\text{-}initial}$) experienced by the expansion stage.

These outputs ($T_{gas\_final1}$, $p_{final1}$) can in turn be fed as inputs representing the initial temperature and pressure ($T_{gas\_initial2}$, $p_{initial2}$) to the equations (5', 6', 7') to calculate the behavior of a next expansion stage receiving this expanded gas for further expansion. The pressure and temperature outputs ($T_{gas\_final2}$, $p_{final2}$) of a stage may be being fed as inputs ($T_{gas\_initial3}$, $p_{initial3}$) to a third expansion stage, to produce the final output temperature and pressure ($T_{gas_{final3}}$, $p_{final3}$).

In the calculation, values of the initial temperature and/or pressure of the system ($T_{gas\_initial1}$, $p_{initial\_1}$), and/or values of the final temperature and/or pressure of the system ($T_{gas\_final3}$, $p_{final3}$), may be predetermined. For example the pressure and/or temperature of the inlet gas, may be dictated by the current capacity of a compressed gas storage unit (which as discussed below, may change over time as compressed gas is consumed).

In another example, the pressure and/or temperature of the outlet gas may be dictated by the environment to which it is being exhausted. For example, air being exhausted into the outside environment at sea level may not have an output pressure of less than 1 ATM.

Other factors may constrain the calculation. For example, where liquid water at ambient temperature is being used for heat exchange, the temperature change experienced by any one stage could not be lower than about 15° C. in order to avoid freezing.

In addition, the corresponding equations showing properties of each stage in a multi-stage compression system, may be solved in an iterative manner to determine the structure or operational parameters of individual stages that will exhibit substantially equal changes in temperature when arranged in series with one another.

A system configured to determine conditions under which each stage will experience a substantially equivalent temperature change may include a controller in electronic communication with a computer-readable storage medium which may be based upon magnetic, optical, and/or semiconductor principles. This computer-readable storage medium has stored thereon code that is configured to instruct the processor to perform certain tasks.

For example, code stored on the computer-readable storage medium may instruct the controller to predetermine the initial pressure and/or temperature parameters that are input to the calculation. Code stored on the computer-readable storage medium may also instruct the controller to predetermine the final pressure and temperature parameters that are to be output by the multi-stage system calculation.

Code stored on the computer-readable storage medium may further instruct the controller to predetermine certain of the variables present in inputs to the respective equations. For example, certain of these variables may be predetermined by the identity of the gas (for example air) that is subject to compression, and/or the identity of the liquid (for example water) that is being injected for heat exchange.

Code stored on the computer-readable storage medium may further instruct the controller to determine one or more variables present in inputs to the respective equations. For example, results of a prior iteration may indicate changing an input variable in a particular manner (direction, magnitude) to produce a desired per-stage temperature change. Thus, based upon an algorithm expressed by code present in the computer-readable storage medium, the controller may change the value of an input from a previous iteration. A standard technique such as conjugate gradient or steepest descent may be used.

Successful convergence of the iterative calculations to define parameters of stages exhibiting substantially equivalent temperature changes, may be determined based upon numerical analysis techniques. Examples of such numerical analysis to obtain such a solution include but are not limited to conjugate gradient, steepest descent, Levenberg-Marquardt, Newton-Raphson, neural networks, genetic algorithms, or binary search.

According to certain embodiments, a calculation based on equations (5'-16') may be performed during the design process, to fix certain unchanging parameters of a design. According to other embodiments, an iterative calculation described above may be performed on an ongoing basis, with properties of the multi-stage system adjusted to reflect changing conditions. One example of such a changing condition is the inlet temperature ($T_{gas\_initial}$) to the system.

Specifically, as a compression system is operated over the course of a day, the temperature of the outside air may change over time. Where this outside air is inlet for compression, its temperature will change over time (for example rising during the day, and cooling at night). The controller may be in electronic communication with a sensor to detect this change in temperature, and provide it as an input to the calculation. The controller may also be in communication with additional sensors to detect a state of other changing properties.

The controller may be in electronic communication with various elements of a gas compression system. Based upon the results of the calculation, the controller may instruct operation of system elements to ensure that even temperature changes are maintained at the different stages.

For example, in certain embodiments the controller may actuate a valve responsible for admitting gas into a compression chamber. In certain embodiments, the controller may actuate a valve responsible for exhausting gas from an expansion chamber, and/or a valve responsible for flowing liquid into a compression chamber. Control over the timing of actuation of these valve elements may affect the compression ratios of individual stages, and hence the temperature changes experienced by those stages.

Equation (17') shows $T_{gas\_final}$ to depend upon $V_{closed}$:

$$T_{gas_{final}} = T_{gas_{initial}} + \Delta T_{gas\text{-}liquid}\left(\frac{V_{closed}}{V_{displacement}}\right)^{Y_{effective}} \tag{17'}$$

Equation (18') shows that $V_{closed}$ can be expressed in terms of compression ratio (r):

$$V_{closed} = \text{the chamber volume when the compression intake valve closes} = \frac{V_{total}}{r} \tag{18'}$$

Thus, the compression ratio of a stage can determine the magnitude of a temperature change experienced by that compression stage. Such control over compression ratio may be achieved in several possible ways.

In one approach, the compression ratio may be determined by controlling $V_{closed}$. For example $V_{closed}$ may be controlled through the timing of actuation of valves responsible for admitting flows of gas into the chamber for compression.

In a manner analogous to that discussed above, the controller may be in electronic communication with various elements of a gas compression system. Based upon the results of the calculation, the controller may instruct operation of system elements to ensure that even temperature changes are maintained at the different stages.

Figure 63C:
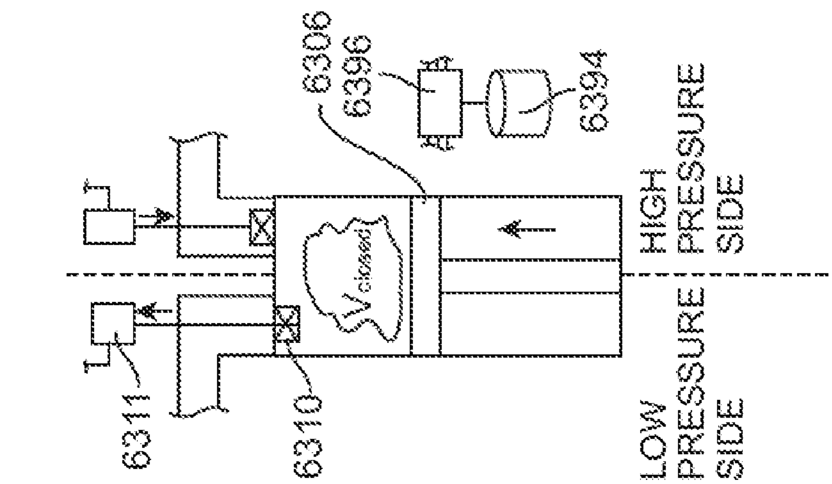
FIGS. 63A-C show views of a stage operating as a compressor.
Figure 63B:
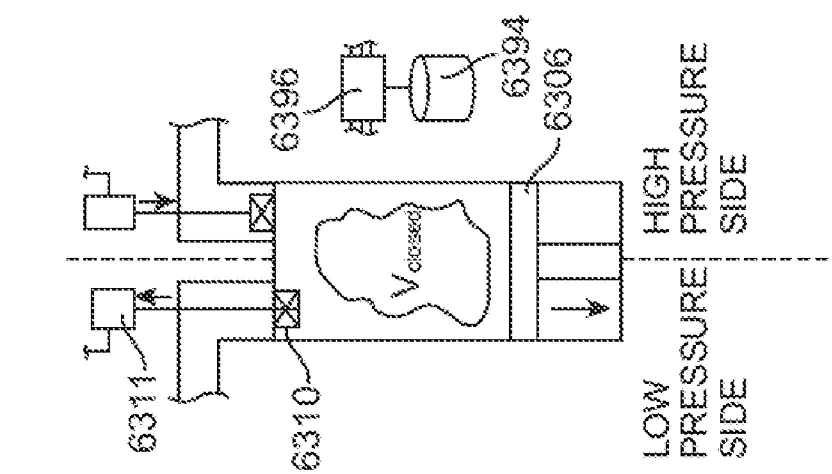
Figure 63A:
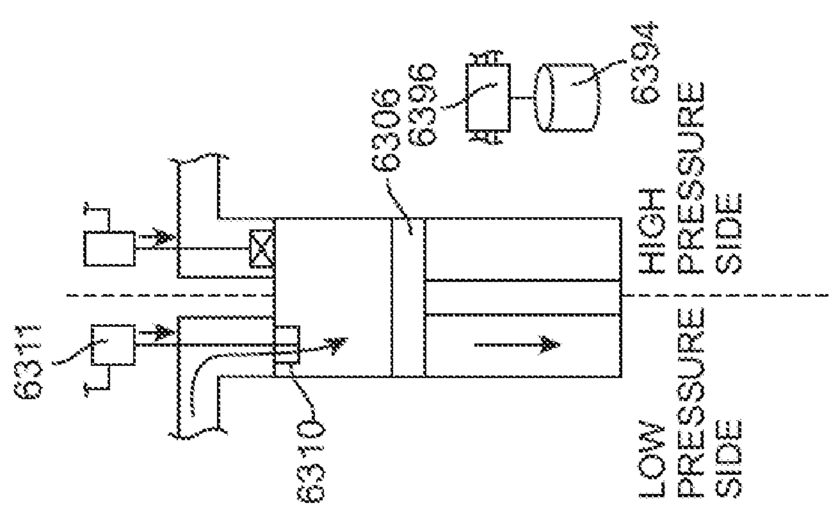

For example, in certain embodiments the controller may actuate a valve responsible for admitting gas into a compression chamber. FIGS. 63A-C show an example of such inlet valve actuation in the case of compression. Specifically, FIGS. 63A-B shows a compression stage 6300 where piston 6306 is undergoing a stroke prior to compression, and then FIG. 63C shows the initial portion of the compression stroke.

FIG. 63A shows valve 6312 closed with piston 6306 moving downward, and valve 6310 open to admit a flow of gas into the chamber for compression. In FIG. 63B, valve 6310 is closed to halt the inlet of gas prior to the piston reaching BDC, thereby limiting to $V_{closed}$ the quantity of gas that may be compressed in the subsequent stroke of the piston. FIG. 63C shows that in the subsequent compression stroke, as piston 6306 moves upward to compress the gas quantity $V_{closed}$.

By regulating the timing of closing of valve 6310, the quantity of gas which is compressed in the cylinder is determined. Specifically, because in FIG. 63B the valve 6310 is closed prior to the piston reaching BDC, the effective volume of gas in the cylinder for compression is limited, and the compression ratio (r) of the stage is also limited.

The timing of actuation of the inlet valve 6310, may be regulated by a controller or processor. Accordingly, FIGS. 63A-C show the actuating element 6311 of valve 6310 as being in electronic communication with a controller 6396. Controller 6396 is in turn in electronic communication with a computer-readable storage medium 6394, having stored thereon code for instructing actuation of valve 6310.

Timing of actuation of a gas outlet valve in a compression mode, can also be regulated to control the compression ratio. In a manner similar to that described above, closure of the outlet valve can be timed to retain some residual compressed gas within the compression chamber, thereby reducing $V_{closed}$ to less than the full value of ($V_{displacement}$) in the subsequent piston stroke to intake more gas for compression. Such valve timing would thus also reduce the compression ratio (r).

In a manner similar to that previously described in connection with prior figures, liquid introduced in a compression chamber can also serve to alter the compression ratio (r). A cylinder with no water in it has a compression ratio of $r=V_{total}/V_{closed}$. If a volume of water, $V_{water}$ is introduced to the cylinder, the compression ratio becomes $r=(V_{total}-V_{water})/(V_{closed}-V_{water})$. Thus the compression ratio depends on $V_{water}$.

Performance of an expander may be controlled by an active control loop whose inputs may include control parameters and sensor data, and whose outputs may include valve actuation. In one embodiment, control inputs include but are not limited to:

$P_f$≡The final pressure we expand down to before opening the exhaust valve $\Delta V_i$≡The change in volume during intake $\Delta V_e$≡The change in volume after exhaust S≡The rotational speed of the crank, in RPM $\Theta_o$≡The crank angle at which a spray valve is opened $\Theta_e$≡The crank angle at which a spray valve is closed F≡The flow rate of a spray pump Measured values from sensors include but are not limited to:

$P_i$≡The input pressure $P_o$≡The output pressure

Θ≡The crank angle relative to TDC $T_i$≡The average inlet temperature $T_f$≡The average exhaust temperature W≡The shaft power output by the expander In an embodiment, the control loop may proceed as follows. Starting with the piston at TDC, the intake valve is opened, admitting gas at $P_i$.

The intake valve remains open as the piston moves until the piston has swept out a volume of $\Delta V_i$. This may be computed from the measured crank angle and the known piston and linkage dimensions.

At this point, the intake valve is closed and the gas expands, doing work on the piston as the pressure inside the cylinder decreases. When the pressure inside the cylinder has fallen below $P_f$, the exhaust valve is opened. This may be before or at BDC.

The exhaust valve remains open until $\Delta V_e$ before TDC (which may be computed from the measured crank angle), at which time the exhaust valve is closed. The piston continues to move to TDC, and the cycle repeats.

The spray can be controlled with this control loop. In some embodiments, the liquid is simply sprayed continuously into the cylinder.

According to certain embodiments, the spray may be turned on by a controllable valve such as a solenoid valve, during a portion of a cycle. For example, the spray may be turned on from a crank angle A to a crank angle B from TDC. A might be 0, 5, 10, 45, 90, 120, 180, 200, 240, 270 degrees. B might be 180 or 360 degrees, plus or minus 20 degrees or more.

The pressure or flow rate to the spray nozzles may be controlled. This may be done, for example, by controlling a variable frequency drive connected to a spray pump.

The rotational speed of the system may be controlled. This may be done, for example, by varying the load on a generator in mechanical communication with the piston.

The control input parameters, in conjunction with operating conditions, lead to particular results, including but not limited to final temperature ($T_f$) or shaft power (W). The relationship between control input parameters and outputs may be modeled from physical principles, and/or it may be measured during controlled tests, creating a map. This map may be interpolated to approximate a smooth multi-dimensional surface.

During operation of the expander it may be desirable to achieve a certain target performance, such as outputting a particular power (W) to meet a particular demand. The map that has been created may be used to arrive at an initial set of control values for operation.

During operation, as the desired performance parameter (in this case, W) is measured, the gradient of the map may be used to alter the control parameters in a direction that reduces or minimizes the difference between the measured value and the desired value. Examples of target performance metrics include but are not limited to power output, efficiency (computed from measured values), or a weighted sum of other metrics.

Certain embodiments may utilize the metric of minimizing $T_i-T_f$ subject to a constraint such as $T_f>T_{min}$. This might be used to obtain a high efficiency from the expander while keeping the temperature above a freezing point of the liquid.

While performance of an expander utilizing a control loop has been described above, the present invention is not limited to these particular embodiments. According to alternative embodiments, performance of a compressor may be controlled by an active control loop whose inputs may include control parameters and sensor data, and whose outputs may include valve actuation.

In one embodiment, control inputs include but are not limited to:

$\Delta P_f \equiv$The difference between the final pressure in the cylinder before opening the exhaust valve and the pressure on the other side of the exhaust valve ($P_o$)

$\Delta P_i \equiv$The difference between the initial pressure in the cylinder before opening the intake valve and the pressure on the other side of the intake valve ($P_i$)

$\Delta V_i \equiv$The change in volume during intake $\Delta V_e \equiv$The change in volume after exhaust S=The rotational speed of the crank, in RPM $\Theta_o \equiv$The crank angle at which a spray valve is opened $\Theta_e \equiv$The crank angle at which a spray valve is closed F≡The flow rate of a spray pump Measured values from sensors include but are not limited to:

$P_i \equiv$The input pressure $P_o \equiv$The output pressure

Θ≡The crank angle relative to TDC $T_i \equiv$The average inlet temperature $T_f \equiv$The average exhaust temperature W≡The shaft power output by the expander In an embodiment, the control loop may proceed as follows. Starting with the piston at TDC and the gas in the cylinder at some pressure P, the piston begins to move towards BDC.

When the pressure drops below $P_i-\Delta P_i$ the intake valve is opened. This may be before or at TDC.

The piston moves to BDC, at which time the intake valve is closed. As the piston heads back towards TDC the piston compresses the gas as the pressure inside the cylinder increases.

When the pressure inside the cylinder has risen above $P_o-\Delta P_f$, the exhaust valve is opened. This may be before or at TDC.

The exhaust valve remains open until $\Delta V_e$ before TDC (as may be computed from the measured crank angle), at which time the exhaust valve is closed. The piston continues to move to TDC, and the cycle repeats.

Spray may be controlled with this control loop. In some embodiments, the liquid is simply sprayed continuously into the cylinder.

In certain embodiments, the spray may be turned on (for example by a controllable valve such as a solenoid valve) during a portion of a cycle. For example, the spray may be turned on from a crank angle A to a crank angle B from TDC. A might be 0, 5, 10, 45, 90, 120, 180, 200, 240, 270 degrees. B might be 180 or 360 degrees, plus or minus 20 degrees or more.

The pressure or flow rate to the spray nozzles may be controlled, for example by controlling a variable frequency drive connected to a spray pump. The rotational speed of the system may be controlled, for example by varying the load on a generator in mechanical communication with the piston.

The control input parameters in conjunction with operating conditions, lead to particular results, such as final temperature ($T_f$) or shaft power (W). The relationship between control input parameters and outputs may be modeled from physical principles, or it may be measured during controlled tests, creating a map. This map may be interpolated to approximate a smooth multi-dimensional surface.

During operation of the compressor, it may be desirable to achieve a certain target performance such as outputting a particular power (W) to meet a particular demand. The map created above may be used to first arrive at an initial set of control values for operating the apparatus.

During operation, as the desired performance parameter (in this case, W) is measured, the gradient of the map may be used to alter the control parameters in a direction that reduces or minimizes the difference between the measured value and the desired value. Some target performance metrics might be power input, efficiency (computed from measured values). Another metric might be a weighted sum of other metrics.

Another metric may be minimizing $T_i-T_f$ subject to a constraint such as $T_f>T_{min}$. This metric might be used to get the high efficiency from the expander while keeping the temperature below a boiling point of the liquid.

Thus, the compression ratio of a stage can determine the magnitude of a temperature change experienced by that compression stage. Such control over compression ratio may be achieved in several possible ways.

In one approach, the compression ratio may be determined by controlling $V_{closed}$. For example $V_{closed}$ may be controlled through the timing of actuation of valves responsible for admitting flows of gas into the chamber for compression.

The controller may be in electronic communication with various elements of a gas compression system. Based upon the results of the solution to the iterated calculation, the controller may instruct operation of system elements to ensure that even temperature changes are maintained at the different stages.

For example, in certain embodiments the controller may actuate a valve responsible for admitting gas into a compression chamber. FIGS. 63A-C show an example of such inlet valve actuation in the case of compression. Specifically, FIGS. 63A-B shows a compression stage 6300 where piston 6306 is undergoing a stroke prior to compression, and then FIG. 63C shows the initial portion of the compression stroke.

FIG. 63A shows valve 6312 closed with piston 6306 moving downward, and valve 6310 open to admit a flow of gas into the chamber for compression. In FIG. 63B, valve 6310 is closed to halt the inlet of gas prior to the piston reaching BDC, thereby limiting to $V_{closed}$ the quantity of gas that may be compressed in the subsequent stroke of the piston. FIG. 63C shows that in the subsequent compression stroke, as piston 6306 moves upward to compress the gas quantity $V_{closed}$.

By regulating the timing of closing of valve 6310, the quantity of gas which is compressed in the cylinder is determined. Specifically, because in FIG. 63B the valve 6310 is closed prior to the piston reaching BDC, the effective volume of gas in the cylinder for compression is limited, and the compression ratio ($c_r$) of the stage is also limited.

The timing of actuation of the inlet valve 6310, may be regulated by a controller or processor. Accordingly, FIGS. 63A-C show the actuating element 6311 of valve 6310 as being in electronic communication with a controller 6396. Controller 6396 is in turn in electronic communication with a computer-readable storage medium 6394, having stored thereon code for instructing actuation of valve 6310.

Timing of actuation of a gas outlet valve in a compression mode, can also be regulated to control the compression ratio. In a manner similar to that described above, closure of the outlet valve can be timed to retain some residual compressed gas within the compression chamber, thereby reducing $V_{closed}$ to less than the full value of ($V_{disp}$) in the subsequent piston stroke to intake more gas for compression. Such valve timing would thus also reduce the compression ratio ($c_r$).

In a manner similar to that previously described in connection with prior figures, liquid introduced in a compression chamber can also serve to alter the compression ratio ($c_r$). A cylinder with no water in it has a compression ratio of $c_r=V_{total}/V_{closed}$. If a volume of water, $V_{water}$ is introduced to the cylinder, the compression ratio becomes $c_r=(V_{total}-V_{water})/(V_{closed}-V_{water})$. Thus the compression ratio depends on $V_{water}$.

The above approaches have focused upon controlling compression and/or expansion ratio by volume control utilizing the regulation of valve (inlet/outlet) timing and/or liquid injection. However, this is not required by the present invention, and alternative embodiments could achieve control over temperature by regulating other elements affecting compression or expansion ratio.

For example, other techniques of changing the compression or expansion ratio may employ mechanical approaches. Examples of such approaches include but are not limited to altering the length of a piston stroke, or operating a plunger to vary chamber dead volume.

The temperature change occurring at a given stage may be controlled by varying the speed of that stage. For example, lower pressure stages may exhibit a smaller ΔT than higher pressure stages at the same speed and gas and liquid mass flow rate.

Increasing the speed, and reducing the displacement by the same factor will give the same mass flow rate (for example to match subsequent stages), but a higher ΔT. The size of such a stage will be reduced, lowering cost.

Each stage could run at a different speed, either with a fixed or variable gear ratio between separate cranks or other linkages actuating the movable member of each stage. Alternatively, a separate motor/generator could be provided for each stage, or group of stages.

If more than one speed is independently controllable, these speeds may be adjusted dynamically to achieve a desired operating performance. One way of dynamically adjusting parameters that control compression/expansion ratios and ΔT values, is to use a function of weighted inputs.

In certain embodiments, these inputs may include but are not limited, to raw sensor data such as intake pressure, discharge pressures, intake temperature, discharge pressure, liquid flow rate, gas flow rate, storage tank pressure, and measured power into or out of the motor/generator. These inputs may include computed values based on raw sensor data and other sources, such as power demand requirements, user input parameters, estimated ΔT, and estimated efficiency.

Embodiments of the present invention having multiple stages of compression or expansion that experience a substantially equivalent temperature change according to the present invention, may offer a number of potential benefits. One potential benefit is the ability to maximize efficiency of the system.

As mentioned above, compression and expansion proceed with minimum thermal loss and maximum efficiency, where they occur under near-isothermal conditions. The problem of designing an apparatus to efficiently perform such compression or expansion across multiple stages, is simplified by requiring the temperature change of each of the stages to be the same. With this condition in place, other elements of the multi-stage system are able to be designed to minimize this uniform temperature change.

Moreover, in order to achieve the near-isothermal conditions that are desirable for efficient operation, each stage of a multi-stage system is in thermal communication with a thermal source or thermal sink to exchange energy. In the case of a stage performing compression, the stage is in thermal communication with a heat sink to transfer thermal energy from the heated gas. In the case of a stage performing expansion, the stage is in thermal communication with a heat source to transfer thermal energy to the cooled gas.

Figure 64A:
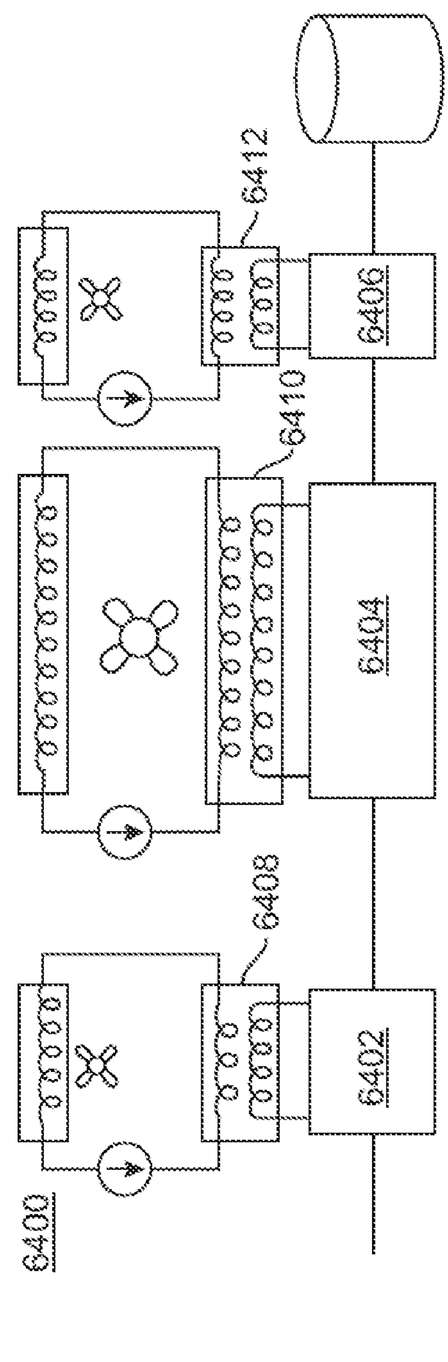
FIG. 64A shows a multi-stage system where each of the stages is expected to exhibit a different change in temperature.

FIG. 64A shows the case of a multi-stage system 6400 where each of the stages 6402, 6404, and 6406 is expected to exhibit a different change in temperature. To reliably and efficiently exchange the necessary amounts of thermal energy, the system of FIG. 64A would generally employ different heat exchangers 6408, 6410, and 6412 for each stage. Moreover, because the circulating fluids would be at different temperatures, separate circulation systems (including a pump) would be used between each heat exchanger and a respective thermal source or sink having the relevant thermal capacity.

Figure 64B:
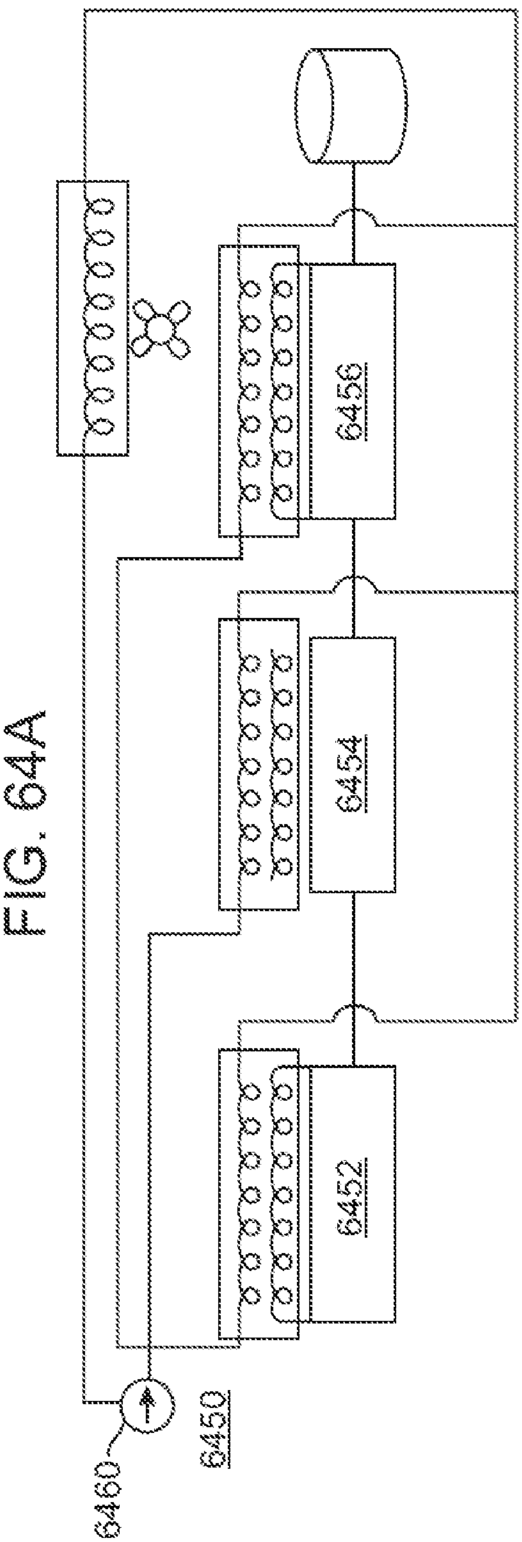
FIG. 64B shows a multi-stage system where each stage is expected to exhibit a substantially equivalent temperature change.

Where, however, each stage is expected to exhibit a substantially equivalent temperature change, a simpler heat exchanger design may be used. FIG. 64B shows such a system 6450, where each stage 6452, 6454, and 6456 is in thermal communication with a tube-in-shell heat exchanger 6458 of the same type. Moreover, because each heat exchanger is expected to exchange a same amount of thermal energy at each stage, these heat exchangers can all share a common circulation system having a single pump 6460 and thermal sink or thermal source. Such a configuration desirably eliminates the use of multiple pumps and fluid conduit loops, thereby reducing the complexity and expense of the system.

Figure 65:
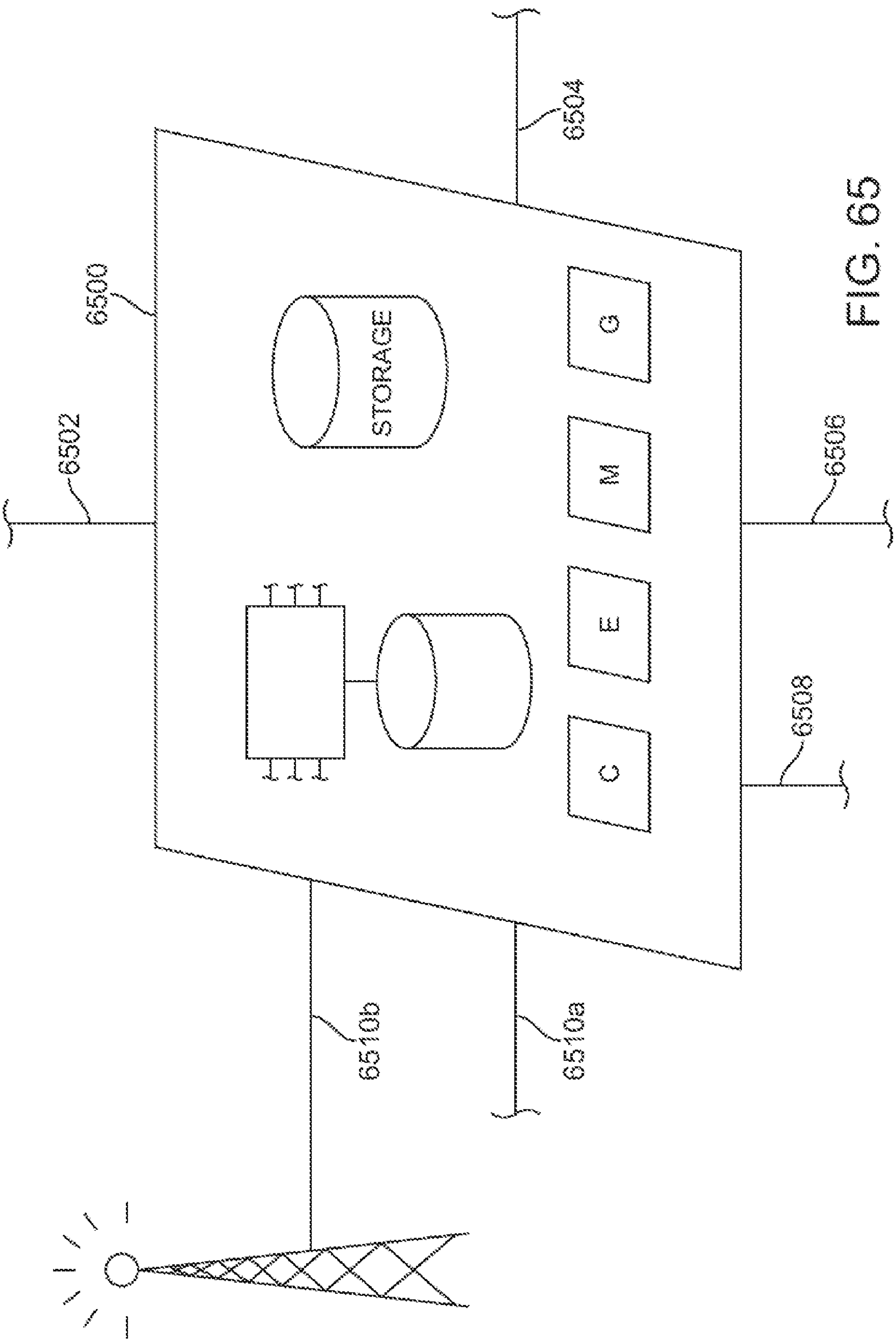
FIG. 65 generically depicts interaction between a compressed gas system and external elements.

As described above, elements of compressed gas systems according to the present invention may be in communication with other structures through one or more linkages, as generically depicted in FIG. 65. Such linkages between a compressed gas energy system 6500 and external elements can include physical linkages 6502 such as mechanical linkages, hydraulic linkages, magnetic linkages, electro-magnetic linkages, electric linkages, or pneumatic linkages.

Other possible types of linkages between embodiments of systems according to the present invention include thermal linkages 6504, which may comprise conduits for liquid, gaseous, or solid materials, conduits, pumps, valves, switches, regenerators, and heat exchangers, including cross-flow heat exchangers.

As further shown in FIG. 65, other possible types of linkages between embodiments of systems according to the present invention and outside elements, include fluidic linkages 6506, and communications linkages 6508. Examples of the former include flows of material in the gas or liquid phase, and may include conduits, valves, pumps, reservoirs, accumulators, bottles, sprayers, and other structures.

Examples of communications linkages include wired or optical fiber linkages 6510*a* and wireless communications networks 6510*b*, that are locally active or which operate over a wide area. Examples of communications networks which may be suited for use by embodiments in accordance with the present invention include, but are not limited to, ethernet, CAN, WiFi, Bluetooth, DSL, dedicated microwave links, SCADA protocols, DOE's NASPInet, DoD's SIPRNet, IEEE 802.11, IEEE 802.15.4, Frame Relay, Asynchronous Transfer Mode (ATM), IEC 14908, IEC 61780, IEC 61850, IEC 61970/61968, IEC 61334, IEC 62056, ITU-T G.hn, SONET, IPv6, SNMP, TCP/IP, UDP/IP, advanced metering infrastructure, and Smart Grid protocols.

An amount of stored work that is present in a volume of air at a given pressure, and hence an amount of work that is stored in system 6500 of FIG. 65, may be calculated as follows.

The quantity $$\frac{W}{V_0}$$

represents the amount of work stored per unit volume in a storage vessel. This is the storage energy density. This energy density can be determined utilizing the following formula:

$$\frac{W}{V_0} = P_a \cdot \left[1 + \left(\frac{P_0}{P_a}\right)\left[\ln\left(\frac{P_0}{P_a}\right) - 1\right]\right];$$

W=stored work;

$V_0$=volume of the storage unit; and $P_a$=ambient pressure in an open system, or the low pressure in a closed system; and $P_0$=pressure in the tank.

Expression of this energy density from volume in units of liters (L) and from pressure in units of atmospheres (atm), requires the use of a conversion factor:

$$\frac{W}{V_0} = 101.325 \cdot P_a \cdot \left[1 + \left(\frac{P_0}{P_a}\right)\left[\ln\left(\frac{P_0}{P_a}\right) - 1\right]\right] \left(\frac{\text{Joule}}{\text{L}}\right),$$

W=stored work (Joule);

$V_0$=volume of storage unit (L);

$P_a$=ambient pressure in an open system, or low pressure for a closed system (atm); and $P_0$=pressure in the tank (atm).

So, under standard conditions where:

$$V_0 = 1\ \text{L};$$

$$P_a = 1\ \text{atm; and}$$

$$\frac{P_0}{P_a} \equiv r:$$

$$W / V_0 = 101.325[1 + r(\ln r - 1)] \left(\frac{\text{Joule}}{L}\right), \text{ or}$$

$$W / V_0 = 0.101325[1 + r(\ln r - 1)] \left(\frac{\text{kJoule}}{\text{L}}\right)$$

The inverse of $W/V_0$ represents the volume of a tank required to store a given amount of energy. This formula may be expressed in units of L/kW·h according to the following:

$$V_0 \Big/ W\left(\frac{L}{\text{kW} \cdot h}\right) = 3600/(W/V_0),$$

1 Joule=1 W·s;

3600 Joule=1 W·h; and 3600 kJoule=1 kW·h

This yields the following results at the given exemplary pressures:

| $P_0$ | $W/V_0\left(\frac{\text{kJoule}}{\text{L}}\right)$ | $V_0/W\left(\frac{\text{L}}{\text{kW}\cdot\text{h}}\right)$ |
|---|---|---|
| 300 atm | 143 | 25.16 |
| 310 bar | 146.5 | 24.57 |
| 10 atm | 1.42 | 2533 |
| 8 atm | 0.976 | 3687 |

Consideration of efficiency results in alteration of the above equation as follows:

$$\frac{W}{V_0} = 101.325 \cdot P_a \cdot \left[1 + \left(\frac{P_0}{P_a}\right)\left[\ln\left(\frac{P_0}{P_a}\right) - 1\right]\right] \cdot e\left(\frac{\text{kJoule}}{\text{L}}\right),$$

where:

e=one-way efficiency of the system.

So in a system recovering compressed air to a final pressure ($P_a$) of 1 atm from a storage pressure ($P_0$) of 300 atm with an efficiency (e) of 0.8, the quantity $V_0/W$=31.45

$\left(\frac{L}{kW \cdot h}\right)$.

The ability of systems according to embodiments of the present invention, to rapidly recover energy stored in the form of compressed gas, may render such systems potentially suitable for a variety of roles. Several such roles involve the energy system's placement within the network responsible for providing electrical power to one or more end-users. Such a network is also referred to hereafter as a power grid.

Incorporated by reference in its entirety herein for all purposes, is the following document: "Energy Storage for the Electricity Grid: Benefits and Market Potential Assessment Guide: A Study for the DOE Energy Storage Systems Program", Jim Eyer & Garth Corey, Report No. SAND2010-0815, Sandia National Laboratories (February 2010).

Figure 66:
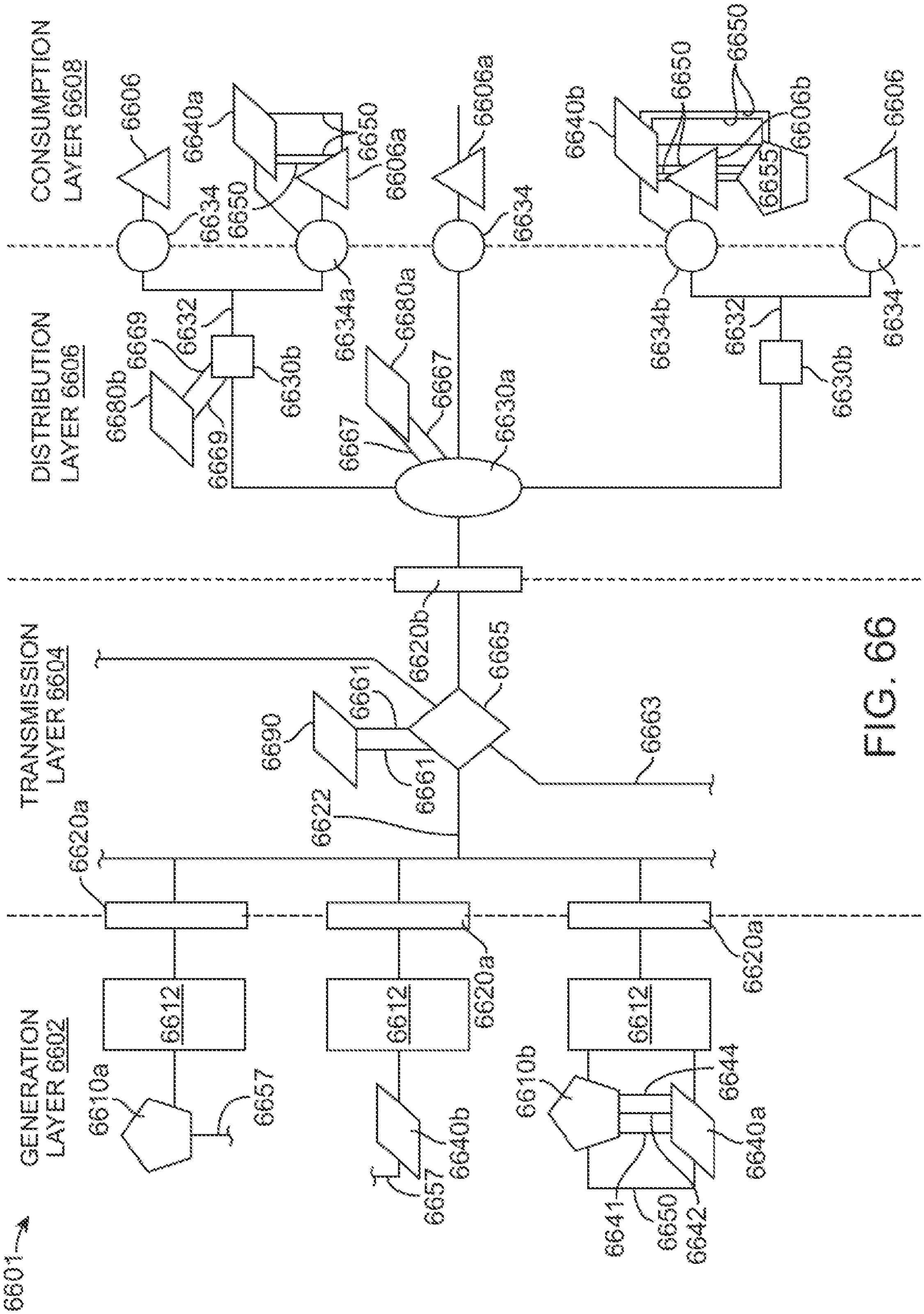
FIG. 66 is a simplified schematic view of a network configured to supply electrical power to end users.

FIG. 66 presents a generic description of an embodiment of a network for the generation, transmission, distribution, and consumption of electrical power. The embodiment shown in FIG. 66 represents a substantial simplification of an actual power network, and should not be understood as limiting the present invention.

Power distribution network 6601 comprises a generation layer 6602 that is in electrical communication with a transmission layer 6604. Power from the transmission layer is flowed through distribution layer 6605 to reach the individual end users 6606 of the consumption layer 6608. Each of these layers of the power distribution network are now described in turn.

Generation layer 6602 comprises a plurality of individual generation assets 6610*a*, 6610*b* that are responsible for producing electrical power in bulk quantities onto the network. Examples of such generation assets 6610*a*, 6610*b* can include conventional power plants that burn fossil fuels, such as coal-, natural gas-, or oil-fired power plants. Other examples of conventional power plants include hydroelectric, and nuclear power plants that do not consume fossil fuels. Still other examples of generation assets include alternative energy sources, for example those exploiting natural temperature differences (such as geothermal and ocean depth temperature gradients), wind turbines, or solar energy harvesting installations (such as photovoltatic (PV) arrays and thermal solar plants).

The assets of the generation layer generally deliver electrical power in the form of alternating current at relatively low voltages (<50 kV) compared to the transmission layer. This electrical power is then fed to the transmission layer for routing. Specifically, the interface between a generation asset and the transmission layer is hereafter referred to as a busbar 6612.

The transmission layer comprises respective transformer elements 6620*a* and 6620*b* that are positioned at various points along a transmission line 6622. The step-up transformer 6620*a* is located proximate to the generation assets and corresponding busbars, and serves to increase the voltage of the electricity for efficient communication over the transmission line. Examples of voltages present in the transmission layer may be on the order of hundreds of kV.

At the other end of the transmission line, a step-down transformer 6620*b* serves to reduce the voltage for distribution, ultimately to individual end users. Power output by the step-down transformers of the transmission layer may lie in the voltage range of the low tens of kV.

FIG. 66 presents the transmission layer in a highly simplified form, and transmission of power may actually take place utilizing several stages at different voltages, with the stages demarcated by transmission substation(s) 6665. Such a transmission substation may be present at the point of interface between transmission line 6622 and second transmission line 6663.

The distribution layer receives the power from the transmission layer, and then delivers this power to the end users. Some end users 6606*a* receive relatively high voltages directly from primary substation 6630*a*. The primary substation serves to further reduce the voltage to a primary distribution voltage, for example 12,000 V.

Other end users receive lower voltages from the secondary substations 6630*b*. Feeder lines 6632 connect the primary substation with the secondary substation, which further reduces the primary distribution voltage to the final voltage delivered to end users at a meter 6634. An example of such a final voltage is 120 V.

FIG. 66 provides a general description of the physical elements of a power network which may be used in the generation, transmission, distribution, and consumption of electric power. Because it forms a vital part of the public infrastructure, and requires cooperation from a multitude of distinct geographic and political entities, such power networks are highly regulated at many levels (local, national, international).

FIG. 66 thus also provides a framework for classifying the regulation of various network elements by different regulatory agencies. For example, an element of the power network may be regulated based upon its classification as an asset of the generation layer, transmission layer, distribution layer, or consumption layer, of the power network. Such regulatory classification can play an important role in determining properties of an energy storage system that is integrated within a power network.

According to certain embodiments of the present invention, a compressed gas system may be incorporated within a generation layer of a power supply network. In certain embodiments energy recovered from the compressed gas may supply stable electricity over a short term period of time. According to some embodiments, energy recovered from the compressed gas may supply electricity to smooth or levelize variable output from a generation asset comprising a renewable energy source, for example a wind farm.

The various assets of the generation layer of the power network of FIG. 66, may be categorized in terms of the types of power that are to be produced. For example, baseload generation assets typically comprise apparatuses that are configured to produce energy at the cheapest price. Such baseload power generation assets are generally operated continuously at full power in order to afford a highest efficiency and economy. Examples of typical baseload generation assets include large power plants, such as nuclear, coal, or oil-fired plants.

Load following generation assets generally comprise apparatuses that are more capable of responding to changes in demand over time, for example by being turned on/off or operating at enhanced or diminished capacities. Examples of such load following generation assets include but are not limited to steam turbines and hydroelectric power plants.

A load following generation asset may be called upon to provide additional power to meet shifting demand, with as little advance notice as 30 minutes. Because load following generation assets typically do not operate continuously at full capacity, they function less efficiently and their power is in general more expensive than that available from baseline generation assets.

A third type of generation asset are the peak generation assets. Peak generation assets are utilized on an intermittent basis to meet the highest levels of demand. Peak generation assets are capable of operating on relatively short notice, but with reduced efficiency and correspondingly greater expense. A natural gas turbine, is one example of an apparatus that is typically employed as a peak generation asset. Another is a diesel generator.

While they are capable of providing power on relatively short notice, even peak generation assets require some lead time before they are able to produce power of the quantity and quality necessary to meet the requirements of the power network. Examples of such power quality requirements include stability of voltage within a given tolerance range, and the necessity of synchronizing frequency of output with the frequency that is already extant on the network.

Embodiments of compressed gas energy storage and recovery systems have previously been described in U.S. Provisional Patent Application Nos. 61/221,487 and 61/294,396, and U.S. Nonprovisional patent application Ser. Nos. 12/695,922, each of which are incorporated by reference in their entireties herein for all purposes. Incorporated by reference in its entirety herein for all purposes is U.S. Provisional Patent Application No. 61/358,776 being filed herewith.

One potential feature of such compressed gas energy storage and recovery systems, is their availability on short notice, to provide energy stored in relatively stable form. Specifically, the compressed gas may be maintained at an elevated pressure within a storage unit having a large volume. Examples of such storage structures include but are not limited to man-made structures such as tanks or abandoned mines or oil wells, or naturally-occurring geological formations such as caverns, salt domes, or other porous features.

Upon demand, the energy stored in the form of compressed gas may be accessed by actuating a gas flow valve to provide fluid communication between the storage unit and an expander apparatus. This simple valve actuation allows rapid conversion of the energy in the compressed gas into mechanical or electrical form.

For example, as described below expansion of the compressed gas within a chamber may serve to drive a piston also disposed therein. The piston may be in mechanical communication with a generator to create the electricity. Such a configuration allows for stable power to be rapidly generated because no warm-up period characteristic of a combustion engine is required. The energy in the air is available immediately, and need only overcome the system's inertia in order to deliver full power. A few seconds is sufficient.

Such ready availability of energy stored in the form of compressed gas, stands in marked contrast to combustion-type apparatuses, where stable power output may only be achieved upon regulation of multiple flows of material. For example, stable operation of a natural gas turbine may only occur by exercising precise control over flows of air and natural gas, the mixing of these flows, and the ignition of the mixture under substantially unvarying conditions. Operation of a gas turbine to produce stable, reliable output also requires careful management of the heat resulting from the combustion, to produce expanding gas that is converted to mechanical energy in the form of spinning turbine blades.

Depending upon the particular role upon which it is called upon to perform, a generation asset may operate with certain performance characteristics. Certain such characteristics are described in the table of FIG. 62. Certain embodiments compressed gas energy storage and recovery systems may be utilized to provide stable electrical power over a short term period, thereby covering the time period required to ramp-up a power generation asset.

According to certain embodiments, the compressed gas energy storage and recovery system may be physically co-situated with the generation asset, and may be in electrical communication with the power network through a common busbar. Alternatively, the generation asset and the energy storage and recovery system may be in electrical communication with the power network through a same transmission line.

Compressed gas energy storage and recovery systems according to the present invention, may be incorporated into the generation layer of a power network to levelize output of renewable energy sources that are variable in nature. For example, the output of a wind turbine is tied to the amount of wind that is blowing. Wind speed can rise or fall over relatively short periods, resulting in a corresponding rise and fall in the power output. Similarly, the output of a solar energy harvesting apparatus is tied to the amount of available sunshine, which can change over relatively short periods depending upon such factors as cloud cover.

Conventionally however, power networks have relied upon energy sources such as fossil fuel power plants, that exhibit an output that is substantially constant and controllable over time. This difference between renewable energy sources and those traditionally relied upon by power networks, may pose a barrier to the adoption renewable energy sources such as solar and wind power that are intermittent and/or variable in nature.

Figure 67:
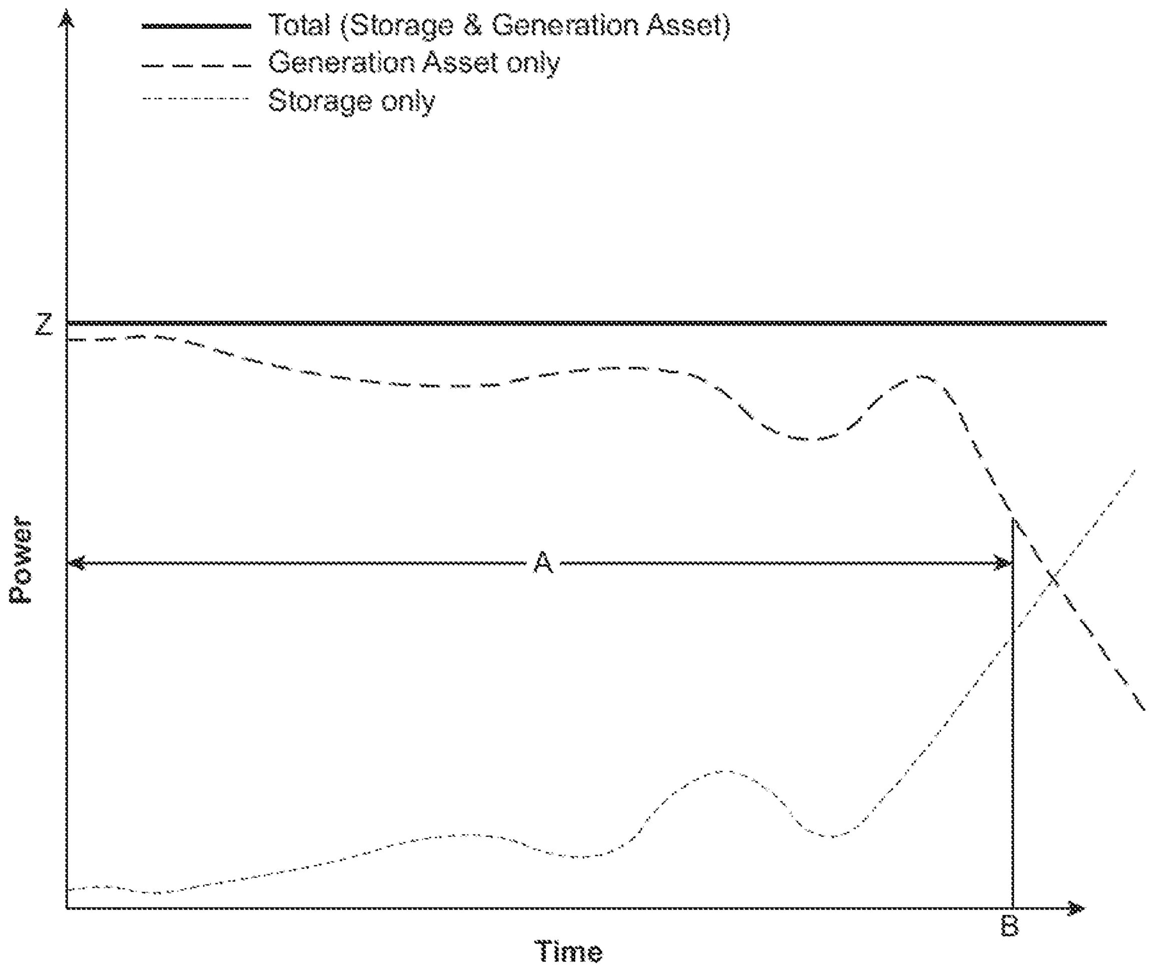
FIG. 67 shows a simplified view of the levelizing function that may be performed by a compressed gas energy storage and recovery system according to an embodiment of the present invention.

Accordingly, embodiments of compressed gas energy storage and recovery systems of the present invention may be coupled with renewable energy sources, in order to levelize their output onto the power network. FIG. 67 shows a simplified view of such a levelizing function.

For example, over the time period A shown in FIG. 67, the compressed gas energy storage and recovery system provides sufficient output to make up for differences between the variable output of the renewable alternative energy resource and a fixed value Z. This fixed value may be determined, for example, based upon terms of a contract between the owner of the generation asset and the network operator.

Moreover, at the time period starting at point B in FIG. 67, the energy provided by the renewable generation asset falls off precipitously, for example based upon a complete loss of wind or an approaching storm front. Under such circumstances, the compressed gas energy storage and recovery system may be configured to supply energy over a time period following B, until another generation asset can be ramped up to replacement energy coverage over the longer term.

In certain embodiments, the compressed gas energy storage and recovery system could be configured to transmit a message to the replacement generation asset to begin the ramp-up process. Such a message could be carried by a wide area network such as the internet or a smart grid, where the compressed gas energy storage and recovery system is not physically co-situated with the replacement generation asset.

Specifically, incorporation of embodiments of compressed gas storage and recovery systems into a power network, is also shown in FIG. 66. According to certain embodiments, a compressed gas energy storage and recovery system 6640*b* may be incorporated in the generation layer located along the same transmission line as a power generation asset 6610*a* or 6610*b*. In other embodiments, a compressed gas energy storage and recovery system 6640*a* according to the present invention may be physically co-situated with the power generation asset, possibly behind the same busbar.

Locating a compressed gas energy storage and recovery system with a power generation asset, may confer certain benefits. One such potential benefit is a cost advantage afforded by allowing more efficient operation.

For example, in certain embodiments the compressor element of the compressed gas energy storage and recovery system could be in physical communication with a moving member of a power generation asset through a physical linkage 6641. Thus, as described above, in a particular embodiment, the spinning blades of a gas or wind turbine could be in physical communication with the compressor of a compressed gas energy storage system through a mechanical, hydraulic, or pneumatic linkage.

The direct physical communication afforded by such a linkage may allow power to be transferred more efficiently between these elements, thereby avoiding losses associated with having to convert the power into electrical form. In this manner, power from an operating gas or wind turbine could be utilized to store compressed gas for later recovery in an output levelizing or ramp-up coverage role.

Moreover, co-situation of the compressed gas storage and recovery system with a generation asset, may allow efficient communication between them of other forms of energy flows. For example, certain embodiments of an energy storage system may be in thermal communication through a thermal link 6642, with a co-situated generation asset. Thus in some embodiments, an efficiency of expansion of compressed gas by the compressed gas energy storage system, could be enhanced utilizing heat that is communicated from the generation asset.

In this manner, waste heat from a thermal solar power plant could be leveraged to enhance gas expansion in the chamber of an energy storage system. Under certain circumstances, the system and thermal solar plant could be co-situated. In other embodiments, the compressed gas could be brought to the generation asset through an elongated conduit.

Siting of an energy storage system with a generation asset may also afford actual fluid communication between these elements through a fluid link 6644. For example, where an energy storage system is co-situated with a gas turbine generator, the fluid link could allow compressed gas stored by the system to be flowed directly to such a gas turbine for combustion, thereby enhancing the efficiency of operation of the gas turbine.

Another possible benefit which may be realized by co-situation of the energy storage system with a power generation asset, is the ability to leverage off of existing equipment. For example, an existing generation asset typically already includes a generator for converting mechanical energy into electrical power. A compressed gas energy storage and recovery system according to the present invention could utilize the same generator element to convert motion from gas expansion into electrical power. Similarly, a compressed gas energy storage and recovery system could utilize a power generation asset's existing interface with the network (busbar), in order to communicate power to the network.

Yet another possible benefit which may be realized by locating an energy storage system behind the busbar in the network's generation layer, is the resulting form of regulatory oversight. As part of the generation layer, an energy storage system's contact with the network is relatively simple and limited. In particular, the energy storage system would contact the network through a single interface, and the magnitude and direction of flows of power through the interface would be based upon expected operation of the generator and the energy storage system.

Co-situation of the energy storage system with a power generation asset, may further enhance coordinated action between the two elements. In particular, the communication link 6650 between the compressed gas energy storage system 6640*a* and the co-situated generation asset may be local in nature, and hence potentially faster and more reliable than a larger area network.

Such close proximity between the energy storage system and the generation asset may help to facilitate a seamless transition between power being output onto the network from the storage system, to power being output onto the network from the generation asset. In the output levelizing role, close proximity between the energy storage system and the alternative source of intermittent energy may facilitate rapid and smooth intervention by the storage system to produce power in the face of rapidly changing conditions.

While desirable under certain circumstances, it is not required that the compressed gas energy storage and recovery system according to the present invention be physically co-situated with a power generation asset. In particular, the increased reliability of communication over wide area networks such as the internet, has reduced the need for close proximity between different elements of the network.

Accordingly, FIG. 66 also shows an embodiment of a compressed gas energy storage and recovery system 6640*b* that is located along the same transmission line as a power generation asset 6610*a*. System 6640*b* and power generation asset 6610*a* may effectively communicate over wired or wireless network link 6657.

For example, one potential role for a compressed gas energy storage and recovery system according to embodiments of the present invention, is to provide a governor response mechanism that may otherwise be lacking from certain forms of alternative energy sources. Specifically, conventional power generators involving the flows of fluids (such as steam turbines), include a governor device linking measured speed of the generator with a fluid flow valve. The governor may be operated in a manner to provide negative feedback, for example opening the valve to promote fluid flow when operational speed is too low, and closing the valve to restrict fluid flow when operational speed is too high.

Such generators may be designed to have Automatic Generation Control (AGC) capability. Where additional power is needed to stabilize frequency, voltage, or for other ancillary purposes, AGC allows a message from the system operator requesting an increase or decrease in output to be forwarded directly to the governor. This signal takes precedence over the governor's own determination of speed and other conditions.

However, certain power generation assets lack inherent AGC capability. For example, the amount of power output by a wind turbine is based upon a speed of rotation of the turbine blades by the wind. Such rotation cannot be accelerated in the conventional manner by action of a governor, in order to provide additional voltage.

Certain forms of solar energy may also lack an intrinsic governor response mechanism. For example, the amount of energy available from an array of photovoltaic cells or thermal solar system is typically dictated by sunshine, and may not necessarily be readily augmented in order to meet a demand for additional power.

Accordingly, some embodiments of compressed gas energy storage and recovery systems according to the present invention may be coupled with such non-governor generation assets of the power network. Such a storage system could essentially take the place of a governor, endowing the generation asset with AGC capability, and automatically outputting more power on short notice in response to a request for voltage stabilization by the system operator. Such a configuration would facilitate integration of an alternative energy source within the existing power grid infrastructure, and would not necessarily require physical co-situation of the energy storage system with alternative power generation asset.

Such positioning of the energy storage system in a location different from the generation asset, may be beneficial under certain circumstances. For example, the site of a renewable energy source is largely dictated by the availability of natural resources such as wind or sunlight. As a result, such alternative generation assets may be situated in remote areas, increasing the expense of inspection and maintenance of any co-situated elements such as a compressed gas energy storage and recovery system. Additional costs may be associated with transmitting the power from a remote area to where it is needed. Accordingly, providing the energy storage system in a more accessible location may improve the cost effectiveness of its operation.

Positioning a compressed gas energy storage and recovery system in a different location than a generation asset, may also endow it with greater flexibility. Specifically, operation of such a remotely located energy storage system would not necessarily be tied to any particular generation asset. Thus, the compressed gas energy storage and recovery system 6640*b* of FIG. 66 could readily supply power onto the network in order to provide coverage over the ramp-up period for generation asset 6610*a*, generation asset 6610*b*, or both of these.

Figure 68:
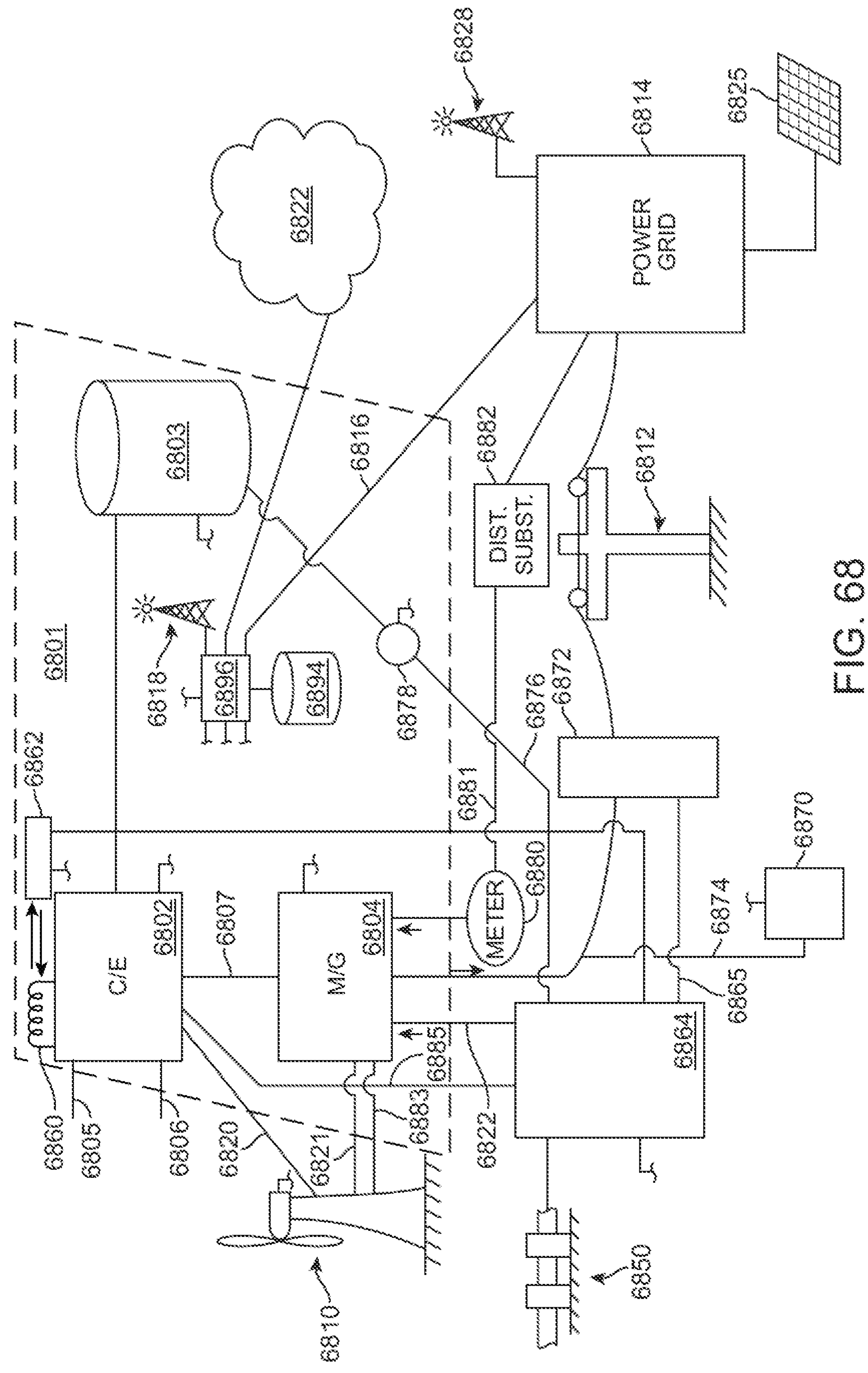
FIG. 68 shows a simplified view of an embodiment of a compressed gas energy storage and recovery system according to the present invention, which is co-situated with a power generation asset.

FIG. 68 shows a simplified block diagram of one embodiment of a compressed gas storage and recovery system in accordance with an embodiment of the present invention. In particular, compressed gas storage and recovery system 6801 comprises compressor/expander (C/E) 6802 in fluid communication with gas inlet 6805, and in fluid communication with compressed gas storage unit 6803.

FIG. 68 shows that compressor/expander 6802 is in selective physical communication with/generator (M/G) 6804 through linkage 6807. In a first mode of operation, motor/generator 6804 operates as a motor to allow energy to be stored in the form of a compressed gas (for example air). Motor/generator 6804 receives power from an external source, and communicates that power to cause compressor/expander 6802 to function as a compressor. One possible source of power for the motor/generator 6804 is the meter 6880 that is in electrical communication through line 6881 with substation 6882 of the distribution layer of the power grid 6814. As described further in detail below, the power grid 6814 may be a smart grid containing information in addition to power.

In compression, motor/generator 6804 in turn communicates power to compressor/expander 6802 through linkage 6807, allowing compressor/expander 6802 to function as a compressor. Compressor/expander 6802 receives the gas from inlet 6805, compresses the gas, and flows the compressed gas to the storage unit 6803.

FIG. 68 also shows that the system 6801 may also be configured to receive energy from a first (variable) alternative source 6810 such as a wind turbine. Here, the compressor/expander 6802 is shown as being in physical communication with the wind turbine 6810 through a linkage 6820. This linkage may be mechanical, hydraulic, or pneumatic in nature.

The direct communication between the rotating blades of the wind turbine and the compressor/expander, afforded by linkage 6820, may allow for the efficient storage of energy as compressed gas with little energy loss. Embodiments of a combined wind turbine-compressed gas storage system are described in the co-pending U.S. Nonprovisional patent application Ser. No. 12/730,549, which is incorporated by reference in its entirety herein for all purposes. In certain embodiments, the energy storage system and the alternative energy source may share a common generator, as indicated by the physical linkage 6821.

In certain embodiments, the alternative energy storage source may include a separate generator and provide energy in electrical form through linkage 6883 to power motor/generator 6804 that is functioning as a motor. In certain embodiments a separate generator in the wind turbine may be in electrical communication with motor/generator 6804 through linkage 6883.

FIG. 68 further shows that the compressed gas energy storage and recovery system 6801 may also be configured to receive energy from a second (dispatchable) source 6850, such as a pipeline of oil or natural gas. The system may draw upon this dispatchable energy source 6850 to meet contractual commitments to supply power, for example where previous operation has exhausted the stored compressed gas supply.

In particular, the energy from the dispatchable source 6850 may be consumed by an element 6864 such as a natural gas turbine, diesel motor, or gas motor, to drive motor/generator 6804 through linkage 6822 to operate as a generator, and thereby produce electricity for output onto the grid (for example during peak demand periods). Energy from the alternative energy source 6850 may also be consumed by element 6864 to drive compressor/expander 6802 through linkage 6885 to operate as a compressor, and thereby compress gas for energy recovery, for example during off-peak demand periods.

The element 6864 may also be in thermal communication with a heat source 6862 through heat exchanger 6860. In this manner, thermal energy resulting from operation of element 6864 may improve the efficiency of expansion during recovery of energy from compressed gas.

Where element 6864 is a turbine (such as a gas turbine), in certain embodiments it may utilize expansion of compressed gas from the storage unit during a combustion process. Accordingly, FIG. 68 shows element 6864 in selective fluid communication with compressed gas storage unit 6803 through a fluid conduit 6876 and a valve 6878. Utilizing the compressed gas for combustion in this manner may allow high efficiency recovery of the energy stored in that compressed gas.

In certain embodiments compressor/expander 6802 may comprise a separate compressor and a separate expander that are configurable to be arranged to operate together as a heat engine. In such an embodiment, heat from heat source 6862 may be used to drive motor/generator 6804 even after gas storage unit 6803 has been depleted.

In certain embodiments, the energy storage and recovery system 6801 may also be co-situated with another facility 6870, which may be a large consumer of electricity. Examples of such facilities include but are not limited to, manufacturing centers such as factories (including semiconductor fabrication facilities), data centers, hospitals, ports, airports, and/or large retail facilities such as shopping malls.

The facility 6870 and the energy storage and recovery system 6801 may share a common interface (such as a meter) with the power grid, although power may be routed between system 6801 and facility 6870 through a separate channel 6874. Power may be communicated directly from the energy storage and recovery system to the facility through channel 6874 to serve as an uninterruptible power supply (UPS), or to allow the facility to satisfy objectives including but not limited to peak shaving, load leveling, and/or demand response. Other links (not shown here), such as thermal, fluidic, and/or communication, may exist between the facility and the energy storage system, for example to allow temperature control.

In a second mode of operation, energy stored in the compressed gas is recovered, and compressor/expander 6802 operates as an expander. Compressor/expander 6802 receives the compressed gas and allows this compressed gas to expand, driving a moveable member in communication through linkage 6807 with motor/generator 6804 that is functioning as a generator. The resulting power from the motor/generator may be output onto the power grid via the busbar 6872 and the transmission line 6812 for consumption.

As previously described, gas undergoing compression or expansion will tend to experience some temperature change. In particular, gas will tend to increase in temperature as it is compressed, and gas will tend to decrease in temperature as it expands.

The processes of compressing and decompressing the gas as described above, may experience some thermal and mechanical losses. However, these processes will occur with reduced thermal loss if they proceed at near-isothermal conditions with a minimum change in temperature. Such near-isothermal compression and/or expansion may be achieved utilizing one or more techniques, including but not limited to injection of liquid to perform heat exchange.

Accordingly, the compressor/expander apparatus 6802 of the system 6801 is in fluid communication with one or more heat exchanger(s) 6860 that may be selectively in thermal communication with a heat sink or a heat source 6862. In a compression mode of operation, the heat exchanger is placed into thermal communication with a heat sink, for example the atmosphere, where a fan that blows air to cool the heat exchanger. In an expansion mode of operation, the heat exchanger is placed into thermal communication with a heat source, for example an environmental air temperature or a source of waste heat. The heat source may be a structure such as a pond that is configured to receive and store heat generated by element 6864 drawing upon energy source 6850.

While the particular embodiment of FIG. 68 shows an energy storage and recovery system in the form of a system utilizing compressed gas, the present invention is not limited to such a system. Alternative embodiments of the present invention could utilize other forms of energy storage and recovery systems located behind the same busbar, or in communication with the same transmission line, as a generation asset of a power supply network. Examples of such other types of energy storage and recovery systems include but are not limited to: pumped hydroelectric, flywheels, batteries, ultracapacitors, thermal storage, chemical storage, osmotic pressure storage, or superconducting rings.

The various elements of the system 6801 are in communication with a central controller or processor 6896, that is in turn in electronic communication with a computer-readable storage medium 6894. The central controller or processor 6896 may also be in communication with a power grid 6814 (for example a smart grid) through a wired connection 6816 and/or a wireless link between nodes 6818 and 6828. The central controller or processor 6896 may also be communication with other sources of information, for example the internet 6822.

Based upon instructions in the form of computer code stored on computer-readable storage medium 6894, the controller or processor 6896 may operate to control various elements of the system 6801. This control may be based upon data received from various sensors in the system, values calculated from that data, and/or information received by the controller or processor 6896 from various sources, including co-situated sources or external sources.

In certain embodiments, the controller of the system may be configured to commence operation based upon an instruction received from a generation asset. For example, a compressed gas storage and recovery system may be engaged to provide power to levelize intermittent output from a renewable energy generation asset. In such circumstances, the controller could then be configured to receive a signal indicating the variable or intermittent output from the renewable energy generation asset, and in response generate a sufficient amount of power.

In certain embodiments, the compressed gas energy storage and recovery system may transmit signals to a generation asset. For example, a system engaged in the levelizing function may receive an indication of long term loss of output from a renewable energy generation asset (due to cloudiness or of loss of wind). Upon detection of such an event, the system controller could be configured to transmit a signal instructing another generation asset to provide sufficient power coverage over longer time frame.

Figure 68A:
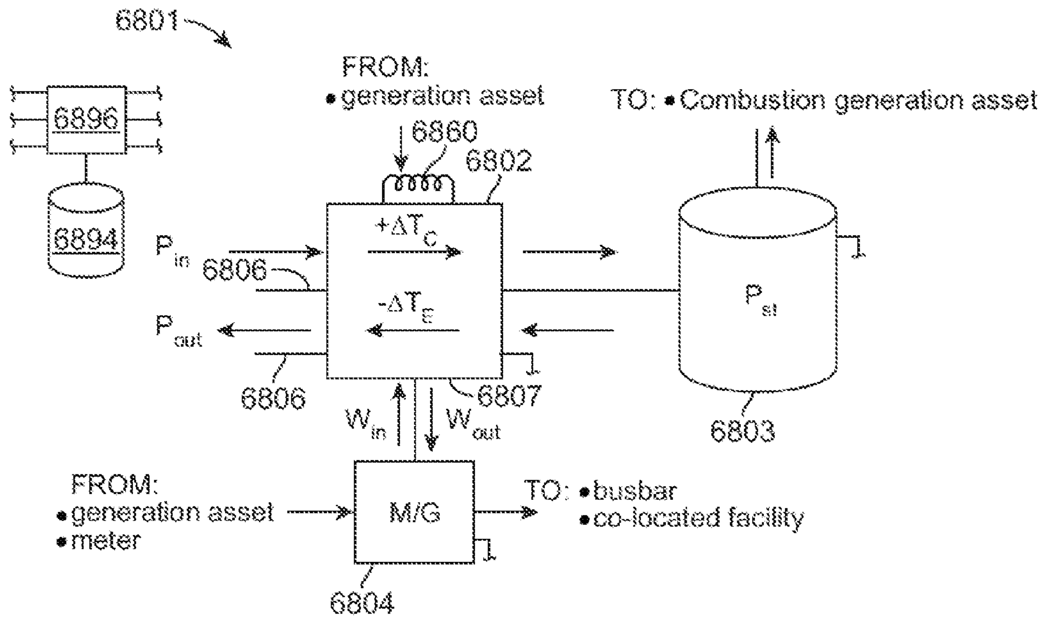
FIG. 68A shows a simplified view of an embodiment of a compressed gas energy storage and recovery system utilizing a combined motor/generator and a combined compressor/expander.

FIG. 68A is a simplified block diagram showing the various system parameters of operation of a combination compression/expansion system in accordance with an embodiment. FIG. 68A shows that under compression, motor/generator 6804 receives power from an external source, and communicates that power ($W_{in}$) to cause compressor/expander 6802 to function as a compressor. Compressor/expander 6802 receives uncompressed gas at an inlet pressure ($P_{in}$), compresses the gas to a greater pressure for storage ($P_{st}$) in a chamber utilizing a moveable element such as a piston, and flows the compressed gas to the storage unit 6803.

FIG. 68A also shows that in a second mode of operation, energy stored in the compressed gas is recovered, and compressor-expander 6802 operates as an expander. Compressor/expander 6802 receives the compressed gas at the stored pressure $P_{st}$ from the storage unit 6803, and then allows the compressed gas to expand to a lower outlet pressure $P_{out}$ in the chamber. This expansion drives a moveable member which is in communication with motor/generator 6804 that is functioning as a generator. Power output ($W_{out}$) from the compressor/expander and communicated to the motor/generator 6804, can in turn be input onto a power grid and consumed.

FIG. 68A also shows the existence of possible physical, fluidic, communications, and/or thermal linkages between the compressed gas storage and recovery system, and other elements.

Figure 68B:
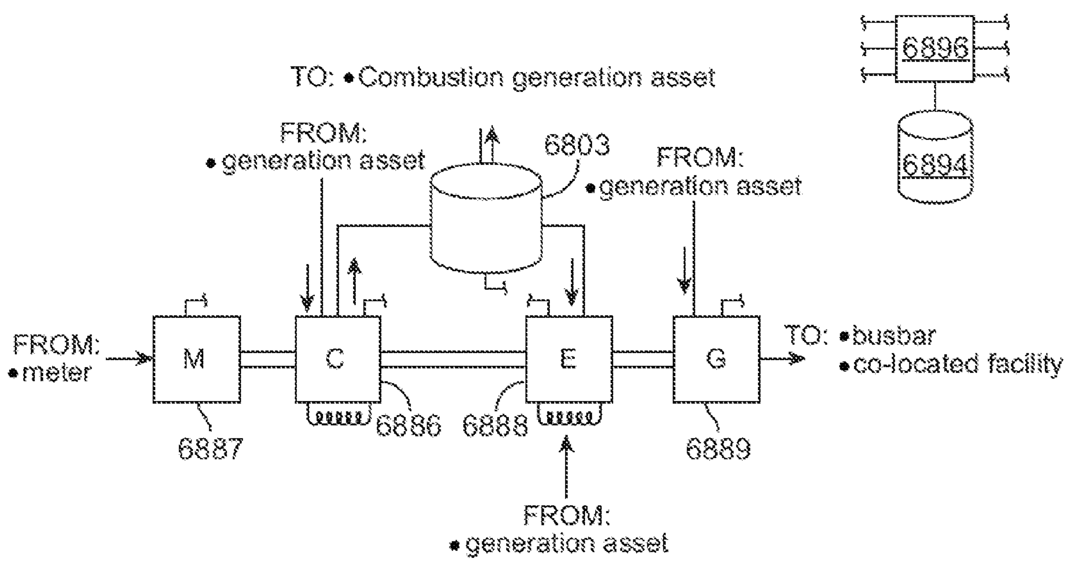
FIG. 68B shows a simplified view of an embodiment of a compressed gas energy storage and recovery system utilizing dedicated motor, generator, compressor, and expander elements.

While FIGS. 68 and 68A have shown an embodiment of a compressed gas storage and recovery system having a combined compressor/expander (C/E) and a combined motor/generator (M/G), this is not required by the present invention. FIG. 68B shows an alternative embodiment which utilizes separate, dedicated compressor and expander elements 6886 and 6888, respectively, that are in communication with separate, dedicated motor and generator elements 6887 and 6889 respectively. In certain embodiments these elements may be in physical communication through a single common linkage. In other embodiments, these elements may be in physical communication through a plurality of linkages. In still other embodiments, motor 6887 and generator 6889 may be combined into a single motor/generator unit.

In this embodiment as well as others, energy recovered from expansion of compressed gas need not be routed out of the system as electrical energy. In certain modes of operation the full amount of the energy derived from expanding gas may be consumed for other purposes, for example temperature control (such as heating or cooling) and/or the compression of more gas by a compressor.

Figure 68C:
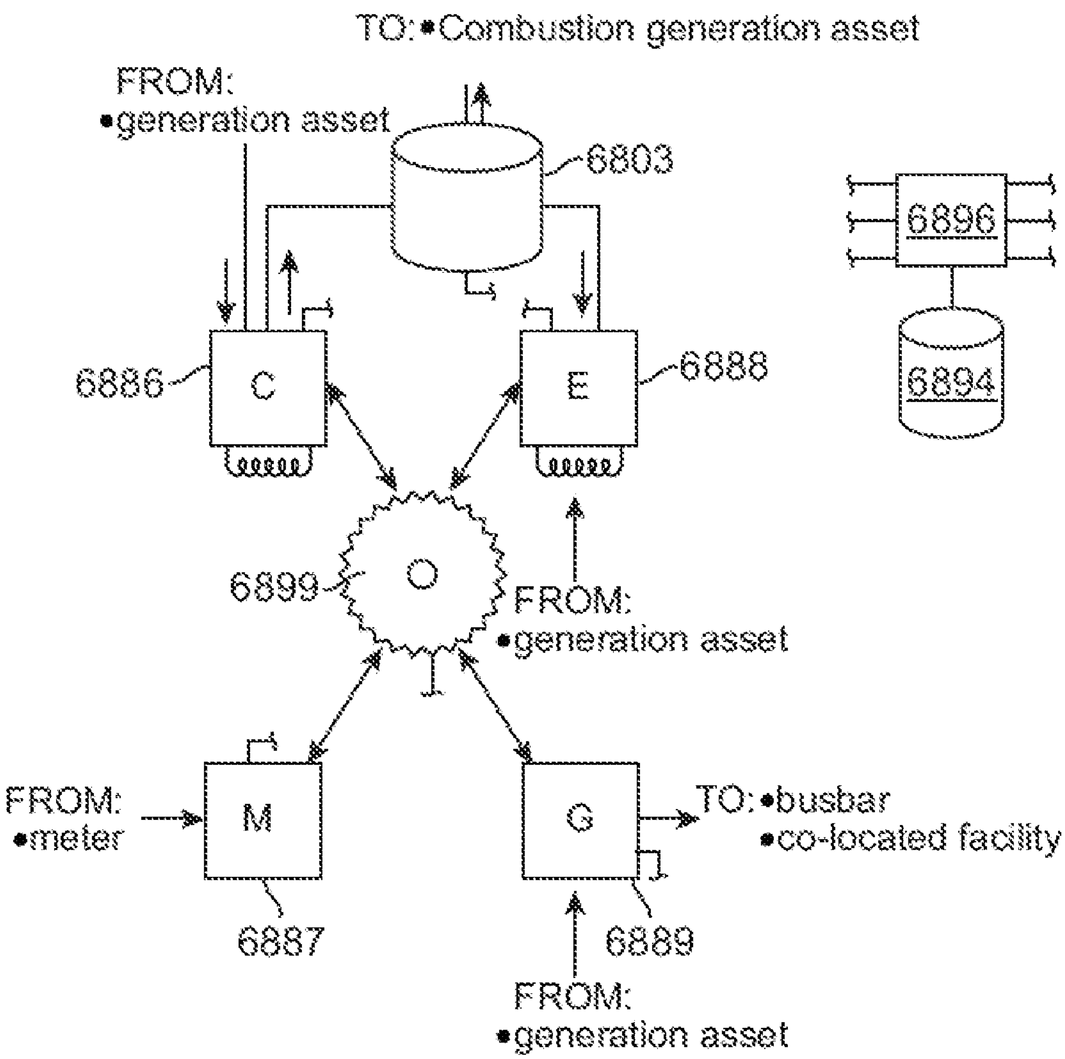
FIG. 68C shows a simplified view of an embodiment of a compressed gas energy storage and recovery system in accordance with the present invention utilizing a multi-node gearing system.

FIG. 68C shows a simplified block diagram of an alternative embodiment of a compressed gas storage and recovery system in accordance with an embodiment of the present invention. In the embodiment of FIG. 68C, the dedicated compressor (C) 6886, the dedicated expander (E) 6888, a dedicated motor (M) 6887, and a dedicated generator (G) 6889, are all in selective physical communication with one another through a multi-node gear system 6899. An embodiment of such a gear system is a planetary gear system described in U.S. Nonprovisional patent application Ser. No. 12/730,549, which is incorporated by reference herein for all purposes.

A multi-node gearing system such as a planetary gear system as shown previously in FIGS. 33A-AA, may permit movement of all of the linkages at the same time, in a subtractive or additive manner. For example where the wind is blowing, energy from the turbine linkage may be distributed to drive both the linkage to a generator and the linkage to a compressor. In another example, where the wind is blowing and demand for energy is high, the planetary gear system permits output of the wind turbine linkage to be combined with output of an expander linkage, to drive the linkage to the generator.

Moreover, a multi-node gear system may also be configured to accommodate movement of fewer than all of the linkages. For example, rotation of shaft 3341 in FIG. 33A may result in the rotation of shaft 3362 or vice-versa, where shaft 3368 is prevented from rotating. Similarly, rotation of shaft 3341 may result in the rotation of only shaft 3368 and vice-versa, or rotation of shaft 3362 may result in the rotation of only shaft 3368 and vice-versa. This configuration allows for mechanical energy to be selectively communicated between only two elements of the system, for example where the wind turbine is stationary and it is desired to operate a compressor based upon output of a motor.

Certain embodiments of the present invention may favorably employ a planetary gear system to allow the transfer of mechanical energy between different elements of the system. In particular, such a planetary gear system may offer the flexibility to accommodate different relative motions between the linkages in the various modes of operation.

While FIG. 68C shows an embodiment having a multi-node gear system, this is not required by the present invention. In alternative embodiments, various elements of the system could be in physical communication with each other through individual physical linkage or through physical linkages shared with fewer than all of the other elements.

In certain embodiments, a compressed gas energy storage and recovery system may utilize injection of liquid to facilitate heat exchange during compression and/or expansion. Such heat exchange may allow temperature controlled (such as near-isothermal) conditions to be maintained during the compression and/or expansion processes, thereby improving efficiency of the corresponding storage and recovery of energy.

Incorporation of compressed gas energy storage and recovery systems into the generation layer of a power network, may allow existing generation assets to be utilized in roles from which they might otherwise be precluded by virtue of their ramp-up times. For example, a potential role for generation assets may be to sell power onto energy markets.

One such market is for the sale of energy to balance supply with demand over time frames of greater than one hour. Such an embodiment may dispatch power from storage systems in near-real time in order to allow an existing generation asset to meet short-term fluctuation in demand. These fluctuations can result from natural causes, for example a change in an amount of power supplied by a variable renewable energy source (such as a wind farm). The fluctuations can also be of an artificial origins, for example changes in rate scheduling by energy markets.

Certain embodiments of compressed gas energy storage and recovery systems may be configured to facilitate the ramp-up of generation assets to sell power onto wholesale energy markets over longer time frames, for example within a day. Thus another potential role for energy storage systems of the present invention, may be to facilitate bulk intraday arbitrage by a generation asset.

In such a role, a generation asset would function to ramp-up and provide energy for sale when wholesale power is expensive. The presence of a compressed gas energy storage system would allow a generation asset to respond on short notice to opportunities for such bulk intraday arbitrage.

Power from the storage system (and later replaced by power from the generation asset after ramp-up), could be sold onto the wholesale energy market. Such a compressed gas energy storage and recovery system could be owned and operated by an Independent Power Producer (IPP), a generation utility, or some other Load Serving Entity (LSE).

Another potential role for generation assets whose ramp-up is covered by compressed gas energy storage and recovery systems, may be to perform diurnal renewable levelizing. Specifically, the fast response time of such a generation asset would allow demand to quickly be shifted from variable renewable energy sources in order to better match load and transmission availability. For example, where winds die down, energy from compressed gas could tide over the power network until a gas turbine is ramped-up to cover the loss of the renewable supply. This would increase the reliability, and hence value, of the renewable energy.

While the above description has related to systems classified as belonging to the generation layer whose recovered power is sold onto wholesale energy markets, the present invention is not limited to performing such roles. In accordance with alternative embodiments, energy storage and recovery systems could sell energy to other types of markets and remain within the scope of the present invention.

An example of such an alternative market for selling power recovered from compressed gas, is the ancillary services (A/S) market. Broadly speaking, the ancillary services market generally represents the sale of electrical power to the network for purposes other than consumption by end users. Such purposes include maintaining integrity and stability of the network, and the quality of the power provided thereon.

The ability (capacity) to provide energy to the ancillary services market, is usually sold for periods of less than one day, at a market price. The Independent System Operator (ISO) pays the capacity cost for reserving such capacity.

The actual energy itself, is sold in response to a call from the network to provide the power for a duration. When this happens, the owner of the system would be paid the market value of the energy sold.

One ancillary market exists for maintaining the capacity to provide necessary reserves needed to operate the network. That is, the operator of the network is required to be able to supply an amount of power above and beyond an existing demand, in order to ensure that the network is able to meet future demand. Such reserves are typically calculated as a percentage in excess of a supply.

One form of reserves are contingency reserves. Contingency reserves are summoned by the power network at relatively short notice in response to certain events (contingencies) that are unexpected but need to be planned for. Examples of such possible contingencies include the failure of an element of the transmission layer (such as a transmission line), an unanticipated surge in demand, or the need to shut down or reduce output of a generation element on short notice.

One form of contingency reserves are spinning reserves. Such spinning reserves are typically available on extremely short notice. Spinning reserves have traditionally taken the form of an increase in output from generating units that are operating at less than capacity, or by interruption of service to certain customers. Such reserve is referred to as "spinning" because in order to satisfy the demand on short notice, the generation asset may already be on-line and operating in a synchronous manner ("spinning") with the rest of the network.

Another form of contingency reserves are standing reserves. Standing reserves are available with a longer lead time than spinning reserves, as the generation element is not yet synchronously on-line. Standing reserves may also take the form of an interruption of service to certain customers, with a correspondingly longer notice period.

In certain embodiments, existing generation assets whose ramp-up times are covered by compressed gas energy storage and recovery systems according to the present invention, may be able to function to provide contingency reserves. Such generation assets would have the capacity to provide the necessary amount of contingency power for a duration required by the service provider. Various possible roles for ramp-up coverage are summarized above.

A compressed gas energy storage and recovery system may be incorporated within a power supply network, with an end user behind the meter. Such an energy storage and recovery system could function in power supply and/or temperature control roles. In certain embodiments, the energy recovered from expansion of compressed gas may be utilized to cool an end user. According to some embodiments, heat generated from compression of the gas could be utilized for heating. In functioning as a power supply, the compressed gas energy storage and recovery system could serve as an uninterruptible power supply (UPS) for the end-user, and/or could function to provide power to allow the end user to perform peak shaving and/or participate in demand response programs.

According to embodiments of the present invention, a compressed gas energy storage and recovery system may be incorporated within a power supply network behind the meter of an end user. In certain embodiments energy produced by compression of the gas, or energy recovered from expansion of the gas (and possibly supplemented from other heat sources), may be utilized to provide temperature control (for example cooling and/or heating) of the end user.

Examples of some parameters for such temperature control roles are listed in the table shown as FIG. 60.

In certain embodiments, compressed gas energy storage systems that are located within the consumption layer, may provide a supply of power to meet the full or partial needs of the end user. Examples of such power supply roles include but are not limited to functioning as an uninterruptible power supply (UPS), as a power supply allowing the end user to engage in daily arbitrage (i.e. the daily purchase of power from the network at times of lower price), as a power supply allowing the end user to participate in demand response programs, as a power supply allowing the end user to reduce consumption below historic peak levels, and/or as a power supply furnishing power during periods of varying or intermittent supply from a renewable energy source, such as a wind turbine or photovoltaic (PV) array.

Examples of some parameters for such power supply roles are listed in the table shown as FIG. 62.

An example of a small end user includes an individual residence or a small business. Examples of a medium-sized end users include those with greater demands for power and/or temperature control, for example hospitals, office buildings, large stores, factories, or data storage centers. A large end user may include ones made up of a plurality of individual entities, for example a shopping mall, a residential subdivision, an academic or administrative campus, or a transportation node such as an airport, port, or rail line.

FIG. 66 shows incorporation of various embodiments of compressed gas storage systems into a power network. FIG. 66 shows that in certain embodiments, a compressed gas energy storage and recovery system 6640*a* may be incorporated in the consumption layer behind a meter 6634*a* with an end user 6606*a*. In such a configuration, a plurality of different types of linkages 6650 (including but not limited to physical, thermal, electrical, fluidic, and/or communication) may be present between the end user and the energy storage and recovery system.

FIG. 66 also shows that in other embodiments, a compressed gas energy storage and recovery system 6640*b* according to the present invention may be co-situated behind a meter 6634*b* with both the end user 6606*b* and with one or more local power sources 6655. Examples of such local power sources include but are not limited to wind turbines and solar energy harvesting apparatuses such as a rooftop photovoltaic (PV) arrays and/or thermal solar systems. In such a configuration, a plurality of different types of linkages 6650 (including but not limited to physical, electronic, communication, thermal, and/or fluidic) may be present between the end user and the energy storage and recovery system, between the end user and the local generator, and/or between the energy storage and recovery system and the local power source.

Figure 69:
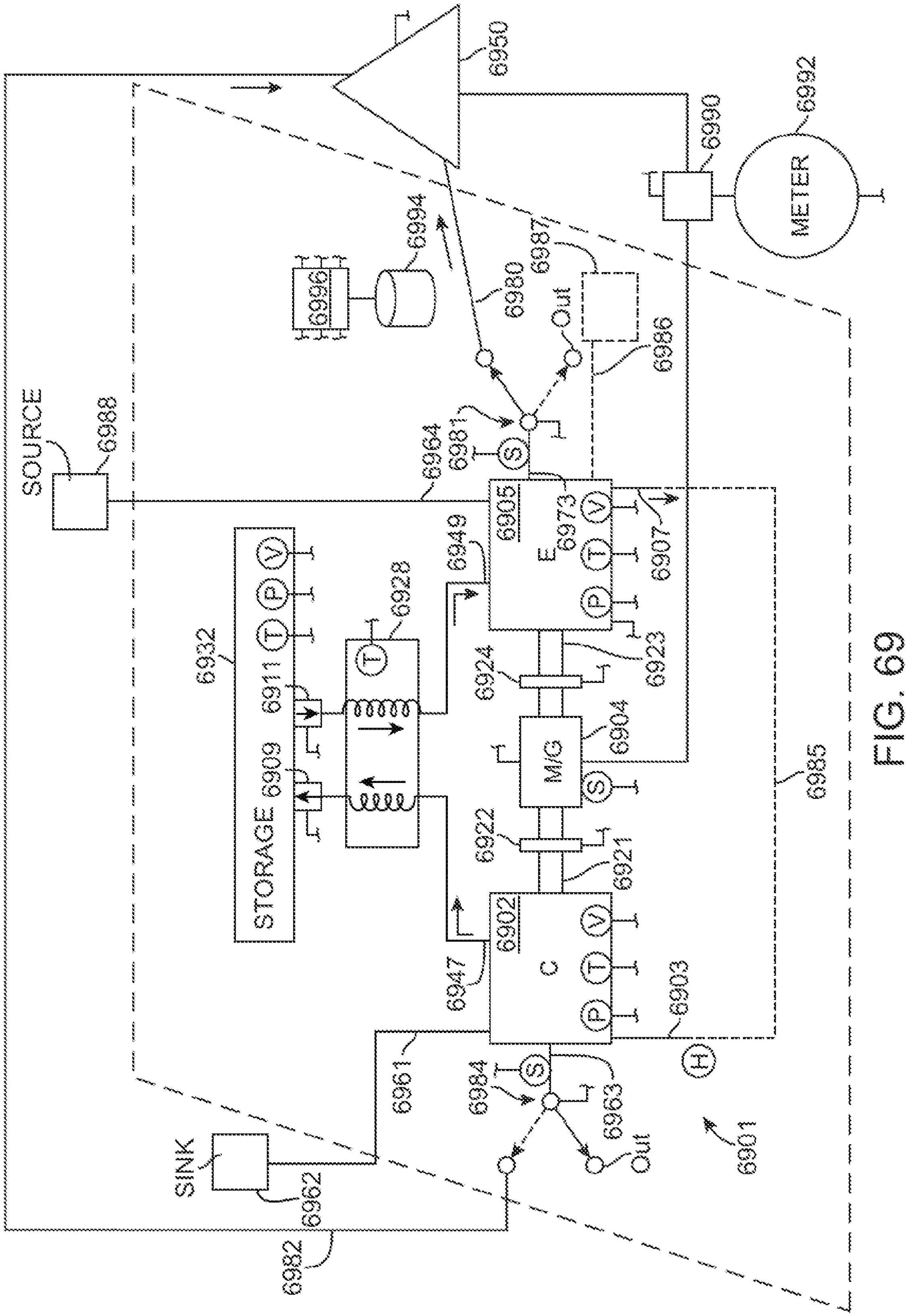
FIG. 69 shows a simplified view of an embodiment of a compressed gas energy storage and recovery system according to the present invention, which is co-situated with an end user behind a meter.

FIG. 69 shows a simplified block diagram of one embodiment of a compressed gas storage and recovery system in accordance with an embodiment of the present invention. In particular, compressed gas storage and recovery system 6901 comprises a motor/generator (M/G) 6904 configured to be in electrical communication with an end user 6950 and with a meter 6992.

Motor/generator (M/G) 6904 is in selective physical communication with dedicated compressor (C) 6902 through physical linkage 6921 and clutch 6922. Motor/generator (M/G) 6904 is also in selective physical communication with dedicated expander (E) 6905 through linkage 6923 and clutch 6924.

The dedicated compressor (C) 6902 is in selective fluid communication with gas inlet 6903. A gas outlet 6947 of the dedicated compressor is in selective fluid communication with compressed gas storage unit 6932 through counterflow heat exchanger 6928 and one-way valve 6909.

In certain embodiments, the compressed gas storage unit 6932 may be in selective communication with a heat source. For example, the compressed gas storage unit could be positioned in thermal communication with the sun, such that during the daylight hours it absorbs solar energy. In certain embodiments the storage unit could be coated with a material that promotes the absorption of thermal energy, for example a dark colored paint.

In certain embodiments the compressed gas storage unit could be positioned in thermal communication with the sun behind an optically transparent barrier, such as glass. The barrier could serve to trap infrared (IR) radiation from the sun's rays, thereby further enhancing heating of the compressed gas during daylight hours.

A gas inlet 6949 of the dedicated expander (E) is in selective fluid communication with compressed gas storage unit 6932 through the counterflow heat exchanger 6928 and one-way valve 6911. The dedicated expander is in selective fluid communication with gas outlet 6907.

As mentioned above, embodiments of the present invention employ heat exchange with introduced liquid to achieve efficient energy storage and recovery utilizing gas compression and expansion under conditions of controlled temperature change. In certain embodiments, these controlled temperature conditions may result in near-isothermal gas compression or expansion.

Thermal energies extant within the system may be communicated through a variety of thermal linkages. A thermal linkage according to embodiments of the present invention may comprise one or more elements configured in various combinations to allow the transfer of thermal energy from one physical location to another. Examples of possible elements of a thermal linkage include but are not limited to, liquid flow conduits, gas flow conduits, heat pipes, heat exchangers, loop heat pipes, and thermosiphons.

For example, the dedicated compressor may be in selective thermal communication with thermal sink 6962 through a thermal linkage 6961. This thermal linkage may allow the transfer of thermal energy in the form of heat from the compressed gas.

The dedicated expander may be in selective thermal communication with thermal source 6988 through thermal linkage 6964. This thermal linkage may allow the transfer of thermal energy in the form of coolness from the expanded gas.

The dedicated compressor includes a thermal linkage 6963 that is configured to communicate thermal energy in the form of heat from the compressed gas. This thermal energy in the form of heat may be selectively flowed through switch 6984 out of the system, or through thermal linkage 6982 to the end user. In certain embodiments, thermal linkage 6982 may convey heat in the form of the compressed gas itself. In certain embodiments, the thermal linkage may convey the heat in the form of a fluid that has exchanged heat with the compressed gas.

The dedicated expander includes a thermal linkage 6973 that is configured to communicate thermal energy in the form of coolness from the expanded gas. This thermal energy in the form of coolness may be selectively flowed through switch 6981 either out of the system, or through thermal linkage 6980 to the end user. In certain embodiments, thermal linkage 6973 may convey coolness in the form of the expanded gas itself. In certain embodiments, the thermal linkage may convey the coolness in the form of a fluid that has exchanged heat with the expanded gas.

In certain embodiments, the thermal links 6980 and 6982 may be configured to interface with an existing Heating, Ventilation, and Air-Conditioning (HVAC) system in the end user. Examples of such standard HVAC systems include but are not limited to available from the following manufacturers: AAON, Addison Products Company, Allied Thermal Systems, American Standard, Armstrong, Bard, Burnham, Carrier, Coleman, Comfortmaker, Goodman, Heil, Lennox, Nordyne, Peake Industries Limited, Rheem, Trane, and York International.

Exemplary types of residential HVAC systems may comprise air conditioners, heat pumps, packaged gas electric, packaged heat pumps, packaged air conditioners, packaged dual fuel, air handlers, and furnaces. Exemplary types of commercial HVAC systems may comprise packaged outdoor units, including packaged rooftop units using Puron® refrigerant, packaged rooftop units using R-22 refrigerant, and 100% Dedicated outdoor air units. Commercial HVAC systems packaged indoors include indoor self-contained units, water source heat pumps, and packaged terminal air conditioners.

Commercial HVAC systems may also be in the form of packaged split-systems. Examples include split systems (6 to 130 tons), split systems (1.5 to 5 tons), condensers, duct free systems, furnaces, and coils.

Examples of chillers include but are not limited to air-cooled chillers, water-cooled chillers, condenserless chillers, and may include condensors and other chiller components.

Airside equipment may include but is not limited to air handlers, air terminal coils, fan coils, heat/energy recovery units, induction units, underfloor air distribution systems and unit ventilators. Examples of heating equipment include but are not limited to boilers and furnaces.

In many embodiments the thermal linkages may comprise fluidic conduits that are part of a loop or circuit of fluid flow. In certain embodiments, fluid(s) cooled by direct or indirect heating of the end user (or heated by direct or indirect cooling of the end user) may be returned to the system.

Thus in certain embodiments, heated liquid outlet from the compressor, may be circulated back to the compressor after exposure to a heat sink (which may be an end user requiring heating). Similarly, cooled liquid outlet from the expander may be circulated back to the expander after exposure to a heat source (which may be an end user requiring cooling). In both cases, the thermal exposure could occur through one or more heat exchanger structures.

In certain embodiments, cooled gas outlet from the expander, may be circulated back to the compressor after exposure to a heat source in the form of an end user requiring cooling. Similarly, heated gas outlet from the compressor may be circulated back to the expander after exposure to a heat sink in the form of an end user requiring heating. In such cases, the thermal exposure could occur through one or more heat exchanger structures.

Again, the thermal linkages need not comprise a single element. Thermal energy could be transferred from a liquid flowing through a liquid conduit, to a gas flowing through a gas conduit (and vice-versa), utilizing heat exchangers of various types. Such heat exchangers may be positioned in a variety of different locations, ranging from the site of the original heat exchange, to inside of the end user. In certain embodiments, one or more components of a thermal linkage could comprise a heat pipe, in which a fluid changes phase between gas and liquid.

Figure 69A:
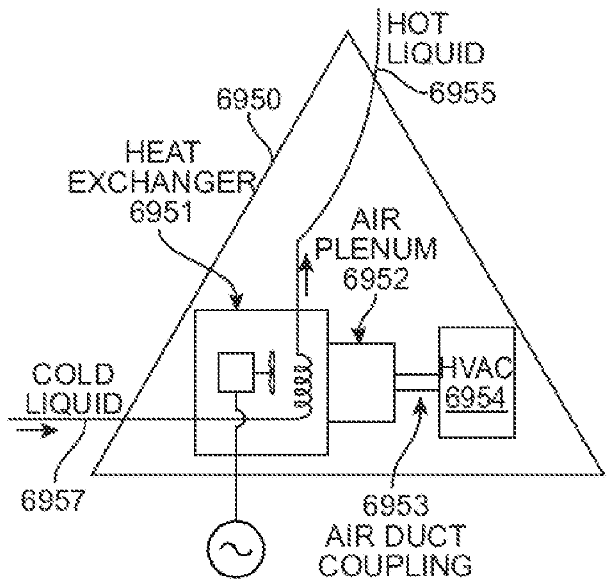
FIGS. 69A-D show examples of thermal interfaces between an energy storage system and an end user.

FIGS. 69A-D are simplified views illustrating various ways in which the thermal linkages may interface with an end user. FIG. 69A shows an embodiment wherein the thermal linkage 6957 carries cold liquid, and the end user component 6950 comprises a heat exchanger 6951 wherein the cooling in the thermal linkage is transferred to air.

In some embodiments, the air moves through a plenum 6952 and then enters an air duct coupling 6953. In certain embodiments the air moves directly from the heat exchanger into the coupling.

The cold air then enters a heating, ventilation, and air conditioning (HVAC) system 6954 that may be designed to conform to certain engineering standards. The liquid warmed by its passage through the heat exchanger exits the end user component 6950 via linkage 6955. In certain embodiments this linkage may circulate the warmed liquid back to the system.

The present invention is not limited to the particular embodiment shown in FIG. 69A. For example in certain embodiments the thermal flow may be in the opposite direction. Linkage 6955 may carry hot liquid to the heat exchanger, heating the air in the air plenum. Hot air is then conveyed through the air duct coupling to the HVAC system. The liquid cooled during its passage through the heat exchanger exits the end user component 6950 via thermal linkage 6957.

Figure 69B:
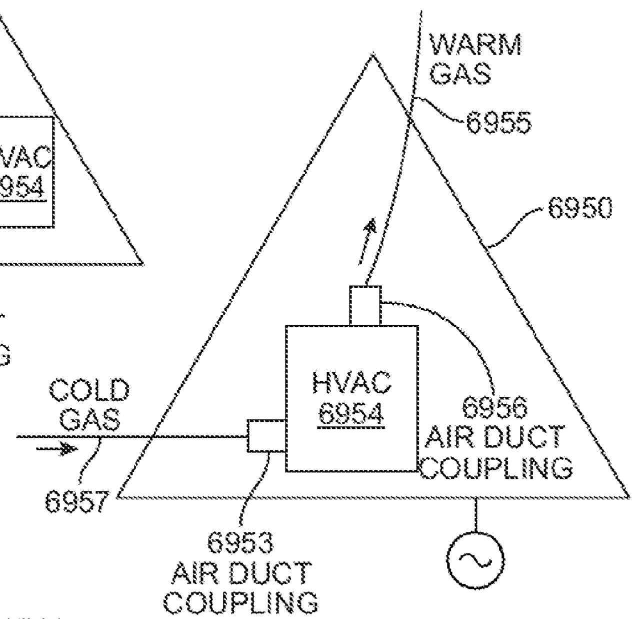

FIG. 69B shows another embodiment, in which thermal linkage 6957 carries cold air and the end user component 6950 comprises an air duct coupling 6953 to an HVAC system 6954 as described above, and an air duct coupling 6956 from the HVAC system 6954 to the thermal link 6955 which carries warm air rejected by the HVAC system.

Alternately the thermal link 6955 carries hot air and the end user component 6950 comprises an air duct coupling to an HVAC system as described above, and an air duct coupling from the HVAC system to the thermal linkage 6957. This linkage 6957 carries cooled air rejected by the HVAC system.

Figure 69C:
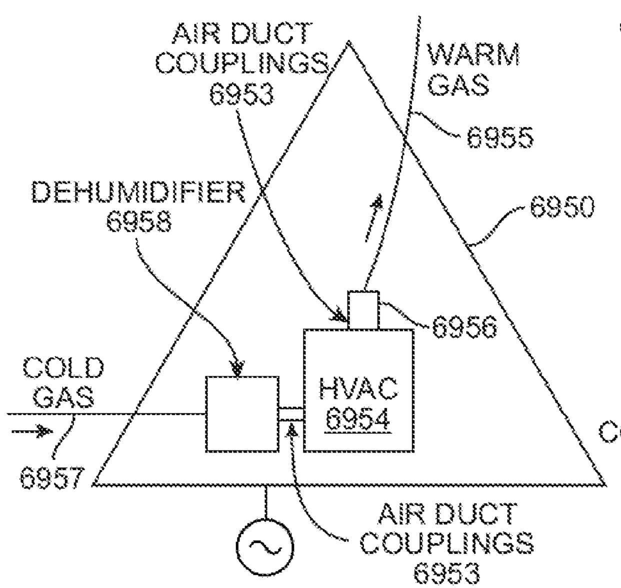

FIG. 69C shows another embodiment, where the thermal linkage 6957 carries cold air, and the end user component 6950 comprises a dehumidifier 6958 connected to an air duct coupling 6953 to an HVAC system 6954 as described above, and an air duct coupling 6956 from the HVAC system to the thermal linkage 6955. Linkage 6955 carries warm air rejected by the HVAC system.

Figure 69D:
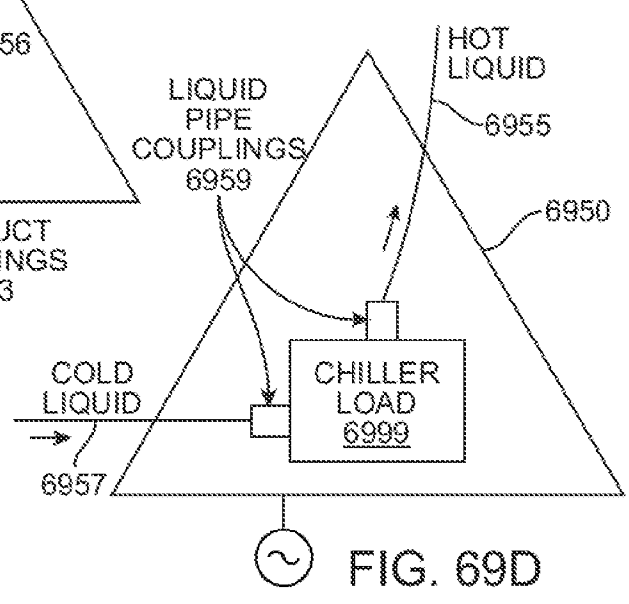

FIG. 69D shows still another embodiment, where the thermal linkage 6957 carries cold liquid, and the end user component 6950 comprises a pipe coupling 6959.

The pipe coupling is connected to a chiller load 6999, for example a refrigerator case in a supermarket. The liquid warmed by passage through the chiller load passes through a pipe coupling and exits end user component 6950 via thermal link 6955.

As described above, embodiments of the present invention may employ gas duct connections to communicate thermal energy. For example, the heat exchanger apparatus of the embodiment of FIG. 69A may transmit hot or cold air through a plenum to an HVAC system via an air duct connection. In the embodiment of FIG. 69B, thermal linkages may be configured to transmit hot or cold air directly to an HVAC system via an air duct connection. In the embodiment of FIG. 69C, a thermal linkage may be configured to supply cold air to the dehumidifier, which may be connected to an HVAC system via an air duct connection. A thermal linkage may be configured to receive hot air from an HVAC system via an air duct connection.

Such a gas duct connection according to embodiments of the present invention may comprise ductworks formed from one or more of the following duct connection components: duct sealants including liquid sealants, mastics, gaskets, tapes, heat applied materials, and mastic and embedded fabric combinations; transverse joint reinforcements including but not limited to standing drive slips, standing S' s, companion angles, flange join reinforcements, slip-on flange joint reinforcements, standing seam joint reinforcements, and welded flange joint reinforcements; flexible duct connectors including but not limited to nonmetallic duct clamps, metal clamps, collars (including spin-in, flared, dovetail, spin-in conical, spin-in straight, 4" sleeve, and collar in duct min. 2"; fittings including but not limited to type re 1: radius elbow, type re 2: square throat elbow with vanes, type re 3: radius elbow with vanes, type re: 4 square throat elbow without vanes, type re 5: dual radius elbow, type re 6: mitered elbow; type re 7: 45° throat, 45° heel; type re 8: 45° throat, radius heel; type re 9: 45° throat, 90° heel; type re 10: radius throat, 90° heel.

The ductwork may conform to the HVAC Duct Construction Standards: Metal and Flexible (2005) standard of the Sheet Metal and Air Conditioning Contractor's National Association (SMACNA), which is incorporated by reference herein in its entirety for all purposes.

Various types of ductworks may be used according to embodiments of the present invention, to convey gases over pressure ranges from low pressures to pressures as high as 1000 Pa. In certain embodiments, the ducts may comprise galvanized steel. The ducts may comprise a lock forming quality to ASTM A525 specification for General Requirements for Steel Sheet, Zinc Coating (Hot Dipped Galvanized), G90 Zinc Coating.

In certain embodiments the ducts may comprise spiral, round and flat oval ductwork and fittings. In certain embodiments the ducts may comprise a spiral round duct, which may be calibrated to manufacturer's published dimensional tolerance standard. Spiral ducts 350 mm (14 in) and larger may be corrugated for added strength and rigidity. Spiral seam slippage may be prevented by flat seam and mechanically formed indentation, spaced along the spiral seam.

In some embodiments the ducts may comprise manufactured flanged duct joints, examples of which include but are not limited to a tension ring with gasket type, or stiffened flanged and gasket types. Examples of standards of acceptance include but are not limited to DUCTMATE, NEXUS, and McGill Airflow Flange/Hoop Connector, SPIRALMATE, or OVALMATE.

Various sealants can be used. Certain sealant types use water based polymer, non-flammable, high velocity duct sealing compounds. Some sealants may meet the requirements of NFPA90A and 90B. Sealants may be oil resistant. Sealants may be UL Class 1 listed.

Sealant may have a temperature range of from −7° C. to +93° C. (20° F. to +200° F.). Standards of Acceptance for sealants include DYN-O-SEAL (−40° F. to +200° F.), Foster 32-17, and Foster 32-19.

Various tapes may be used. One example is a PVC treated, non-flammable, open weave (gauze) fiberglass tape. The tape may be UL Listed.

In certain embodiments a tape may have a width of 50 mm (2 in). Standards of acceptance include DURODYNE FT-2, and HARDCAST FS-150.

Ducts may be installed in a number of ways. Ducts may be installed in accordance with SMACNA Standards.

Pressure construction may be used in certain embodiments. Low pressure ductwork construction classifications are given in the following table:

| Pressure Class, Pa (in WG) | Operating Pressure, Pa (in WG) | Maximum Velocity, m/s (fpm) |
|---|---|---|
| 125 (½) | Up to 125 (½) | 10.0 (2000) |
| 250 (1) | 125 to 250 (½ to 1) | 12.5 (2500) |
| 500 (2) | 250 to 500 (1 to 2) | 12.5 (2500) |
| 750 (3) | 500 to 750 (2 to 3) | 15.0 (3000) |
| 1000 (4) | 750 to 1000 (3 to 4) | 20.0 (4000) |

Duct construction, sheet gauges, reinforcing and bracing classification may be according to function and as described as follows:

supply air ductwork from discharge side of fan: 750 Pa (3 in WG) class;

return air ductwork on suction side of fan: 250 Pa (1 in WG) class;

exhaust air ductwork on the discharge side of fan: 250 Pa (1 in WG) class;

exhaust air ductwork on suction of fan: 500 Pa (2 in WG) class.

Low Pressure ductwork seal classification may be according to the following table:

| Seal Class | Sealing | Static Pressure construction class, Pa (in WG) |
|---|---|---|
| A | Seams, joints and connections made airtight with sealing compound and tape | 1000 (4) and up |
| B | Seams, joints and connections made airtight with sealing compound | 750 (3) |
| C | Transverse joints and connections made airtight with sealing compound. Longitudinal seams unsealed | 500 (2) |
| D | Seams, joints and connections unsealed | 250 (1) |

The construction of duct seals may be as follows:

supply air ductwork from discharge side of fan: Seal Class A;

return air ductwork on discharge side of fan: Seal Class B return air ductwork on suction side of fan: Seal Class B exhaust air ductwork on the discharge side of fan: Seal Class B exhaust air ductwork on suction of fan: Seal Class B Embodiments in accordance with the present invention may utilize flexible ducts. Applicable standards for such flexible ductwork include but are not limited to the latest editions of the following:

UL 181;

National Fire Protection Association (NFPA) 90A and 90B;

SMACNA installation standards for flexible duct.

Embodiments of flexible ducts utilized in accordance with the present invention may have maximum flame spread rating of 25 and maximum smoke developed rating of 50.

Embodiments of flexible ductwork used in accordance with the present invention may comprise factory fabricated semi-rigid non-insulated aluminum ductwork. The flexible ductwork may be spirally wound and mechanically joined with triple lock seam. The seam between the ductwork may form a continuous air-tight and leak proof joint. The ductwork may be UL Class 1 listed.

In certain embodiments, the flexible ductwork may exhibit one or more of the following operational characteristics:

a maximum positive pressure of about 2500 Pa (10 in WG);

a maximum negative pressure of about 250 Pa (1 in WG);

a maximum gas velocity of about 20.3 m/s (4000 ft/min);

a temperature range of between about −50° C. to 320° C. (−60° F. to 600° F.).

According to some embodiments, thermally insulated flexible ductwork may be used. Certain embodiments may comprise factory fabricated semi-rigid thermally insulated aluminum ductwork. The thermally insulated flexible ductwork may be spirally wound and mechanically joined with triple lock seam. Thermally insulated flexible ductwork may employ a seam to form a continuous air-tight and leak proof joint. The thermally insulted flexible ductwork may be UL Class 1 listed. The thermally insulated flexible ductwork may be factory wrapped with 25 mm (1 in) fiberglass insulation covered by (Polyethylene sleeve) vapour barrier.

In certain embodiments, the thermally insulated flexible ductwork may exhibit one or more of the following performance characteristics:

a mean thermal loss/gain not more than about 0.24 Btu/h/ft$^{2}$° F.;

a maximum positive pressure of about 2500 Pa (10 in WG);

a maximum negative pressure of about 250 Pa (1 in WG);

a maximum gas velocity of about 20.3 m/s (4000 ft/min);

a gas temperature range of between about −40° F. to 250° F.

Flexible ductwork according to embodiments of the present invention may be installed with a length of flexible duct feeding ceiling outlet, being not more than about 3 m (10 ft). In certain embodiments, a sealing compound and/or tape may be used at a connection point between sheet metal and flexible duct. Further mechanical connection may be made using sheet metal screws. Various embodiments of flexible ductwork may have bends with a centreline radius greater than one duct diameter.

In certain embodiments, thermal energies may be communicated utilizing linkages that are configured to carry liquids. For example, the embodiment of FIG. 69A includes thermal linkages configured to transmit cold and hot liquids through a heat exchanger apparatus. The embodiment of FIG. 69D uses thermal linkages configured to transmit cooling and/or heating directly to a chiller load via liquid duct connections.

Such liquid duct connections according to embodiments of the present invention may be formed from one or more components, including but not limited to: pipe sealants such as fittings (which may be formed from copper, black pipe, brass, galvanized steel, or PVC), nipples (which may be formed from copper, black pipe, brass, galvanized steel, or PVC), no hub couplings, pipe clamps, and pipe hanger inserts.

A variety of types of steel pipes may be used for liquid ducting. Examples include NPS 2 & under according to schedule 40, seamless, NPS 21/2-3 according to Schedule 40 seamless or Electric Resistant Weld (ERW), and NPS 4-8 according to schedule 40, ERW. Applicable standards include ASTM A53 or A135, Grade B.

Various joints may be used to connect liquid duct piping. Examples of threaded joints include NPS 2 & under utilizing tapered pipe threads and Teflon tape or pulverized lead paste jointing compound according to standard ANSI B1.20.1, or unions with black malleable iron, bronze face, ground joint according to standard ASME B16.39. Threaded joints for NPS 2 & over may also be used.

Welded joints may also be used to connect liquid duct piping. Examples of welded joints include NPS 2 & under utilizing socket weld fittings under standard ANSI B16.11. Joints for NPS 2½ & over may include raised face flanges under CSA W47.1-1983, flange bolts & nuts under ANSI B18.2.1, B2.2.2, and flange gaskets; gaskets to be elastomeric sheet or other suitable material 1.6 mm (1/16 in) thick under ANSI B16.21, B16.20, A21.11.

Grooved joints may also be used to connect liquid duct piping. Examples of grooved joints include NPS 2½ & over utilizing mechanical joint rolled, or cut grooved standard, with rigid coupling with EPDM gaskets. Standards of acceptance include Victaulic and Gruvlock. An applicable standard is CSA B242-M1980.

Various types of fittings can be used for liquid ducting expected to experience pressures up to about 1035 kPa (150 psi). Threaded fittings for NPS 2 & under in this pressure range include threaded malleable iron, Class 150 under the ANSI B 16.3 standard, and unions of black malleable iron, bronze face, ground joint under the ASME B16.39 standard.

Welded fittings for liquid ducting expected to experience pressures up to 1035 kPa (150 psi) include NPS 2½ & over using forged steel, class 150, raised face pipe flanges, weld neck or Slip-on, or forged steel butt welding type; wall thickness to match pipe. Standards of acceptance include Weldbend, Tube Turns, and Bonney Forge. An applicable standard is ANSI B16.5.

Grooved fittings for liquid ducting expected to experience pressures up to 1035 kPa (150 psi) include NPS 2½ & over using malleable iron under standard ASTM A47-77, or ductile iron under standard ASTM A536-80. Standards of acceptance include Victaulic and Gruvlock.

Various types of fittings can be used for liquid ducting expected to experience pressures up to up to about 2070 kPa (300 psi). Threaded fittings of NPS 2 & under may use threaded malleable iron, Class 300 under the ANSI B16.3 standard.

Welded fittings may also be used for ducting expected to experience higher pressures. For NPS 2 & under, welded fittings of forged steel, Class 300 may be used, with a standard of acceptance of Bonney Forge and Anvil (Grinnell) under standard the ANSI 16.11 standard. Unions comprising forged steel Class 300, bronze face, ground joint under the MSS-SP-83 standard may also be used.

For NPS 2½ & over, welded fittings of forged steel, Class 300, raised face pipe flanges; weld neck or slip-on may be used. Forged steel butt welding type with a wall thickness to match pipe, may also be used. Standards of acceptance include Weldbend, Tube Turns, and Bonney Forge. Applicable standards include ANSI B16.5.

Grooved fittings may also be used for this pressure range. NPS 2½ & over may use malleable iron under the ASTM A47-77 standard, or may use ductile iron under the ASTM A536-80 standard. Standards of acceptance include Victaulic and Gruvlock.

Welded branch connection fittings may also be used for higher pressures for all pipe sizes. These fittings may be forged steel, with a wall thickness to be minimum thickness of pipe run to which branch fitting is to be welded. Standards of acceptance include Bonney Forge "O-let" fittings, and Anvil (Grinnell) "Anvilet" fittings. The fittings may conform to the ANSI B31.1 standard.

A variety of valve types may be used in liquid ducting employed for heating and cooling. Gate valves may be used for pressures up to about 1035 kPa (150 psi). For NPS 2 & under, the valves may be soldered with a rising stem, Class 150 with bronze body and screwed bonnet, solid wedge disc. A standard of acceptance is Kitz 44.

In this pressure range, threaded gate valves may also be used, which can comprise a rising stem, Class 150 with bronze body and screwed bonnet, solid wedge disc. A standard of acceptance is Kitz 24. Threaded valves for NPS 2 and under may conform to MSS SP-80 and/or ANSI/ASME B 16.34 standards.

For NPS 2½ & over, flanged gate valves can be used in this pressure range, including rising stem, Class 125 with flat faced flanges, cast iron body, bronze trim, solid wedge disc, bolted bonnet, OS&Y. A standard of acceptance is Kitz 72. Flanged gate valves may conform to the MSS SP-70 and/or ANSI/ASME B16.5 standards.

For Pressures up to 2070 kPa (300 psi), ball valves can be used. For NPS 2 & under, such ball valves may be soldered or threaded. Soldered ball valves may comprise a minimum of 600 psi WOG two piece bronze or brass body, full port chrome plated bronze or stainless steel ball, PTFE seat and seals, blowout proof stem. A standard of acceptance is Kitz 59. A threaded ball valve may comprise a minimum of 600 psi WOG two piece bronze or brass body, full port stainless steel ball, PTFE seat and seals, blowout proof stem. A standard of acceptance is Kitz 58. Such ball valves may conform to the ANSI/ASME B16.34 standard.

For NPS 2½ to 12, butterfly valves may be used. An example of such a butterfly valve is grooved, of class 150 with a long neck design malleable or ductile iron body, aluminum bronze disc, EPDM Grade "E" liner for 93° C. (200° F.) working temperature. A standard of acceptance is Victaulic Series 300. The valve may conform to the ANSI/ASME B 16.34 or ANSI/ASME B 16.5 standards.

For Pressures up to 4100 kPa (600 psi), ball valves may be used. For NPS 2 to 4, the ball valves may be grooved, with 600 psi WOG, ductile iron body, stainless steel ball and stem, standard port, lockshield where specified, TFE seat and seals. Standards of acceptance include Victaulic Series 721 and Gruvlok. The ball valves may conform to the MSS SP-70 or ANSI/ASME B16.5 standards.

For Pressures up to 1035 kPa (150 psi), swing check valves may be used. NPS 2 & Under may use soldered or threaded swing check valves. Soldered swing check valves may be Class 150, Y-Pattern bronze body, bronze swing disc, integral seat, screw in cap, with a standard of acceptance being Kitz 30-. Threaded swing check valves may be Class 150, Y-Pattern bronze body, bronze swing disc, integral seat, screw in cap, with a standard of acceptance of Kitz 29. Such soldered or threaded swing check valves may conform to the MSS SP-80 and/or ANSI/ASME B 16.34 standards.

NPS 2½ & over may used flanged swing check valves of Class 125 with flat faced flanges, cast iron body, renewable bronze seat ring, bronze swing type disc. Standards of acceptance include Kitz 78. Such flanged swing check valves may conform to the MSS SP-71 and/or ANSI/ASME B 16.5 standards.

Thermal linkages from systems according to certain embodiments of the present invention may be in communication with refrigeration apparatuses. Such refrigeration components may comply with Canadian Standards Association (CSA) standard B52, ARI, ASME and ASHRAE codes and standards to be used in performance testing, to establish component ratings.

An example of a refrigeration component is refrigeration tubing. Where Halogen refrigerants are to be used, factory cleaned and sealed seamless ACR copper may be employed for tubing. Such tubing may conform to the ASTM B280 standard.

Fittings are another example of a refrigeration component. For fittings, long radius type elbows and return bends may be used. These fittings may be formed from wrought copper or forged brass solder type. The fittings may conform to the ASME B16.22 standard.

Joints represent still another example of a refrigeration component. Certain embodiments may employ copper piping jointed with copper fittings. Examples of material for such joints include but are not limited to SIL-FOS-15 Phosphor-copper-silver alloy, which may comply with the CSA B52 standard.

Certain embodiments may employ brass fittings. Such fittings may comprise 2500 PSI Solder, conforming to the CSA B52 standard.

Connections to equipment or accessories in some embodiments may be achieved using 95-5 Solder, and may be in conformity with the CSA B52 standard.

In certain embodiments flexible connections may be used. Some embodiments according to the present invention may use a flexible connection comprising seamless flexible bronze hoses. Some embodiments of the present invention may use a flexible connection comprising bronze wire braid covering for larger sizes. The connection may be in conformity with the CSA B52 standard.

According to certain embodiments, the refrigeration piping may be installed as follows. Each length of refrigeration piping may be swabbed with cloth soaked in refrigerant oil if dirt, filings, or visible moisture is present. The piping ends may be kept sealed except when fabricating joints. Elbows and fittings are kept to a minimum. Horizontal pipe carrying gases are graded 1:240 down in direction of flow. Lines may be supported at intervals of not more than 8 ft and anchored.

Where appropriate, expansion swing joints, pipe guides, and anchors can be provided. The pipe guides and anchors can be copper plated when contacted with refrigeration piping.

Anchors may be properly secured to building structure. Vibration eliminators can be of "Anaconda" sized the same as refrigeration piping.

Liquid line filter drier and sight glass may be of "Sporlan" of size and capacity to suit refrigeration piping and loads and in accordance to manufacturer's recommendation. Suction line P traps may be provided at the base of each evaporator, and at every 50 feet horizontally and every 20 feet vertically. Solenoid valves shall be of "Sporlan" sized to suit capacities and the magnetic coil voltage shall be coordinated with the control system. When multiple runs are installed, pipes may be spread to 6 in minimum to allow for expansion and contraction.

"HYDRAZORB" or "CUSH-A-CLAMP" rubber grommets may be used between tubing and clamps to prevent line chafing. Where vertical risers of more than 1.7 m (5 ft) occur in a suction line, the riser may be connected into the top of next horizontal section. Screwed and flanged joints may be limited to equipment connections not available in brazing format.

Dry nitrogen may be bled into piping when sweating connections. Flexible pipe vibration isolators and stub connectors may be brazed on sealed hermetic compressors using alloys which melt at 620° C. (1148° F.) or below.

Two evacuation fittings may be provided. One may be in the suction line at inlet side of suction line filter, and one may be in the liquid line at outlet side of filter-drier. Connection in liquid line may be valved to serve as charging valve. Connections should be at least ¼ in. Pressure relief may be vented in accordance with latest edition of CSA B52.

Leak and pressure testing may be conducted as follows. Leak testing may be performed before evacuating the system. Testing may comply with latest edition of CSA B52, with gauge pressure of 2070 kPa (300 psi) on high side and 1050 kPa (150 psi) on low side. Dry Nitrogen may be used to develop pressure. The apparatus may be built to field test pressure in high and low side with dry nitrogen. Leaks may be tested for using a soap solution, or proprietary leak detection kit such as "SNOOP", or a fluorescent tracer.

Returning to FIG. 69, sensors of various types, including humidity (H), volume (V), temperature (T), and pressure (P), and other sensors (S) such as valve state sensors, may be located at various points throughout the system. These sensors may be in electronic communication with central controller 6996.

Specifically, various elements of the system 6901 are in communication with a central controller or processor 6996, that is in turn in electronic communication with a computer-readable storage medium 6994. Based upon instructions in the form of computer code stored on computer-readable storage medium 6994, the controller or processor 6996 may operate to control various elements of the system 6901. This control may be based upon data received from various sensors in the system, values calculated from that data, and/or information received by the controller or processor 6996 from various sources, including co-situated sources (such as the end user or a co-situated energy generator as discussed below), or from external sources such as the internet or a smart grid.

Operation of the compressed gas energy storage and recovery system is now described. As previously mentioned, in certain roles the system provides temperature control to the end user, for example in the form of air conditioning and/or heating. This cooling or heating is accomplished through the thermal linkages provided between the end user and the dedicated compressor and dedicated expander.

Specifically, compressed gas that is stored in the storage unit may be flowed through one-way valve 6911 into the dedicated expander. According to basic thermodynamic principles, compressed gas that is undergoing expansion within that expander, will tend to experience a drop in temperature. This flow of thermal energy from this gas expansion process, can be employed to cool the end user through the thermal linkage 6980 and switch 6981.

In particular, the thermodynamic efficiency of cooling may be enhanced by performing gas expansion under near-isothermal conditions, resulting in a minimum change in temperature and with reduced thermal loss. In certain embodiments, such near-isothermal conditions can be achieved utilizing heat exchange between the expanding gas and a liquid (such as water or an oil) that is present within the expanding gas. Specifically, the relatively high heat capacity of the liquid, combined with the large surface area afforded by the droplets, allows for the effective transfer of heat from the liquid to the expanding gas. After separation from the expanded aerosol, the liquid cooled by transfer of heat to the expanding gas can in turn be flowed through a thermal linkage to the end user to perform a cooling function.

While the particular embodiment shown and described in FIG. 69 has focused upon the storage and recovery of energy from compressed gas, this is not required by the present invention. Alternative embodiments in accordance with the present invention could utilize other forms of energy storage systems located behind a meter with an end user, as is described above in connection with positioning within the generation layer.

The embodiment of the compressed gas energy storage and recovery system shown in FIG. 69 differs in certain respects from the embodiment of the refrigeration apparatus of FIG. 28. For example, the refrigeration apparatus of FIG. 28 couples together a compressor and an expander in a single compressor/expander unit.

In addition, the refrigeration apparatus of FIG. 28 is shown without provision for a structure for storing gas that has been compressed. As discussed in connection with FIG. 28, however, such an apparatus can readily be modified at point A to include such a gas storage unit.

The refrigeration apparatus as shown in FIG. 28 also lacks a separate power generation capability. However, in alternative embodiments the expander element of the compressor expander unit could readily be placed into physical communication with a generator to provide power. Such power generation could be useful where: 1) a capability for storing compressed gas for later use is present, and/or where 2) the expander is in thermal communication with an external heat source to augment the magnitude of its power output.

Despite their differences, however, it is to be recognized that the refrigeration system of FIG. 28 and the energy storage and recovery system of FIG. 69 operate utilizing similar principles. In particular, both utilize liquid separated from a expanded gas-liquid mixture, to perform a temperature control function.

FIGS. 28-32 above have focused upon the effect of gas expansion to provide cooling. However the present invention is not limited to this application, and other embodiments could provide a heating effect.

According to basic thermodynamic principles, gas that is undergoing compression within the compressor, will tend to experience an increase in temperature. Thus in a manner analogous to the aerosol refrigeration described above, injected liquid that has been heated by exposure to the compressed gas, may be separated and flowed through switch 6981 and thermal linkage 6980 to heat the end user.

While the previous discussion has focused upon the use of the compressed gas energy storage and recovery system for temperature control, the embodiments of the present invention are not limited to this application. In particular, the expansion of gas within a dedicated expander may give rise to physical work that can be harnessed to provide power.

Thus returning to FIG. 69, the dedicated expander 6905 could include a moveable member that is in physical communication with linkage 6923.

The detailed view of the dedicated expander of FIG. 50B, taken in combination with the embodiment of FIG. 69, indicates that expansion of the gas may drives the moveable member, outputting physical energy to a link such as link 6923 of FIG. 69. This physical energy, in mechanical, hydraulic, or pneumatic form, could be utilized in a number of ways.

For example, energy output on the linkage 6923 could be communicated to second linkage 6921 to drive a second moveable member that is located within the dedicated compressor 6902. In this manner, actuation of the second moveable member to compress and flow gas to the storage unit, could serve to replenish the supply of compressed gas available for expansion.

While the particular embodiment of FIG. 69 shows linkages 6921 and 6923 as being separate and distinct, this is not required by the present invention. In certain embodiments the linkages 6921 and 6923 could be the same structure, for example a common crankshaft between reciprocating pistons as moveable members. Such a configuration could facilitate the efficient transfer of energy between the expander and compressor elements for the purpose of supplying compressed gas to the storage unit.

In certain modes of operation, energy from the link 6923 that is driven by the expander, could be kept primarily within the system. Specifically, the energy recovered from the compressed gas would be utilized for cooling and/or to replenish the supply of compressed gas. No net electrical power would then be output from the motor/generator.

However, other operational roles may call for the compressed gas energy storage system to serve as a power supply. Thus in certain applications (including but not limited to UPS, peak shaving, demand response, and renewable levelizing), the compressed gas storage system could supply power directly to an end user, bypassing the meter. In one or more of such power supply applications, the compressed gas energy storage system could include additional components such as a power electronics module and short term energy storage (for example in the form of a battery) that allow transition to drawing energy from the compressed air system in a smooth manner without disruption to the end user.

In other applications, the system could supply power back through the meter to the power network. For example, in a distributed generation (DG) configuration, the power network is configured to receive power back through the meter. In this manner, the electricity output by the generator driven by expansion of the compressed gas, may be fed to the power network, and the operator of the energy storage system remunerated for the supply of this power.

Such a scheme could be particularly advantages at times of peak demand, where power contributed back onto the network from DG could meet the extra load. Such a scheme could also contribute resiliency to the network, allowing for the formation of temporary local islands of electrified grid from DG, in response to a wider network failure attributable to an event such as a natural disaster or terrorist attack.

The various elements of the system 6901 are in communication with a central controller or processor 6996, that is in turn in electronic communication with a computer-readable storage medium 6994. Based upon instructions in the form of computer code stored on computer-readable storage medium 6994, the controller or processor 6996 may operate to control various elements of the system 6901. This control may be based upon data received from various sensors in the system, values calculated from that data, and/or information received by the controller or processor 6996 from various sources, including co-situated sources (such as the end user or a co-situated energy generator as discussed below), or from external sources such as the internet or a smart grid.

In certain embodiments, the controller of the system may be configured to commence operation based upon an instruction received from the end user. For example, where the end user has accepted a solicitation for demand response from the operator of the power network, the end user may in turn communicate a signal to the controller indicating the need for the storage system to provide the necessary electrical power to cover the demand response period.

In another example, a compressed gas storage and recovery system may receive a signal from the end user or from an external source (such as the internet), indicating an actual or imminent change in temperature conditions. In response, the controller could instruct the system to operate with greater cooling effect.

In certain embodiments, the compressed gas energy storage and recovery system may transmit signals to an end user. For example, where the available supply of compressed gas is becoming depleted, the energy storage system may send a message to the end user indicating a need for the end user to draw additional power from the network through the grid, in order to maintain its temperature.

A potential benefit which may be realized by locating an energy storage system behind the meter, is the resulting form of regulatory oversight. As part of the consumption layer, an energy storage system's contact with the network is relatively simple and limited. In particular, the system is expected to interact with the network through a single interface (the meter), with magnitude and direction of flows of power through that interface able to be estimated based upon patterns of consumption and even output, in the case of net metering connections. A compressed gas energy storage and recovery system located behind the meter according to embodiments of the present invention, may thus be considered analogous to an ordinary home appliance, and not subjected to the regulations governing elements of other layers of the power network, such as the generation, transmission, and distribution layers.

Co-situation of the energy storage system with an end user may further enhance coordinated action between the two entities. In particular, the communication link between the compressed gas energy storage system 6640*a* and the co-situated end user may be local in nature, and hence potentially faster and more reliable than wider-area communication networks.

In any one of various power supply roles, (i.e. UPS, peak shaving, demand response, renewable levelizing), such close proximity between the energy storage system and the end user may help to facilitate a seamless transition between an end user's consumption of power supplied by the network, and an end user's consumption of power supplied from the storage system.

The embodiment shown in FIG. 69 may include one or more optional features shown in outline form. For example, in certain embodiments the gas outlet of the expander may be in fluid communication with the gas inlet of the compressor. The closed fluidic loop 6985 offered by such an embodiment could provide a number of potential benefits. One is the conservation of gases, thereby allowing the use of more exotic gases (such as helium or high density gases) having higher heat capacities that enhance heat exchange.

Another optional feature of the embodiment of FIG. 69, is a possible thermal linkage 6986 between expander 6905 and an external heat source 6987, for example the heat emitted by the sun or a nearby facility or industrial process, or a local power source as is discussed below in connection with FIG. 70. In particular, the thermal energy from such an external heat source could be captured utilized to enhance the efficiency of recovery of energy from expansion of the compressed gas. Use compressed gas storage and recovery systems according to the present invention in conjunction with sources of additional heat, is described at length in U.S. Provisional Patent Application No. 61/294,396, which is hereby incorporated by reference in its entirety herein for all purposes.

In certain embodiments, the operation of a compressed gas energy storage and recovery system according to the present invention, may be coordinated with the thermal phases of a diurnal cycle. An example of such operation is now provided.

Referring again to FIG. 69, in this example the end user comprises a large office building located in a climate offering relatively large differences between day and night temperatures. On evenings and during the weekend, the office building is largely unoccupied and offers a minimal load to the power network, consuming some power to maintain a minimum temperature.

However, between 7 AM and 7 PM during the weekday the office building is occupied with workers and poses a large load to the power network, a substantial component of which is devoted to cooling. The price for electricity during this period is high, owing to demand from other users. In addition, the price charged to the building for electricity supplied, may be based upon historical peaks of usage.

Thus in order to reduce power costs, the office building may incorporate behind its meter, a compressed gas energy storage and recovery system according to the present invention. Such a system can function in both temperature control and power supply roles.

For example, during off-peak hours the system could consume energy from the network to operate the compressor to store compressed gas in a storage unit. The heat generated by such compression could be utilized for heating, thereby obviating the need for the office building to draw energy for that purpose from the power network.

Of even potentially greater economic significance, however, is the system's consumption of power for energy storage during off-peak times when energy is less expensive. This stored energy can subsequently recovered to reduce (or even eliminate) the load posed by the office building during peak demand times.

In particular, the energy storage and recovery system could flow compressed gas from the storage unit to the expander during times of peak demand. Such operation would reduce the office building's load on the power network for at least two reasons.

First, the gas expansion could provide a cooling effect during the day, when temperatures within the office building are expected to be high. Such cooling by gas expansion, would eliminate that portion of the load which would otherwise be drawn from of the network in order to control building temperature.

Second, in addition to eliminating some load, the power produced by gas expansion can also advantageously shift the timing of the load to periods of lower demand, further reducing cost. The stored energy has already been drawn from the power network at times of lower energy pricing. The energy available from subsequent recovery is available at that lower price, thereby reducing the effective cost of the energy.

Moreover, solar energy that is naturally available during daylight hours, may readily be harnessed to enhance the cooling effect and/or power supplied from the stored compressed air. For example, the compressed gas storage unit could be positioned in thermal communication with the sun. Thermal energy from the sun could heat the gas within the storage unit, increasing an amount of energy stored therein and available for recovery upon expansion of the gas.

Separately or in conjunction with heating stored gas, energy from the sun could also be utilized to heat liquid for injection into expanding gas. In particular, the thermal energy could be communicated to heat the liquid that has been separated following expansion of the gas-liquid mixture As described above, this liquid would have been cooled by virtue of its transfer of heat to the expanding gas under near-isothermal conditions. The natural availability of sunlight for heating gases and liquids during typical times of energy recovery, lends itself to operation of a compressed gas energy storage and recovery system run according to a diurnal cycle.

The load reduction and load shifting afforded by energy storage according to embodiments of the present invention, may further reduce cost by lowering a present load below historical peaks. In particular, elimination or reduction of cooling costs comprising the bulk of previous peak loads, may ensure that the present load does not exceed those peaks, thereby avoiding penalties or surcharges.

In summary, operation of an energy storage system coordinated with diurnal cycles, may offer reduced costs on at least two separate bases. First, energy storage and recovery may eliminate some load associated with temperature control, as the cooling associated with energy recovery by expansion coincides with daily warmth, and the heating associated with energy storage by compression coincides with nightly coolness.

Second, energy storage and recovery may shift a load on the power network from peak periods of relatively expensive power, to off-peak periods of relatively inexpensive power. Such load shifting may be understood in terms of reducing bulk rates charged for electricity consumed, and also in terms of the rates charged in view of historical peaks in demand by a particular user.

In certain situations, a compressed gas energy storage and recovery system could be configured by a system controller to perform compression and expansion simultaneously. In such an operational mode, all or a portion of the gas that is compressed, may immediately be expanded in order to provide cooling and/or power.

Such an operational mode could be prompted by a variety of conditions. For example, the stored compressed gas may be close to depletion, but temperature control is still required. In another example, ongoing supply of power may be required to shave peak load, or to meet the terms of a contractual relationship to provide power (i.e. to provide power even where the supply of compressed gas has been exhausted). In another example, a cost of power available from the network is low, justifying energy storage on a cost-effective basis.

Operation in such a mode involving simultaneous compression and expansion, may also offer certain efficiencies. In particular, as described above in connection with FIG. 28, the concurrent flow of gases to and from the storage unit through the heat exchanger, allows the transfer of thermal energy between these gas flows.

The table presented as FIG. 71 summarizes different modes of system operation.

Returning to FIG. 66, in certain embodiments, the energy storage system and the end user may be co-situated behind a same meter with a local source of energy. Possible examples of such a local energy source include a rooftop PV array, a solar thermal system, a wind turbine, or a gas microturbine in fluid communication with the natural gas supply of the end user.

Figure 70:
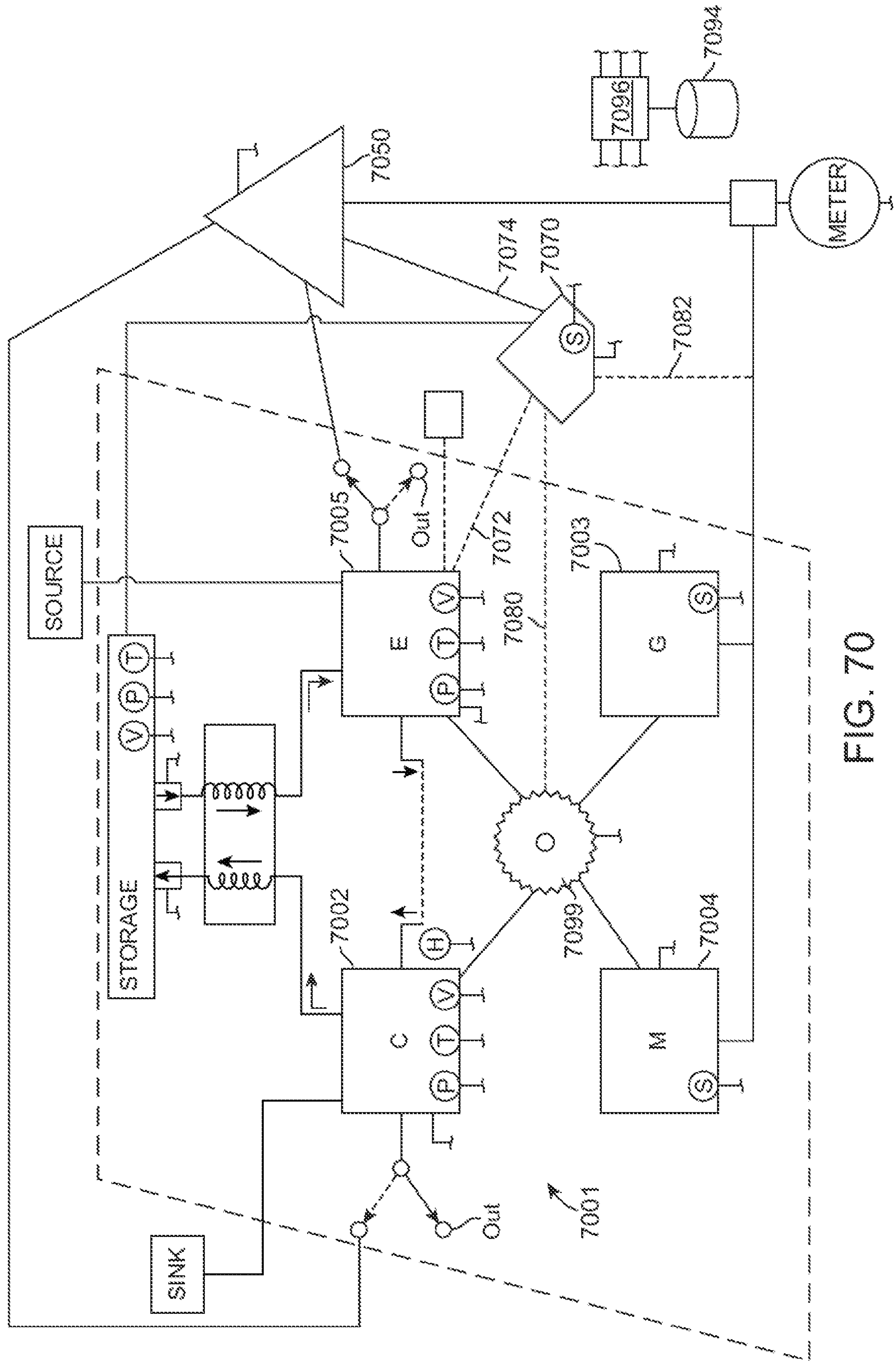
FIG. 70 shows a simplified view of an embodiment of a compressed gas energy storage and recovery system according to the present invention, which is co-situated with an end user and a local power source behind a meter.

Accordingly, FIG. 70 shows a simplified block diagram of one embodiment of a compressed gas storage and recovery system 7001 in accordance with an embodiment of the present invention, that is co-situated behind the meter with an end user 7050 and a local power source 7070. In the embodiment of FIG. 70, the dedicated compressor (C) 7002, the dedicated expander (E) 7005, a dedicated motor (M) 7004, and a dedicated generator (G) 7003, are all in selective physical communication with one another through a multi-node gear system 7099.

An embodiment of such a gear system is a planetary gear system as described in U.S. Nonprovisional patent application Ser. No. 12/730,549 and described above in connection with FIGS. 33A-33AA. Specifically, the multi-node gear system 7099 provides mechanical communication with three rotatable linkages (for example linkages 3341, 3362, and 3368). Each of these linkages may be in physical communication with the various other elements of the system, for example a local energy source such as a wind turbine, a generator, a motor, a motor/generator, a compressor, an expander, or a compressor/expander.

The multi-node gearing system 7099 permits movement of all of the linkages at the same time, in a subtractive or additive manner. For example where the wind is blowing, energy from the turbine linkage may be distributed to drive both the linkage to a generator and the linkage to a compressor. In another example, where the wind is blowing and demand for energy is high, the planetary gear system permits output of the wind turbine linkage to be combined with output of an expander linkage, to drive the linkage to the generator.

Moreover, the planetary gear system is also configured to accommodate movement of fewer than all of the linkages. For example, rotation of shaft 3341 of the particular embodiment of FIGS. 33A-33AA may result in the rotation of shaft 3362 or vice-versa, where shaft 3368 is prevented from rotating. Similarly, rotation of shaft 3341 may result in the rotation of only shaft 3368 and vice-versa, or rotation of shaft 3362 may result in the rotation of only shaft 3368 and vice-versa. This configuration allows for mechanical energy to be selectively communicated between only two elements of the system, for example where the wind turbine is stationary and it is desired to operate a compressor based upon output of a motor.

Certain embodiments of the present invention may favorably employ a multi-node gear system such as a planetary gear system, to allow the transfer of mechanical energy between different elements of the system. In particular, such a planetary gear system may offer the flexibility to accommodate different relative motions between the linkages in the various modes of operation described in FIG. 72.

Returning to FIG. 70, while that figure shows a multi-node gear system, this is not required by the present invention. In alternative embodiments, various elements of the system could be in physical communication with each other through individual physical linkage or through physical linkages shared with fewer than all of the other elements.

FIG. 70 shows the local power source as optionally being in physical communication with the multi-node gearing through linkage 7080. This configuration allows physical energy from the local power source and from the expander, to be combined in order to produce an even greater amount of electricity. This configuration also allows the local power source and the expander to separately utilize an existing asset (the same generator structure) in order to produce electricity.

FIG. 70 also shows that the local power generator may be in electrical communication with the end user or the meter through an electrical linkage 7082. Such a linkage may be utilized where the local energy source outputs electricity directly, as is the case for a PV array.

FIG. 70 also shows that the local power generator may be in thermal communication with the end user and/or the expander through thermal linkages 7072 and 7074 respectively. Such a linkage may be utilized where the local energy source outputs energy in thermal form directly, for example as is the case for a solar thermal system and a combustion gas microturbine.

The flexibility offered by the multi-node gearing and/or other forms of physical, thermal, fluidic, and electrical linkages, permits operation of the system in the modes that are summarized in the table of FIG. 72.

Location of a compressed gas energy storage and recovery system with a local power source as in FIG. 70, may endow the system with the ability to function in a number of possible roles. In one role, an energy storage unit in combination with one or more local energy sources, such as rooftop solar (PV and/or thermal solar) or a wind turbine, could potentially satisfy all of the energy demands of the end user. This would allow the end user to operate completely off of the grid, as could be desirable for reasons of security and/or economy.

Another role is to levelize the intermittent power that is output by a renewable energy source, such as a wind turbine, PV array, or solar thermal system. For example, in a DG scheme the owner of a local alternative power source may enter into a contract with the network operator, to provide electricity back onto the grid. However, the intermittent nature of certain natural resources such as sunshine and wind, may make it difficult to meet contractual obligations to provide a constant supply of power.

However, co-situation of a compressed gas energy storage and recovery system according to the present invention, may allow the owner of the local energy source to provide power on a regular basis. In particular, energy stored by the system in the form of compressed gas, could be recovered as necessary in order to make up for gaps in output attributable to a temporary lack of natural resources such as wind or sun. The energy from the system would thus serve to levelize the power output by the local alternative energy source, such that electricity ultimately output by the meter to the power network is substantially constant. A compressed gas energy storage and recovery system having a capacity of greater than one-half day that is able to replenish itself every day, would allow for levelization over a long period of the absence of the natural resource.

Location of a compressed gas energy storage and recovery system with a local power source as in the embodiment of FIG. 70, may confer certain benefits. One such potential benefit is a cost advantage afforded by allowing more efficient operation.

For example, in certain embodiments the compressor element of the compressed gas energy storage and recovery system could be in physical communication with a moving member of a local power source through a linkage and gearing. Thus in an embodiment, the spinning blades of a rooftop wind turbine could be in physical communication with the compressor of a compressed gas energy storage system through a mechanical, hydraulic, or pneumatic linkage.

The direct physical communication afforded by such a linkage may allow power to be transferred more efficiently between the local source and compressor elements, thereby avoiding losses associated with having to convert the power into an intermediate form such as electricity. In this manner, physical work produced by an operating wind turbine or gas microturbine could be harvested to store compressed gas for later recovery in a temperature regulation or power supply role.

Moreover, co-situation of the compressed gas storage and recovery system with a local power source may allow efficient communication of other forms of energy flows. For example, certain embodiments of an energy storage system may be in thermal communication through a thermal link, with a co-situated source of energy. Thus in some embodiments, an efficiency of expansion of compressed gas by the compressed gas energy storage system, could be enhanced utilizing heat that is communicated from the local source of thermal energy. A local source of thermal energy is generically designated with the reference number 7079 in FIG. 70. Operation of a compressed gas energy storage and recovery system utilizing heat from another source is discussed in the U.S. Provisional Patent No. 61/294,396, which is incorporated by reference in its entirety herein for all purposes.

Under certain circumstances, a local power source may also be a power generator, for example a rooftop PV and/or thermal solar system, a microturbine, a diesel generator, or other local power source. In this manner, thermal energy from such a power source, can be leveraged to enhance gas expansion in a chamber of a co-situated energy storage system.

Siting an energy storage and recovery system with a generation asset, may also allow the communication of fluids communication between these elements through a fluid link. For example, where an energy storage system is co-situated with a microturbine, the fluid link would allow compressed gas stored by the system to be flowed directly to such a microturbine for combustion, thereby enhancing the efficiency of operation of the microturbine. Similarly, the liquid heated by a thermal solar system could be the same as, or in thermal communication with, the liquid that is used to transfer heat to expanding compressed gas.

Another possible benefit which may be realized by co-situation of the energy storage system with a power generation asset, is the ability to leverage off of existing equipment. For example, an existing local source of power such as a diesel generator or microturbine, may already include a generator for converting mechanical energy into electrical power. An embodiment of a compressed gas energy storage and recovery system according to the present invention could utilize the same generator component to convert motion resulting from gas expansion, into electrical power. Similarly, a compressed gas energy storage and recovery system could utilize an end user's existing interface with the network (meter) to communicate electricity to the power network, for example in a net metering and/or distributed generation scheme.

Returning to FIG. 70, the various elements of the system 7001, are in communication with a central controller or processor 7096, that is in turn in electronic communication with a computer-readable storage medium 7094. The central controller or processor 7096 is also in communication with one or more sources of information, which may be internal or external. Examples of internal information sources include various system sensors. Examples of external information sources include but are not limited to a smart grid, the internet, or a LAN.

As indicated above, based upon instructions in the form of computer code stored on computer-readable storage medium 7094, the controller or processor 7096 may operate to control various elements of the system 7001. This control may be based upon data received from various sensors in the system, values calculated from that data, and/or information received by the controller or processor 7096 from sources such as a co-situated end user or external sources.

According to embodiments of the present invention, a gas compression and/or expansion system may be configured to operate in response to data received from one or more outside sources, such as a smart grid. Based upon the external information, a controller or processor of the processor may regulate operation of system elements in a particular manner. Examples of such external information which may be received include but are not limited to, a current price of electricity, a future expected price of electricity, a current state of demand for electricity, a future state of demand for electricity, meteorological conditions, and information regarding the state of the power grid, including the existence of congestion and possible outages.

As will be discussed below, operation of a compressed gas energy storage and recovery system in accordance with embodiments of the present invention may be based upon information received by a controller or processor. In certain circumstances, operation of the system may be halted based upon information that is received. For example, where the information received indicates a high demand for electricity, operation of the system to compress air may be halted by the controller, in order to reduce a load on the grid.

Alternatively, energy received by the system controller or processor may result in commencement of operation of the system. For example, an embodiment of a system may function in the role of an uninterruptible power supply (UPS), such that it is configured to provide energy on a continuous basis in certain applications where interruption in power could have harmful results, such as industrial processes (for example a semiconductor fabrication facility), transportation nodes (for example harbors, airports, or electrified train systems), or healthcare (hospitals), or data storage (server farms). Thus receipt of information indicating either an imminent reduction (brownout) or loss (blackout) of power from the grid, or even the risk of such an event, may cause the processor or controller to instruct the compressed gas energy storage and recovery system to operate to provide the necessary power in an uninterrupted manner.

Under certain circumstances, information provided to a controller or processor may determine operation of a compressed gas storage and recovery system in a particular mode, for example a compression mode, an expansion mode, or a combined compression and expansion mode. Under certain circumstances, information received by the controller may indicate a reduced price for power, causing the energy storage and recovery system to operate in compression mode in order to store energy at low cost.

Moreover, a compressed gas energy storage and recovery system typically operates at some balance between an efficiency of energy storage/recovery, and an amount of power that is stored/produced over a given time frame. For example, an apparatus may be designed to generate power with maximum efficiency based upon expansion of compressed gas in particular volume increments. Expansion of other volume increments may result in a greater power output, but at a reduced efficiency. Similarly, compression of gas volumes in increments outside of a particular range, may result in less efficient conversion of energy into the form of compressed gas for storage.

Under certain circumstances, embodiments of systems in accordance with the present invention may be operated under conditions of optimized efficiency. For example, where the grid indicates ordinary prices and/or demand for power, a controller may instruct components of the system to operate to compress or expand gas with maximum efficiency.

Alternatively, based upon information received from the grid or from other sources such as the internet, the controller or processor may instruct the system to operate under conditions deviating from maximum efficiency. Thus where the smart grid indicates a relatively low price for electricity (for example outside of peak demand times between 7 AM-5 PM on weekdays), the processor or controller may instruct compression of gas in a manner calculated to consume larger amounts of power for energy storage while the price is low.

According to certain embodiments, information relevant to operation of the energy storage and recovery system may be available on an ongoing basis from the external source. In such circumstances, code present in the computer-readable storage medium may instruct the system processor or controller to actively monitor the external source to detect information availability or changes in information, and then to instruct elements of the system to operate accordingly.

In some embodiments, relevant information may be actively communicated from the external source to the controller of the energy storage and recovery system. One instance of such active communication are solicitations of a demand response system.

Specifically, in certain embodiments a processor or controller of a storage system may receive from the operator of the power grid, an active solicitation to reduce demand during peak periods as part of a demand response system. Thus, the controller or processor may instruct operation of the system to output sufficient power to compensate for an end user's reduced load on the grid as part of a such a demand response system.

When received information indicates a relatively low price for electricity (such as in the middle of the night), the processor or controller may instruct compression of gas in a manner calculated to consume larger amounts of power—for example compression of gas in large volume increments while a price is low. In such cases, the extra cost associated with the inefficiency of such compression, may be offset by the low cost of the energy that is available to perform compression.

Factors other than present demand, may influence the terms at which energy is bought and sold. For example, future power demand or future price may be considered by the controller or processor in determining conditions of operation of the apparatus.

Thus under certain circumstances where a future price of energy is expected to be particularly high, the controller or processor may operate the system in a particular manner. One example of this may be a heat wave, where demand is expected to spike based upon a meteorological forecast. In view of such an expectation, the controller or processor may instruct the system to prepare for the future conditions, for example by operating to compress additional gas—possibly with reduced efficiency—in advance of the expected spike in demand.

Other factors potentially influencing system operation, include specific contractual terms between the power network operator and the end user. Such terms can include a maximum load (and/or minimum power output in distributed generation schemes) required over a particular time frames, and incremental or tier-based bonuses, penalties, and multipliers for power output or consumption. Conformity or divergence from these contract terms can be an important factor in dictating operation of the energy storage and recovery system by the controller or processor.

Thus in certain embodiments, the controller or processor may take such contractual terms into consideration in operating the apparatus. For example, the contract between the end user and the grid operator may establish a maximum load able to be drawn by the user from the network over a particular time frame. Thus where this baseline quantity is in danger of being exceeded, the controller or processor may instruct operation of the system under conditions of higher power output and lower efficiency to ensure satisfaction of the contractual obligation.

Still another type of information potentially influencing system operation, is the expected availability of sources of energy to the power grid. For example, where information received indicates a forecast for future cloudy conditions at the site of a solar energy farm known to provide energy to the network, a processor or controller of the apparatus could instruct the system to operate in compression and at low efficiency to store large amounts of compressed gas in advance of the expected later higher energy prices.

Yet another type of information which may be considered by a system controller or processor, is the potential availability of other sources of power. For example, the system of FIG. 70 is configured to receive energy in different forms from a plurality of sources. In particular, the system may receive energy in the form of electrical power directly from the grid itself, or from operation of a local energy source such as a rooftop array of photovoltaic cells. The system may receive energy in physical form (such mechanical, hydraulic, or pneumatic) from the local source, for example a proximately-located wind turbine or microturbine. The system may receive energy in thermal form from the local source, for example a thermal solar apparatus.

Thus where information regarding favorable wind conditions is received from the local generator, the controller or processor could instruct the system to operate in compression to store compressed gas, owing to the ready availability of power directly from the wind turbine. Upon abatement of the winds, the energy stored in this compressed gas could later be recovered by operating in an expansion mode to output power to the end user directly, to the grid through the network, or to both. A similar situation may exist where energy from favorable solar conditions provide energy for the compression of gas.

Under certain circumstances, favorable solar conditions could result in operation of the system in expansion. For example, favorable solar conditions could allow the communication of heat from a thermal solar apparatus to enhance the power output from expanding gas, or to enhance the efficiency of energy recovery from expanding gas.

In certain embodiments the local energy source may be non-renewable, such as a natural-gas fed microturbine. Thus where a supply of compressed gas in the storage unit has been exhausted by prior expansion activities and power is still required, the controller may instruct the generator to create power from operation of the local microturbine that is consuming power from an energy source other than the grid (i.e. a natural gas distribution network).

Still other types of information that may be available to a controller or processor of an energy storage system, include profiles of congestion on a power grid. Thus where information is received indicating difficulty (or expected future difficulty) in transmitting power through certain local areas of the grid, the processor or controller could instruct operation of the system accordingly.

For example, prior to expected periods of grid congestion information, a controller or processor could configure the system to store energy transmitted through particular grid nodes. Later, the system could be instructed to operate in an expansion mode to output this power on the un-congested side of the node, allowing demand to be met.

Information received by the system controller or processor can take several forms. In some embodiments, the controller may receive information directly from the power grid, for example pursuant to the Smart Grid Interoperability Standards being developed by the National Institute for Standards and Technology (NIST). Incorporated by reference herein for all purposes, are the following documents: "NIST Framework and Roadmap for Smart Grid Interoperability Standards, Release 1.0*", dated January 2010; and "SmartGrid: Enabler of the New Energy Economy", Electricity Advisory Committee (December 2008). Information expected to be available over such a smart grid includes but is not limited to, current prices for power, expected future prices for power, readings of metered power consumption or output onto the power grid including historical peaks of consumption, indications of grid congestion, grid brown-outs, or grid blackouts.

The controller or processor may also configure the system based upon information other than as directly available over a smart power grid. For example, according to some embodiments the controller may receive other types of information over the internet that could influence system operation, including but not limited to as weather forecasts or longer-term price futures for power, or for commodities such as coal or oil that are used in the generation of power. Based upon such information, the controller or processor can also control operation or non-operation of the system, a mode of operation of the system, and/or balance of efficiency versus power consumed or output over a given time frame.

Another possible source of information is a meter indicating current and historical consumption of electricity off of the power grid by a particular user. For example, in certain embodiments a compressed gas energy storage and recovery system may be situated with an end user that is a large consumer of power, such as an industrial complex. Based upon information received from the electrical meter for that site, the controller or processor may configure the system to operate in a certain manner. One example of such information is historical peak load data for the end user.

The expected power demand of an end user is another example of information that may be used as a basis for controlling the energy storage and recovery system. For example, where an industrial facility expects to operate at enhanced or reduced capacity, that information could be utilized to determine system operation In addition to information from external sources, the controller or processor also receives information internal to the system. Such internal information may include data from sensors configured to measure physical parameters within the system, including but not limited to valve state, temperature, pressure, volume, humidity, flow rates of liquids and gases, and speeds and torques of moveable elements within the system, such as fans, pumps, pistons, and shafts in communication with pistons. Additional examples of internal information which may be provided to the controller or processor include but are not limited to power drawn by the operation of motors such as pumps or fans.

In the broadest sense, the controller or processor may regulate the function of a system element to determine whether the system operates at all. An example of such an element is the valving between the compressed gas storage unit and the compressor/expander. Closure of this valve would prevent operation of the system in compression mode to flow gas into the storage unit. Closure of this valve would also prevent operation of the system in expansion mode to flow gas from the storage unit for energy recovery. Thus where a pressure within a storage vessel indicates near-depletion of the compressed gas, the controller or processor may halt operation of the system until conditions allow replenishment of the gas supply under economically favorable conditions.

When the system is operating, the controller or processor may regulate a system element to determine the operational mode. An example of this kind of system element is a valve such as a three-way valve. The state of such a valve could be regulated by the controller to control flows of liquids or gases within the system in a manner corresponding to a particular mode of operation. Thus where a pressure within a storage vessel indicates near-depletion of the compressed gas, the controller or processor may instruct operation of the system in a compression mode to replenish the gas supply.

The controller or processor may also regulate an element of the system to determine a manner of operation within a particular operational mode. For example, the efficiency of operation of the compressor/expander may depend upon the volume increments of gas which are compressed or expanded.

Regulation of operation of system elements by the controller may be based upon considerations in addition to, or in lieu of, output electrical power or efficiency. For example, in some applications, the system may function in a temperature control role, providing deliverable quantities in the form of heating or cooling capacity. Under such circumstances, the controller may control system operating parameters such as the injection or non-introduction of liquid in one or more stages, the conditions of liquid introduction in one or more stages, compression or expansion ratios of one or more stages, and other parameters in order to determine the end temperature of gases and/or liquids output from the system that may be used for such temperature control.

Cost is another example of a such a consideration for system operation. For example, actuation of a valve by the controller to compress gas in smaller volume increments, may be dictated by the controller where conditions warrant compression but a price of energy available from the power grid is relatively high. In another example, operation of a valve by the controller such that gas is expanded in smaller volume increments, may be dictated by the controller where conditions warrant expansion but a price for energy supplied to the power grid is relatively low.

Available capacity for storage of compressed gas represents is another factor that may be considered in system operation. For example, valve timing could be regulated for compression in smaller volume increments where the storage unit is nearing its capacity. Under other circumstances, valve timing could be regulated for expansion in smaller volume increments where the storage unit is nearing depletion.

Still another possible consideration in operating system elements by controller, is coordination of activity between individual stages of a multi-stage apparatus. Thus in embodiments comprising multiple stages, certain system elements may be operated by the controller in order to allow effective coordination between those stages.

One example is the timing of actuation of inlet or outlet valves to compression/expansion chambers, which may be regulated by a controller in order to allow effective operation across multiple stages. Timing of actuation of valves responsible for flows of liquid between stages, is another example of an operational parameter that may be regulated by a system controller.

Moreover, in some embodiments the individual stages of certain systems may be in fluid communication with each other through intermediary structures, including but not limited to pressure cells (e.g. in the embodiment of FIG. 4), heat exchangers (e.g. in the embodiment of FIG. 10), valves/valve networks (e.g. in the embodiment of FIGS. 58B-C), gas vessels, gas/liquid separators, and/or liquid reservoirs. In such embodiments, elements governing flows of materials into and/or out of such intermediary structures, may be regulated by a system controller in order to coordinate system operation. In some cases, it may be advantageous to control the relative phase of cyclically moving members in various stages to minimize pressure differentials seen by valves between those stages.

In certain embodiments, the transfer of thermal energy between the warmer atmospheric air and the expansion chamber (or heat exchanger in thermal communication therewith), may result in the formation of liquid water by condensation. Such liquid water could be made available for certain uses (for example drinking or irrigation), and hence may offer yet another type of material that is deliverable by a system. Liquid water may also be available from desalinization carried out utilizing energy derived from embodiments of systems in accordance with the present invention.

Thus in certain embodiments, a processor or controller could be configured to regulate system operation based upon the amount of liquid water that is to be delivered by the system. Examples of other forms of deliverables include but are not limited to electrical power, compressed gas flows, carbon dioxide, cooling capacity, and heating capacity.

While the embodiments described above have related to placement of a compressed gas system within the generation or consumption layers of a power supply network, the present invention is not limited to such roles. Embodiments of compressed gas systems could be positioned within the transmission or distribution layers of the network and remain within the scope of the present invention.

Accordingly, FIG. 66 shows an embodiment of a compressed gas energy storage system 6690 that is positioned within the transmission layer. System 6690 is in communication with transmission substation 6665 through one or more linkages 6661. In certain embodiments, the energy storage system may be in communication with a transformer of the transmission layer through one or more electrical linkages.

The location of system 6690 within the transmission layer of the power supply network, allows it to perform a number of possible roles. For example, the cost of adding or even upgrading assets of the distribution layer and particularly the transmission layer of the power network, may be relatively high owing to regulatory, environmental, and safety concerns.

Thus, certain embodiments of energy storage systems according to the present invention may be integrated within the transmission layer to defer or even avoid upgrades on transmission lines. For example, an energy storage system may be situated proximate to transmission substations of transmission lines that experience high use at peak periods. In such a role, the energy storage system may allow shifting of the time of transmission of power away from such peak times.

In certain embodiments, the compressed gas energy storage systems utilized in the transmission layer (or in the distribution layer as described below), could be physically portable. For example, such systems could be positioned on a flatbed truck, tractor trailer, or container, and moved proximate to the appropriate expected points of congestion within the transmission layer or distribution layer.

Owing to the large amounts of power that are carried through transmission assets, such an embodiment of a power storage system may need to have a high capacity for storing power. Moreover, where the storage system is situated to relieve congestion on a daily basis, its capacity must be able to meet demand over multiple hours, and be capable of renewal over the period of a day.

While congestion on the transmission layer may be characterized over relatively long time frames on the order of hours or minutes, a different form of transmission congestion can arise on much shorter time frames. For example, certain operational limits may be imposed on transmission assets based upon equipment reliability concerns under contingency factors.

Accordingly, short term transmission capacity may be constrained by such limits, apart from the actual capacity of the transmission lines. Thus another potential role for an energy storage and recovery systems incorporated within the transmission layer, is to introduce power on short time frames and thereby effectively relax limits in transmission reliability. Such an energy storage system could be configured to inject power at strategic locations within the transmission network, on short notice, for a period of from about one second to about 15 minutes or more.

Still another possible role for energy storage and recovery systems incorporated within the transmission layer, is to support renewable sources of variable energy that offer limited transmission access. For example, high winds may be found in remote geographic regions served only by existing high voltage transmission lines of relatively low capacity.

Incorporation of an embodiment of an energy storage and recovery system according to the present invention, however, could allow these existing transmission lines to carry the power generated by such a generation asset. For example, a storage system could operate to store some or all of the power output by the generation asset, allowing transmission to be deferred until existing capacity is available in the transmission layer.

Such deferral of transmission could prevent wasting of power that would otherwise not be able to be output to the network. Moreover, deferral of transmission allowed by storage systems could allow renewable generation assets to be placed into service before a corresponding transmission link is fully upgraded to handle their maximum output capacity.

Still another possible role for an energy storage and recovery system, is to provide voltage support for transmission lines. Specifically, voltage support involves injecting or absorbing power onto a network in order to maintain voltage within certain tolerance limits.

For example, reactive power (VAR) is a form of power on the network which can arise from several sources, the most common of which is the presence of one or more inductive generators. Reactive power is not available for direct consumption by end users, but nevertheless must be provided by the operator of the power network in order to maintain the stability of voltages and power within prescribed ranges.

Providing voltage control to regulate reactive power generally involves the injection of power on subsecond response times. Hence, voltage control has conventionally been provided by devices such as capacitor banks, static VAR compensators (SVCs), or synchronous condensors. These devices function to provide capacitive resistance, injecting reactive power to boost a local voltage level.

Accordingly, certain embodiments energy storage systems according to the present invention may be incorporated within the transmission layer to provide reactive power onto the network at strategic locations, thereby freeing up generation assets to provide active power that may ultimately be consumed by end users. As such voltage support typically requires power to be supplied in response times of less than one second, embodiments of storage systems according to the present invention may be coupled with capacitor banks or other fast-responding structures capable of providing the power over the required response times.

Embodiments of energy storage and recovery systems according to the present invention may also be incorporated within the distribution layer of a power network. In one role, such an energy storage and recovery system could function to reduce peak load on a substation, and to perform back-up functions.

As shown above in FIG. 66, distribution substations are strategically located within the distribution layer to route power to end users. As populations grow, these substations experience overall larger loads, and typically experience an even greater increase in peak load.

The design of a distribution substation is constrained by the requirement that it meet peak demand, and thus load growth may dictate upgrade or replacement of a substation more frequently than the general load would otherwise require. Accordingly, in certain embodiments a compressed gas energy storage and recovery system may be positioned within a distribution layer to reduce such peak loads, thereby deferring the need to perform a costly upgrade or replacement of the distribution substation.

Accordingly, FIG. 66 shows an embodiments of a compressed gas energy storage system that is positioned within the distribution layer. In particular, compressed gas system 6680*a* is in communication with substation 6630*a* of the primary distribution layer through one or more linkages 6667. Compressed gas system 6680*b* is in communication with substation 6630*b* of the secondary distribution layer through one or more linkages 6669. In certain embodiments the compressed gas system may be in communication with a transformer of the distribution layer through an electrical linkage. In embodiments where the generator is configured to output voltage matching that of the distribution layer, the system may be in direct electrical communication with the distribution layer.

For example, an embodiment of a storage system that is located within the distribution layer, could be configured to store power at off-peak times. At peak times, the storage system would inject power onto the distribution layer. Such injection of power at strategic points, could reduce the peak load experienced by one or more distribution substations. As the historical peak load of the substation will not have increased, the need to upgrade the distribution substation may be deferred until a future time.

The reduction in peak load offered by embodiments of storage systems according to the present invention, may result in still other cost savings. For example, reduction in peak load may result in a corresponding reduction in the strain on substation elements, thereby improving their reliability over the long term.

The role played by storage systems in reducing peak levels on substations of the distribution layer, may determine the properties of those storage systems. For example, a storage system that is positioned to back up a primary substation, may be required to output relatively high voltages commensurate with its location in the distribution network.

In addition, as the storage system needs only to reduce a peak load, rather than shoulder the entire load, a storage capacity of such a system may be smaller as compared with other roles. The storage capacity of the system may also be dictated by the relative infrequency of its operation corresponding to times of particularly high demand.

Alternatively or in addition to positioning within the primary distribution layer, embodiments of compressed gas storage systems according to the present invention may be located within the secondary distribution layer. In such a role, the storage system would provide similar benefits of deferring upgrade on equipment, and reducing the wear on the equipment.

Moreover, positioning energy storage systems in the secondary distribution layer could provide other potential benefits. For example, such a storage system could provide a source of energy backup to consumers in the even of a brown out, rolling black out, or total blackout. The decentralized nature of such a community energy supply could also enhance the security of the power network, avoiding a complete loss of power resulting from failure of a few nodes of the network.

Positioning of energy storage within the distribution layer could also facilitate "islanding", wherein following the failure of the larger network, subsections of the grid could be independently powered up as "islands", and then ultimately linked together as the larger grid is re-established. Such an "islanding" technique can reduce the wear on the grid, and lessen the amount of time that users are completely without electricity.

An energy storage system incorporated into secondary distribution could also function to balance output onto the power network from multiple distributed generation (DG) apparatuses that are located at end users, examples of which include rooftop solar (PV and/or thermal solar) or wind. In such a role, the cost burden of an energy storage system could be distributed over a community of users rather than a single user.

Providing an energy storage and recovery system within the secondary distribution layer as part of a community energy supply, could also improve efficiency by reducing distribution losses. This is because the storage is located closer to the load, reducing the distance traveled, and hence losses incurred.

Voltage support represents still another potential role for energy storage systems according to the present invention that are located within the distribution layer. Such voltage support functions are discussed above in connection with the transmission layer.

Some embodiments of compressed gas energy storage and recovery systems may provide voltage support that is particularly relevant to the distribution layer. For example, a compressed gas energy storage system may serve to boost voltage levels at points along secondary distribution layers that extend over a wide area to serve rural geographic regions.

Embodiments of compressed gas energy storage and recovery systems may be suited for other localized roles. For example, certain facilities that are large consumers of electricity, may extend over a wide geographic area and may not use a common meter (thereby distinguishing them from a single end user, as described above). Examples of such facilities can include transportation hubs such as airports, ports, and railway lines.

Providing an energy storage system in the distribution layer proximate to such facilities, could serve to reduce their demand at peak times. Moreover, the use of an energy storage system in such a distribution layer could also be beneficial for security, ensure the integrity of the power supplied to these key facilities in the event of a natural disaster or terrorist attack.

As indicated in detail above, various embodiments of systems according to the present invention relate to compressed gas energy storage systems, whose operation is controlled based upon information received by a controller or processor. In certain embodiments information received by the controller can serve as a basis for deciding to operate, or halt operation, of the system. In some embodiments, the information can be utilized to determine system operation in a compression mode or in an expansion mode. In some embodiments, information received by the controller may be further utilized to determine efficiency of system operation, versus power consumed or output during the storage or recovery of energy. Information received by the controller may include but is not limited to, a current price of energy on a power grid, an expected future price of energy on a power grid, contractual terms governing purchase or sale of power to a power grid, a level of supply of energy from other sources to a power grid, meteorological information, and/or metering history of the system or a co-situated facility.

Embodiments of the present invention relate to systems and methods employing aerosol-cycle cooling.

Vapor-compression air conditioners are simple, efficient, inexpensive and effective. Unfortunately, the use of standard refrigerants may release potent greenhouse gases. Embodiments according to the present invention may match or exceed the efficiency of vapor compression systems, while eliminating GHG emissions using a novel thermodynamic cycle called the aerosol refrigeration cycle.

Embodiments according to the present invention may utilize a cycle similar in some respects to a Stirling cycle, which uses isothermal compression and expansion of the gas used to transfer heat. According to some approaches, a fine, dense liquid spray may be injected directly into the compressing and expanding gas. This spray, with its very high heat capacity and interfacial surface area, may rapidly capture and transfer heat between the working gas and hot and cold atmospheric heat exchangers. One choice for the liquid-gas aerosol is water and air (helium is another option for the gas), the use of which will cause no GHG emissions.

Gas refrigeration cycles have been traditionally used in aircraft because of their light weight in comparison with traditional vapor compression devices. (See Nag, P., "Engineering Thermodynamics," Tata-McGraw Hill, 2nd Ed., 1995). The gas refrigeration cycles have a low COP because of the adiabatic compression and expansion carried out in these systems and therefore unsuitable in traditional refrigeration units.

A technology gaining increasing attention is the Stirling cycle coolers. Currently, small capacity Stirling cycle refrigeration systems are available commercially. Possible disadvantages of these systems is that it is difficult to design for large changes in refrigeration load. Also, a Stirling refrigerator may take a long time to reach the desired temperature from startup, and the specific power is low which results in large sizes of the system. (See Organ, A, J., "Regenerator and the Stirling Engine," Mechanical Engineering Publications, UK.)

In theory, an air conditioner running the ideal Stirling cycle could achieve the goals set out in the FOA (Area of Interest 1a). However, in practice, no 'Stirling' air conditioner built to date even reasonably approximates the ideal Stirling cycle, which demands extremely efficient and rapid heat transfer to and from the gas during the expansion and compression processes. Failure to deliver this renders the compression and expansion processes of existing Stirling cycle systems nearly adiabatic, resulting in severe thermodynamic losses and limited power density.

Accordingly, embodiments of the present invention may utilize an aerosol refrigeration cycle. Such embodiments may allow the ability to compress and expand gas nearly isothermally (that is, with only a small temperature change). This may be achieved by entraining a fine, dense, high-heat-capacity liquid spray into the compressing and expanding gas. The heat capacity of the spray so dominates that of the gas, that the otherwise significant temperature rise of compression (and drop during expansion) can be reduced to only a few degrees.

Accordingly, a highly efficient air conditioner running such an aerosol refrigeration cycle may be created.

Figure 73:
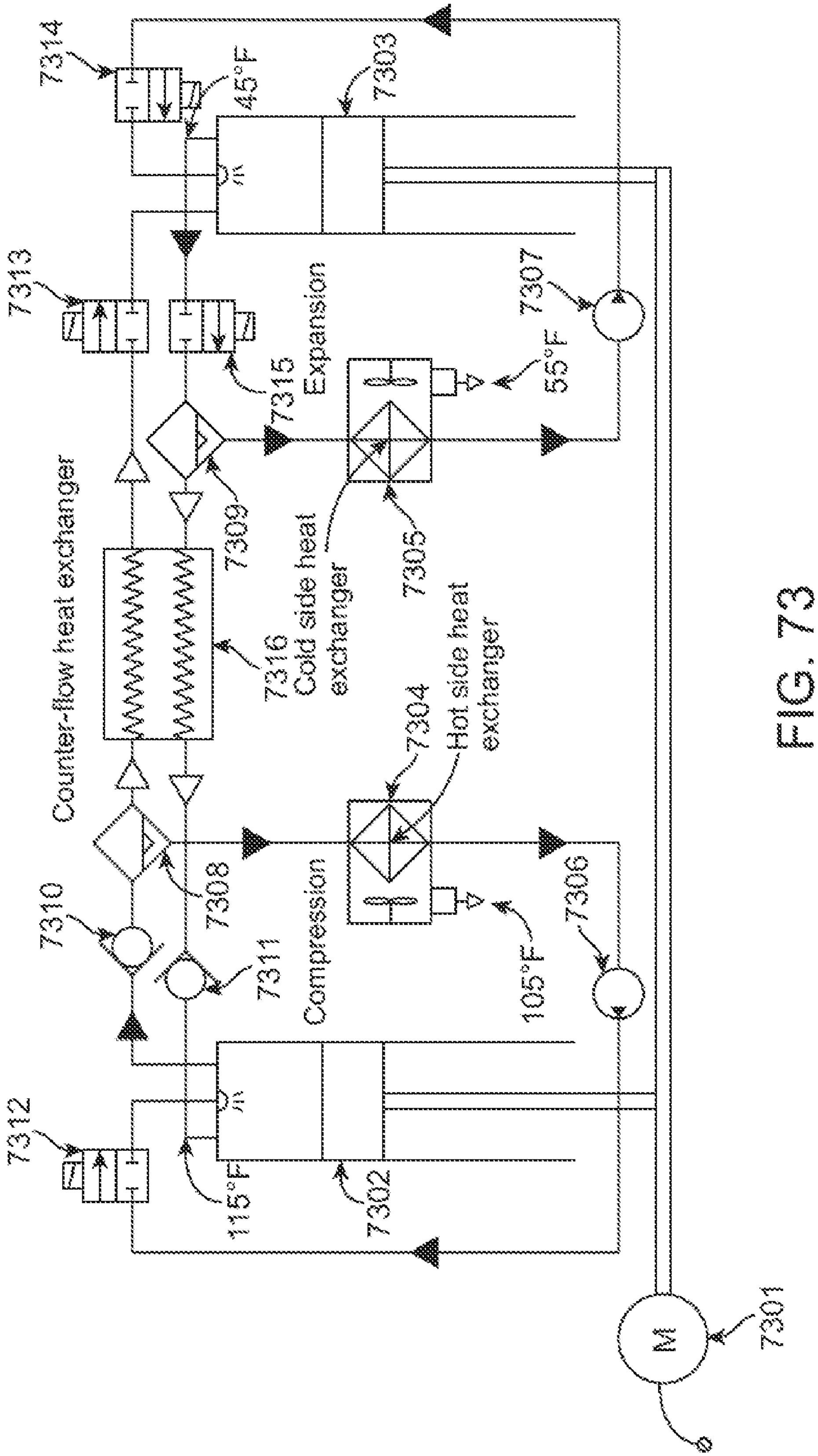
FIG. 73 represents a simplified view according to certain embodiments.

FIG. 73 represents a simplified view according to certain embodiments. The system comprises a motor (7301), reciprocating piston compressor (7302) and expander (7303), hot and cold side air-cooled liquid heat exchangers (7304 and 7305), two pumps (7306 and 7307), two gas-liquid separators (7308 and 7309), check valves (7310 and 7311) and solenoid valves (7312 through 7315), and a counter-flow heat exchanger (7316).

The details of an embodiment of an aerosol-cycle are as follows:

1. Cool gas (at ~55° F.) expands in a reciprocating expander (7303), drawing heat from a liquid spray entrained within. Both leave the expander at ~45° F. The work extracted is reinvested into the compressor (7302) and the pumps (7306 and 7307).
2. The liquid in the cool aerosol is separated from the gas (via separator 7309), collected into a liquid stream, and routed to a heat exchanger (7305), cooling the intake airstream to ~55° F., and then cycled back to be sprayed into expanding gas once more.
3. The cool liquid-free gas is passed through a counter-flow heat exchanger (7316), countering a flow of warm liquid-free gas. The cool gas is heated at constant pressure to slightly above ambient temperature (~105° F.).
4. Warm liquid is sprayed into the warm gas, and is then compressed (in compressor 7302). The compressor is driven in part by the expander, and in part by an electric motor (7301). The heat of compression is drawn into the aerosol. Both leave the compressor at ~115° F.
5. Warm liquid is separated from the gas (via separator 7308), collected into a stream, and routed to the heat exchanger (7304), which cools by dumping the heat to the ambient environment, and is then recycled to be sprayed into the compressing gas once again.
6. The warm liquid-free gas is passed through the counter-flow heat exchanger (7316), countering the flow of cool liquid-free gas. The warm gas is cooled at constant pressure to slightly below air conditioner exhaust temperature (to ~45° F.). The gas flows into the expander, is entrained with cool liquid, and the cycle continues.

As in conventional refrigeration cycles, the compressor in our design compresses gas (air or helium), heating it, and the heat is rejected to the ambient air via a heat exchanger. In certain embodiments of a cycle according to the present invention, however, there may not be a bulk phase change; the temperature change is due almost entirely to the transfer of sensible heat. Furthermore, the heat of compression is absorbed almost entirely by droplets of water that are sprayed into the compression cylinder. The heated droplets are exhausted from the cylinder at the end of the compression stroke, and are then separated from the compressed air. It is the heated liquid that is pumped through the heat exchanger in order to reject the heat.

The expansion side of the cycle is the mirror image of the compression side. Note, though, that the expansion of the gas drives a piston, which, in turn, drives the same shaft that drives the compressor. This improves efficiency as compared with a standard throttle valve in which the energy of the free expansion of the gas is lost.

A reciprocating piston mechanism, similar to those found in internal combustion engines, may permit spraying directly into the working compression/expansion chamber. Turbine-based compressors may lack the right geometry to permit uniform mixing of the liquid droplets with gas.

For the target specifications (a 75° F. building temperature with a relative humidity of 60%, a 55° F. exhaust temperature at a relative humidity of 100%, and a 95° F. ambient temperature), a coefficient of performance (COP) exceeding 4 can be achieved at reasonable cost if a number of parasitic losses can be controlled. The efficiency of the compressor and expander mechanisms may exceed 79% roundtrip if the electrical motor and drive efficiency together is 95%. This level of efficiency may be achieved if high-quality mechanical components are used and, if the temperature change during compression, expansion, and across the heat exchangers can be kept to about 10° F.

By contrast, conventional adiabatic compressors and expanders may have a $\Delta T$ in excess of 100 degrees under similar operating conditions. A near-isothermal technology according to embodiments of the present invention may achieve the desired cooling efficiency.

Embodiments according to the present invention may utilize a liquid spray system. Specifically, the ability to maintain a fixed, small temperature rise during the compression stroke (and temperature drop during the expansion stroke) may help to deliver system efficiency. A liquid spray may absorb heat during compression and to add heat during expansion. Water is the best choice of liquid because of its high heat capacity. To achieve the heat transfer rate required, the spray may be very dense. That is, the volume fraction of water may be at least 0.25%. Additionally, the gas-water aerosol may be uniformly distributed in the compression and expansion chambers so as to avoid hot or cold spots.

Nozzles and spray manifolds can be designed, and their performance simulated using computational fluid dynamics (CFD) tools, and then fabricated and tested the nozzles using laser imaging and particle imaging velocimetry (PIV).

Embodiments of the spray system inject water directly into the compression and expansion cylinders via the cylinder head. A challenge is to miniaturize the spray system sufficiently to fit in the head of a cylinder with about one liter displacement.

Embodiments of the present invention may incorporate compressor and expander mechanisms. In principle, various compressor or expander technologies could be used for this application.

In practice, the requirement to inject a dense water spray during operation may determine this aspect. A reciprocating piston mechanism may be used. Such an approach may offer the best geometry, the most flexibility, and more than adequate speed and mechanical efficiency.

A reciprocating mechanism may be designed by modifying an off-the-shelf compressor. Custom cylinder heads may accommodate the spray system. The mechanism may be made water-tolerant, which may involve the use of specialized materials and coatings throughout. Examples include nickel-polymer and DLC (diamond-like carbon) coatings for the exposed surfaces, graphite-filled PTFE piston rings, brass nozzles, and stainless steel valve components.

Embodiments according to the present invention may use a counter-flow heat exchanger. The performance of the counter-flow heat exchanger may determine delivery of the desired system efficiency. A low $\Delta T$ (about 10° F.) between the inflow and outflow airstreams at each end of the heat exchanger may be used, with an ability to tolerate an internal pressure of 120 psi or higher.

Secondly, moisture condensation may occur in the counter-flow heat exchanger when the hot gas stream is cooled. When the hot gas leaves the separator prior to the counter-flow heat exchanger, it may be saturated with moisture. The pressure drop through the heat exchanger may be low, so some of the moisture in the air may condense inside the heat exchanger. As the water remains at high pressure in a closed loop in this system, the condensate can be recovered and re-injected into the system.

Modeling the counter-flow heat exchanger involves psychrometric property values at high pressures. Existing software provides thermodynamic properties of moist air up to 27 bar pressure. Psychrometric algorithms will be used to model the moist air passing through the chilled water coil where condensation also occurs.

If the working gas used is air, it can be stored in a suitable pressure vessel following compression rather than immediately circulated to the expander. This allows the system to be charged up overnight, when the electricity used to power it is inexpensive. The cooling can be delivered (without any further electricity being consumed) at a later time—typically the next day when air conditioning is needed and electricity would be more expensive.

Embodiments according to the present invention may have an "open" design. That is, air would be drawn into the compressor from the environments and exhausted to the environment from the expander.

Embodiments according to the present invention may develop an air conditioning system that can deliver a COP of 4 both economically and without the use of greenhouse gases. Certain components (e.g. the near-isothermal compressor and expander and the counter-flow heat exchanger) can be built and tested individually, (after the appropriate analysis and simulation is complete) and then integrated into the system.

Thermodynamic Modeling may proceed as follows. An application of this device is as a high performance air conditioning system. Latent and sensible cooling may occur at the chilled water coil (cold side heat exchanger). Therefore accurate performance modeling can include appropriate psychrometric processes on the air side.

Although performance will be measured at one set of design parameters, operation at off design conditions may be important to estimate seasonal performance. Parametric studies can be performed using thermodynamic/psychrometric models to simulate system performance at various indoor and outdoor environmental conditions.

Other possible applications for various embodiments include use of the system to assist with domestic hot water heating, and/or use as a heat pump, that can be investigated using steady state thermodynamic modeling. These alternate applications may employ additional or different heat exchangers than specified in the original design. Thermodynamic simulations can also be conducted to determine the effect on system performance if some or all the heat from the hot side is used to heat domestic hot water and if the system is used as an air to air heat pump.

Component modeling may be conducted as follows. Two issues may prevent the use of off the shelf heat exchangers in this application. The first is the use of high pressures in all the main heat exchangers. Tube wall thickness may need to be increased above values normally used to provide adequate safety for the high pressures encountered.

Secondly, moisture condensation will occur in the counter-flow heat exchanger when the hot gas stream is cooled. When the hot gas leaves the separator prior to the counter-flow heat exchanger, it will be nearly saturated with moisture. The pressure drop through the heat exchanger is expected to be low so some of the moisture in the air will condense inside the heat exchanger. As all the water remains at high pressure in a closed loop in this system, the condensate needs to be recovered and re-injected into the system.

Modeling the counter-flow heat exchanger requires psychrometric property values at high pressures. Existing software provides thermodynamic properties of moist air up to 27 bar pressure. Conventional psychrometric algorithms will be used to model the moist air passing through the chilled water coil where condensation also occurs. Conventional heat transfer and fluid mechanics principles and models are expected to apply without modification to both the moist air and water inside and in the moist air external to the system.

Components may be designed as follows. The design requirements for the heat exchangers can be determined from the results of the component modeling. The design may comprise a set of specifications for each of the three main heat exchangers, the counter-flow heat exchanger between the two gas streams and the hot water and chilled water coils. Specifications can include heat transfer duty, flow rates, pressure ratings and pressure drops, maximum dimensions and weight. Compact design requirements may impose additional challenges.

Data collection and system design may be as follows. Appropriate sensors capable of the high pressure environment may be used to text the system, together with software and hardware for data acquisition.

Testing facilities may include two environmental chambers capable of maintaining stable air temperature and humidity conditions for the air that approaches both the hot and cold side heat exchangers in the system. The majority of the data will be collected on the cold side to determine the cooling load on the system. Heat transfer rates on both the air and water sides of the heat exchangers may be obtained. It is possible that water side measurements will be more accurate than those on the moist air side. Accurate power measurements will also be obtained to determine the system C.O.P.

Facilities for testing the design of the heat exchanger may be as follows. Two separate measurement systems are possible. One is for testing the counterflow heat exchanger.

In this facility moist air may be provided at the conditions expected to leave the gas/liquid separators on both the high and low temperature sides of the compressor/expander. Temperatures, pressures, humidity values and flow rates of the moist air flowing in and out of both sides of the heat exchanger may be measured. In addition the temperature and flow rate of the condensate may also be monitored.

Hot and chilled water coils may be tested in a facility that is capable of providing known air flow rates and can heat and humidify the air in the tunnel. The facility may be capable of testing the chilled water coils, where the air needs to be heated and humidified. Using building chilled water, cooling capability for testing the hot water coils may be designed when heat needs to be removed from the air stream. The air flow rates in these tests lower than required in the ASHRAE filter tests normally conducted in this facility. Therefore, a new air flow nozzle to meter the flow with lower range than the existing nozzle may be specified for accurate flow measurements. Instrumentation will be installed in both facilities and connected to an automatic data acquisition system. System performance verification tests may be conducted.

Analysis of the thermodynamics of novel cycles using near-isothermal compression and expansion and developing the underlying technology for this system, has been performed. This work arose from efforts to use similar technology to create an inexpensive, efficient energy storage system.

Spray nozzles and control systems that will introduce the liquid into the compression and expansion chambers at mass flow and droplet size, have been studied. These spray systems may be characterized using particle velocity imaging and CFD analysis.

FIG. 29 shows the velocity field for a hollow-cone nozzle that provides very uniform droplet distribution, appropriate for a high compression ratio. FIG. 30 is a CFD simulation of a fan nozzle, which provides a high mass flow, and may be easily arranged in manifolds to entrain the spray uniformly in the working gas.

Figure 74:
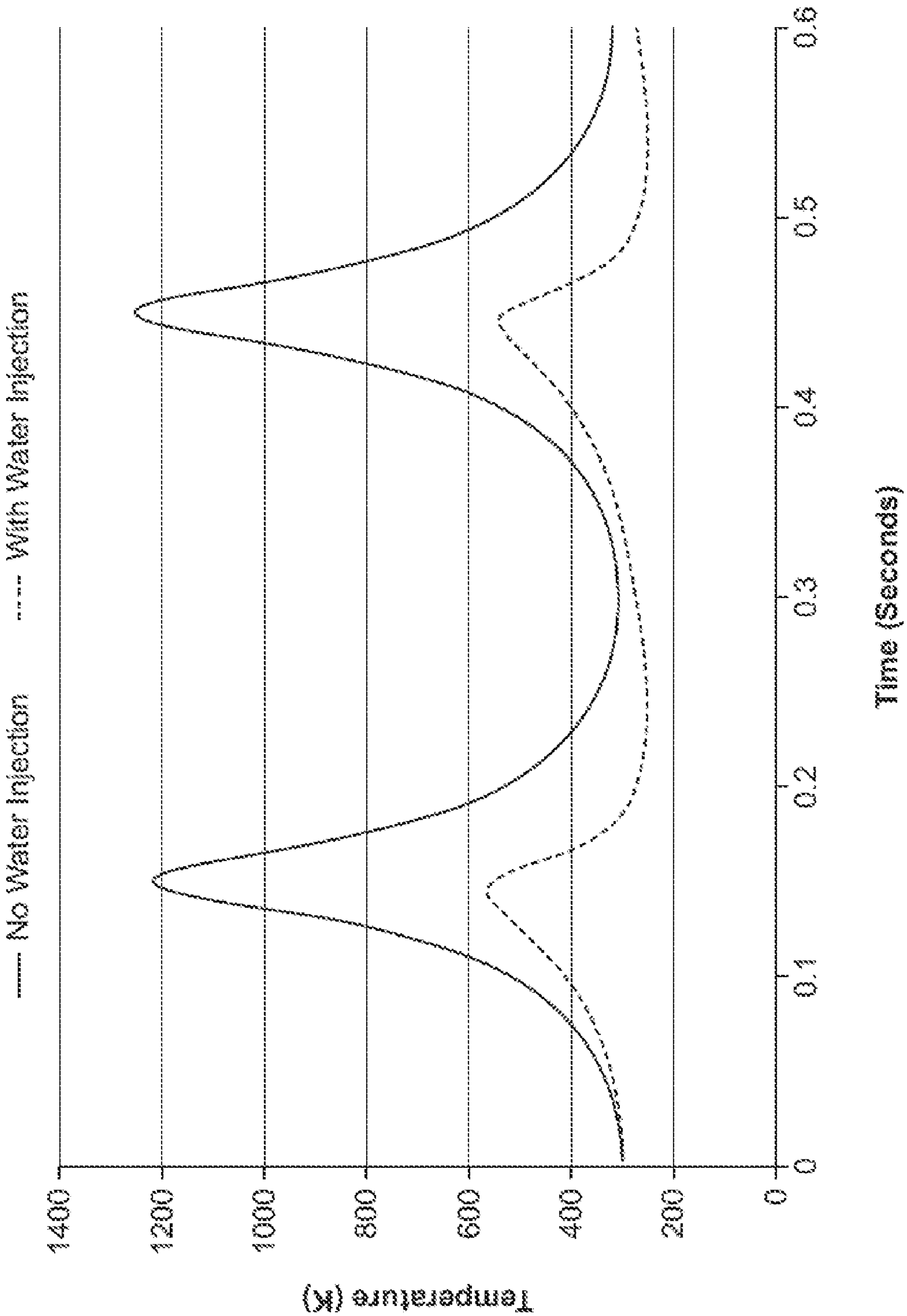
FIG. 74 is a graph of mass weighted average temperature over two compression cycles with a compression ratio of 32.
Figure 74A:
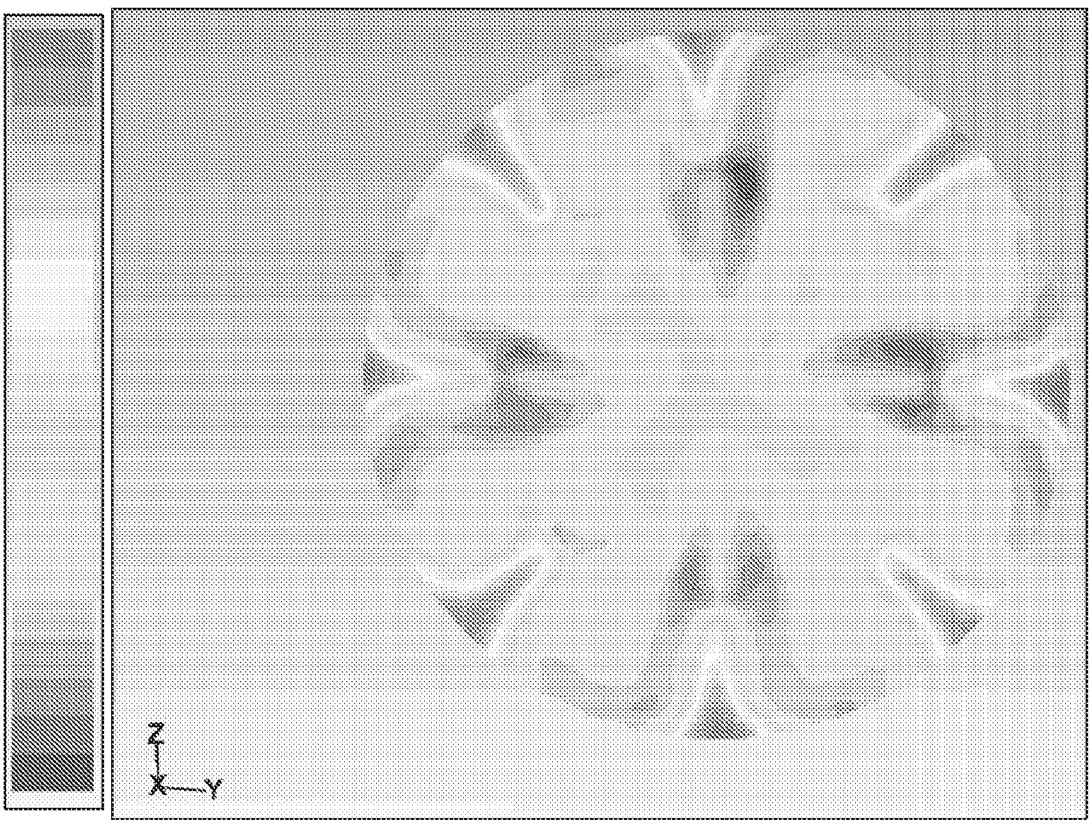
FIG. 74A is a false color representation of temperature in Kelvin at top dead center from a CFD simulation of gas compression at a high compression ratio.

FIG. 74 is a graph of mass weighted average temperature over two compression cycles with a compression ratio of 32. For comparison, the average temperature without spray is plotted. FIG. 74A is a false color representation of temperature in Kelvin at top dead center from a CFD simulation of gas compression at an extremely high compression ratio of 32. The quantity of water injected per stroke is about 0.6% of the volume.

R&D Progression:

One reason that air conditioning using compressed gas has not been aggressively pursued in the past is that the thermal efficiency of the conventional (adiabatic) compression/expansion cycle is very low. For example, the round-trip efficiency of adiabatically compressing air from 1 atm to 200 atm and expanding it back to 1 atm is about 30%. Additionally, the change in temperature of the gas—as it is compressed/expands-limits the compression ratio to about 3.5, requiring multiple stages for the compression or expansion cycle, thereby reducing the efficiency even further.

Figure 75:
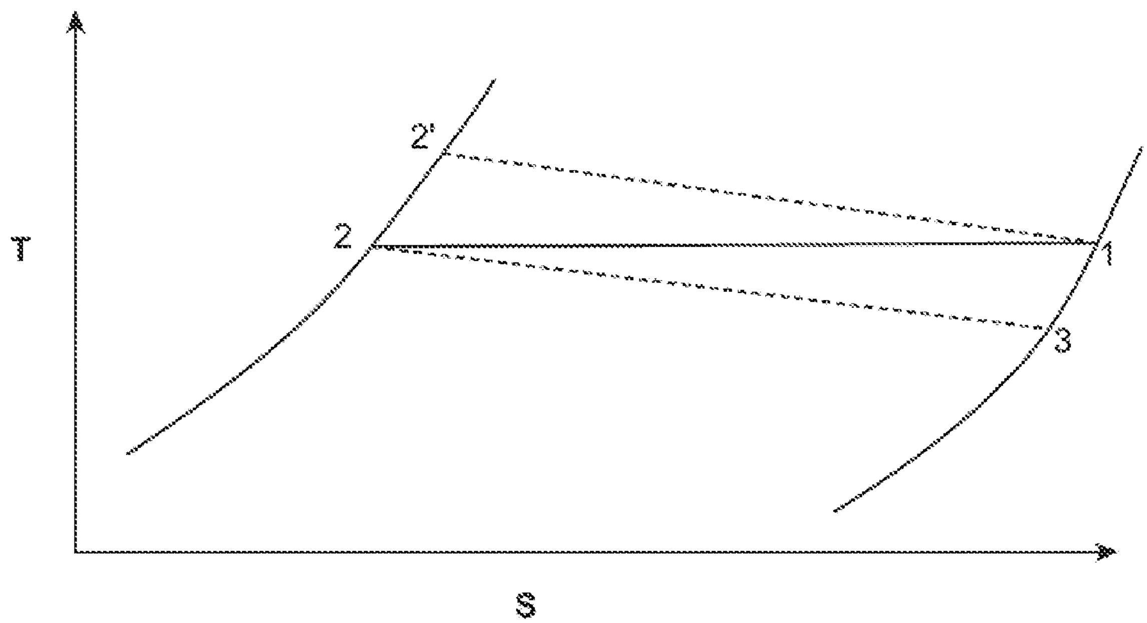
FIG. 75 shows a thermodynamic cycle.

To demonstrate the performance of such system, we are planning to compress air to atm while the temperature variation $\Delta T$ is kept below 20° C. by spraying water droplets into the compressor. Our criterion for pressure is set to achieve an energy density of about 25 Wh/liter, which is high enough to make the system practical for use. The criterion for $\Delta T$ is set by the target round-trip thermodynamic efficiency of 90%, as discussed below:

Thermodynamic Efficiency of the System:

FIG. 75 shows an embodiment of a thermodynamic cycle used for an energy storage system. During the process 1-2' the air is compressed to a high pressure of around 200 atm with an isothermal compressor which uses proprietary water spray technology being developed by LSE. Existing experimental data suggests that a compression ratio as high as 30 can be used in isothermal compression (See Coney et. al., "Development of a reciprocating compressor using water injection to achieve quasi-isothermal compression", Int. Compressor Eng. Conf., July 16-19, 2002), whereas a traditional adiabatic compressor can only achieve compression ratios of about 3.5. Thanks to the large isothermal compression ratios, high pressures (in excess of 200 atm) can be achieved using only two stages. This compressed energy is stored in a tank for either few minutes or even hours together. In large multi-megawatt power systems it may be likely that this energy is stored for several hours. During this period the air stored in the tank will lose some heat and return back to atmospheric temperature at a constant volume. When the stored energy is needed, the compressed air is expanded back along process 2-3 which also uses water spray technology to expand air under isothermal conditions.

Thermodynamic Analysis:

Basic thermodynamic calculations showing the feasibility of this system will be presented in this section. The amount of water injected into the system should be enough to keep temperature more or less constant. The energy transfer can be given by the relation TdS=dH−VdP. For water droplets of size of few hundred microns, the heat transfer rates are very fast resulting in fast thermal equilibrium being achieved by air and water droplets. The discussion in the following sections on proprietary spray technology being developed clearly shows that small droplet size is easily possible by applying relatively small percentage of the total energy. Therefore it is assumed that the air and water are at same temperature. Therefore we have $dH=C_{pa}dT+m_wC_{pw}dT$, where $m_w$ is the mass of water per unit mass of air. $C_{pa}$ and $C_{pw}$ are the thermal heat capacities of air and water respectively. We can now write $(C_{pa}+m_wC_{pw})dT/T=RdP/P$. Integrating the above equation results in the following relationship $$\frac{T_2}{T_1}=\left(\frac{P_2}{P_1}\right)^{\frac{R}{(C_{pa}+m_wC_{pw})}}=\left(\frac{P_2}{P_1}\right)^{\frac{n-1}{n}},$$

where $n=(1-R/(C_{pa}+m_wC_{pw}))^{-1}$. The work done during the compression process can be shown to be $$W=\int dH=\int Vdp=\frac{n}{n-1}RT\left[(P_2/P_1)^{\frac{n-1}{n}}-1\right].$$

The efficiency of energy storage system can be defined as $$\eta=\frac{W_{out}}{W_{in}}=RT\left[(P_2/P_1)^{\frac{n-1}{n}}-1\right]\Big/\left(RT\left[1-(P_3/P_2)^{\frac{n-1}{n}}\right]\right).$$

Figure 76A:
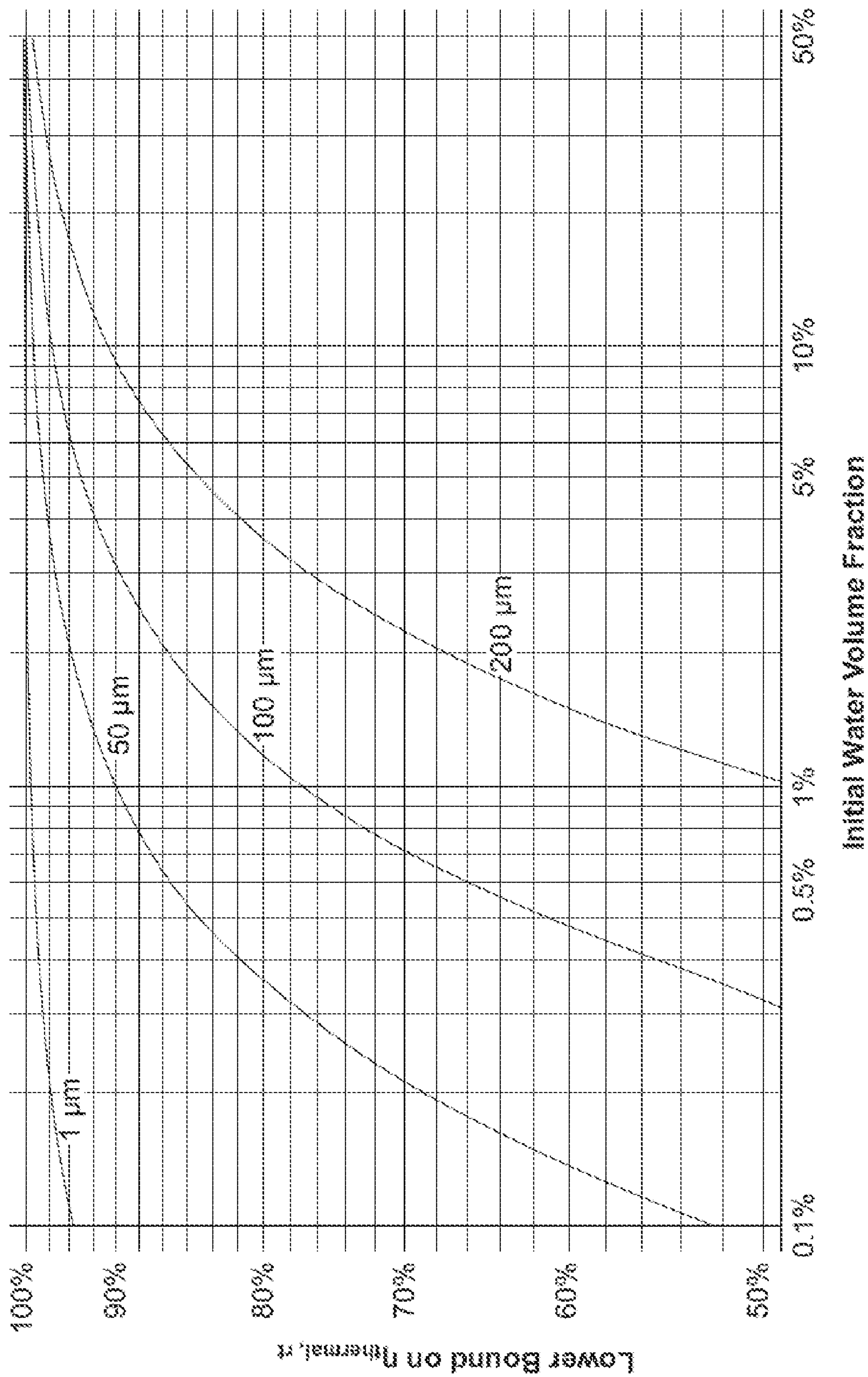
FIG. 76A plots efficiency versus water volume fraction.

The plot of efficiency versus the water volume fraction is shown in FIG. 76A. FIG. 76A shows ideal thermodynamic efficiency of round-trip energy storage cycle (at 20 Hz with compression ratio is 14.1) when different drop sizes are sprayed into the cylinder during compression.

It is shown that to achieve an ideal round-trip thermodynamic efficiency of 90%, it is required to spray maximum of 2.5% by volume water into the compressor in the form of 100 μm drops. As shown in FIG. 76A, spraying this amount of water constrains the temperature increase/decrease during compression/expansion to be about ΔT=20 K.

Figure 76B:
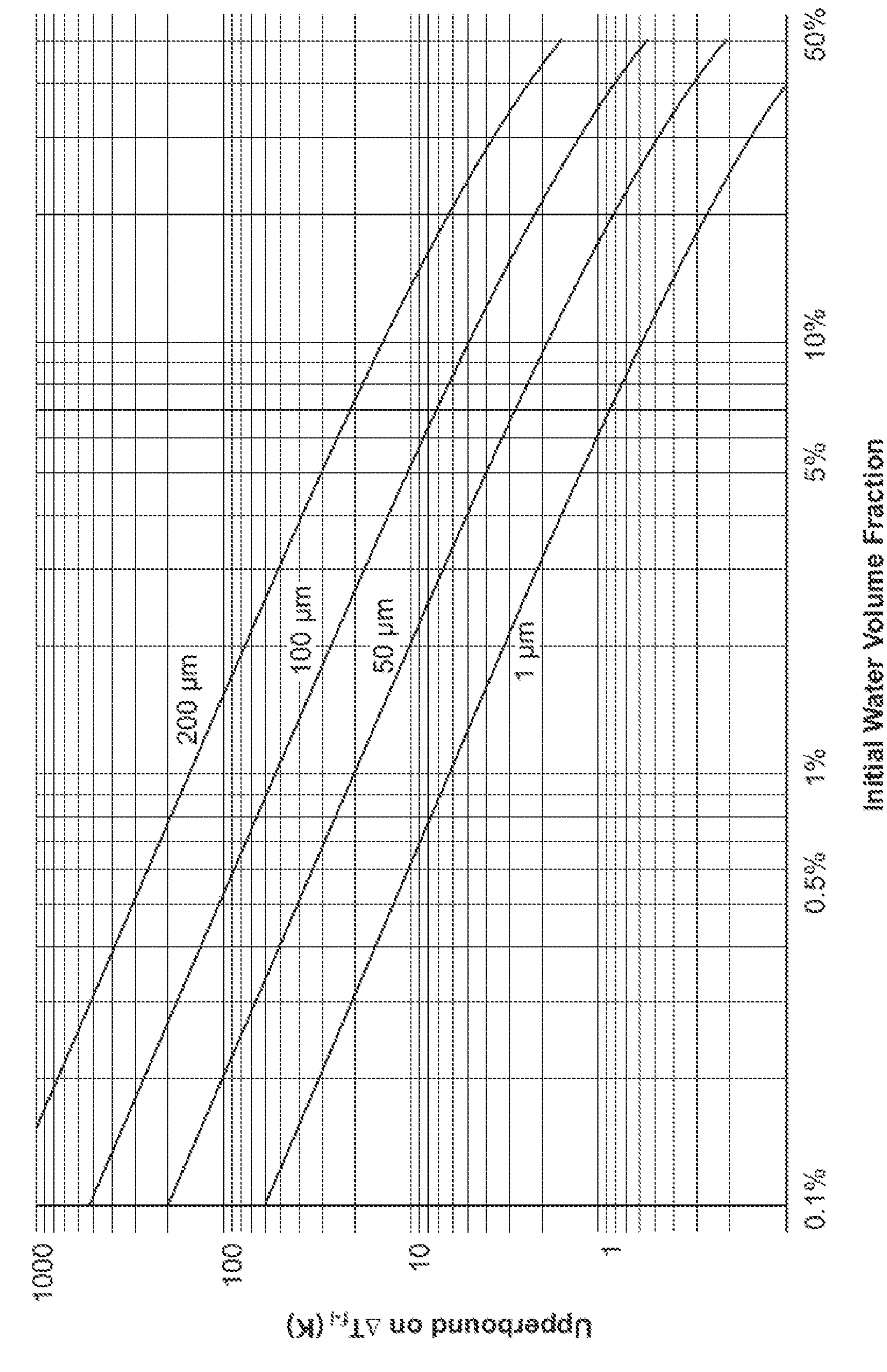
FIG. 76B shows a temperature of the exhaust air with increase in water volume fraction.

FIG. 76B shows temperature of the exhaust air with increase in water volume fraction. FIG. 76B shows air temperature increase (ΔT) during compression at 20 Hz with compression ratio is 14.1, as a function of initial volume fraction of water @1 atm.

At a water volume fraction of 2.5% when 100 μm drops are sprayed, the increase in exhaust air temperature is less than 20 degrees. In comparison, when no water is used the temperature increase is in excess of 1000K.

Time Scale for Heat Exchange Between Air and Water Droplets

For the current compressor system it can be assumed that Pr ~0.7 and based on the injected velocities calculated theoretically and experimentally, it can be found that Re ~100. Therefore $Nu=hd_p/k=7.33$. Assuming 100 micron droplets on average and air conductivity k=0.027 W/m/K, we have the heat transfer coefficient 'h' as 2000 W/m$^2$/K. The heat transfer between a spherical water droplet and air can be written as $m_aC_{pa}dT_a/dt=hA_p(T_a-T_w)$, where $m_a$ is the mass of air surrounding one droplet. $T_a$ and $T_w$ are air and water droplet temperature respectively. $A_p$ is the surface area of the droplet. From calculations of injected water mass above we have $m_a=0.5\ m_d$, where $m_d$ is the droplet mass. The time scale associated with this heat transfer process is given as $$\tau=\frac{m_aC_{pa}}{hA_p},$$

which for a 100 micron droplets works out to be roughly 1 millisecond. This is significantly faster than faster than the time scale of compression process (The compressor is operating at rotation speeds of around 1200 RPM).

CFD Analysis of Isothermal Compressor:

A computational flow dynamics (CFD) analysis of a isothermal compressor with compression ratio of 9 has been carried out. Complex multiphase flow simulation models along with dynamic re-meshing is being used to simulate the complex interaction between air and water phase. Individual energy, momentum and volume conservation equations for the two phases are solved.

Figure 77:
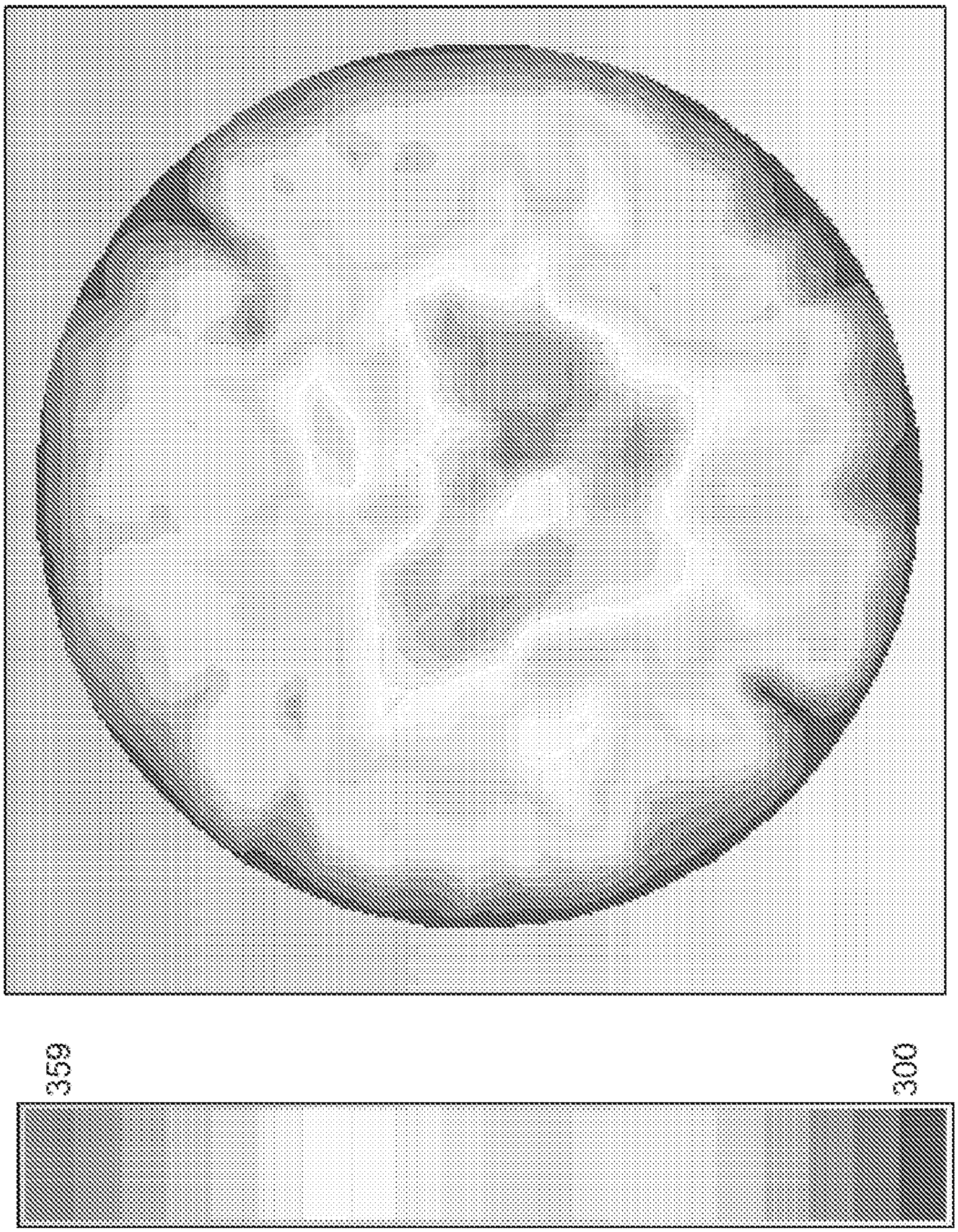
FIG. 77 shows the temperature at top dead center at a location close to the cylinder head.

FIG. 77 shows the temperature (K) at top dead center at a location close to the cylinder head, immediately preceding opening of exhaust valve. In the simulation, significant accumulation of water is observed along the walls due to water droplet splashing, sliding and sticking effects. The temperatures, in general, are low at high water volume fraction regions and high in the central core where the low water volume fractions exist.

Figure 78:
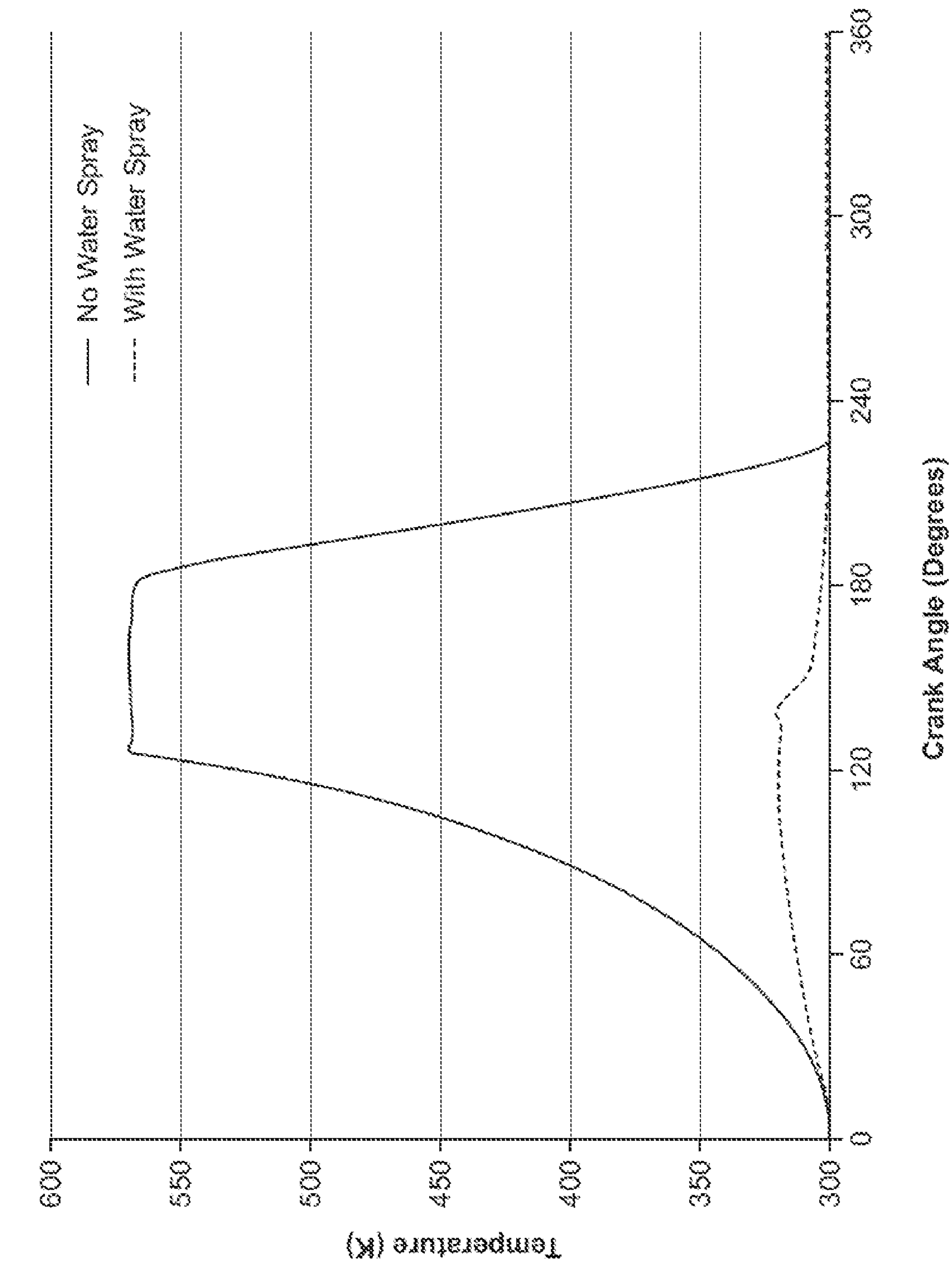
FIG. 78 shows the temperature variation with and without spraying water.

FIG. 78 shows the temperature variation with and without spraying water. FIG. 78 shows CFD prediction of the mass-average air temperature in cylinder (K) versus crank rotation with and without spraying water.

The average temperature of the gas without water spray would rise by about 270K, whereas the temperature rise in the presence of 200 μm droplets sprayed at 0.4 liters per second (20 cc's per stroke) is only about 25K. These results confirm theoretical analysis and clearly show the effectiveness of a proposed approach.

Other Losses:

In addition to the thermal inefficiency, which is considerably reduced by isothermal compression/expansion cycles, there will be other losses that lead to reduction in efficiency.

Such sources have already been identified and are summarized here.

Motor and Electronic Components Losses: Estimated to be about 5%. Higher efficiency components may be purchased at higher cost.

Valve Losses: Estimated at about 2.7%. The flow through valve and pressure drop are related by $\dot{Q}=C_dA_V\sqrt{2\Delta p/\rho}$. Since we know the flow rate of air and water, we can calculate the pressure drop as $\Delta p=\frac{1}{2}\rho(\dot{Q}/C_dA_V)^2$. Typical velocities for the air and water are in the range of 10 m/s near the valve ($v=\dot{Q}/A_V$). The losses are then calculated separately for air and water phase: air flow loss in units of KJ/kg-of-air is $\Delta pQ=\frac{1}{2}\rho Q(\dot{Q}/C_dA_V)^2$, calculated to be about 1.25 kJ/kg. Valve Loss due to water flow in units of kJ/kg-of-air is $\Delta pQ=\frac{1}{2}\rho Q(\dot{Q}/C_dA_V)^2$, calculated to be about 3.75 kJ/kg, which is about 1.1% of the total power generated of 456 kJ/kg.

Friction and Leakage Losses: Such losses are mainly due to motion of piston inside the cylinder, and the leakage of compressed air through the piston rings. The combined friction and leakage loss is estimate as 4 psi per piston ring.

Spray Loss: Estimated at about 0.16%. This power loss was estimated based on the pressure delta applied on the nozzles and the flow rate through them. The percentage loss is estimated using $(\Delta P_{nozzle}Q_{water}m_r/\rho_{water})/(RT\ \ln(P_2/P_1))$ Spray System:

To meet spray criteria set by the abovementioned analysis, a spraying system that operates at relatively low pressure delta (<50 psi) and relatively high flow rates (~100 cc/s) and generates small droplets (<100 micron) at a relatively short breakup length, may be designed. The spray nozzles may produce a relatively uniform spray inside the cylinder, should spray at shallow angles (with respect to the cylinder head), and should introduce small or zero dead volume. Then nozzles should also be easy to manufacture, and eliminate/reduce cavitation effects.

A nozzle has been designed that is small enough to fit in our cylinder and simple enough to replicate reliably and inexpensively. Nozzle development continues. Some preliminary experimental and numerical tests follow.

Figure 79:
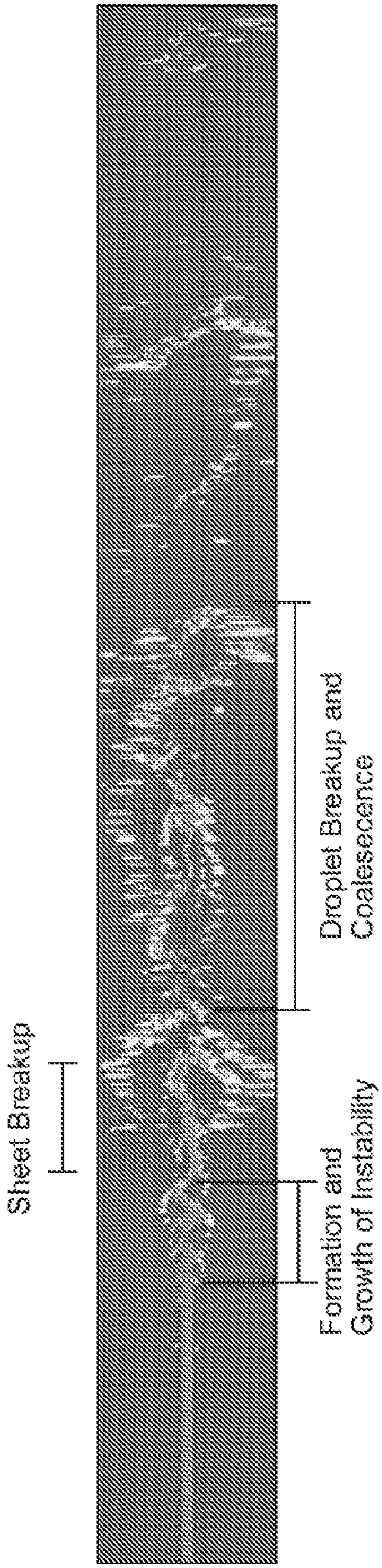
FIG. 79 shows a multiphase flow simulation of jet breakup in two-dimensions.
Figure 80:
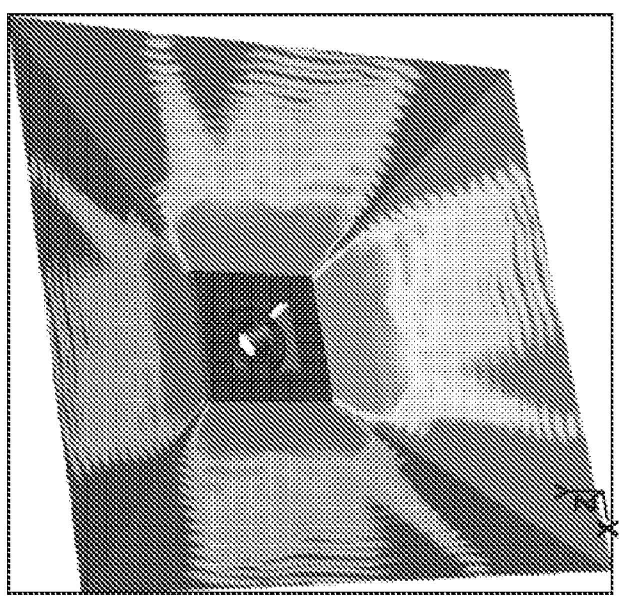
FIG. 80 is a CFD simulation of water spray emitted from an embodiment of a pyramid nozzle.

FIGS. 30 and 79-82*b* show CFD simulation of some of the nozzle designs that we tested. FIG. 79 shows multiphase flow simulation of jet breakup in 2D. FIG. 30 shows CFD simulation of water spray emitted from one of the proprietary LSE nozzle. FIG. 80 shows CFD simulation of water spray emitted from a pyramid nozzle developed.

With CFD simulations, we are able to predict the internal flow structure of the nozzles and predict the divergence angle of the formed sheet. We are also able to obtain a rough estimate of breakup length and breakup mechanism. We then use the obtained information along with semi-empirical correlations published in scientific literature to predict a more accurate value for breakup length and droplet size.

Figure 81B:
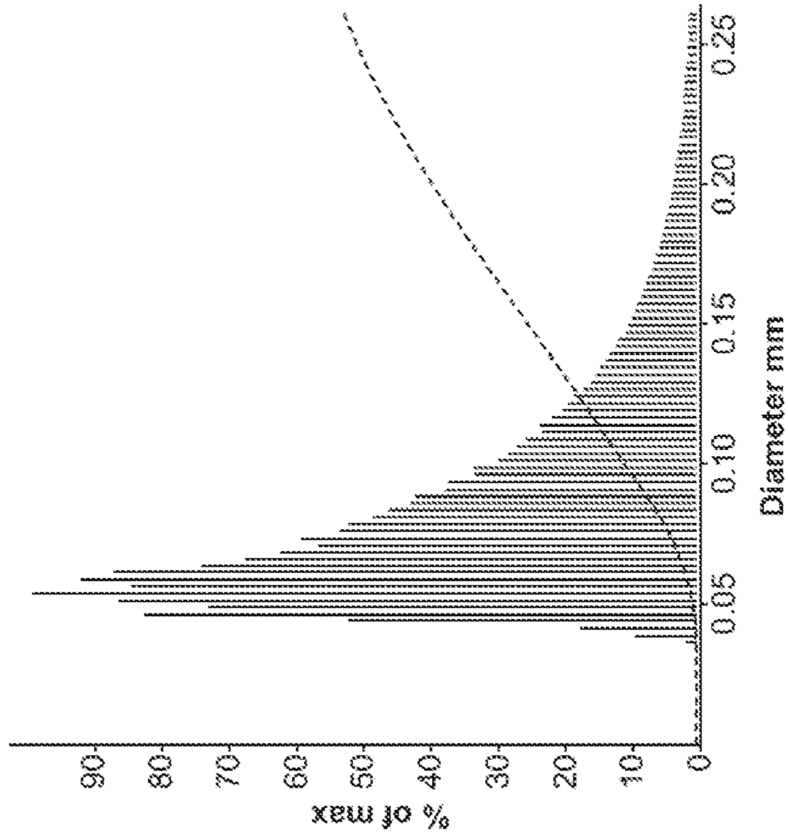
FIG. 81*b* plots measured droplet size distribution.
Figure 81A:
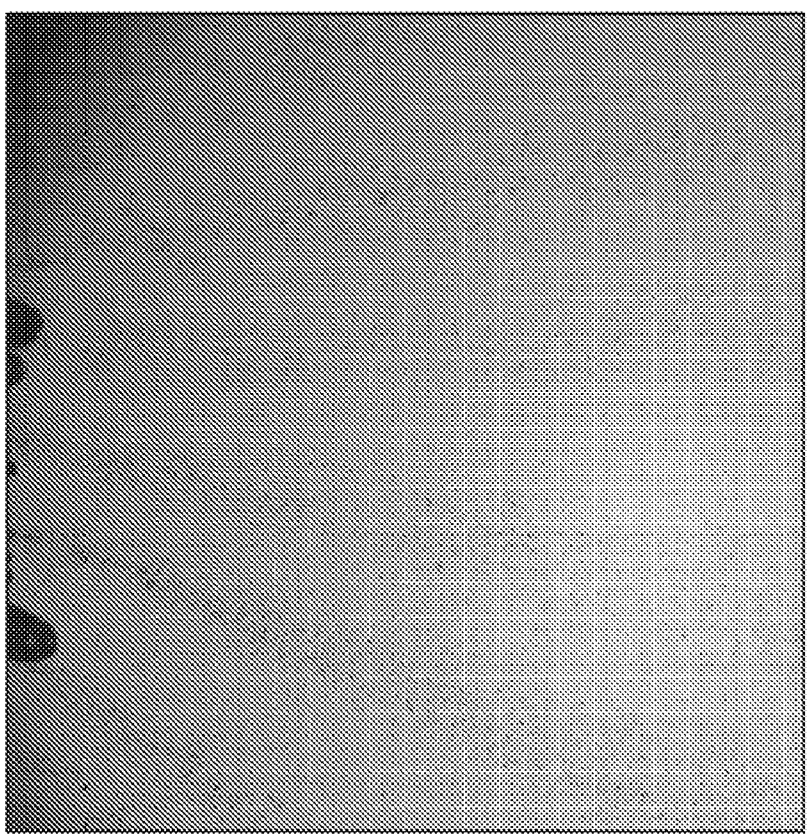
FIG. 81*a* shows an experimental picture of the drops taken using a Particle Image Velocimetry (PIV) system.

FIG. 81*a* shows an experimental picture of the drops taken using a Particle Image Velocimetry (PIV) system, showing liquid sheet breakup & atomization. The measure drop size distribution is also plotted in FIG. 81*b*.

The experimental setup includes a dual-cavity Nd:Yag laser (Solo III-15, New Wave Research) capable of illuminating the view field with two sequential 50 mJ 4 ns laser pulses at 532 nm wavelength. This setup allows us to measure spatial distribution of drop velocities.

Cost Analysis:

Assuming operation at 20 Hz (1200 RPM, two power strokes), and efficiency of 90% in expanding air from a 200 atm tank to 1 atm, the power rating of our system is estimated at 7.75 kW/Liter-of-displacement using the following relationship:

$$P_{iso} = \eta_v P_f V_{total}\left(\ln(P_i/P_f) - 1 + \frac{P_f}{P_i}\right) \times f$$

We used truck diesel engine as a model to estimate the capital (mass-production) costs of our proposed compressor/expander. This is intuitively reasonable because the pressure values in diesel engine is similar to that in our system (~200 atm). The power rating of the diesel engine at the 2400 RPM with 4 strokes (same power strokes as our system) is estimated to be about 16 kW/Liter-of-displacement using:

$$P_{diesel} = \tfrac{1}{2}\mathrm{BMEP} \times V \times f$$

Assuming that a 100 hp (~75 kW) truck diesel engine costs about $6000, the capital cost of mass production of our compressor/expander is about $165/kW. The following table summarizes the capital cost estimates, including cost of other items:

| Item | Cost |
|---|---|
| Compressor/Expander | 165 $/kW |
| Electric Motor | 60 $/kW |
| Heat Exchanger | 50 $/kW |
| Balance of System (BOS) - pump, controller electronics, etc | 90 $/kW |
| Total | 365 $/kW |

COP

Under the target conditions, many commercial air conditioning units operate at a COP of 3.5. Our system targets a COP of 4.25. A summary of our analysis follows.

FIG. 32A is a power flow graph illustrating work and heat flowing through the entire cycle. All power values are normalized to the electric power flowing in from the grid. First, 1 kw of electric power is processed through a motor drive with an efficiency of 97%, followed by a motor with an efficiency of 95%. This progresses through a motor shaft, which loses 0.5% of its power as friction. This shaft drives the compressor. The compressor has several sources of inefficiency: spray, leakage, mechanical, and thermal.

Spray losses, for the mass ratio of 10:1 water to helium, come to only 1% of the work cycled through the system. The mechanical and leakage losses of a reciprocating compressor or expander are typically 95%. However, the friction losses are concentrated in the valve actuators, the orifice friction and pipe losses and the piston rings; none of these friction losses scale up linearly as the pressure mounts, and valve/pipe losses are low for light gases like helium. Operation may be internally pressurized at 25 bar, with a pressure ratio of 2.71. These mechanical efficiencies may be kept collectively above 95.6%.

There are thermal efficiencies. The dynamic thermal performance of compressors and expanders have been analyzed, resulting in analytical bounds, numerical results, and some experimental results at small scales. The work done on expansion is less than that on compression because the gas is at a lower temperature. Expansion efficiencies are 92.7% and compression efficiencies are 98% for the temperatures shown, as long as the temperature difference between the gas and liquid stays below 5° F.—achievable according to our analytical and computational results.

Size

For a one-ton system running at 1200 RPM and 150 psi, we'd need a 1 hp electric motor, two reciprocating pistons of 350 cc total displacement, and fan-cooled heat exchangers with an interfacial surface area of about 15 square meters. Fitting these components into the desired form-factor (1.5'×1'×9") may be challenging but feasible.

Lifetime

Components in the design can reasonably be expected to operate with little or no maintenance for the target specification of 14 years—they do so in other similar systems. A risk to lifetime involves the use of water in the compressor and expander cylinders, as water can be corrosive to many metals. Water-tolerant materials that are also long-lifetime are useful for the sliding seals, valve seats, wear surfaces, and fasteners. Designs in accordance with the present invention may use aluminum components, nickel-polymer coatings, and PTFT sliding components.

Cost

To reach a target of $1000 per ton, cost-engineering of the near-isothermal compression and expansion cylinders can be done. Reciprocating air compressor pumps with 350 cc displacements retail for about $370. Embodiments according to the present invention may operate as both a compressor and an expander, using custom valves, plus spray nozzles, pumps, and air-water separators. If the total cost of those components can be kept to $500, that leaves about $150 for a one hp motor, $100 each for the three heat exchangers, and $50 for the enclosure and controls.

Scalability

Because our design is based on a simple reciprocating piston mechanism, it can be scaled arbitrarily from perhaps 100 watts to 10 MW. Larger units will have a lower per-ton cost.

Near-isothermal compression to about 8 atmospheres may be demonstrated. We anticipate the stages that follow may include:

1. Demonstrate both near-isothermal air compression and expansion at low pressure (ca. 10 atmospheres), which, taken together enable low-density energy storage
2. Demonstrate near isothermal compression and expansion at high pressures (ca. 200 atmospheres). This enables very generally applicable energy storage.
3. Demonstrate an integrated system that includes an open accumulator to improve efficiency and composite air tanks to lower costs.
4. Develop a custom engine block and other components designed specifically for cost-effective implementation of the technology demonstrated in 3, above.
5. Fabricate tooling for the components developed in 4, above, and establish a pilot production facility.
6. Build an initial run of pilot energy storage units and deploy them in test facilities.
7. Tool for full production The first three phases described above are those being proposed here and correspond roughly to years 1, 2, and 3 of the project. If the project's targets are met, the capabilities of the technology will be fully ready for commercial development: The project's final prototype deliverable will be capable of taking electricity in from the grid, storing it indefinitely in air tanks that are fully able to meet applicable safety codes, then delivering the stored electricity to grid standards. This is the basic capability required for many existing energy storage applications (e.g. demand shifting for buildings and frequency regulation).

Phase 4 is the first step taken specifically for commercialization. This is largely a manufacturing engineering phase focused on cost and quality engineering. We expect the first product to be 100 kW scale—the scale we are prototyping here. Such a system would have many applications at industrial scale (demand shifting for buildings, back-up power, "islanding" at substations, storage for large photo-voltaic arrays, etc.)

The investment required to bring the first product to market would mostly be to cover the cost of tooling, pilot production inventory, pilot testing, tooling upgrades for small-scale production, and initial production inventory. The expectation is that some purchase orders would already be in hand before full production commences, which would facilitate conventional financing for inventory and accounts receivable. Venture capital investment would be the most likely source of capital for tooling and pilot production. That is likely to be comparable to the cost of tooling a small engine, perhaps $25M to $50M.

While the above embodiments have described the introduction of liquid for heat exchange through the spraying of liquid droplets, the present invention is not limited to this approach. According to certain embodiments, liquid could be introduced in one or more stages by bubbling gas through the liquid, for example utilizing a bubbler or sparger. Such liquid introduction utilizing bubbling may be particularly favored at high pressures, where homogenous interaction between liquid droplets and gas leading to uniform heat exchange may be difficult to achieve.

And while embodiments previously described have discussed cooling utilizing a cycle in which a refrigerant remains in the gas phase, the present invention is also not limited to such approaches. Cooling according to some embodiments of the present invention could employ a cycle in which a phase of the refrigerant does change from liquid to gas and then back again.

Figure 82:
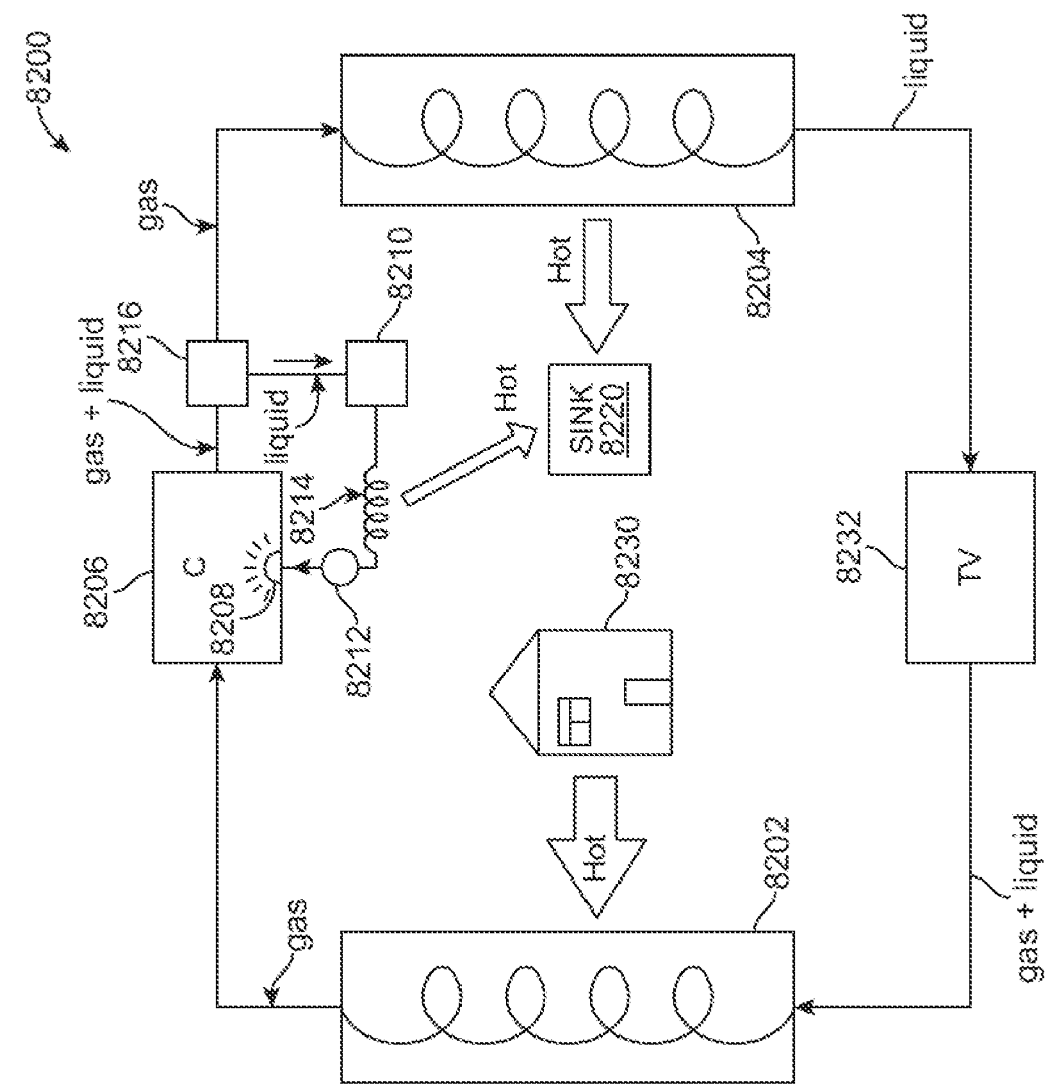
FIG. 82 is a simplified view of a cooling system according to an embodiment of the present invention which utilizes a phase change of a refrigerant.

For example, FIG. 82 shows a highly simplified view of an alternative embodiment of a cooling system according to the present invention. System 8200 utilizes as a refrigerant, a material that is configured to change phase from liquid to gas, and then back to a liquid. As described below, change of phase by the refrigerant serves to absorb and remove heat for cooling in an evaporator 8202, and then later to release this absorbed heat in a condensor 8204.

The circulating refrigerant enters the compressor (C) 8206 as a gas, where it is compressed to a higher pressure. According to embodiments of the present invention, a lower temperature liquid may be introduced to the gas during this compression, through sprayer 8208 (or bubbler) that is in fluid communication with reservoir 8210 through pump 8212 and heat exchanger 8214. This introduced liquid serves to perform heat exchange with the compressed gas, reducing the temperature change of the gas and improving thermodynamic efficiency as discussed in detail above.

The liquid that is introduced may, or may not, be the same as the refrigerant itself. A listing of liquids that may be suitable for introduction according to various embodiments of the present invention, is provided elsewhere in this document.

After compression, the introduced liquid is separated from the compressed gas using a liquid-gas separator 8216, which may be of any of the particular designs described above. This separated liquid is then flowed to the reservoir 8210.

The separated compressed gas is then flowed to condensor 8204, where it exchanges heat with and is cooled by exposure to a thermal sink 8220, thereby changing into the liquid phase. Heat from the condensed liquid is carried away by the thermal sink.

The condensed liquid refrigerant then flows through a throttle valve (TV) 8232 where it undergoes a rapid pressure decrease. That reduction in pressure causes evaporation of some portion of the liquid refrigerant, resulting in a gas and liquid mixture. This evaporation lowers the temperature of the gas/liquid mixture below that of the desired cooling temperature.

The cold gas/liquid mixture is then routed to the evaporator 8202. Heat (typically in the form of air) from the user 8230 (here shown simplistically as a dwelling) interacts with the cold gas/liquid mixture. Heat of the air from the user evaporates the liquid component of the cold refrigerant mixture, and is thereby cooled.

Finally, refrigerant gas from the evaporator is flowed back into the compressor, and the cycle begins anew.

Introduction of liquid to perform heat exchange during compression in the refrigeration cycle shown in FIG. 82, serves to perform compression more efficiently by compressing more nearly isothermally. This increased efficiency improves the COP (coefficient of performance) substantially.

Embodiments of the present invention relate to compressed gas energy storage systems exhibiting one or more desirable characteristics. Such systems may be efficient (80% round-trip), cost-effective (system cost <$100 kWh), quickly rampable (<10 minutes) energy storage clearly represents a transformational technology. Particular embodiments may use water sprays to facilitate heat transfer at high pressures during compression and expansion.

Efficient, cost-effective energy storage technology according to embodiments of the present invention uses compressed air as the storage medium. Unlike existing compressed air energy storage technology (CAES), embodiments of the present invention can be sited anywhere, are highly efficient, and need no fossil fuels to operate.

Embodiments according to the present invention offer the ability to compress and expand air nearly isothermally. Isothermal operation greatly improves efficiency, but it has proven difficult to achieve previously, particularly at high power densities. Embodiments of the present invention inject a water spray directly into the compressing or expanding air. This absorbs the heat of compression, reducing the required work (and adds heat during expansion, increasing the work retrieved). A near-constant operating temperature allows operation at higher compression ratios and higher speeds, lowering costs; and it eliminates the need to burn fossil fuels during expansion.

Though conceptually simple, water-spray facilitated heat transfer represents a significant engineering challenge—particularly at high pressures. Embodiments in accordance with the present invention may transfer heat out of a compression chamber (and into the expansion chamber) at rates up to ten times higher than have ever been reported in the scientific literature.

Embodiments according to the present invention relate to practical utility-scale energy storage that uses compressed air as the storage medium. Our proposed technology can be sited anywhere, is highly efficient, and needs no fossil fuels to operate.

A focus of embodiments according to the present invention is the ability to compress and expand air nearly isothermally. Isothermal compression greatly improves efficiency, but it has proven difficult to achieve, particularly at high power densities. One approach according to embodiments of the present invention is to spray water droplets directly into the compression and expansion chambers to facilitate heat exchange.

Several tasks are employed to demonstrate this technology at a commercial scale. Analysis and modeling can be used to refine and extend mathematical models of the thermodynamic, mechanical, acoustic, and hydraulic processes occurring in the system.

The fluid dynamics of water sprays can also be modeled. Examples include flow through nozzles, droplet breakup, collisions with the cylinder walls, and two-phase flow with air.

Development of a compressor can proceed as follows. A 100 kW-scale gas compressor can be modified to operate reversibly as an expander and integrate water-spray facilitated heat transfer. A single stage may be prototyped at low pressure (300 psi), then add a second stage to reach 3000 psi or higher. A pre-mixing chamber and custom valves for the second stage may be designed to enable high volume fraction of water at high pressures.

Existing Grid-Scale Energy Storage Technology

Grid energy storage is dominated today by two technologies, pumped hydro and compressed air (CAES). These technologies operate via the transport or compression of two fluids: air and water. Air and water will always be extremely inexpensive. A challenge is in making the systems that use them efficient, scalable, and flexible.

Embodiments in accordance with the present invention relate to energy storage technology that uses compressed air as the storage medium. Research reports have concluded that compressed air offers the best opportunity for cost-effective grid-scale energy storage—and perhaps the only viable path to meeting the aggressive cost targets specified by the FOA (<$100/kWh).

Existing compressed air energy storage (CAES) uses a compressor turbine, operated by an electric motor, to compress air. In the systems implemented to date, the compressed air is stored underground in a salt dome until it is needed. The compressed air is used to operate an expansion turbine during power delivery.

However, because the air cools so much during expansion, limiting the amount of energy that can be obtained, natural gas is burned to heat the air stream before it enters the expansion turbine. This is essentially a natural gas combustion turbine operated with a time delay between compression and expansion.

Although two CAES systems are in operation, they have not proven to be popular technology due to expense and efficiency considerations, and the requirement of fossil fuel combustion to operate.

Near-Isothermal Compressed Air Energy Storage

Several projects are underway that propose to address the disadvantages of existing CAES systems. The objective is to develop compressed air energy storage that delivers power exclusively from air expansion without the need for supplementation with fossil fuel combustion.

This new compressed air technology uses near-isothermal (rather than adiabatic) compression and expansion. It is a basic result in thermodynamics (see the Preliminary Results section below) that less work is required to compress a gas if the heat generated during compression is removed from the system during the compression stroke. Similarly, if heat is added during expansion, more power will be generated.

If the temperature is kept constant during operation, the efficiency of energy storage can, in theory, approach 100%. In fact, there are many sources of possible losses—friction, pressure drops, electrical-mechanical conversion losses, etc. Nevertheless, a round-trip efficiency approaching 80% may be achievable.

There are several approaches to achieving near-isothermal performance, with heat transferred out of the compression chamber during compression and added during expansion. This can be done by operating very slowly, so that there is time for the heat to conduct through the walls of the chamber. Such a system may have difficulty scaling, and may run slowly, limiting the system's power density (and therefore increasing its cost).

Alternatively, a heat exchanger can be incorporated into the compression chamber, and this approach has been used by Lemofouet, S., "Energy Autonomy and Efficiency through Hydro-Pneumatic Storage", http://www.petitsdejeuners-vaud.ch/fileadmin/user_upload/Petits_dejeuners/EnAirys_Powertech_20081121.pdf.

Water-Spray Mechanism for Near-Isothermal Air Compression and Expansion

Embodiments according to the present invention may take yet a different approach. Specifically, a liquid with high heat capacity (such as water) is sprayed into the air during compression and expansion. Because the water can absorb so much more heat per unit volume than the air, a small amount is sufficient to keep the process near-isothermal. And because water sprays provide such a large surface area for heat exchange, large amounts of heat can be transferred very quickly.

Such liquid injection according to embodiments of the present invention, will allow the compressor/expander mechanism to run at high RPM's. The faster the system runs, the more power it can deliver for a given system cost.

Mechanical components should be capable of high-speed operation in order to take full advantage of the heat transfer capabilities of water sprays. However, previous known technology for near-isothermal air compression uses hydraulic cylinders and a hydraulic motor/pump to deliver power. Use of hydraulics, though simple to prototype, significantly limits the speed of operation. At the scale of interest here, a mechanical system—for example using reciprocating pistons and a crankshaft according to embodiments of the present invention—can operate much faster than a hydraulic circuit.

The problem of water-spray facilitated heat exchange gets harder at high pressures, however—and high pressures may be important to obtain high efficiency and a small air-storage footprint. Accordingly, embodiments of the present invention may use a higher volume fraction of water-to-air than has been reported to date in the scientific literature in order to keep compression near-isothermal at a target pressure of 200 atmospheres. This may involve the design of specialized nozzles, valves, and spray manifolds to achieve spray density and uniformity.

Embodiments of the present invention may use reciprocating mechanical pistons, much like an automobile engine. Mechanical piston designs employing a crankshaft, bearings, and a lubrication system, may be more difficult to engineer than hydraulic designs. However, for this application, embodiments according to the present invention may achieve ten times the operating speed of hydraulics for the same displacement. Such systems can therefore deliver considerably more power for a comparable cost; air compressors and automotive engines use reciprocating pistons rather than hydraulics for this reason. The added complexity of a reciprocating mechanism allows leveraging full advantage of the heat transfer capabilities of water spray.

Embodiments of the present invention may relate to an efficient energy storage system that can ramp up quickly (for example 1 minute or less) and deliver over 20 kW of power for at least an hour. A prototype system is a commercial reciprocating compressor, modified to operate near-isothermally at pressures of up to 200 atmospheres. Conventional compressors typically operate at lower pressures (about 3.5 atmospheres).

Compressor/Expander

In order to create a thermodynamic model for the entire air compression/expansion process (LSE), the current model described in the Preliminary Results section below, may be modified to include effects of water vapor, continuous spray, boundary layer, and turbulent mixing effects. Closed-form bounds for the system behavior are be found, and then numerical methods may be used to determine detailed values for specific configurations and operating conditions.

In order to model water spray behavior in a cylinder with a moving piston at high pressures using computational flow dynamics (CFD), new nozzle designs (for example as described in the Preliminary Results section below) may be modeled using CFD to improve the spray density and uniformity. CFD analysis has proven useful in determining the most productive design avenues to pursue.

Nozzle manifolds in cylinder models may be modeled across the range of bore/stroke ratio and pressures of interest. Models of spray systems at high pressures—100 atmospheres and above—may be of particular value to reflect high spray densities that are to be achieved.

A separate set of CFD models can be run to simulate the flow in and out of valves. Optimizing valve flow may improve volumetric efficiency. Another consideration in valve design is to ensure that water droplets sprayed into the air stream in a pre-mixing chamber remain entrained with the air as the mixture passes through the valve orifice.

Some modeling indicates that piston motion and splashing effects may be relevant. These can be further developed, particularly at high pressures. The modeling described above can be performed, for example, using the ANSYS Fluent software package.

A spray system capable of creating a highly uniform volume fraction of water near 10% at 200+ atmospheres pressure is under development. High-pressure cylinders have small bores, so that the direct-injection design used for the low-pressure cylinders (where the nozzles spray directly into the cylinder) is likely to be impractical—there won't be room for the number of nozzles required.

A pre-mixing chamber upstream of the cylinder may be used. In such a mixing chamber, the appropriate volume fraction of water to air is generated, then passed through an intake valve to the cylinder. CFD can be used to design an effective chamber geometry and nozzle distribution.

A high flow-coefficient valve capable of allowing a dense air-water aerosol to pass through, is being developed. As mentioned above, the challenge is to move a dense air-water droplet mixture from the pre-mixing chamber into the cylinder while keeping the droplets in suspension.

Various valve geometries are possible. One is a rotating valve with a large cylindrical orifice that doesn't require the flow to change direction. A second geometry utilizes a port, or group of ports, in the cylinder wall, as can be found in many two-stroke engines.

In the second arrangement, the piston itself opens and closes the valve as it travels. One challenge with the port geometry may be to is to make it work for both compression (where the ports may be located just above the top of the piston at bottom dead center) and expansion (where the ports may be located near top dead center).

Certain embodiment may use liquid water to manage the dead volume in a cylinder. Near-isothermal compression and expansion allow high compression ratios to be achieved without the large temperature changes that would make such ratios impractical. However, a high compression or expansion ratio may be difficult to achieve unless the dead volume (the portion of the cylinder volume that remains uncovered when the piston is at top dead center) is too large.

In a conventional gas compressor, for example, the dead volume is 25%, limiting the compression ratio to four.

Embodiments according to the present invention may achieve a compression ratio as high as 20 or more. This could be achieved using carefully designed piston/cylinder/valve assembly and/or by the use of water fill much of the dead space.

With the latter, the method by which just the right volume of water is maintained in the cylinder during operation may be hard to achieve. Solving this problem may involve modeling and experimentation with valve design and feedback-based control.

Embodiments of the present invention may seek to exercise optimal control of water spray in air compressor/expander. The performance (efficiency and power) of the compressor/expander may depend on timing and amount of water spray.

In general, the more water that is sprayed the better it is able to isothermalize the compression/expansion. However, water spray also incurs a cost (e.g. pressure drop).

It therefore may be useful to determine a strategy to inject the least amount of water while satisfying the goal of isothermalizing the process. An analytical model that can provide sufficient accuracy in order to determine the optimal timing and amount may not be readily available. Learning control approaches may be utilized, in which through repeated experiment, an optimal control strategy will be attained. Formally, such approaches are termed self-optimizing control or extremum seeking approaches.

Embodiments of the present invention may integrate a spray system, valves, dead-volume management system, and the spray control optimization, into a single-cylinder compressor/expander capable of a high compression ratio. A single cylinder may be configured to operate as a compressor or expander at 10 to 20 atmospheres or higher with a controllable ΔT. System performance may be characterized and compared with the analytical model.

Certain embodiments may utilize a multi-stage compressor capable of >100 atmospheres pressure. In certain embodiments the compressor/expander may be configured to work with two cylinders. According to some embodiments, the water spray system may use a higher pressure of the second stage to pump water spray through the nozzles of the lower-pressure cylinder. The heat exchanger system may be configured to support the cylinders and manage the spray system to maintain equal ΔT's in both stages.

Preliminary Results

Near-Isothermal Compression and Expansion

Air is an inexpensive storage medium. Rapid heat transfer can allow efficient energy storage. Water, sprayed finely, densely and uniformly, would allow heat transfer better than anything tried before.

Water has a greater volumetric heat capacity than air (more than 3200×). So even a small volume of water suspended as spray in the compressing air, could absorb tremendous amounts of heat of compression and likewise supply heat for expansion, without undergoing a significant temperature change.

A detailed analytical and numerical thermodynamic analysis (see below) yielded analytical upper and lower bounds for thermodynamic performance. A numerical simulation verified those bounds.

Efficient expansion of air can be achieved utilizing various approaches. While the injection of water spray could improve heat transfer, existing air motors cause significant 'free' expansion, which wastes the energy stored without doing any useful work.

Accordingly, certain embodiments of the present invention may utilize a 'controlled pulse' valve timing strategy that would recover that efficiency. This valve timing strategy would open the valves at the beginning of the expansion process for a specified time and then close the valves. This would admit enough air such that when expansion completed, the internal pressure is equal to the pressure of the lower stage or atmosphere, and all available energy extracted.

To demonstrate that: (a) a 'controlled pulse' valve strategy would avoid inefficiencies due to free expansion and (b) near-isothermal compression and expansion are both possible and allow efficient energy storage, a small prototype was built using the fluid piston concept. Air was displaced by a hydraulic fluid instead of a piston, without attempting to spray fluid into the air. A drive, controller board, and pressure cells were homebuilt. Using solenoid valves, a hydraulic motor, and a gallon of vegetable oil for the hydraulic fluid, an air motor was built that demonstrated thermodynamic efficiency at 88% of a perfect isothermal system.

Components, costs, and parasitic losses throughout this prototype system were hunted down and eliminated where possible. For example, it was recognized that a liquid piston or other hydraulic system would struggle to achieve high energy densities, low costs, and high efficiencies. High energy densities necessitate high RPMs, but the momentum and friction of liquid moving around so rapidly may make it difficult to build a stable, robust, efficient system. The fluid friction associated with moving such a significant amount of liquid around would reduce efficiency by a significant amount—by some estimates more than 5% each way.

In addition, during the compression and expansion the pressure could change, moving the hydraulic motor/pump continually off of its maximum efficiency point. Based upon available efficiency curves, efficiency could be reduced by, again, more than 5% each way.

Accordingly, mechanical approaches to compression and expansion may be favored, for example using a reciprocating piston in a cylinder.

Water spray could alleviate traditional technical problems, cooling all of the surfaces, reducing wear on sliding components. For example, a leading manufacturer makes compressors that cannot have a compression ratio exceeding 3.5: the high temperatures created would stress the materials too far. This limitation is avoided with the use of water spraying.

Additionally, water could access hard-to-reach crevices of the cylinder head and valve assemblies, taking up the 'dead-volume' that reduces the volumetric efficiency and compression ratio of compressors and engines. For example, with traditional reciprocating technology, it would take 4 stages to compress air at one atmosphere to 200 atmospheres. Embodiments according to the present invention may be able to achieve this in two stages.

Cost and inefficiency of variable frequency drives are another possible source of improvement. A synchronous motor generator with load control could instead be used, and on the compressor/expander control the valve pulse length. Such an approach could trade off some efficiency in exchange for increased or decreased power in real time.

In certain embodiments, the spray system may meet the following performance criteria: it may generate small droplets (<100 micron) at a relatively short breakup length, with a relatively low pressure delta (<50 psi), and at relatively high flow rates (~100 cc/s). The spray system may produce a relatively uniform spray inside the cylinder. The spray nozzle design may introduce small or zero dead volume, be relatively easy to manufacture, and eliminate/reduce cavitation effects.

Nozzles are known that can eject streams of water requiring a low pressure delta. Other nozzle designs are known that can eject very fine mist at a high pressure delta. However, no nozzles known appears to be able to match desired parameters.

Thus, embodiments in accordance with the present invention may utilize novel nozzle designs. FIG. 79 shows a model of jet breakup from a two-dimensional CFD simulation. Red regions are for liquid and blue for air.

FIG. 80 shows CFD simulation of water spray emitted from a nozzle design. Red color indicates completely liquid and blue indicates air. FIG. 80 shows CFD simulation of water spray emitted from pyramid nozzle developed by LSE. Red color indicates liquid spray and blue indicates air. FIG. 81*a* shows liquid sheet breakup & atomization from an embodiment of a nozzle. FIG. 81*b* shows droplet size distribution from an embodiment of a nozzle.

Nozzle designs in accordance with embodiments of the present invention may exhibit desirable characteristics. Nozzle designs can atomize water droplets to less than 100 microns, with a pressure drop of only 50 psi, and with a high flow rate (100 cc/s) and a short breakup length (~1 inch) that is small enough to fit in our cylinder and simple enough to replicate reliably and inexpensively.

Combination of nozzle models with a model of compression/expansion cylinder and valves, yields a full CFD model of the entire compression/expansion process. This has been used to model droplets splashing against the wall through a thin sheet of water on the surface, the mesh dynamically deforming as the piston moves and the valves open and close, and incorporating a model of the effects of droplets crowded close together, taking up an extremely high fraction of the volume available to it.

Simulation of a system with a displacement of a compression ratio of 9, and stroke taking a mere $20^{th}$ of a second, indicates that the average temperature of the gas without water spray would go from 300 K to 570 K. By contrast, the temperature rise in the presence of a spray of 200 micron droplets at 0.4 liters per second (20 cc's per stroke).

Figure 83:
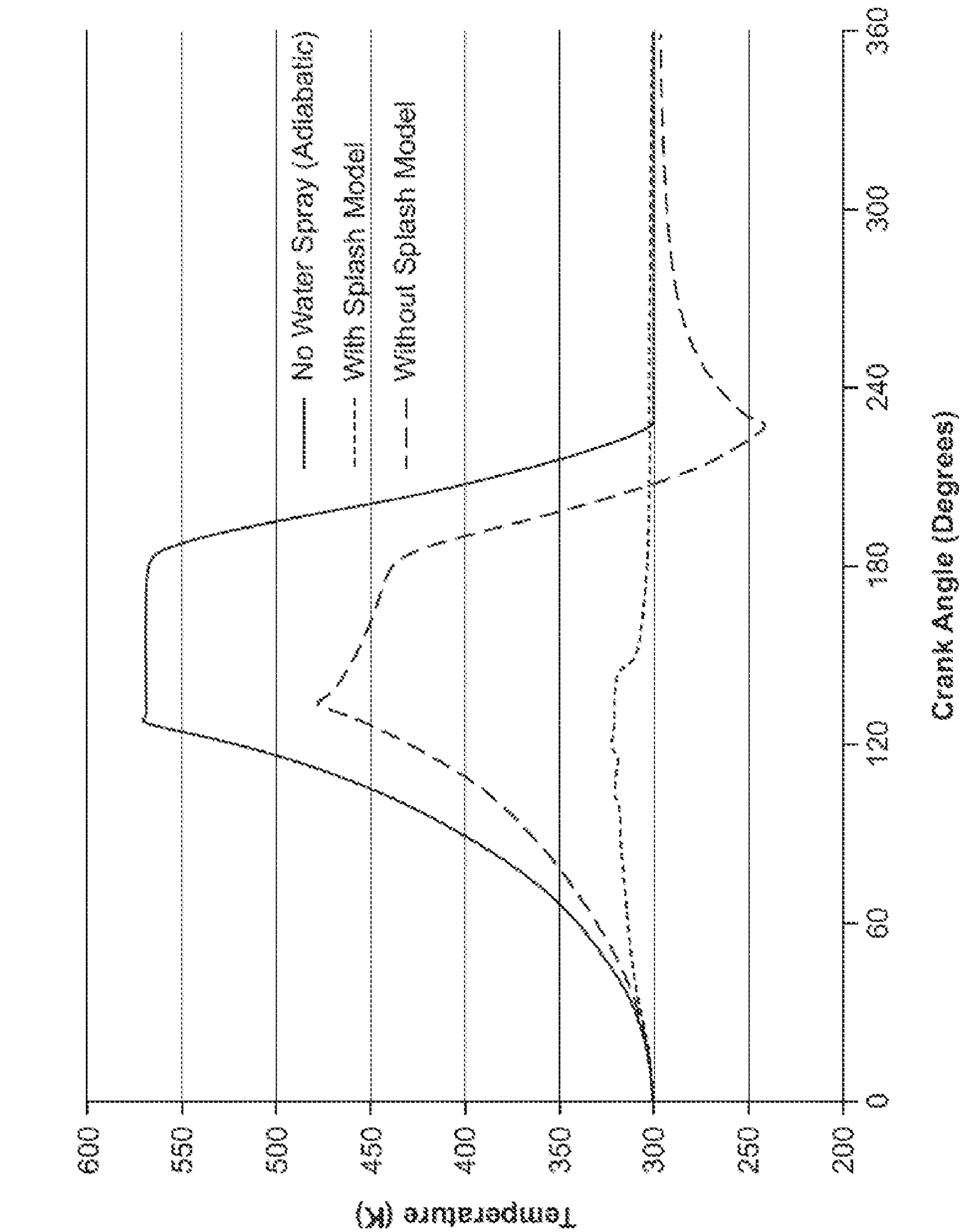
FIG. 83 indicates the mass-average air temperature in cylinder (K) versus crank rotation from CFD simulations with and without splash model.

FIG. 83 indicates the mass-average air temperature in cylinder (K) versus crank rotation from CFD simulations with and without splash model. FIG. 77 indicates the temperature (K) immediately preceding opening of exhaust valve.

A thermodynamic analysis proceeded in three parts. First, the thermal behavior of a compression or expansion process was calculated, where the water was in perfect thermal equilibrium with the air, heat transfer between the mixture and the environment was negligible, and the temperatures were low enough that the saturation vapor pressure was also low, so phase-change could be neglected. The process was similar to an adiabatic compression or expansion process, with no thermal exchange between the environment and the mixture. However, the presence of water, in intimate thermal contact with the air, increases the 'effective' heat capacity per mole of air.

In adiabatic compression or expansion of an ideal gas, the process obeys:

$pV^{\gamma}$=constant, where:

$$\gamma = \frac{c_p}{c_v} = \frac{c_v + R}{c_v},$$

$c_p$ and $c_v$ are the molar heat capacities at constant pressure and volume, and where R is the molar gas constant.

Additionally, since pV=nRT, the temperature is given by:

$$T_{final} = T_{initial}\left(\frac{V_{initial}}{V_{final}}\right)^{\gamma-1}$$

This is true for compression or expansion of an air and water mixture, except that γ is replaced by:

$$\gamma_{effective} = \frac{c_{v,effective} + R}{c_{v,effective}},$$

$c_{v,effective}$ is the total heat capacity of the gas and liquid at constant volume per mole of gas.

As the water spray increases in proportion, $c_{v,effective}$ increases, and $\gamma_{effective}$ approaches. Hence, by the expression for temperature given above, the temperature throughout the process becomes nearly constant.

A second part of the thermodynamic analysis, extended the above analytical result to account for the fact that droplets and air will not instantaneously come into thermal equilibrium. First, an equation for the maximum shaft power in or out during the process was determined. This allows finding an equation for the maximum temperature difference between the water and air ever attained during the process.

This in turn allows creation of a bounding process which can be shown to slightly overestimate the temperature change during compression or expansion. This bounding process also slightly overestimates the work required for compression, and underestimates the work done during expansion. The air and water are assumed to be continuously in thermal equilibrium, already warmed or cooled from their initial state by the maximum temperature difference attained.

This process then proceeds as the equilibrium process described above. These values depend on one another, but can be solved algebraically. This work gives us an analytical bound and scaling law on the ΔT attained during the compression and expansion process, and a lower bound on the thermodynamic efficiency.

Embodiments of systems according to the present invention may offer certain desirable properties as compared to other energy storage systems. For example, unlike batteries, cycle life of an air compressor is indefinite.

The cost of a compressed-air energy storage (CAES) system is the sum of two costs: that of the compression/expansion mechanism (a per kW cost, since this mechanism generates power), and that of the air storage system (a per kWh cost, since it stores energy). Embodiments of the present invention may target a cost of $400/kW and $80/kWh installed cost (assuming underground storage is not available). For a system with 12 hours of storage, the cost could be thought of as $113/kWh. However, a system with 26 hours of storage (the storage duration of the Macintosh, Ala. CAES plant) would cost only $95/kWh.

Reciprocating engines are a mature technology. Truck diesel engines typically cost about $100/kW. To that cost (assuming a comparable power density) a motor-generator, power electronics, and other components would be included. Meeting a $400/kW target is quite achievable for high-volume production.

Conventional steel tanks capable of storing air at 200 atmospheres cost about $125/kWh (including a valve). To this should be added the cost of a manifold, connecting hoses, an enclosure, gauges, and connectors. In addition, extra capacity is needed to account for any inefficiency in delivering power from the compressed air. If the one-way efficiency is 90%, about 1.1 kWh of storage capacity can deliver 1.0 kWh. A cost of $150/kWh may be likely for off-the-shelf technology.

If tanks are made 16 meters long, instead of their usual 1.6 meters, the cost of spinning the tank closed may be reduced, along with the cost of valves and hoses. Starting with natural gas pipeline pipe or well-casing pipe is another possible approach.

The operating time at rated power can be extended indefinitely by adding more storage tanks Enough tanks may be added to run for at least one hour (that is, about 100 kWh of total storage).

Embodiments according to the present invention may also offer a long cycle life. As a compressed air energy storage system is mechanical, not electrochemical, its performance doesn't degrade in the same way that batteries do. Properly maintained, gas compressors can run continuously for 30 years (11,000 diurnal cycles).

Embodiments according to the present invention may also offer high round-trip efficiency. Conventional CAES systems are just over 50% efficient. 80% round-trip efficiency is theoretically possible for an isothermal system. 75% efficiency under normal operation may be a more realistic target. 90% or more efficiency may be achievable if low-grade heat (such as waste heat) is available.

Efficiency in current CAES systems is limited because the heat of compression is lost. Near-isothermal operation will give thermal efficiency of close to 100%.

However, there are a number of parasitic losses that can be minimized. Examples of such parasitic losses include but are not limited to: volumetric losses (the ability to fill the cylinder with air during the intake stroke and empty it during the exhaust stroke); motor/generator efficiency; the power used to spray water into the cylinder; the heat exchanger fan; and friction. For instance, for volumetric efficiency the proper volume of water to fill most of the dead volume in the cylinder, should be maintained.

Regarding dwell time, changing from charge to discharge mode is a matter of switching the state of several valves. The engine continues rotating in the same direction. This should happen almost instantaneously.

Regarding scalability, in an embodiment a system may be on a frame that can operate at about 1 MW when all four cylinders are attached. Operation may initially be at 100 kW, but can scale up once the basic targets have been achieved.

One potential technical challenge associated with scaling up involves efficient operation at high pressures: 3000+psi may be desirable to reduce storage footprint and cost. Maintaining a high-enough volume fraction of water at those pressures is an objective.

Still another potential benefit offered by embodiments according to the present invention is a reduction of internal losses. Specifically, existing CAES systems store compressed air underground. Depending on the type of geology used, losses can be significant. For above-ground storage in steel or composite tanks, there is, for practical purposes, zero loss in energy stored over an arbitrarily long time period.

Regarding safety, the mechanical components and pressure vessels can be fully compliant with the appropriate engineering codes. Moreover, in many embodiments the system uses no toxic substances, just air and water.

Embodiments of the present invention may last 30 years or more, typical of heavy-duty reciprocating gas compressors. As with any engine, regular maintenance is required. Piston rings, packing, filters, and lubricating oil will require periodic replacement.

Use of water in the cylinders offer a source of corrosion. Certain coatings such as DLC, nickel/polymer, and other materials may provide long-term protection against corrosion.

As previously described, the compressed gas residing in a storage unit may serve purposes in addition to energy storage. For example, as described above, in certain embodiments the compressed gas could perform a physical support function, with forces exerted by the compressed gas serving to maintain the shape and integrity of an inflated structure. Examples of such inflated structures include but are not limited to building elements such as pillars, walls, and roofs, and/or floating members such as pontoons, buoys, barges, or vessel hulls.

As also described above, the structure of an inflatable support member that is configured to store compressed gas, may be designed to take maximum advantage of inflation forces offered by the compressed gas. One example of such a structure is described by Mauro Pedretti in "TENSAIRITY®", European Congress on Computational Methods in Applied Sciences and Engineering (ECCOMAS 2004), incorporated by reference herein for all purposes. TENSAIRITY® describes a light weight structural concept using low pressure air to stabilize compression elements against buckling.

Such an approach may allow the inclusion or arrangement of additional compression members to oppose loads from other directions. In certain embodiments a fiber may be arranged in a spiral about an inflated member, with endcaps used. Such a configuration provides resistance to internal pressure, resistance to expansion buckling modes, and/or distribution of forces to/from compression expansion members.

In certain embodiments, the shape, material composition, and/or position of the compressed gas storage unit, may be selected at least in part based upon its role to provide physical support. In certain embodiments, the additional stabilizing force offered by compressed gas may allow the relaxation of certain tolerances in a supporting member.

For example, returning again to the example of a wind turbine support structure configured as a compressed gas storage unit, forces exerted by the compressed gas could allow the walls of the tower to be thinner. This in turn could have a cumulative effect to reduce the overall weight and cost of the structure, because a significant proportion of the material in such a tower may be dedicated to supporting the tower itself, rather than bearing the load of the wind turbine.

The design of an inflatable supporting structure could also take into account potential failure modes. For example, a significant amount of the overall strength of a wind turbine support tower may be devoted to providing sufficient force to oppose the torque of the spinning blades. In the event of a problem potentially leading to the loss of compressed gas, rotation of the turbine could be rapidly halted, thereby alleviating the need for the support structure to resist this torque. Of course, even in an uninflated state the support tower may be required to provide sufficient force to bear the weight of the turbine, and to oppose drag forces offered by the non-rotating turbine to prevailing winds.

Certain embodiments of the present invention relate to liquid spray nozzles which may inject liquid into a gas within a compression or expansion chamber. According to some embodiments, the liquid spray nozzle is formed by selective and precise removal of material from a single piece, forming a velocity elevation region in fluid communication with a narrow fan-shaped output slot. A liquid spray nozzle of certain embodiments may be defined between recesses in opposing facing surfaces of two or more pieces in mating engagement with one another. By affording access to opposing surfaces prior to their mating, such multi-piece embodiments may facilitate precise definition of interior shapes, for example by machining FIG. 89 shows a simplified cross-sectional view of the space defining a liquid injection sprayer according to an embodiment of the present invention. The space 8902 comprises a deep region 8904 having an inlet 8904*a* in fluid communication with a pressurized source 8906 of liquid, for example a manifold or a liquid flow valve. Deep region 8904 may be in the form of a cylinder having a circular cross-section, or may be a modified cylinder having a cross-section of another shape.

A second end 8904*b* of the deep region 8904 opens to a velocity enhancing region 8908 of varying depth, that terminates short of the space (chamber) 8910 that is configured to receive the injected liquid. A shallow fan-shaped slot region 8912 extends from the second end 8904*b* of the deep region 8904, through the velocity-enhancing region 8908 to an reach an outlet 8912*a* opening to the space 8910 into which the liquid is to be injected, for example a gas compression/expansion chamber. In the particular embodiment shown in FIG. 89, the sides of the fan-shaped slot region define an angle of 120° relative to one another, although this or any other particular angular relationship is not required by the present invention.

The arrows of FIG. 89 show a generalized depiction of the path of liquid flowed through the space. Pressurized liquid enters the inlet 8904*a* to the cylindrical region in a relatively straight flow path. The liquid then undergoes an increase in velocity as the flowing liquid experiences constriction in the reduced cross-sectional area of the region 8912, and finally is ejected in a fan-shaped trajectory as the pressurized liquid passes through the fan-shaped slot region 8912. The shape of region 8908 serves to change the velocity vectors of the liquid to be substantially perpendicular to the boundary between regions 8908 and 8912.

In certain embodiments, the spaces defining the liquid injection nozzle may be formed from a single piece of material, for example metal. FIG. 90A shows a simplified end view from the inlet side, of one embodiment fabricated from a single piece of material. FIG. 90B shows a simplified cross-sectional view taken along line 90B-90B' of FIG. 90A. FIG. 90C shows a simplified end view from the outlet side of the nozzle.

The embodiment of the nozzle 9000 of FIG. 90A comprises a first inlet portion 9002 configured to receive the flow of liquid into the nozzle. In certain embodiments, this first inlet portion may readily be formed by machining a block of metal utilizing a drill bit or end mill having a diameter D.

The first inlet portion 9002 is in turn in communication with a middle portion 9004, which corresponds to the deep portion described in connection with FIG. 89. The middle portion opens to a direction changing portion 9006, which can be hemispherically shaped and a velocity elevating portion 9008.

In certain embodiments, the middle portion and the direction changing portion may readily be formed at the same time, by machining a block of metal utilizing a ball end mill having a diameter D' that is inserted into the inlet side and stops short of reaching the outlet side of the block.

Finally, the middle portion 9004 and the direction changing portion 9006 are in fluid communication with the outlet through a narrow slot region 9008. Narrow slot region 9008 may readily be formed by machining the block of metal from the outlet side. In certain embodiments, the narrow slot region could be fabricated utilizing a slitting saw having a blade with a radius r and thickness t.

Embodiments according to the present invention are not limited to the particular shape shown in FIGS. 90A-90C. For example, while the slot portion is shown as extending at an angle parallel to the lengthwise axis A defined by the portions 9002 and 9004, this is not required.

Figure 91A:
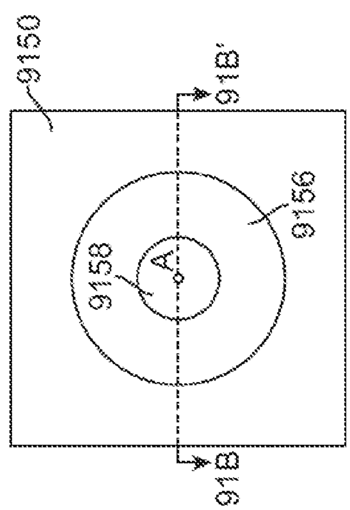
Figure 91B:
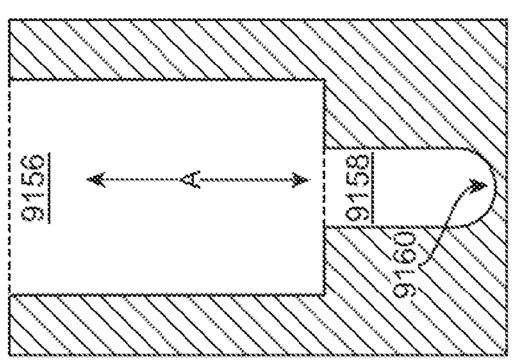
Figure 91C:
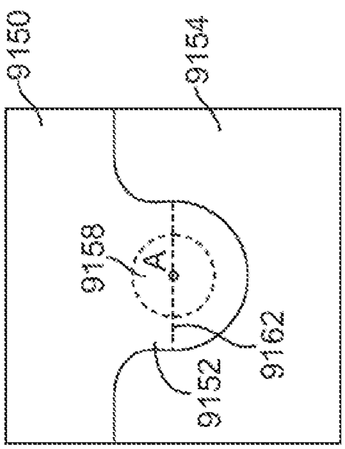
Figure 91D:
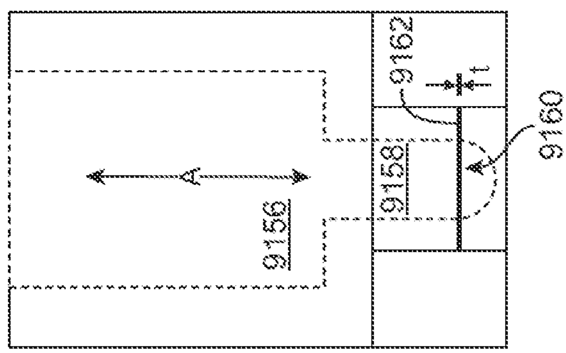
Figure 91E:
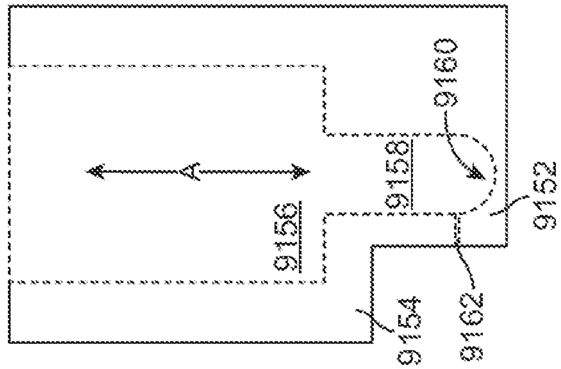

FIGS. 91A-91E show different simplified views of an alternative embodiment, wherein the slot is formed perpendicular to the axis of the inlet and middle portions. FIG. 91A shows a simplified end view from the perspective of the inlet. FIG. 91B shows a simplified cross-section taken along line 91B-91B' of FIG. 91A. FIG. 91C shows a simplified view from an end opposite that of FIG. 91A. FIG. 91D shows a side view from the perspective of the outlet. FIG. 91E shows another side view.

In particular, the alternative embodiment of FIGS. 91A-91E features a nozzle that is formed by milling a block of material 9150 that has been shaped to include a narrower head portion 9152 and a broader body portion 9154. The body portion contains the entirety of the inlet space 9156, and a part of the middle space 9158. The head portion contains the remainder of the middle space 9158 and a direction changing space 9160 and the narrow outlet slot 9162.

The nozzle design of FIGS. 91A-91E can be fabricated by forming the inlet space and the middle space utilizing the milling techniques described above in connection with FIGS. 90A-90C. The slot can be formed by milling the side of the exposed head portion, again for example utilizing a slitting saw having a thickness t as shown in FIG. 91D. While the drawings show the slot cut through a diameter of middle space 9158, this is not required, and the slot may be cut shallower or more deeply.

While this particular embodiment shows the slot as being cut at a 90° angle relative to the axis A, this is not required. In certain embodiments, the angle of the outlet slot could be inclined at other than 90°. This could be accomplished by determining an orientation of the piece relative to the tool at the time of formation of the slot.

Figures 92A, 92B, 92C, 92D, 92E:
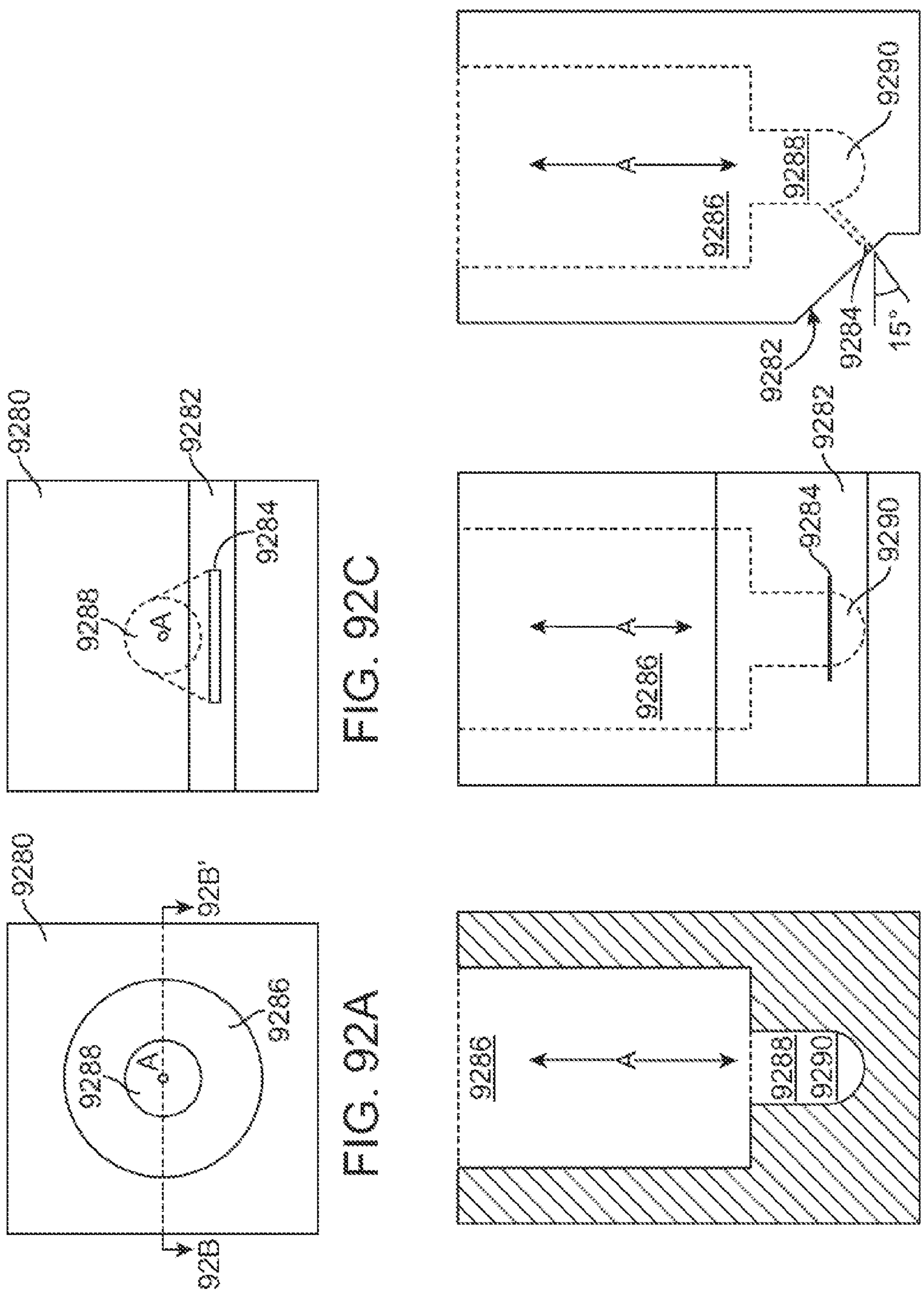

FIGS. 92A-92E show different simplified views of an alternative embodiment, wherein the slot is formed at an angle relative to the axis of the inlet and middle portions. FIG. 92A shows a simplified end view from the perspective of the inlet. FIG. 92B shows a simplified cross-section taken along line 92B-92B' of FIG. 92A. FIG. 92C shows a simplified view from an end opposite that of FIG. 92A. FIG. 92D shows a side view from the perspective of the outlet. FIG. 92E shows another side view.

In particular, the alternative embodiment of FIGS. 92A-92E features a nozzle that is formed by milling a block of material 9280 that has been shaped to include an inclined shoulder surface 9282 proximate to the velocity elevating portion 9284.

The nozzle design of FIGS. 92A-92E can be fabricated by forming the inlet space and the middle space utilizing the milling techniques described above in connection with FIGS. 92A-92C. The slot can be formed by milling the inclined surface at an angle perpendicular to that surface, for example utilizing a slitting saw machining tool. Another machining technique that may be used to create the slot is electrical discharge machining (EDM). By virtue of the orientation of the inclined surface relative to the axis of the inlet space, the resulting slot will also be angled relative to that inlet space.

While the above embodiments have described a nozzle structure formed from a single piece, the present invention is not limited to such a structure. In alternative embodiments, one or more portions of the space forming the liquid injection nozzle may be defined by recesses in opposing surfaces of mated plates. FIG. 93 is a perspective view of one such plate 9300 showing and end surface 9302 defining the recess 9304 forming one-half of the sprayer structure, including the shallow trapezoidal-shaped slot recess 9306 having outlet 9306*a*.

FIG. 93A shows a corresponding top view of the plate of FIG. 93. FIG. 93B shows a corresponding side view of the plate of FIG. 93

FIGS. 93 and 93B also show holes 9307 that are present in the side surface of the plate. These holes may be used to physically secure the plate to a manifold or other fluid source utilizing a bolt or another structure.

FIGS. 93-93B further shows projections 9308 extending from the end surface 9302. These projections are configured to engage with corresponding openings present in the second plate, thereby allowing aligned mating of the plates in order to define the sprayer.

Specifically, FIG. 94 is a perspective view of an embodiment of the second plate that is configured to mate with the first plate. FIG. 94 shows the surface 9402 of plate 9400 defining the half cylinder-shaped recess 9404 defining a planar opening and forming the other half of the sprayer structure. End surface 9402 also includes the holes 9410 that are sized to receive the corresponding projections from the surface of the second plate. Holes 9407 in the side surface of the plate, may be used to physically secure the plate to a manifold or other fluid source utilizing a bolt or similar structure.

FIG. 95 shows a view of an embodiment of an assembled sprayer structure taken from the perspective of a chamber that is configured to receive liquid from the sprayer. FIG. 95 shows the plates 9300 and 9400 mated together, with only the opening of the trapezoidal-shaped slot portion visible as an elongated hole 9500.

FIG. 96 shows a view of the embodiment of the assembled sprayer structure of FIG. 95, taken from the perspective of a pressurized source of liquid to the sprayer such as a manifold. FIG. 96 shows the plates 9300 and 9400 mated together, with the planar opening to the cylindrical-shaped recess visible as a circle 9600.

Nozzles according to certain embodiments of the present invention may offer a benefit by producing a fan-shaped spray. For example in certain embodiments the liquid may be injected into a chamber to efficiently perform heat exchange with a gas. Such liquid-gas heat exchange may be useful in achieving compression of a gas, or expansion of a compressed gas, under thermodynamically efficient conditions.

In particular, the amount of heat exchange depends upon a surface area of the liquid that is exposed to the gas. Providing a given volume of injected liquid over a fan-shaped area, produces a sheet of liquid that thins as the liquid flows, eventually breaking up into individual droplets. It may be desirable to produce small sized droplets distributed evenly over a large volume. Smaller sized droplets in turn exhibit larger surface area and enhanced heat exchange properties.

Using conventional spray nozzle designs, the liquid that is present at the edges of a spray may tend to remain coalesced in droplets of larger size relative to droplets in the center of the fan spray. The presence of such larger droplets at the edge may undesirably lower a surface area of the liquid that is available for heat exchange with the gas. This would reduce the efficiency of liquid-gas heat exchange.

Use of spray nozzle designs according to embodiments of the present invention as described above, however, may result in fewer large droplets at the edge of the fan spray. Specifically, FIG. 97 shows that liquid emerging from the edge of the direction changing region (hemispherical region), must traverse a longer distance within the limited volume of the narrow slot. This longer flow path X' through the narrow slot, as compared with the shorter flow path X through the slot taken by liquid emerging from the center of the direction changing region, should cause liquid at the edges of the fan spray to experience lower flow rates, reducing the volume of liquid present at the edge of the spray relative to the volume of liquid at the center of the spray. This lower flow rate effect should in turn reduce the relative thickness of the liquid sheet before breakup, and hence the size and number of the droplets at the edge of the spray, as shown in FIG. 98.

One potential benefit offered by some embodiments of spray structures according to the present invention, is relative ease of manufacturing. Specifically, the recesses forming the sprayer are defined between opposing surfaces that are mated together. Prior to mating of the plates, their respective surfaces are exposed and hence readily accessible to the designer and to machine tools, facilitating fabrication of recesses having the desired shape.

The multi-piece construction of certain embodiments in accordance with the present invention, also facilitates fabrication of more complex apparatuses utilizing multiple sprayers. Specifically, access to the surface of the plate(s) prior to their assembly, allows multiple recesses to be formed adjacent to each other in the same surface. Subsequent mating of the plate with one or more plates also having multiple such recesses, allows formation of a structure having multiple sprayers.

Furthermore, the shapes of the recesses in the surfaces of the plate may be relatively simple and easy to create with the appropriate precision. For example, certain milling tools may allow fabrication of shapes with features of 100 microns, 50 microns, or even 25 microns or less. The manufacture of nozzles with such precise small dimensions permits careful regulation of the flows of liquid through the device.

In certain embodiments such as are shown in FIGS. 93-93B, one plate may have a surface with a planar opening defining one-half of a cylindrical shaped recess with a hemispherical end. Such a shape may readily be formed with high precision and low dimensional tolerances, utilizing a machining tool having the appropriate profile.

The shape of the recess formed in the opposing surface of the other plate may be somewhat more complex, also including the shallow trapezoidal slot portion that is in contact with the spherical or other-shaped direction changing portion. However, even such more complex combinations of shapes may readily be formed with high precision and low dimensional tolerances, utilizing conventional milling techniques.

FIGS. 89-96 show only particular embodiments of spray structures, and should not be viewed as limiting the invention. Alternative embodiments could employ specific relative dimensions different from those shown in the figures, and remain within the scope of the present invention.

Still other embodiments of sprayers according to the present invention, may be formed from recesses shaped differently from those of the particular embodiments shown and described above. For example, the relative angle between the sides of the trapezoidal-shaped recess is not limited to 120°, and could be larger or smaller depending upon the particular application, resulting in a fan spray of liquid having a different angle. Increasing the angle may shorten the breakup length and affect droplet size.

In accordance with alternative embodiments, other configurations of recesses are possible. For example, while the above embodiments show a slot feature that is oriented to eject liquid either at an angle perpendicular or parallel to an inlet bore axis, this is not required by the present invention.

FIGS. 99A-D show an alternative embodiment a nozzle structure 9900 according to the present invention, wherein the slot portion 9902 having outlet **9902*a* is oriented at an angle of only 15° relative to the plane defined by the side faces 9904*a* and 9906*a* of the mated plates 9904 and 9906. This is accomplished by forming the plates or portions thereof in shapes other than rectangles, such that their opposed mating end faces 9904*b* and 9906*b* are not perpendicular to the respective side faces 9904*a*, 9904*b*** of the plates.

Thus in the particular embodiment shown in FIGS. 99A-D, the partially-spherical recess 9908 defining a planar opening 9910 is formed in triangle-shaped plate 9906, and the recess 9912 defining the non-planar opening 9914 is formed in the plate 9904 having a surface that fits with that triangle-shaped plate.

FIGS. 99A-D also show the liquid inlet opening 9915, as well as the openings to the bores 9916 that may receive screws or bolts that can be used to secure the plates together.

The particular embodiment of FIGS. 99A-D differs from prior multi-piece embodiments, in that the shapes of the recesses in the respective plates are not substantially symmetrical relative to one another. That is, recess 9908 in the plate 9906 defines the partially spherical portion, while the recess 9912 in the plate 9904 defines a cylindrical shaped channel leading from the inlet opening 9915 to a non-planar opening and the slot. Again, however, these recesses are relatively simply shaped and readily formed in the separate plates by milling techniques prior to assembly.

While the nozzle embodiments described above are defined between opposing faces of two plates fitted against each other, the present invention is not limited to this particular approach. Alternative embodiments in accordance with the present invention could be created by inserting a first piece into a second piece, such that the corresponding faces of the inserted pieces define the nozzle.

For example, FIGS. 100A-J show various views of an alternative embodiment of a nozzle design 10000, which is formed by the insertion of a first piece 10002 within an opening 10003 present in a second piece 10004. The two pieces 10002 and 10004 are secured together utilizing a bolt 10006 fitted through hole 10008 in the first piece and hole 10010 in the second piece. The bolt 10006 includes an end piece 10006*a*. Washer 10005 is seated on surface 10004*b* of the second piece 10004, and the first piece 10002 is seated on the washer.

Figure 100A:
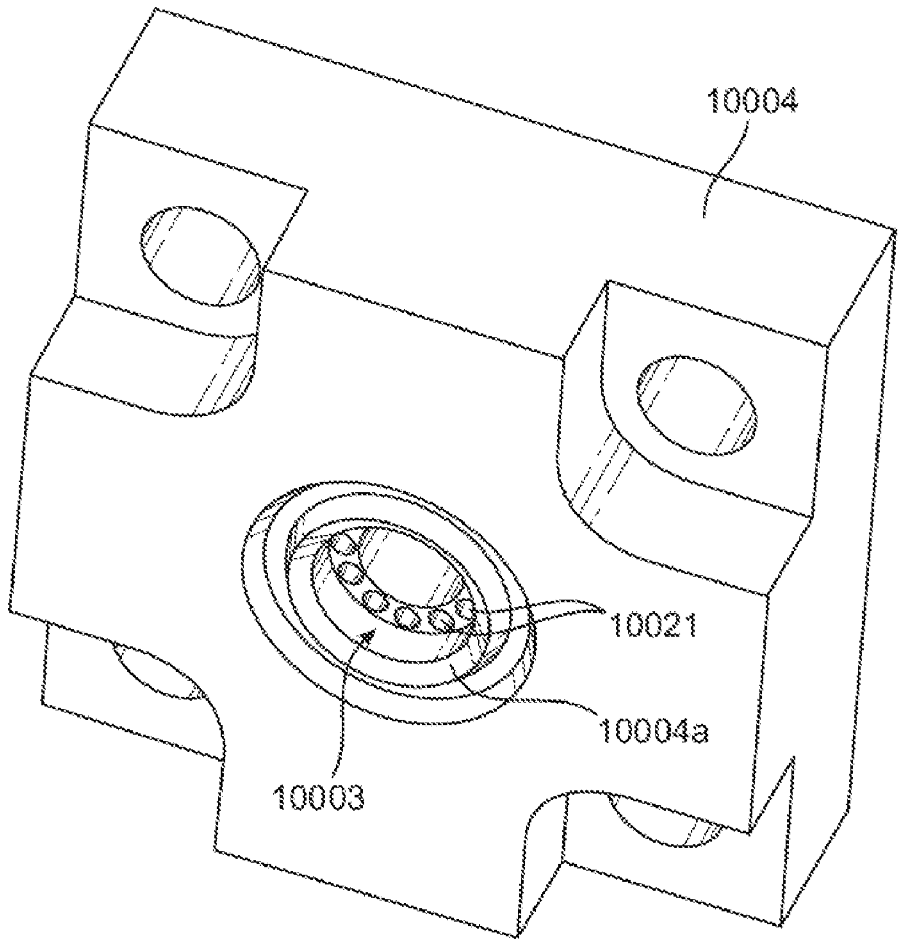
Figure 100B:
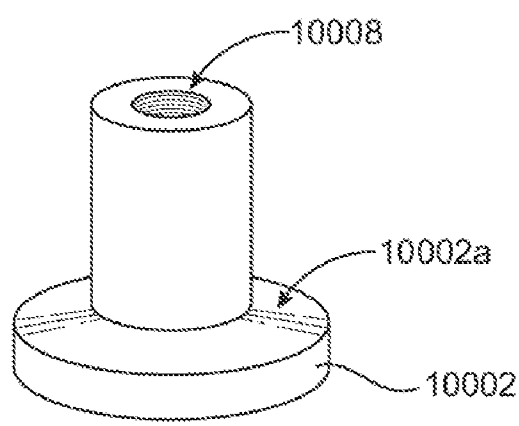
Figure 100C:
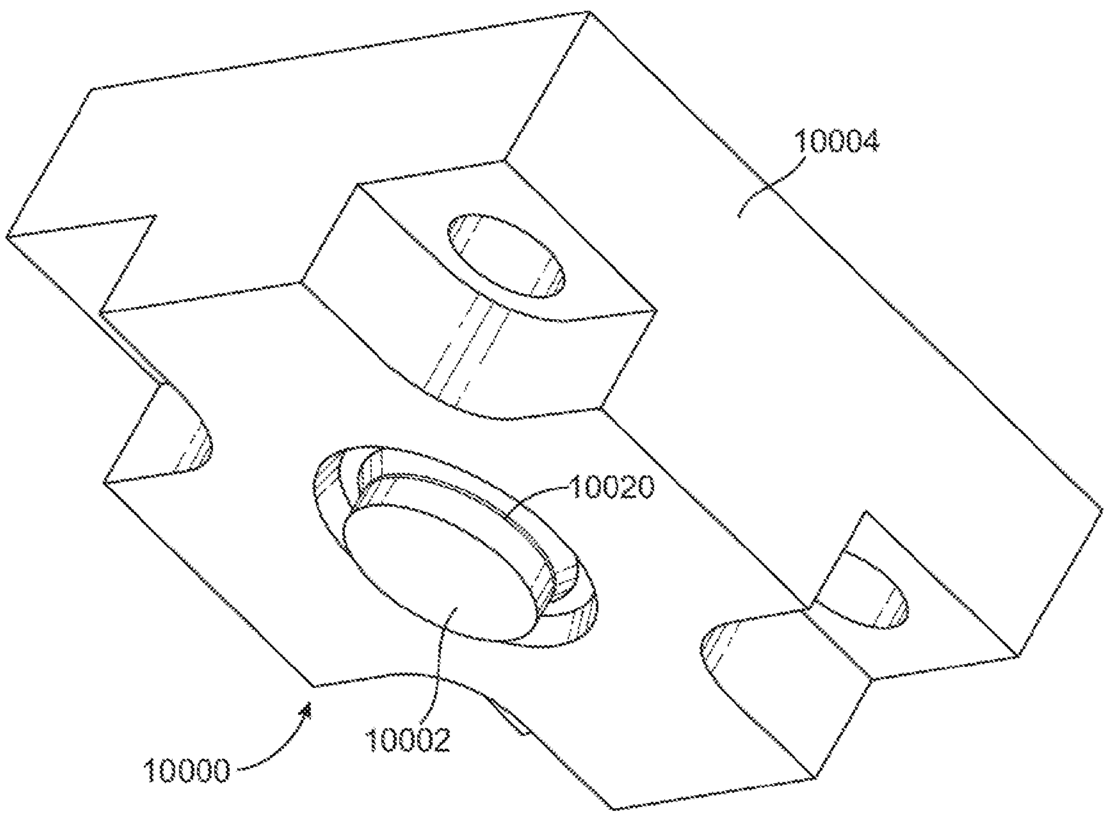
Figure 100D:
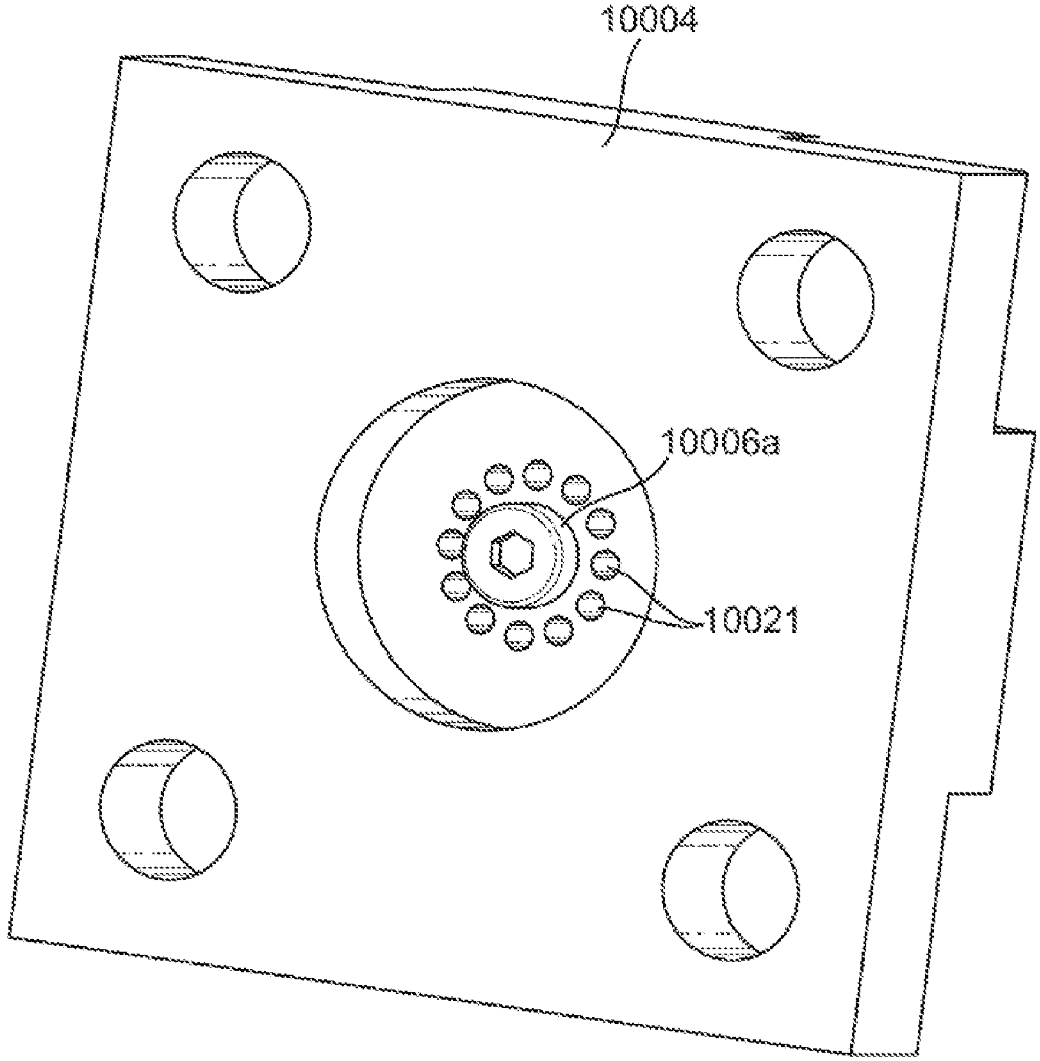
Figure 100E:
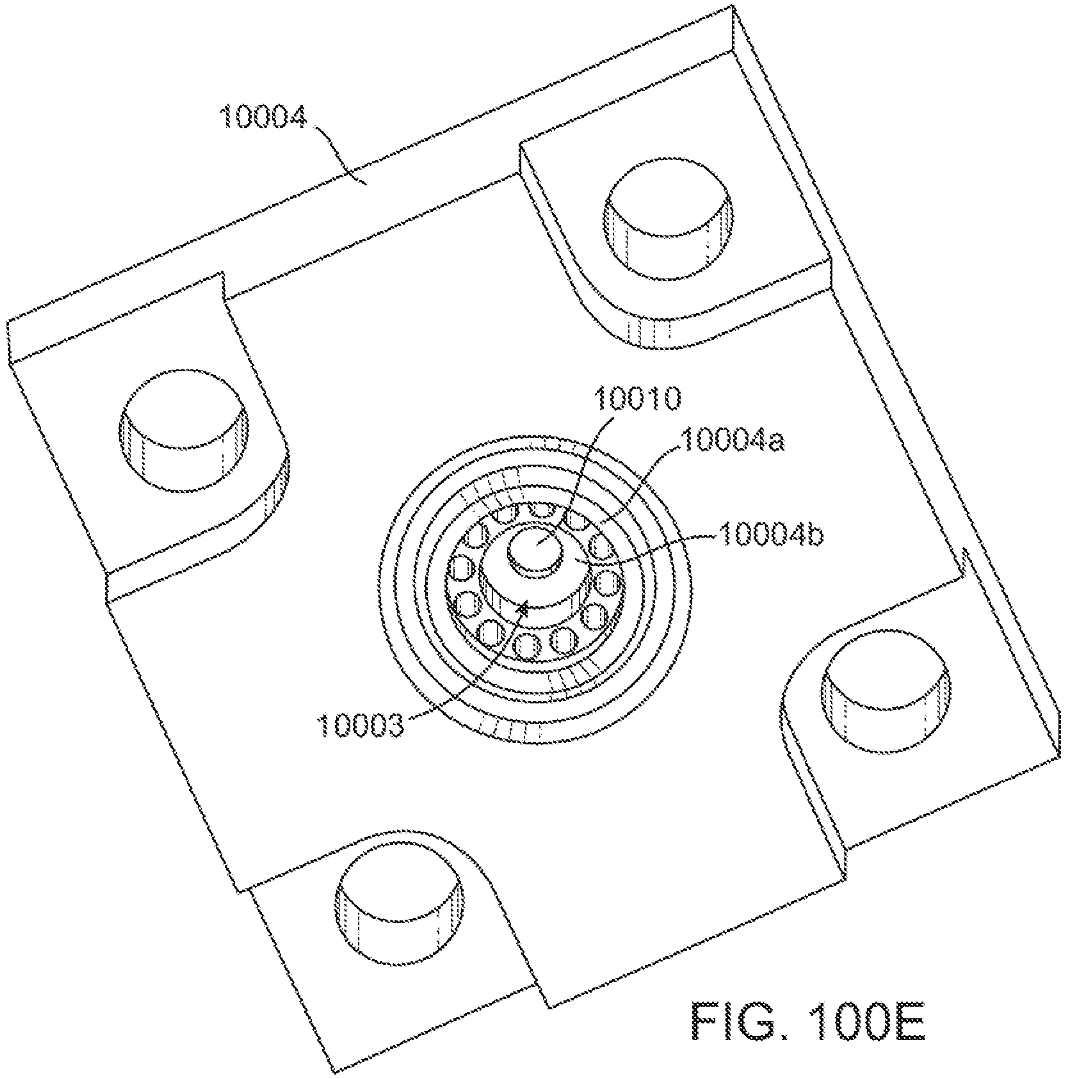
Figure 100F:
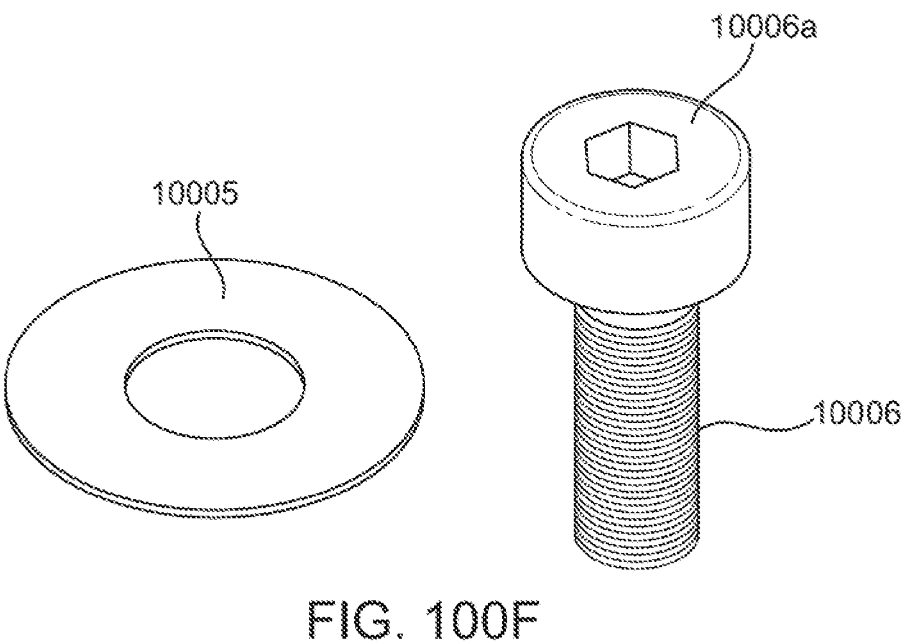
Figure 100G:
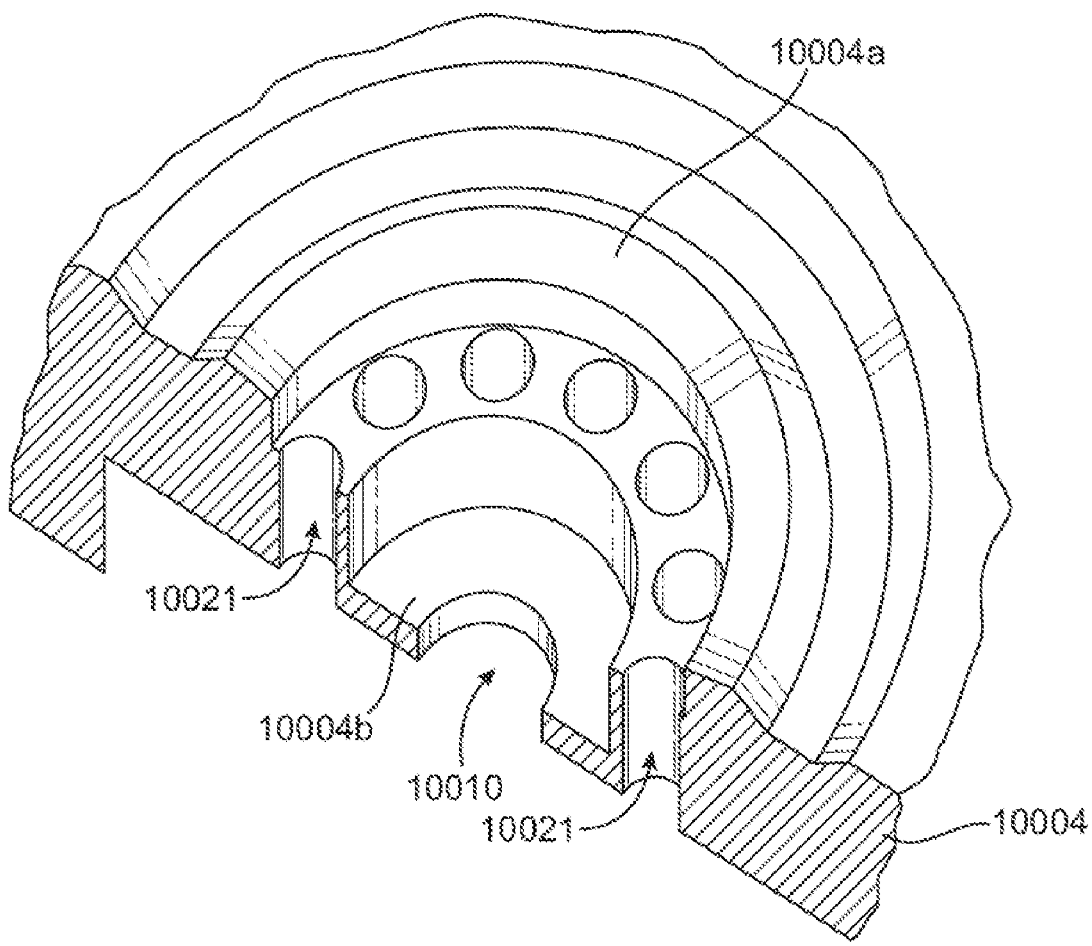
Figure 100H:
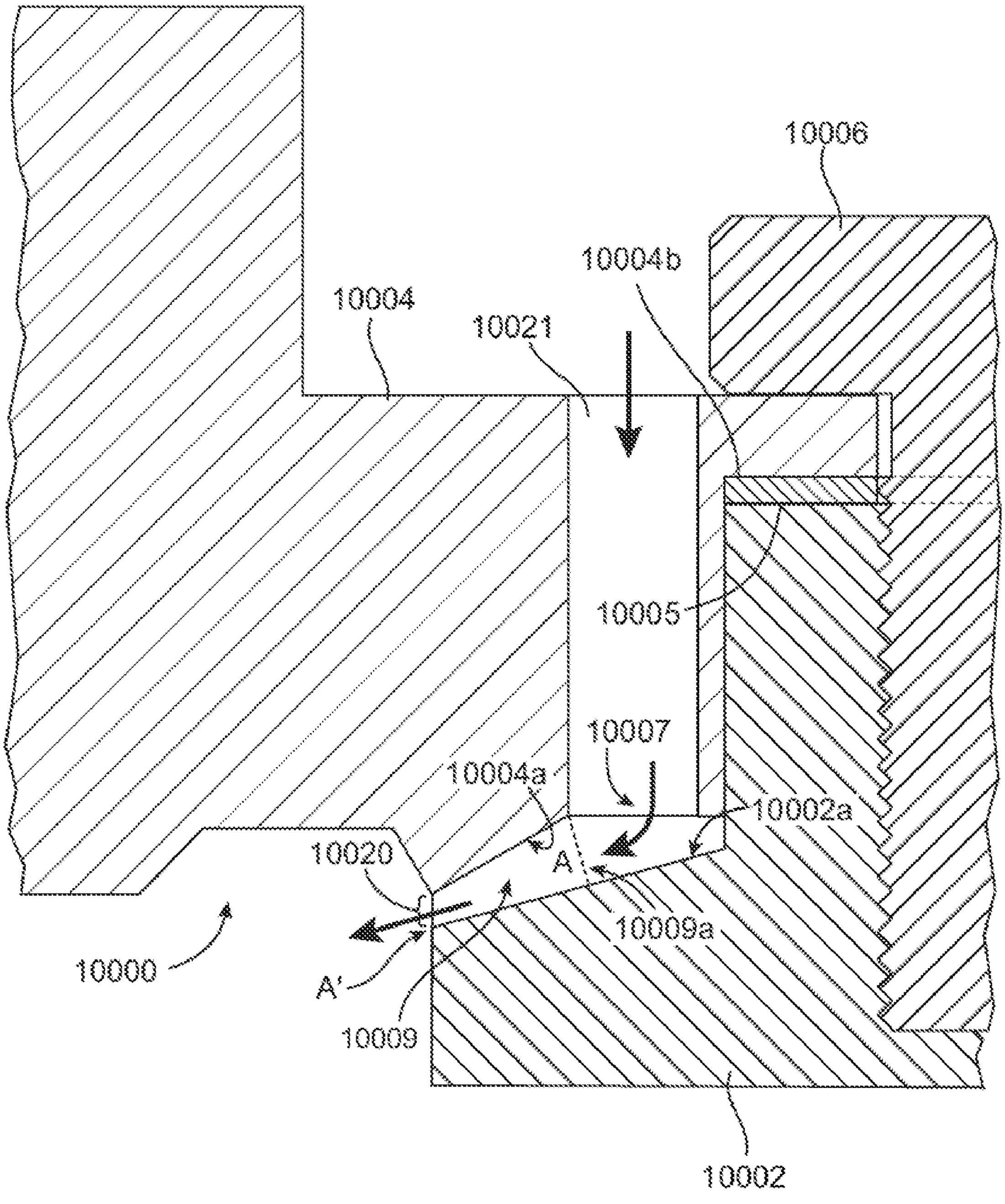
Figure 100I:
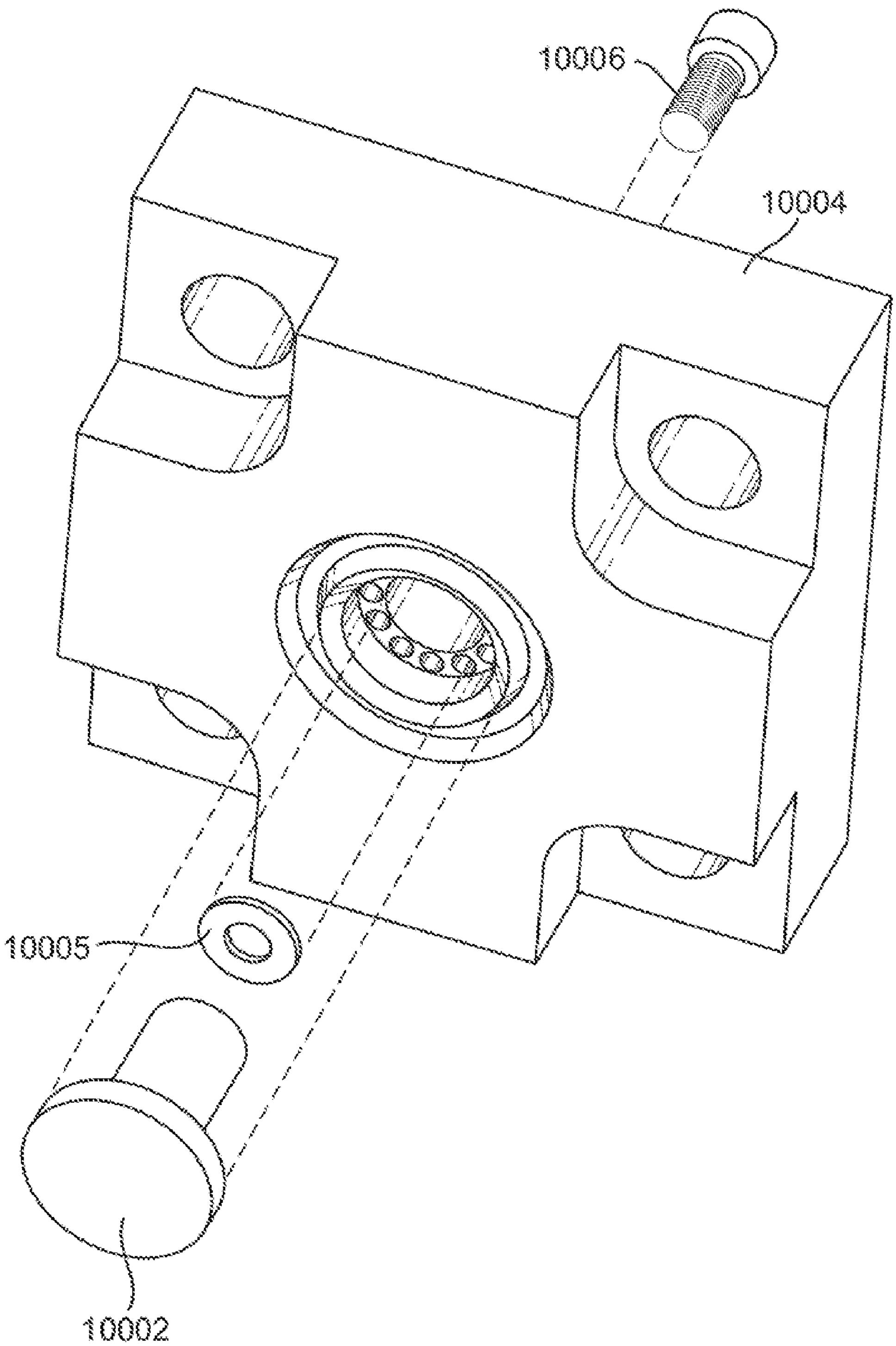

As shown in the cross-sectional view of FIG. 100H, the flow of liquid to be sprayed is indicated with the arrows as shown. This liquid flows through orifice(s) 10021 (here twelve in number) that are present in the second piece 10004.

The flowing liquid then changes direction in region 10007, as shown by the arrow. Region 10007 thus corresponds to the direction changing portion of this embodiment of a nozzle design.

This liquid then flows through the passageway 10009 defined between opposing surfaces 10002*a* and 10004*a* offered by the first and second respective pieces. Because passageway 10009 offers a smaller cross-sectional area to the incoming liquid than passageway 10021, velocity of the liquid is enhanced.

Figure 100J:
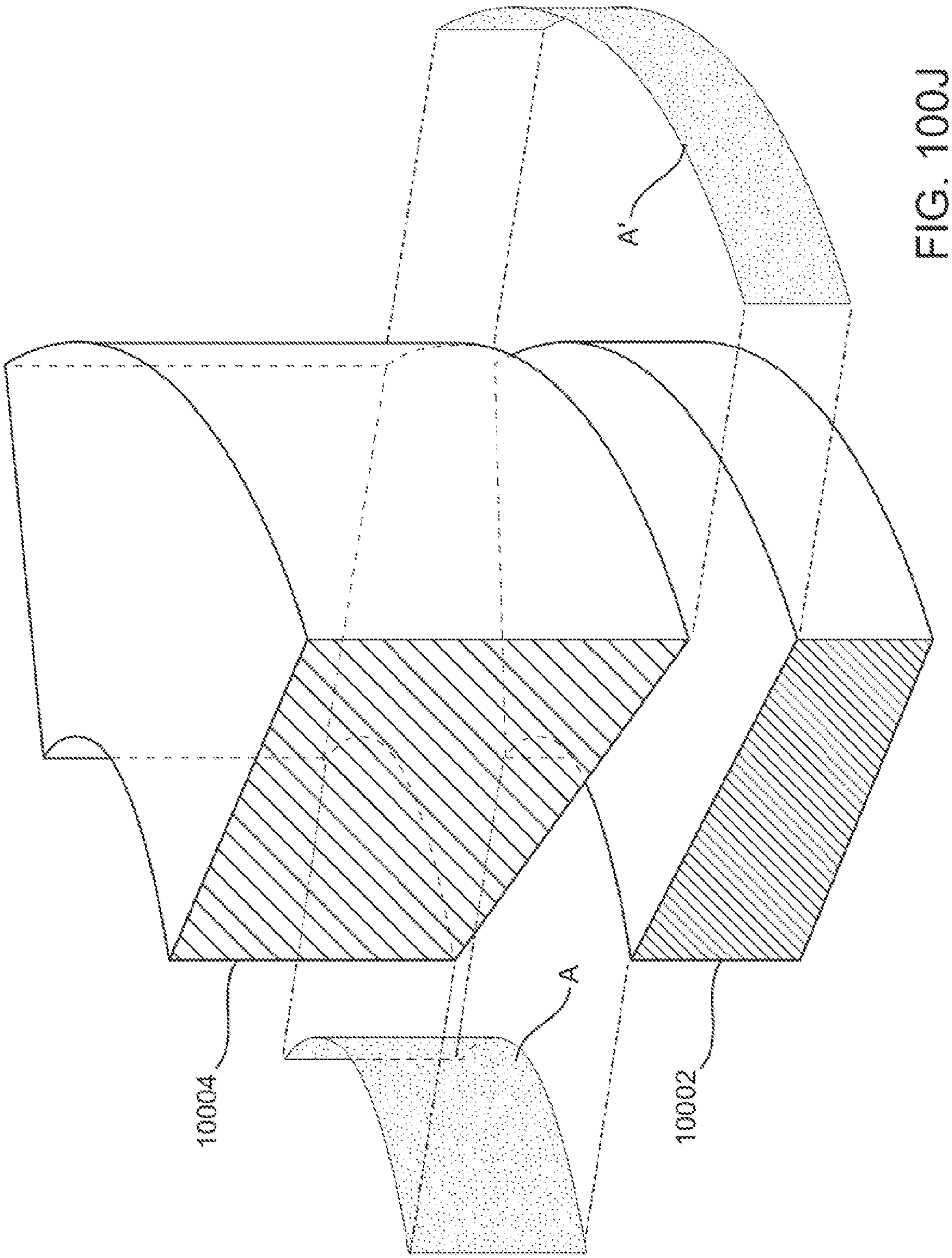

In addition, the respective surfaces 10002*a* and 10004*a* are inclined at different angles relative one another (surface 10002*a* is inclined at an angle of 15°, while surface 10004*a* is inclined at an angle of 30°). As shown in FIG. 100J, this geometry is arranged to offer substantially the same cross-sectional area as the liquid flows through passageway 10009. In particular, the cross-sectional area A of the inlet 10009*a* to the passageway 10009 forming the velocity enhancement portion, is substantially equal to (or even somewhat larger than) the cross-sectional area A' of the gap 10020 forming the outlet of that passageway.

Based upon the relative cross-sectional areas of the inlet and outlet to the velocity enhancement portion of the nozzle, the configuration of the embodiment of FIGS. 100A-J can lower the magnitude of the pressure drop experienced by the liquid. In this manner, the configuration of the embodiment of FIGS. 100A-J can desirably reduce incidence of cavitation, while inducing the velocity vector profile to create a hollow conical sheet of the liquid emerging from the nozzle.

The pressurized flowing liquid then ultimately exits from passageway 10009 and the nozzle through narrow gap 10020. FIG. 100H is not drawn to scale here, and the width of the gap 10020 is exaggerated for purposes of illustration.

One potential benefit of the performance of the embodiment of a nozzle design shown in FIGS. 100A-J is that it produces a spray in a hollow cone pattern. The lack of an edge offered by such a pattern may produce a more uniform distribution of droplet sizes than a fan spray. Additionally, a hollow cone spray pattern distributes liquid over a larger volume.

The nozzle shown in FIGS. 100A-J exhibits a geometry that is favorable to the creation of droplets of desired size for heat exchange. Specifically, the gap 10020 of the nozzle is 25 μm in this embodiment. This gap 10020 may be determined at least in part by a thickness of the washer 10005.

In the design of FIGS. 100A-J, the surface of the second piece 10004 adjacent to the outlet side of the gap 10020, is recessed. This recess may be helpful in avoiding deviation of the liquid spray attributable to the Coanda effect. According to certain embodiments, the side of the first (insert) piece may be recessed or beveled in order to avoid the Coanda effect. In other embodiments, the Coanda effect may be relied upon to divert or alter the flow direction.

A volume flow rate of 0.41 Gal/Minute 25.93 (ml/s) was measured from a stop watch and a graduated cylinder at a water pressure of 50 psig: 0.41 Gal/Minute; 25.93 (ml/s). The following table presents a brief summary of results of flowing liquid through the nozzle of FIG. 100A-J at two different pressures.

| Water Pressure (PSIG) | | 100 | 50 |
|---|---|---|---|
| Run # | | 1, 4, & 12 | 2, 3 & 20 |
| Average velocity in run 1 & 2 (m/s) | | 22.60 | 15.06 |
| Droplet Size in 1.94" | D32 (μm) | 161.4 | 167.9 |
| FOV (runs 4 & 3) | DV50 (μm) | 160.5 | 174.9 |
| Droplet Size in 0.63" | D32 (μm) | 116.8 | 127.9 |
| FOV (runs 12 & 20) | DV50 (μm) | 134.2 | 151.8 |
| Breakup length from one instantaneous image (inch) | | 1.15" | 1.4" |
| Sheet Angle | | 30° | |
| Thickness Water sheet at y = 3" | | Greater than 20 mm | Maybe same as 100 psi |

This table includes two measures of droplet size. The quantity D32 (also known as Sauter Mean Diameter or SMD), quantifies a spray with a fictitious droplet whose diameter represents the average ratio of volume to surface area for the droplets measured.

The quantity DV50 gives the droplet diameter which 50% of the droplets are smaller than. The quantity DV90 gives the droplet diameter which 90% of the droplets are smaller than.

For measurements taken with the 1.94" field of view (including runs 4 & 3), small droplets were not recognized. Thus, the droplet size statistics may not reflect all droplets.

An experimental setup for evaluating nozzle performance was created, as shown in FIGS. 101A-C. Water pressures of 50 and 100 PSIG were tested.

Because the nozzle of FIG. 100A-J exhibits a high flow rate, a drop in the water pressure of between about 8 to 10 PSI occurs when the nozzle is spraying. So the actual water pressure experienced by the nozzle may be about 42-50 PSIG and 90-100 PSIG.

Because the two internal surfaces of the nozzle exhibit different angles (30° and 15°), the angle of the water sheet at the exit was not know before the test. As shown in FIG. 101C, the average angle of 22.5° relative to the nozzle surface is used in the installation.

The angle between the water sheet and the nozzle surface calculated from the measurement is 30°. This indicates that the water sheet follows the 30° surface.

FIG. 101A shows the Field of View (FOV) coordinates. In addition to the typical measurement plane (z=0), more runs had been conducted at different z locations, as shown in FIG. 101B. This was to determine the thickness of the spray layer and the spray angle.

FIGS. 102-112B show results of spraying through the nozzle of FIG. 100A-J, at 100 PSIG water pressure. FIG. 102 shows the global flow structure from two instantaneous shadowgraphy images. The two images were not taken at the same time. The white lines indicate the break up length of 1.15".

The following table shows the mean velocity from runs 1 and 4 with 300 instantaneous velocity fields.

| Run # | | Min (m/s) | Max (m/s) | Average (m/s) | RMS (m/s) |
|---|---|---|---|---|---|
| 1 | Vx | −31.52 | 1.81 | −20.43 | 4.77 |
| | Vy | −23.25 | 25.29 | 0.53 | 9.69 |
| | \|V\| | 0.07 | 32.36 | 22.60 | 4.85 |
| 4 | Vx | −19.37 | −2.19 | −9.01 | 4.33 |
| | Vy | −5.57 | 6.13 | 0.28 | 1.78 |
| | \|V\| | 2.19 | 19.93 | 9.15 | 4.42 |

FIG. 103 shows mean velocity vectors from run 1 and run 4. FIG. 104 shows RMS velocity vectors from run 1 and run 4.

The droplet sizes resulting from run 1 are now discussed. The break up length is 1.15", and the field of view is 1.94". Since the spray does not break up until 2/3 of the FOV of run 1, the droplets size analysis is conducted only from x=−1.64" to −2.24".

FIG. 105 shows one instantaneous image with recognized droplets from run 1. Only some of the droplets are shown. The rest of the droplets are either too small to be recognized or are out of focus.

Because small droplets are not recognized, the droplet size statistics are not completely accurate. However, these droplet size statistics are shown in the following table to give an idea of the big droplets distribution

| Number of droplets | 100630 |
|---|---|
| D10 (μm) | 119.2 |
| D32 (μm) | 155.2 |
| DV10 (μm) | 96.7 |
| DV50 (μm) | 164.3 |
| DV90 (μm) | 281.4 |
| RMS (μm) | 42.6 |

FIG. 106 shows the histogram of the droplet size of run 1.

The droplet sizes resulting from run 4 are now discussed. FIG. 107 shows one instantaneous image with recognized droplets from run 4. Only some of the droplets are recognized, with the rest either being too small to be recognized or out of focus.

The lack of recognition of small droplets again affects the overall accuracy of the droplet size statistics. However, the purpose of showing these droplet size statistics in the following table is provide a sense of the distribution of large droplets.

| Number of droplets | 244616 |
|---|---|
| D10 (μm) | 110.8 |
| D32 (μm) | 161.4 |
| DV10 (μm) | 91.1 |
| DV50 (μm) | 160.5 |
| DV90 (μm) | 497.0 |
| RMS (μm) | 40.3 |

FIG. 108 shows the corresponding histogram of droplet size.

The droplet sizes resulting from runs 5-15 and 25-27 are now discussed. FIG. 109A shows one instantaneous image with recognized droplets of run 12 (z=7 mm) and FIG. 109B shows one instantaneous image with recognized droplets of run 14 (z=9 mm). Only certain droplets are recognized, with the rest of the droplets being either too small to be recognized, or out of focus.

FIG. 110A shows the histogram of the droplet size of run 12. FIG. 110B shows the histogram of run 14.

The following table shows the statistics of droplet size of runs 5-15 and 25-27.

| Run | Z (mm) | Sheet Angle | # of droplets | D10 (μm) | D32 (μm) | DV10 (μm) | DV50 (μm) | DV90 (μm) | RMS (μm) |
|---|---|---|---|---|---|---|---|---|---|
| 5 | 0 | 22.5 | 59884 | 55.4 | 93.1 | 47.6 | 113.3 | 189.3 | 29.0 |
| 6 | 1 | 23.3 | 65301 | 55.5 | 95.0 | 48.5 | 115.0 | 196.4 | 29.8 |
| 7 | 2 | 24.0 | 70230 | 56.5 | 99.5 | 50.9 | 121.8 | 203.9 | 31.5 |
| 8 | 3 | 24.8 | 70469 | 57.0 | 100.4 | 52.4 | 121.0 | 201.9 | 32.0 |
| 9 | 4 | 25.5 | 73430 | 57.9 | 102.9 | 54.3 | 124.4 | 205.2 | 33.0 |
| 10 | 5 | 26.3 | 73169 | 58.8 | 104.4 | 56.5 | 124.9 | 204.3 | 33.9 |
| 11 | 6 | 27.0 | 72683 | 59.5 | 105.0 | 57.8 | 125.0 | 201.5 | 34.3 |
| 12 | 7 | 27.7 | 70776 | 61.1 | 116.8 | 63.1 | 134.2 | 263.6 | 36.3 |
| 13 | 8 | 28.5 | 69952 | 60.9 | 107.8 | 60.9 | 127.8 | 204.3 | 35.6 |
| 14 | 9 | 29.2 | 68666 | 61.4 | 108.6 | 61.3 | 128.5 | 205.0 | 35.8 |
| 15 | 10 | 30.0 | 68069 | 61.4 | 109.8 | 61.5 | 130.5 | 212.8 | 36.1 |
| 25 | 4 | 25.5 | 56900 | 58.7 | 103.4 | 53.1 | 127.2 | 202.9 | 32.9 |
| 26 | 8 | 28.5 | 67633 | 60.3 | 108.1 | 58.9 | 130.2 | 210.5 | 35.3 |
| 27 | 10 | 30.0 | 66282 | 60.0 | 106.7 | 58.7 | 127.9 | 203.2 | 34.9 |

FIG. 111A shows the droplet size distribution along z axis of runs 5 to 15 and runs 25 to 27. FIG. 111B shows the same data in terms of sheet angle.

FIG. 112A shows the number of droplets recognized at each z location of runs 5 to 15 and runs 25 to 27. FIG. 112B shows the same data in terms of sheet angle.

FIGS. 112A-B show that the D32 line keeps increasing until z=7 mm (sheet angle) 27.7°), and is then stabilized for z=8 to 10 mm (sheet angle from 28.5° to 30°). So the sheet thickness defined by the droplet size is more than 20 mm.

FIGS. 112A-B also show that the number of droplets recognized peak at 4 mm (sheet angle 25.5°), and the resulting sheet thickness defined would be more than 10 mm. Even though the number of droplets is growing smaller from z=4 to 10 mm, this layer may be important owing to the large droplet size containing more water.

FIGS. 113-123B show results of spraying through the nozzle of FIG. 100A-J, at 50 PSIG water pressure. FIG. 113 shows the global flow structure from two instantaneous shadowgraphy images. The two images were not taken at the same time. The white lines indicate the break up length of 1.4".

The following table shows the mean velocity from runs 2 and 3 with 300 instantaneous velocity fields.

| Run # | | Min (m/s) | Max (m/s) | Average (m/s) | RMS (m/s) |
|---|---|---|---|---|---|
| 2 | Vx | −22.27 | 1.84 | −13.56 | 3.57 |
| | Vy | −18.06 | 19.2 | 0.42 | 6.79 |
| | \|V\| | 0.16 | 23.09 | 15.06 | 3.99 |
| 3 | Vx | −12.14 | −2.17 | −5.96 | 2.31 |
| | Vy | −3.32 | 3.54 | 0.07 | 1.14 |
| | \|V\| | 2.22 | 12.22 | 6.05 | 2.36 |

The velocity field for run 2 may lack accuracy because the flow is too smooth and not ideal for PIV analysis. The mean and RMS velocity vector fields from runs 2 and 3 are shown respectively in FIGS. 114 and 115.

The field of view of run 2 is 1.94", and the break up length is 1.4". Since the spray of run 2 does not break up until ⅔ of its field of view, the droplets size analysis is conducted only from x=−1.64" to −2.24".

FIG. 116 shows one instantaneous image with recognized droplets from run 2. As indicated before, only certain droplets are recognized. The rest of the droplets are either too small to be recognized, or are out of focus.

Lack of recognition of the small droplets may affect accuracy of the droplet size statistics. However, the purpose of showing these statistics is to provide some idea of the distribution of big droplets.

The following table shows the statistics for droplet size from run 2:

| Number of droplets | 84843 |
|---|---|
| D10 (μm) | 128.6 |
| D32 (μm) | 180.9 |
| DV10 (μm) | 106.4 |
| DV50 (μm) | 195.8 |
| DV90 (μm) | 358.0 |
| RMS (μm) | 52.8 |

FIG. 117 shows the corresponding histogram of the droplet size.

FIG. 118 shows one instantaneous image with recognized droplets from run 3. Again, only certain droplets are recognized droplets, with the rest being either too small to be recognized, or out of focus. While this affects the droplet size statistics, these are indicated in the following table to provide an idea of the distribution of big droplets.

| Number of droplets | 219604 |
|---|---|
| D10 (μm) | 117.2 |
| D32 (μm) | 167.9 |
| DV10 (μm) | 96.5 |
| DV50 (μm) | 174.9 |
| DV90 (μm) | 495.5 |
| RMS (μm) | 45.2 |

FIG. 119 shows a corresponding histogram of the droplet size from run 3.

FIG. 120 shows one instantaneous image with recognized droplets of run 20, with only some of the droplets recognized. The rest of the droplets are either too small to be recognized, or are out of focus.

The following table shows the statistics of droplet size of runs 16 to 24.

| Run | Z (mm) | Sheet Angle | # of droplets | D10 (μm) | D32 (μm) | DV10 (μm) | DV50 (μm) | DV90 (μm) | RMS (μm) |
|---|---|---|---|---|---|---|---|---|---|
| 16 | 0 | 22.5 | 30990 | 64.7 | 123.1 | 62.6 | 154.6 | 248.9 | 39.3 |
| 17 | 2 | 24.0 | 45744 | 62.1 | 120.8 | 63.3 | 151.1 | 243.8 | 38.9 |
| 18 | 4 | 25.5 | 50251 | 64.3 | 126.5 | 69.6 | 155.1 | 251.1 | 41.4 |
| 19 | 6 | 27.0 | 50169 | 66.1 | 127.2 | 72.9 | 153.6 | 241.6 | 42.5 |
| 20 | 8 | 28.5 | 51067 | 66.8 | 127.9 | 74.7 | 151.8 | 241.3 | 43.1 |
| 21 | 10 | 30.0 | 49241 | 67.5 | 129.4 | 75.9 | 153.7 | 241.3 | 43.6 |
| 22 | 10 | 30.0 | 50406 | 65.5 | 123.5 | 71.4 | 148.4 | 228.6 | 41.5 |
| 23 | 8 | 28.5 | 49721 | 65.6 | 123.5 | 69.6 | 149.3 | 229.6 | 41.1 |
| 24 | 4 | 25.5 | 44984 | 62.9 | 118.3 | 61.8 | 146.9 | 232.0 | 38.3 |

FIG. 121 shows a histogram of the corresponding droplet size from run 20.

FIG. 122A plots droplet size distribution along the z axis for runs 16-21 and 22-24 in terms of mm. FIG. 122B plots this droplet size distribution data in terms of sheet angle.

FIG. 123A shows the number of droplets recognized at each z location of runs 16 to 24. FIG. 123B shows the same data in terms of sheet angle.

Both lines of the D32 and the number of droplets recognized reach flat asymptote lines at z=4 mm (sheet angle 25.5). So the sheet thickness is also more than 20 mm.

In contrast with the results observed with a water pressure of 100 psig, the last three runs that were shifted in the x direction are different with those without shift. This suggests that the lower water pressure (50 psig) case may result in one or more of a smaller cone angle, a relatively more uniform droplet size distribution in space, and a bigger droplet size.

One possible benefit offered by the nozzle structure shown in FIGS. 100A-J, is the lack of features projecting into the cylinder. In particular, because the opening of the slot is flush with the wall of the chamber, the nozzle will not require providing additional dead volume within the cylinder to accommodate it. Lower dead volume is favorable to creating a high compression or expansion ratios.

Another possible advantage of the nozzle structure shown in FIG. 100A-J is ease of fabrication. In particular the paired recesses defining the nozzle that are present in the opposing surfaces of the plates, are readily machined with precision even in complex shapes, prior to mating of the plates.

As mentioned above, embodiments of sprayers according to the present invention may be particularly suited for use in injecting liquid droplets into a pressurized gas. In some embodiments, this pressurized gas may be experiencing compression, or may be undergoing expansion. In certain embodiments, the sprayer may be configured to inject liquid into the pressurized gas for purposes of performing heat exchange.

Embodiments of the present invention may be suited to the injection of droplets of liquid water into a pressurized gas. In some embodiments the gas may be air.

Embodiments of sprayers according to the present invention may be suited to injecting liquid into compressed gas that is present within a chamber in which compression and/or expansion is taking place. One example of such a chamber is a cylinder housing a reciprocating member such as a solid piston. Another example is a chamber housing a moveable member such as a screw. Other examples of apparatuses with which embodiments of a sprayer according to the present invention could possibly be used, include but are not limited to turbines, multi-lobe blowers, vane compressors, gerotors, and quasi-turbines.

Embodiments of sprayer structures according to the present invention may be configured to receive the pressurized flow of liquid through a liquid valve structure. Examples of such liquid valve structures that are suited for flowing pressurized liquid to a sprayer structure, include but are not limited to solenoid-actuated valves, spool valves, poppet valves, or needle valves. The liquid flow valves may be actuated by mechanical, magnetic, electromagnetic, pneumatic, or hydraulic forces.

In certain embodiments, the sprayer structure may be configured to receive the pressurized flow of liquid through a manifold structure. In some embodiments, a sprayer structure may be configured to receive the pressurized flow of liquid from a valve through a separate conduit, a portion of which may be shared with other sprayers.

In certain embodiments, the conduit connecting the sprayer structure to a liquid flow valve, may be made as short as possible. Such a configuration could be useful to reduce potential problems associated with bubbles forming in the conduit, due to outgassing when the valve is closed. Such outgassing could occur due to the liquid being supplied to the valve in pressurized form, with a lower pressure existing in the chamber that is receiving the liquid flowed through the sprayer.

In certain embodiments, a sprayer structure according to an embodiment of the present invention may be positioned relative to a second sprayer that is also in fluid communication with the same chamber. In some embodiments, the dimensions of the sprayers may be the same, but they could be oriented relative to one another in a particular manner.

For example, in the embodiment of FIGS. 100A-J, the insert includes a surface angled at 15° relative to the plane of the top of the insert, which may be the same as a wall of a compression and/or expansion chamber. In certain embodiments, two or more sprayers may have their outlet slots oriented in a consistent manner relative to a particular direction.

According to certain embodiments, this direction may be influenced by factors such as a position of a gas inlet valve relative to the sprayer, and/or a direction of movement of the moveable member within the chamber.

Embodiments of the present invention as have been described so far, relate to a sprayer structure for use in injecting liquid spray to perform heat exchange with a compressed gas. However, it will be appreciated that the sprayer structure is not limited to use in any particular application, and could be employed where liquid is to be introduced into a gas.

Embodiments in accordance with the present invention are not limited to injection of liquids in any particular direction relative to a direction of motion of a moveable member, or to a direction of an inlet flow of gas. For example, the particular embodiments of FIGS. 50A-B feature liquid sprayers are positioned on opposite end walls of a cylinder, with valve structures positioned on side walls of the cylinder.

In the configuration of these embodiments, owing to the location of the sprayers, liquid may be injected into the chamber in a direction parallel to the movement of the piston. Such an orientation may promote interaction between the gas and the injected liquid to form a liquid-gas mixture having the desired properties.

In these embodiments, the direction of liquid injection is not necessarily substantially coincident with the direction of inlet of gases through gas flow valves located on the side walls of the chamber. Such an orientation may promote interaction between the gas and the injected liquid to form a liquid-gas mixture having the desired properties.

The particular embodiment of FIG. 51 shows sprayers are positioned on opposite side walls of the chamber, with the valve structures positioned on other side walls. Accordingly, a direction of liquid injection may not necessarily be substantially parallel to either a direction of gas flowed into the chamber (in compression or expansion mode), or to a direction of movement of the piston within the chamber. Such lack of coincidence between the direction of liquid injection and directions of inlet gas flow or piston movement, may promote gas-liquid mixing and the formation of a liquid-gas mixture having the desired properties.

In other embodiments, however, liquid may be injected into the chamber in a direction substantially corresponding to a direction of inlet gas flow to the chamber. Such directionality of liquid injection may promote formation of a liquid-gas mixture having the desired properties.

For example, while the embodiments of FIGS. 50A-B and FIG. 51 show the low pressure side and high pressure side valves as being disposed on walls of the chamber different from the location of the liquid sprayers, this is not required by the present invention. FIG. 124 shows an alternative embodiment wherein sprayers 12438 and valves 12412 and 12422 are located on the same side walls 12408*b* of the chamber 12408.

In the embodiment of FIG. 124, a three-way valve 12436 is provided between the pump 12434 and the sprayers 12438 to selectively direct the flow of liquid to the particular sprayers located on the chamber side wall adjacent to low pressure side valve 12412, or to the sprayers located on the chamber side wall adjacent to the high pressure side valve 12422, depending upon the operational mode. Such a valve may also be configurable to block flow through the valve in any direction, thereby isolating the liquid circulation system from pressure changes in the chamber when liquid is not being introduced.

The embodiment of FIG. 124 may offer an advantage in that the sprayers can be oriented to inject liquid droplets in a direction substantially corresponding to a direction of gas flow into the chamber, in either compression mode or in expansion mode. Such coincidence between the directions of liquid injection and gas flow may promote formation of a liquid-gas mixture having the desired properties.

The embodiment of FIG. 124 may offer an advantage in that the sprayers may be oriented to inject liquid droplets in a direction that is not substantially parallel to a direction of movement of the moveable element within the chamber during compression or expansion. Such lack of coincidence between the directions of liquid injection and piston movement may promote formation of a liquid-gas mixture having the desired properties.

While the embodiment of FIG. 124 shows sprayers positioned on the chamber side wall above the respective valves, this specific configuration is not required by the present invention and variations are possible. For example, FIG.

124A shows a view of a side wall 12450 from inside a chamber, showing valve 12452 including valve plate 12454. FIG. 124A shows a plurality of sprayers 12456 surrounding the valve and configured to inject liquid in a plurality of trajectories into the inlet gas flow.

In certain embodiments, the sprayers may be configured to inject liquid in a direction substantially parallel to a direction of flow of gas through the valve. In other embodiments, one or more of the sprayers may be configured to inject liquid in a direction not substantially parallel to a direction of flow through the valve. In such embodiments, the outlets of the sprayers may be aligned in a uniform or non-uniform manner relative to each other.

While the above embodiments show sprayers positioned on a single wall or on opposing walls of a compression or expansion chamber, the present invention is not limited to such configurations. For example, FIG. 125 shows an alternative embodiment wherein sprayers are located both on the end wall and on adjacent side walls of the chamber. In certain embodiments, such a configuration may be facilitated by providing a liquid manifold 12570 that extends around various sides of the chamber 12508, with the sprayers in common liquid communication with that manifold. The view of FIG. 125 depicts only a cross-section, and thus in certain embodiments the liquid manifold could also extend out of the plane of the paper to allow fluid communication with sprayers located on other chamber walls.

FIG. 126 shows yet another embodiment, wherein the sprayers 12638 and each of the valves 12612 and 12622 are located on the same (end) wall 12608*a* of the chamber 12608. Such orientation of the sprayers relative to the valves, potentially allows use of the same sprayers to introduce liquid during both compression and expansion. This could avoid the need for design and placement of separate sprayers for compression and expansion, and would also avoid the additional valve and conduit complexity for routing liquid to respective sets of sprayers exclusive to compression or expansion.

While the particular embodiment of FIG. 126 shows the sprayers located between the valves, this is not required. In alternative embodiments, the sprayers could surround the valves in a manner similar to that shown in FIG. 124A.

As shown in FIG. 126, a valve 12636 may be positioned between the sprayer and the pump to isolate the fluid circulation system from pressure changes occurring in the chamber when liquid is not being introduced.

The embodiment of FIG. 126 may offer an advantage in that the sprayers are oriented to inject liquid droplets in a direction substantially corresponding to a direction of gas flow into the chamber. Such coincidence between the directions of liquid injection and gas flow may promote formation of a liquid-gas mixture having the desired properties.

The embodiment of FIG. 126 may also offer an advantage in that the sprayers are oriented to inject liquid droplets in a direction substantially corresponding to a direction of movement of the moveable element within the chamber during compression or expansion. Such coincidence between the directions of liquid injection and piston movement may also promote formation of a liquid-gas mixture having the desired properties.

While the embodiment of FIG. 126 may offer certain potential benefits, it positions a number of elements (valves, valve actuators, multiple sprayers and liquid conduits) within a relatively small region at the end wall of the chamber. Such a clustering of elements within a small space may affect design, construction, inspection, and/or maintenance of the apparatus.

However, it is typically the orientation of the sprayers relative to a gas inlet valve, that is important in determining the character of the liquid-gas mixture. In particular the liquid is injected into the inlet gas for heat exchange during compression/expansion processes. Because compression or expansion may be concurrent with inlet gas flow, it may be desirable to position the sprayers in a manner promoting rapid interaction between incoming gas and the liquid spray.

By contrast, the orientation of the liquid sprayers relative to the outlet valve may be less important. This is because the outlet valve is utilized simply to exhaust the liquid-gas mixture once an exchange of thermal energy during compression or expansion has already taken place.

Accordingly, certain embodiments of the present invention may introduce liquid through sprayers oriented relative to a single valve dedicated to regulating a flow of gases into the chamber in compression and/or expansion modes. FIG. 127 shows a simplified schematic view of one such embodiment, wherein inlet valve 12712 is positioned on end wall 12708*a* of chamber 12708.

In the embodiment of FIG. 127, a plurality of sprayers 12738 are also positioned on the end wall 12708*a* around inlet valve 12712. These sprayers are in fluid communication with a common liquid manifold 12770 that is configured to receive liquid from pump 12734. Outlet valve 12722 is provided in side wall 12708*b* of the chamber.

By careful design of the sprayers and their position relative to the inlet valve, liquid may be introduced to the chamber to result in a liquid-gas mixture possessing the desired characteristics (such as droplet size, uniformity of droplet distribution, liquid volume fraction, temperature, and pressure). And because the same valve is used to admit gas in both the compression and expansion modes, a liquid-gas mixture having desired properties may be produced in each case.

The conditions under which liquid is introduced, may different in the compression case versus the expansion case. For example during compression, the liquid will be introduced into a gas flow having a lower pressure. During expansion, the liquid will be introduced into a compressed gas flow having a higher pressure.

Accordingly, in the embodiment of FIG. 127 the operational parameters of certain elements may be controlled to produce a liquid-gas mixture having the desired properties. One example of a parameter which may be varied is the velocity at which the liquid is introduced into the chamber. Such a velocity parameter may be affected by variables such as the speed of the pump, and/or the dimensions of the sprayer, and/or characteristics of the conduit leading to the sprayer, such as bore, length, and number/degree of turns. In certain embodiments, the sprayer may comprise a nozzle having an orifice with dimensions adjustable to control a velocity of the liquid. In certain embodiments, the characteristics of the conduit leading to the sprayer may be changed (for example by actuation of a valving changing a path of liquid flow).

In certain embodiments, a pressure of the liquid may be changed. This may be done, for example, by altering a characteristic of operation of the pump (for example pump speed). In certain embodiments, liquid pressure may be changed by manipulation of a valve to give rise to pressure accumulation that is periodically relieved by bursts of liquid flows at high velocities.

The size of the liquid droplet may also affect its interaction with gas flows of different pressures. For example, a liquid droplet of a greater size may be able to penetrate more deeply into a compressed volume of gas. Thus in certain embodiments, the sprayer may be designed to produce droplet size that is different for the compression versus the expansion case.

The embodiment of FIG. 127 may offer an advantage in that the sprayers may be oriented to inject liquid droplets in a direction substantially corresponding to a direction of gas flow into the chamber. These sprayers are also oriented to inject liquid droplets in a direction substantially corresponding to a direction of movement of the moveable element within the chamber during compression or expansion.

Such coincidence between the directions of liquid injection and gas flow and piston, movement may promote formation of a liquid-gas mixture having the desired properties. However, embodiments of the present invention are not limited to flows of liquid in any particular direction relative to gas flows or piston movement.

FIG. 128 accordingly shows an alternative embodiment, wherein the inlet valve 12812 is located on a side wall 12808*a* of the chamber 12808, and the sprayers 12838 are positioned on the end wall 12808*b* of the chamber. In this embodiment, a trajectory of the liquid injection does not substantially correspond to a direction of gas inlet into the chamber. Such an embodiment may promote formation of a liquid-gas mixture having the desired properties.

FIG. 129 shows still another embodiment, wherein the sprayers 12938 are positioned on a plurality of chamber walls that are orientated differently relative to a direction of inlet gas flow and a direction of piston movement. Such a configuration may be facilitated by use of a liquid manifold 12970 extending around multiple sides of the compression or expansion chamber. The view of FIG. 129 depicts only a cross-section, and thus in certain embodiments the liquid manifold could also extend out of the plane of the paper to allow fluid communication with sprayers located on other walls of the chamber.

Embodiments of the present invention are not limited to the particular liquid nozzle injection design shown in FIGS. 100A-J. For example, FIG. 80 shows the spray profile of yet another type of nozzle where the insert has a square pyramidal shape, although the present invention is not limited to an insert having this or any particular number of sides.

FIGS. 133A-G show an alternative embodiment of still another embodiment of a nozzle design. In this nozzle design, a first piece 13302 is inserted within opening 13303 of the second piece 13304. The pieces are secured utilizing a bolt 13310 threaded into opening 13308 of the second piece. The back of bolt 13310 is secured to the back of the second piece 13304 utilizing a jam nut 13306.

Washer 13305 is seated on surface 13304*b* of the second piece 13304. The first piece 13302 is seated on the washer.

Figure 133A:
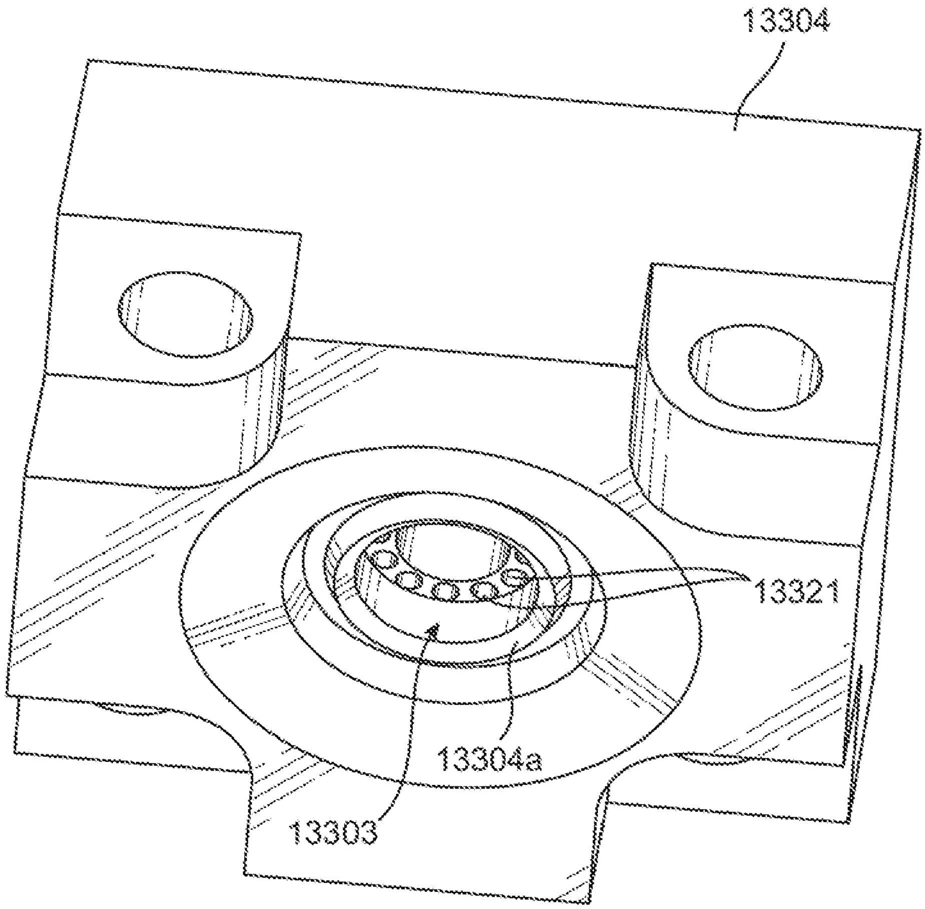
Figure 133B:
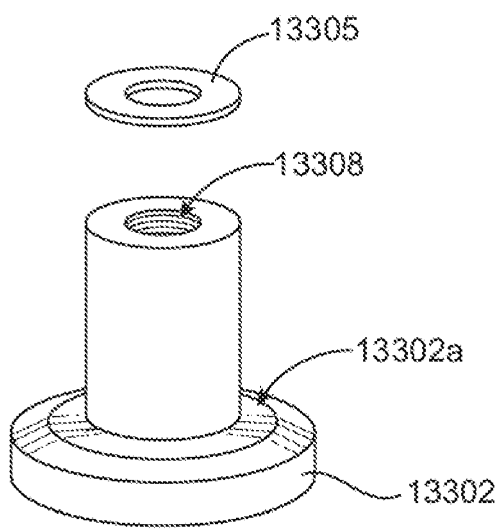
Figure 133C:
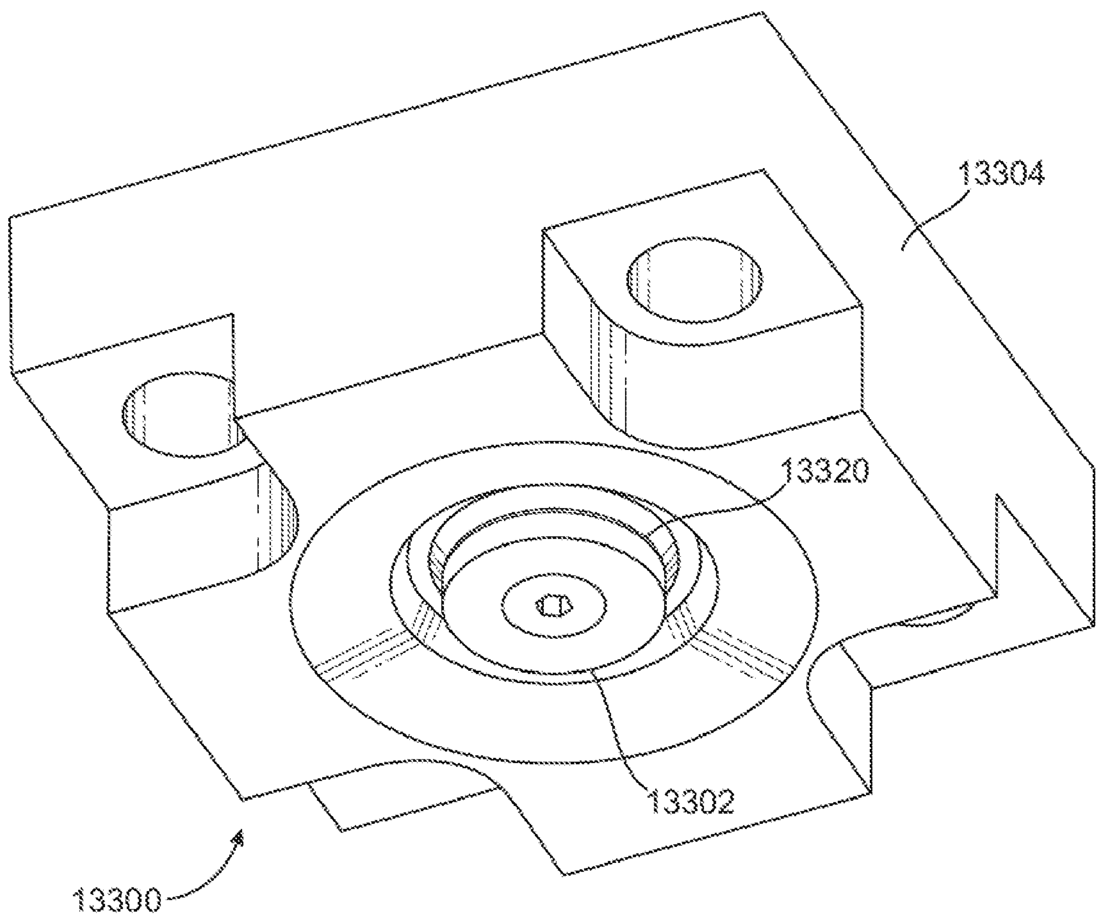
Figure 133D:
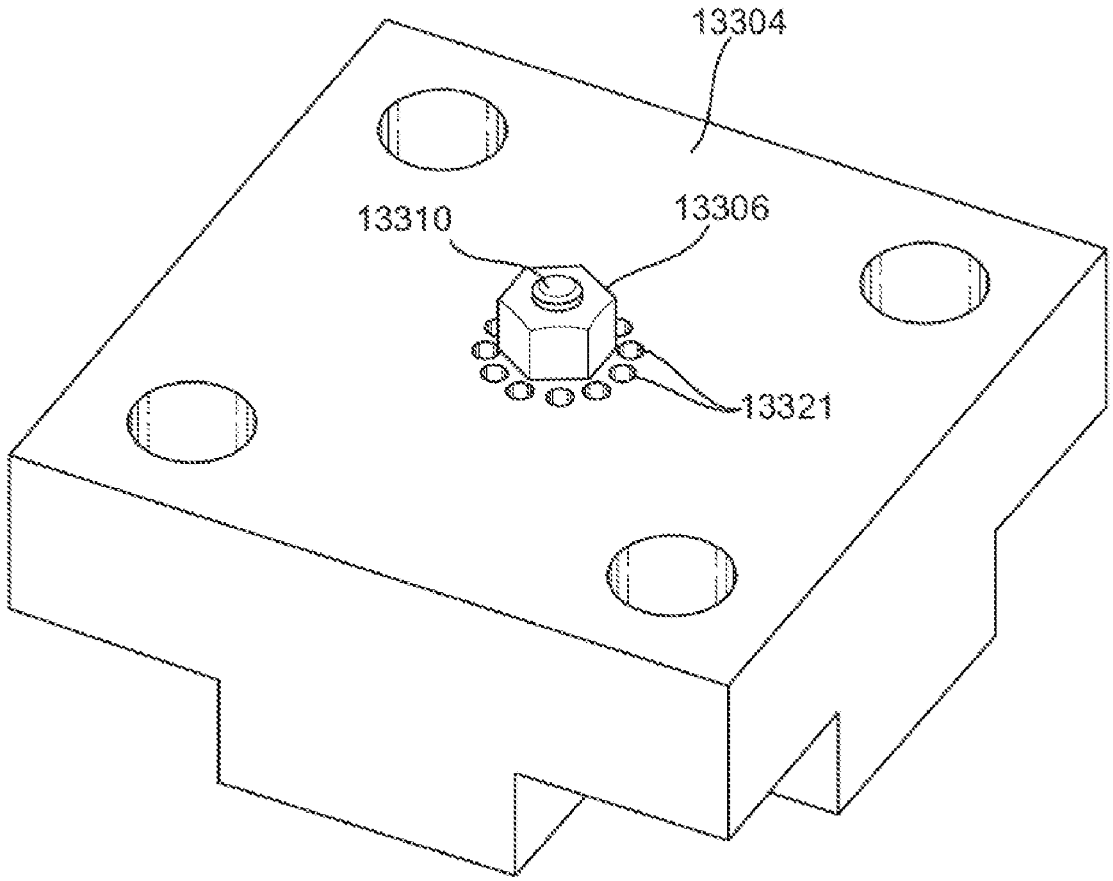
Figure 133E:
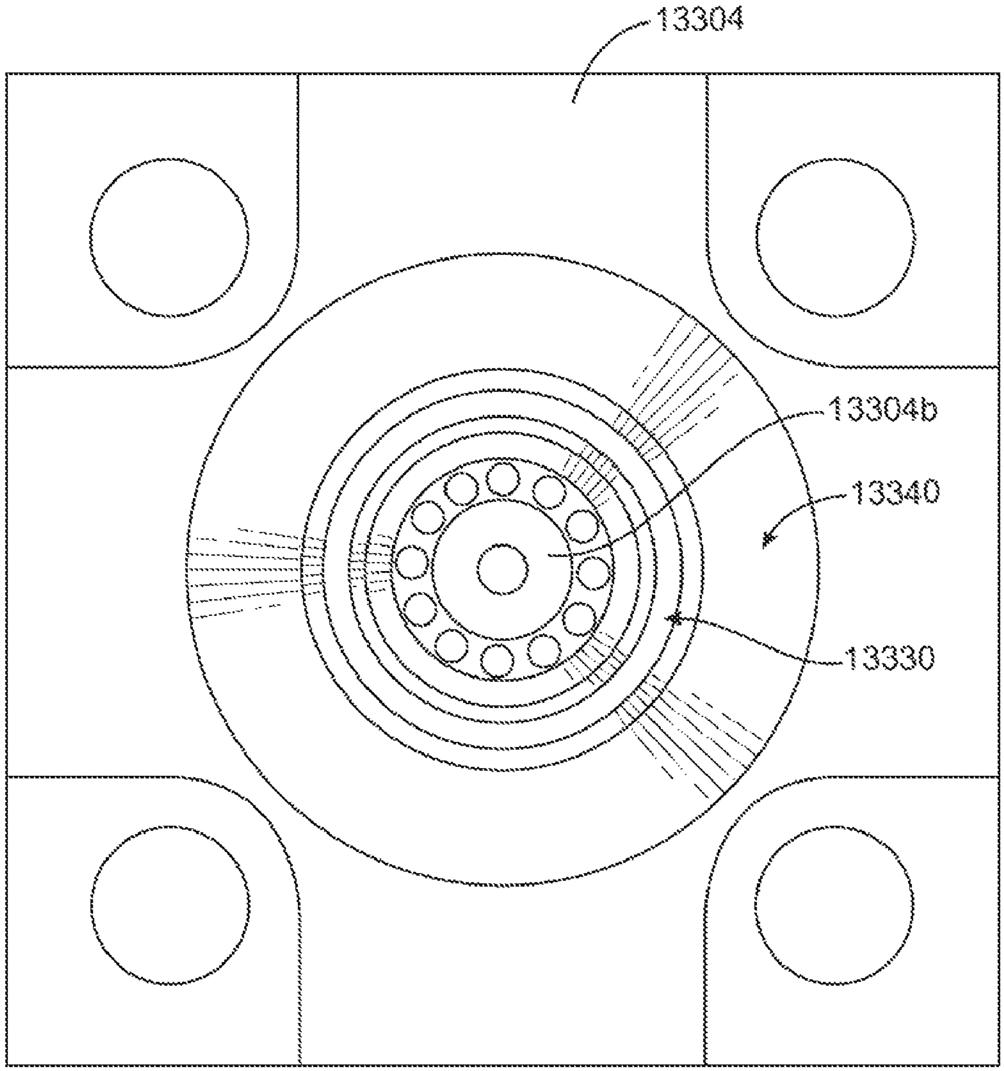
Figure 133F:
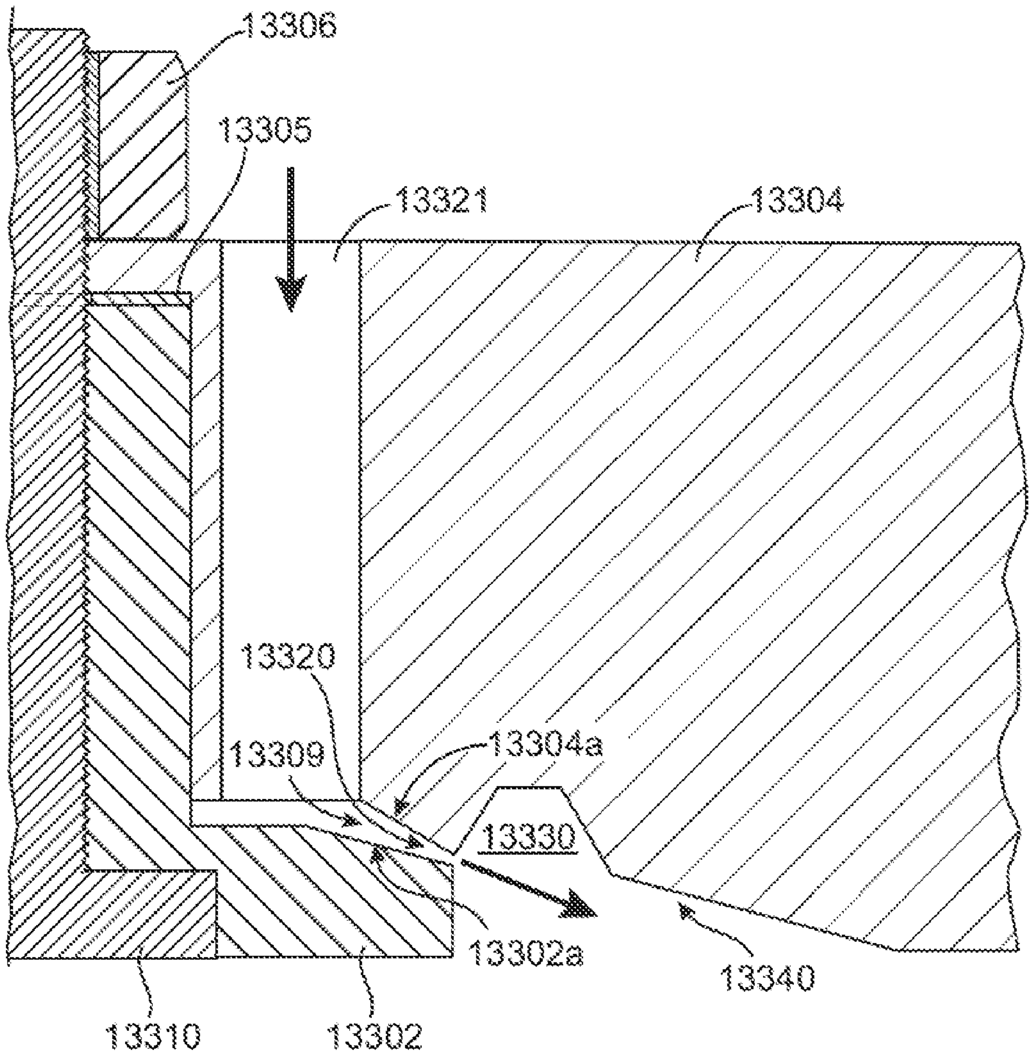
Figure 133G:
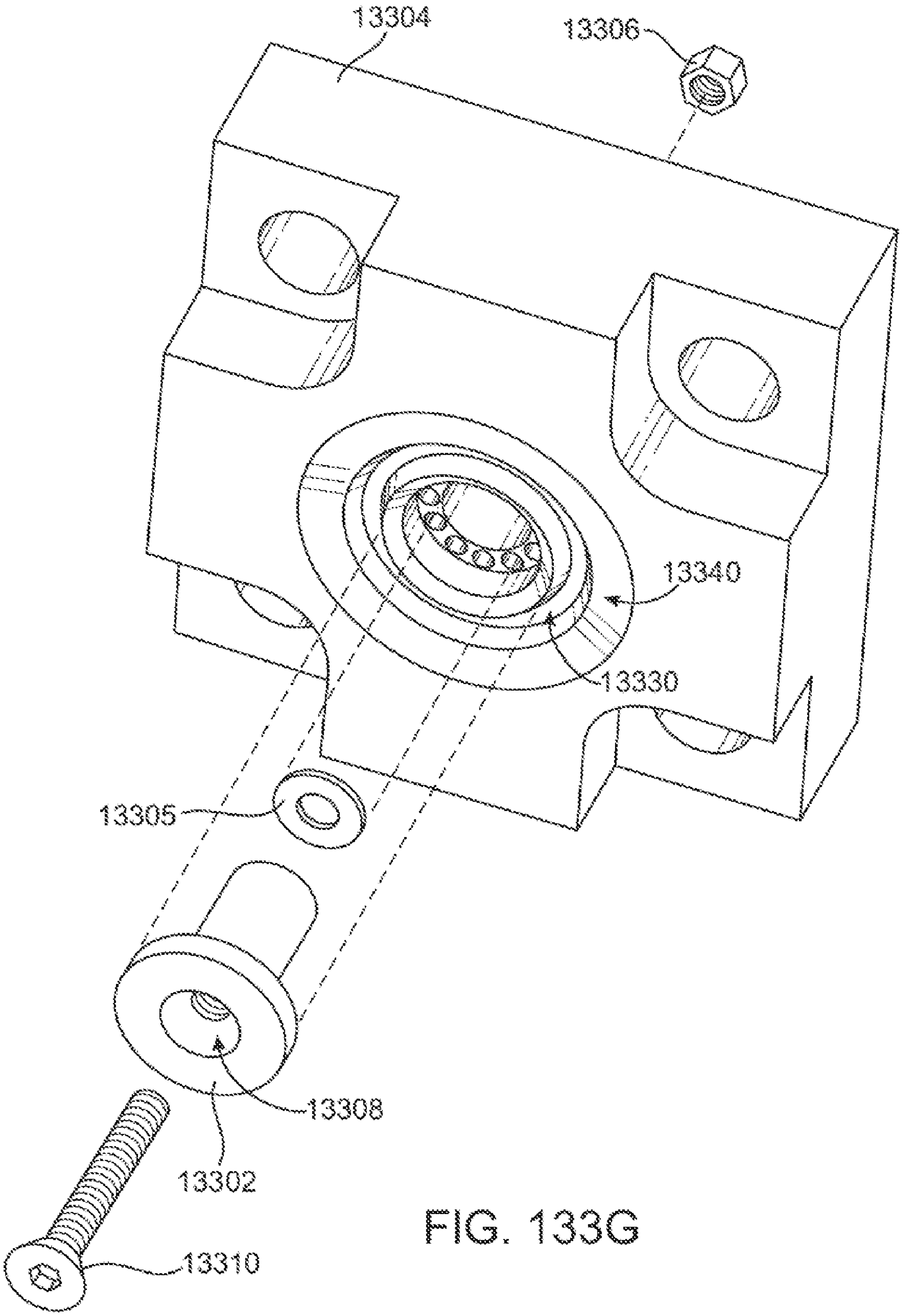

As shown in the cross-sectional view of FIG. 133F, the flow of liquid to be sprayed is indicated with the arrows as shown. This liquid flows through orifice(s) 13321 (here twelve in number) that are present in the second piece 13304.

The liquid then flows through the passageway 13309 defined between opposing surfaces 13302*a* and 13304*a* offered by the first and second respective pieces. Because passageway 13309 offers a smaller cross-sectional area to the incoming liquid, velocity of the liquid is enhanced.

In addition, the respective surfaces 13302*a* and 13304*a* are inclined at different angles relative one another (surface 13302*a* is inclined at an angle of 15°, while surface 13304*a* is inclined at an angle of 30°). Similar to the nozzle embodiment of FIGS. 100A-J, this geometry is arranged to have substantially the same cross-sectional area as the liquid flows through passageway 13309, thereby reducing the incidence of cavitation while inducing the velocity vector profile to create a hollow conical sheet of liquid emerging from the nozzle.

The pressurized flowing liquid then ultimately exits from passageway 13309 and the nozzle through narrow gap 13320. FIG. 133F is not drawn to scale here, and the width of the gap 13320 is exaggerated for purposes of illustration.

The nozzle shown in FIGS. 133A-G exhibits a geometry that is favorable to the creation of droplets of desired size for heat exchange. Specifically, the gap 13320 of the nozzle is 25 μm in this embodiment. This gap 13320 may be determined at least in part by a thickness of the washer 13305.

In the design of FIGS. 133A-G, the surface of the second piece 13304 adjacent to the outlet side of the gap 13320, bears a first recess 13330, and a second recess 13340. These recesses may be helpful in avoiding deviation in the path of the liquid spray attributable to the Coanda effect.

The nozzle design embodiment of FIGS. 133A-G may offer certain possible benefits. For example, the careful use of recesses in the second piece and thicknesses of material in constructing the first piece, allows the top surface of the first piece to be flush with the top surface of the second piece. This prevents the first piece from projecting into the chamber, reducing dead volume.

Another possible benefit of the embodiment of the nozzle of FIGS. 133A-G, is the ability to fix the first and second pieces together under conditions of vibration and liquid flow. In particular, these two pieces are secured together by bolt, which is in turn secured against the second piece by a jam nut, which resists loosening of the bolt under operational conditions of the nozzle.

Nozzle designs according to the present invention are not limited to the particular embodiments described above. For example, while FIGS. 100A-J and FIGS. 133A-G show a nozzle having a second piece with an array of (twelve) bores with axes oriented perpendicular to the surface of the second piece, this is not required by the present invention.

According to alternative embodiments, the axes of the bores could be oriented differently, for example offset at a consistent angle relative to the surface normal. Such a configuration could impart a swirl to the liquid flowed out of the nozzle. Such a swirled flow of liquid could exhibit beneficial properties, including but not limited to a reduced break-up length.

Moreover, the operational characteristics of a particular nozzle can be determined by differences in relative dimensions between elements. For example, FIG. 134A shows an enlarged view of the gap region 13400 formed between two pieces 13402 and 13204 of a nozzle 13406.

Liquid flows out of the nozzle at an angle approximately normal to the plane formed between the ends of the pieces 13402 and 13404. Accordingly, changing the relative lengths of these pieces can affect the spray angle.

FIG. 134B shows an alternative embodiment with the length L of the first piece 13402 shortened relative to the embodiment of FIG. 134A. This dimensional change results in a corresponding increase in the flow angle A relative to the plane of the surface of the nozzle, as compared with the embodiment of FIG. 134.

FIG. 134C shows an alternative embodiment with the length L of the first piece 13402 lengthened relative to the embodiment of FIG. 134A. This dimensional change results in a corresponding decrease in the flow angle A relative to the plane of the surface of the nozzle, as compared with the embodiment of FIG. 134.

Embodiments of spray nozzles according to the present invention may exhibit particular performance characteristics. One performance characteristic is droplet size.

Droplet size may be measured using DV50, Sauter mean diameter (also called SMD, D32, $d_{32}$ or D[3, 2]), or other measures. Embodiments of nozzles according to the present invention may produce liquid droplets having SMD's within a range of between about 10-200 um. Examples of droplet sizes produced by embodiments of nozzles according to the present invention include but are not limited to those having a SMD of about 200 microns, 150 microns, 100 microns, 50 microns, 25 microns, and 10 microns.

Another performance characteristic of liquid spray nozzles according to embodiments of the present invention, is flow rate. Embodiments according to the present invention may produce a flow rate of between about 20 and 0.01 liters per second. Examples of flow rates of embodiments of nozzles according to the present invention are 20, 10, 5, 2, 1, 0.5, 0.25, 0.1, 0.05, 0.02, and 0.01 liters per second.
, breakup length, spray pattern, spray cone angle, fan angle, angle to surface (for fan sprays), droplet spatial distribution Another performance characteristic of liquid spray nozzles according to embodiments of the present invention, is breakup length. Liquid output by embodiments of nozzles according to the present invention may exhibit a breakup length of between about 1-100 mm. Examples of breakup lengths of sprays of liquid from nozzles according to the present invention include 100, 50, 25, 10, 5, 2, and 1 mm.

Embodiments of nozzles according to the present invention may produce different types of spray patterns. Examples of spray patterns which may be produced by nozzle embodiments according to the present invention include but are not limited to, hollow cone, solid cone, stream, single fan, and multiple fans.

Embodiments of nozzles according to the present invention may produce spray cone angles of between about 20-180 degrees. Examples of such spray cone angles include but are not limited to 20°, 22.5°, 25°, 30°, 45°, 60°, 90°, 120°, 150°, and 180°.

Embodiments of nozzles according to the present invention may produce spray fan angles of between about 20-360 degrees. Examples of such fan angles include but are not limited to 20°, 22.5°, 25°, 30°, 45°, 60°, 90°, 120°, 150°, 180°, 225°, 270°, 300°, 330°, or 360°. Examples of fan spray angles to surface possibly produced by embodiments of the present invention, include but are not limited to 90°, 80°, 60°, 45°, 30°, 22.5°, 20°, 15°, 10°, 5°, or 0°.

Droplet spatial distribution represents another performance characteristic of liquid spray nozzles according to embodiments of the present invention. One way to measure droplet spatial distribution is to measure the angle of a sheet or cone cross-section that includes most of the droplets that deviate from the sheet. In nozzle designs according to embodiments of the present invention, this angle may be between 0-90 degrees. Examples of such angles possibly produced by embodiments of the present invention include but are not limited to 0°, 1°, 2°, 5°, 7.5°, 10°, 15°, 20°, 25°, 30°, 45°, 60°, 75°, or 90°.

According to certain embodiments of the present invention, it may be important to control the amount of liquid introduced into the chamber to effect heat exchange. The ideal amount may depends on a number of factors, including the heat capacities of the gas and of the liquid, and the desired change in temperature during compression or expansion.

The amount of liquid to be introduced may also depend on the size of droplets formed by the spray nozzle. One measure of the amount of liquid to be introduced, is a ratio of the total surface area of all the droplets, to the number of moles of gas in the chamber. This ratio, in square meters per mole, could range from about 1 to 250 or more. Examples of this ratio which may be suitable for use in embodiments of the present invention include 1, 2, 5, 10, 15, 25, 30, 50, 100, 125, 150, 200, or 250.

Certain nozzle designs may facilitate the fabrication of individual nozzles. Certain nozzle designs may also permit the placement of a plurality of nozzles in a given surface proximate to one another, which can enhance performance.

For example, FIG. 130A shows the spray trajectories of a number of nozzles 13010 that are present on the same wall of a cylinder. In certain regions 13012, sprays of liquid from two or even more of the nozzles overlap with each other. This overlap creates the potential that the liquid spray droplets will collide with each other, thereby further breaking them up into smaller sizes for heat exchange.

The flexibility in fabrication and placement of a plurality of spray nozzles, may offer additional enhancements to performance. For example, in certain embodiments the orientation of the dimensional axis of spray structures relative to a direction of piston movement and/or a direction of gas inflow, may be uniform or non-uniform relative to other spray structures.

Thus in certain embodiments, the dimensional axis of the spray structures could each be offset from a gas flow direction in a consistent manner, such that they combine to give rise to a bulk effect such as swirling. In other embodiments, the dimensional axis of the spray structures could be oriented in a non-uniform relative to certain direction, in a manner that is calculated to promote interaction between the gas and the liquid droplets. Such interaction could enhance homogeneity of the resulting mixture, and the resulting properties of the heat exchange between the gas and liquid of the mixture.

In certain embodiments, one or more spray nozzles may be intentionally oriented to direct a portion of the spray to impinge against the chamber wall. Such impingement may serve to additionally break up the spray into smaller droplets over a short distance.

FIG. 130B shows still another approach that is designed to enhance breakup of liquid sprays into droplets of smaller sizes. In this embodiment, the nozzle 13020 is designed to produce a fan spray which impinges against the chamber walls. Sonic or ultrasonic energy 13022 from transducers 13024 also impinges the chamber walls, causing them to vibrate.

This vibration alters the effective position or angle of liquid impingement, and hence the position or angle of reflection of the liquid off of the vibrating walls. Such reflection in turn serves to further distribute a given volume of liquid spray over a larger area, thereby breaking it up into smaller droplets to effectively perform heat exchange.

The present invention is not limited to the particular embodiment shown in FIG. 130B. In particular, while this figure shows the ultrasonic transducers as being positioned outside of the chamber, alternatively or in conjunction with such external placement, the sonic transducers could be positioned within the chamber.

Also, while this embodiment describes liquid impinging on a surface indirectly energized by a sonic or ultrasonic transducer, this is not required. According to certain embodiments, liquid may directly interact with a surface of a sonic or ultrasonic transducer. Some types of transducers are piezoelectric, electromagnetic, and magnetostrictive.

The direction at which a sprayer is configured to introduce liquid, is not necessarily normal to the chamber wall in which the nozzle is formed. For example in the embodiment of FIGS. 100A-J the outlet slot is inclined at a large angle relative to normal of the chamber wall.

A dimensional axis of a sprayer could lie angled toward or away from a direction in which inlet gas flows into the chamber (in compression or expansion). This direction of liquid introduction could also be angled toward or away from a direction of movement of the piston during introduction of the liquid in compression or expansion.

Such inclination of the spray can serve to effectively increase the path of the injected liquid, before it encounters the piston head or some other solid surface. Such a longer path affords more time for the liquid to break up into individual droplets having the desired small size (and hence large surface area) favorable for efficient heat exchange. This can be significant in designs where the overall length of the piston stroke is short relative to a the break-up length of the sprayed liquid.

The previous embodiments have depicted the chamber as a simplified interior space defined within walls. In certain embodiments, however, an interior of the chamber may exhibit a more complex profile.

For example, FIG. 131 shows a simplified cross-sectional view of an embodiment of a compression or expansion chamber housing a double-acting piston comprising a piston head 13106*a* and a piston shaft 13106*b*. The piston head defines two chambers 13108 and 13109, which are in fluid communication with external conduits through valve openings 13111 and 13123, and valve openings 13112 and 13122 respectively.

FIG. 131 shows in dashed lines the position of the piston head at the two extreme positions 13130 and 13132. At these positions, the piston head covers a portion of the valve opening through which gases are expected to flow.

FIG. 131 also shows that the end walls 13108*a* and 13109*a* of the chambers include respective recessed portions 13108*b* and 13109*b* proximate to the valve openings. The interior spaces 13108*c* and 13109*c* offered by these recesses can accommodate flows of gas through the valve openings when they are partially obstructed by the piston at positions 13130 and 13132.

Accordingly, in certain embodiments the liquid sprayers may be specifically oriented relative to interior chamber spaces, in order to promote formation of a liquid-gas mixture having the desired properties. For example, in the embodiment of FIG. 131 the sprayers 13138 may be specifically oriented in the end walls to introduce liquid droplets into the spaces 13108*c* and 13109*c* that are in the expected path of gas flows inlet through the valve openings.

While the specific embodiment of FIG. 131 shows a chamber having a particular interior profile, the present invention is not limited to the injection of liquid into this or any other type of chamber. For example, FIG. 132 shows a cross-sectional view of another chamber housing a double-acting piston.

In the embodiment of FIG. 132, the piston head 13206*a* exhibits a convex shape, with the corresponding end walls of the chamber exhibiting a concave shape. FIG. 132 thus shows the sprayers 13238 positioned in the end walls to inject liquid into the space defined between the convex piston head and the concave wall shape.

The particular embodiments of FIGS. 131 and 132 show the injection of liquids into chamber having a moveable member that is moveable in the horizontal direction. Thus embodiments of the present invention are not limited to the injection of liquids along any particular axis, and liquid can be injected into a chamber having a direction of piston movement in the horizontal or vertical direction.

In certain embodiments, direct injection of liquids may take into account changing conditions occurring during gas compression or expansion processes. One example of such a changing condition is temperature.

Specifically, gas heating does not take place at a constant rate over a compression stroke. Instead, heating intensifies at the end of the stroke as pressure builds to a higher level. Thus, in order to achieve compression under near-isothermal conditions, a greater amount of heat exchange may be required near an end of a compression stroke to maintain temperatures within a certain range. This greater amount of heat exchange may in turn require the introduction of additional volumes of liquid near an end of the stroke, which can be accomplished utilizing particular arrangements of liquid introduction apparatuses.

The effective volume of liquid introduced may be controlled in a variety of ways, taken alone or in combination. For example, the sprayers may be smaller or larger in size and/or fewer or larger in number, thereby reducing the amount of liquid injected. Alternatively or in conjunction with these factors, the sprayers may receive liquid that is flowed at small or large velocities, such that liquid is injected at a relatively low or high flow rate.

Further alternatively or in combination with the above factors, the sprayers may be configured to generate droplets of a different size. Such different sized-droplets may offer less or more surface area for heat exchange, and hence represent a smaller effective volume.

While the above description has focused on changes in temperature occurring over a compression stroke, other conditions may also change. For example, another example of a changing condition is pressure. Specifically, during initial stages of the compression process, the pressure of the gas is lower, allowing penetration and mixing of water droplets in the gas. By contrast, at the end of the compression stroke the pressure of the gas is much higher. This changed pressure condition may serve to exclude liquid, inhibiting interaction between the droplets and the gas because the gas pressure and/or density resists the impetus of the injected liquid.

The design of a particular apparatus could take into account this effect. For example, air being compressed at a BDC position of the chamber would be expected to be at a lowest pressure, encouraging interaction and mixing between the gas and the injected liquid. Accordingly, in this embodiment the sprayers at this position may be configured to inject a largest effective volume of liquid, utilizing one or more of the approaches described above.

While the above examples have focused upon changes in temperature and pressure occurring during a compression stroke, volume represents still another example of a changing condition. Specifically, during initial stages of the compression process, the gas is distributed over a large volume, offering more space for the positioning of sprayers to interact with the gas. By contrast, at the end of the compression stroke the gas is confined to a much smaller volume, reducing the space available for the sprayers to inject the liquid. Again, one or more of the liquid introduction factors described above may be employed to provide an effective liquid volume for heat exchange at the appropriate location in the chamber.

Designs of apparatuses utilizing the introduction of liquid according to embodiments of the present invention, should take into account the timing of liquid injection. For example, while liquid injection may take place at the beginning of the compression stroke, according to certain embodiments liquid injection may also occur as air is being flowed into the chamber during the immediately preceding stroke of the piston.

Such an approach could change the desirable configuration for the liquid injection system. For example, a consideration could be the orientation of the sprayers relative to the incoming gas, rather than various locations along the direction of the piston stroke. Such positioning of sprayers configured to inject large effective volumes close to the inlet valve, could promote gas-liquid mixing as the droplets interact with the gas flowing in to fill the chamber prior to compression. Of course, in certain embodiments liquid could continue to be directly injected even after the chamber is filled with gas, and as the piston moves toward TDC in compression.

Other configurations of liquid injection systems may be appropriate for the expansion case. There, while the relationship between the position of the piston in the stroke, and temperature and pressure is the same as that shown in connection with compression, these conditions vary in the opposite direction in time. Also, the particular values for pressure and temperature may be different during expansion and compression. Accordingly, the relative configuration of injection systems may be different in order to achieve optimal heat exchange between gas and injected liquid in the context of expansion.

The specific embodiments depicted so far have been provided for purposes of illustration only, and the present invention should not be limited to them. For example, while many of the chambers described above utilize two or more ports to flow gases into and out of a chamber, this is not required by the present invention.

According to alternative embodiments, a compression and/or expansion chamber could have a single port which is used to flow gases into and out of the chamber, in the compression and/or expansion mode. Such gas flows through the port may be regulated by a single valve, which is opened to admit gas, closed, and then opened to flow (compressed or expanded) gas out of the chamber.

This single port could be in communication with appropriate conduits on high- or low-pressure sides through a three way valve or a valve network, in order to allow appropriate routing of the compressed or expanded gases. Use of such a configuration having only a single port and corresponding gas flow valve, could simplify the structure of the device and substantially reduce costs.

And while certain of the embodiments described above utilize liquid inject through walls of a chamber, this is also not required by the present invention. In alternative embodiments, liquid could be introduced through the moveable member, for example utilizing orifices in a solid piston head, a piston rod, and/or a membrane.

What is claimed is:

1. A method comprising:

admitting a quantity of gas into a cylinder device having a moveable piston in communication with a mechanical linkage;

allowing the quantity of gas to expand and drive the piston within the cylinder device;

injecting a liquid into the quantity of gas to provide thermal energy for absorption by the expanding gas;

transmitting power out of the cylinder device via the mechanical linkage; and exhausting expanded gas and liquid from the cylinder device.

2. The method of claim 1 further comprising:

passing the expanded gas and liquid exhausted from the cylinder device, through a gas-liquid separator.

3. The method of claim 2 further comprising:

returning liquid separated out by the gas-liquid separator, to a liquid tank for reuse.

4. The method of claim 3 further comprising:

placing the separated liquid into thermal communication with a heat source.

5. The method of claim 1 wherein the thermal energy provided by the liquid maintains the quantity of compressed gas in a temperature range.

6. The method of claim 1 wherein the thermal energy provided by the liquid maintains the quantity of compressed gas substantially isothermal.

7. The method of claim 1 wherein valving under electronic control admits only the quantity of gas required to expand by a desired expansion ratio.

8. The method of claim 1 wherein injecting the first quantity of liquid comprises spraying.

9. The method of claim 8 wherein the spraying comprises forming a spray of droplets wherein a ratio of the total surface area of the droplets, to a number of moles of gas in the chamber, is between about 1-250 $m^2$/mol.

10. The method of claim 1 wherein injecting the first quantity of liquid comprises bubbling.

11. The method of claim 1 further comprising:

providing an electrical generator in physical communication with the mechanical linkage; and causing the electrical generator to supply electrical power to a power supply network to cover a ramp up period of a generation asset.

12. The method of claim 1 wherein the mechanical linkage converts reciprocating motion to shaft torque.

13. The method of claim 12 further comprising a compression cycle in which the shaft is in communication with a source of shaft torque to cause the piston to compress a second quantity of gas within the cylinder device.

14. The method of claim 11 further comprising:

in the compression cycle, introducing the second quantity of gas into the cylinder device;

subjecting the second quantity of gas to compression by the piston;

injecting a second quantity of liquid into the second quantity of gas to absorb thermal energy generated by compression; and transferring at least a portion of the second quantity of gas and the second quantity of liquid from the cylinder device.

15. The method of claim 14 further comprising:

in the compression cycle, flowing at least the portion of the second quantity of liquid and the second quantity of gas transferred from the cylinder device, through a gas-liquid separator.

16. The method of claim 15 further comprising returning a separated portion of the second quantity of liquid to a liquid tank for reuse.

17. The method of claim 16 further comprising:

placing the second quantity of liquid in thermal communication with a heat sink.

18. The method of claim 14 wherein the thermal energy absorbed by the second quantity of liquid maintains the second quantity of gas in a temperature range.

19. The method of claim 14 wherein the thermal energy absorbed by the second quantity of liquid maintains the second quantity of gas substantially isothermal.

20. The method of claim 14 wherein injecting the second quantity of liquid comprises spraying.

21. The method of claim 20 wherein the spraying comprises forming a spray of droplets wherein a ratio of the total surface area of the droplets, to a number of moles of gas in the chamber, is between about 1-250 $m^2$/mol.

22. The method of claim 14 wherein injecting the second quantity of liquid comprises bubbling.

* * * * *